US010564363B1

(12) United States Patent
Corl et al.

(10) Patent No.: US 10,564,363 B1
(45) Date of Patent: Feb. 18, 2020

(54) OPTICAL CONNECTORS

(71) Applicants: Jonas D. Corl, Bethlehem, PA (US); David M. Vincentsen, Bethlehem, PA (US); Thomas A. Mitchell, Nazareth, PA (US); Michelle M. Stone, Hellertown, PA (US); Thomas W. Stone, Hellertown, PA (US); James W. Guelzow, Victor, NY (US)

(72) Inventors: Jonas D. Corl, Bethlehem, PA (US); David M. Vincentsen, Bethlehem, PA (US); Thomas A. Mitchell, Nazareth, PA (US); Michelle M. Stone, Hellertown, PA (US); Thomas W. Stone, Hellertown, PA (US); James W. Guelzow, Victor, NY (US)

(73) Assignee: Wavefront Research, Inc., Northampton, PA (US)

( * ) Notice: Subject to any disclaimer, the term of this patent is extended or adjusted under 35 U.S.C. 154(b) by 85 days.

(21) Appl. No.: 14/216,199

(22) Filed: Mar. 17, 2014

Related U.S. Application Data

(60) Provisional application No. 61/852,155, filed on Mar. 15, 2013.

(51) Int. Cl.

| | |
|---|---|
| ***G02B 6/32*** | (2006.01) |
| ***G02B 6/36*** | (2006.01) |
| ***G02B 6/26*** | (2006.01) |
| ***G02B 6/38*** | (2006.01) |

(52) U.S. Cl.
CPC ............ *G02B 6/366* (2013.01); *G02B 6/262* (2013.01); *G02B 6/3803* (2013.01)

(58) Field of Classification Search
USPC .......................................................... 385/52
See application file for complete search history.

(56) References Cited

U.S. PATENT DOCUMENTS

| | | | | |
|---|---|---|---|---|
| 4,747,498 A * | 5/1988 | Gach | B65D 47/0885 | 215/232 |
| 2004/0114865 A1 * | 6/2004 | Ryall | G02B 6/2937 | 385/39 |
| 2007/0019907 A1 * | 1/2007 | Alcock | G02B 6/322 | 385/33 |
| 2011/0075971 A1 * | 3/2011 | Elenbaas | G02B 6/3847 | 385/55 |
| 2016/0202428 A1 * | 7/2016 | Grinderslev | G02B 6/3812 | 385/11 |
| 2018/0034773 A1 * | 2/2018 | Petry | H04L 63/10 | |

OTHER PUBLICATIONS

Binder Product Data Sheet, 2019.*

* cited by examiner

*Primary Examiner* — Eric Wong
(74) *Attorney, Agent, or Firm* — Burns & Levinson LLP; Orlando Lopez

(57) ABSTRACT

Optical connectors that substantially preserve alignment and are easy to manufacture. The alignment system using the optical connectors disclosed herein include a first housing, a second housing and an alignment component, the said alignment component configured to provide optical alignment between the optical components.

10 Claims, 321 Drawing Sheets

1960

2440

OPTICAL CONNECTORS

CROSS-REFERENCE TO RELATED APPLICATIONS

This application claims priority to U.S. Provision Application No. 61/852,155, filed Mar. 15, 2013, the entire contents of which are incorporated herein by reference and for all purposes.

STATEMENT OF FEDERALLY SPONSORED RESEARCH OR DEVELOPMENT

This invention was made with U.S. Government support from the U.S. Air Force under Contract Nos. FA8650-04-C-3414, FA8650-08-C-3832, FA8650-10-M-3019 and FA8650-11-C-3107. The U.S. Government has certain rights in the invention.

BACKGROUND

This invention relates generally to optical interconnects.

Current optical fiber connector and breakout/fanout technologies limit applications because the connectors are heavy, large, and costly. Some of these conventional optical interconnects systems are too susceptible to contamination, as from dirt, dust, and cooling fluids. Still other connector devices are too sensitive to small misalignments or temperature fluctuations.

There is a need for optical connectors that substantially preserve alignment in demanding environments.

SUMMARY

The various embodiments of the present teachings disclose optical connectors that substantially preserve alignment and are easy to manufacture.

For a better understanding of the present invention, together with other and further objects thereof, reference is made to the accompanying drawings and detailed description.

DETAILED DESCRIPTION

Figure 1:
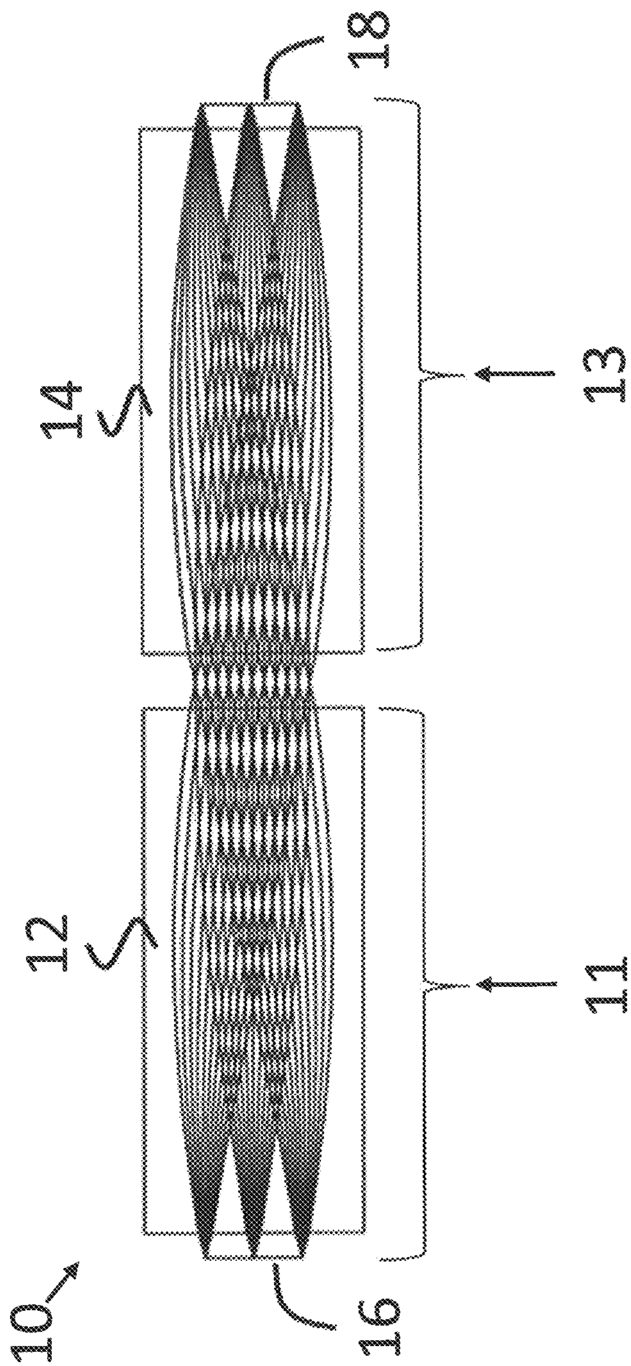
FIG. 1 illustrates an imaging relay lens system as used in these teachings.

Reference is made to FIG. 1, which illustrates an imaging relay lens system 10 having a pair of substantially infinite conjugate imager gradient index (GRIN) lenses 12 and 14 used to reimage an object array 16 to an image array 18 as described in U.S. Pat. Nos. 6,635,861, 7,015,454, 7,446,298 and 7,660,502, which are incorporated herein by reference in their entirety and for all purposes. Herein, the term "lens" is used interchangeably with the term "Imager". "Optical component." as used herein applies both to optical imaging components (such as, lenses, mirrors, gratings, etc.) and optoelectronic components (such as, emitters, detectors, etc.) Herein the imager 12 and object array 16 form one optical subassembly, an array and imager assembly 11. Similarly, the imager 14 and image array 18 form another optical subassembly, an array and imager assembly 13.

The term "object array" can refer to any number of devices, such as but not limited to a fiber array, VCSEL array, detector array, or other object plane, and is herein referred to generally as the object array. The term "image array" can refer to any number of sources, such as but not limited to a fiber array, VCSEL array, detector array, or other image plane, and is herein referred to generally as the image array.

Figure 2:
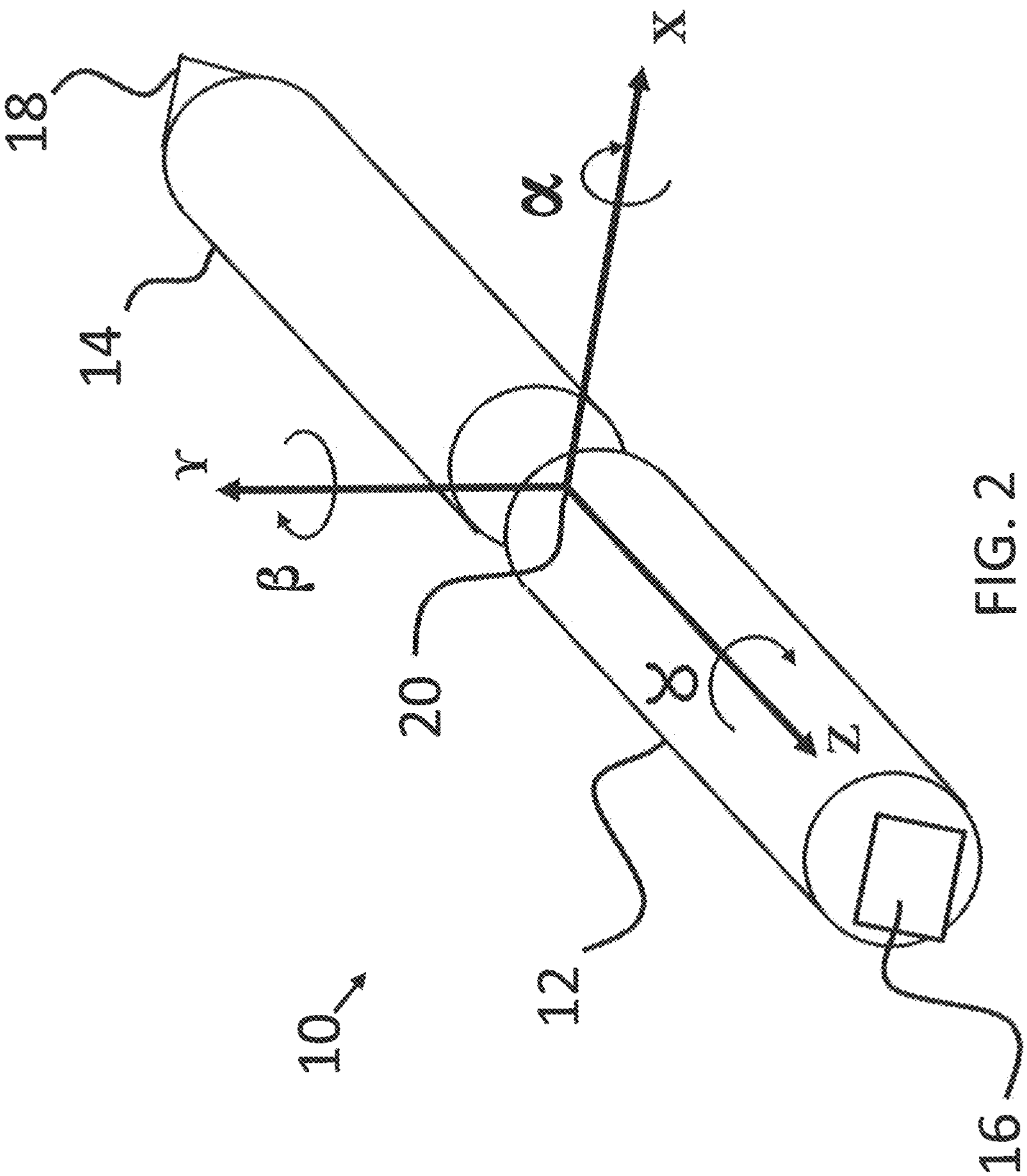
FIG. 2 illustrates a coordinate system used herein to describe six degrees of freedom.

The coordinate system 20 will herein be used to describe the six degrees of freedom as illustrated in FIG. 2. Herein, the term "lateral translations" refers to translations along the x- and y-axes and the term "axial translations" refers to translation along the z-axis. Furthermore, the terms "tip" and "tilt" refer to rotations about the x- and y-axes (labeled a and 13 in FIG. 2) and the terms "axial rotation" and "rotation" refer to rotations about the z-axis (labeled y in FIG. 2).

Figure 3:
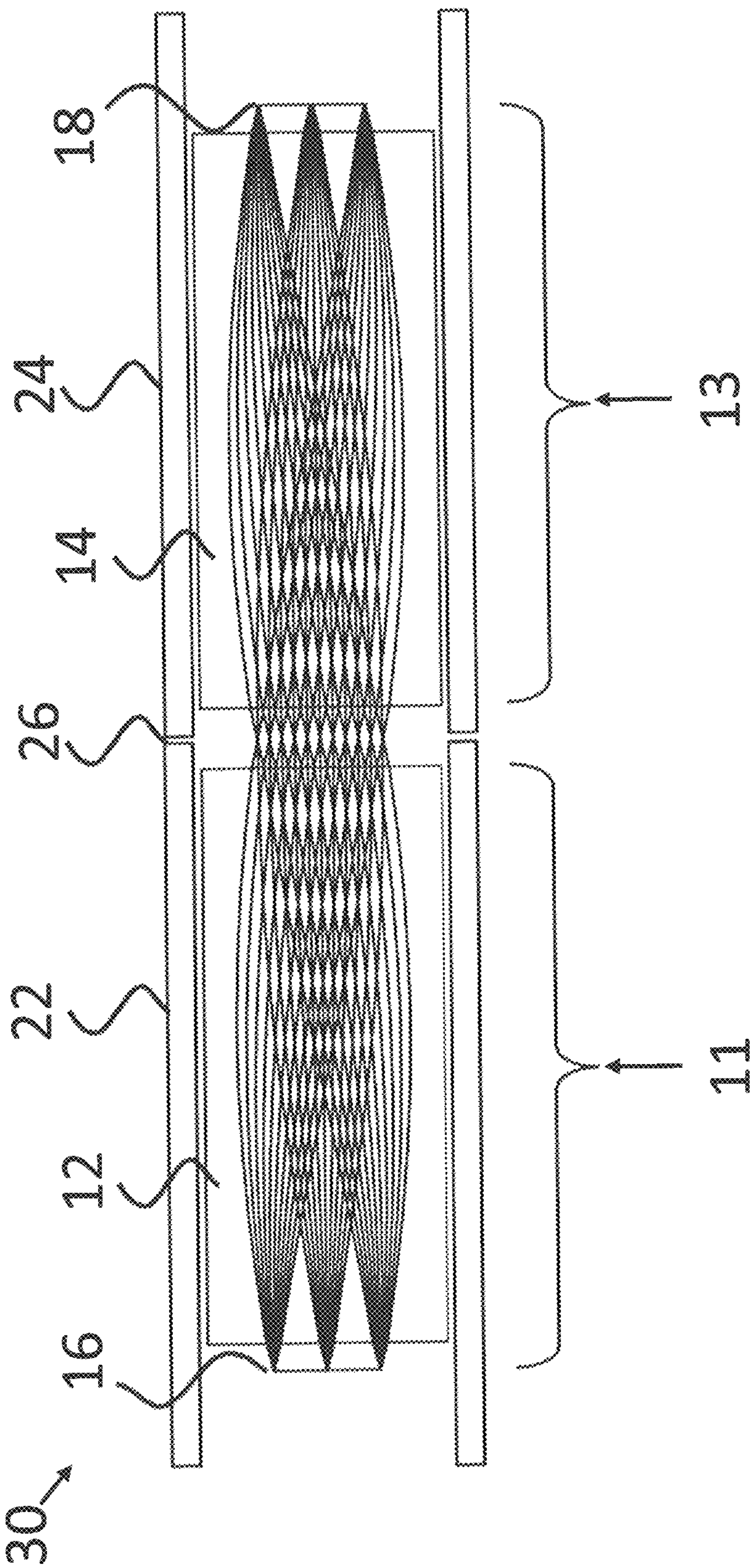
FIG. 3 shows a mostly directly coupled embodiment of the alignment maintaining system of these teachings.
Figure 4:
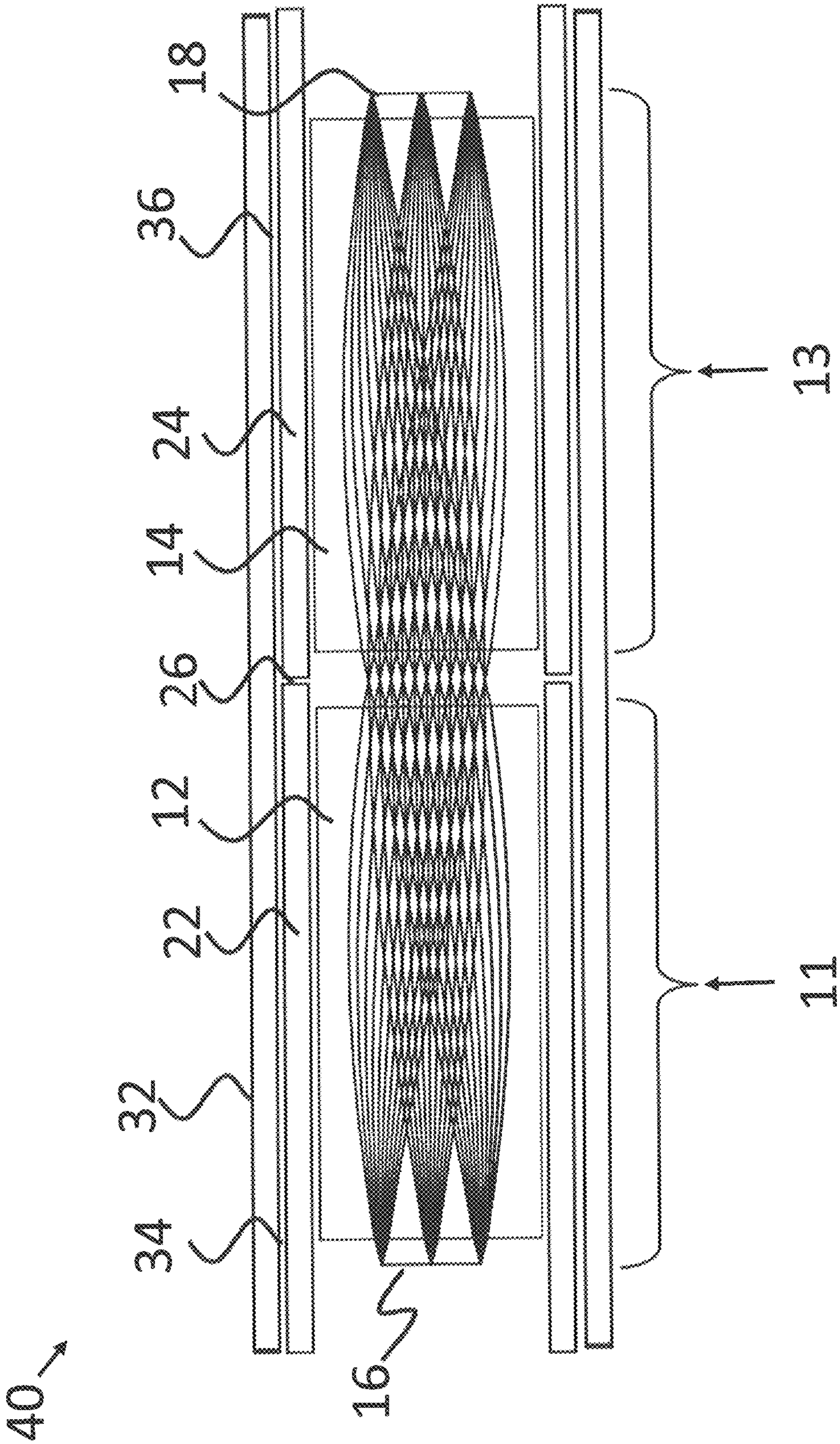
FIG. 4 shows a mostly indirectly coupled embodiment of the alignment maintaining system of these teachings.
Figure 5:
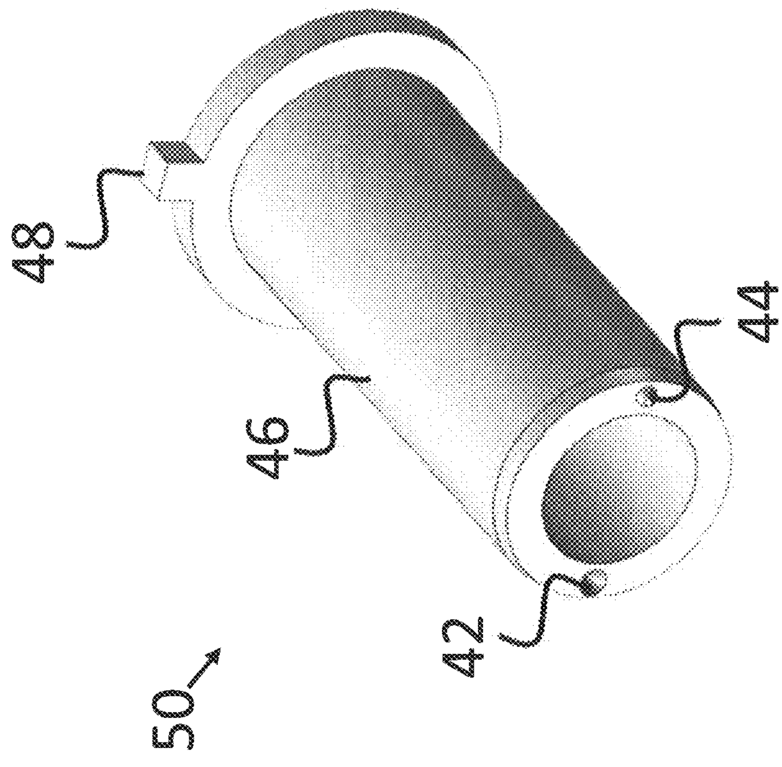
FIGS. 5-6 and 7A-B show mostly directly coupled embodiment of the alignment maintaining system of these teachings.

In the embodiment 30 shown in FIG. 3 the array and imager assembly 11 and the array and imager assembly 13 are mounted in housings 22 and 24, respectively. The housings 22 and 24 provide alignment datums and in some cases protection of optical, electronic, and other components. The array and imager assemblies 11 and 13 typically must be aligned to each other with respect to the six degrees of freedom discussed previously. The tip, tilt, and axial rotation degrees of freedom in some cases, such as in the optical data pipe described in the patents included by reference, are the most sensitive to misalignment and are therefore in such cases the most important of the six degrees of freedom. The array and imager assemblies 11 and 13 can be aligned through direct coupling of the housings 22 and 24 as shown in FIG. 3, through indirect coupling as shown in FIG. 4, or through any combination of direct and indirect coupling of the housings or array and imager assemblies 11 and 13. The directly-coupled housings in the embodiment 30 shown in FIG. 3 comprise alignment features that are built into the geometry of housings 22 and 24 that form a mating interface 26 that aligns the array imager assemblies 11 and 13 to each other when in contact. In embodiment 50 of the housings 24 and 26, shown in FIG. 5, a hemisphere extrusion 44 on each housing 46 is used to mate to the conic cut 42 on the opposing housing to provide axial rotation and lateral translation alignment. The alignment features are shown here as, but are not limited to, the hemisphere 44 and cone 42; many other alignment features can be used as known in the art including, for example, pin and slot, ball and groove, ball and cone, crenellations, multiples of the preceding features, etc. In this embodiment, pre-alignment is achieved via a key 48 in a keyway of a separate housing (not shown). Pre-alignment is an optional operation used to roughly orient housings such that alignment features can come into contact. The pre-alignment feature is shown here as, but is not limited to, the key 48; many other pre-alignment features can be used as known in the art including, for example, splines, threads, crenellations, etc. In other embodiments the separate pre-alignment features are not needed.

Figure 6:
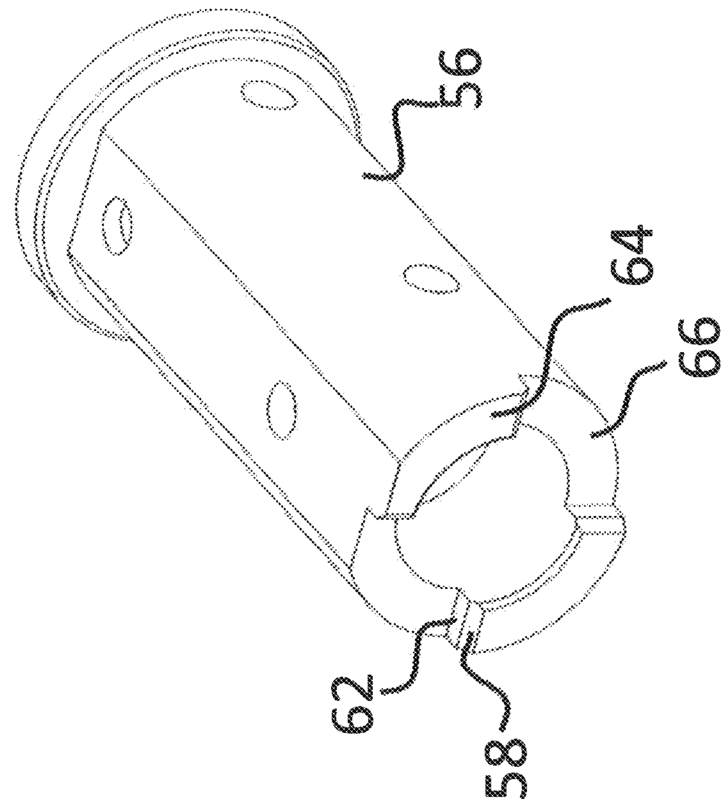
Figure 7B:
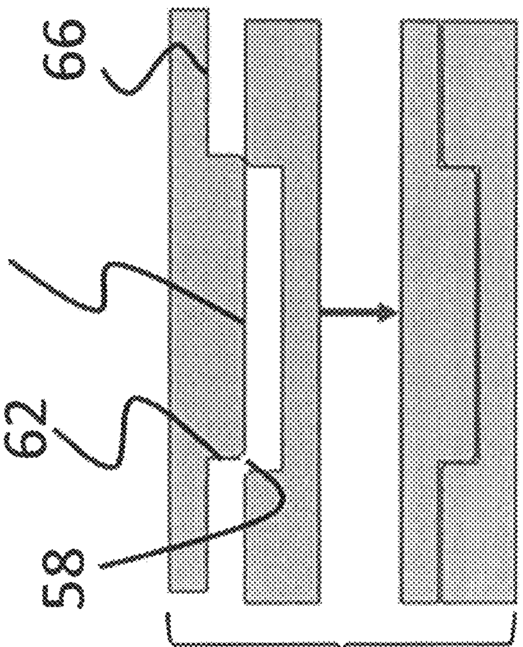
Figure 7A:
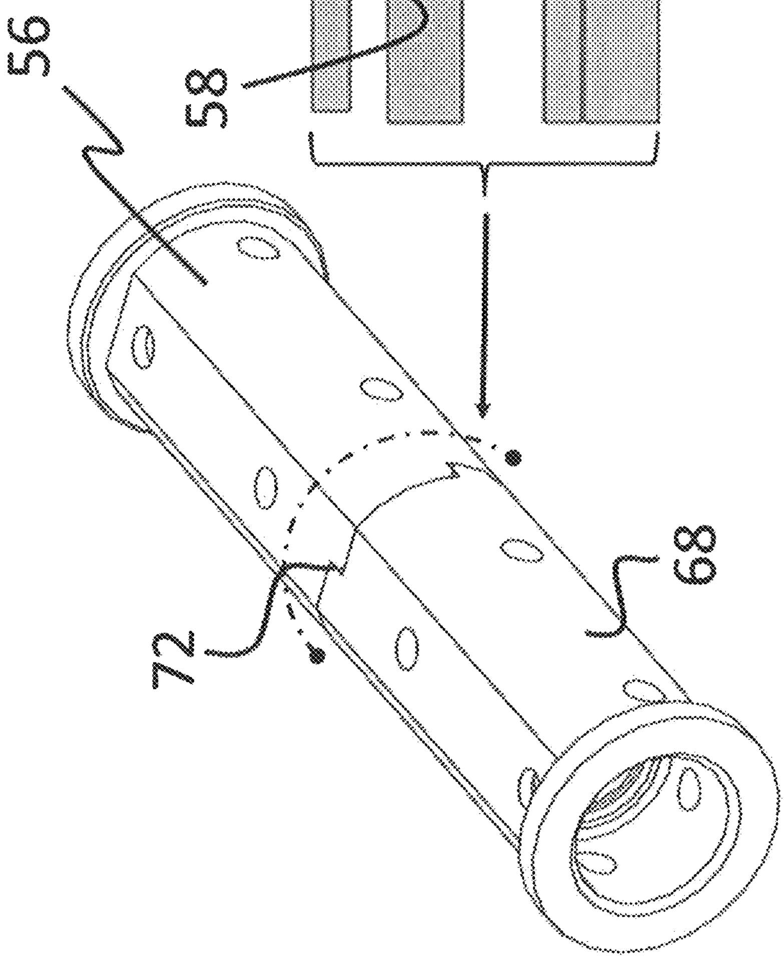

Vet another embodiment of the housings for the directly-coupled system 30, as shown in FIG. 6 and FIG. 7, comprises crenellations on the front faces of the housings, with circumferentially alternating raised (crenellation faces) 64 and lowered (inter-crenellation flats) 66 sections that mate closely together at the interface 72 as shown in FIG. 7. Interface 72 in FIG. 7*a* is mapped to a planar view for illustrative purposes in FIG. 7*b*. Chamfers 58 allow for initial misalignment of the two housings 56 and 68 and guide the housings into close contact with datums 62 to provide rotational alignment. Tip and tilt degrees of freedom are constrained by mating crenellation faces 64 with the inter-crenellation flats 66. This embodiment could also be used in combination with a third aligning component such as is shown in the indirect-coupling embodiment 40, in FIG. 4. The crenellations are shown here as, but are not limited to, two crenellation faces 64 and two inter-crenellation flats 66, but any number of sets of faces 66 and flats 66 can be used, for example, but not limited to, 1 set, 3 sets, 4 sets, etc. Note that herein "engage" and "insert" can be used interchangeably and both mean the interaction between mating features on a housing and alignment component or a housing and another housing.

Figure 8:
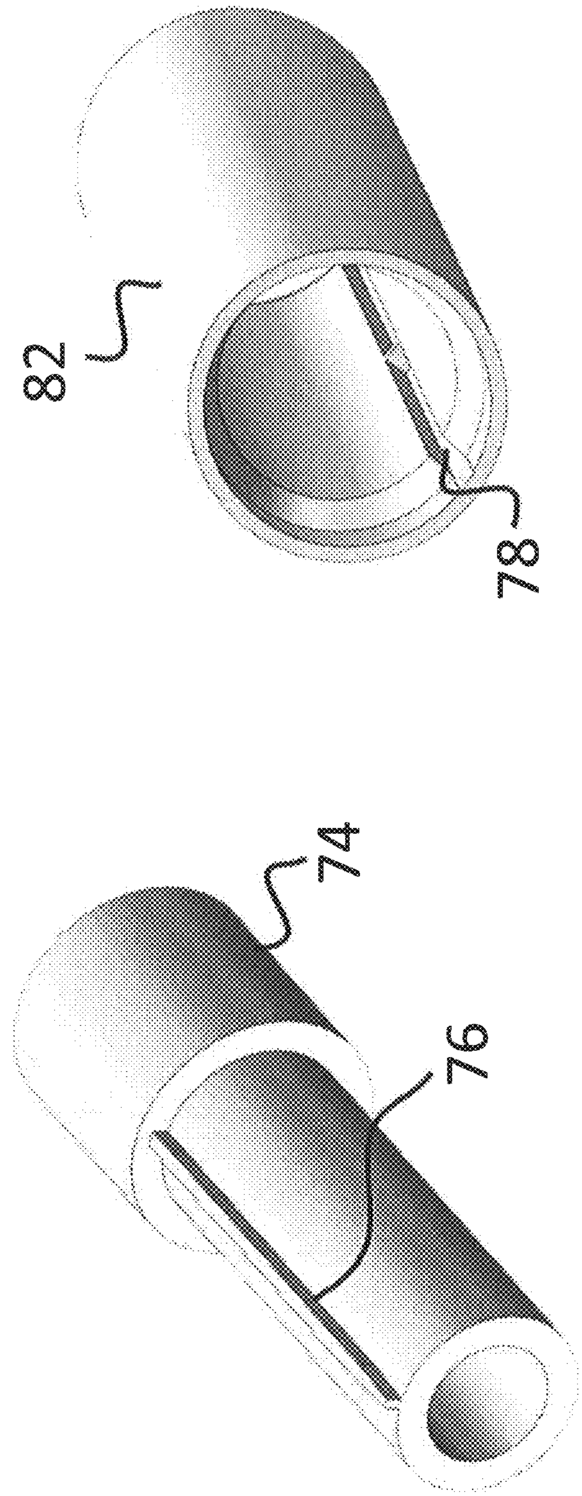
FIGS. 8-16 show embodiments of the alignment maintaining system of these teachings that use indirect alignment.
Figure 9:
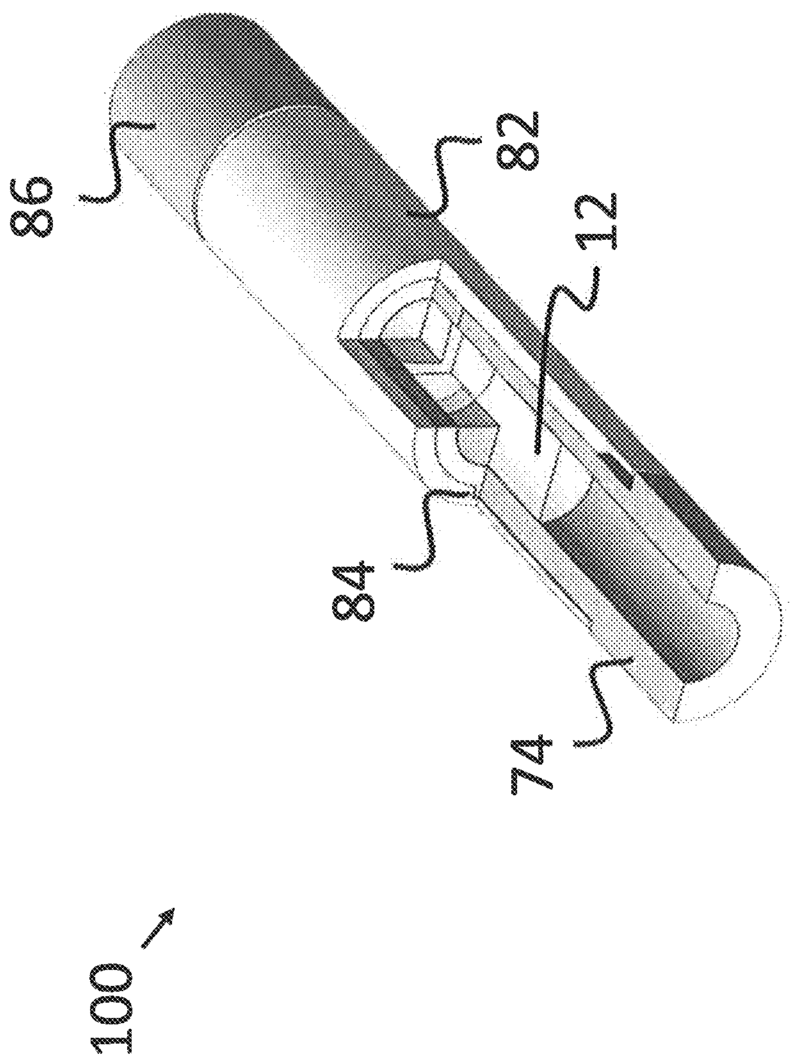

Another embodiment 40 using the indirectly-coupled housings shown in FIG. 4 utilizes a separate component 32 that provides some or all of the necessary alignments between the housings. The term, "indirect alignment component", refers without limitation to the separate component or components 32 that provide(s) some alignment between the housings 22 and 24 discussed herein. The sleeve could be compliant, i.e. providing compressive or tensile alignment forces at points on the housings, or could be rigidly constraining, i.e. provides some level of clearance around the housings but limits the alignment to some allowable tolerance band, or any combination thereof. The remaining degrees of freedom that are not aligned by the indirect alignment component 32 could be aligned by the housings themselves or by a combination thereof. One embodiment of the indirectly-coupled housing 40 is the slip-fit sleeve 82 with an integral keyway feature 78 shown in FIG. 8 and FIG. 9. The inner bore of the sleeve 82 is a tight fit to the outer diameter of the housings 22, 24 (embodied as 74 and 86 in FIG. 9) to provide tip tilt, and radial translational alignment and contains a keyway 78 that interfaces 84 with the keys 76 of the housings 74 and 86 to provide axial rotational alignment. The axial translation is fixed by the front faces of the housings 74 and 86, or the sleeve 82 itself, or the external containment vessel, or any combination thereof.

Figure 10:
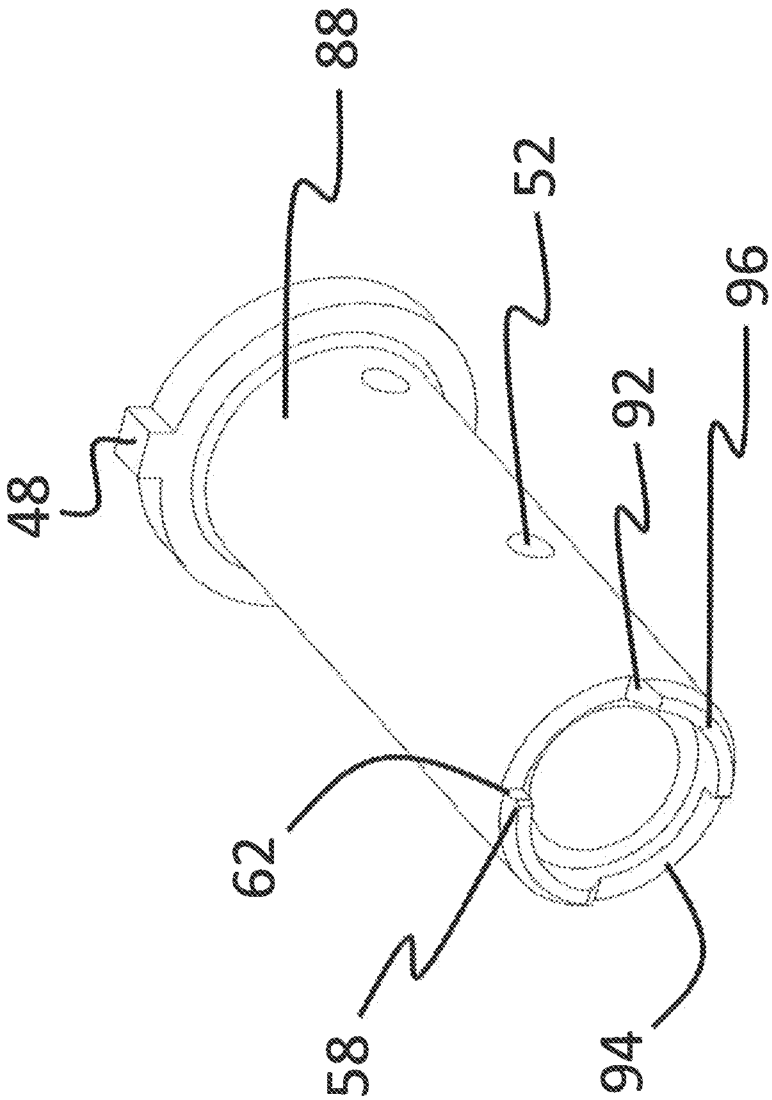
Figures 11A, 11B:
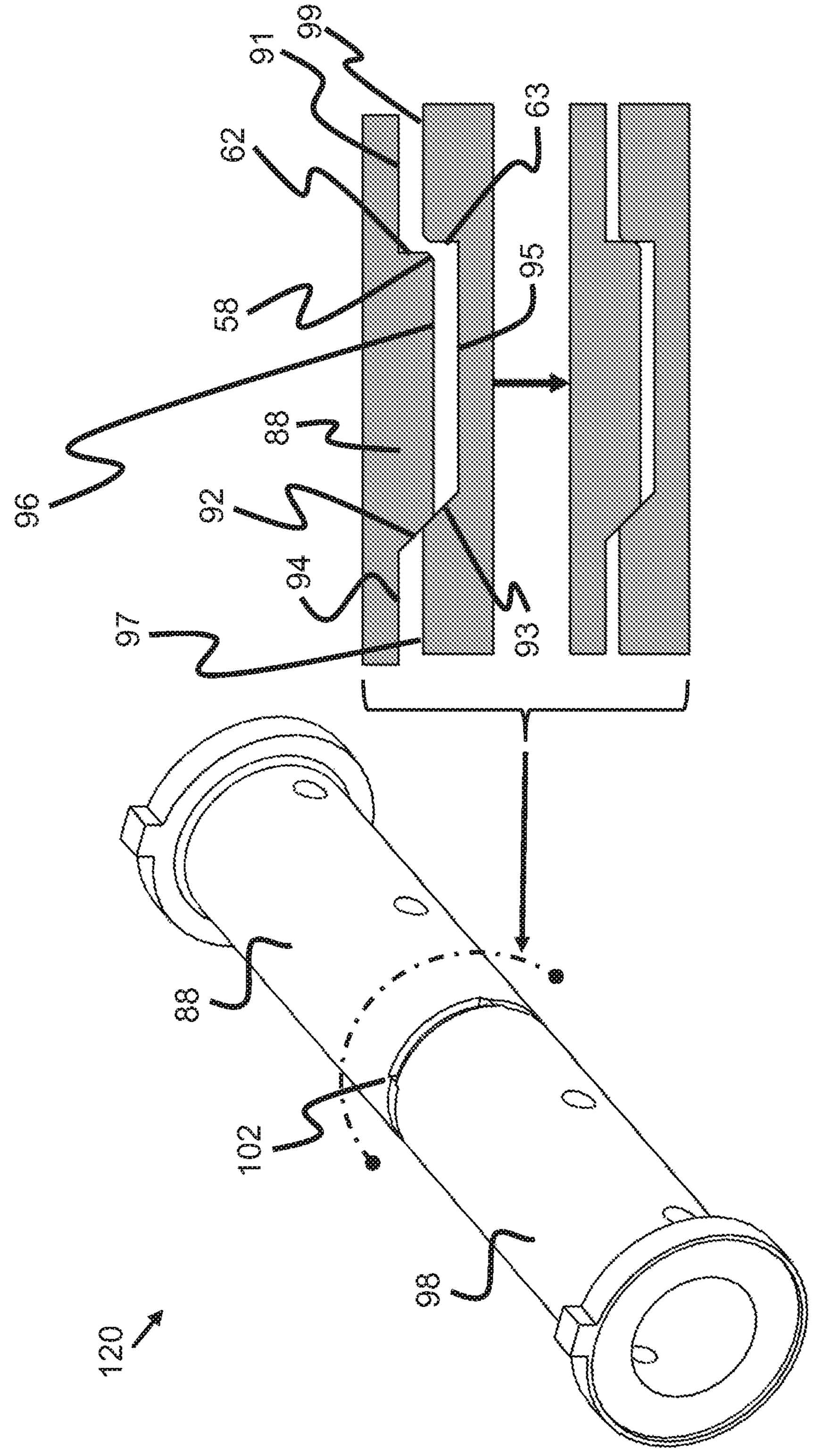
Figure 12:
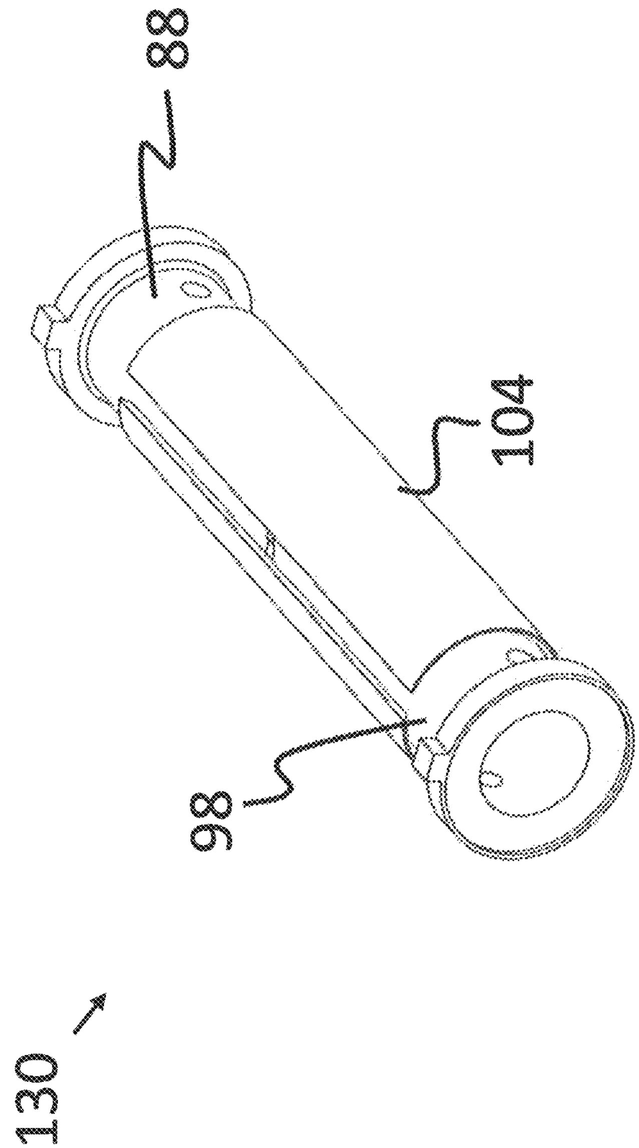

Other embodiments 130 in FIG. 12 in an indirectly-coupled 40 and directly-coupled 30 system, and embodiment 120 in FIG. 11 in a directly coupled system 30 implement "wedgellations" on the mating faces of housings 22 and 24 (embodied as 88 and 98) to provide axial rotational alignment. The term "wedgellations" as used herein, refers to a mating interface between the housings that, as the housings are pushed together axially, induces axial rotation in one or both of the housings towards a fixed datum that stops said rotation at a repeatable angle. Interface 102 in FIG. 11*a* is mapped to a planar view for illustrative purposes in FIG. 11*b*. Note that the embodiments in FIG. 10 and FIG. 11 differ from the crenellation system 70 in FIGS. 6 and 7 in that as long as an axial force is supplied, the wedges 92 and 93 will transfer the axial engagement force into a torque about the axial rotation direction, in turn positively contacting and preloading the datums 62 and 63, as shown in FIG. 11*b*. Additionally, it is typically designed such that surfaces 96, 94, and 91 do not come into contact with the mating housing's opposing surfaces, 95, 97, and 99, respectively.

Figure 13:
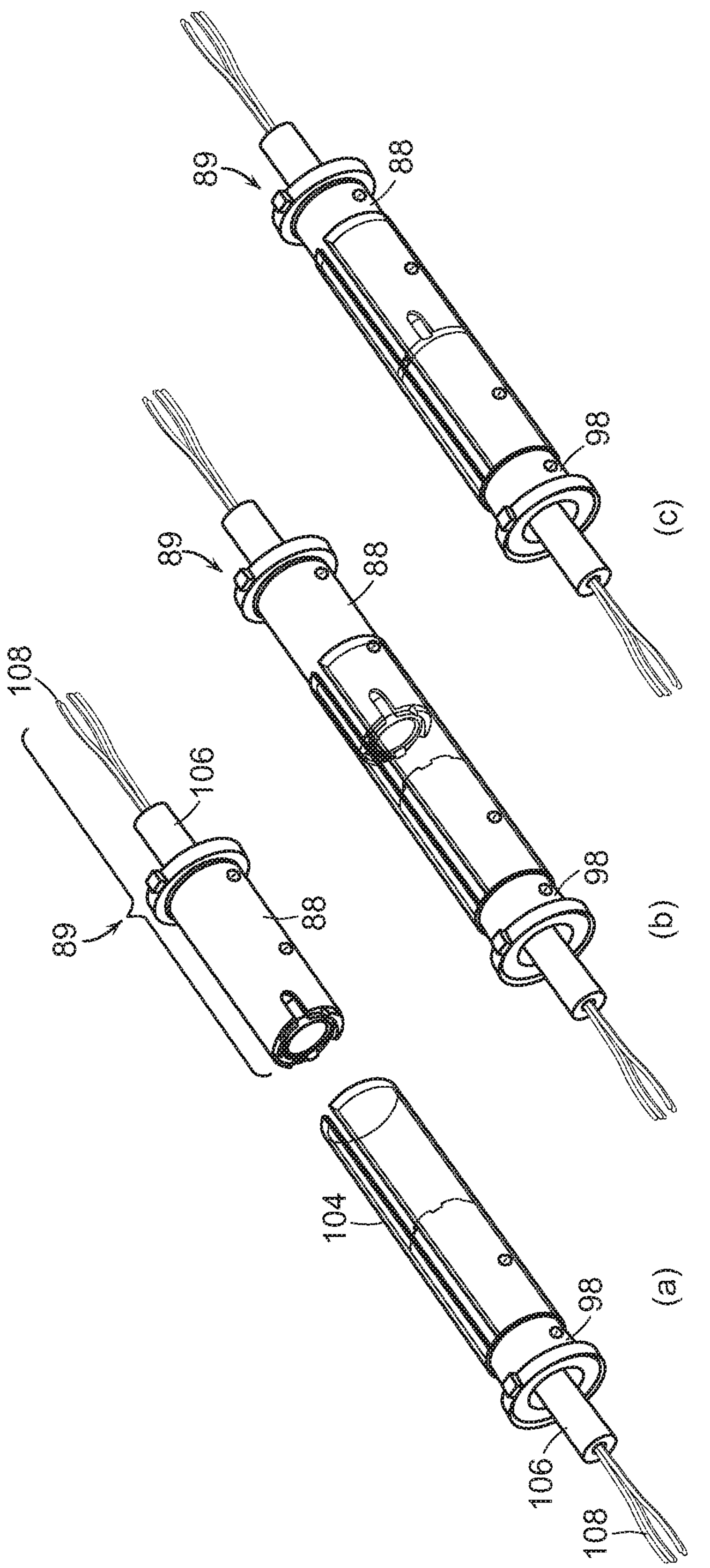

The embodiment 130 shown in FIG. 12, additionally has a compressive split sleeve 104 that provides tip, tilt, and lateral translational alignment, thus providing the indirectly-coupled alignment in conjunction with the directly-coupled wedgellation interface. Axial rotational alignment is provided by "wedgellations" on the front faces of the housings 88 and 98 as with the previous embodiment 120, FIG. 13 demonstrates the insertion of one housing 88 into the compressive split sleeve 104 starting at the pre-mating (FIG. 13*a*), proceeding to the insertion of the housing 88 into the sleeve 104 (FIG. 13*b*) and finally fully mated (FIG. 13*c*). On the ends of the housings are fiber bundles 108 and fiber plugs 106.

Figure 14:
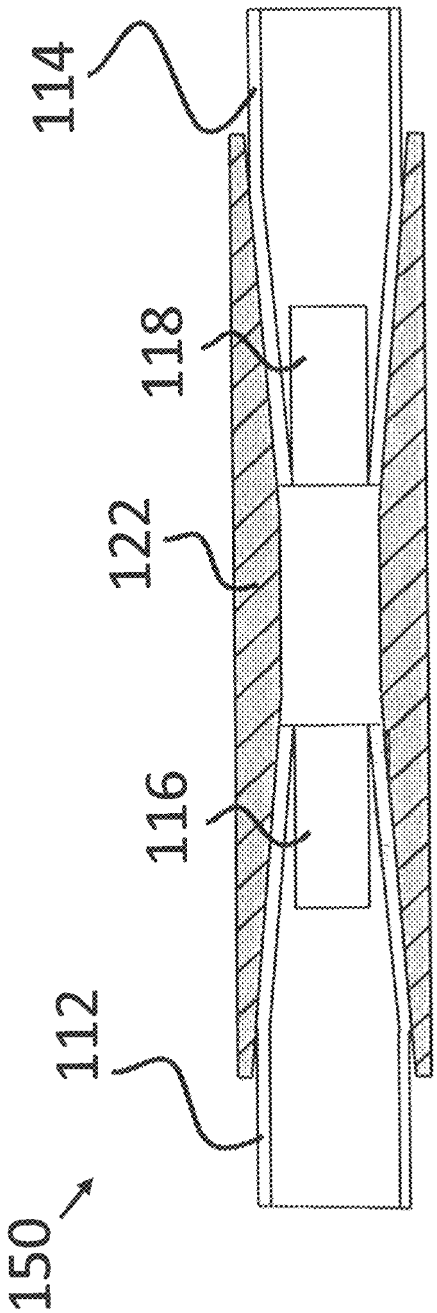

FIG. 14 depicts yet another embodiment 150 involving a conic-shaped housing 112 and 114 that wedges into a tapered sleeve 122 to provide tip, tilt, radial translation, and axial translation alignment of the optical elements 116 and 118.

Yet another embodiment (not shown) involves both housings 22 and 24 from FIG. 3 independently fitting into a collet-type sleeve that, once the housings are in place, is tightened down to lock the housings in all degrees of freedom.

Figure 15:
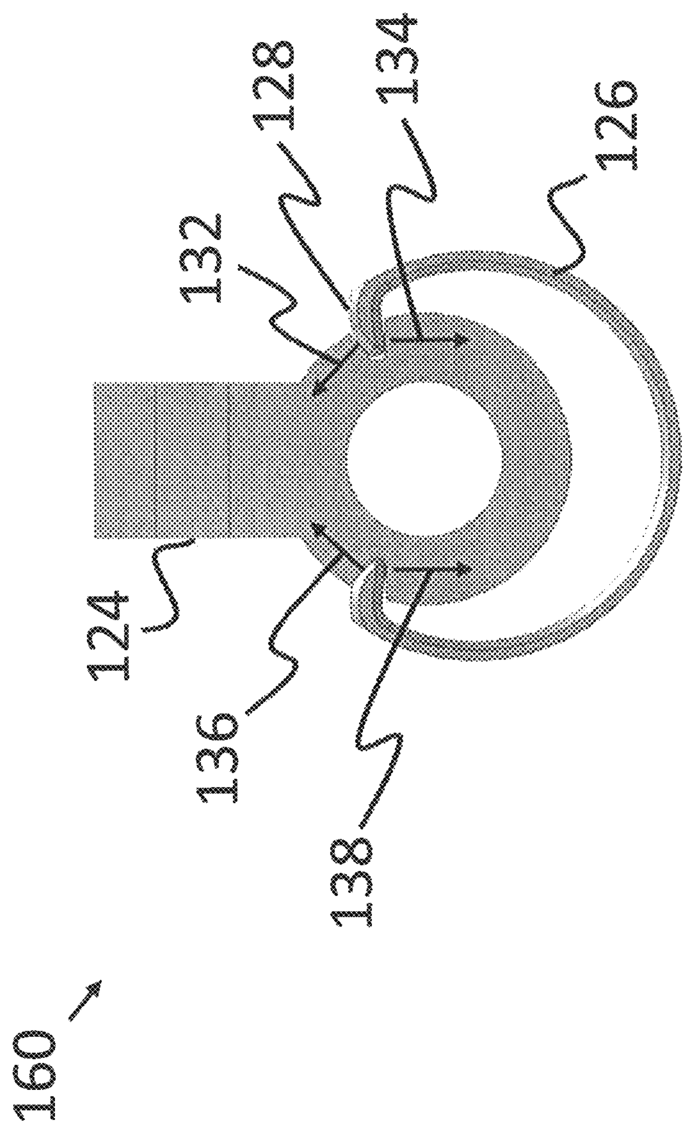
Figure 16:
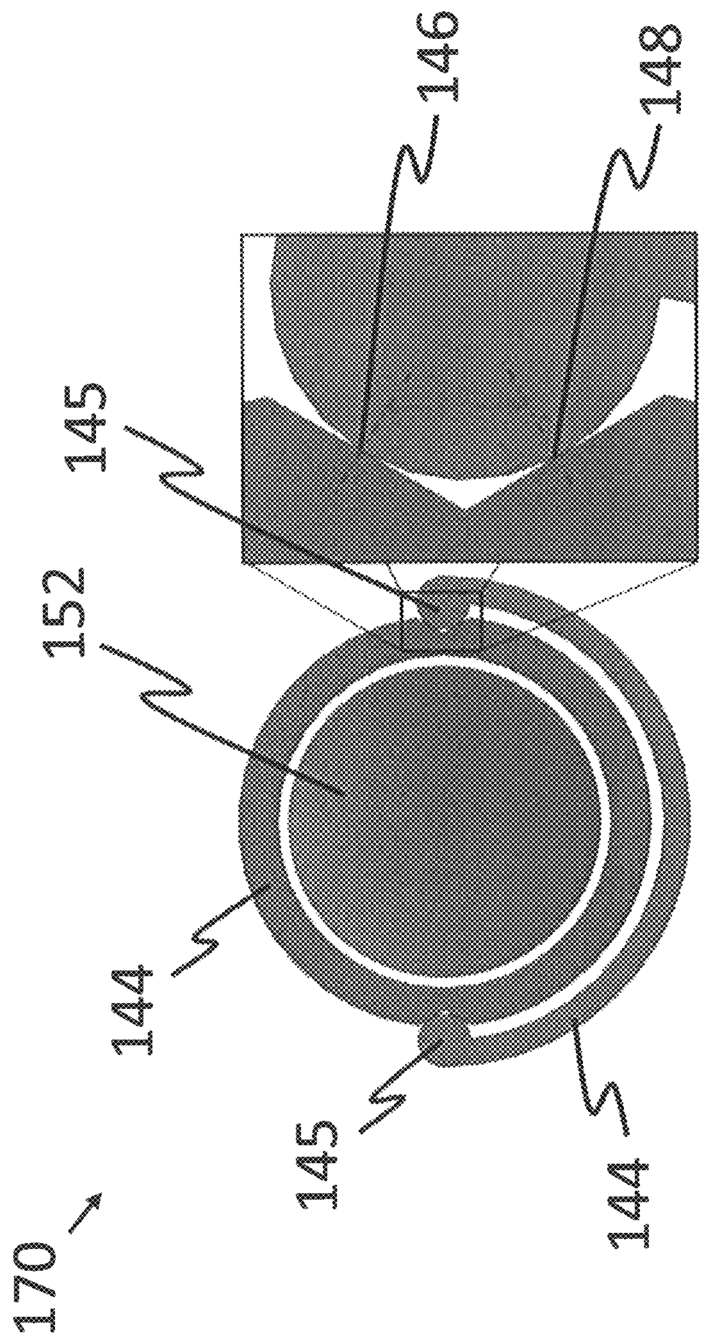

Another embodiment 160, shown in cross section in FIG. 15, includes an indirect alignment component 32 embodied as a spring alignment clip with alignment datums 128, and housings 124 with alignment datums parallel to the axial direction. Each housing 124 is inserted into the spring alignment clip 126 either axially, laterally, or rotationally and the spring alignment clip expands to accept the housing. Once inserted, the spring alignment clip maintains a force 132, 134, 136, 138 on the housing that aligns the housing datums to the spring clip datums. When both housings are aligned to the spring alignment clip datums 128 they are indirectly aligned to each other. Another embodiment 170, shown in cross section in FIG. 16, uses a spring alignment clip 144 and rod-shaped datums 145 on the spring alignment clip to engage the housings 142 on the housing datums (v-notches) at contact points 146 and 148, and thus aligns the housing, which in this case contains an imager 152, to the spring alignment clip datums.

The aligning force is supplied by the spring alignment clip. The aligning force is, in this case, the flexibility and elasticity of the spring alignment clip, itself, in the thin-walled portion of alignment clips 126 and 144. More generally, the aligning forces within an alignment component allow for the alignment component to accept misaligned housings across a tolerance band and still apply an accept them, even though they do not match the orientation or the datum location of the aligning component perfectly. Some embodiments of alignment components apply aligning forces by us of, but not limited to, springs, flexures, magnets, elastomers, and structural elasticity of members. Herein the terms "aligning mechanism," "alignment mechanism," and "alignment component" are used interchangeably.

Applications of embodiments 160 and 170 include, but are not limited to, passing optical signals or imaging between a circuit board and a backplane, between two fiber-optic cables, between a cable and an enclosure, and between a cable and a circuit board. Moreover, it is not required that housings 22 and 24 from FIG. 3 be used in every embodiment because the imagers 12 and 14 could be integral components combining alignment features and optical surfaces.

Figure 17:
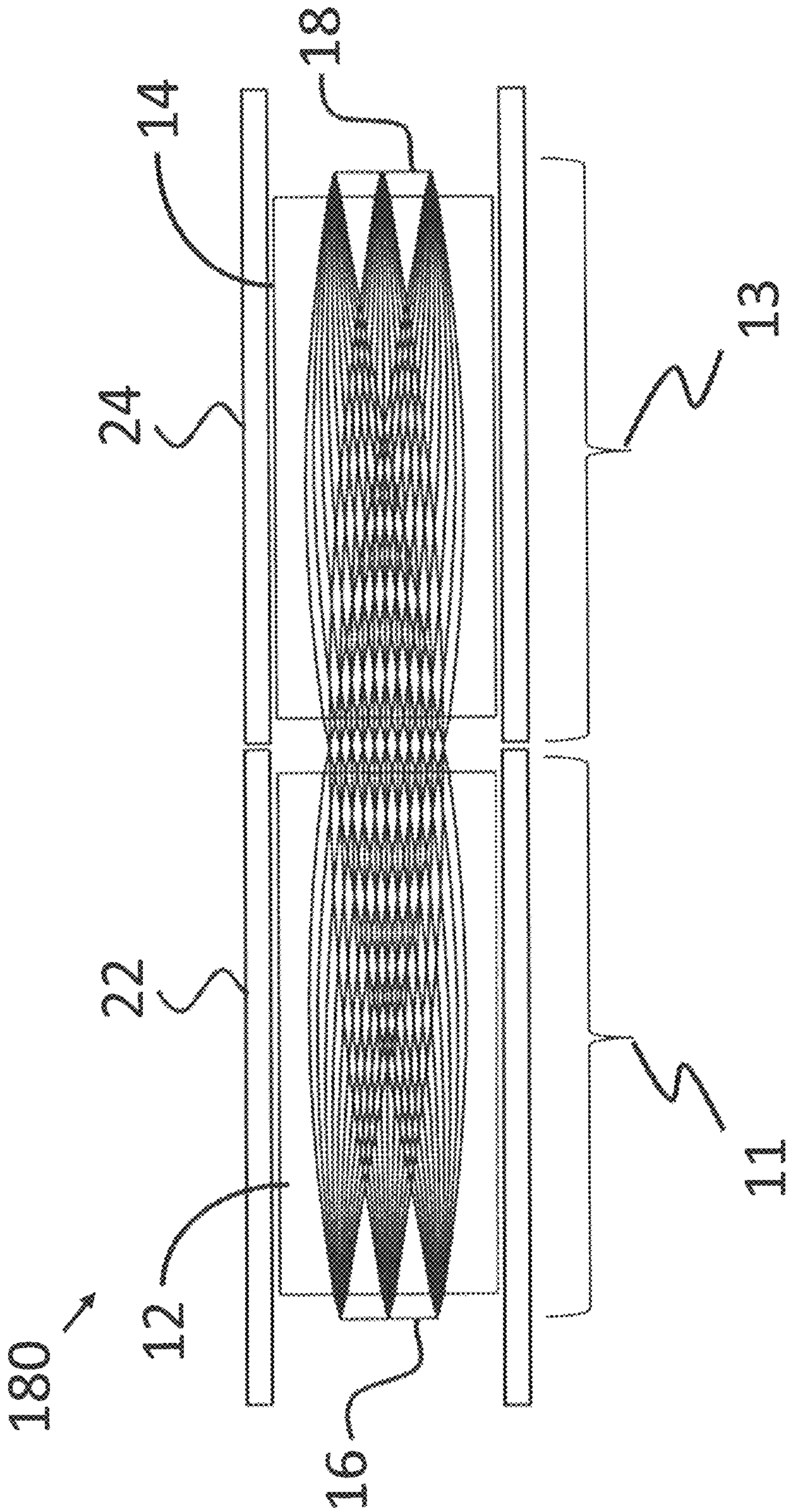
FIGS. 17-22 show embodiments of the compliance mechanism of these teachings.

If the housings 22 and 24 shown in FIG. 17 are connected by some path other than through the component or interface used for alignment, it is necessary to have some compliance mechanism 172 that allows the housings 22 and 24 to align to each other while still allowing external housings, mounts, or other fixtures to mate or align. Reference is made to FIG. 18 and FIG. 19, which illustrate various configurations of the compliance mechanisms between the mating housings 22 and 24 and external mounts 162 and 164. Mount 162 and mount 164 in FIG. 18 and FIG. 19 respectively can be, but are not limited to, a circuit card and a backplane, two external housings, an enclosure and an external housing, or a circuit card and an external housing. A "compliance mechanism" 172 is used herein to denote a component, groups of components, feature, or group of features, that allows the alignment component to align the two housings or imagers without being over-constrained by the two mounts. As long as the alignment component provides greater aligning torques and forces than those put on it by the compliance mechanism, the alignment component will operate as intended. The compliance mechanism can be, but is not limited to, a sliding interface, a spring, a magnet, a flexure, an elastomer, or a bearing.

Figure 18A:
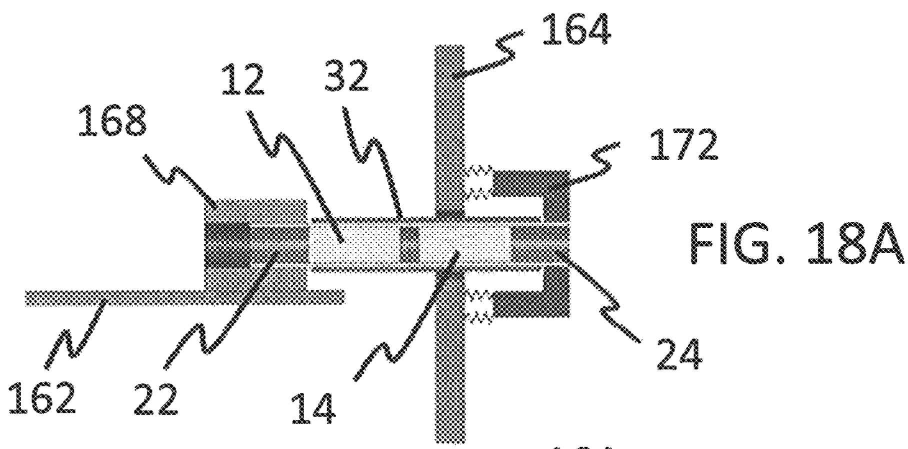
Figure 18B:
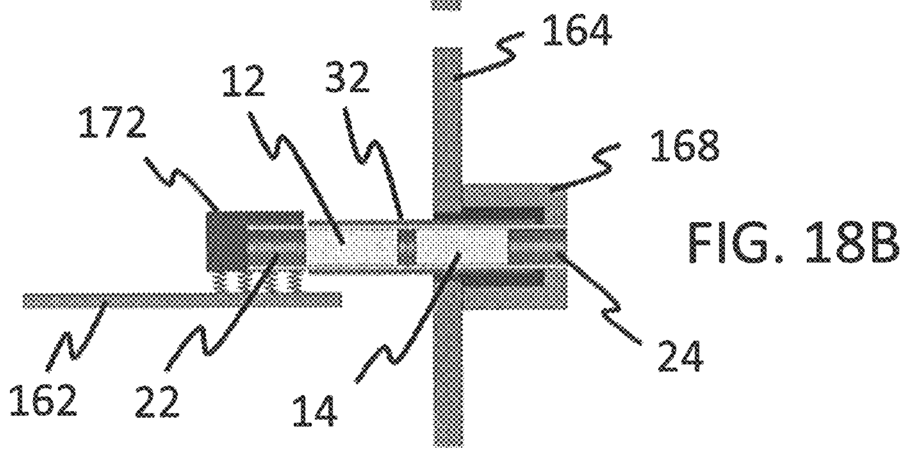
Figure 18C:
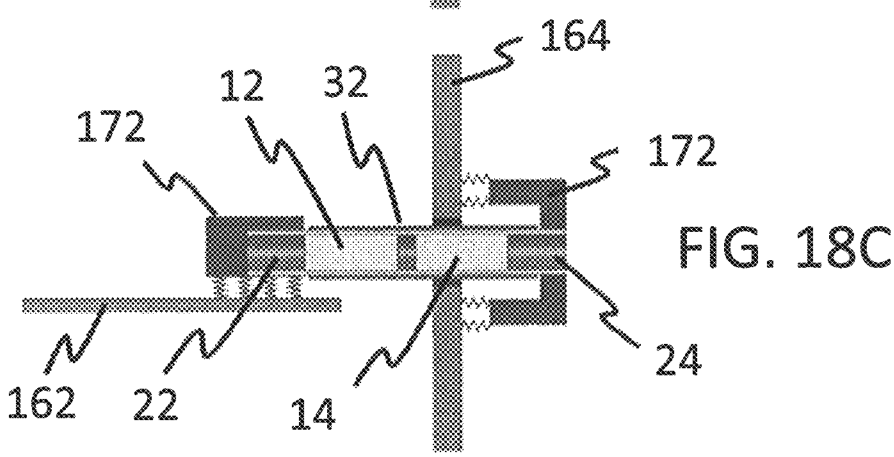

FIG. 18*a-c* shows cross-sectional schematic views of non-bulkhead style architectures. In FIG. 18*a* the compliance mechanism 172 is placed between the mount 164 and the second housing 24 and the first housing 22 is attached to its mount 162 by means of a rigid fixture 168. In FIG. 18*b* the compliance mechanism 172 is placed between the mount 162 and the first housing 22, while the second housing 24 is attached to its mount 164 by means of a rigid fixture 168. In FIG. 18*c* the compliance mechanism 172 is placed between the first housing 22 and the second housing 24 and their respective mounts, 162 and 164, and neither housing is rigidly fixed to a mount. Note that the indirect alignment component 32 is in contact with the housings 22 and 24 only, and imagers 12 and 14 and their respective arrays (not shown) are held by said housings.

Figure 19A:
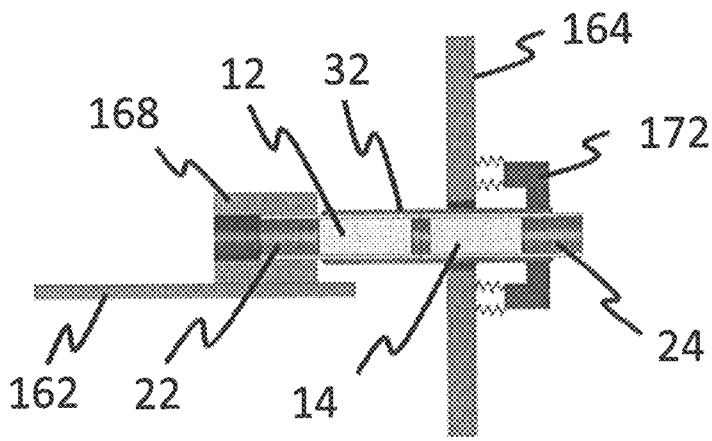
Figure 19B:
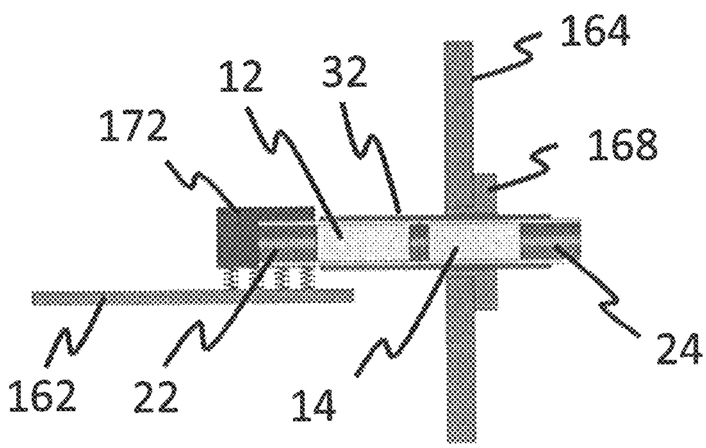
Figure 19C:
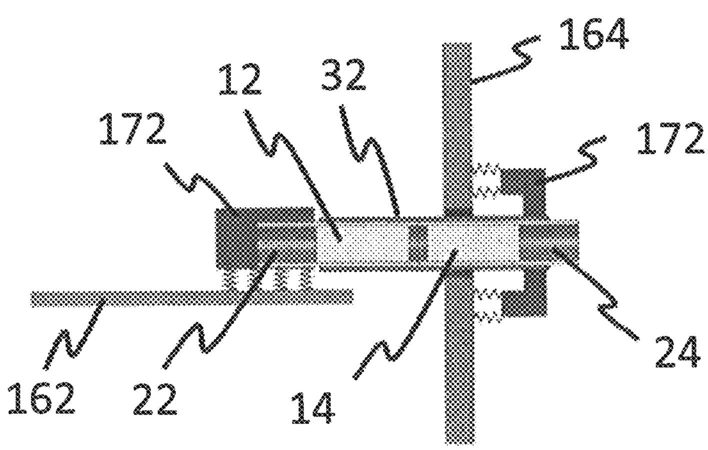

FIG. 19*a-c* are cross-sectional schematic configurations of a bulkhead style architecture—in other words, the indirect alignment component is rigidly or compliantly mounted to a mount 164 and the two housings 22 and 24 are inserted into the indirect alignment component 32. Conversely, the non-bulkhead style in FIG. 18 attached one of the housings 24 to mount 164 and left the indirect alignment mechanism 32 attached only to housings 22 and 24. The non-bulkhead style could also be implemented for direct alignment 30. In FIG. 19*a* the compliance mechanism 172 is placed between the indirect alignment mechanism 32 and mount 164 while housing 22 is rigidly attached to mount 162 by means of fixture 168. In FIG. 19*b* the compliance mechanism 172 is placed between the first housing 22 and mount 162 while the alignment mechanism 32 is rigidly attached to mount 164 by means of fixture 168. In FIG. 19*c* the housing 22 is compliantly attached 172 to mount 162 and the alignment mechanism 32 is compliantly attached 172 to mount 164. Note that in FIG. 19*a-c* the housing 24 is only connected to the indirect alignment mechanism 32. There are three more embodiments not shown where the housing 24 and mount 164 can take the place of housing 22 and mount 162 in the description of FIG. 19, and vice versa.

In addition to the configuration of the system with regards to the location and attachment of the compliance mechanism 172, there are multiple possible compliance mechanisms 172. Compliance may be achieved by, but is not limited to: elastomeric members, linear elastic members, springs, sliding members, or members which are loosely constrained so as to allow relative movement of components.

Figure 20:
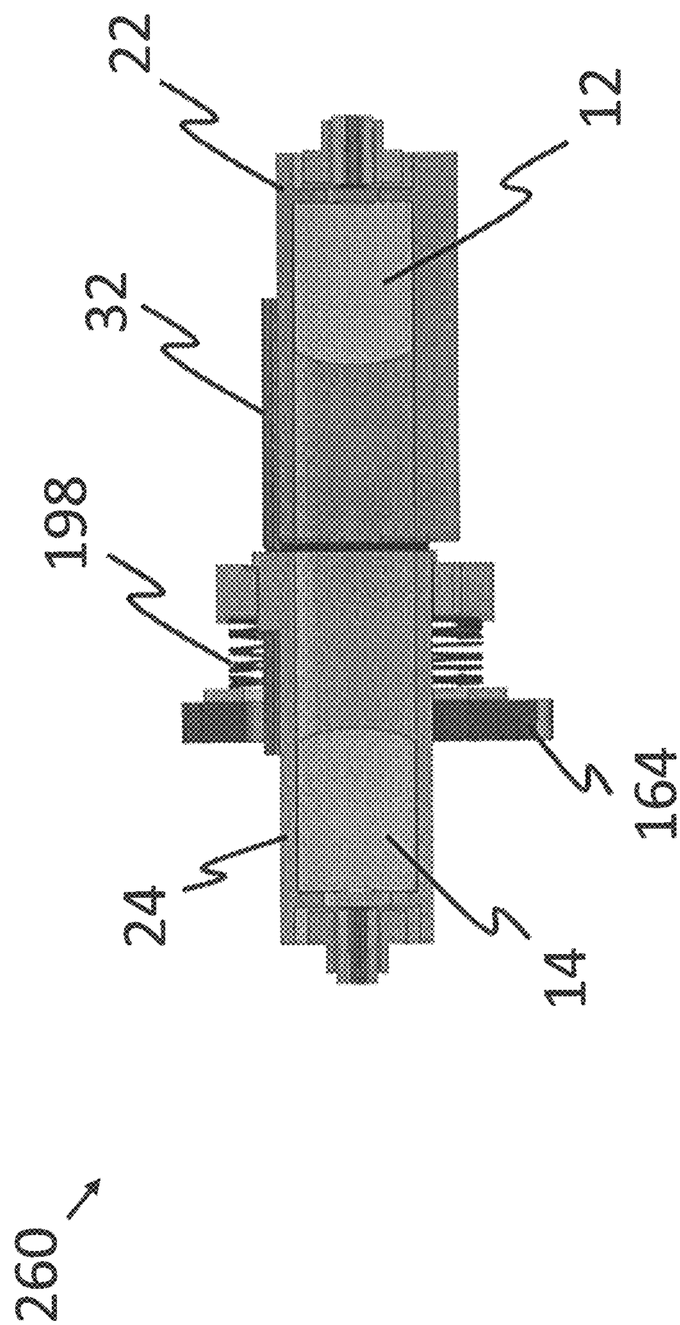

An embodiment 260 using a spring 198 for a compliance mechanism 172 is shown in FIG. 20. This embodiment shares an architecture with that shown in the schematic of FIG. 18*a*.

Figure 21:
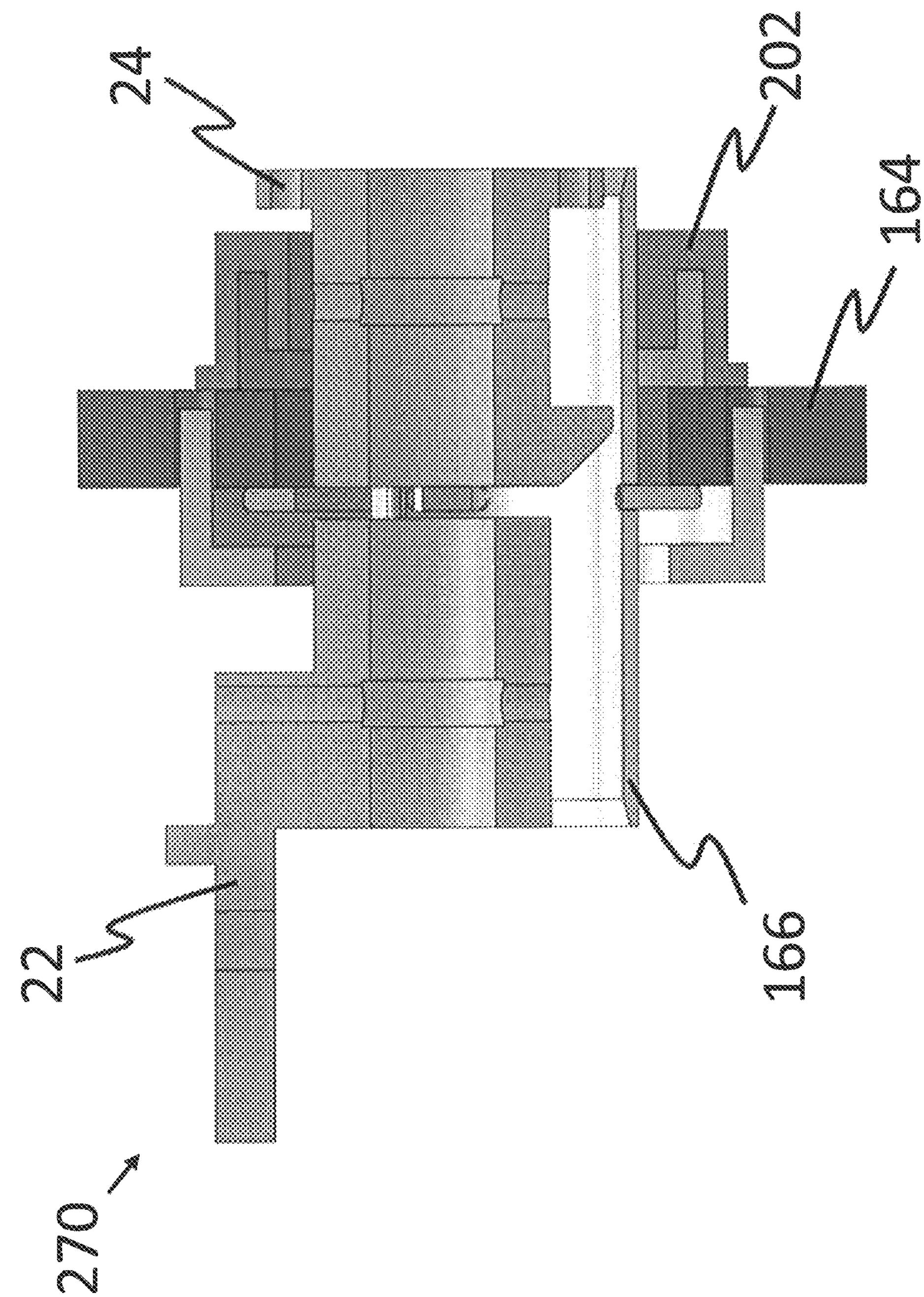

Another embodiment 270 using an elastomeric compliance mechanism 202 is shown in FIG. 21. This is a configuration as one might see with a backplane connection, for example, in which the architecture is the same as that in FIG. 19*a*.

Figure 22:
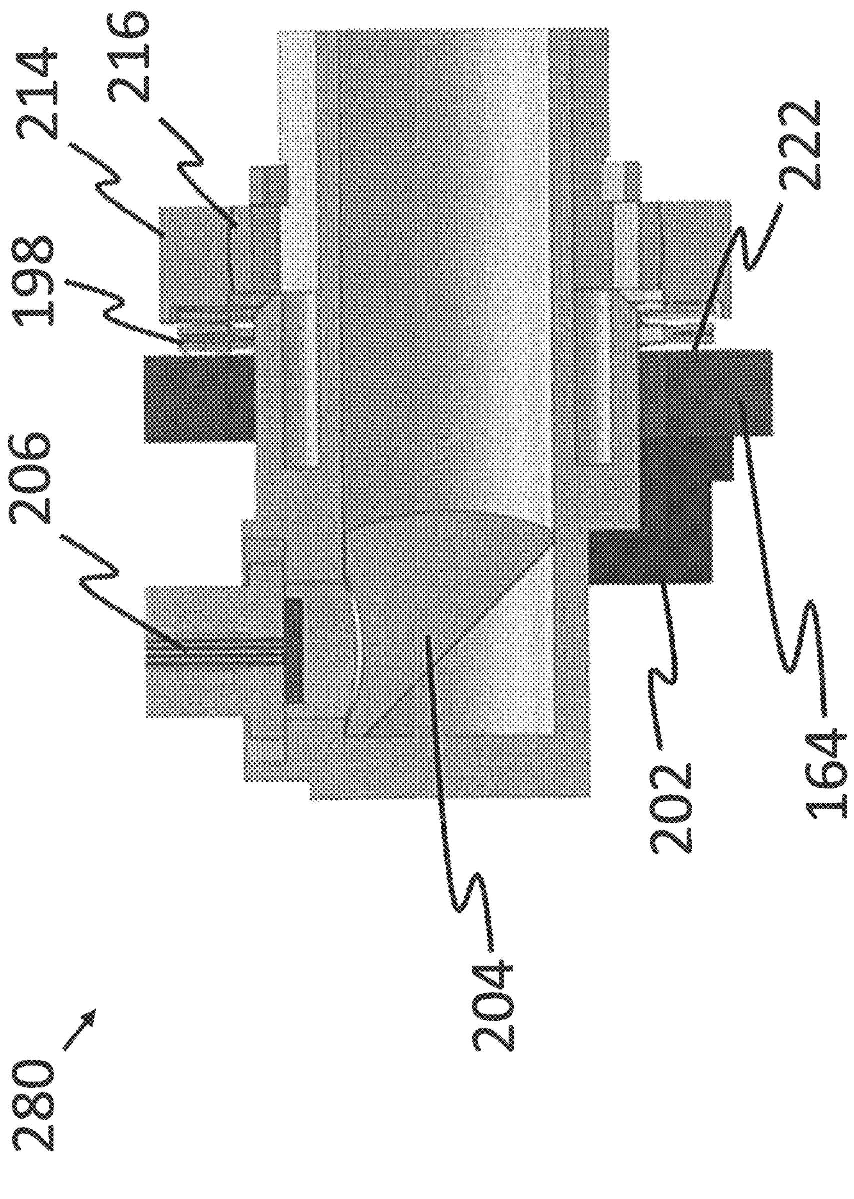

Yet another embodiment 280 of the present teachings combines elastic compliance in the form of a spring 198, elastomeric compliance in the form of a boot 202, and sliding compliance in the form of a spherical bearing comprised of inner 216 and outer 214 races and the spring 198 sliding on the backplane 164 at the contact 222, as shown in FIG. 22. Only the half of the system mounted to mount 164—the backplane in this figure—is shown. This is another embodiment of the schematic from FIG. 18*a*. Note that in this particular embodiment a right angle imager 204 is used to image onto the end of the fiber bundle 206. Other appropriate objects, i.e. a detector array, can also be placed at the focus of the imager 204.

Figure 23:
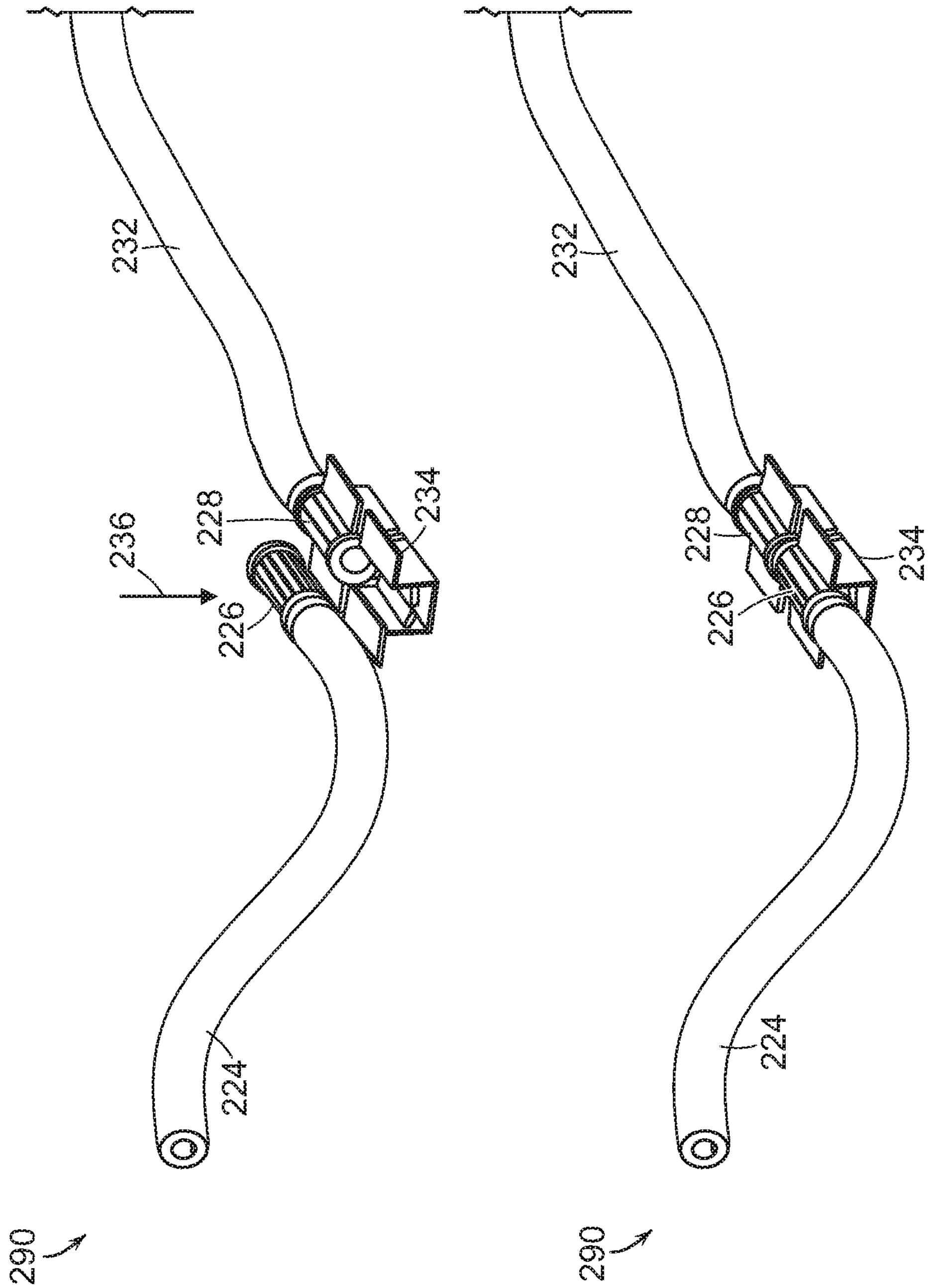
FIGS. 23-30 show embodiments of the snap in ultra-dense alignment tolerant (UDAT) component of these teachings.

Another embodiment of the present teachings is the Snap-in ultra dense alignment tolerant (UDAT) connector, or S-UDAT, 290 where there is no mount or housing directly fixed, rigidly or compliantly, to housing 22 or to housing 24 from FIG. 17. In this embodiment 290 the alignment mechanism 234 is also the means of holding any non-fixed housing. FIG. 23 shows two housings 226 and 228 being held and aligned by a common mechanism. Housing 226 is inserted vertically 236 into the alignment mechanism 234, which then "snaps" into place to align the housing 226 to housing 228 in all degrees of freedom. In this embodiment 290, each housing 226 and 228 is the terminal end of a fiber cable 224 or 232. The "snap"—in configuration is herein referred to as the S-UDAT connector.

Figure 24:
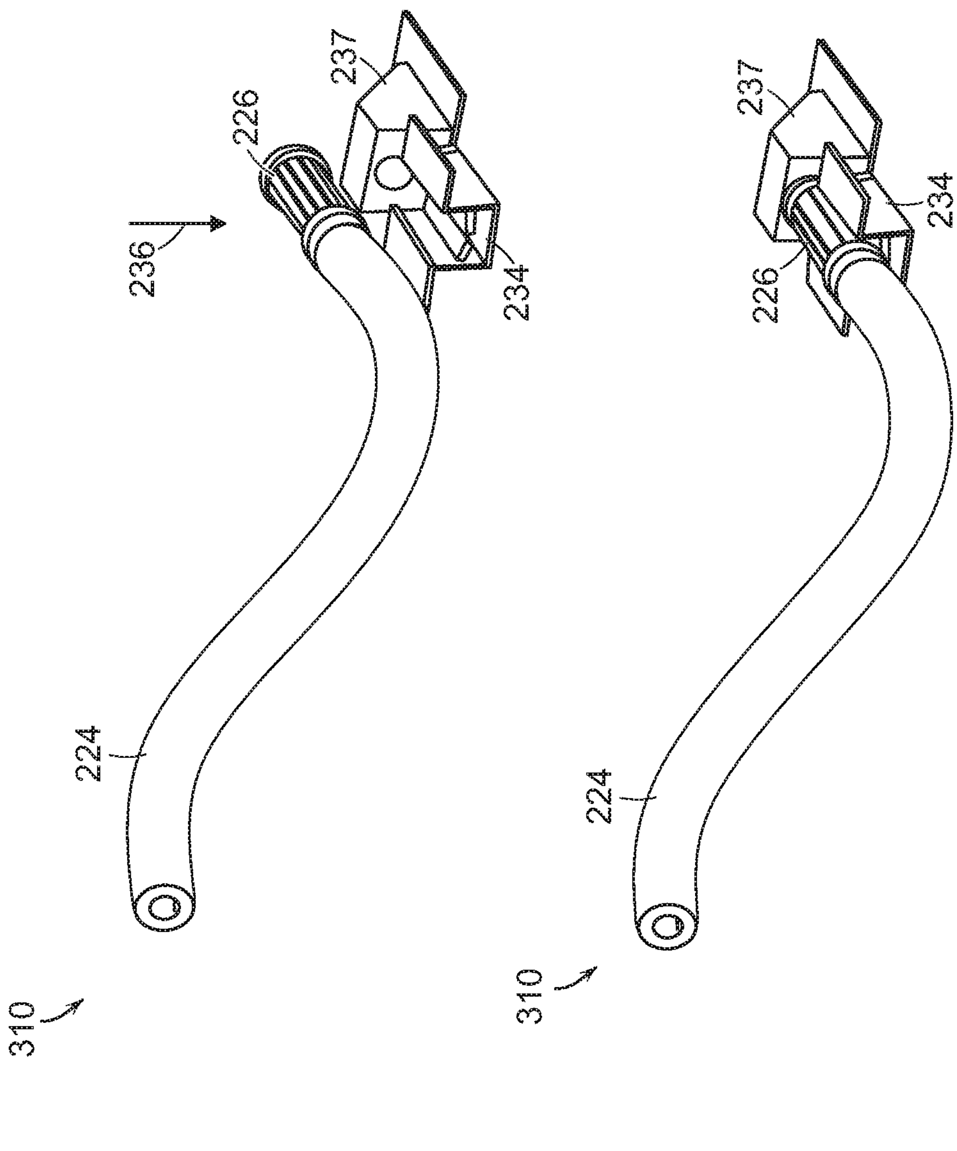

FIG. 24 shows a slightly different embodiment 310 where one housing 226 is aligned to the other 237 that is fixed. The fixed housing 237 in this embodiment contains an imager imaging on an array at a right angle, though other angles are not excluded from this configuration. The first housing 226 is inserted vertically 236 into the alignment mechanism 234, which captures and aligns the housing 226 to the fixed housing 237.

Figure 25:
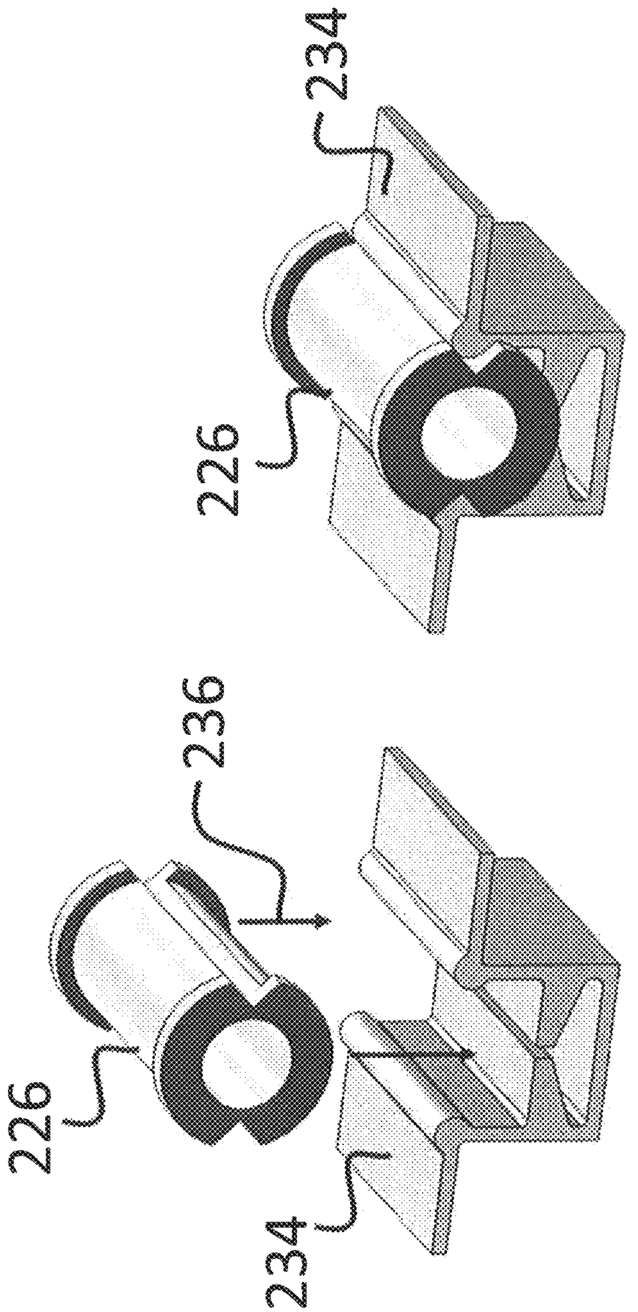

For clarity, FIG. 25. shows an up close view of one half of the alignment mechanism 234 from FIG. 23 and FIG. 24. The housing 226 is pushed down 236 and snaps or clips into the alignment mechanism 234.

Figure 26:
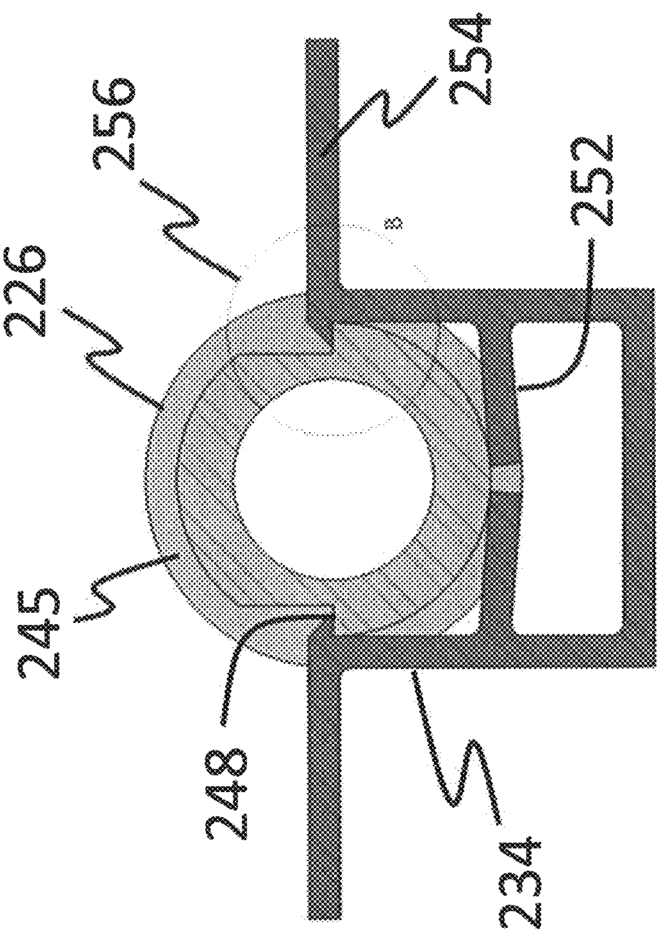
Figure 27:
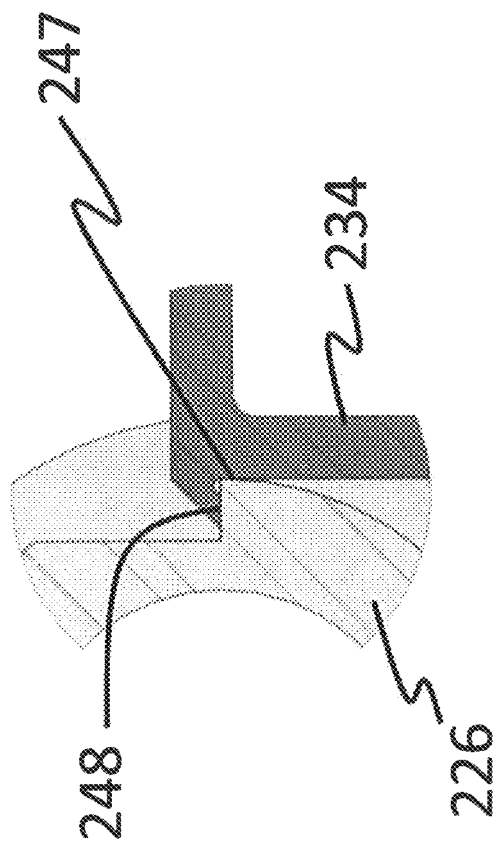

FIG. 26 shows a section view of the housing 226 inserted into the alignment mechanism 234. In this embodiment the housing 226 is aligned and captured by means of two lips 248 running the length of the alignment mechanism 234, and is aligned against the faces of these two lips by force of a compliant member 252. The side walls are compliant as well, and squeeze the housing 226 near the lips 248 to provide alignment in the horizontal plane. The horizontal 247 and vertical 248 datum surfaces are shown in FIG. 27, which is the detail view 256 from FIG. 26. Flanges 245 on the ends of the housing 226 constrain axial translation. This method provides for an easy insertion and removal. Installation of the housing 226 into the alignment mechanism 234 is a single snap, and upon pressing both side tabs 254, the housing is allowed to be pushed out by the compliant members 252 that were compressed during insertion. When using this connector for aligning two housings together, a design is possible where both housings use the same datum surfaces, which would allow closer to nominal alignment. This particular embodiment has a connection configuration that prevents insertion into the alignment mechanism 234 the wrong way—it will not engage if turned upside down. Another embodiment may use tabs 254 in a different orientation or tools to remove the housing from the alignment mechanism.

Figure 28:
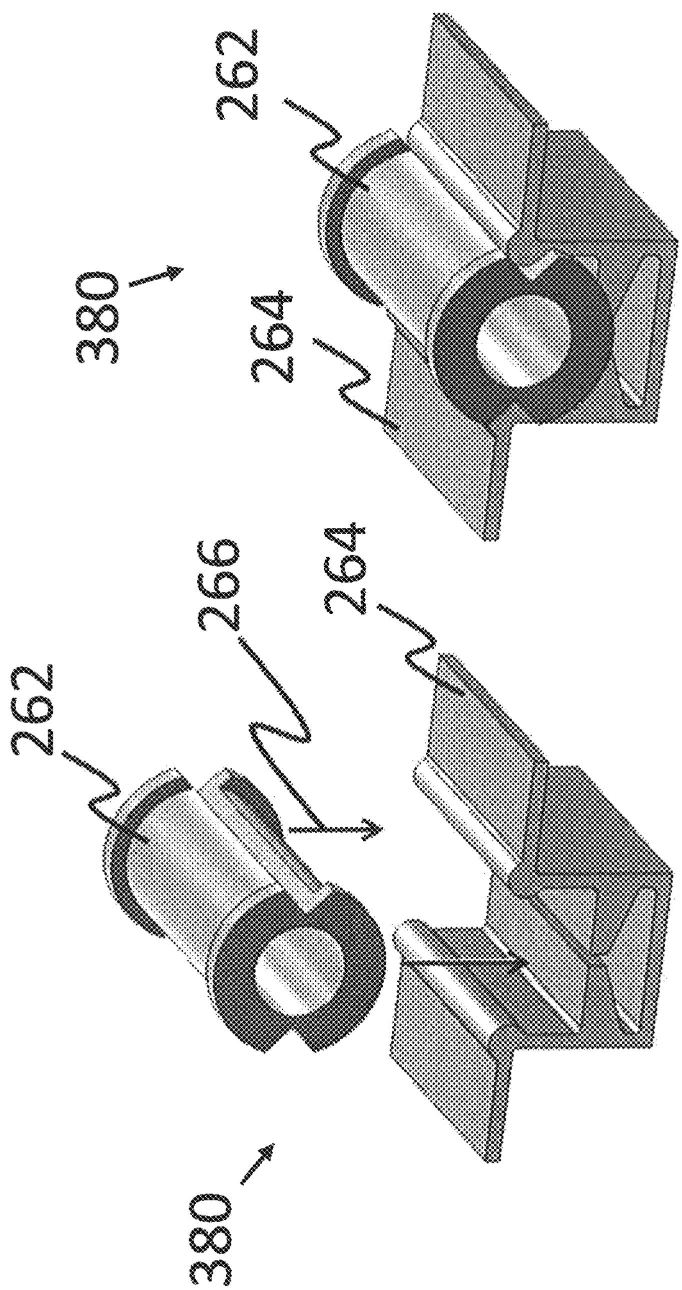
Figure 29:
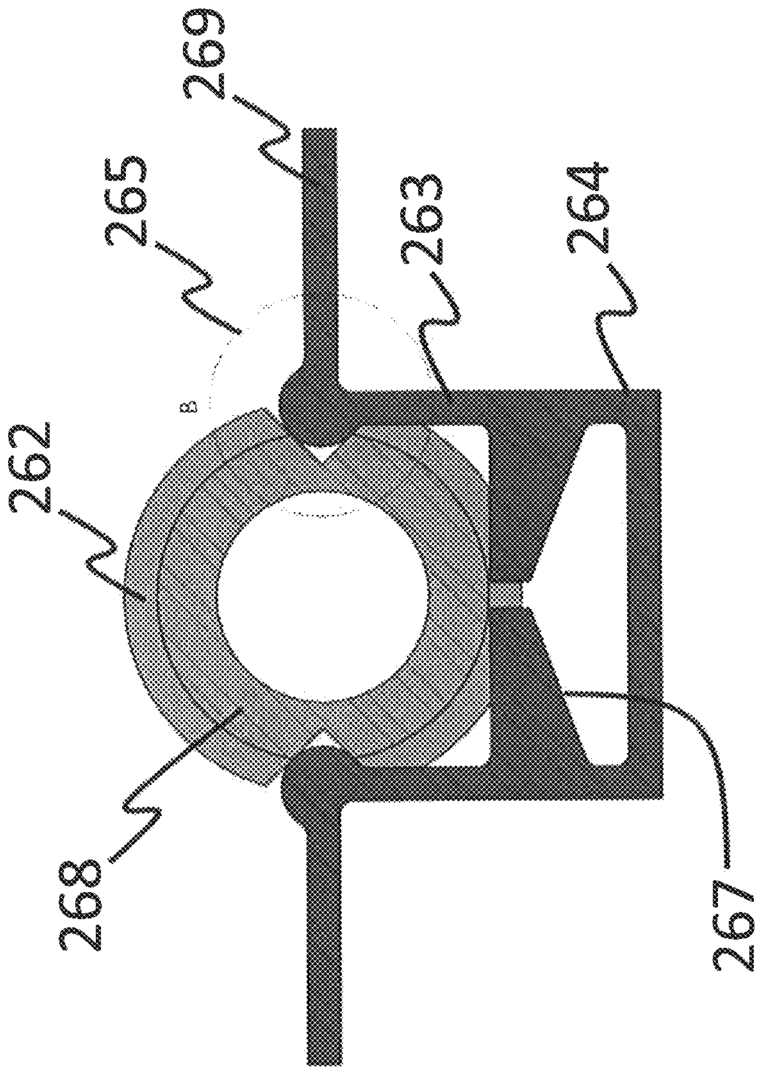
Figure 30:
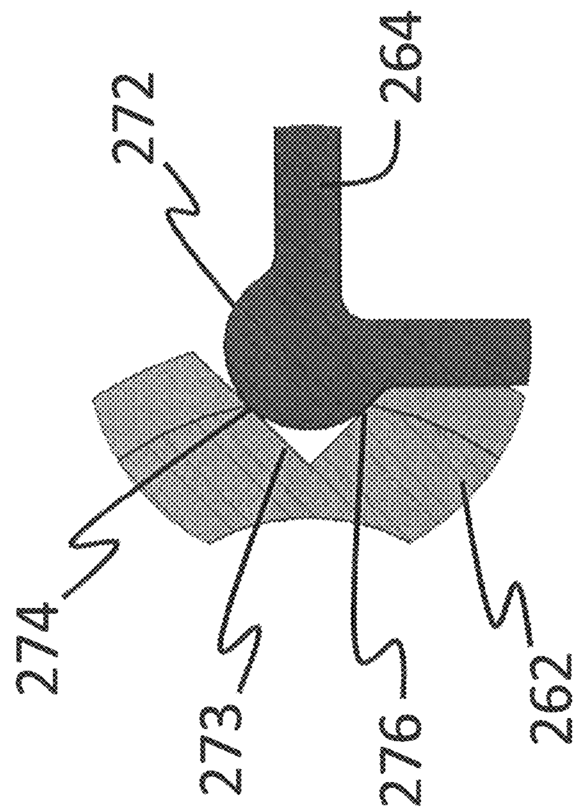

Another embodiment of the present teachings 380, shown in FIGS. 28-30, is very similar to the one previously mentioned, except the primary compliant members of the alignment mechanism 264 are the side walls 263. The datum surfaces are v-grooves 273 on either side of the housing 262 and cylindrical lips 272 that the side walls 263 squeeze into the grooves 273 and contact after insertion 266 along two lines 274 and 276. Flanges 268 on the ends of the housing 262 constrain axial translation. Instead of compliant members for quick disconnection, paddles 267 are attached to the side walls 263 that push the housing 262 up when the wall is flexed out due to a user depressing the release tabs 269. The paddles 267 are not in contact with the housing 262 when the tabs are not depressed. The general scheme is shown in FIG. 28, the section view in FIG. 29, and the detail view 265 is shown in FIG. 30.

This design uses only the walls as compliant members. Vertical misalignment forces are counteracted in this design by the vertical component of the clamping force applied perpendicular to the each plane of the v-groove 273. Horizontal misalignment forces are similarly opposed by the horizontal component of the resultant clamping force on each plane of the v-groove.

Figure 31:
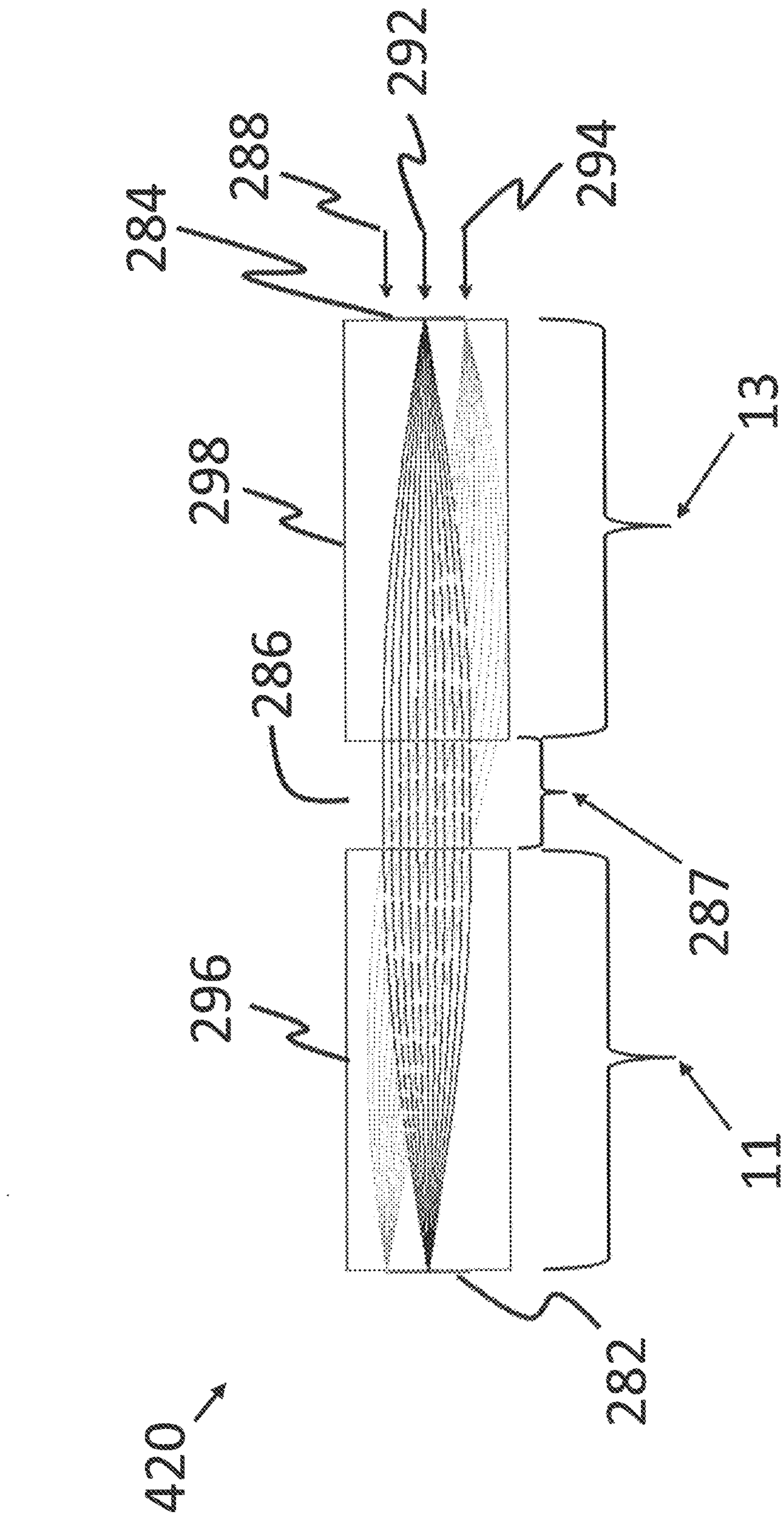
FIG. 31-32 show in an imaging system as used in ultra-dense alignment tolerant component of these teachings.

One embodiment of the present teachings is the Ultra-Dense Alignment Tolerant (UDAT) optical fiber connector system, which uses a pair of substantially infinite conjugate imaging systems, 296 and 298, with rigidly fixed and aligned packed fiber bundles corresponding to the object array 282 and the image array 284. In FIG. 31, this pair of array and imager assemblies 11 and 13, is depicted with ray bundles 286. By connectorizing fibers in this way, very high channel densities can be achieved in a more dirt-tolerant connection than the standard butt connector currently used for large numbers of fibers.

The imaging system 420 used in the Ultra Dense Alignment Tolerant (UDAT) connector technology is shown in FIG. 31. Here matched pairs of infinite conjugate rod lens imagers are used. An optical fiber placed on-axis at the first rod lens 296 is imaged onto the fiber at the center position 292 on the second rod lens 298. Many fibers can be simultaneously imaged between other points such as those labeled 288 and 294 (See FIG. 2). In many configurations this imaging is effectively telecentric, which gives rise to very efficient fiber coupling for fibers distributed across the face. When fibers are input at extreme field positions 288 and 294, the imaging picks up some aberrations and fiber-coupling efficiency begins to drop off. This case is illustrated in FIG. 32.

Figure 32:
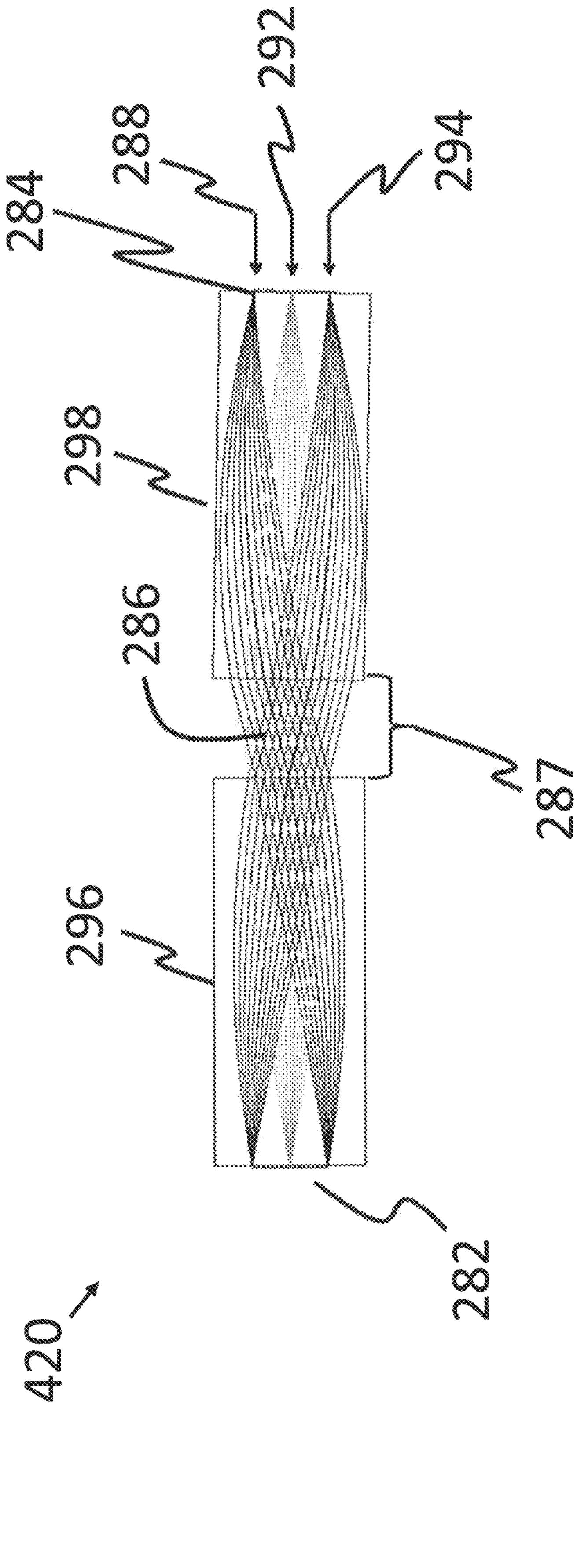
Figure 33:
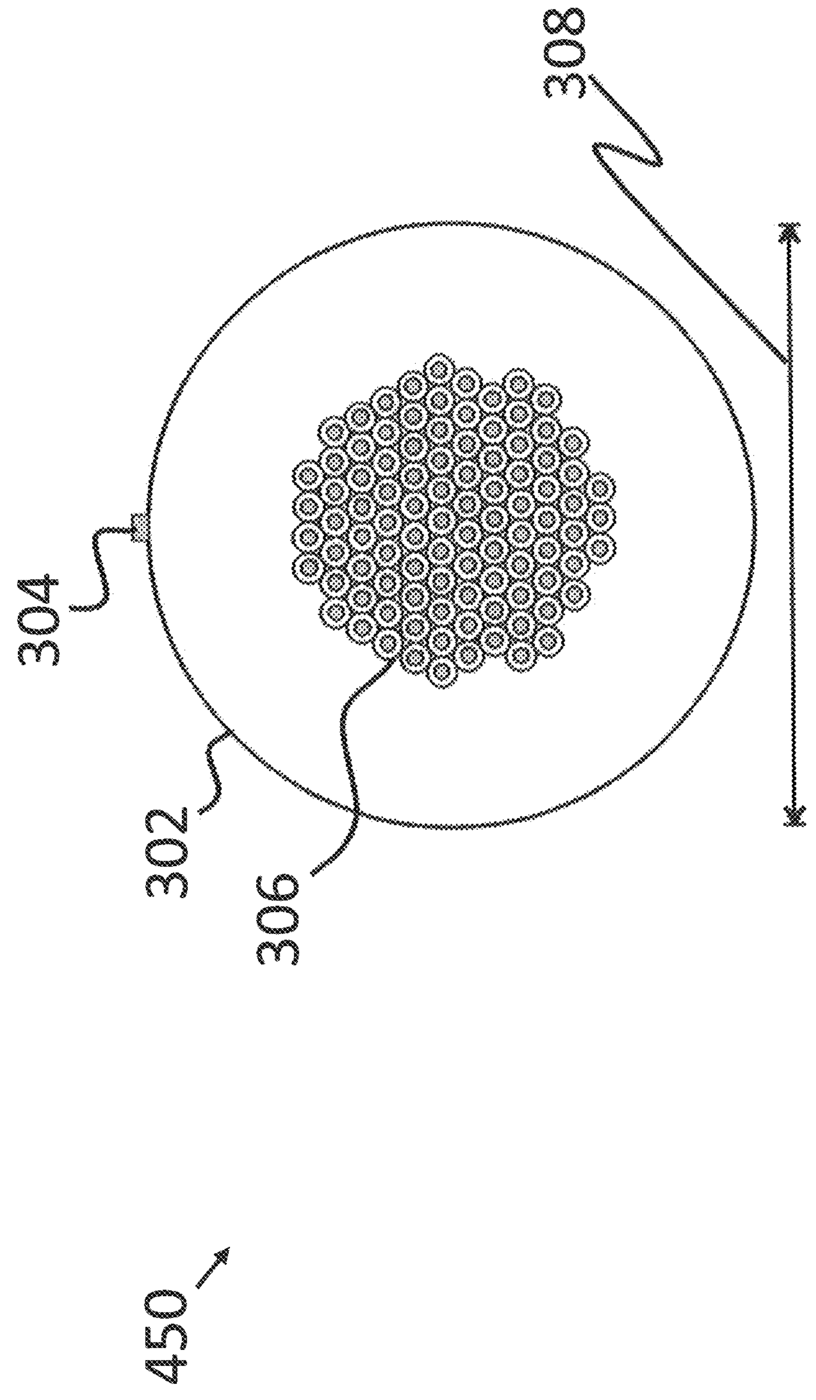
FIGS. 33-43 show embodiments of fiber arrays used in these teachings.

In FIG. 32 and FIG. 31 real rays 286 are shown for the case of a 4 mm diameter rod lens pair, 296 and 298, separated by a 2.6 mm air gap 287. This infinite conjugate rod lens imaging system 420 exhibits tolerance to changes in the air gap 287 length and to lateral misalignments. In this system, each fiber output is transformed into a broad plane wave in the air gap 287 region, each at a different angle. Because the output from each fiber is a wide collimated beam in this region, there is an insensitivity to lateral translations. Contamination, dirt, and oil films in this region only result in slow degradation of the coupled signals. In this ultra-dense connector technology, an array of optical fibers 306 is rigidly fixed to each of the rod lens imagers 302 as shown in FIG. 33 for an array of 96 optical fibers. In this embodiment 450, an alignment key 304 in a keyway (not shown) is used to orient the rod lens pairs relative to each other in the UDAT connector, though the lenses may be aligned in other ways such as those mentioned herein. This embodiment uses a 4.0 mm 308 rod lens 302, but other sizes are possible.

Figure 34:
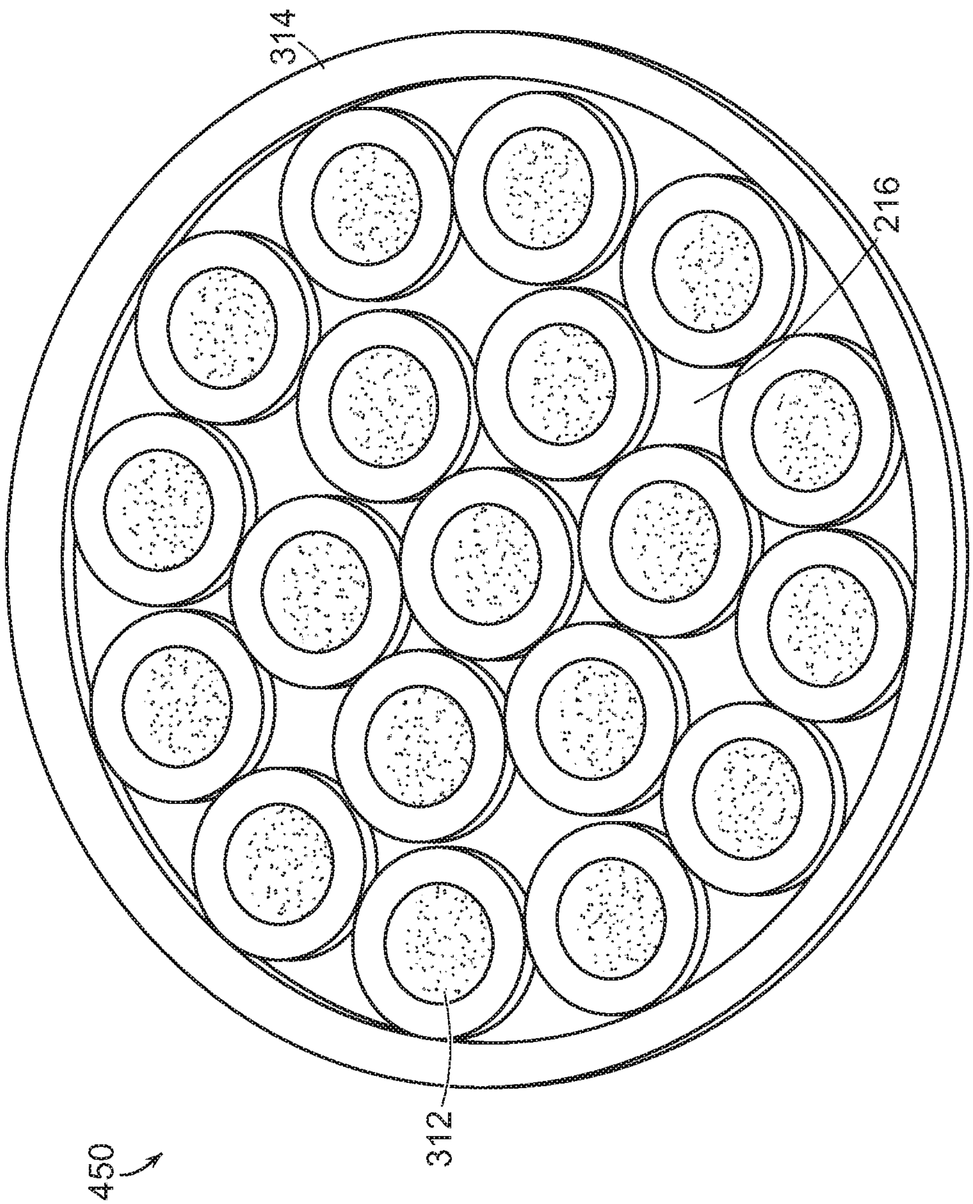

FIG. 34 shows an early experimental UDAT fiber array containing 19 fibers 312 compressed by a tube 314.

Figure 35:
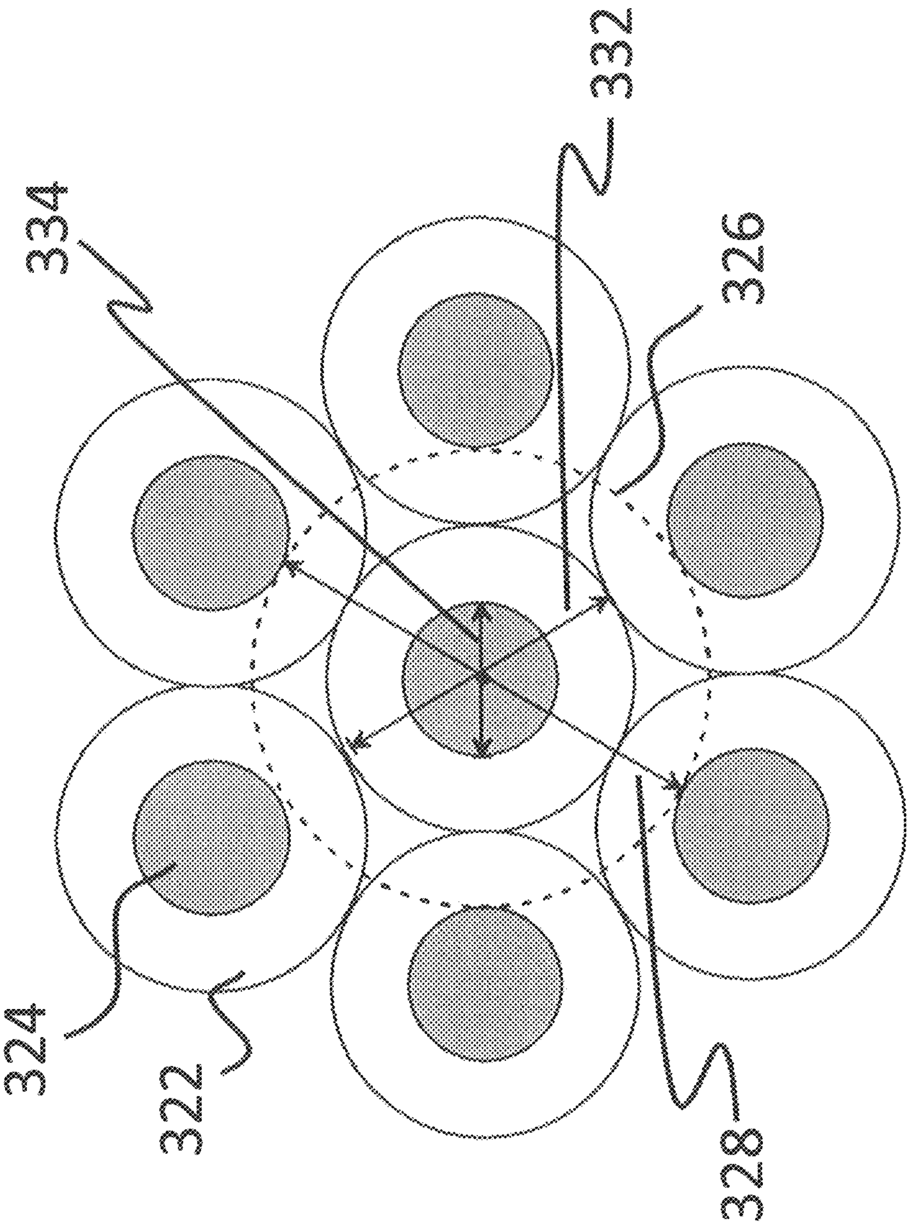

Details of an embodiment of the packing in a hexagonal configuration for the fiber array 306 on the face of the rod lens 302 are illustrated in FIG. 35. In this standard commercial off-the-shelf (COTS) fiber case study, each fiber has a core 324 diameter of 100 μm 334, and an outside cladding/coating 322 diameter of 172 μm 332. The tolerance of the outside diameter is 2 μm in this case for unsorted fiber, opening the possibility of simple compression packing of the bundle. A perfectly-centered imaged spot can be blurred to a diameter 328 of 244 microns before crosstalk is an issue. The blurred spot 326 is shown with the dashed circle.

Figure 36:
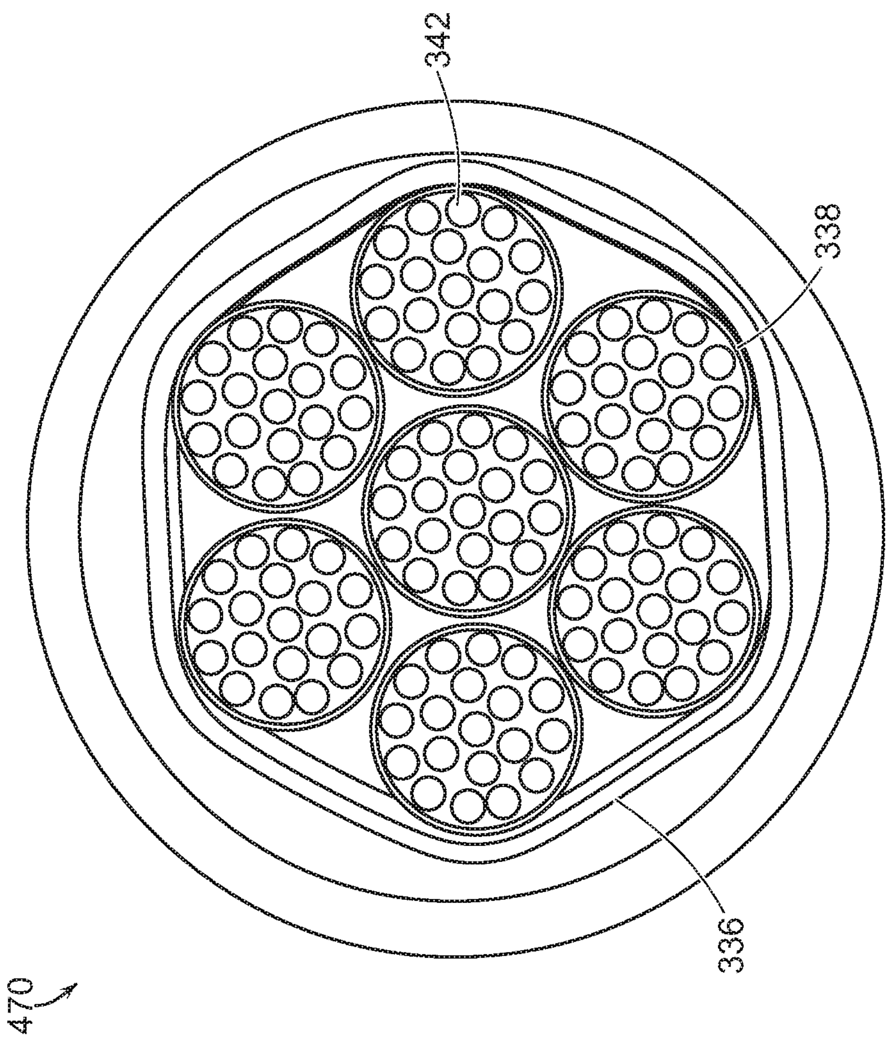

This robust technology has many embodiments, such as the superarray 470 of multiple UDAT fiber arrays 342 in a single array, as shown in FIG. 36. Each array 342 is packed in a compressive sleeve 338 and the arrays, in turn, are packed together with a compressive sleeve 336. Other means of packing are possible.

Figure 37:
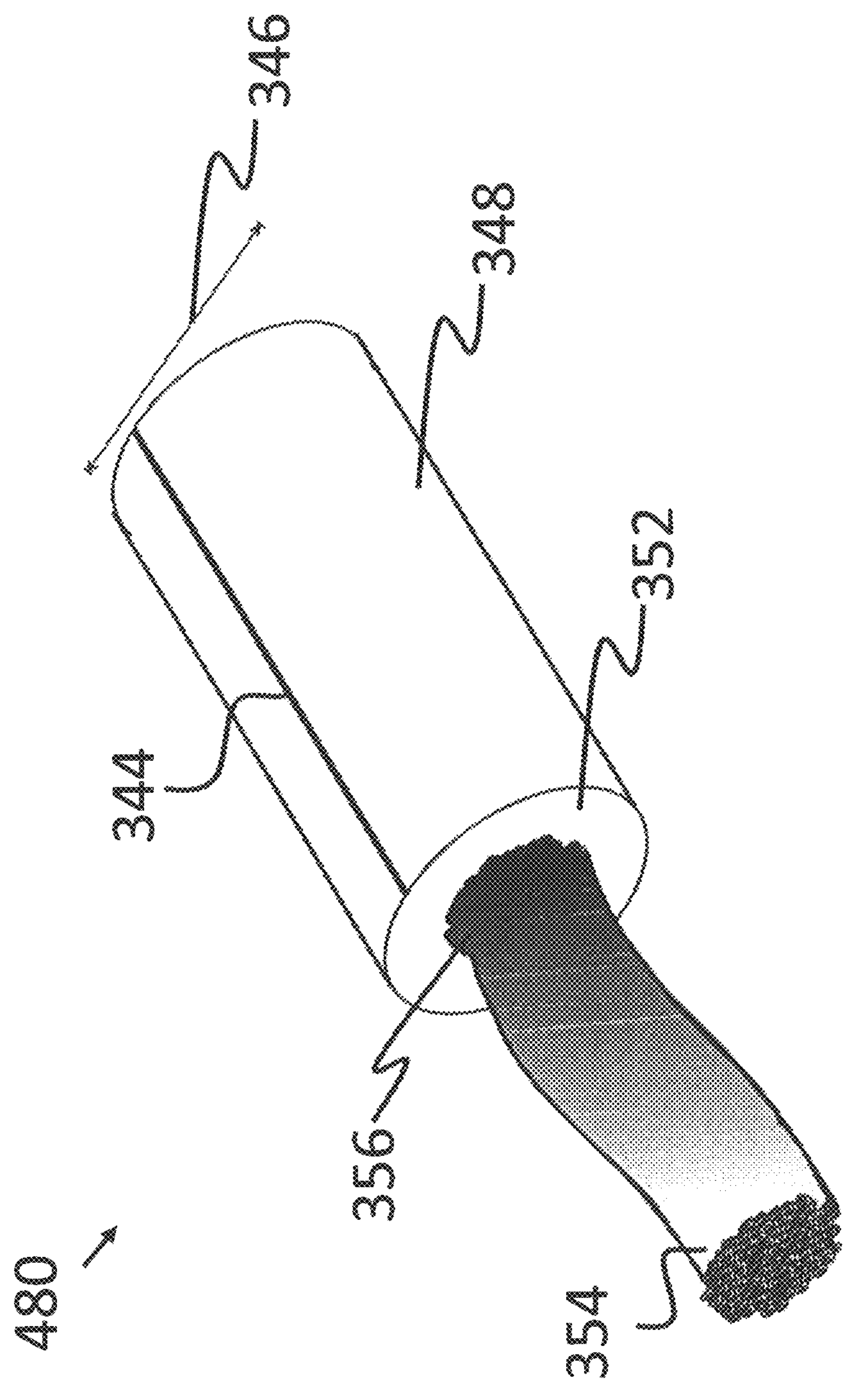

The UDAT connector concept is illustrated in FIG. 37.

Figure 38:
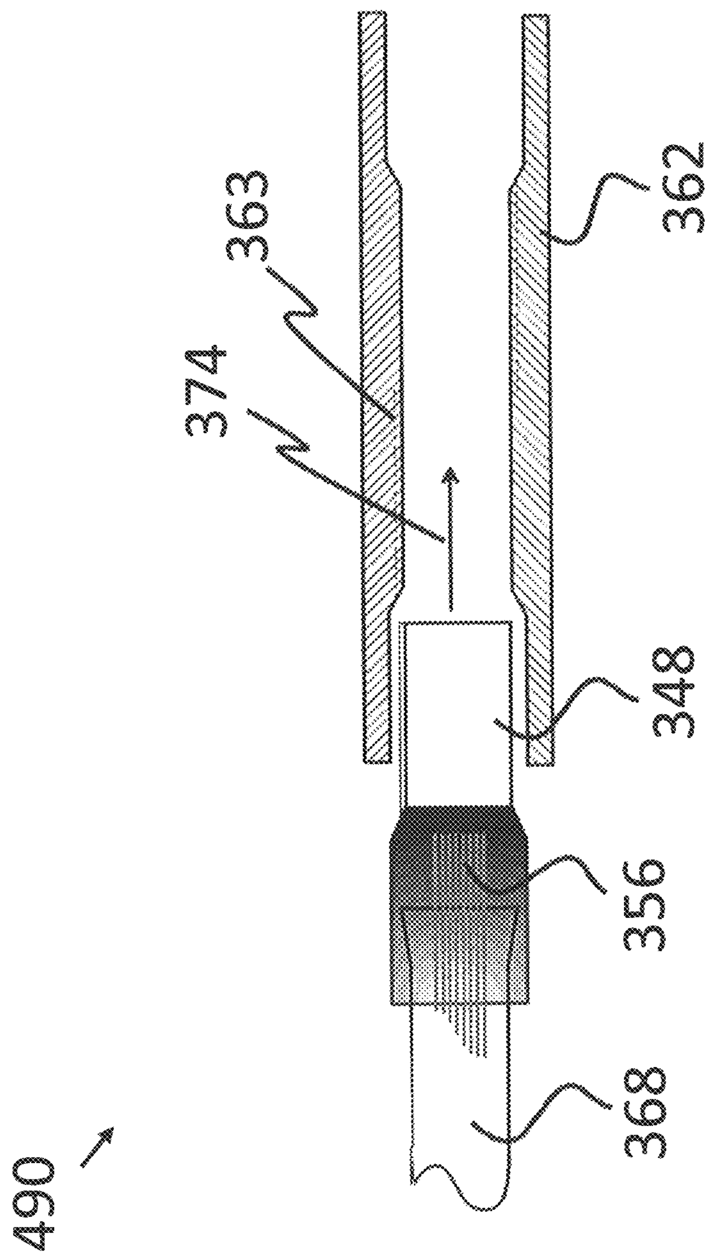

The UDAT imager 348 and fiber array 356 shown in FIG. 37 are aligned, in one embodiment 480, with another imager and fiber array by insertion 374 into a simple connector sleeve 362, as shown in FIG. 38, using a keyway 363 in the sleeve 362 to engage a key 344 on the UDAT imager 348 to handle axial rotational alignment. A cable 368 routes the fibers to their sources and destinations.

Figure 39:
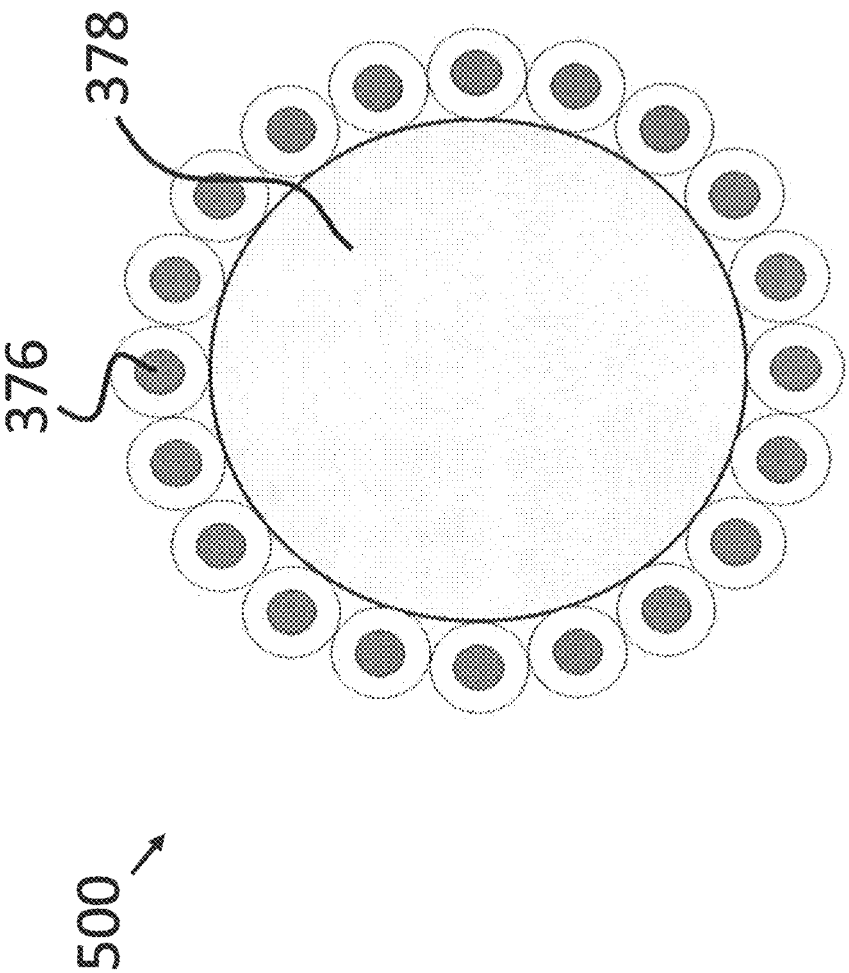
Figure 40:
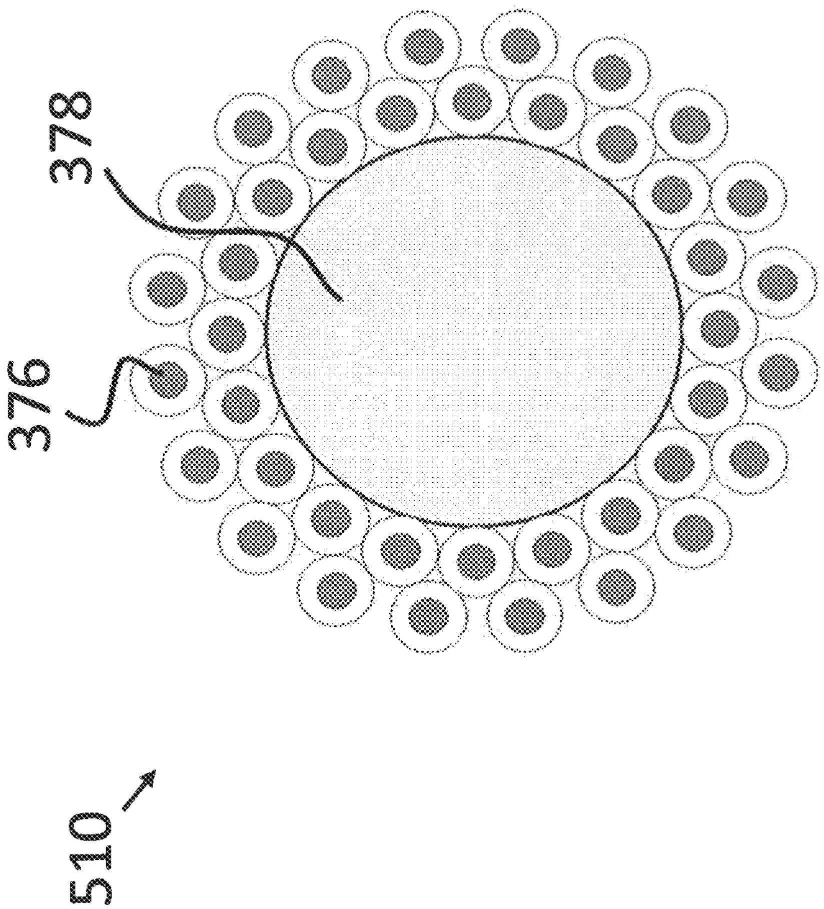
Figure 41:
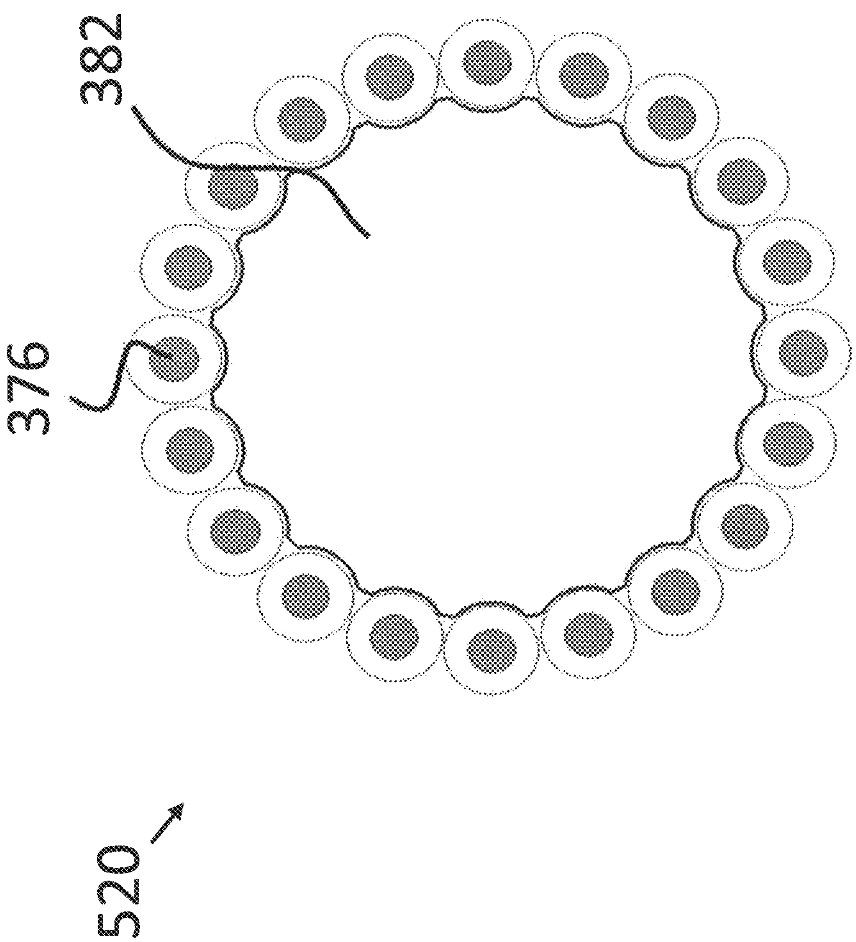
Figure 42:
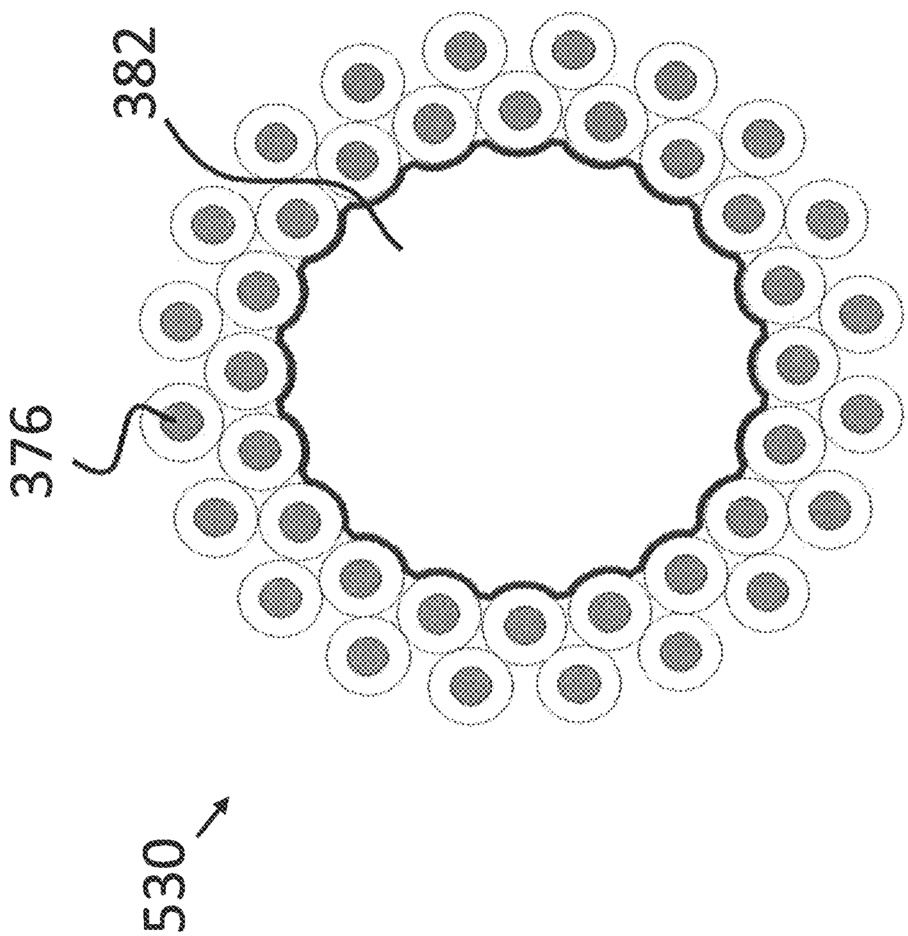
Figure 43:
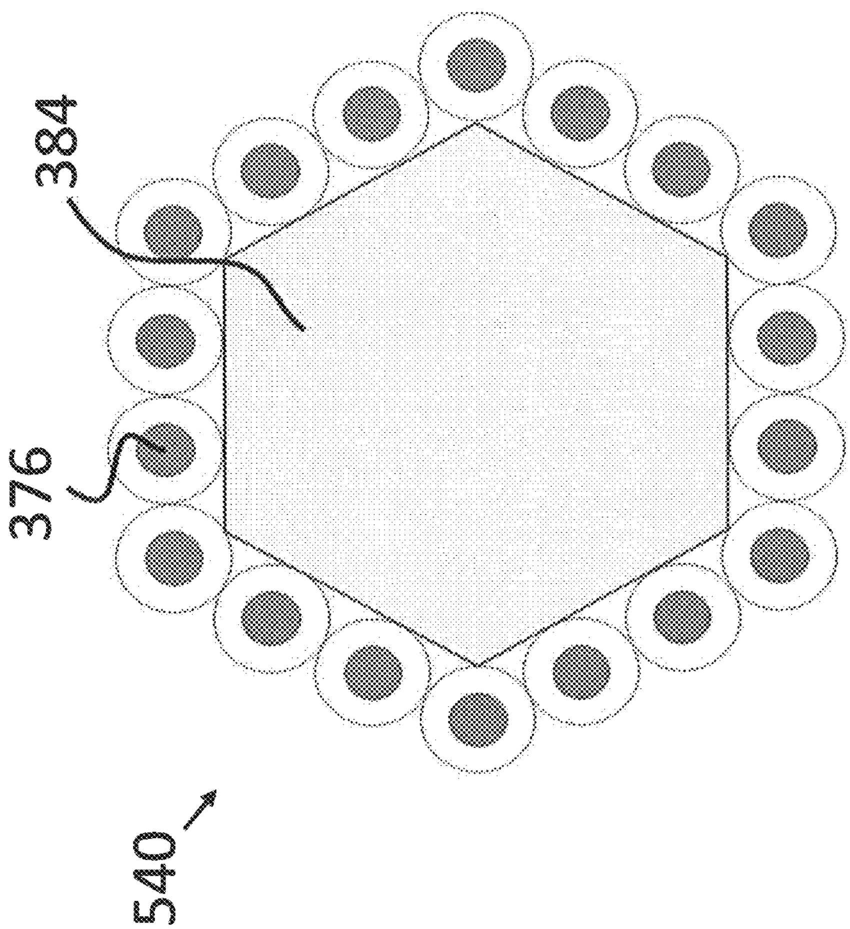

A number of other fiber arrangement embodiments comprise an internal ferrule 378 that is round, as in FIG. 39 and FIG. 40, or a slotted or toothed internal ferrule 382 as in FIG. 41 and FIG. 42 or internal ferrules with other geometric shapes such as a hexagonal internal ferrule 384 as shown in FIG. 43. When optical fibers 376 are built up in arrays by compression as shown in FIG. 35 the variations in core, cladding, and coating (if applicable) dimensions due to manufacturing tolerances stack up to provide potentially larger packing errors as each row of fibers is added around the center fiber. Packing the fibers 376 in a single or multiple row around a precision internal ferrule such as 378, 382, or 384, for example, has the benefit of eliminating the packing errors that would have accumulated from the internal fiber rings that are replaced by the internal ferrule.

Figure 44:
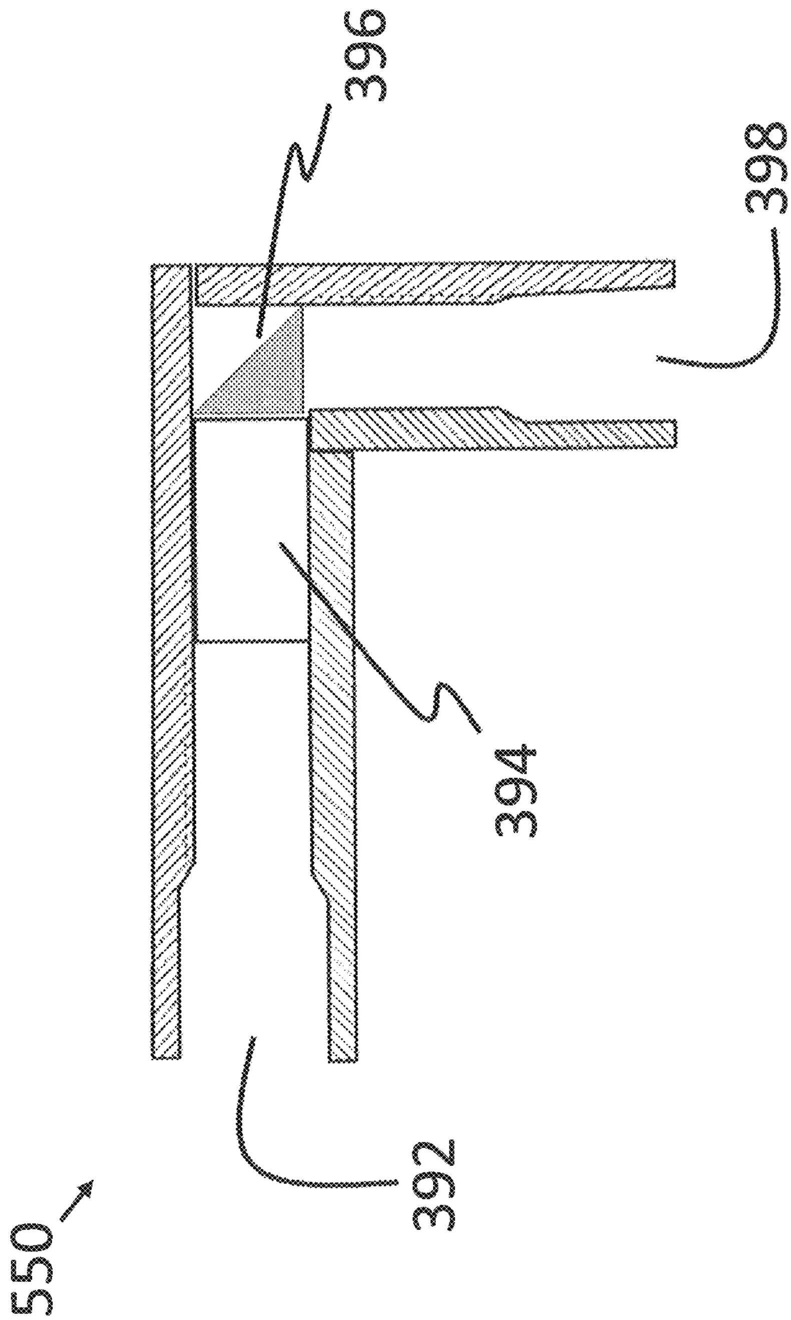
FIGS. 44-49 show embodiments of UDAT components of these teachings.
Figure 45:
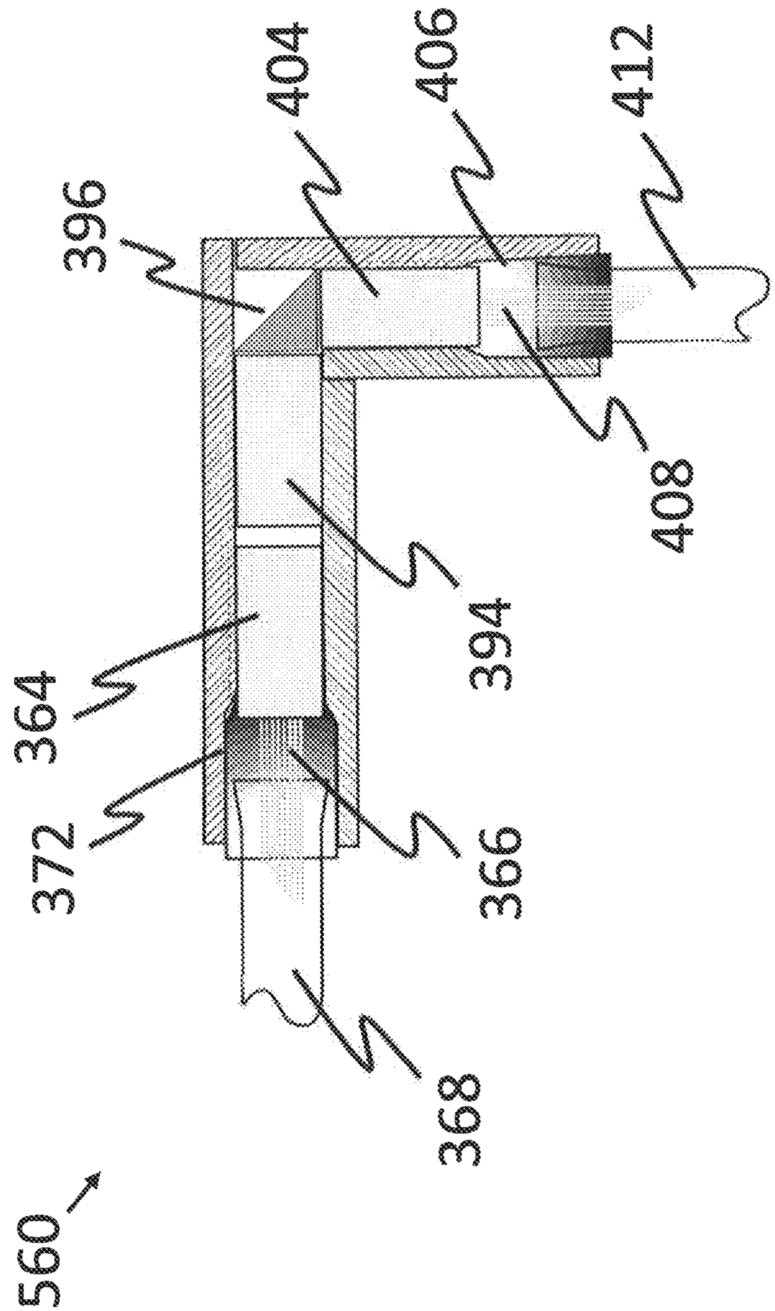
Figure 46:
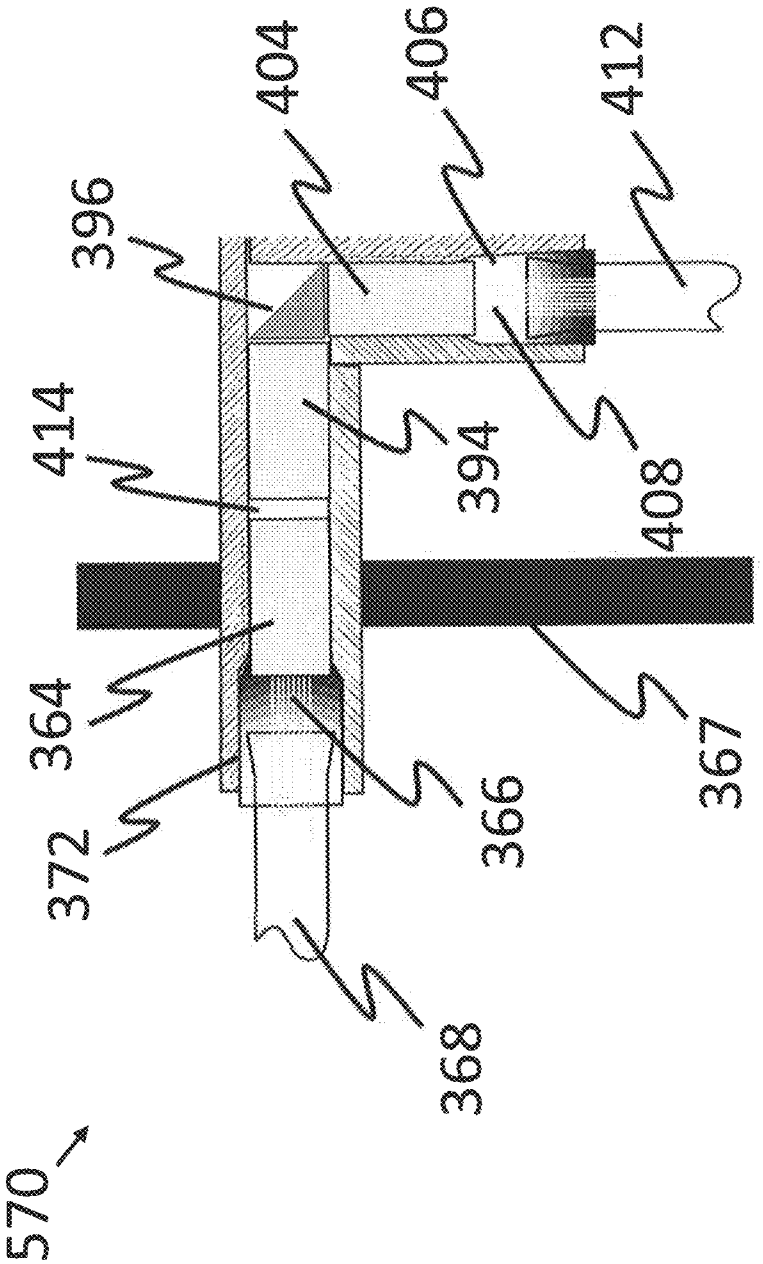

Additional UDAT optical interconnect embodiments address physical situations where fibers need to be routed parallel to a surface from which they are emanating. This happens in many circumstances, including when they leave boxes such as Vehicle Management System Computers (VMSCs). These embodiments are also useful in tightly constrained aerospace applications where fiber bending radius is of a concern as the large fiber arcs round the bend near terminations. For these tight space applications, UDAT connector embodiments such as the right-angle connector systems 550, 560 and 570 illustrated schematically in FIG. 44, FIG. 45 and FIG. 46 are useful. In this right angle connector, output from a first UDAT cable is interconnected to a second cable by plugging the cables into this right-angle connector. A relay lens 394 is used to couple the light from one UDAT cable 372 in its socket 392 to the reflective element 396 to the other UDAT cable 406 in its socket 398. This relay lens 394 may be of conventional design (e.g., a telecentric relay), or a single or multiplicity of rod lenses. The latter configuration may have symmetric rod lenses on either side of the mirror prism. For relatively small fiber arrays, the relay lens 394 can be eliminated altogether, and the imagers 364 and 404 native to the UDAT bundle can be designed to relay across the gap of the reflective element.

Finally, this right angle connector 560 can be installed directly in a VMSC chassis 367 as shown as system 570 in FIG. 46. This configuration is particularly useful for efficiently running fibers from the VMSC box to the remote sensors and actuators, for example. The large bends typically required of fiber bundles and cables are avoided. The optional grounded ITO or other transparent conducting film 414 can be used as shown to shield the inner electronics from external EMI, as well as to prevent internal EMI fields from emanating from the box. In a similar embodiment, the internal connector 372 shown in FIG. 46 can be replaced with a FABI system so the fiber arrays can be efficiently coupled to the internal electronics boards without the need for less reliable individually broken-out fibers inside the VMSC box.

Figure 47:
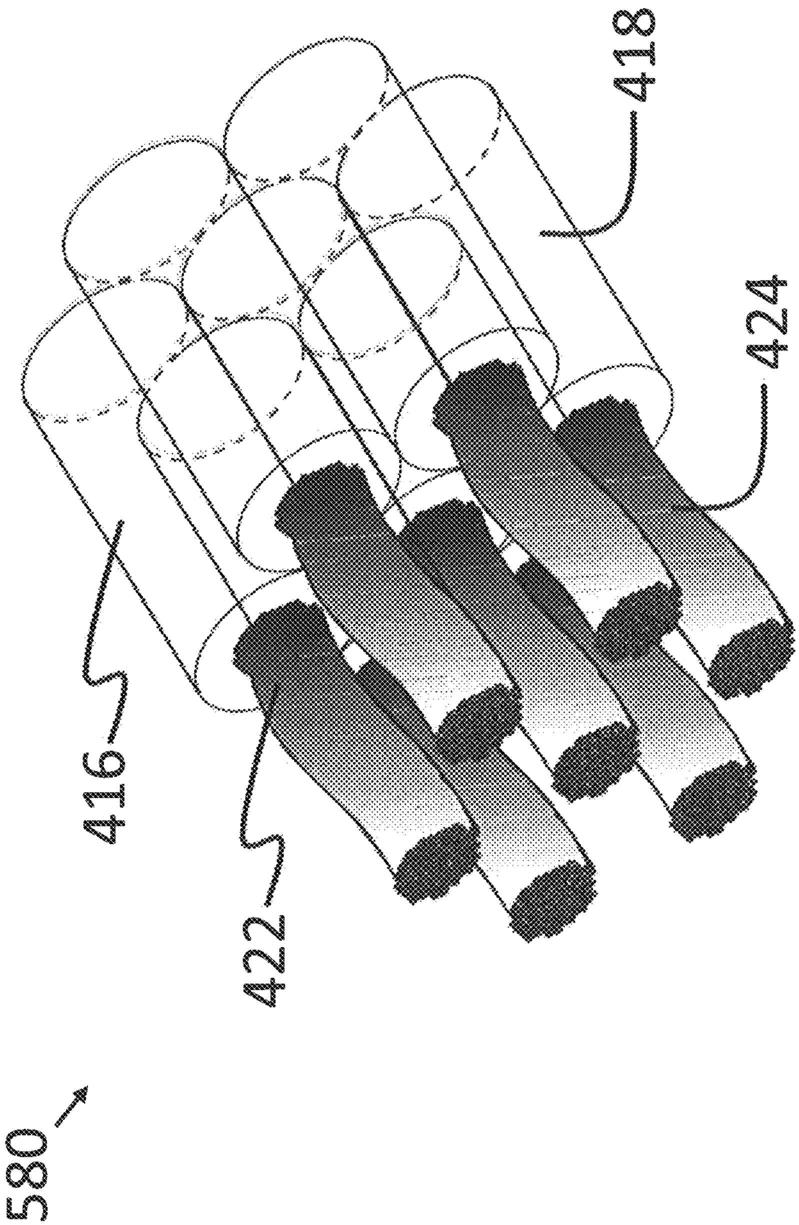

Yet another embodiment includes the UDAT "Array of Arrays" configuration 580 shown in FIG. 47. Here multiple rod lenses 416, each with UDAT fiber array 422 affixed, are either arrayed hexagonally as shown or in other (e.g., Cartesian) arrays (See FIG. 48). For example, the rod lenses 416 can be inserted into compact connectors either individually or in a bundled array 580, and the collective tolerances of the connector are relaxed in comparison with those of conventional connectors. Since multiple imagers are used, many more fibers can be interconnected while maintaining the ultra-dense efficiency. Further, sub-bundles of fibers of arbitrary size are readily defined and may be used to efficiently go to differing specific common locations (or to the same location over redundant paths for critical signals). Also, the ability to swap-out single sets of fibers is provided for maintenance, etc. It is possible to allow insertion and replacement of the individual imagers in the array of imagers supporting maintenance of the many fibers.

Figure 48:
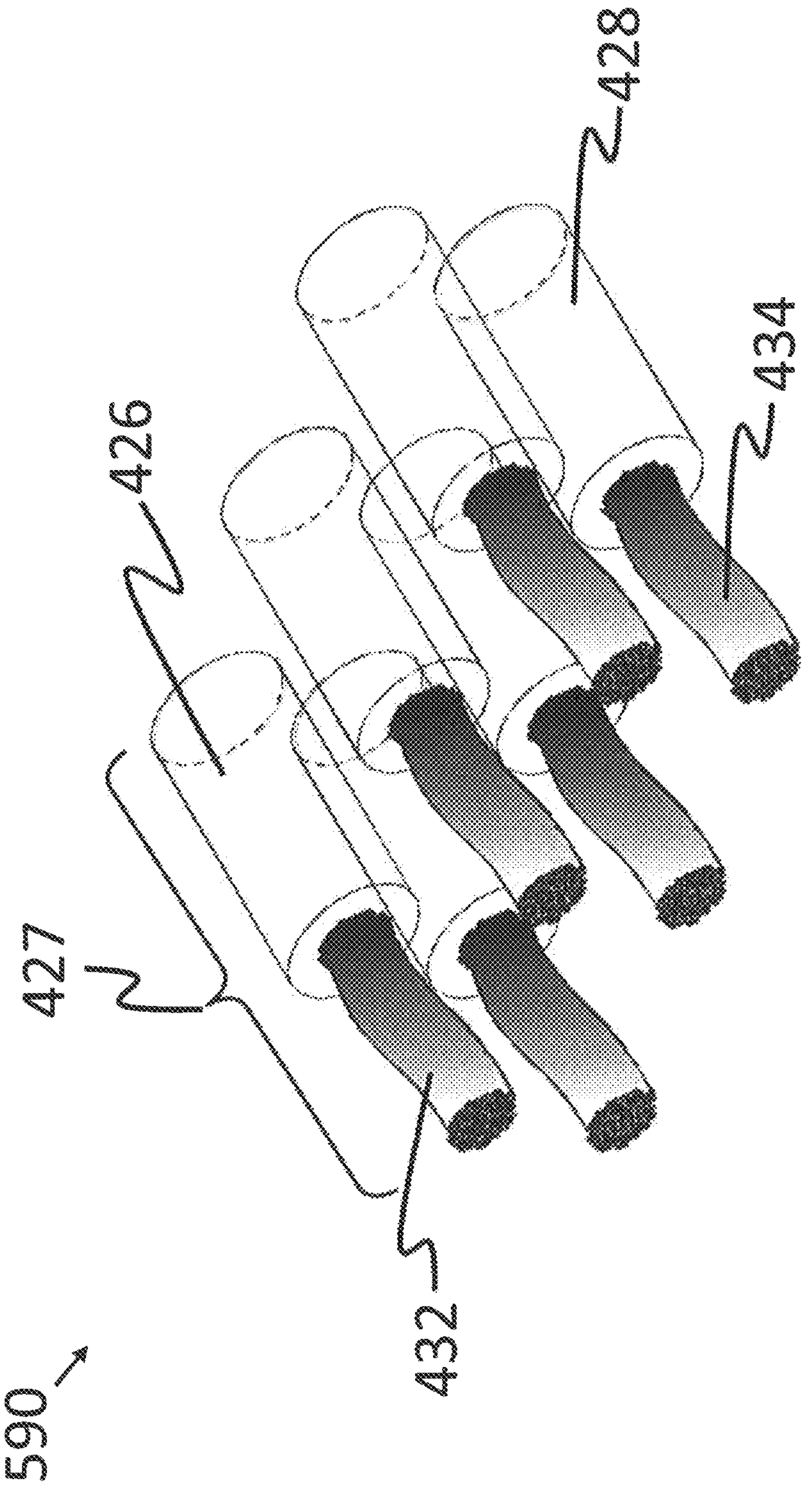
Figure 49:
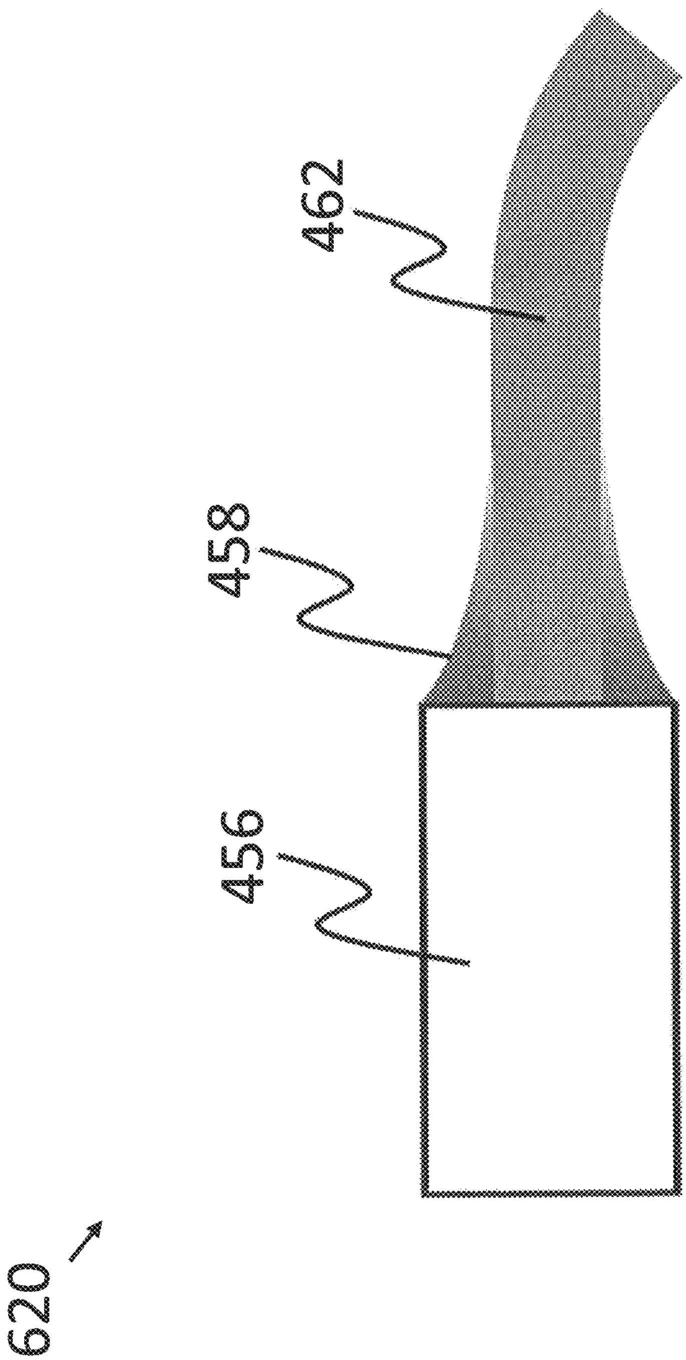

A Cartesian form 590 of the "Array of Arrays" configuration is illustrated in FIG. 48. Here the individual UDAT connectors 427 are arranged in a Cartesian array that may be close packed, or spaced (as shown) in a relaxed-tolerance connector (not shown).

In another embodiment, silica microtubes can be used instead of glass or plastic fibers.

The "all-glass" embodiment of the optical interconnect 620 uses a dense array of silica-core/doped-silica-clad [silica/silica] fibers 462 that are aligned and affixed to the rod lens 456 using a high temperature solder glass material 458. These solder glass materials have a potential for high performance UDAT construction. Temperature ranges for this technology should be extreme, allowing for applications, for example, but not limited to, in engine bays.

Other embodiments of this approach include, for example but are not limited to, replacing the rod lens with refractive, diffractive, or hybrid imagers. These alternate imagers can be made of high temperature materials, for example, some imager designs include all silica lenses.

Figure 50:
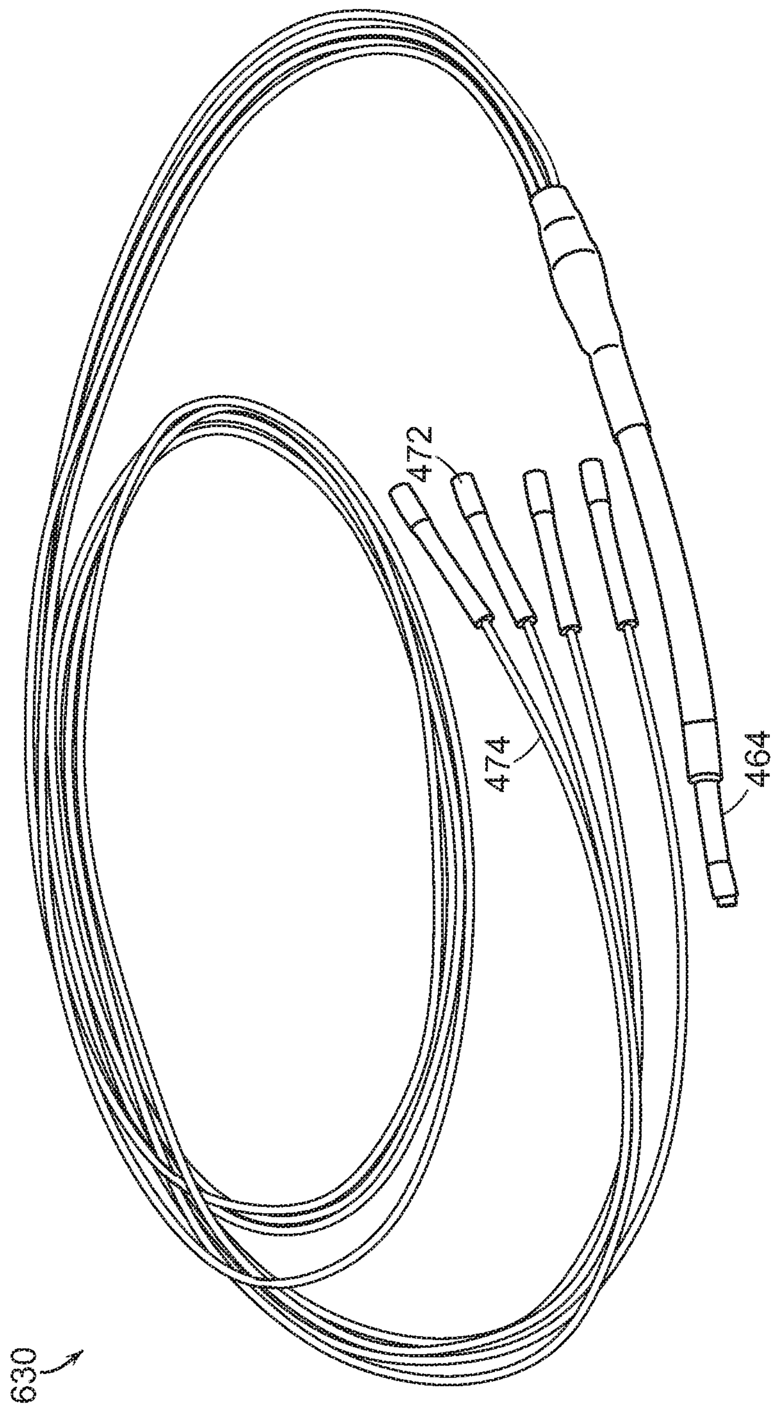
FIGS. 50-53 show a UDAT FABI breakout reduction to practice cable
Figure 51:
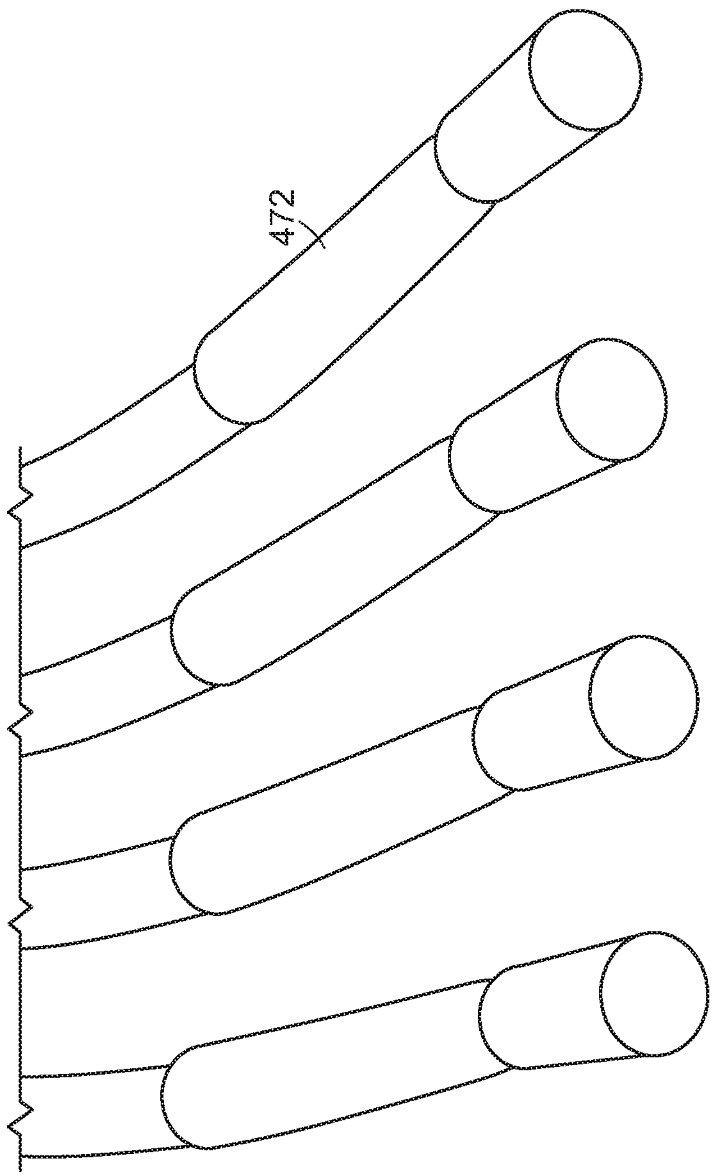
Figure 52:
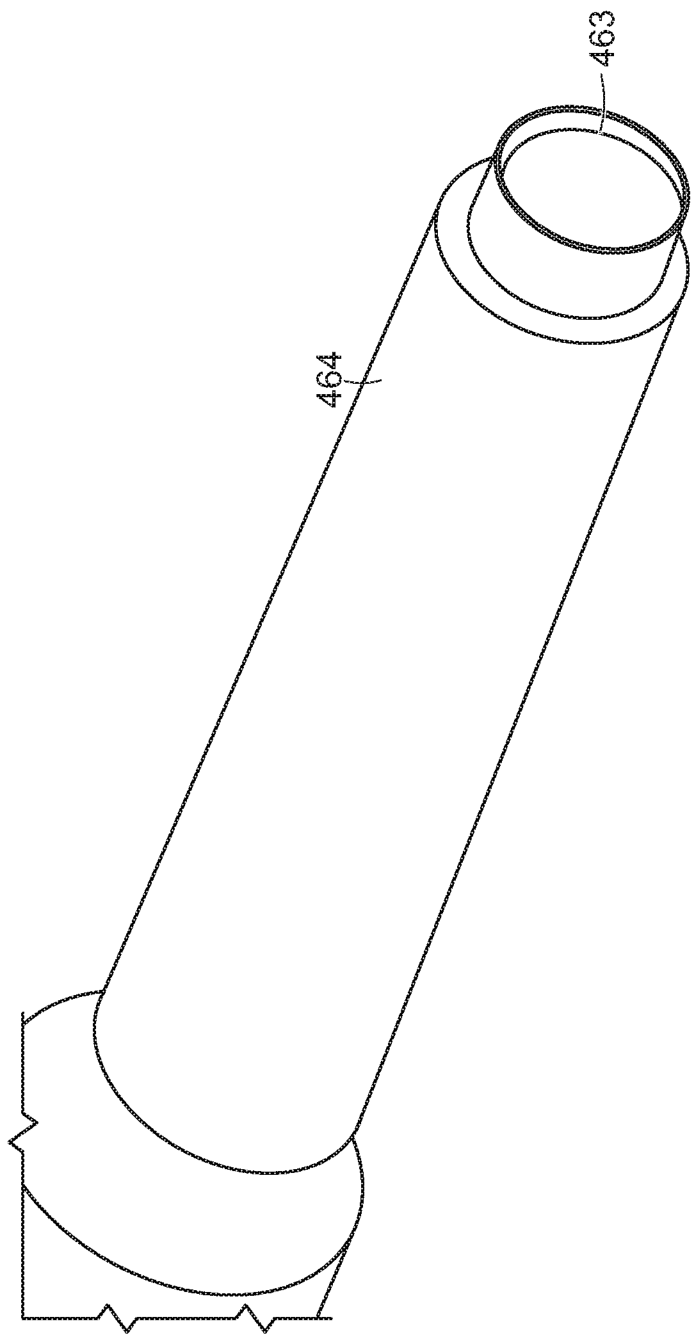
Figure 53:
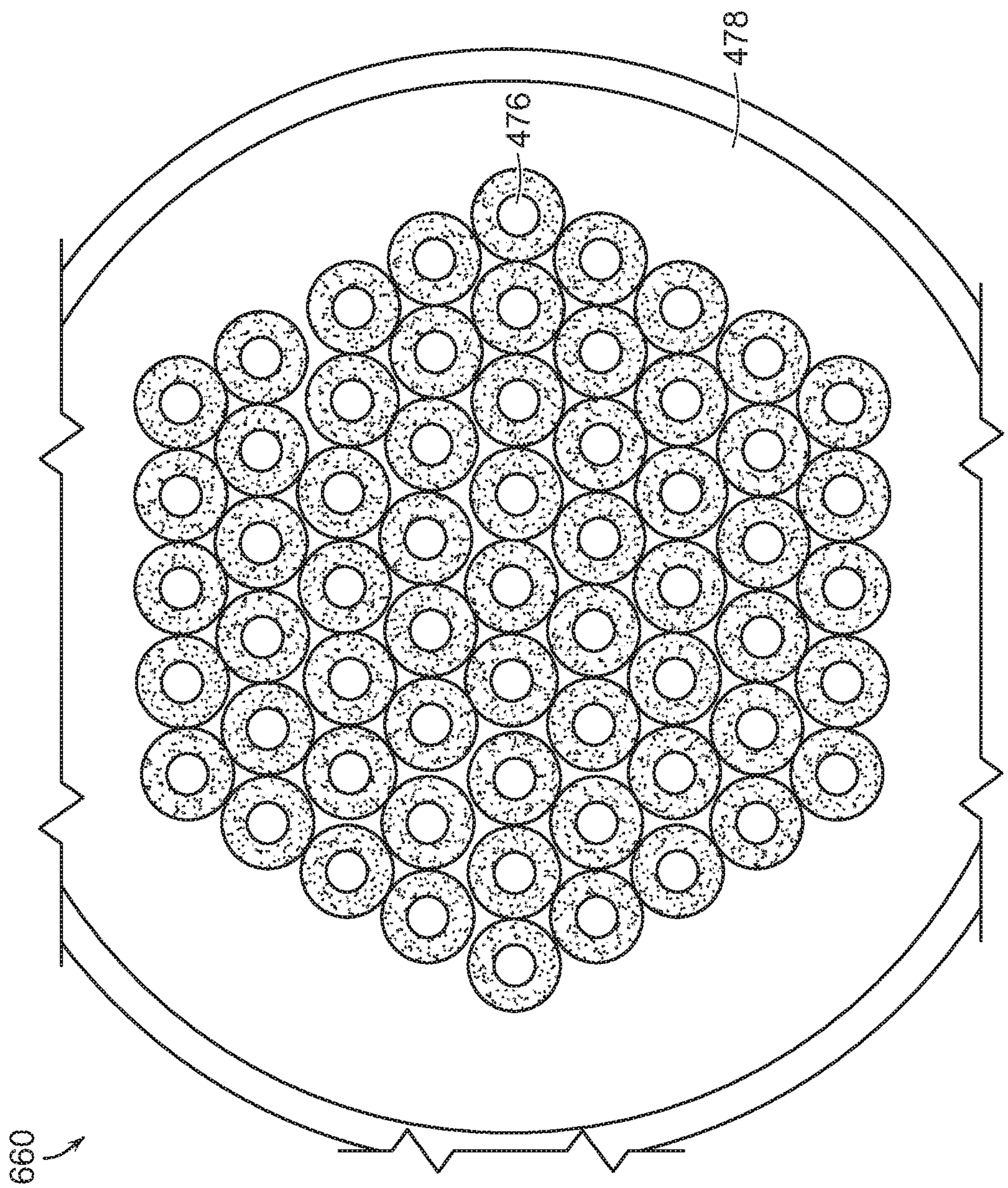

In order to move an optical signal from one connection to the next, the fibers must be routed appropriately and a variety of breakout cables are feasible, including a UDAT breakout/fanout cable system 630 as shown in FIG. 50. In one embodiment reduced to practice, lengths of fiber 476 (shown in FIG. 54) were bundled into four arrays. Each array of nineteen fibers 476 in each was comprised of fifteen or sixteen active fibers 476 along with three or four dummy fibers to complete a nineteen fiber 476 hex array. Each fiber bundle 472 was compressed using polyolefin shrink wrap to ensure a tight hex array. When a tight bundle 472 was formed, the array was potted using an epoxy 478. Every bundle end was diamond saw cut and hand polished. After polishing, the fiber bundles were sleeved using a Fluran jacket material 474. Polished arrays were manually aligned to 4 mm diameter grin lenses 463 and epoxied in place. Connector ends 472 and fanout area were given mechanical support by applying shrink wrap tubing 464. The completed FABI Breakout cable 630 is illustrated in FIG. 50. The array 660 is shown in FIG. 53 end-on with illuminated fibers. Detailed photographs of the breakout ends and large-array end are shown in FIG. 51 and FIG. 52, respectively.

Custom-toleranced fiber boules are routine to fabricate and pull into fiber, and choosing the fiber core and cladding dimensions to optimize the UDAT tolerances and crosstalk levels is not a large source of added expense—and further, opens the UDAT technology to larger array sizes for a given performance requirement. For example, the 62.5 micron core/125 micron cladding dimensions is one of the common standards in multimode fiber. Retaining the 125 micron cladding diameter, but increasing the core dimension (e.g., to the range of 80-90 microns) should roughly maintain the desirable lifetime, bend radius, and ruggedness of this format while increasing the array tolerances and maintaining crosstalk performance.

One example of these benefits is given by specialty fibers. One embodiment of this fiber has a core of 200 microns and a doped silica cladding that is 240 microns in diameter. Typical doped silica clad 200 micron fiber has a cladding of 220 microns, but increasing this dimension to 240 microns provides for added crosstalk suppression among neighboring fibers in the UDAT arrays. Another embodiment has a 100 micron core with a 140 micron outside silica cladding, all coated with polyimide. A similar embodiment with a 62.5 micron core, similar cladding diameter, and polyimide coating is available. This does not represent an overall optimization for the UDAT applications, but illustrates the value of such tradeoffs. Similarly, if tighter core/cladding tolerances are specified, larger arrays can be made for a given performance level.

Figure 54:
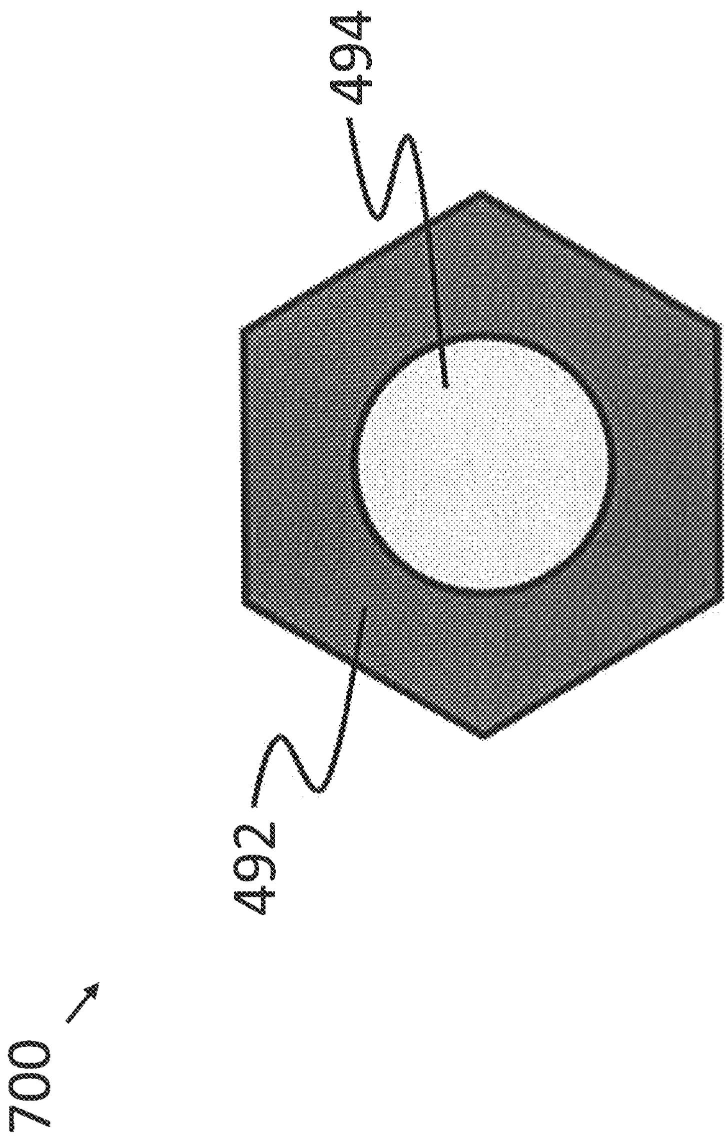
FIGS. 54-56 show embodiments of specialty fibers used in these teachings.

Custom fiber production opens the possibilities for further cost/performance optimizations in the UDAT technology. One embodiment includes a widened cladding region of the fiber boule which is ground into a hexagonal shape prior to fiber pulling. This may allow for the production of hexagonally shaped fibers which would inexpensively, reproducibly, and precisely pack in to hexagonal arrays. This embodiment 700 is shown in FIG. 54, where the core 494 is circular and the cladding 492 is hexagonal.

Figure 55:
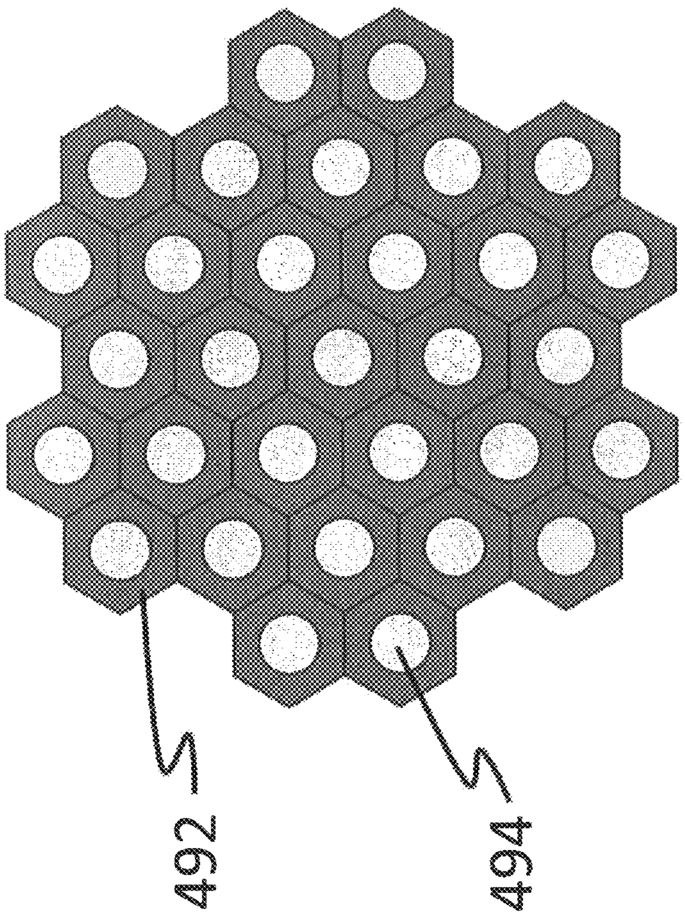

The packing of these fibers in an array is illustrated in FIG. 55. For example, the array of FIG. 55 can be formed simply with a "shrink tubing" approach since the edge elements all exert internal forces aligning all the internal fibers.

Other embodiments of this shaped clad fiber concept of fibers include fibers clad in square or rectangle claddings and packed in a Cartesian array. Similarly, other embodiments include cladding shapes such as triangular or other polygonal cladding which would improve UDAT array formation. Alternatively shaped coatings on fibers could be used to form enhanced alignment UDAT arrays.

Figure 56:
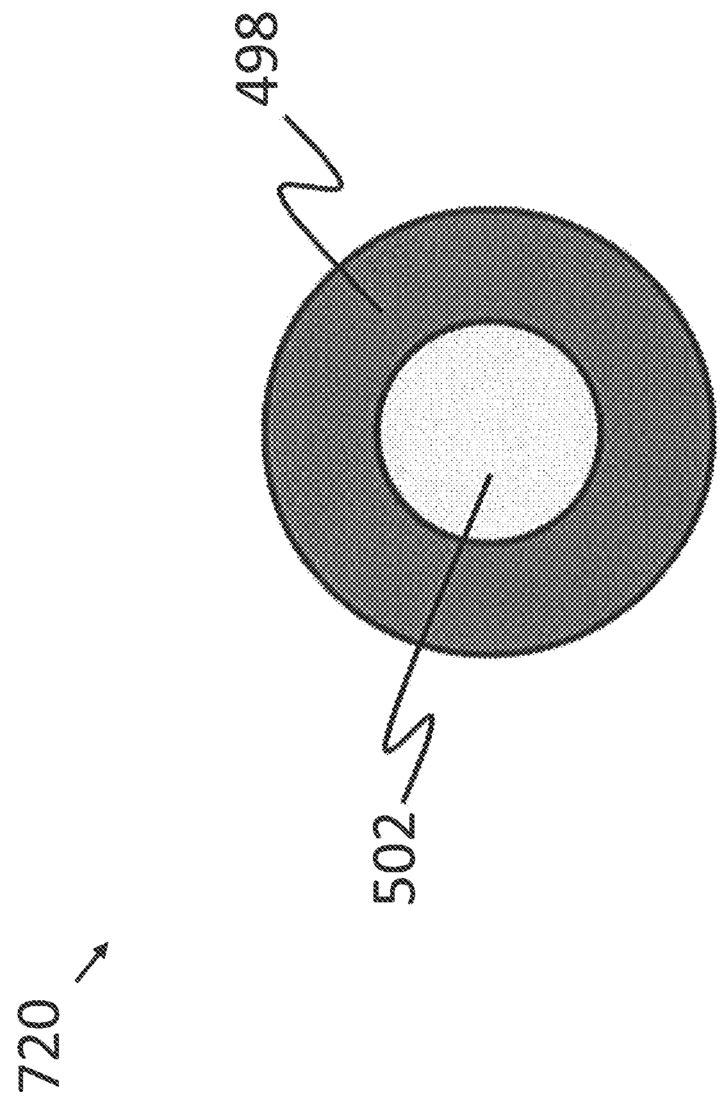

As described earlier, custom fiber preforms grown for Avionic and UDAT applications are readily made. If very large arrays of fibers are required, higher tolerance in core diameter, cladding diameter, and core/cladding centrations can be attained in custom toleranced preforms. Similarly, precision coatings can be specified for the cases where fibers are bundled with coatings applied. This precision dimensioned fiber 720 is illustrated in FIG. 56, where the precision cladding 498 is round, as is the fiber core 502.

Figure 57:
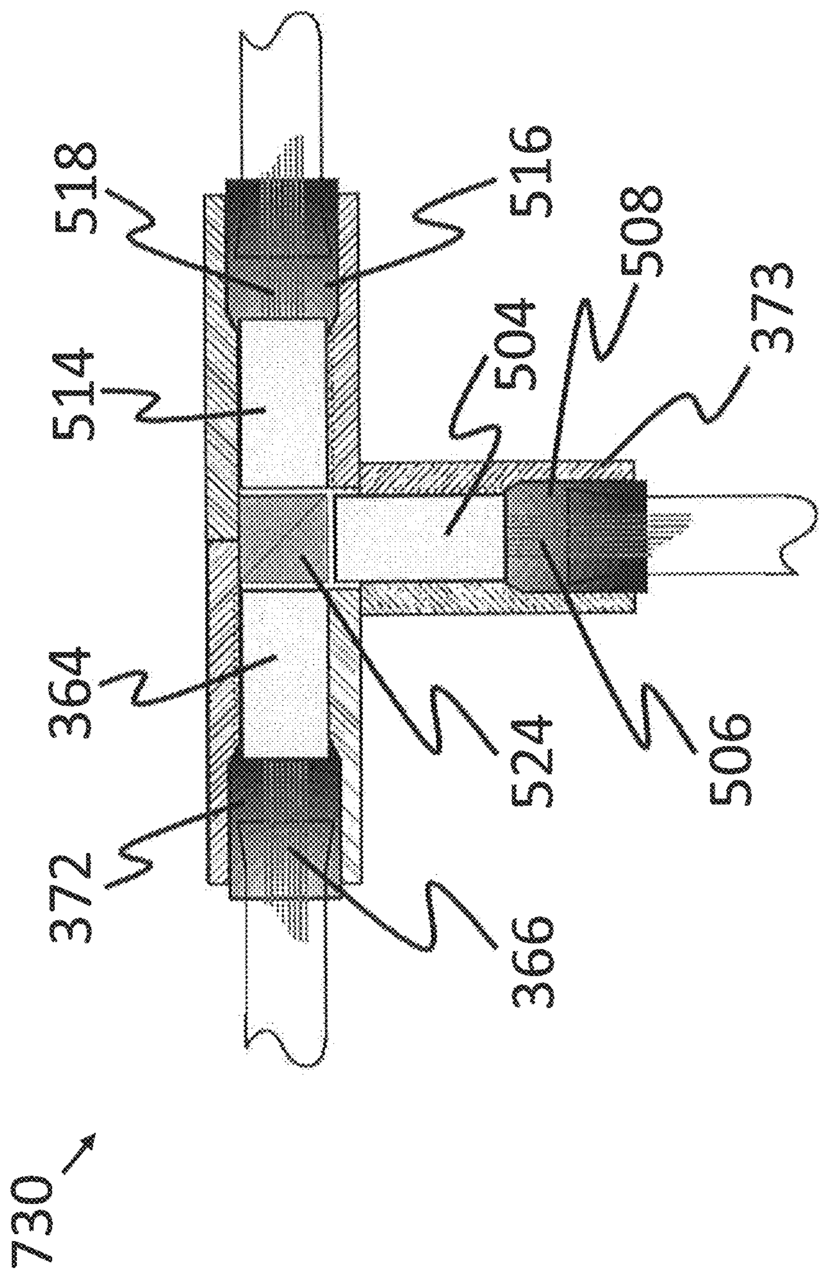
FIGS. 57-59 show embodiments of fan-out and breakout configurations for the UDAT technology of these teachings.
Figure 58:
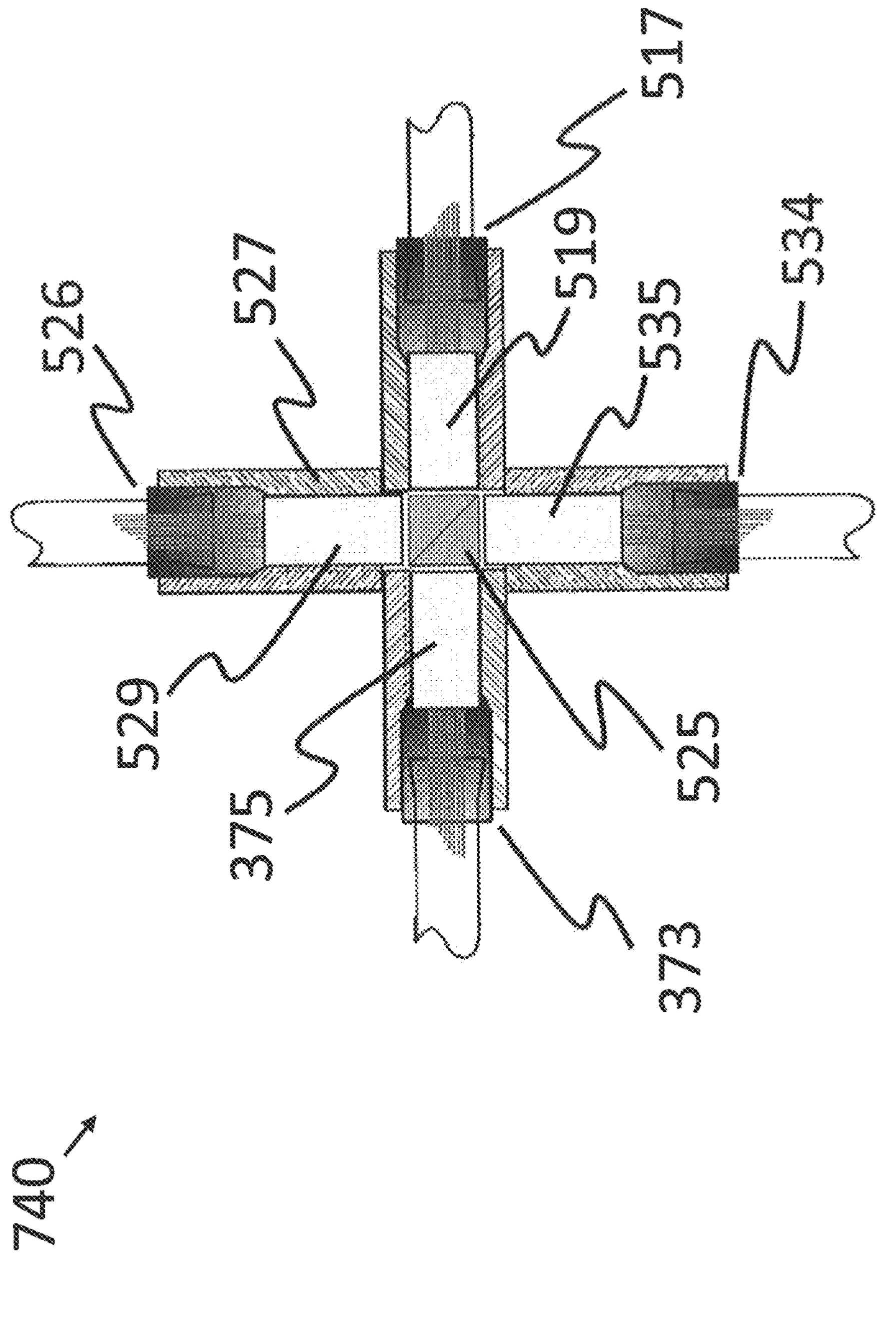

Two embodiments of fanout and breakout configurations for the UDAT technology are illustrated in FIG. 57 and FIG. 58. In the T-breakout embodiment 730 in FIG. 57, the input UDAT connector 372 is inserted into the T-breakout alignment housing 373 and the signals from the input fiber array 366 are imaged by infinite conjugate imagers 364, 514, and 504 and the beamsplitter 524 onto the breakout fiber arrays 506 and 518 of the breakout UDAT connectors 508 and 516, also inserted into the T-breakout alignment housing 373.

In FIG. 58, each UDAT connector 373, 526, 517, and 534 is inserted into the cross-breakout alignment mechanism 527 of the cross-breakout embodiment 740. Signals pass between the separate UDAT connectors by means of the central beamsplitter 525. The signals from the UDAT connectors 373, 526, 517, and 534 are imaged by infinite conjugate imagers 375, 529, 519, and 535 and the beamsplitter 525 onto each other. In these configurations the infinite conjugate imagers can be optimized for telecentricity about the center of the beamsplitter.

Figure 59:
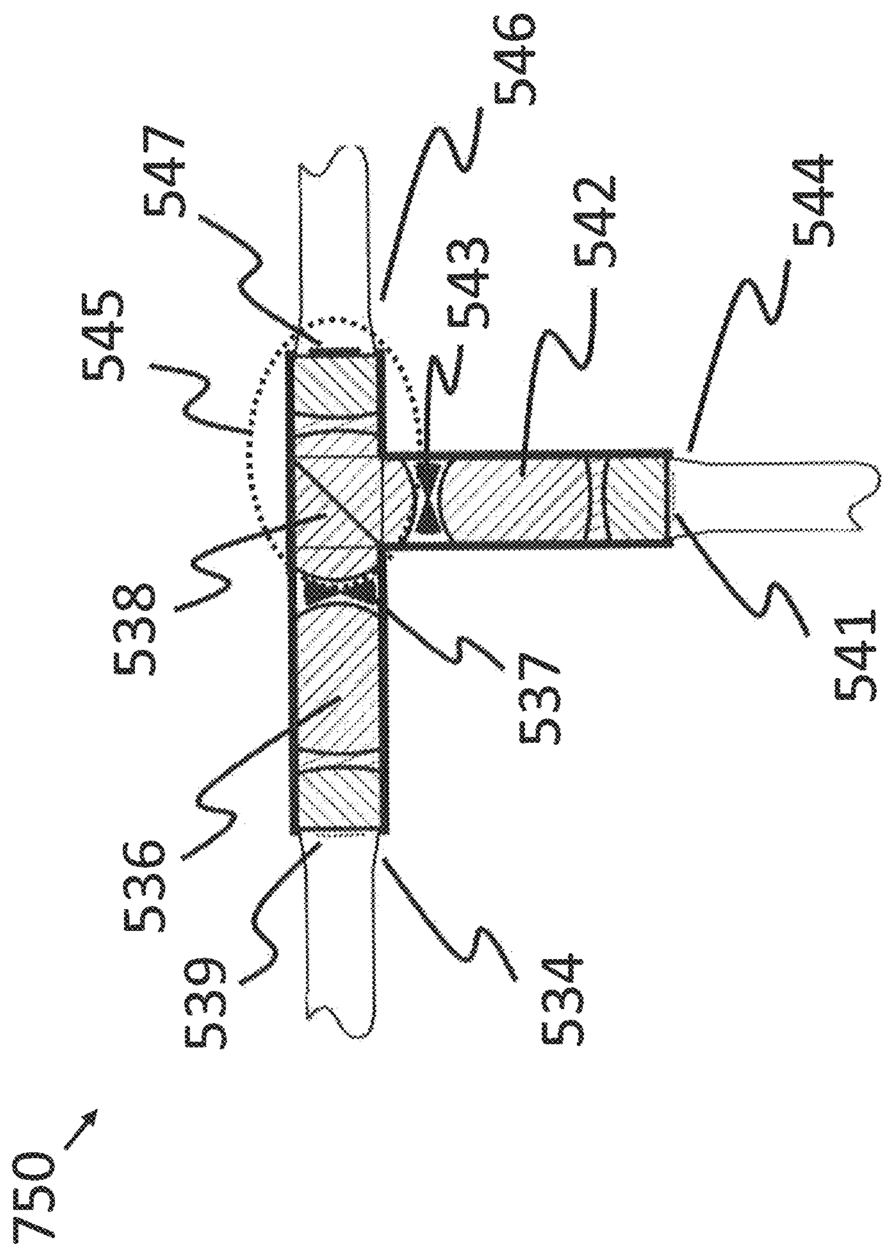

Another embodiment that is shown in system 750 of FIG. 59 is similar to that of system 730 of FIG. 57 and is formed using refractive imagers in place of GRIN lenses. Three connectors 534, 544, and 546 are coupled in this embodiment. Connectors 534 and 544 use refractive infinite conjugate imagers 536 and 542 to produce the angular spectrum of plane waves 537 and 543, respectively, from the input arrays 539 and 541. Beamsplitter 538 is incorporated inside infinite conjugate imager 545 as shown, also producing a mating angular spectrum of plane waves overlapping 537 and 543 corresponding to image array 547.

Figure 60:
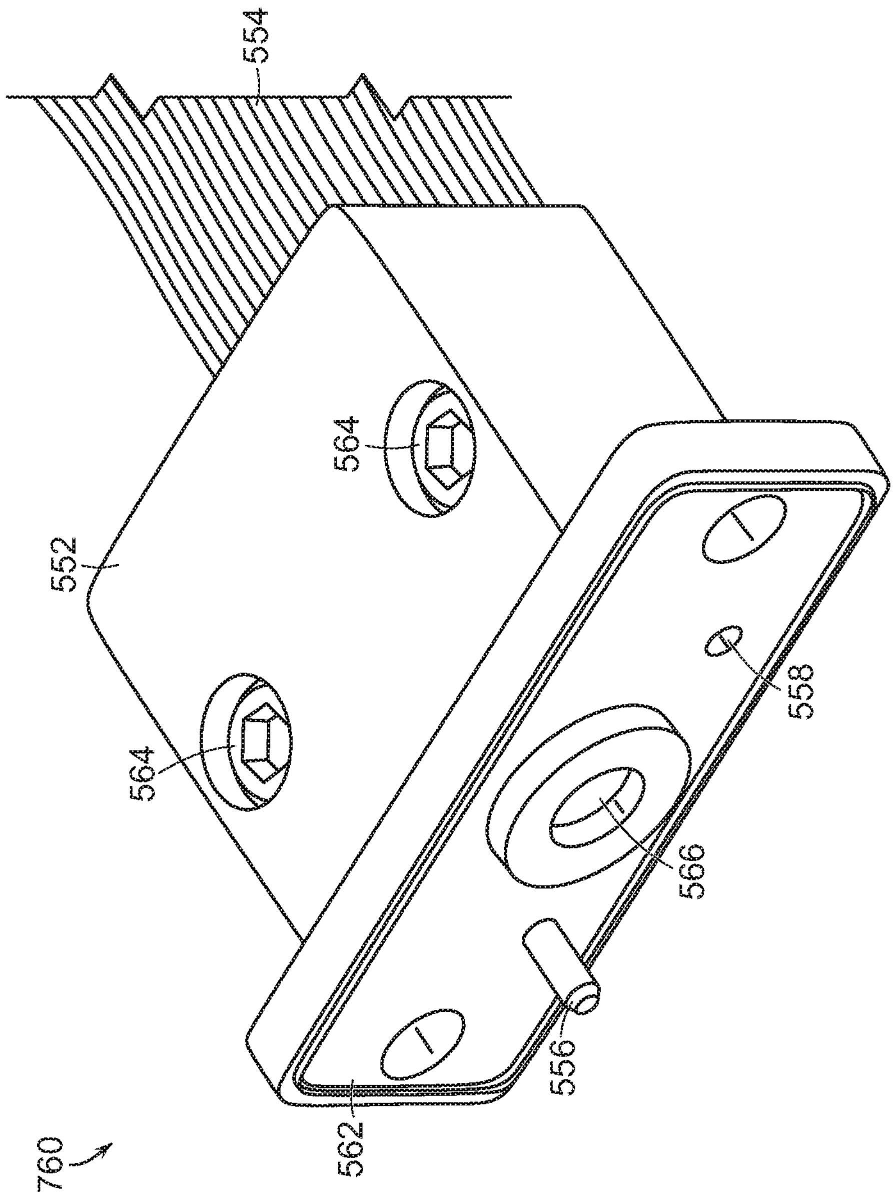
FIGS. 60-62 show an embodiment of an opto-isolating feed-through connector of these teachings.
Figure 61:
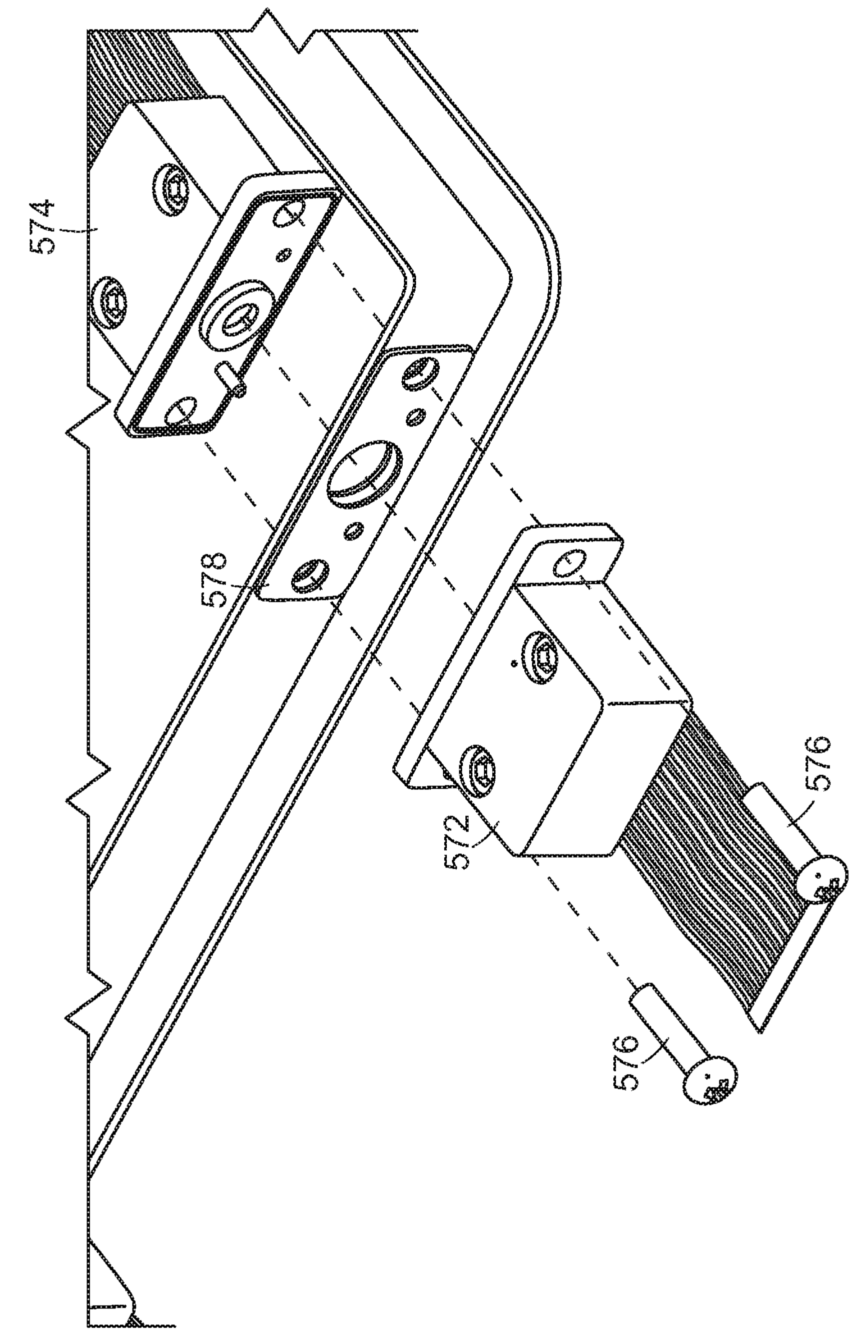
Figure 62:
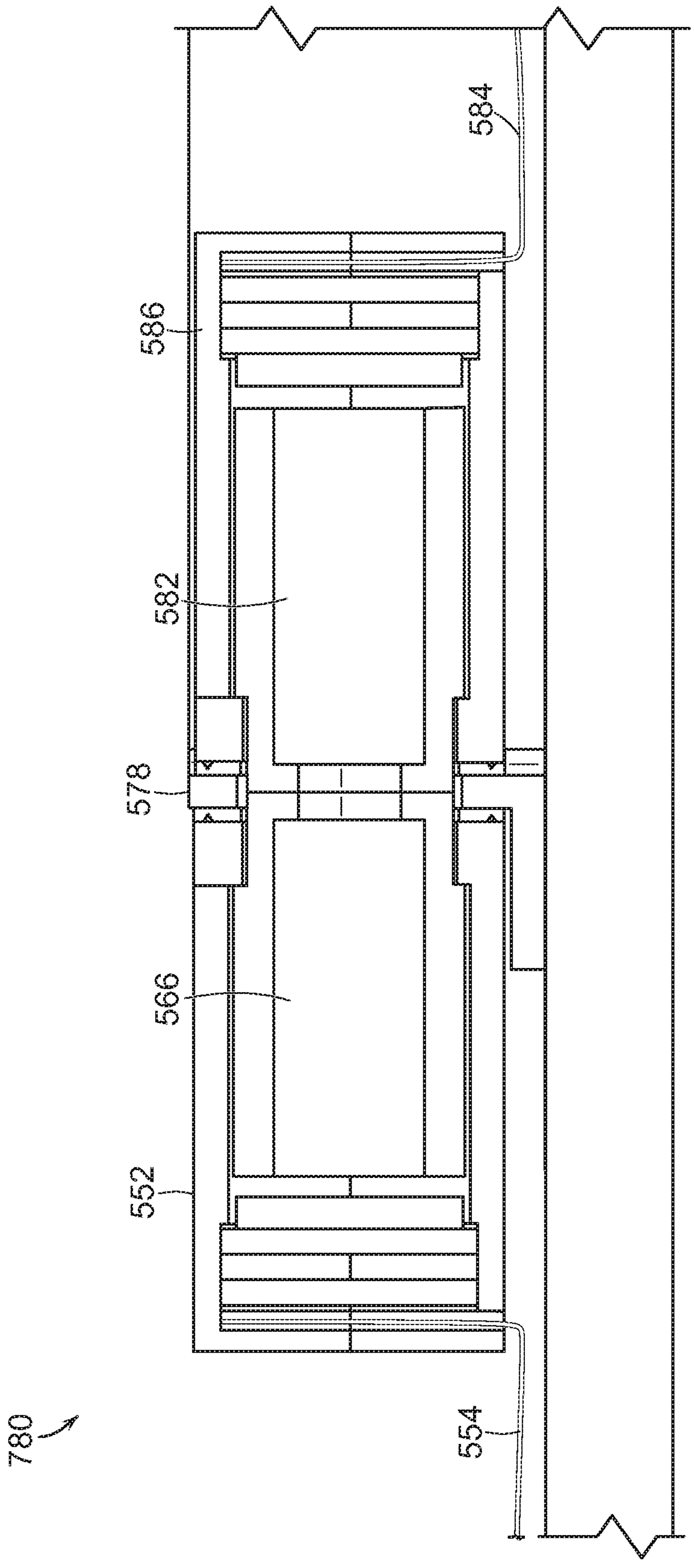

Another embodiment of an optical interconnect solution isolates noisy components on a board. For example high-power components, switches, etc. can be isolated with control signals passed through the shield optically. FIG. 60 shows an electrical-to-electrical opto-isolating feed-through connector 760 that optically couples, for example but not limited, 100 electrical signals through an EMI-barrier wall. This novel EMI shielding connector uses WRI Optical Data Pipe technology to convert the electrical signal to optical signals that are coupled across the metal noise isolating wall 578 shown in FIG. 61. In the connector embodiment 760, electrical signals are brought to/from the connector 552 by electrical wires 554. Position alignment is achieved using mating pins 556 and holes 558, combined with alignment between the wall 578 and connector face 562. The angular spectrum of plane waves is coupled through the wall 578 through an infinite conjugate imager 566 which may include a conductive film for additional EMI shielding, such as but not limited to an ITO coating. A symmetric external connector 552 mates on the other side of the wall 578 and can be fixed with optional screws 576. Other optional screws 564 can be used to make the connectors openable. A cross-sectional view of this EMI shielding connector system 780 is shown in FIG. 62. Here the infinite conjugate imagers 582 and 566 are shown.

Figure 63:
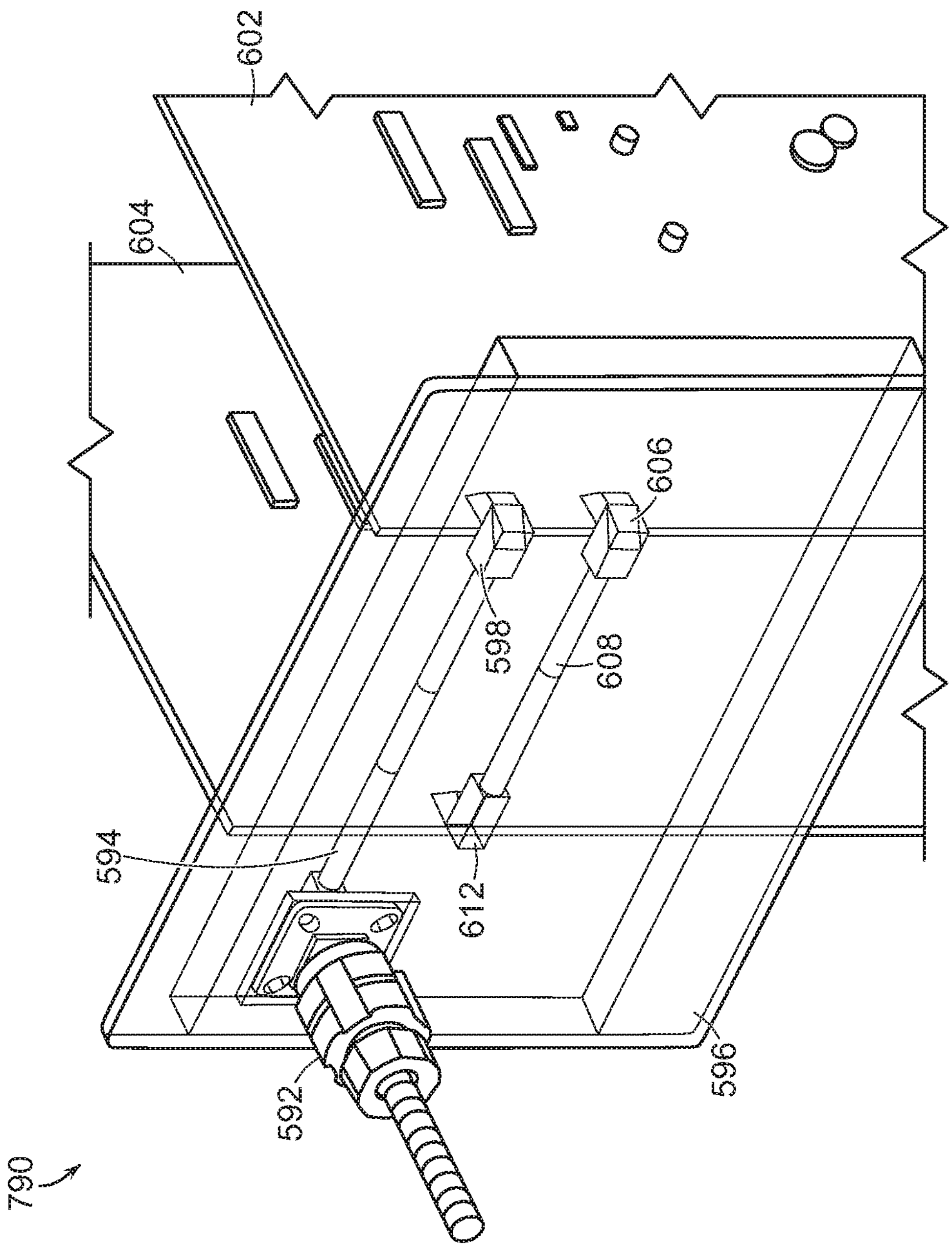
FIGS. 63-71 show embodiments of the UDAT and FABI technologies of these teachings incorporated into structures.

The UDAT and FABI technologies are readily embedded into structures, chassis, box walls, and system walls. In the embodiment 790 shown in FIG. 63, roughly 100 Fibers are interfaced using a UDAT connector 592 to the embedded connector 594 through right angle optical data pipe 598, which can interconnect arrays of fibers to circuit boards 602 and 604 or other fibers or waveguides. The rear panel 596 is shown semi-transparent for clarity. Another embedded interconnect 608 uses right angle optical data pipes 606 and 612 to couple signals directly between circuit board 602 and 604

In an EMI shielded case, the composite walls may be conductive, and the long path inside the conductive conduit can act to attenuate and/or shield EMI and other noise effects.

Figure 64:
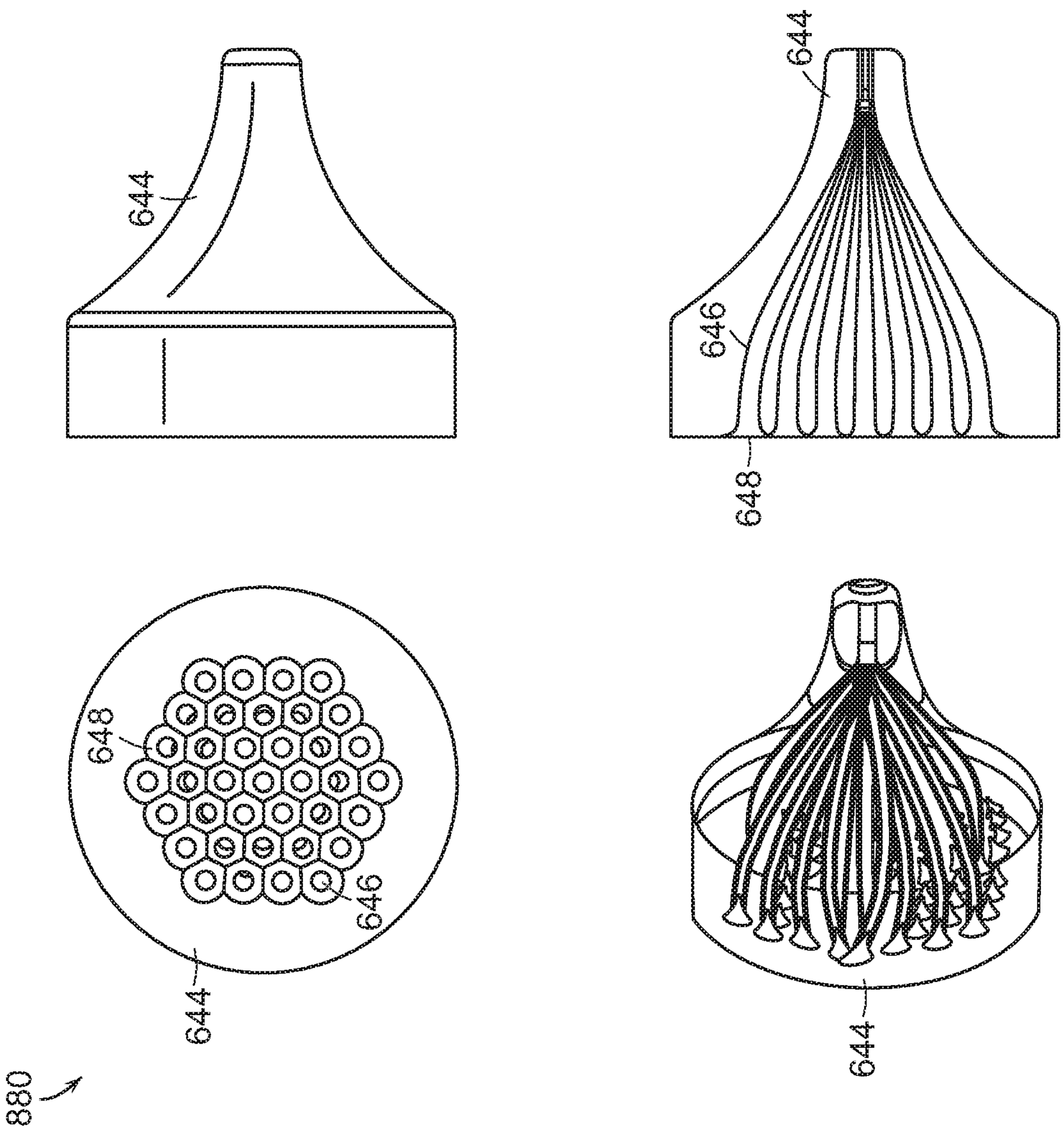

In the course of fabricating an array of fibers such as, but not limited to, the arrays that can be used as the image array 18 and object array 16, in FIG. 1, it is often useful to have specialized tools, processes, or methods for managing fibers and arranging them into the desired array configuration for packing, potting, bonding, forming, damping, or other operations. Such a specialized tool is embodied in the fiber alignment mandrel 880 depicted in FIG. 64*a-d*. FIG. 64*a* shows a front view, FIG. 64*b* shows a section view, FIG. 64*c* displays the side view, and FIG. 64*d* displays a transparent isometric view highlighting the converging internal channels 646. Fibers enter into the large ends of the channels 646, guided in by a chamfer or fillet 648, and travel down the converging and narrowing channels 646 until they emerge from the outlet 644 in a packed configuration or a more-nearly-packed configuration than when they entered the mandrel. If the exiting fibers are in the packed or nearly-packed arrangement, they can then be compressed and fixed together into a permanent array that can then be cut, polished, and mounted and aligned to the imager 12 or 14. In practice, a separate spool of fiber could feed each mandrel port and desired cable lengths could be pulled from the mandrel tip. This technique maintains fibers in identical positions across the cable, which is desired for simple cable interchangeability. Multiple successive mandrels of varying or constant convergence rate could be used if necessary for process considerations such as, but not limited to, restriction of fiber bending due to the minimum bend radius of the fibers, limiting tension in the fibers, reducing friction, reducing wear, intermediate process steps, and allowing more room for tooling.

In a UDAT manufacturing facility, this type of mandrel 880 can be used to directly feed the array formation process. Accordingly the fibers could be potted directly at the end of the mandrel. This mandrel 880 can also be used to form coherent cables with fibers loosely or rigidly arrayed along the length of the cable plant. For example rigid or flexible sleeves, shrink wrap tubing, adhesive lined shrink tubing, or silicone or other adhesives or epoxies could be applied in or near the mandrel tip—or heat fusion can be applied.

Figure 65:
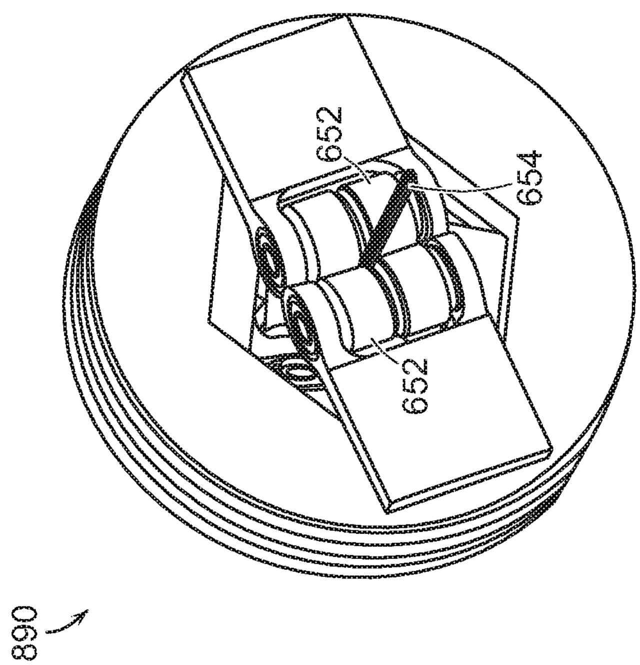
Figure 66:
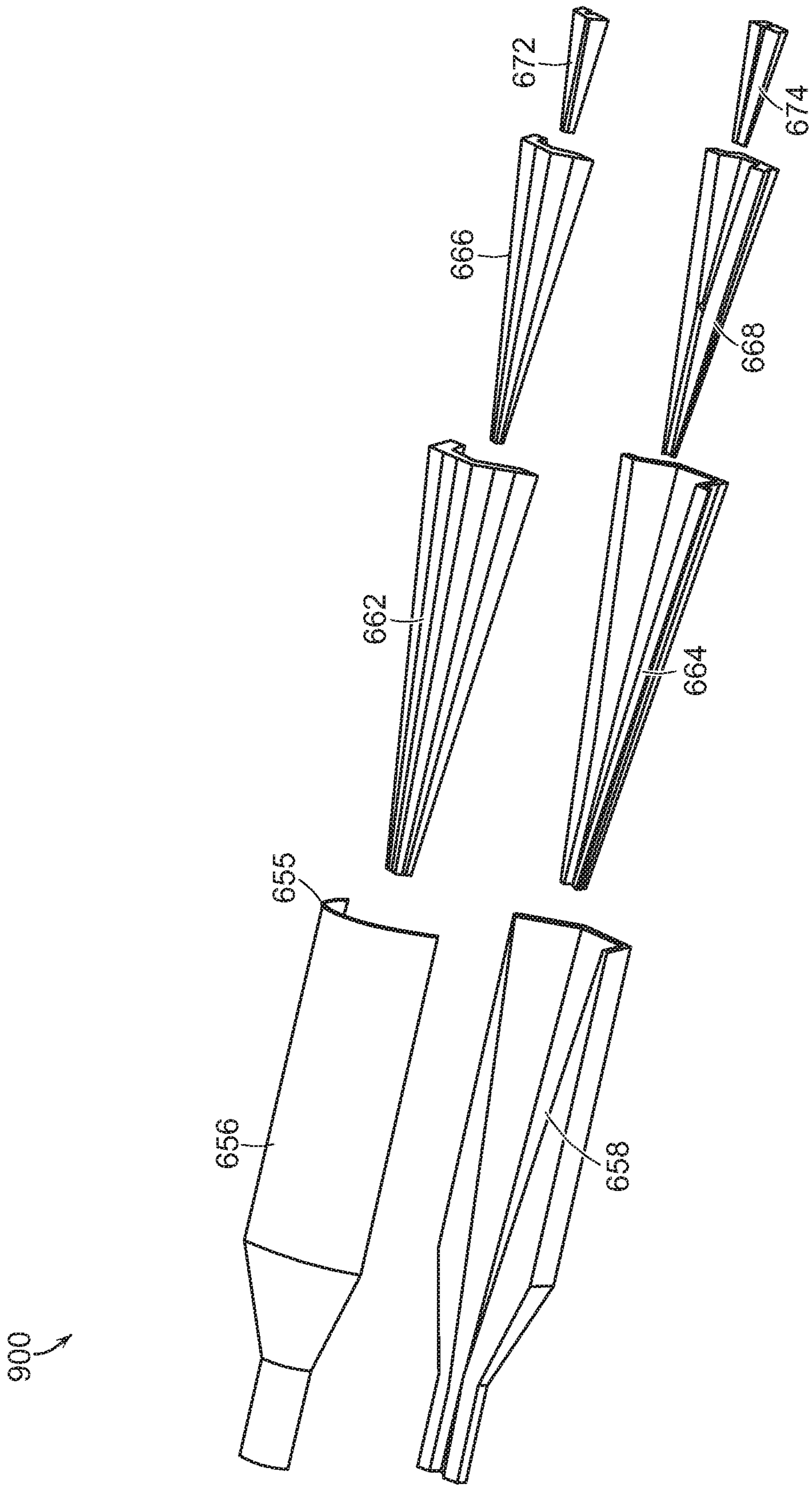

Two other embodiments 890 and 900 for enhancing the manufacturability of UDAT connectors by enhancing manufacturability of assembling the UDAT fiber bundles are depicted in FIG. 65 and FIG. 66, respectively. The first embodiment 890, shown in FIG. 65, involves the use of one or more sets of grooved rollers 652 that direct the fibers 654 into the dense packing configuration for later potting, compressing, fusing, fixing, or other operations. Individual fiber reels would provide fibers which would then be fed into the rollers either by hand or by automated feed. After threading the tool with fibers and arranging the said fibers into the desired array shape, rollers are fixed so as to constrain the shape, and fiber is subsequently fed and/or pulled through the rollers to provide a packed array ready for further operations. Care is taken in design to prevent fibers from getting trapped between the rollers outside of the groove, causing damage to the fibers. In other embodiments, compressive force is applied along the sides of the bundle or cascaded compression stages are used. In the fiber funnel 900, fibers are fed from individual feed reels into the wide end 655 of the tool and then drawn in a more closely arranged array from the narrow end 657. This is a very manufacturable version of the alignment mandrel described earlier. Each component provides a machinable piece that when assembled will funnel all of the fibers into the final UDAT configuration. The pieces shown in FIG. 66 form clamshells and nest together, such that the outer parts 656 and 658 form a shell into which the next to outermost parts 662 and 664 form another shell and nest, into which the next to innermost parts 666 and 668 form a shell and nest, and finally into which the two innermost parts 672 and 674 nest. While only 4 stages of nesting are shown, this could be performed with any number of nests or parts within a nest necessary to create a tool to funnel the fibers into the desired array.

Figure 67:
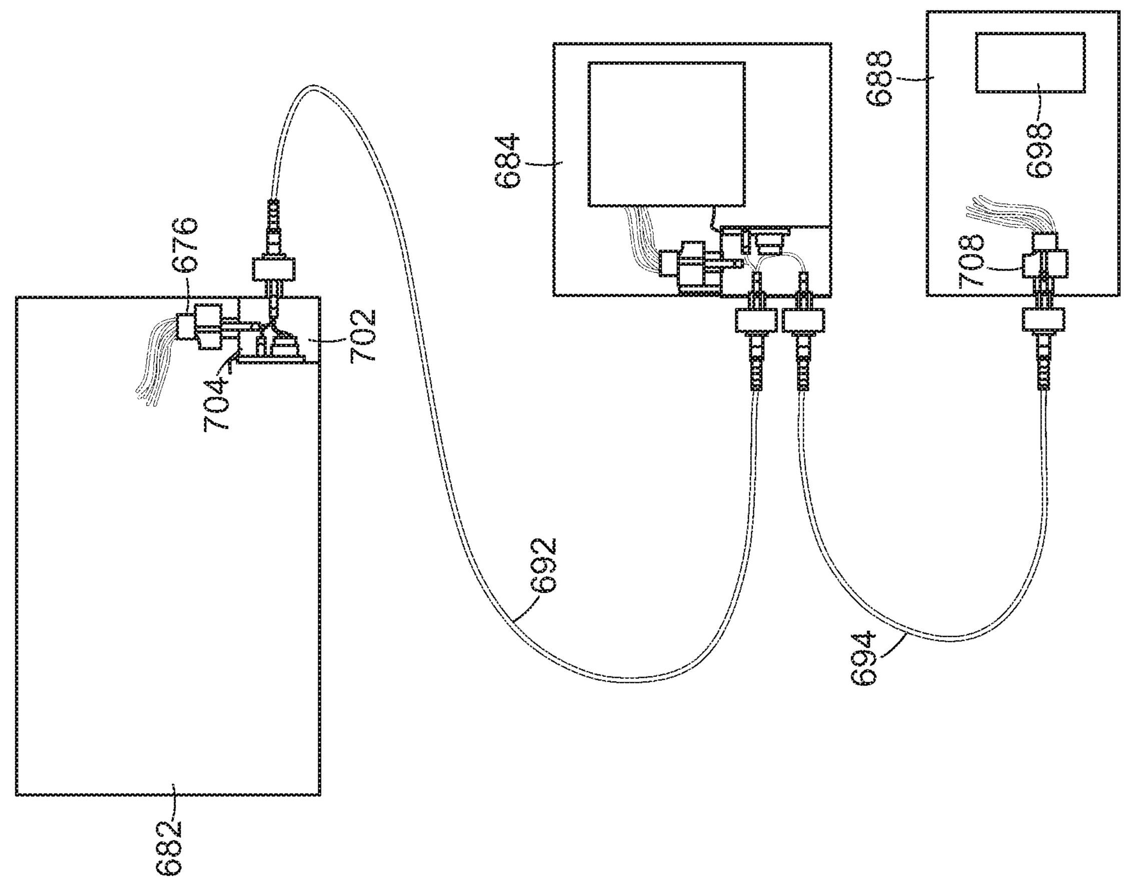

One embodiment 910 of the application of cabled optical signal routing using UDAT or similar connectors is in the architecture as illustrated in FIG. 67. The Actuator Control Box (ACB) 682 produces optical control signals (which may be high power) and in general both emits and receives low power optical sensor and control signals from the Actuator Interface or the sensors located on the actuator itself. These signals must be coupled to the Actuator Interface Box (AIB) 684 and many of them ultimately to the Actuator sensors 698. The ACB 682 is typically centrally located, with potentially long fiber connection to the AIB 684 and actuators 688. This long reach may require multiple bulkhead penetrations which creates the need for large coupling efficiencies in the fiber connector technology. The UDAT/FABI Flexible Interface embodiment will allow a single compact UDAT cable to interface between the ACB, the AIB, and the actuators while providing flexibility for essentially any anticipated sensor or control technology. This flexibility includes digital data, analog sensor data, or high power control streams with full size, weight, power, and reliability advantages of the underlying dense interconnect technology preserved.

Figure 68:
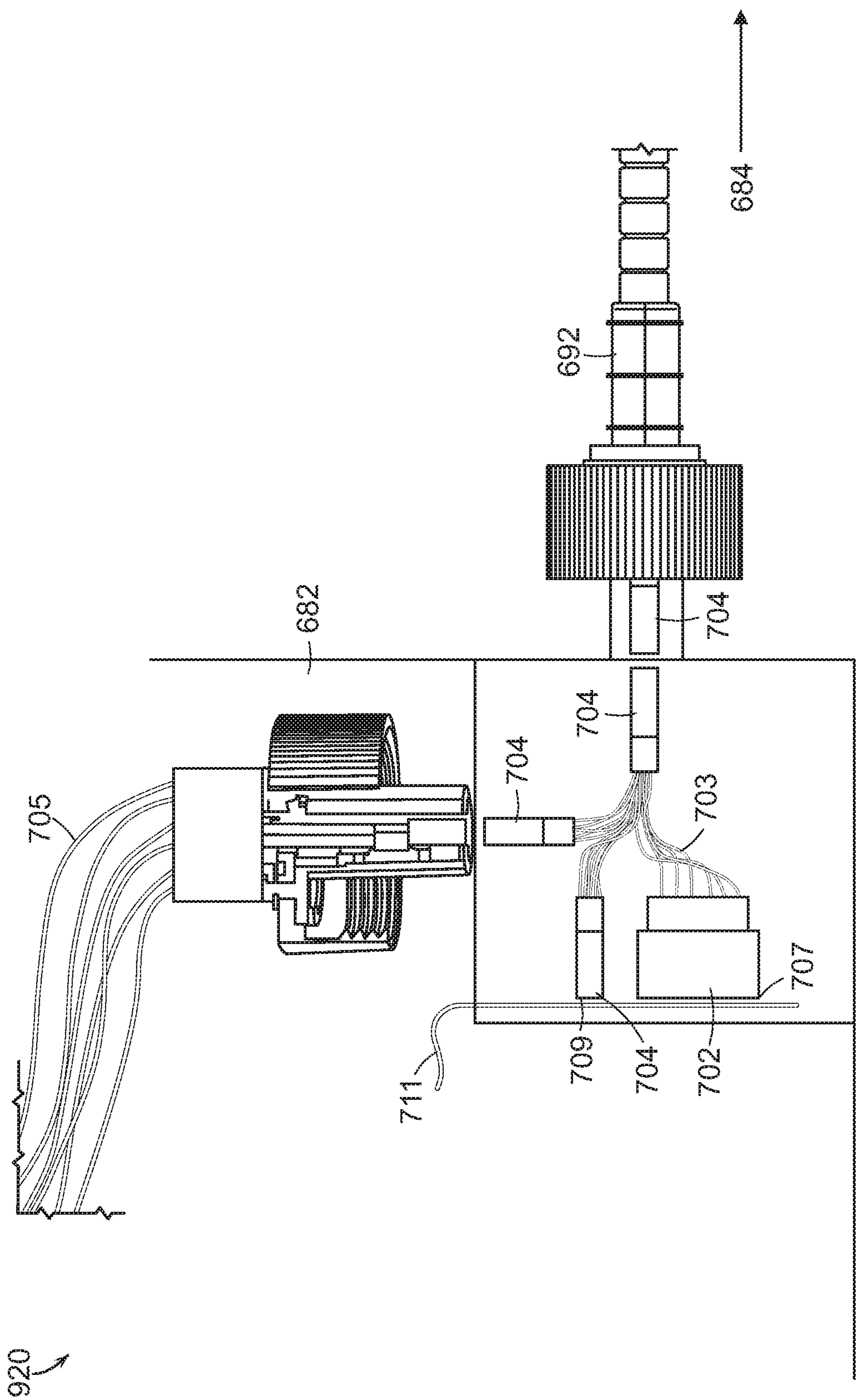

The WRI UDAT/FABI Flexible Interface is shown in the ACB in FIG. 68. This interface provides for a wide flexibility in fly-by-light architectures.

Figure 69:
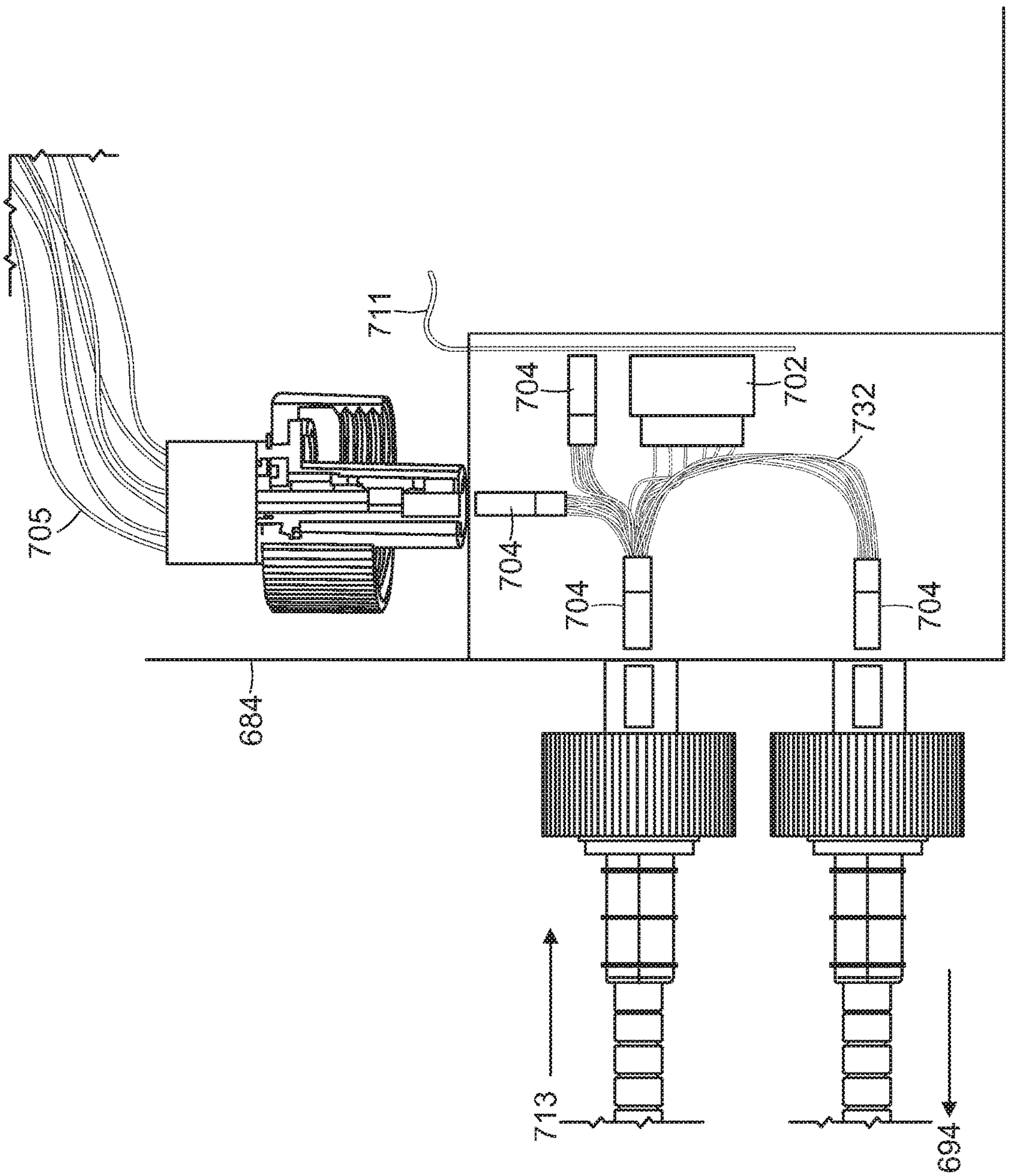
Figure 70:
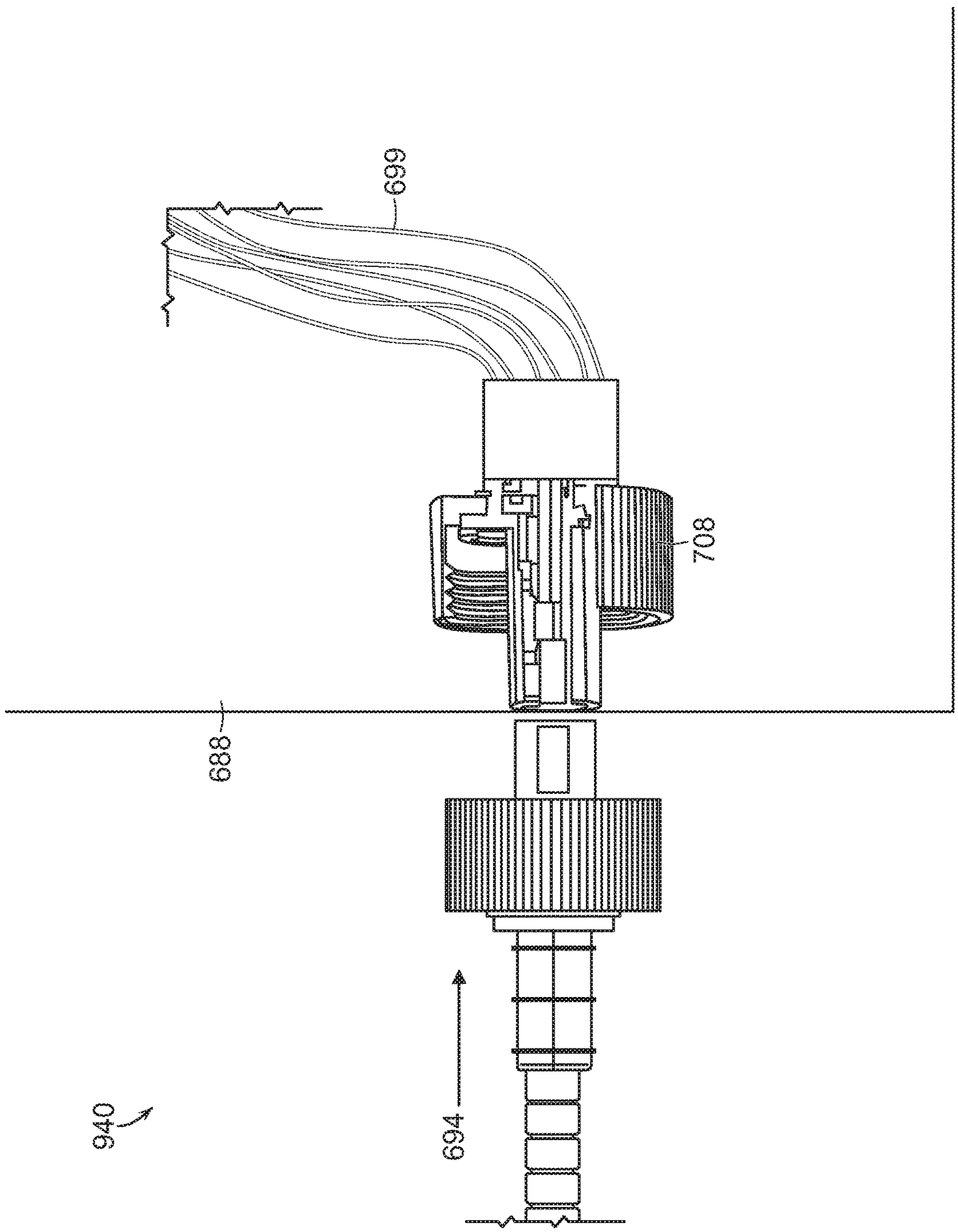

In the UDAT/FABI Flexible Interface 920 of FIG. 68, infinite conjugate imagers 704 are used together with individually routed fibers 703 to accommodate a wide variety of possible interconnect requirements. Fiber pigtailed breakouts 705 are available for interface to individual high power laser sources. Alternatively, the High Power FABI (described later) 707 can be used to couple an array of high power lasers (e.g., diode lasers) into a coarsely spaced UDAT fiber array 702. Low power digital data signals can be sent or received from the bi-directional FABI interface (Low Power FABI) 709 with input and output signals coupled through an electronic flex connector 711 or directly to a board/backplane. All these signals are coupled with low-loss and -crosstalk through a single UDAT cable 692 from the ACB 682 to the AIB 684. In FIG. 68 and subsequent figures the external connectors are illustrated without internal and mating bulkhead non-optical connector components for clarity. The low power and high power FABIs shown can be mounted on a common printed circuit board or other substrate, and depending on the sensor and control technologies used, not all of these interfaces need to be used—the variety was shown to illustrate flexibility and in practice only those interface components that are needed would be included. The UDAT/FABI Flexible Interface is shown in FIG. 69 in the context of the AIB 684. In other applications, the AIB 684 could be any electronics enclosure or intermediate or terminal destination for optical fibers and associated signals and power. Here an additional feedthrough feature 732 is added so that selected signals from an incoming cable 713 or originating in the AIB 684 can be routed directly to a UDAT or other cable 694 leading to the actuator or elsewhere. Provisions are still made for a high-power signal interface 707 just as was described in FIG. 68. The low-power signal interface 709 depicted here is also the same as that in FIG. 68. Dichroic reflectors and filters can be used to effectively reduce the crosstalk between high and low power channels to very low levels (e.g., −60 to −90 dB) if required by the system. These techniques are described below. In principle, the AIB may be eliminated or incorporated directly in the actuators. In this case a single UDAT connection to a UDAT/FABI Flexible Interface is required. Assuming the model shown in FIG. 67, the UDAT connector can be used to provide rugged small-footprint connection to the optical sensors 698 in the actuator 688. FIG. 70 illustrates a system 940 where a compact pigtail connector 708 (shown figuratively inside the actuator) can be used to provide pigtail interconnection 699 to individual sensors 698 or other devices. The box interface system 930 is contained within the dashed rectangle. Since there are not a large number of sensor fibers in avionics actuator control, this transition to pigtails should be possible in a compact form, in general.

Figure 71:
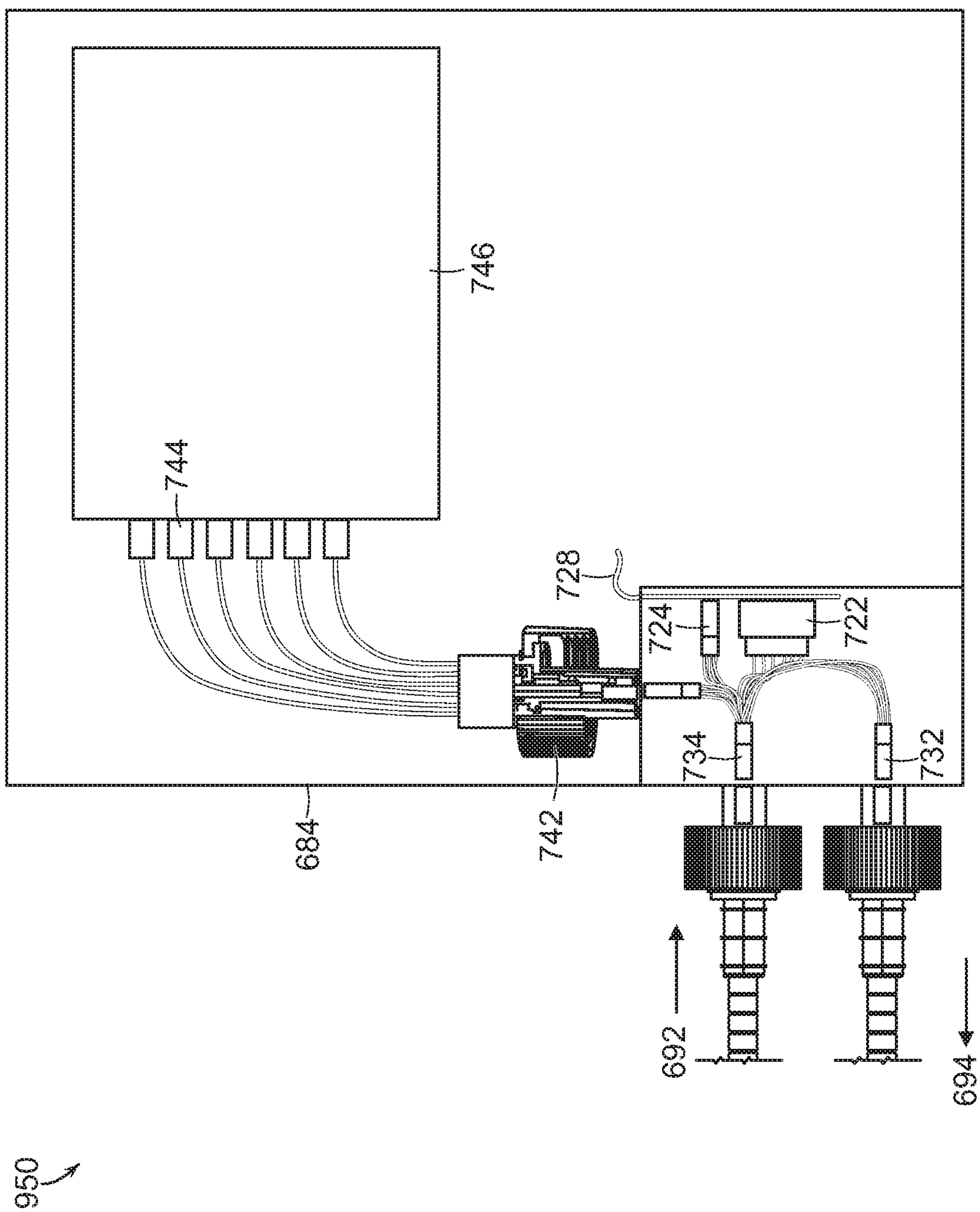
Figure 72:
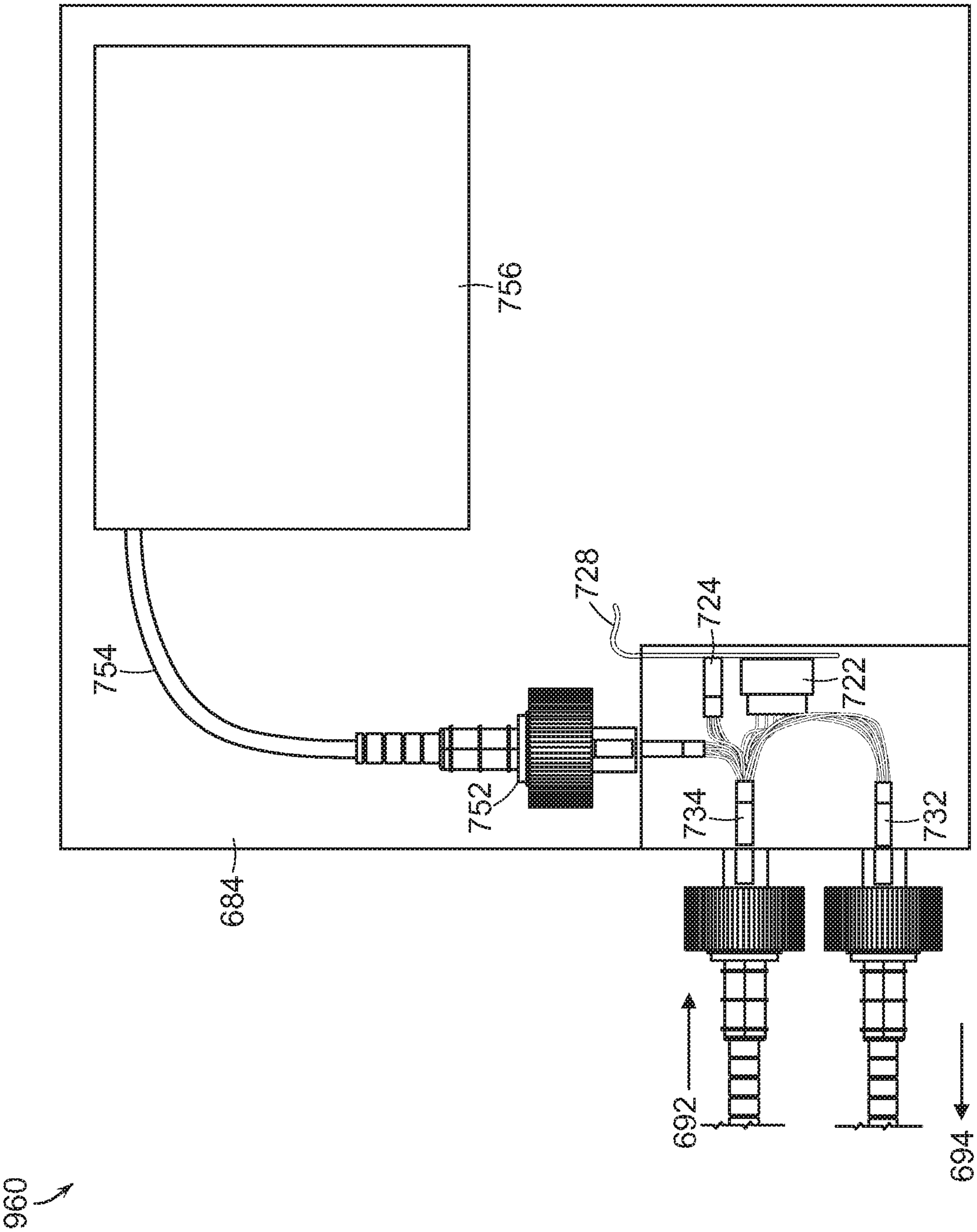
FIGS. 72-74 show embodiments of fiber array management toolings used in these teachings.
Figure 73:
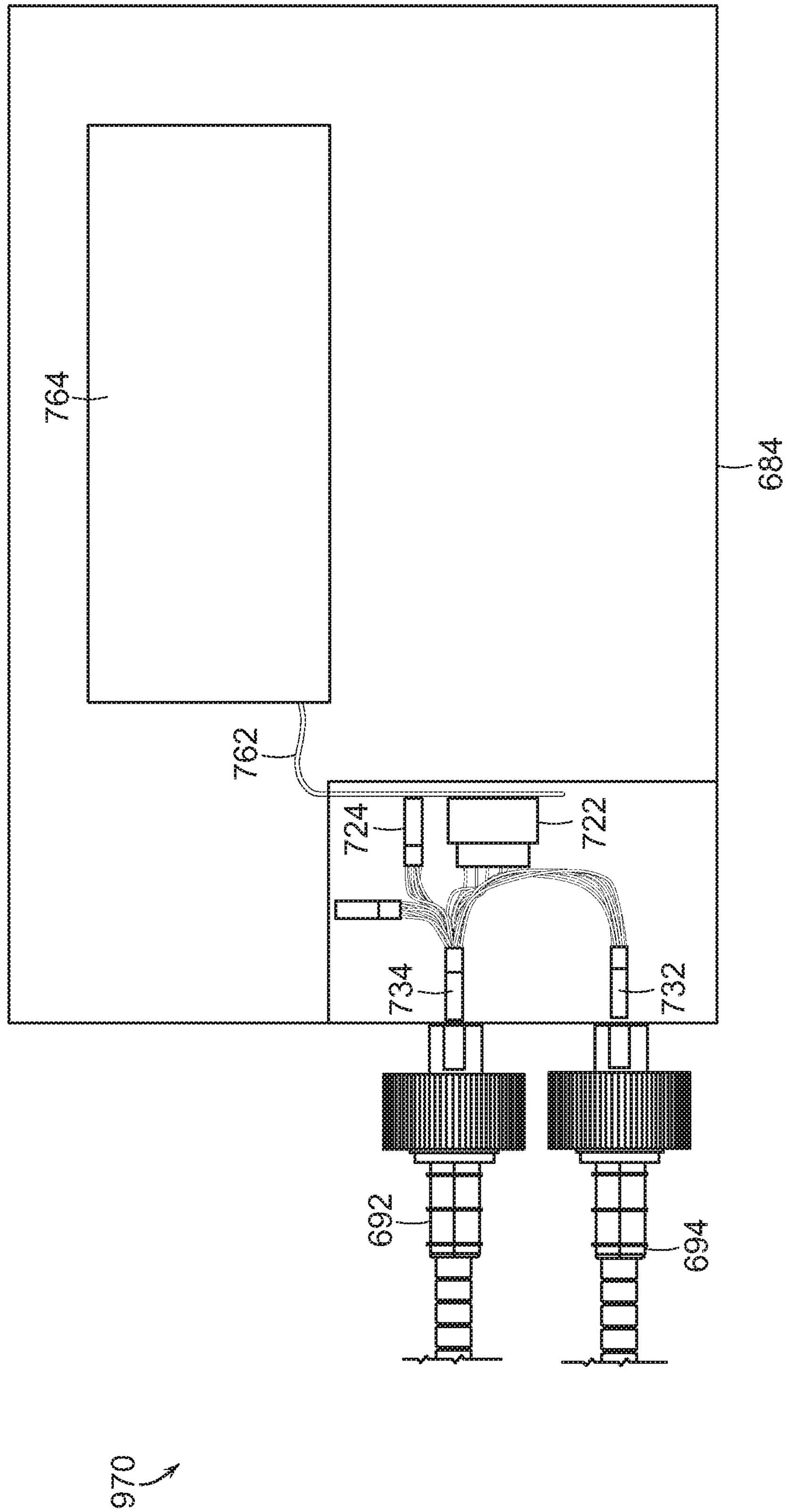

Connections and interfacing of components internal to the AIB 684 are illustrated in FIG. 71-73. The embodiment 950 in FIG. 71 illustrates a UDAT connector 742 broken out to individual fibers 705 discretely connected 744 to an electronic/optical switch 746. FIG. 72 illustrates a similar embodiment 960 wherein the UDAT connector 752 is followed by a cable of fibers 754 that enters into an electrical/optical switch 756, FIG. 73 illustrates an electrical module 764 connected to the box interface system 930 by a flex cable 711.

Figure 74:
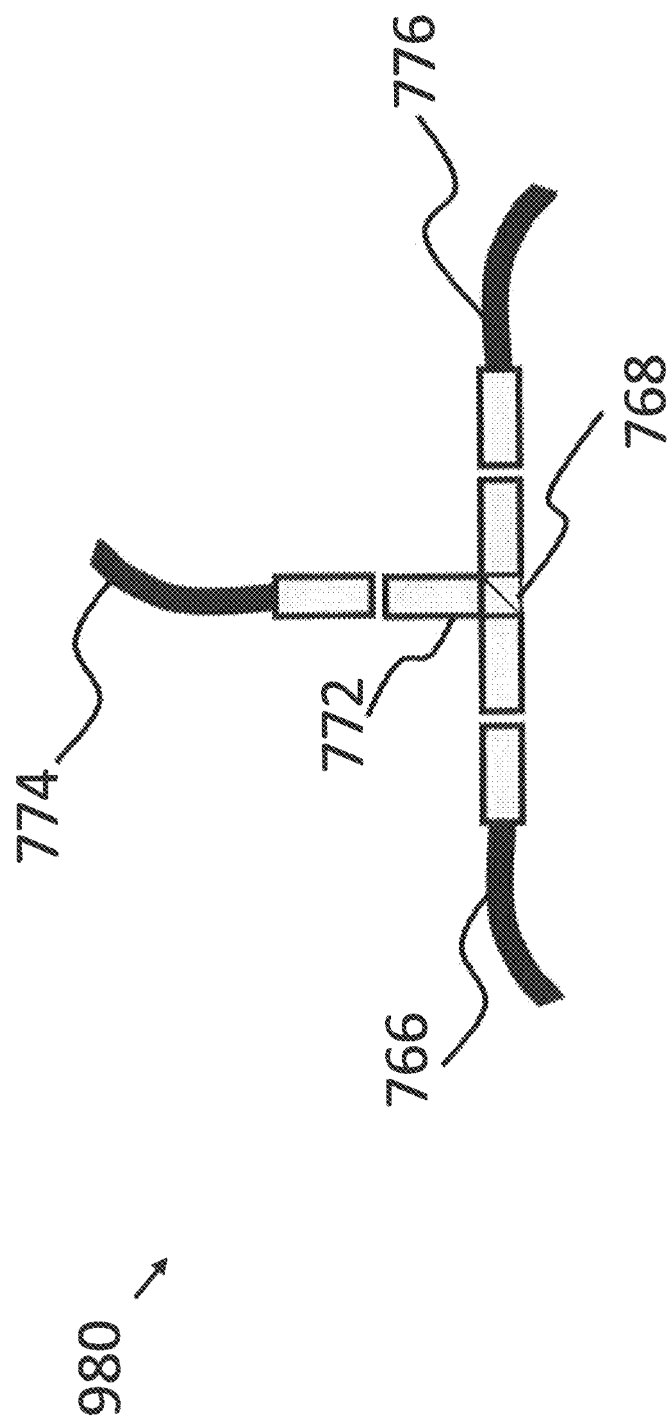
Figure 75:
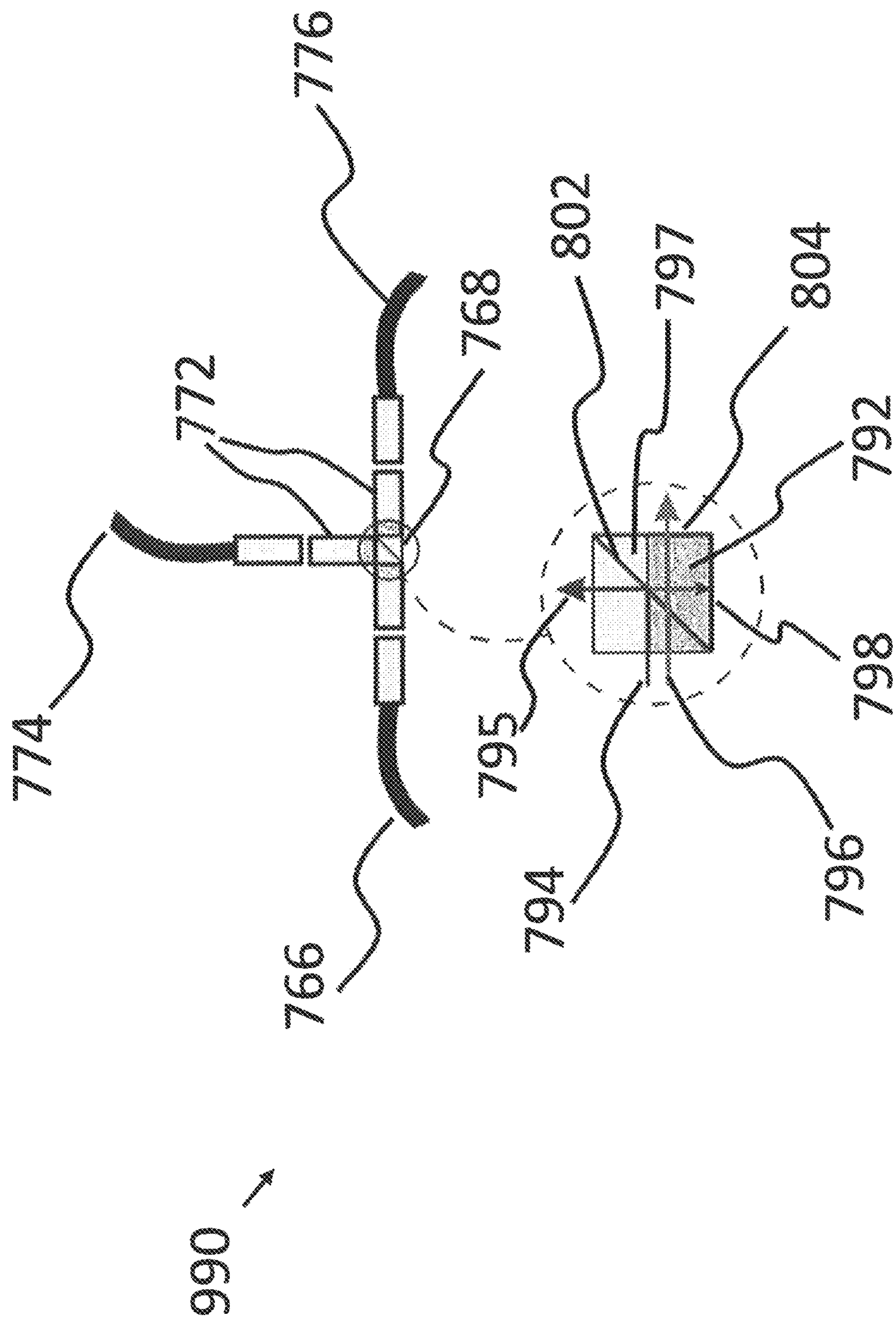
FIGS. 75-81 illustrate embodiments of cabled optical signal routing used in these teachings.

An embodiment 980 for a breakout in the UDAT/FABI Flexible Interface is shown in FIG. 74, and may be preferred in some applications. Here the infinite conjugate imagers 772 are used to image the optical channels on a half-silvered, dichroic, and/or patterned reflector or beamsplitter 768. This allows for selected channels to be diverted or fanned-out to more than one path. This is similar to the optical routing in the T-breakout 730 shown in FIG. 56 except for the introduction of substantially infinite conjugate relay imagers 772. A detailed illustration of this device is shown in FIG. 75. Three UDAT cables 766, 774, and 776 connect to the breakout. For example, a spatially half reflective coating (boundary coming in-and-out of the page as shown) in the beamsplitter 768 interface can divert half of the channels to the upper branch. The beamsplitter could divert more or fewer channels, as desired.

In one embodiment of the UDAT breakout 980, the breakout could be used as a High Power/Low Power splitting flexible interface to, for example, be used to separate the high power signals from the sensor signals in the AIB, as shown in FIG. 75. The wavelengths of the high power and low power signals are separated by tens of nanometers or more to allow for dichroic reflector filtering. Consider the high power input represented by ray A 794. The dichroic reflector 802 reflects this light with greater than 99% efficiency, resulting in reflected ray B 795. The weak transmitted signal C 797 is further reflected by the dichroic crosstalk suppressor 804 and this light is reflected once more from the dichroic reflector in ray D 799 and absorbed at the absorbing coating 798. Low power signals, represented by ray E 796, are transmitted. Roughly an additional 40 dB of crosstalk suppression is obtained after all this filtering because the fibers that the crosstalk is coupled to are not fed thru. Extremely large crosstalk suppression levels, for example of 100 dB or greater, can be achieved by the inherent crosstalk suppression of the UDAT connectors augmented by one or more dichroic crosstalk suppression stages 804. In the configuration shown, the high power signals are all diverted to one high-power UDAT branch 774, while the low power signals are filtered and transmitted to the sensor UDAT branch 776.

Figure 76:
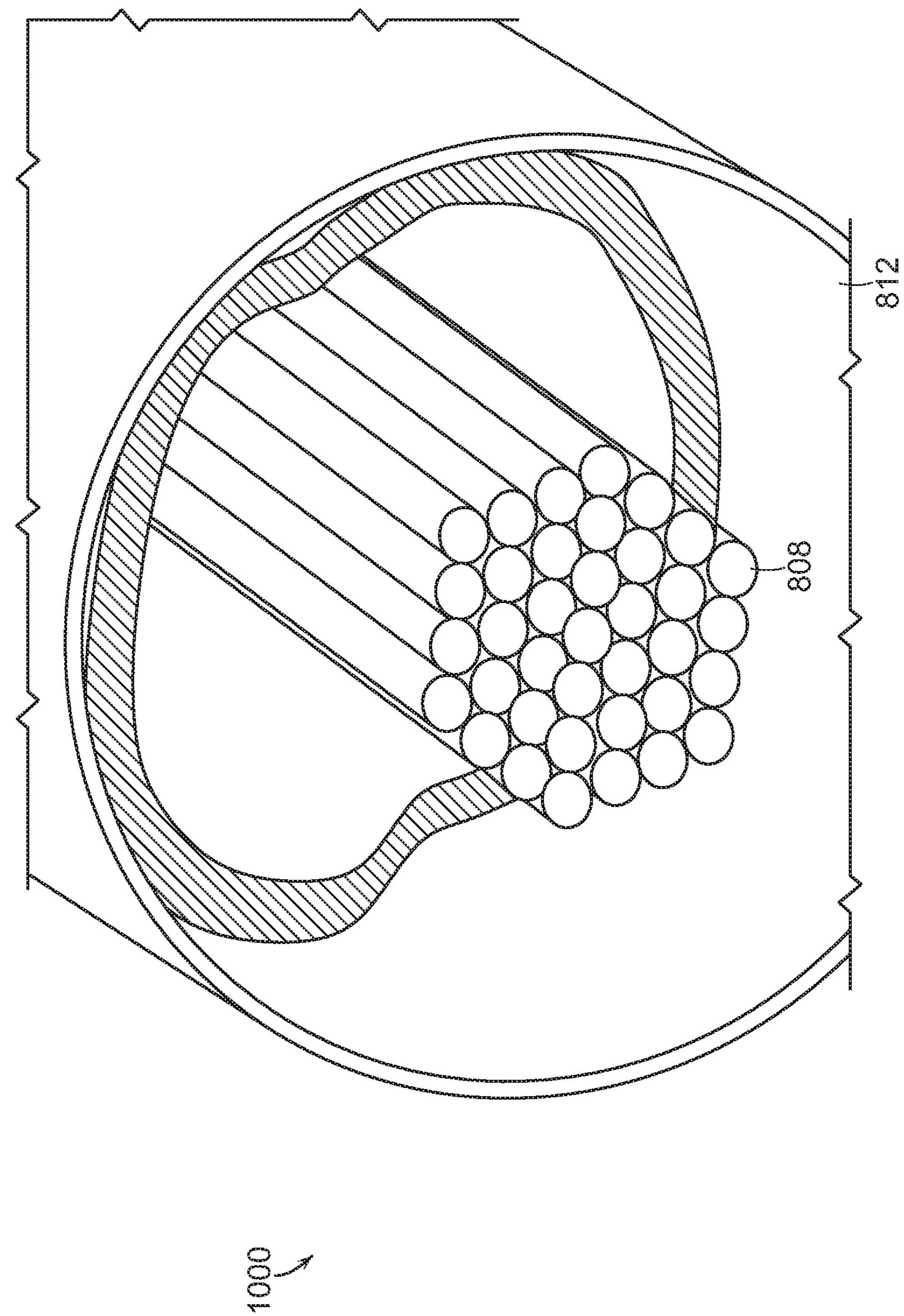

An embodiment of the UDAT array 1000 of fibers 808 potted in epoxy 812 is illustrated in FIG. 76. While this works effectively and is relatively inexpensive, it may not be suitable in some environments.

Figure 77:
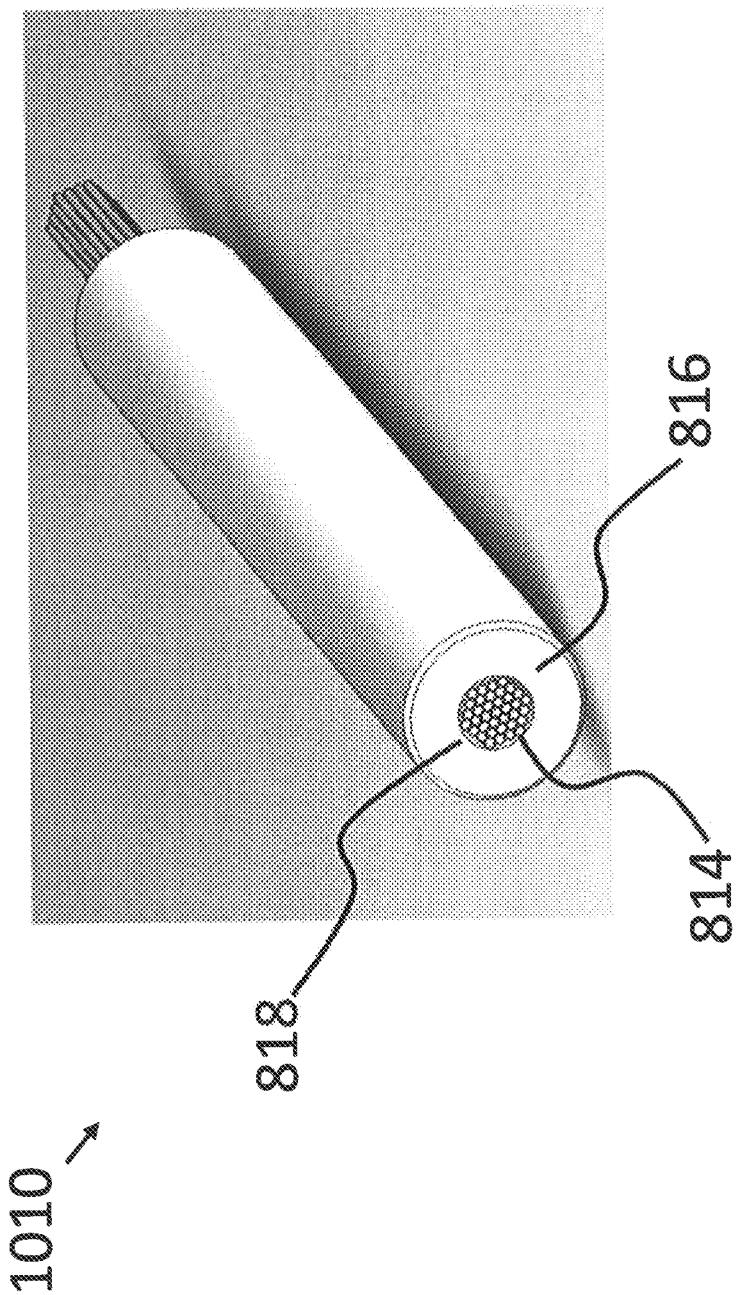

Another embodiment 1010, useful for extreme-temperature operation is given by replacing the epoxy plug with a ceramic ferrule 816, as shown in FIG. 77. The fibers are fixed in the ferrule by some means 814, including, but not limited to, solder glass and fusing. The ferrule inside 818 shape can be circular, hexagonal, or any other shape that facilitates manufacture or improves the performance of the UDAT system. The ferrule also may be other materials, including, but not limited to, metals, glasses, ceramics, and plastics.

Figure 78:
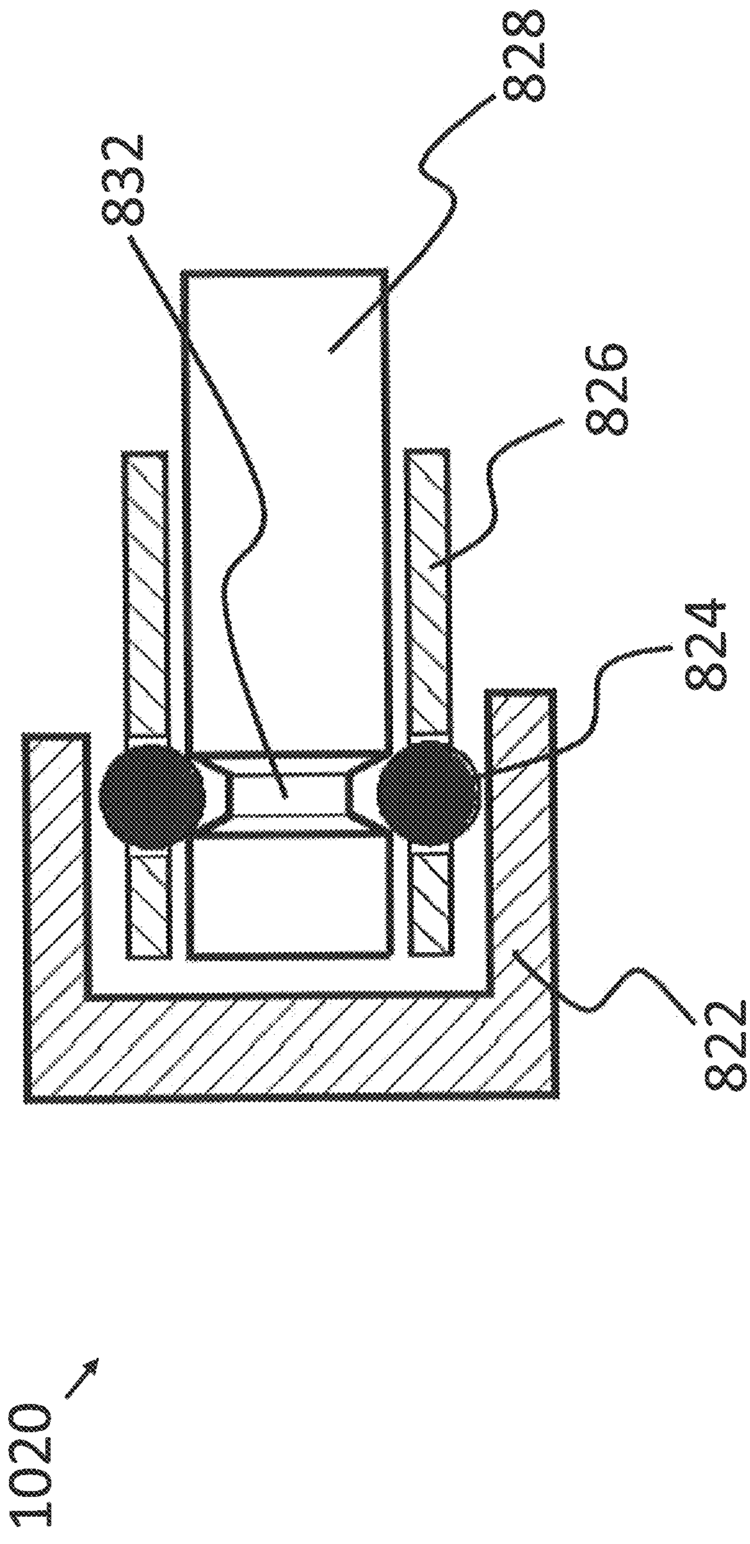

Often when connecting any two or more optical connectors, it is necessary to have an external packaging or mechanical connector. One embodiment of a mechanical quick-disconnect connector for an optical interconnect, utilizes a ball and groove latch/lock method. In one embodiment 1020, ball bearings 824 are held captive in the female sheath 826, and lock the male plug extension 828 in place by protruding into the V-groove 832 as illustrated schematically in FIG. 78. When the outer barrel 822 is retracted (by pulling on the female connector) the ball bearings float and allow removal of the male plug. The female sheath 826 is fixed in this schematic and the balls are captive and prevented from falling out. Other quick-disconnect embodiments include, but are not limited to, bayonet-style connectors and push-pull type connectors.

Another embodiment for UDAT connector packaging is the side-lock gate latch mechanism 1030. A diagram showing a rough cross-section of the mechanism in these connectors is given in FIG. 79.

Figure 79:
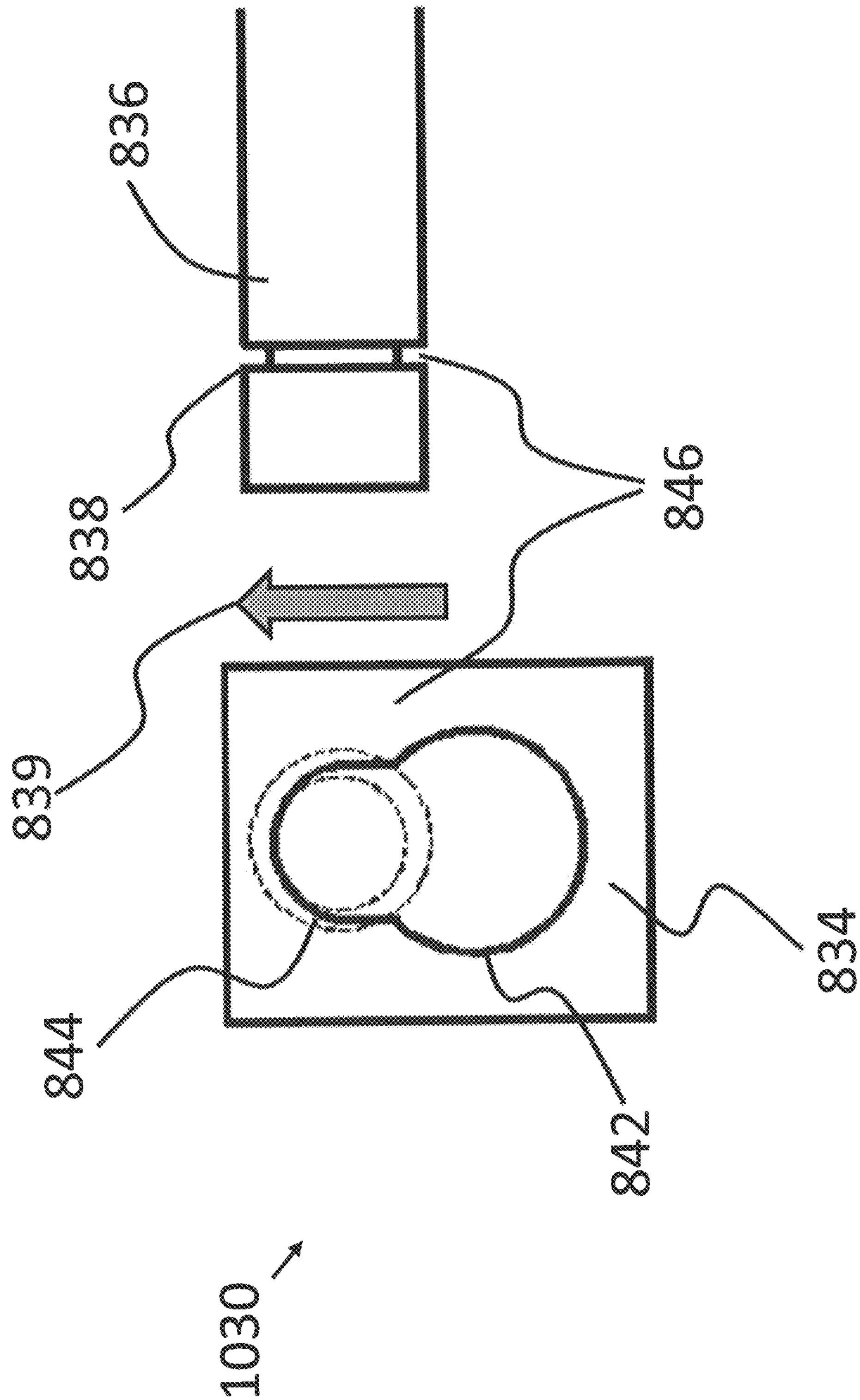

The side-lock gate mechanism 1030 consists of a slot 844 that constricts removal of the plug when in the relaxed position. FIG. 79 illustrates the slide gate 834 that slides down into the groove 838 in the male plug extension 836, locking it in place. When the slide gate 834 is retracted 839 (by pushing on the gate 834, shown in FIG. 79) the larger diameter slide gate hole 842 allows removal of the male connector.

Another embodiment for UDAT connector packaging is the Luer lock connector 1040. This is a mechanism used to connect hypodermic needles to syringes in medical applications. Industrial labs use this style coupling as well for fluid lines.

Figure 80:
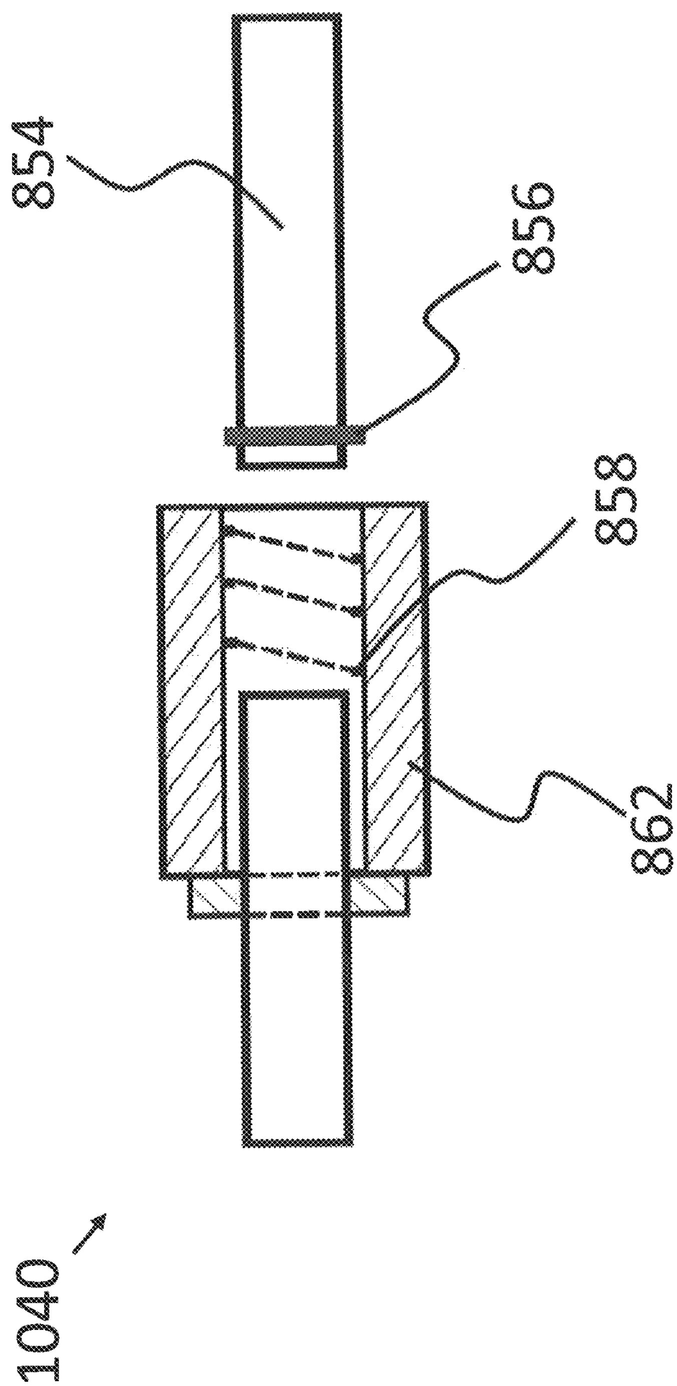

The Luer lock mechanism is illustrated in the diagram of FIG. 80. The two external housings 854 and 862 engage by means of a tapered coarse thread 858 and a lip 856, making a tight seal.

Figure 81:
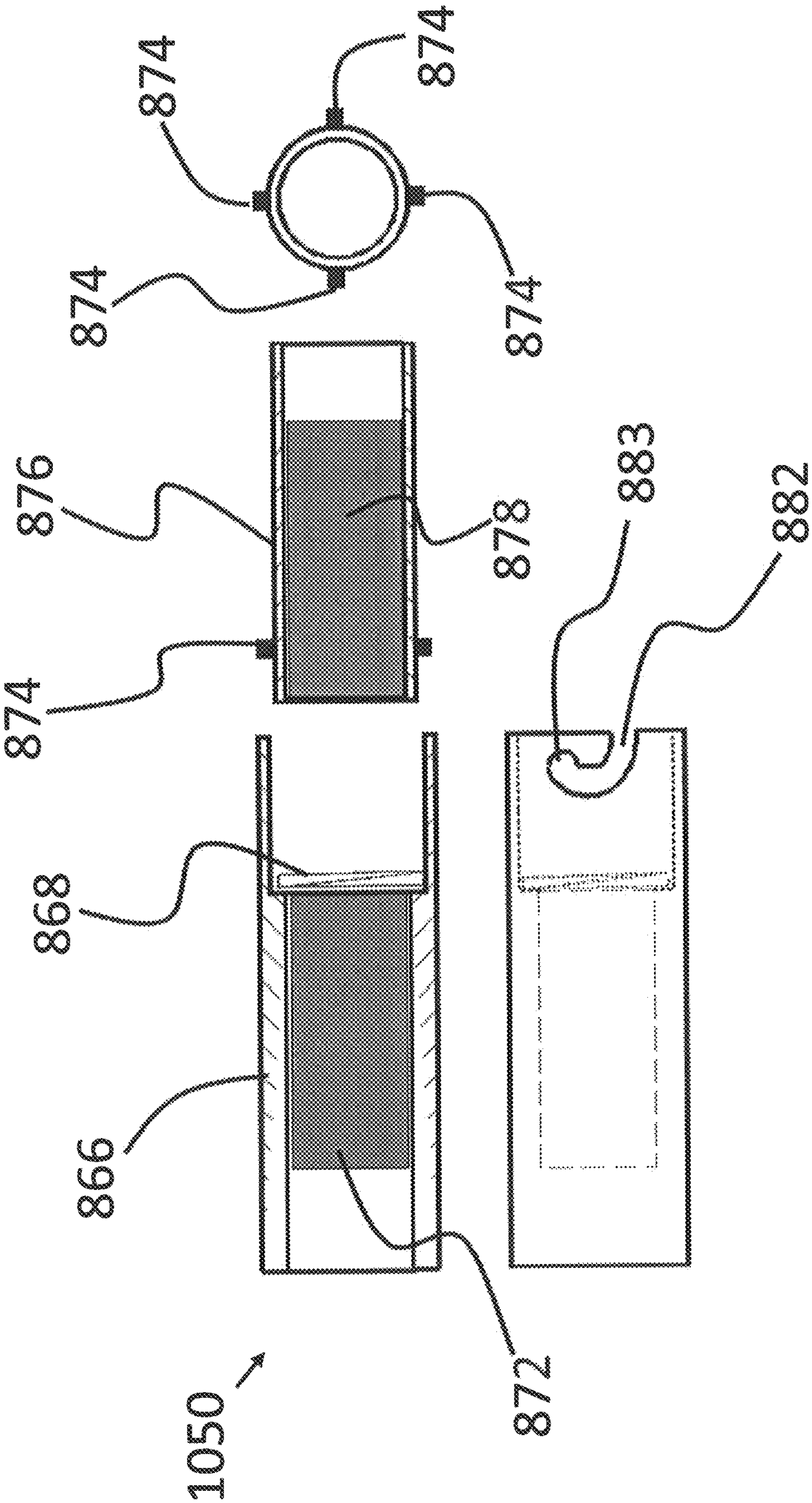

Yet another embodiment of UDAT connector packaging is the bayonet-style connector. A schematic representation of one type of bayonet-style connector 1050 for the UDAT connector is illustrated in FIG. 81. The external housings 876 and 866 contain the lenses 872 and 878 and associated components. The bayonet-style connector 1050 operates by having, in one instance, nubs or tabs 874 that are inserted into slots 882 or grooves. As the second external housing 876 is engaging the first external housing 866, a spring 868, or some other member such as a magnet or elastomer, resists further insertion, providing an axially separating force. The groove or slot now is oriented in a substantially circumferential direction such that the second housing must be turned in the circumferential direction for the tabs 874 to follow the slots 882. The slot 882 or groove terminates in a detent 883 such that the spring or other force latches the two housings in place. In general, the slot may be any shape that allows insertion of the tabs and terminates in a detent 883. There may be 1 or more tabs 874 and corresponding slots 882 or grooves. This style of connection is advantageous in that it allows quick connection and disconnection and various configurations of tabs and slots, such as various numbers, spacings, shapes, and sizes allows for keying. The external housings 866 and 878 need not be male and female—they may be hermaphroditic or male and female with grooves, slots, and tabs on either housing.

Figure 82:
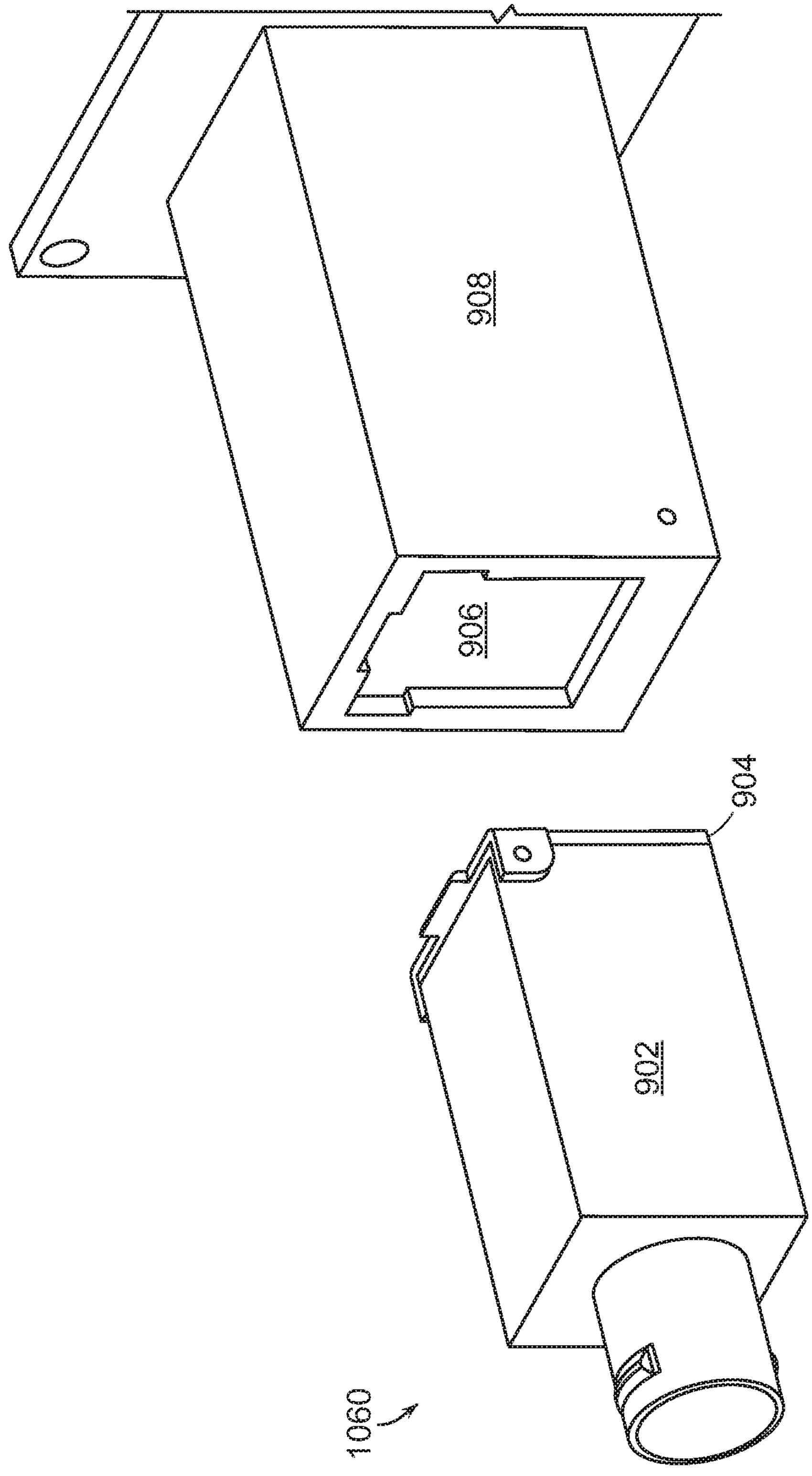
FIGS. 82-83 show embodiments of fanout and breakout configurations for the UDAT technology of these teachings.
Figure 83:
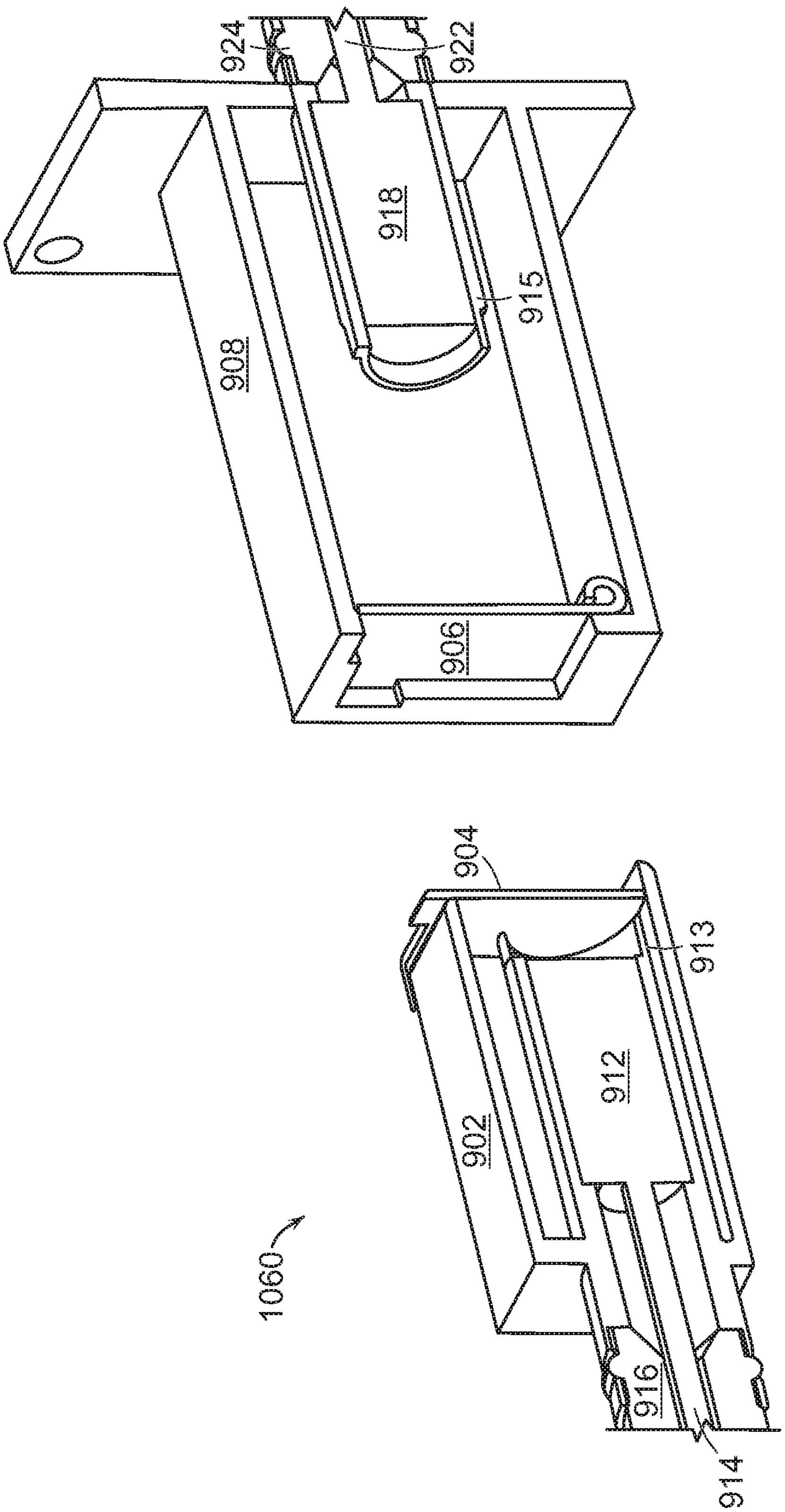

Embodiments of self-sealing connectors are shown in the sequence from FIG. 82 through FIG. 89. FIG. 82 displays an embodiment of the sealed-door UDAT packaging 1060 with the mating external housings 902 and 908 with sealing doors 904 and 906 to protect the optical components from dust and other contaminants. FIG. 83 shows a cutaway view, including strain relief boots 916 and 924, imagers 912 and 918, fiber arrays 914 and 922, and alignment housings 913 and 915. The doors 904 and 906 are spring loaded to maintain a seal so that the imagers 912 and 918 are protected from contaminants. When the external housings 902 and 908 engage the doors are pushed open and the alignment housings mate.

Figure 84:
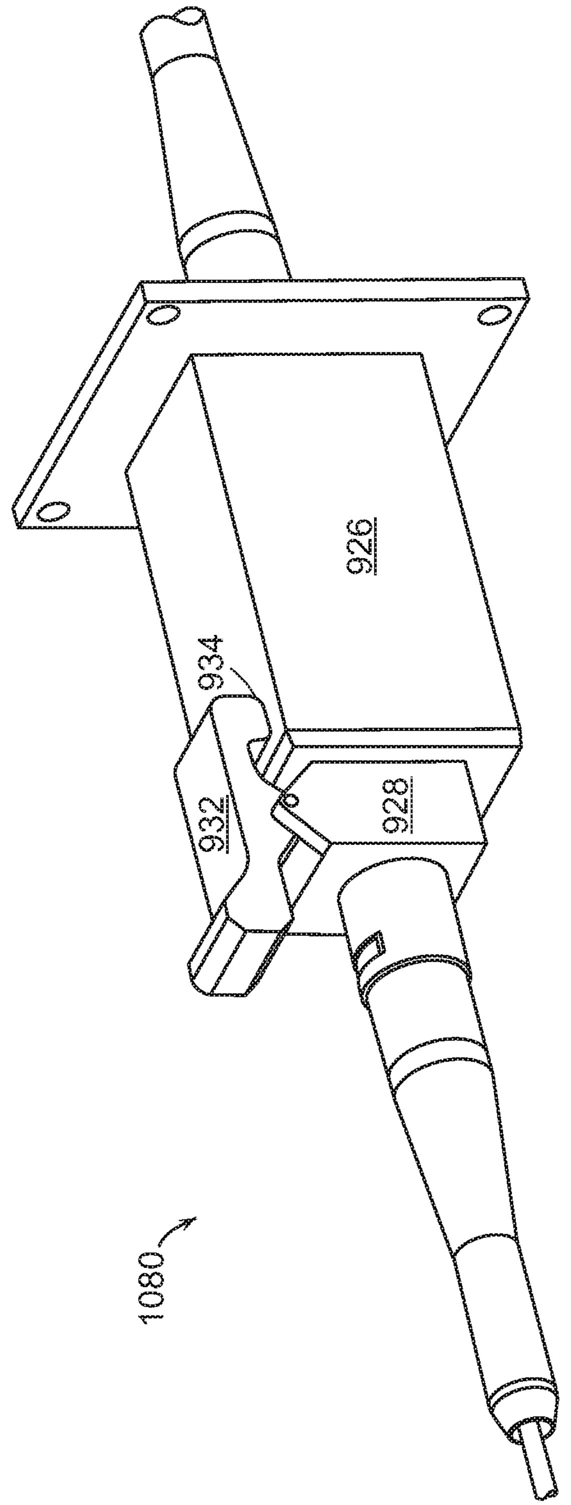
FIGS. 84-85 show embodiments of the UDAT fiber arrays of these teachings.
Figure 85:
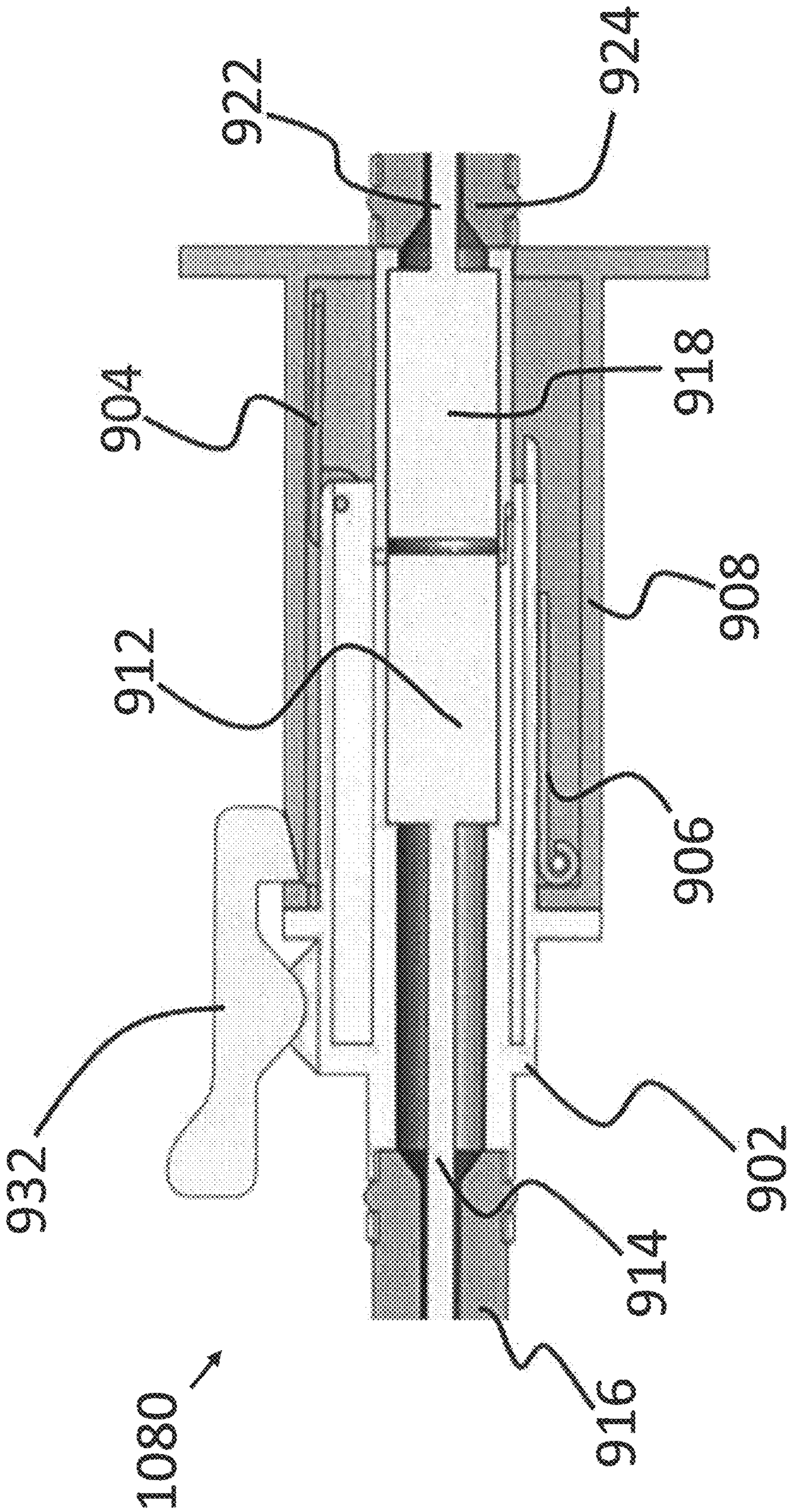

FIG. 84 and FIG. 85 show an embodiment of a similarly-doored connector 1080, but this time with a spring-actuated (spring not shown) latch 932 engaging a catch 934 to hold housings 928 and 926 together and allow for easy disconnection. The latch 932 can also be a flexure and can latch from the outside (as shown) or from the inside.

Figure 86:
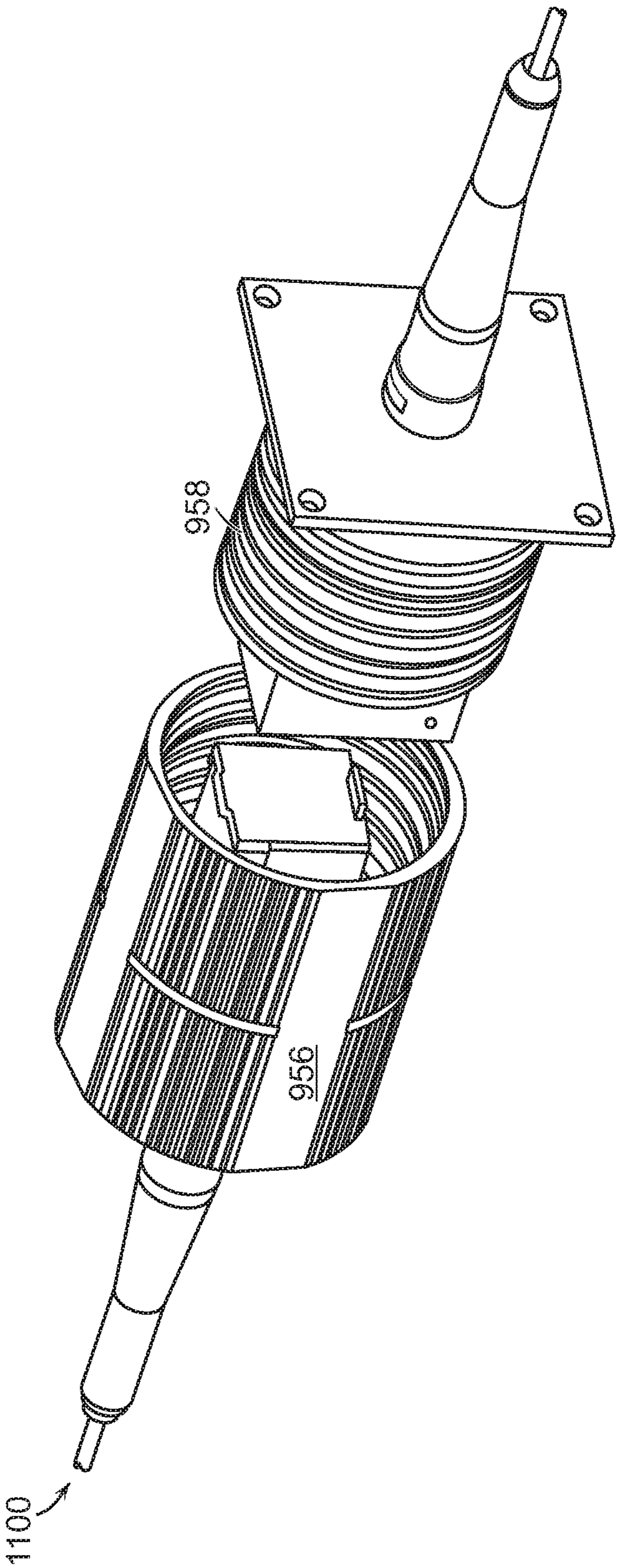
FIGS. 86-89 show embodiments of quick-disconnect connectors of these teachings.
Figure 87:
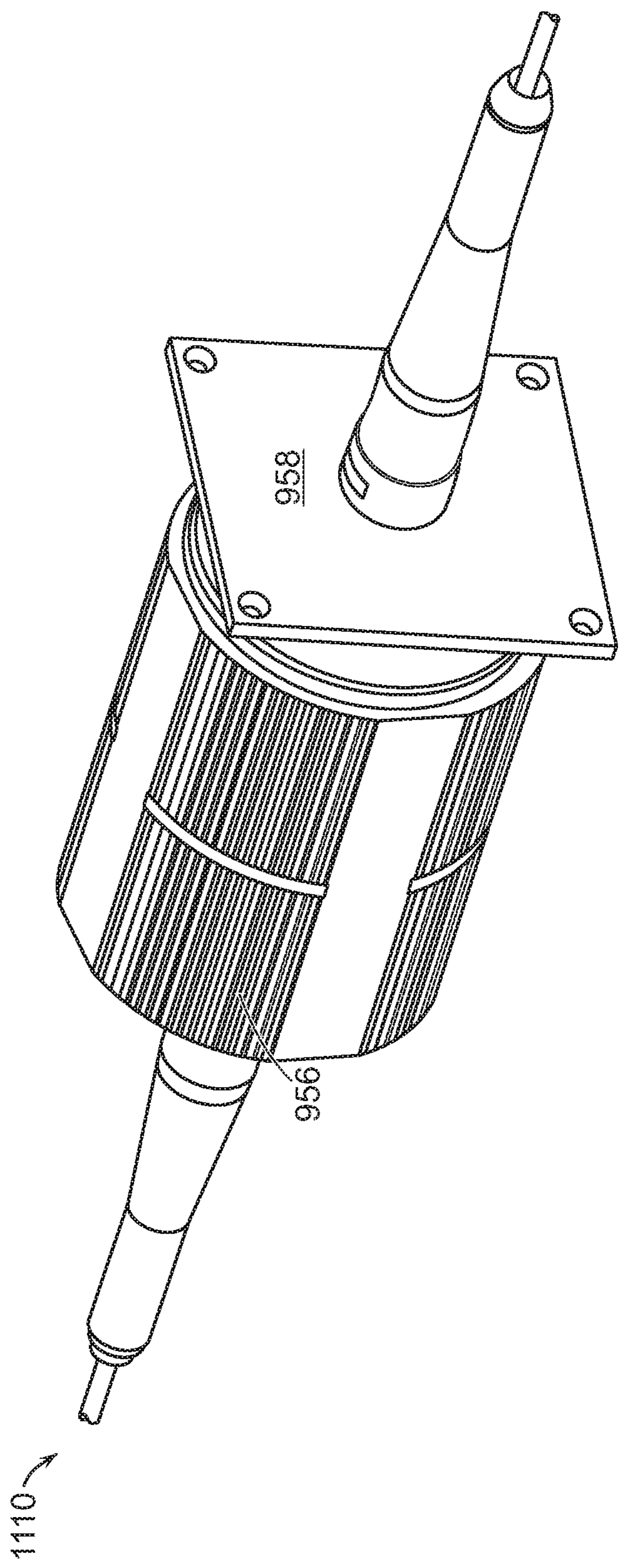
Figure 88:
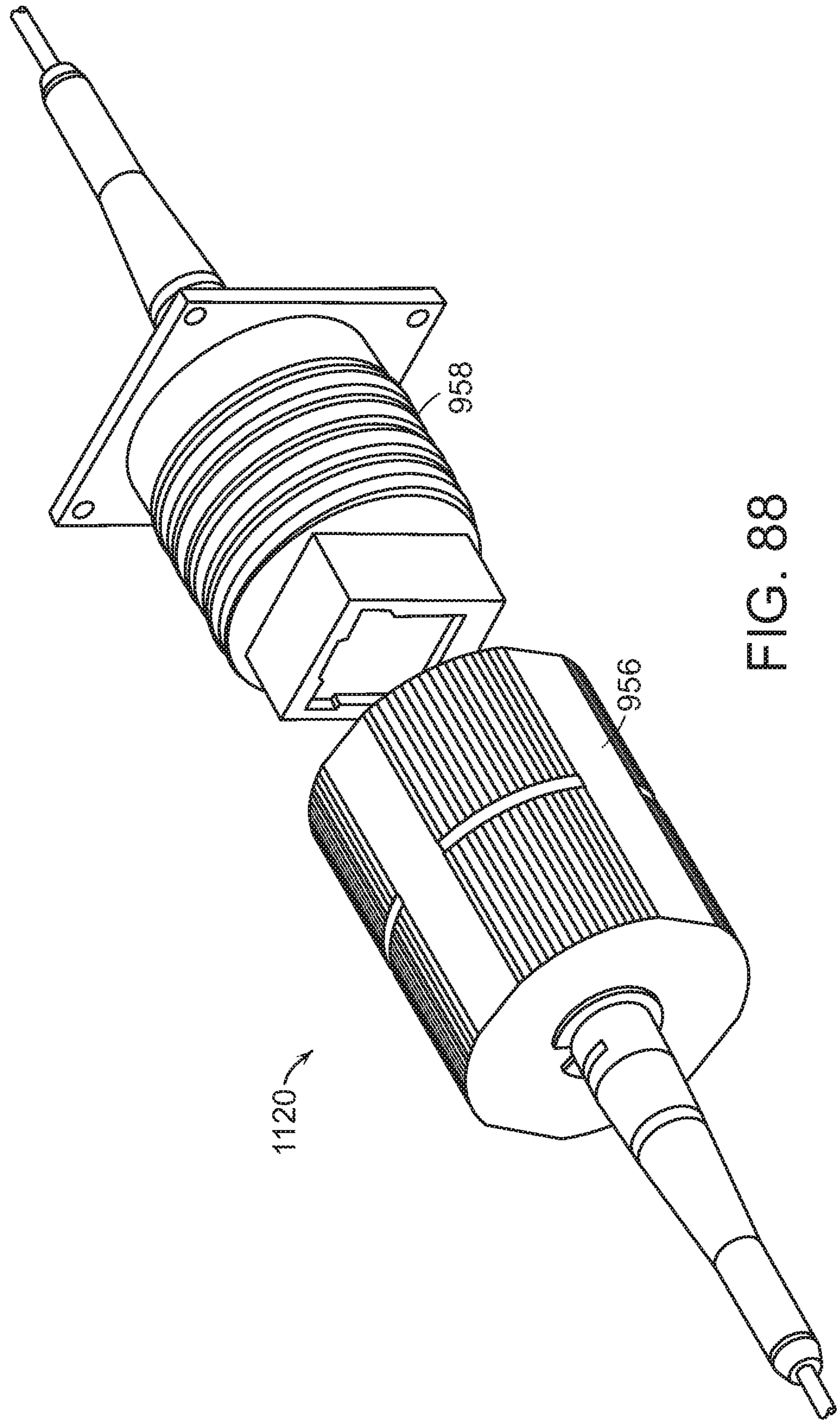
Figure 89:
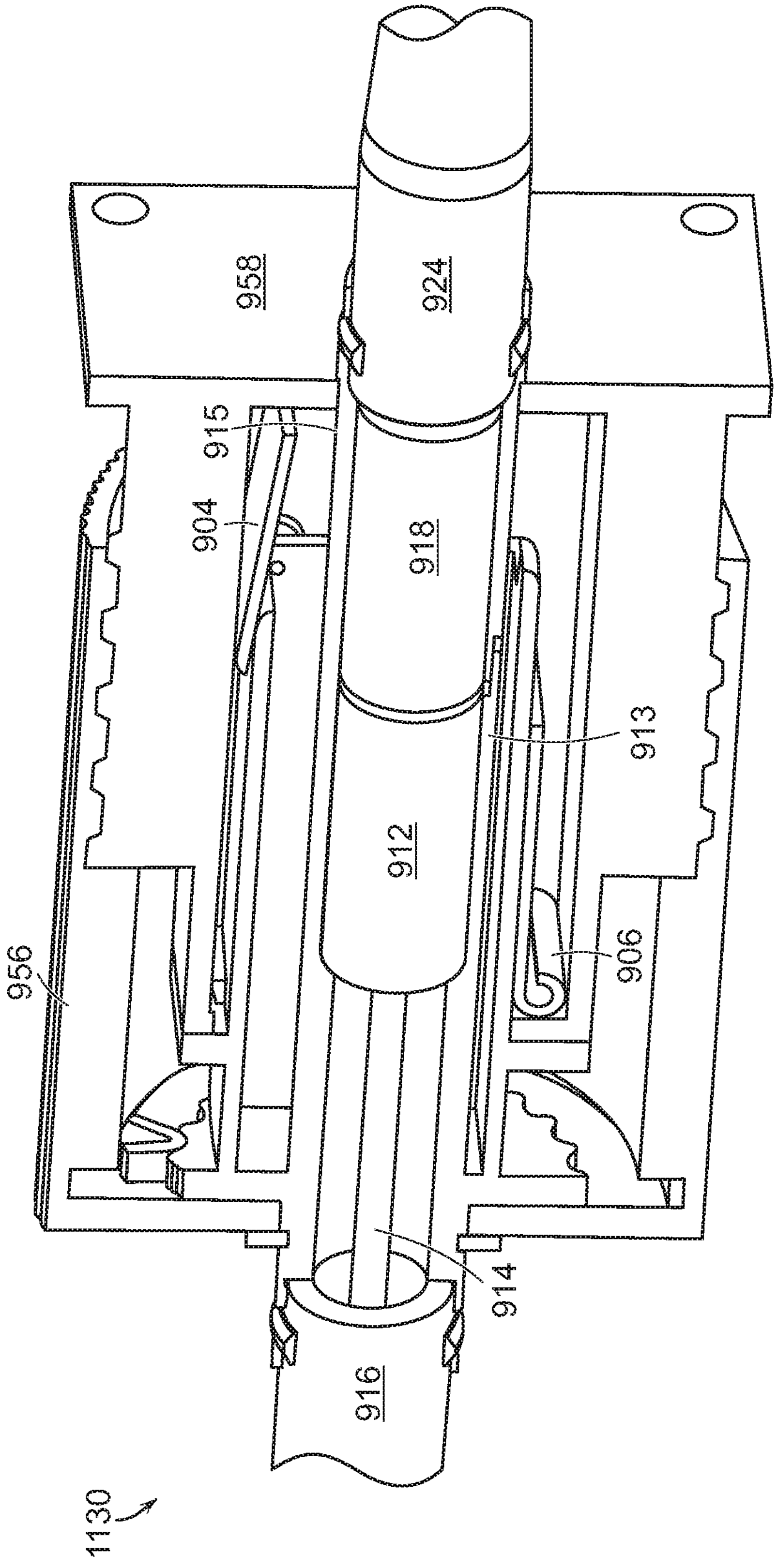

FIG. 86 through FIG. 89 show another embodiment of the connector packaging in the form of a 38999-style housing 1100. As standard with the 38999-style, a female-threaded housing 956 engages the male-threaded housing 958 to close the connection. FIG. 86 shows the two housings before connection and FIG. 87 shows them connected. This particular embodiment 1100 uses the same door mechanism as detailed in the earlier door-style embodiments 1080 and 1060. FIG. 88 shows another angle for clarity and FIG. 89 shows a cutaway detailing the internal components.

Figure 90:
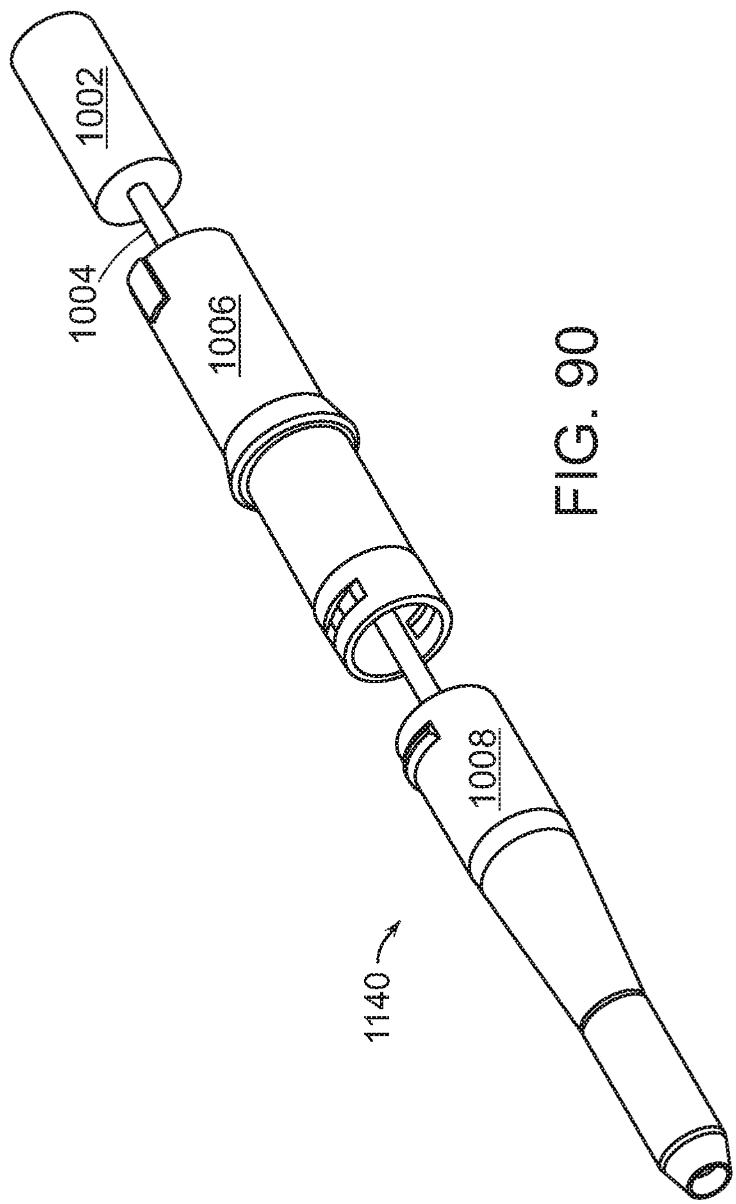
FIGS. 90-140 show embodiments of the UDAT connectors used in these teachings.
Figure 91:
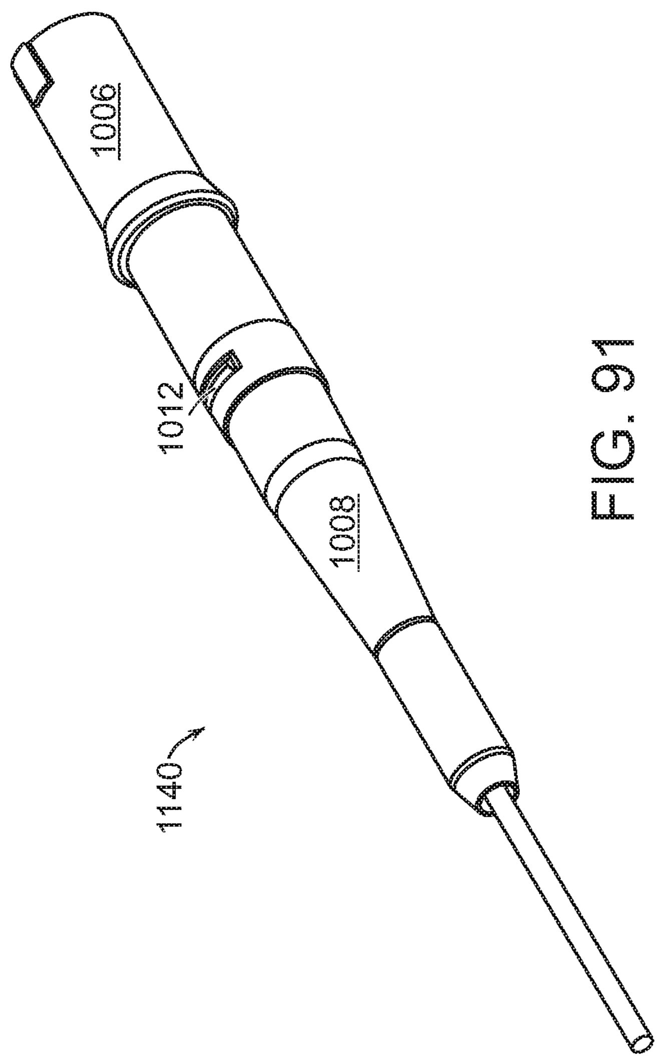
Figure 92:
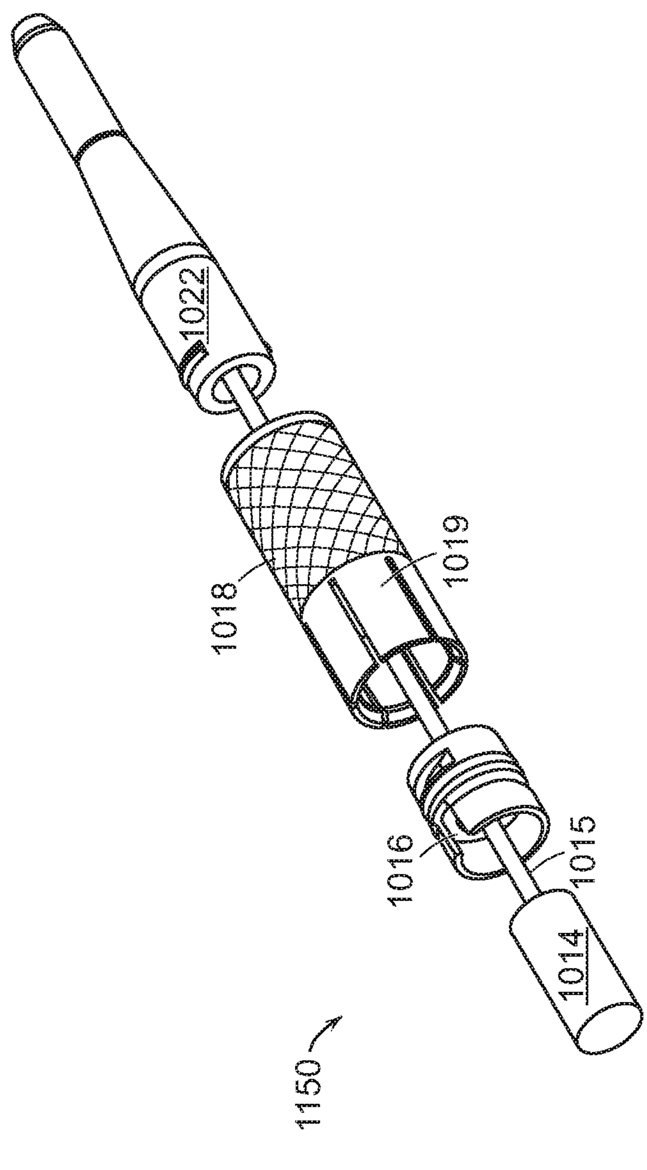
Figure 93:
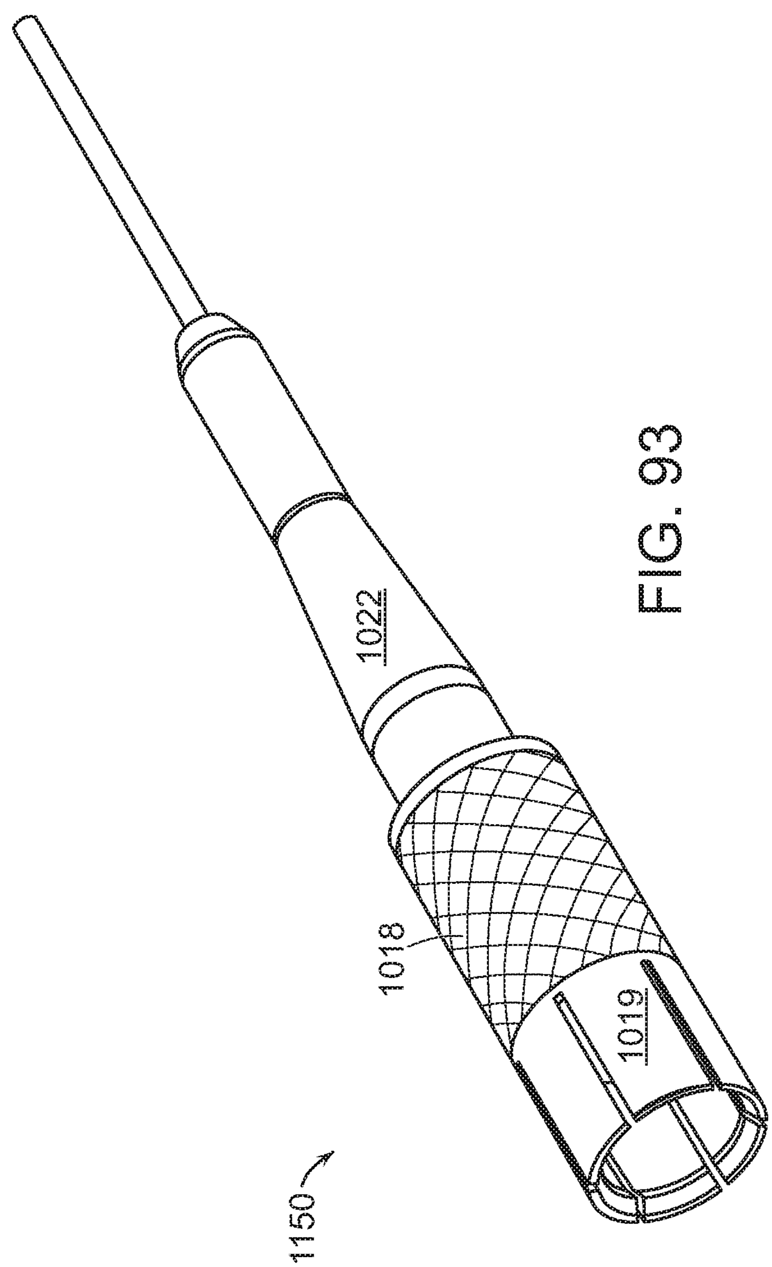
Figure 94:
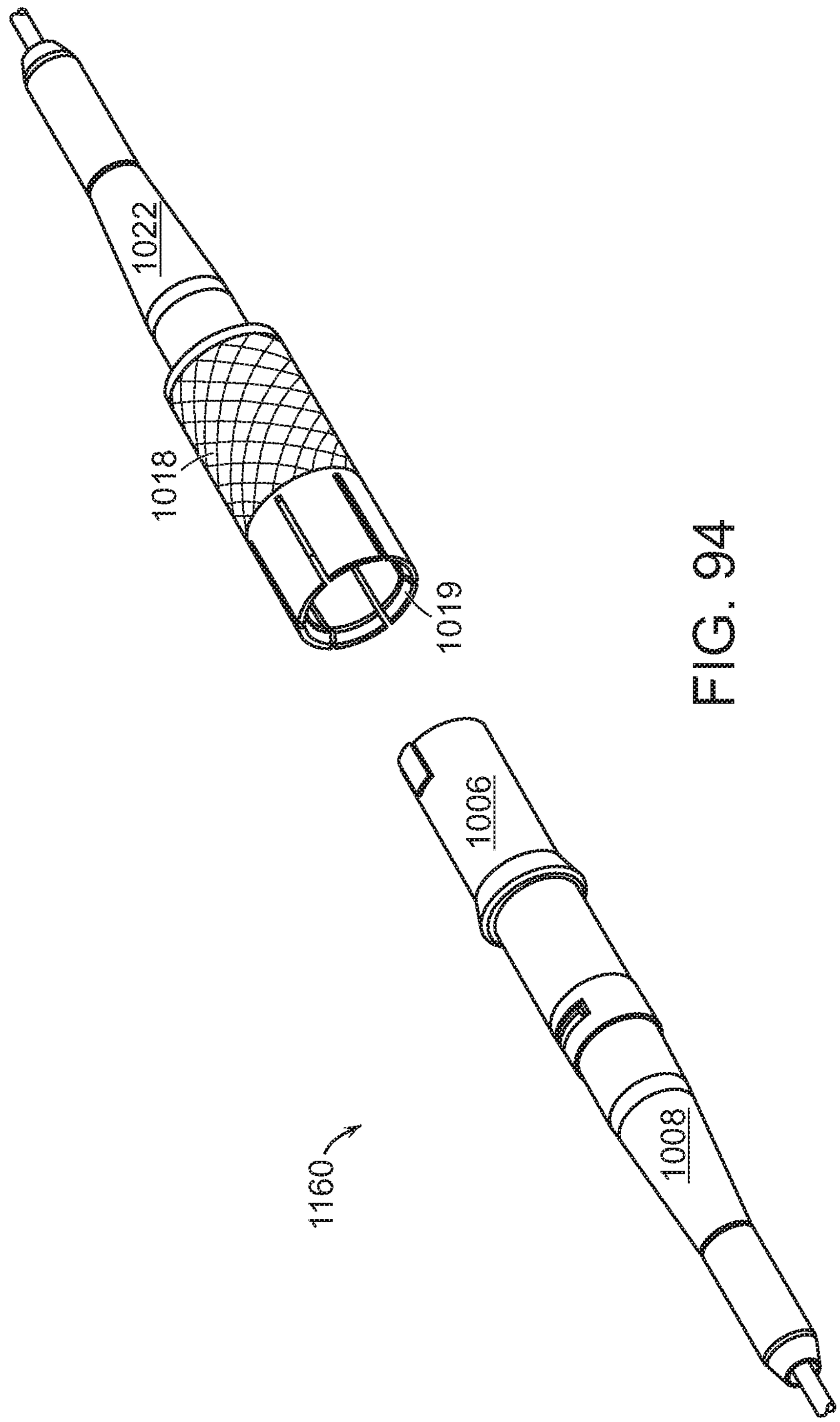
Figure 95:
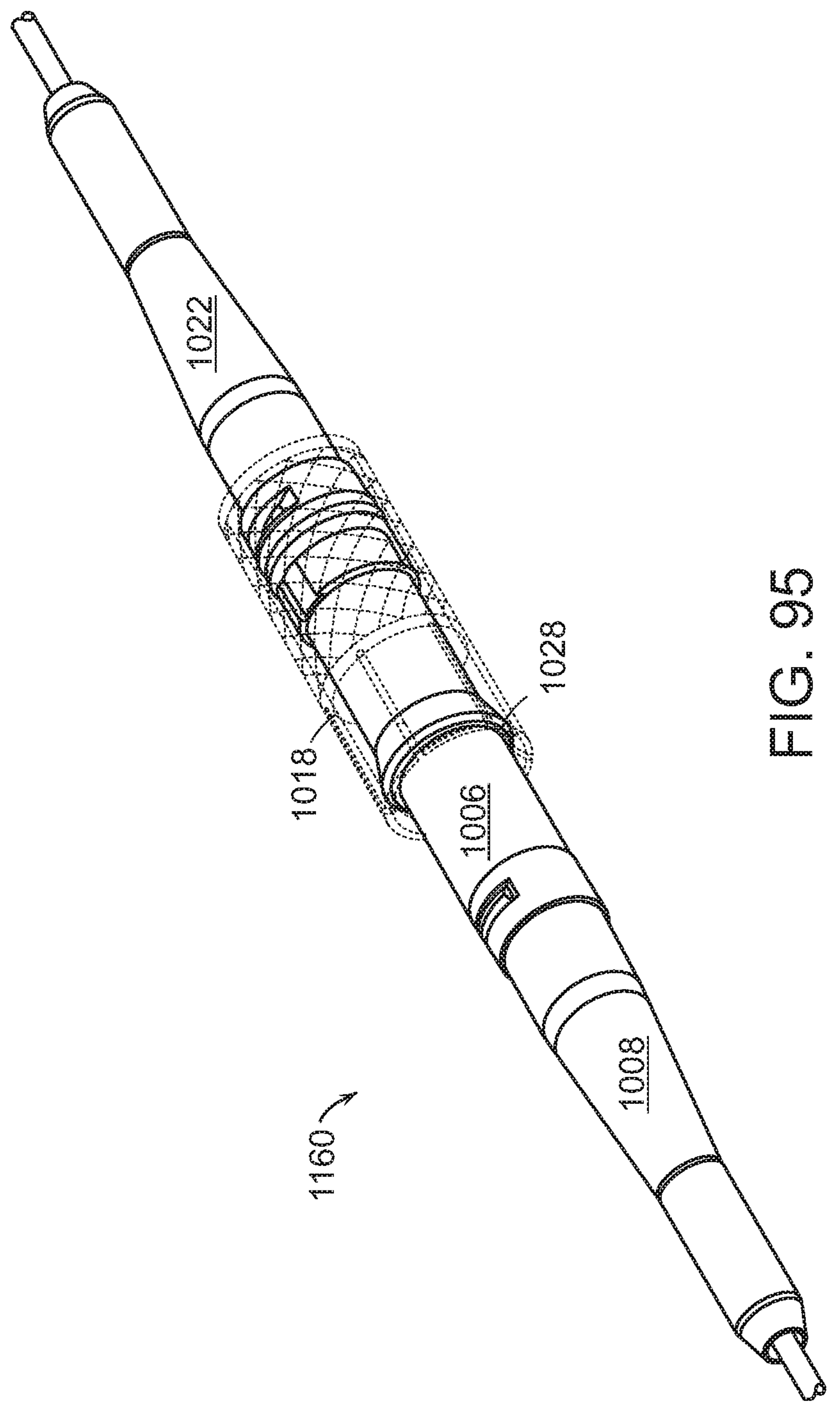
Figure 96:
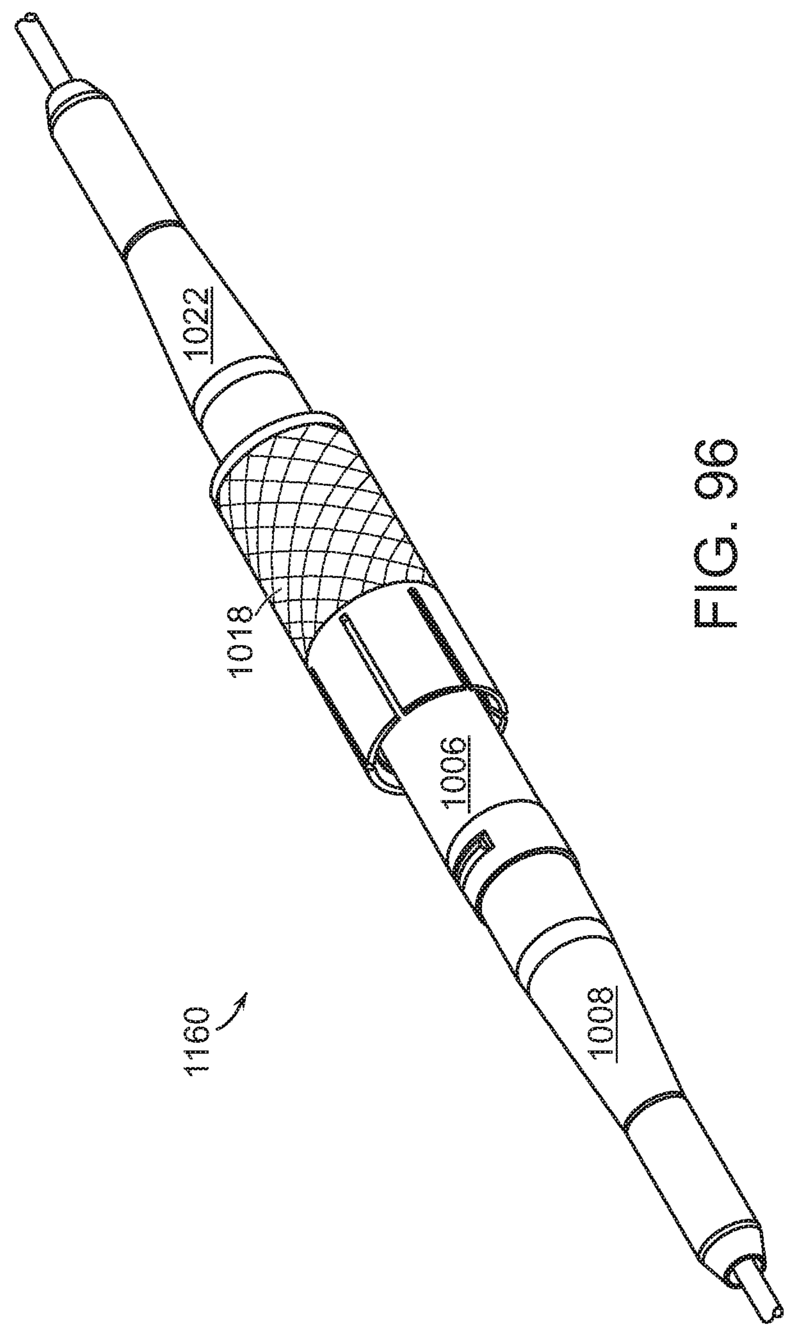
Figure 97:
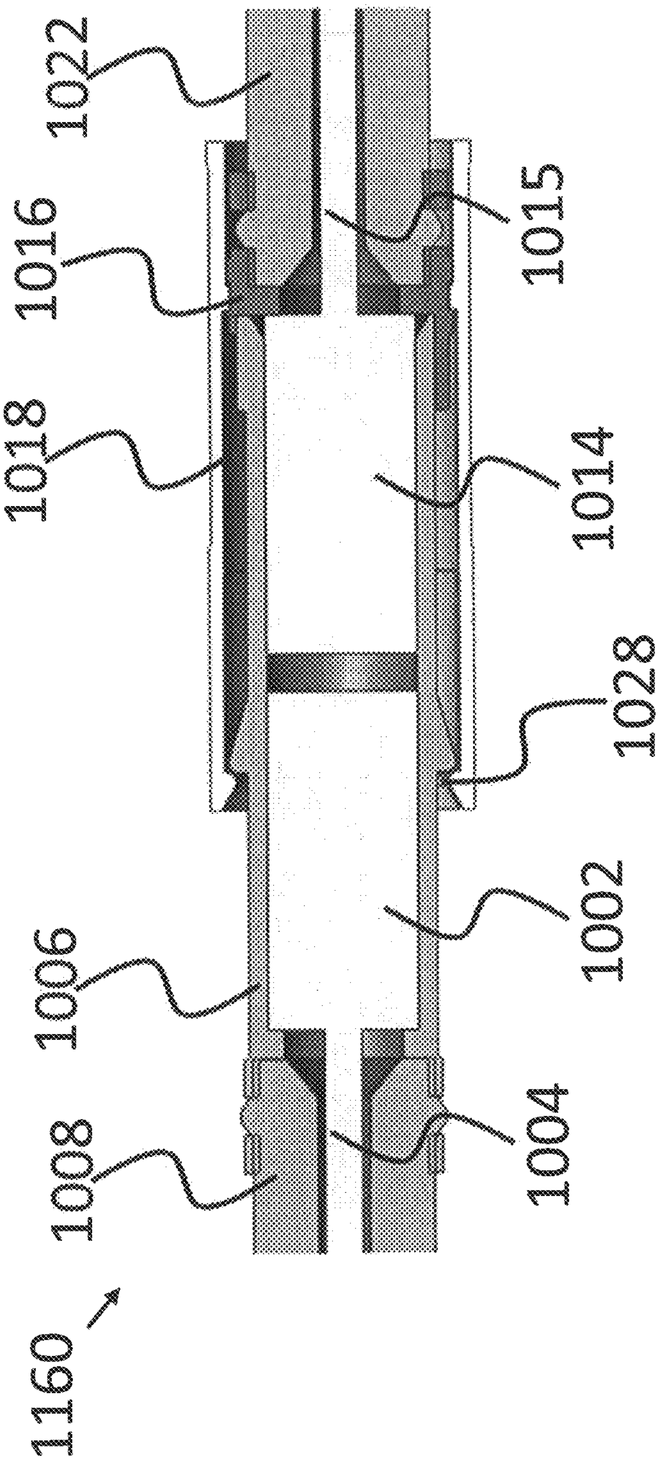

Yet another embodiment of the UDAT connector quick disconnect design is disconnect UDAT connector with a snap on mechanism. The single bore quick disconnect UDAT connector housing design concept is described in detail in the sequence from FIG. 90 to FIG. 97. FIG. 90 and FIG. 91 illustrate exploded and assembled views of the male snap on connector 1140, having a strain-relief boot 1008, the external housing 1006, a fiber array 1004, and an imager 1002. FIG. 92 and FIG. 93 illustrate the exploded and assembled views for the female connector end 1150, having an imager 1014, a strain relief boot 1022, a fiber array 1015, a housing 1016 and a flexure housing 1018 containing multiple flexures 1019. FIG. 94 through FIG. 96 show the connection process of bringing the mating ends together, with a latching contact 1028 being made between the flexure housing 1018 and the male external housing 1006 An interim step is illustrated in greater detail with a transparent sleeve for clarity. Finally FIG. 97 shows a cross-section of the completed connector 1160.

The number of flexures 1019 and flexure and latch interface 1028 geometries can be varied in design for optimum insertion and removal force based on the application. Other variations include, but are not limited to the introduction of other positive locking features, an environmental seal, and a membrane closure when unconnected at the expense of a small additional diameter increase.

Figure 98:
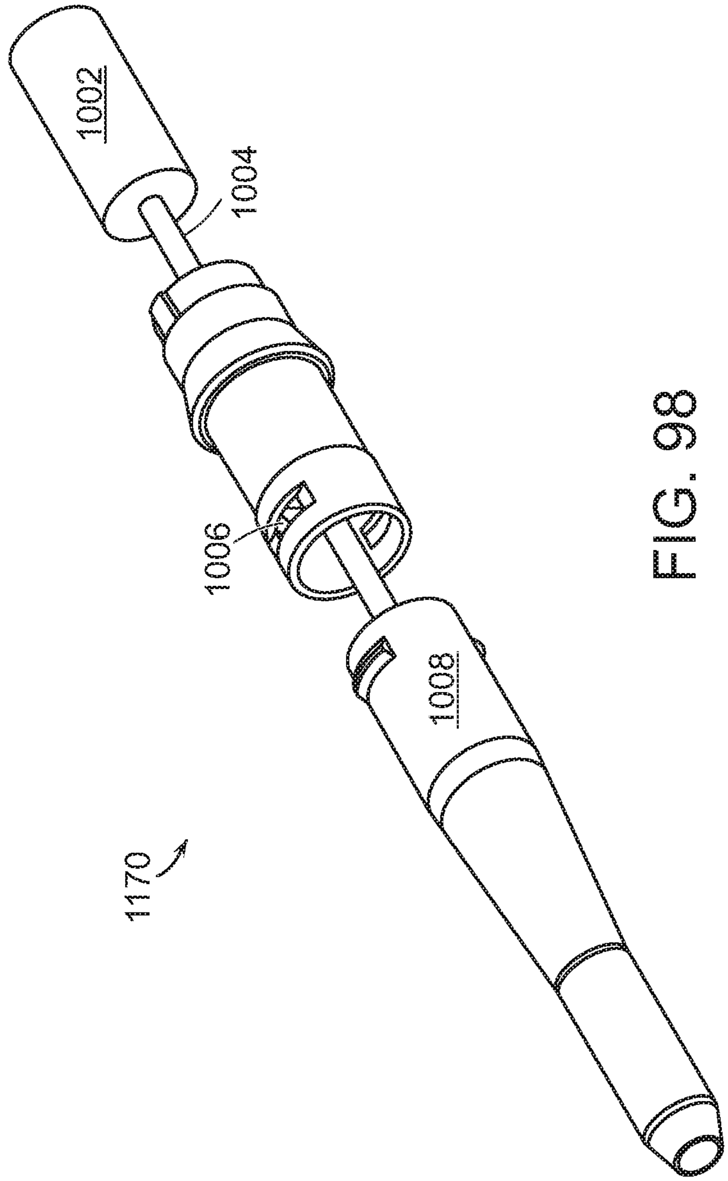
Figure 99:
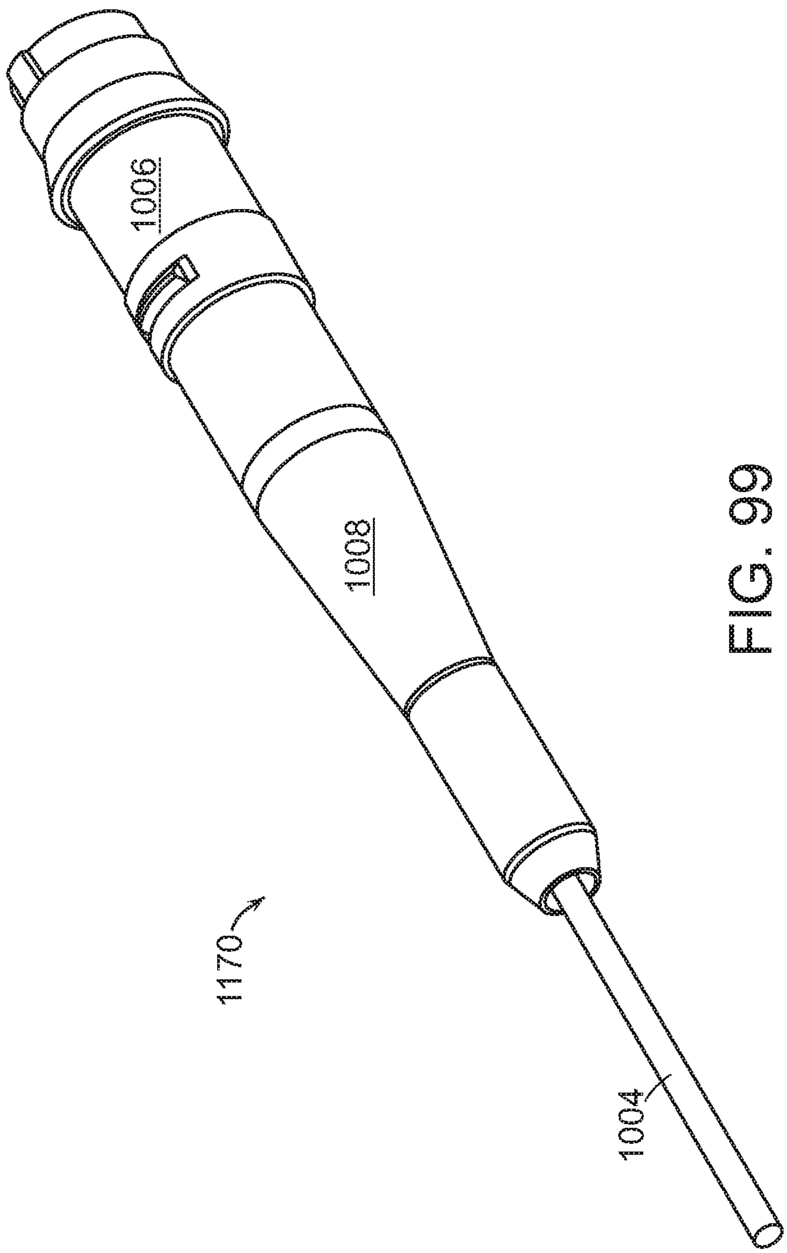
Figure 100:
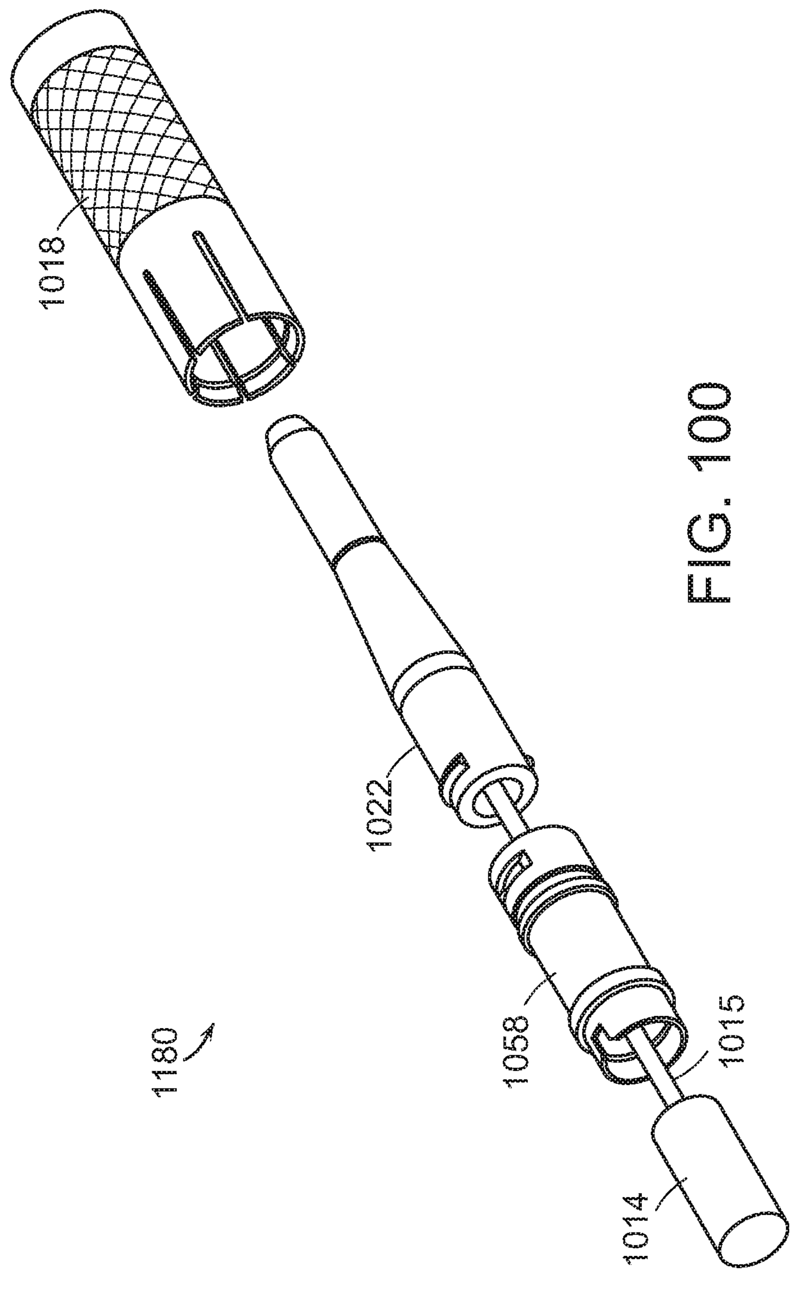
Figure 101:
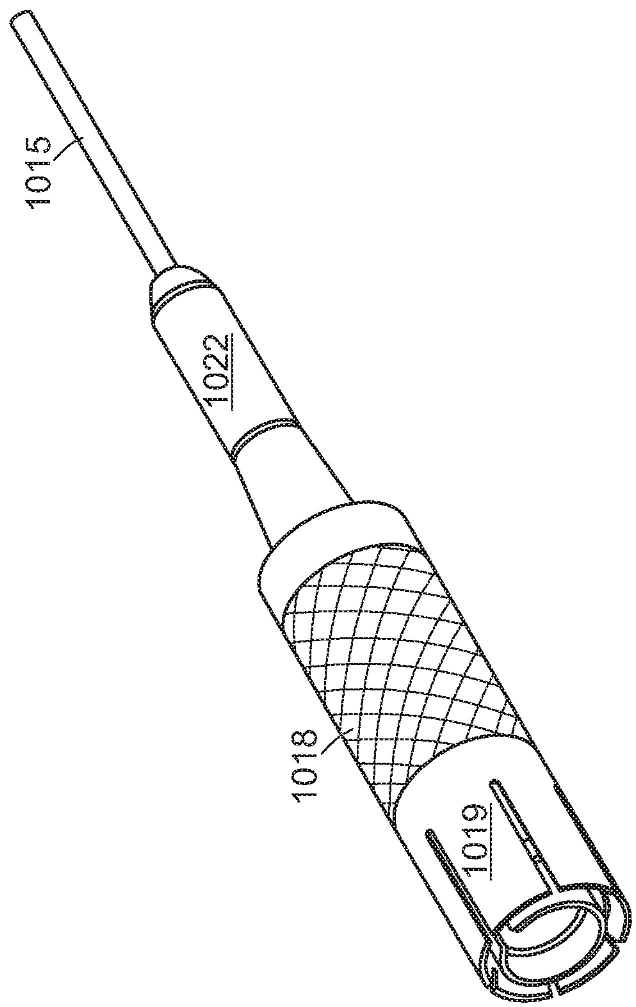
Figure 102:
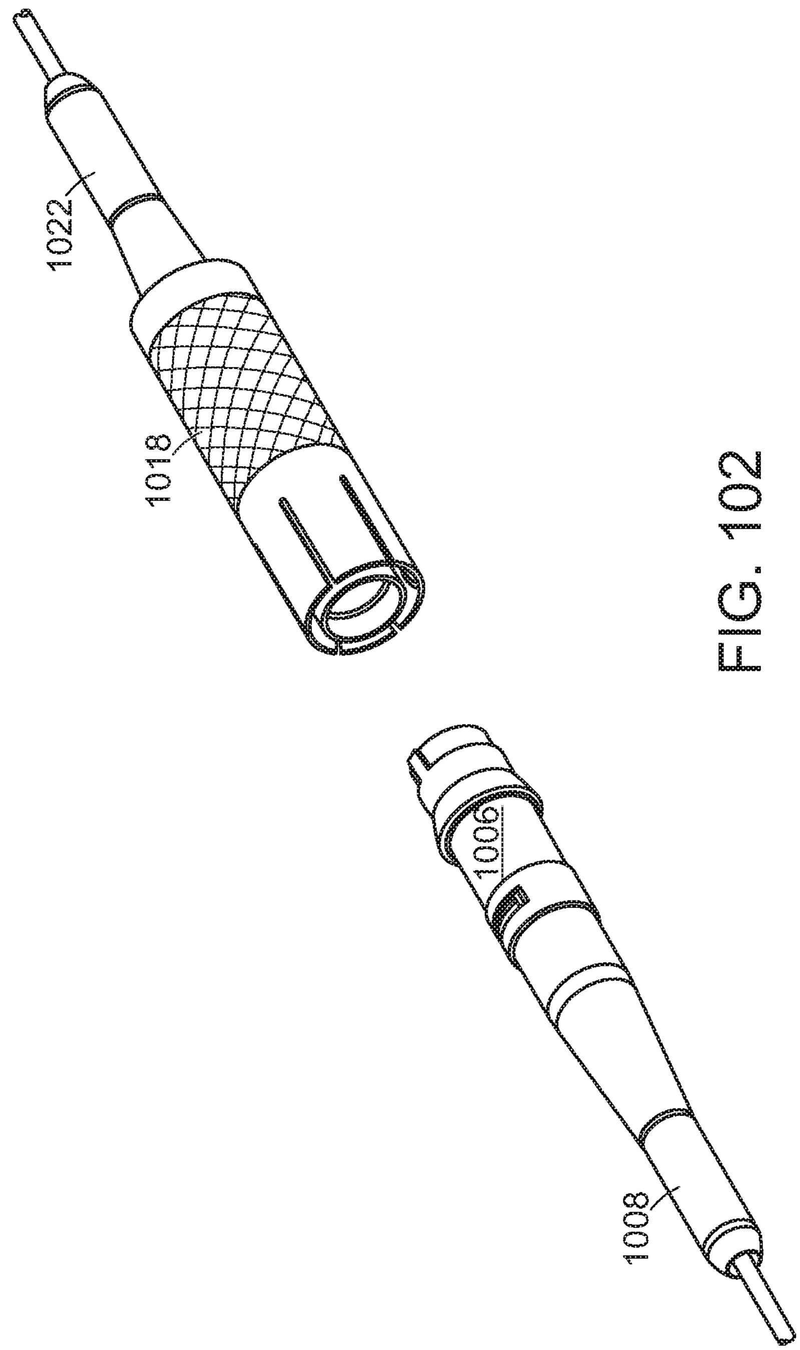
Figure 103:
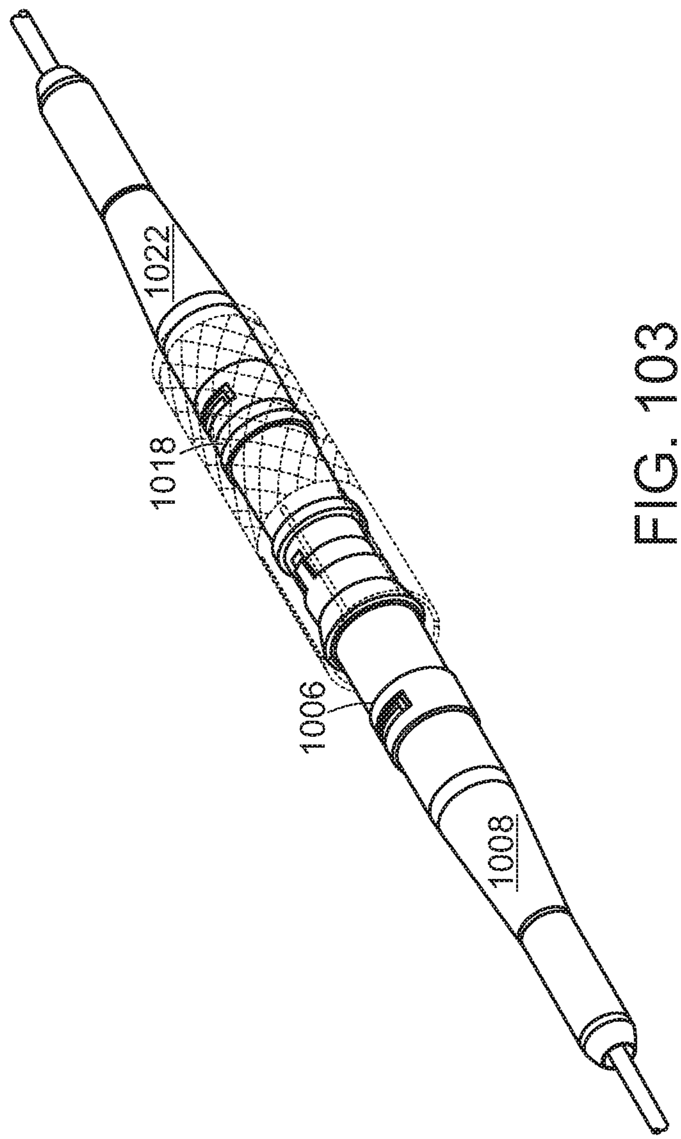
Figure 104:
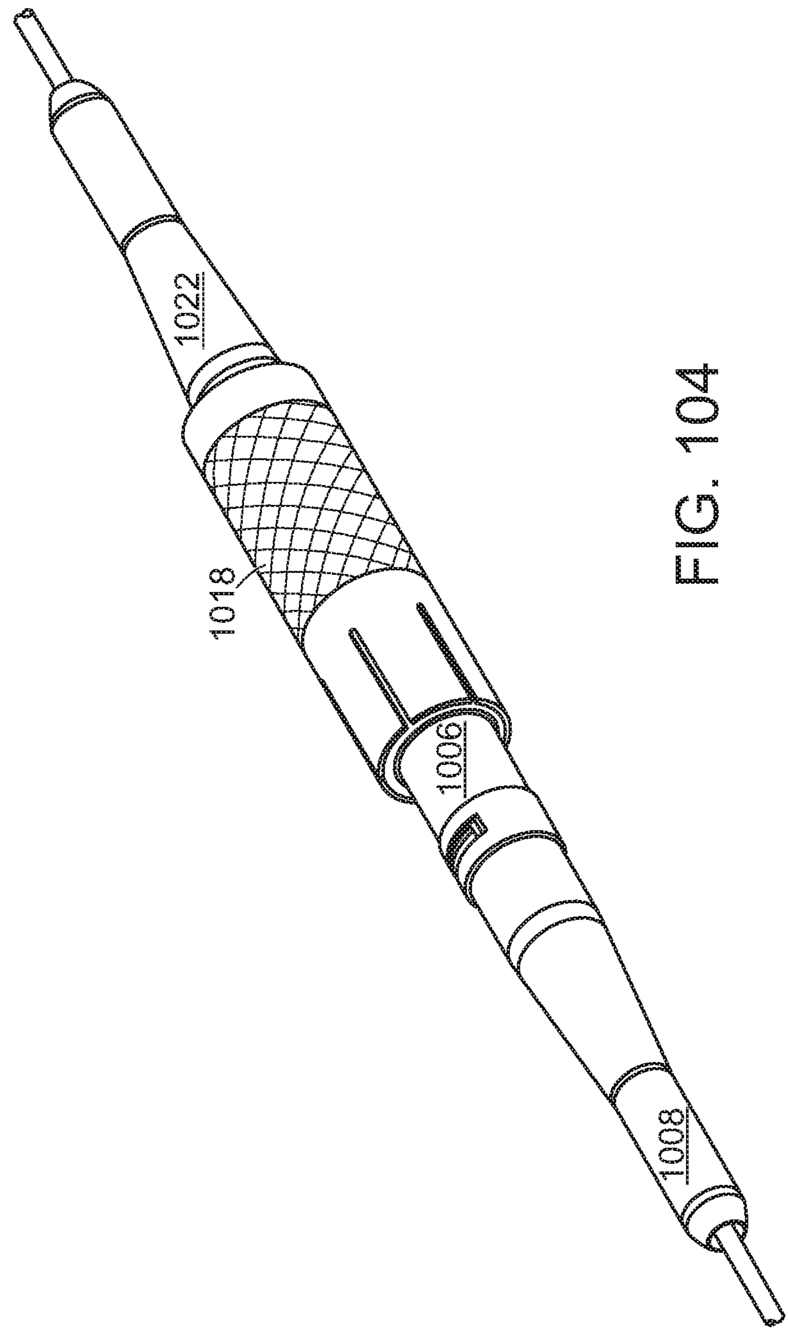
Figure 105:
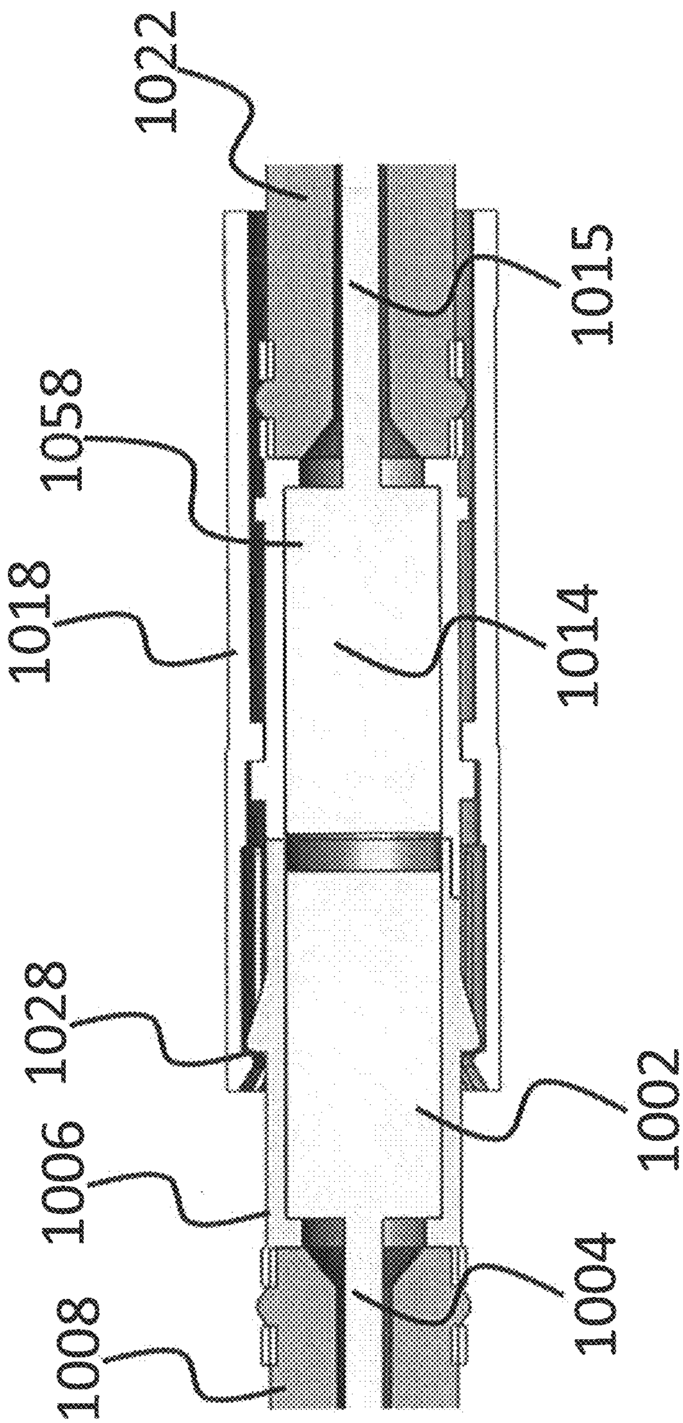
Figure 106:
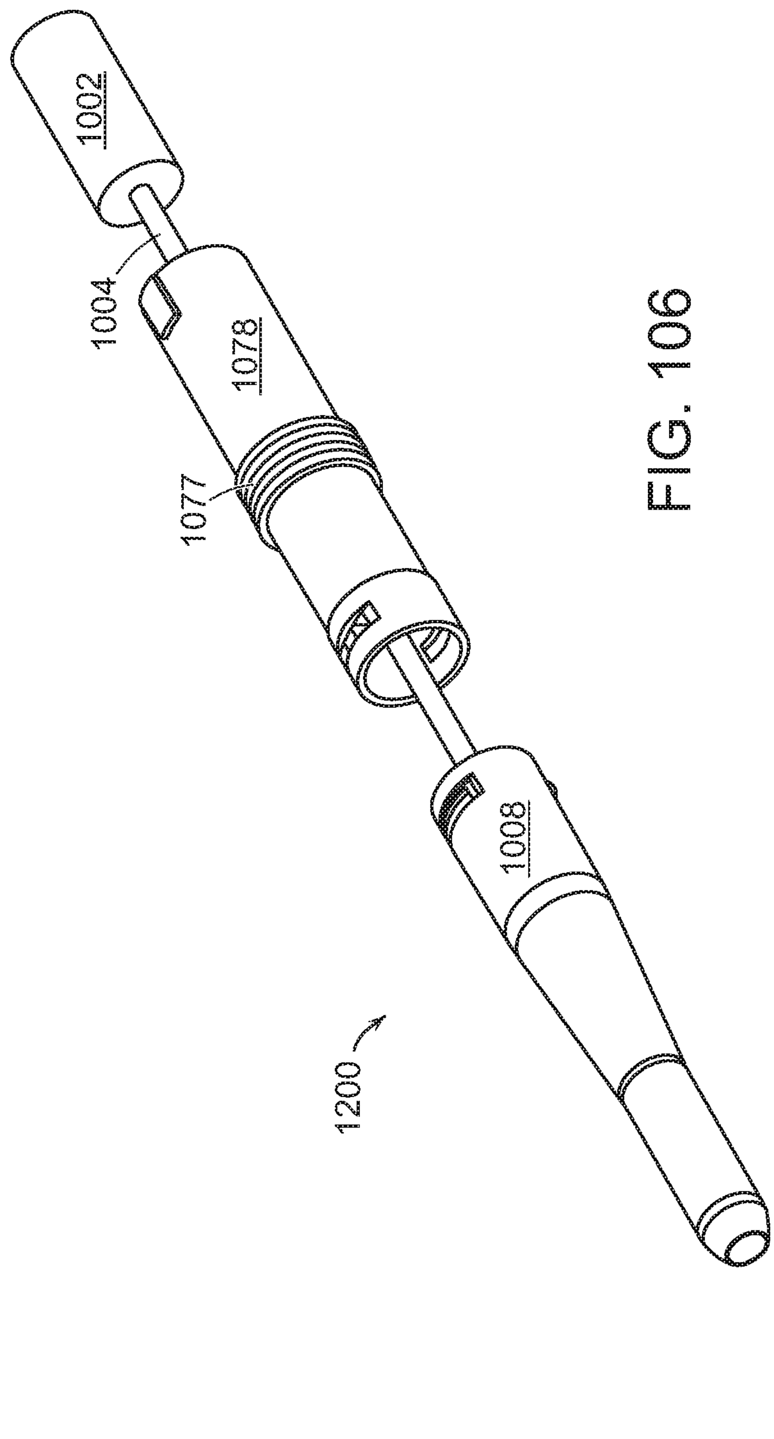
Figure 107:
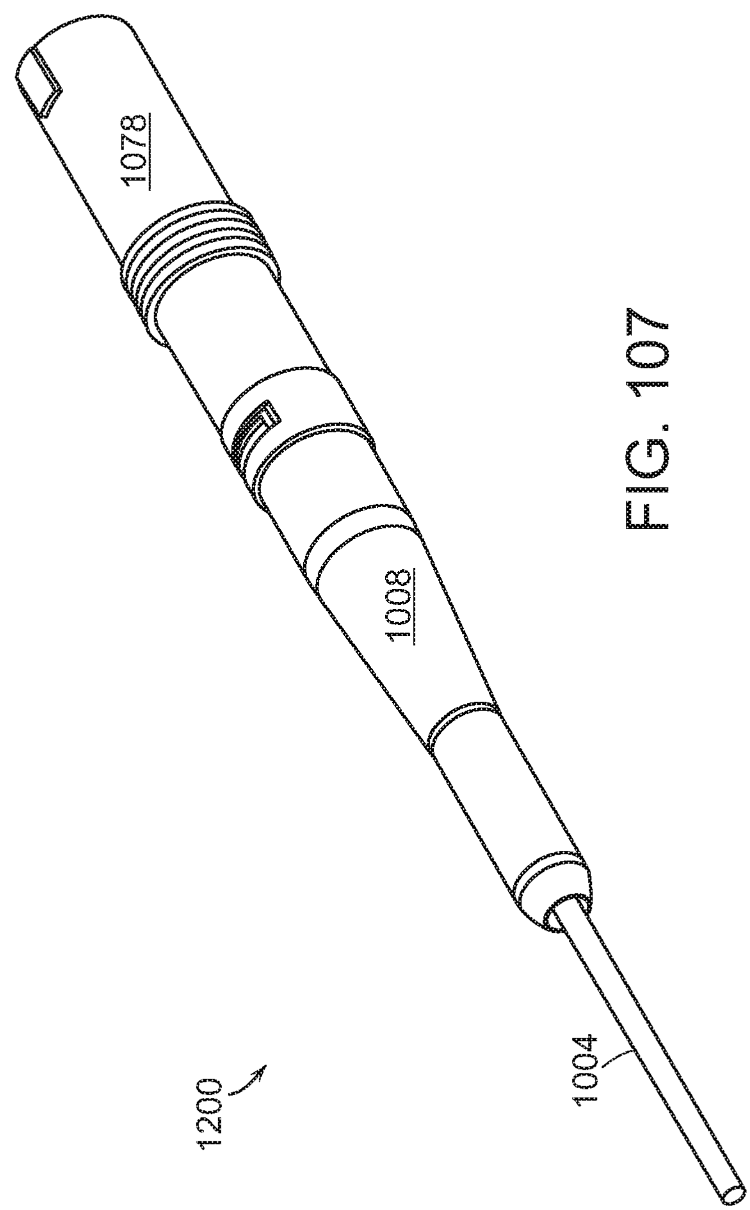

An embodiment 1190 of the quick-disconnect UDAT connector incorporating protective sleeves for both imagers is described in detail in the sequence from FIG. 98 to FIG. 105. FIG. 98 and FIG. 99 illustrate exploded and assembled views of the male snap-on connector 1170, just as was displayed in FIG. 90 and FIG. 91, except housing 1006 is replaced with housing 1007. FIG. 100 and FIG. 101 illustrate the layout for the female connector end 1180, similar to that shown in FIG. 92 and FIG. 93, except that the housing 1058 here covers the imager whereas the previous housing 1016 did not. FIG. 102 through FIG. 104 illustrate the connection process of bringing the mating ends together. An interim step is illustrated in greater detail with a transparent sleeve for clarity. Finally FIG. 105 shows a cross-section of the completed connector. In either of these two designs, the imager can also be replaced with an imager and alignment housing if more accurate alignment is necessary.

Figure 108:
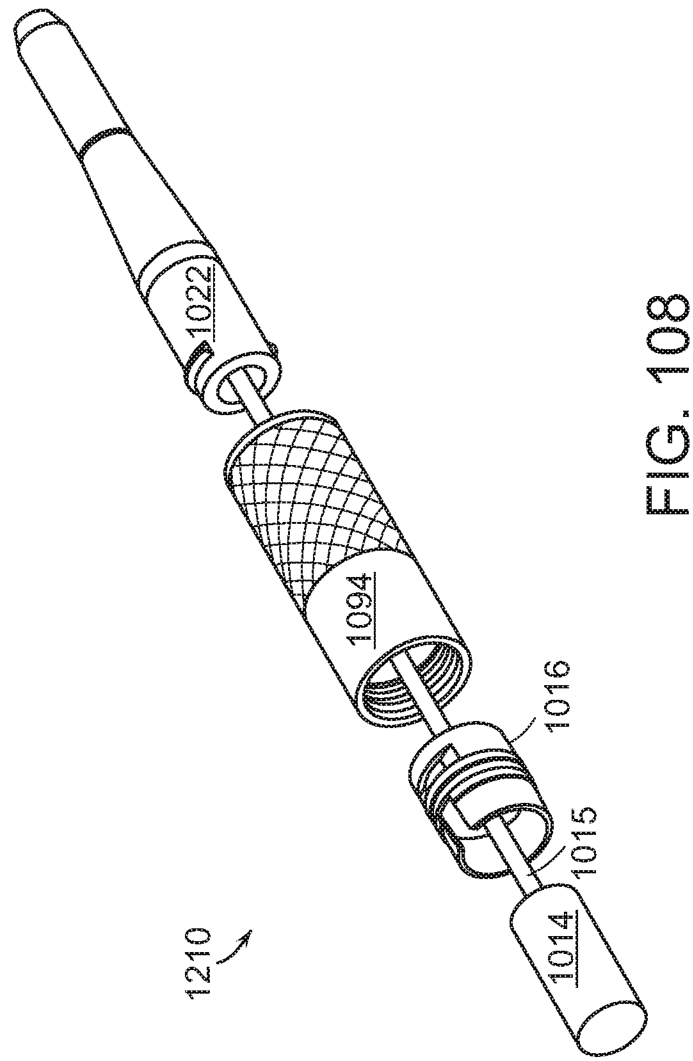
Figure 109:
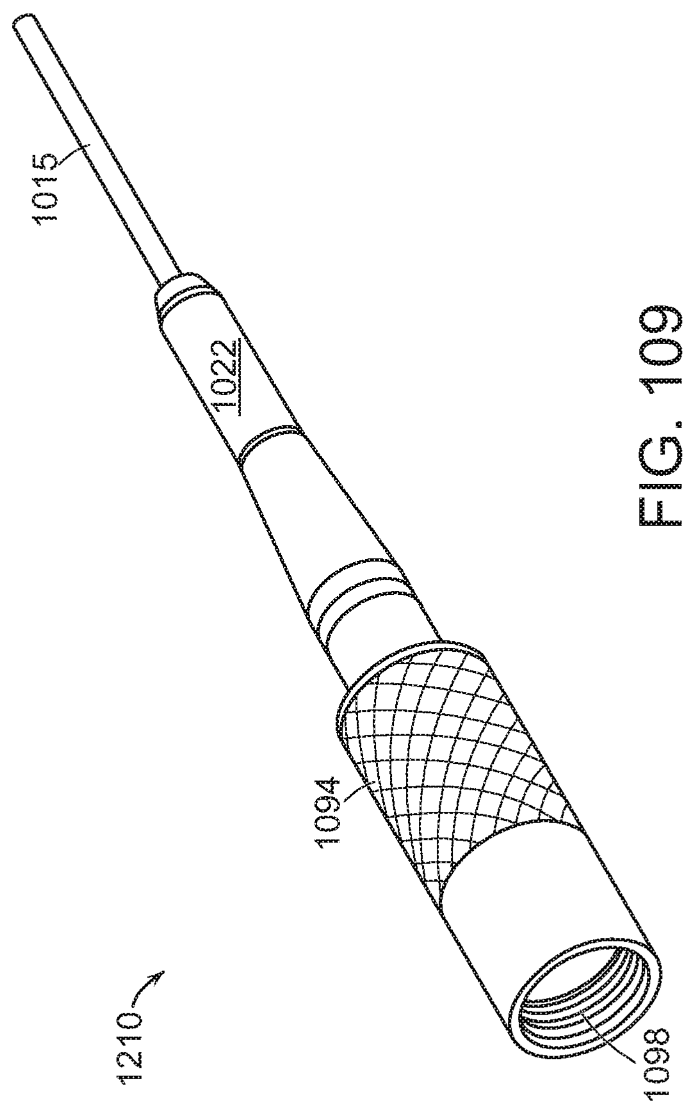
Figure 110:
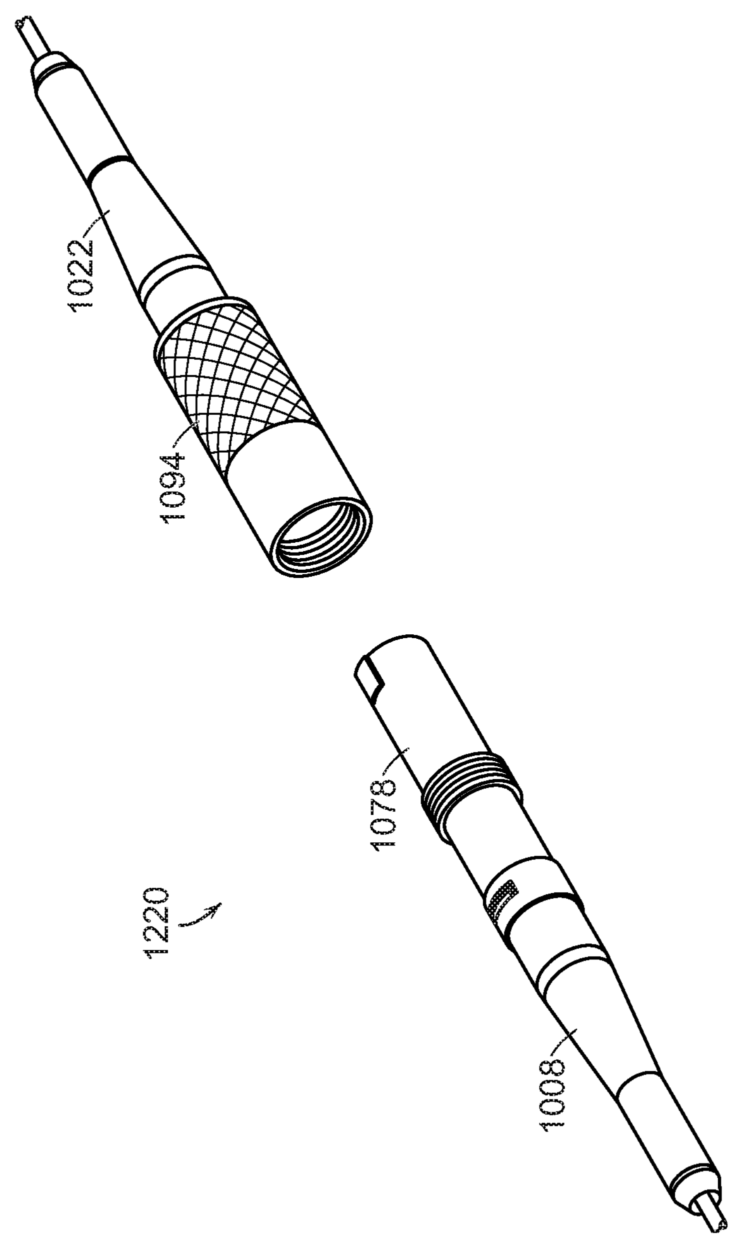
Figure 111:
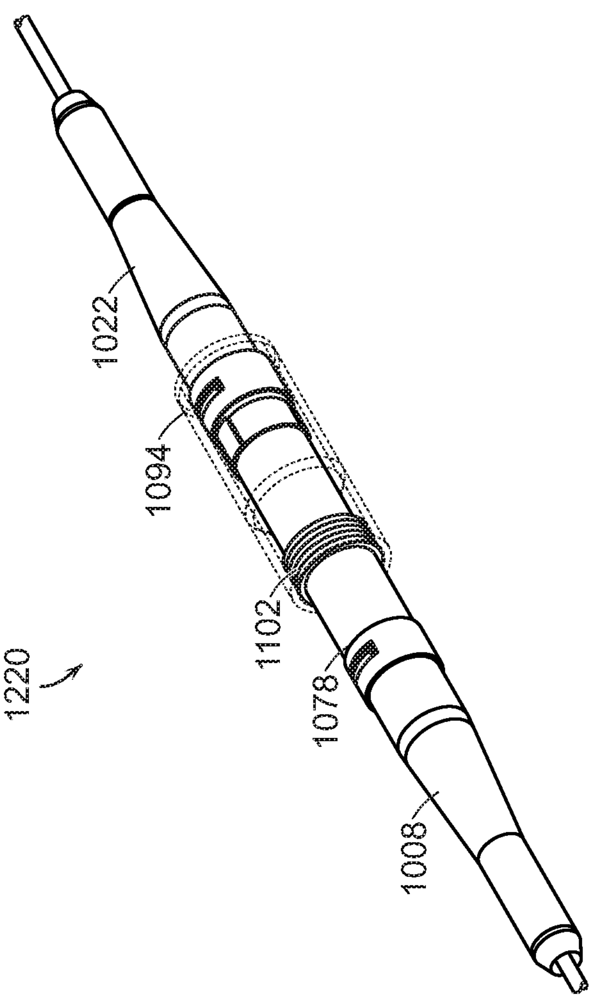
Figure 112:
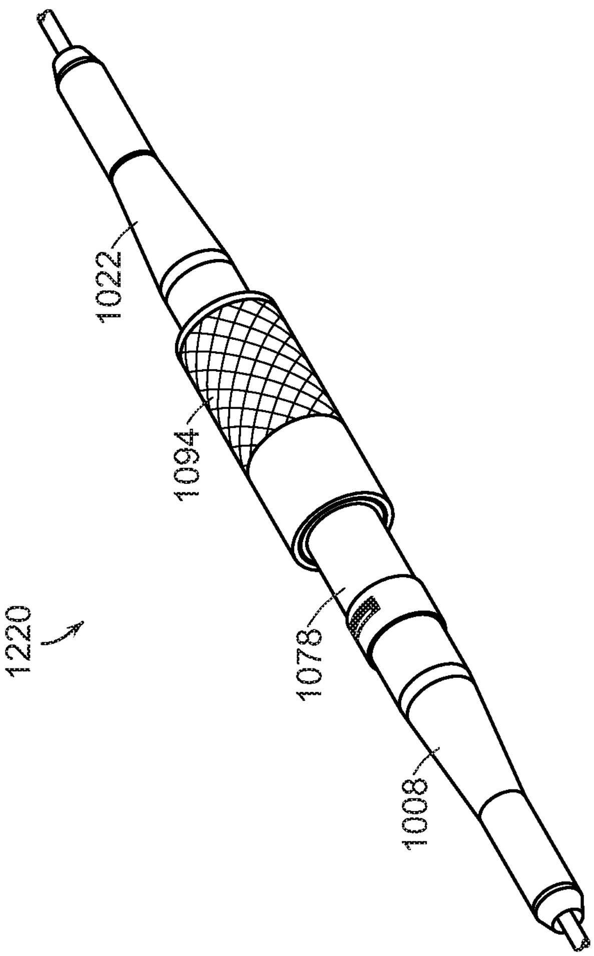
Figure 113:
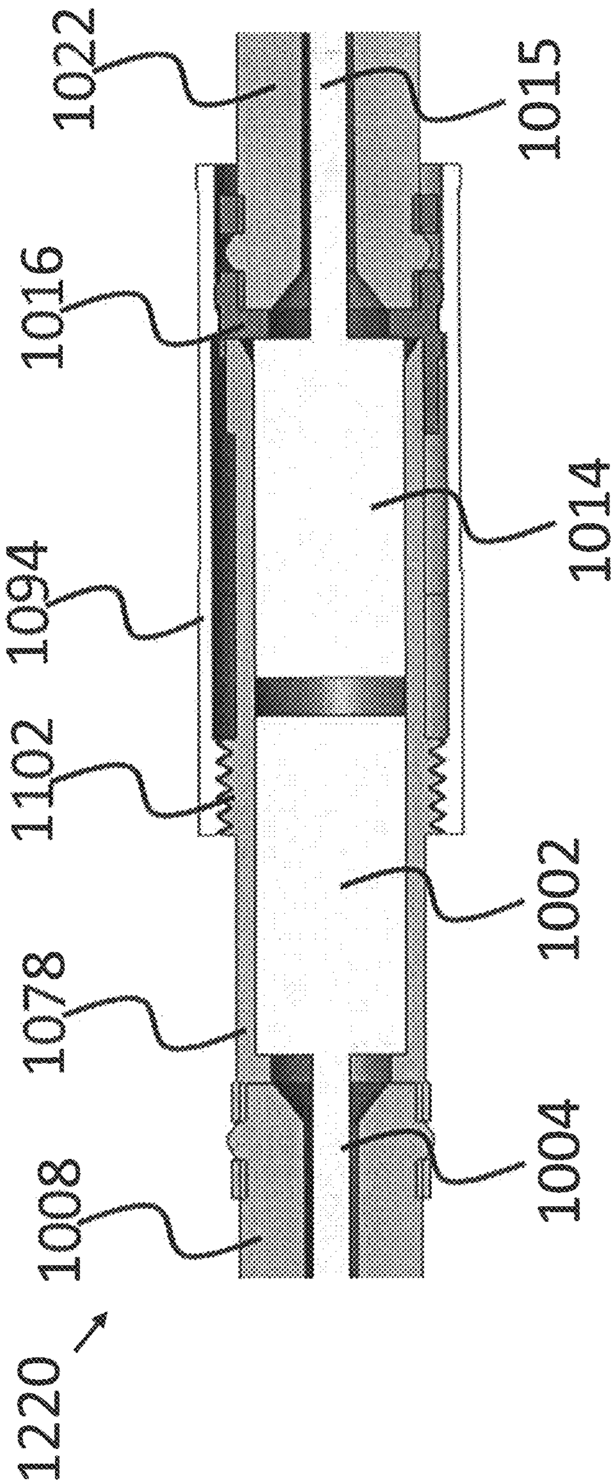

Yet another embodiment is the threaded (instead of snap-on) quick disconnect UDAT connectors. Both embodiments (housed and unhoused imagers) follow the same tradeoffs for the snap-on connectors. However, the threaded mechanism provides some other advantages for aerospace applications. The quick disconnect UDAT connector housing design concept is described in detail in FIG. 106 through FIG. 113, FIG. 106 and FIG. 107 illustrate exploded and assembled views of the male threaded connector 1200, notice that the difference between this and the snap-on connectors is that the lip interface 1028 has been replaced with a male thread 1077 on the housing 1078. FIG. 108 and FIG. 109 illustrate the same for the female connector end 1210, and once again, the flexures 1019 have been replaced with a female thread 1098 on the housing 1094. FIG. 110 through FIG. 112 illustrate the connection process of bringing the mating ends together, affixing at the thread interface 1102. An interim step is illustrated in greater detail with a transparent sleeve for clarity. Filially FIG. 113 shows a cross-section of the completed connector 1220.

Features of this connector include the adaptability of established locking mechanisms such as ball and toothed end faces that prevent unscrewing of the connector in a vibration intense environment, an integral environmental seal, and the possibility of adding a membrane closure when unconnected at the expense of a small additional diameter increase.

Figure 114:
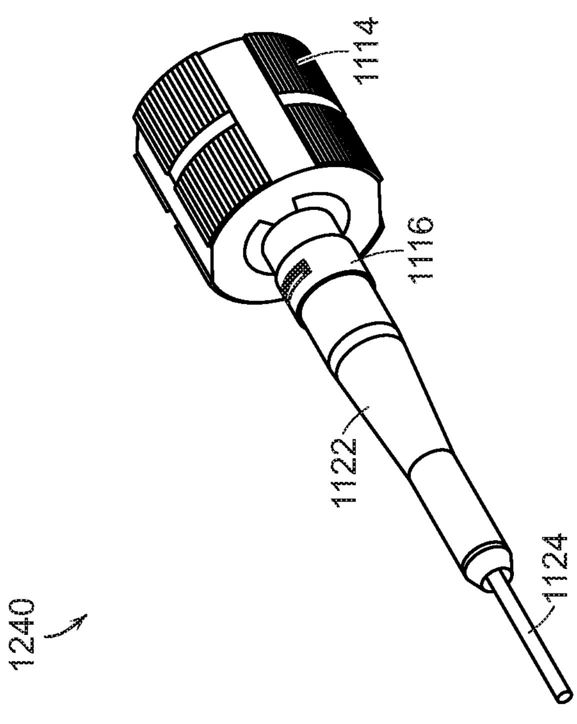
Figure 115:
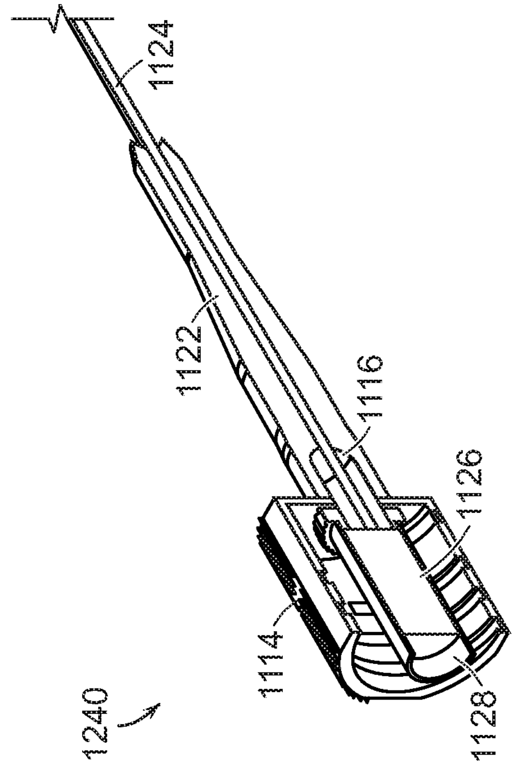

Another embodiment 1240 includes the commercial off-the-shelf military standard series 38999 connectors. The UDAT 38999-style cable terminus embodiment designs are shown in FIG. 114 and FIG. 115. Note the female threaded housing 1114, the strain-relief boot 1122, the imager housing 1116, the fibers 1124, the imager 1126, and the aligning interface on the imager housing 1128. The connectors are shown in FIG. 114 and FIG. 115.

Figure 116:
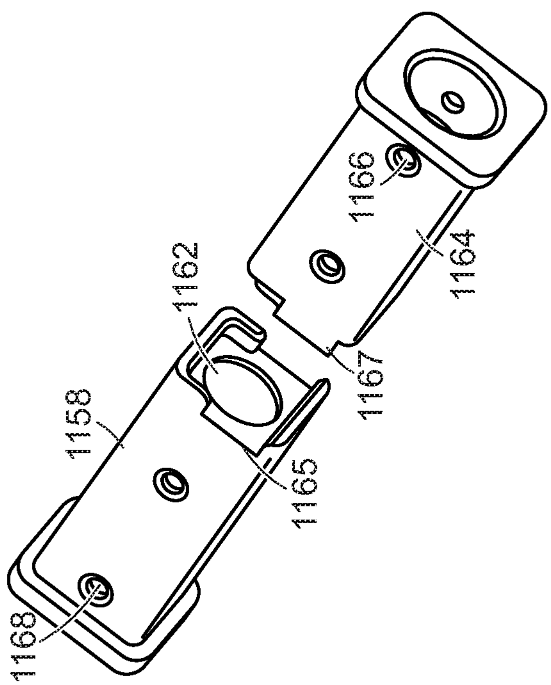
Figure 117:
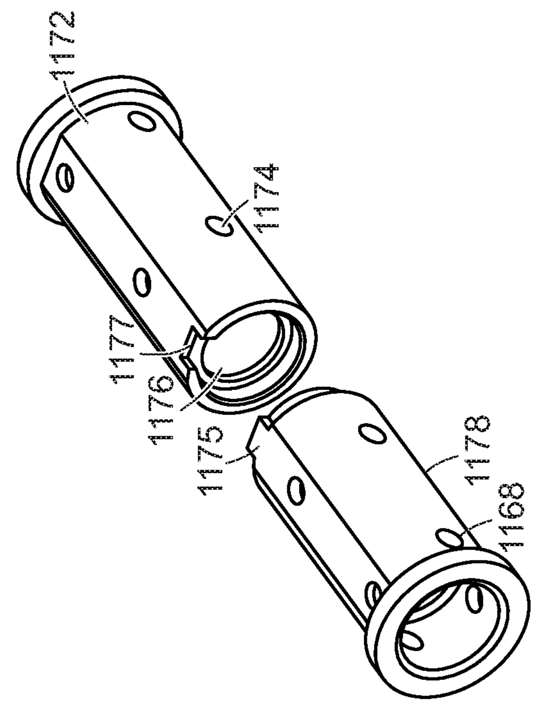

In other embodiments of directly coupled alignment housings, square 1158 and 1164 and round 1178 and 1172 cross-section housings are shown in FIG. 116 and FIG. 117. The square and round housings have alignment key features 1165 and 1167, and 1175 and 1177, respectively. Epoxy fill ports 1168, 1166, 1169, and 1174 facilitate bonding the imagers 1176 and 1162.

Figure 118:
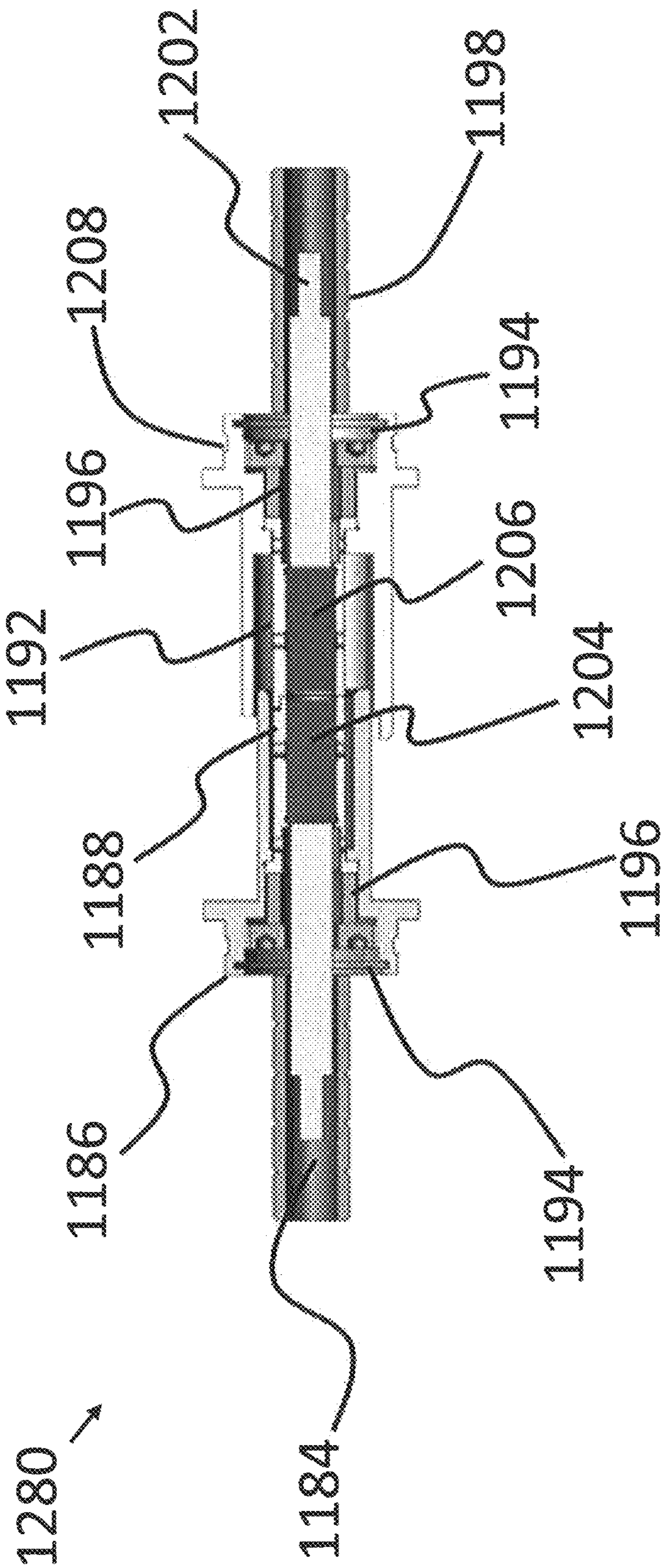

FIG. 118 shows a connector embodiment 1280 using either of the housings from FIG. 117 or FIG. 116. Note the use of sheathing 1198 to protect the fibers 1184 and 1202 and as a strain relief, the male 1188 and female 1192 imager (1204 and 1206) housings and the external connector housings 1208 and 1186. A retaining ring 1194 retains a bushing 1196 that supports axial loads on an imager housing 1188 or 1192. The sheathing 1198 connection is not shown in FIG. 118. It is attached with a clamshell like device that mounts to the connector and is affixed so as to allow the sheathing to roll without affecting the fiber. If the sheathing 1198 is stressed it will pull against the connector and not against the imager housings 1188 and 1192.

Figure 119:
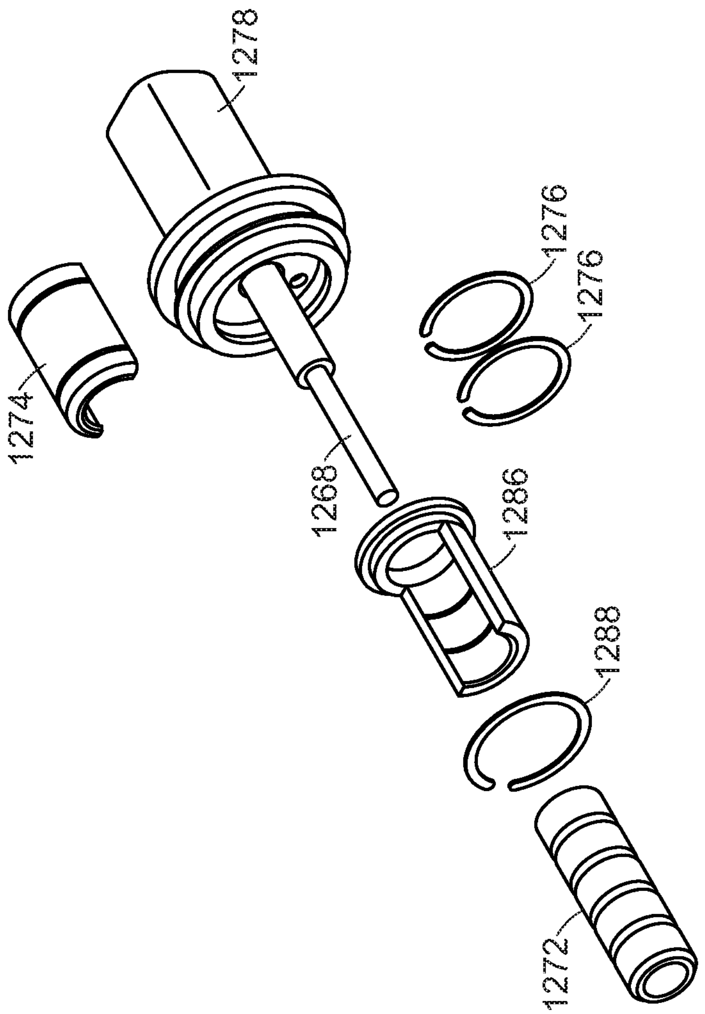

FIG. 119 displays an exploded view of an embodiment using a sheathing 1272, a clamshell housing with two parts 1274 and 1286 that retains the sheathing but allows rotational motion of the sheathing, C-rings 1276 that hold the clamshell together, a retaining ring 1288 that retains the clamshell in the connector housing 1278.

Figure 120:
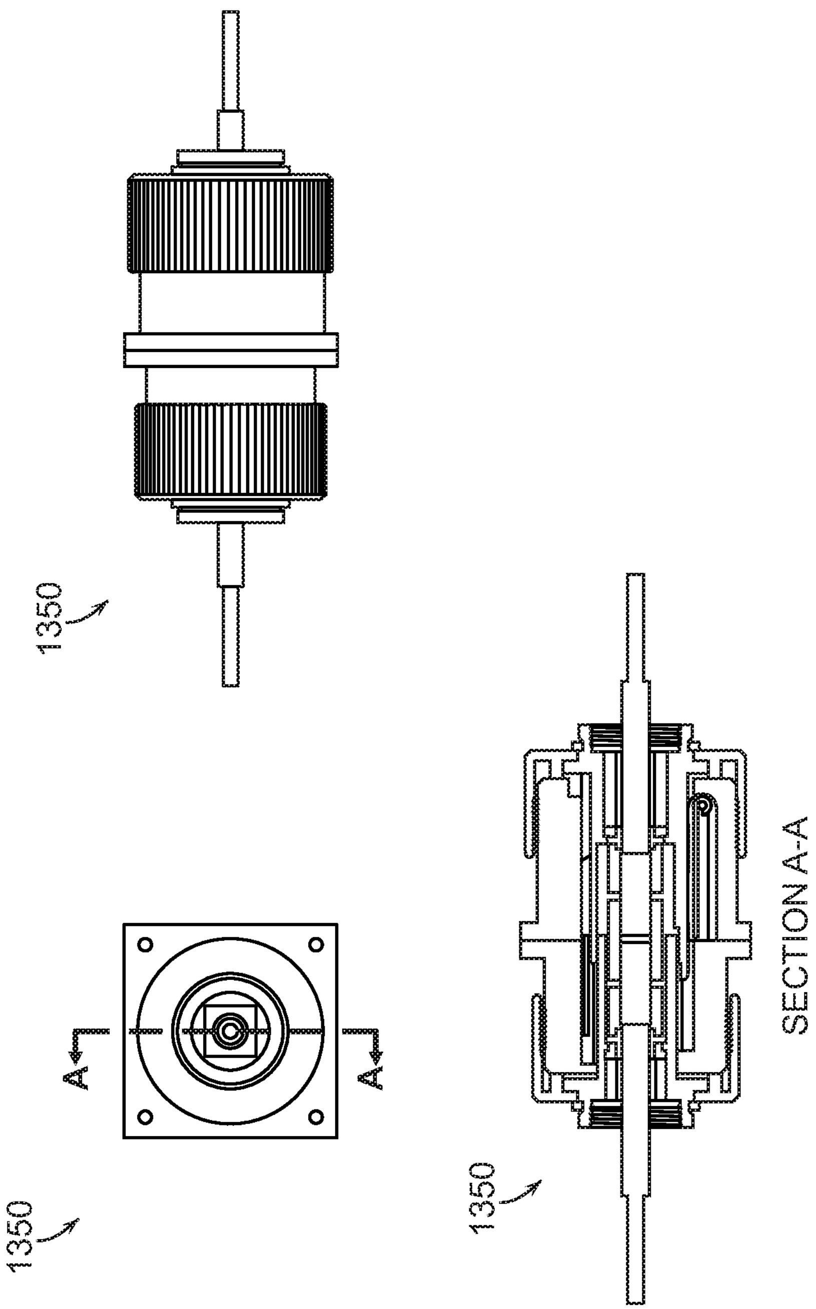
Figure 121:
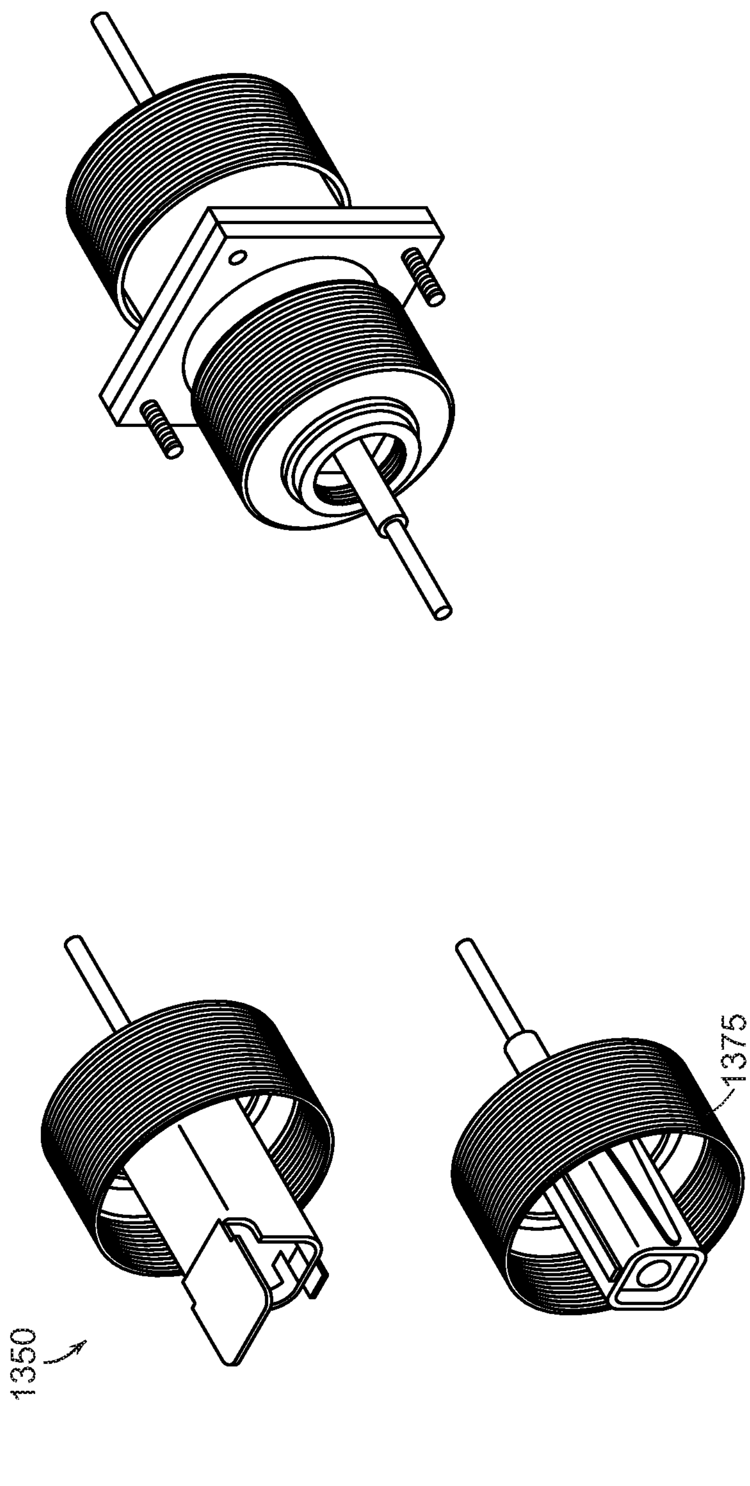
Figure 122:
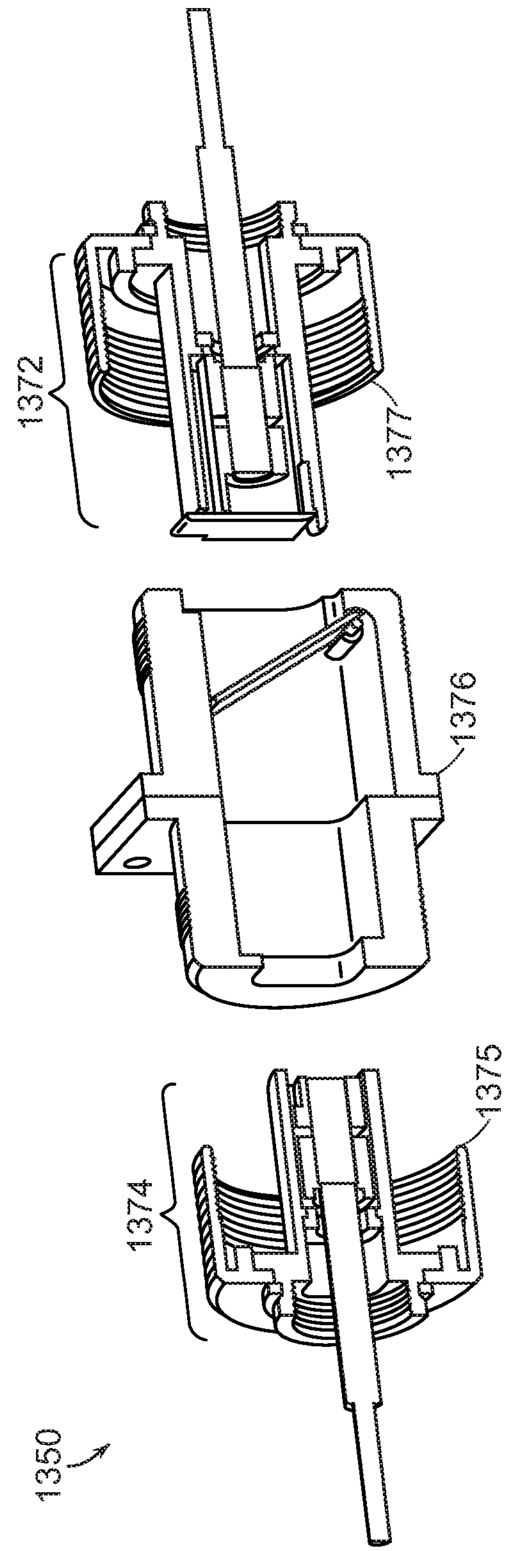
Figure 123:
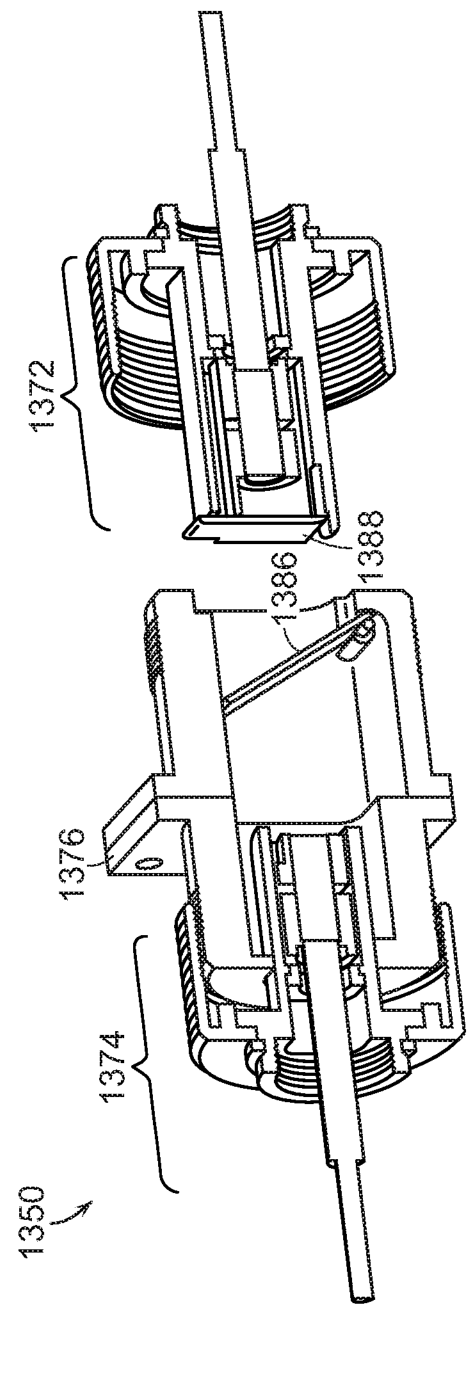
Figure 124:
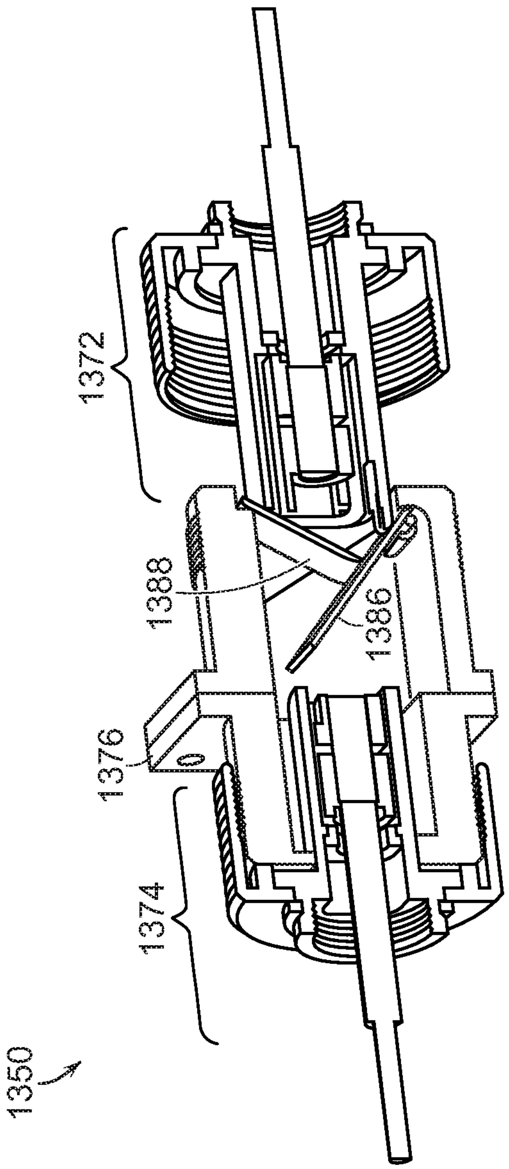
Figure 125:
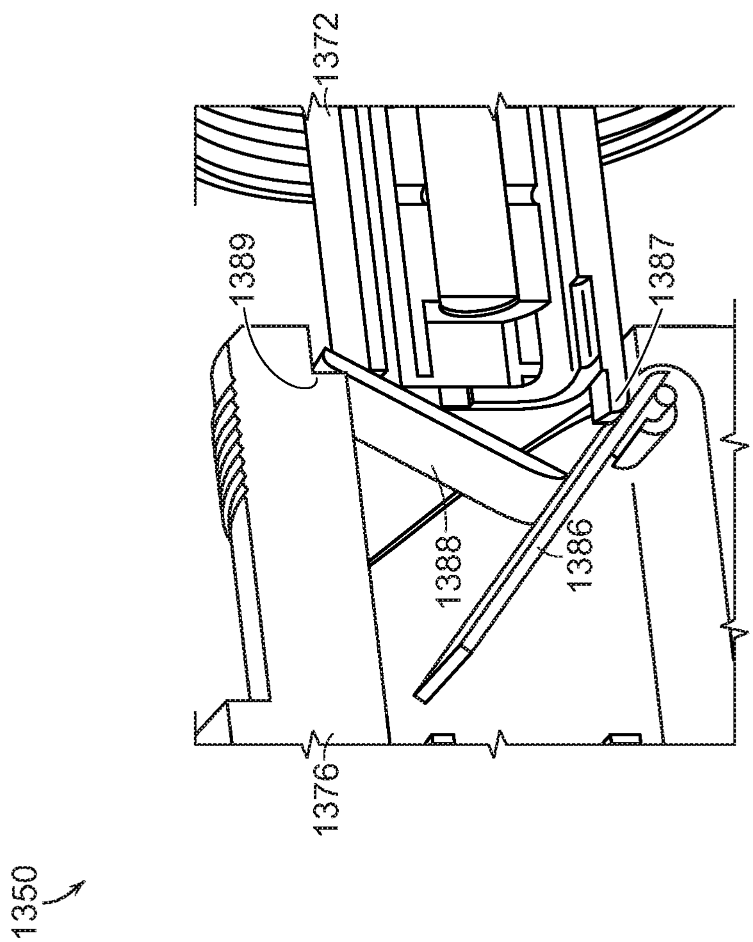
Figure 126:
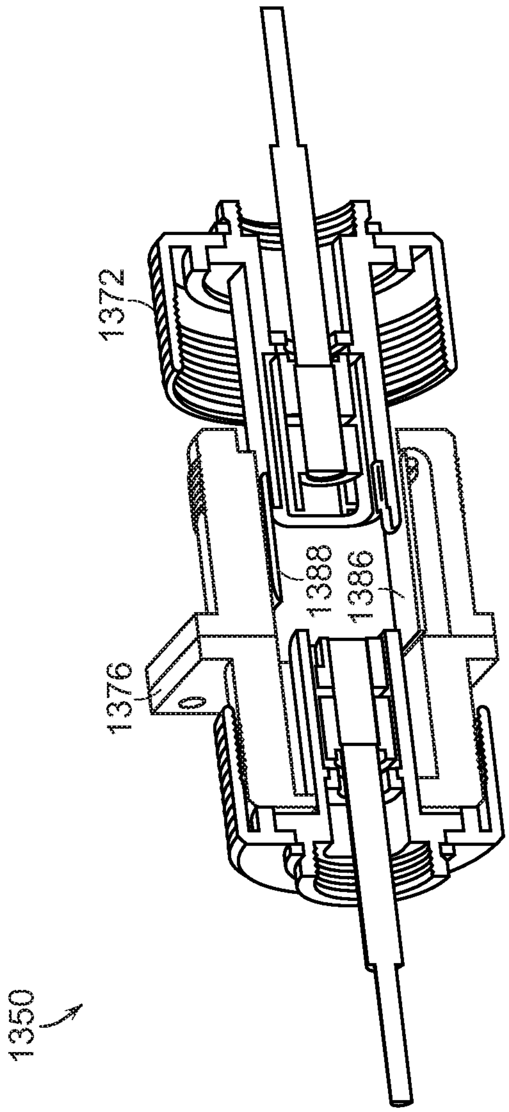
Figure 127:
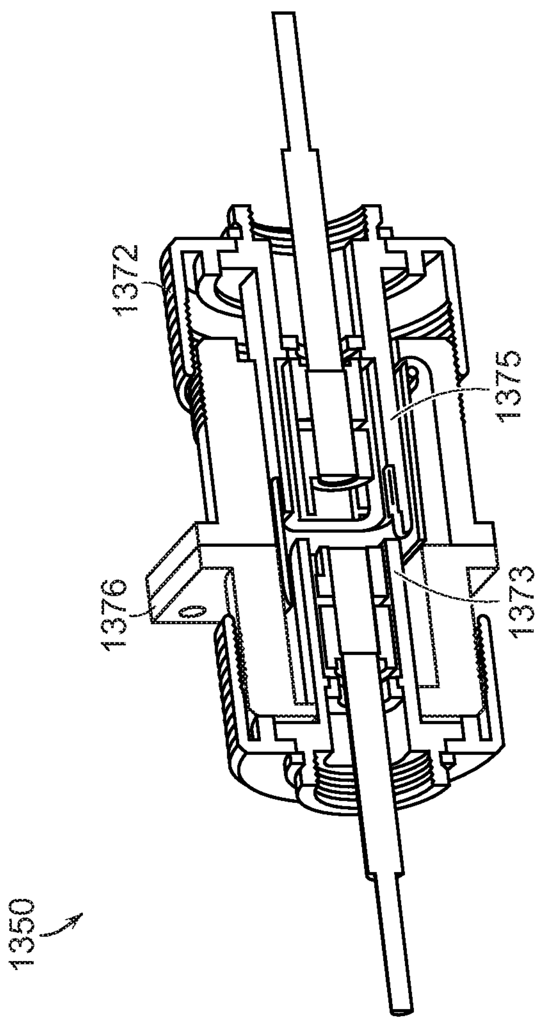

Cross-sections of an embodiment of a 38999 bulkhead-style complete outer connector and complete connector 1350 with door-style environmental seals are shown in FIG. 120 and FIG. 121. Details showing the connector 1350 and self-sealing door operation are shown in FIG. 122 through FIG. 127. The internal connector 1374 is inserted into the bulkhead connector housing 1376 and locked into place with the threaded 38999-style housing 1375. The external connector 1372 is also inserted into the bulkhead connector housing 1376, during which the bulkhead door 1386 is opened by the protrusion 1387 on the external connector 1372 and the connector door 1388 is in turn opened by a mating feature 1389 on the bulkhead connector housing 1376. Once inserted past the doors, the two internal alignment housings 1373 and 1379 engage each other and align the optics within as the connector completes insertion and is locked in place by the 38999-style housing 1377. This bulkhead connection can also be accomplished, for example, in embodiments without doors, containing a third internal alignment member or feature, and in styles other than the 38999-style.

Figure 128:
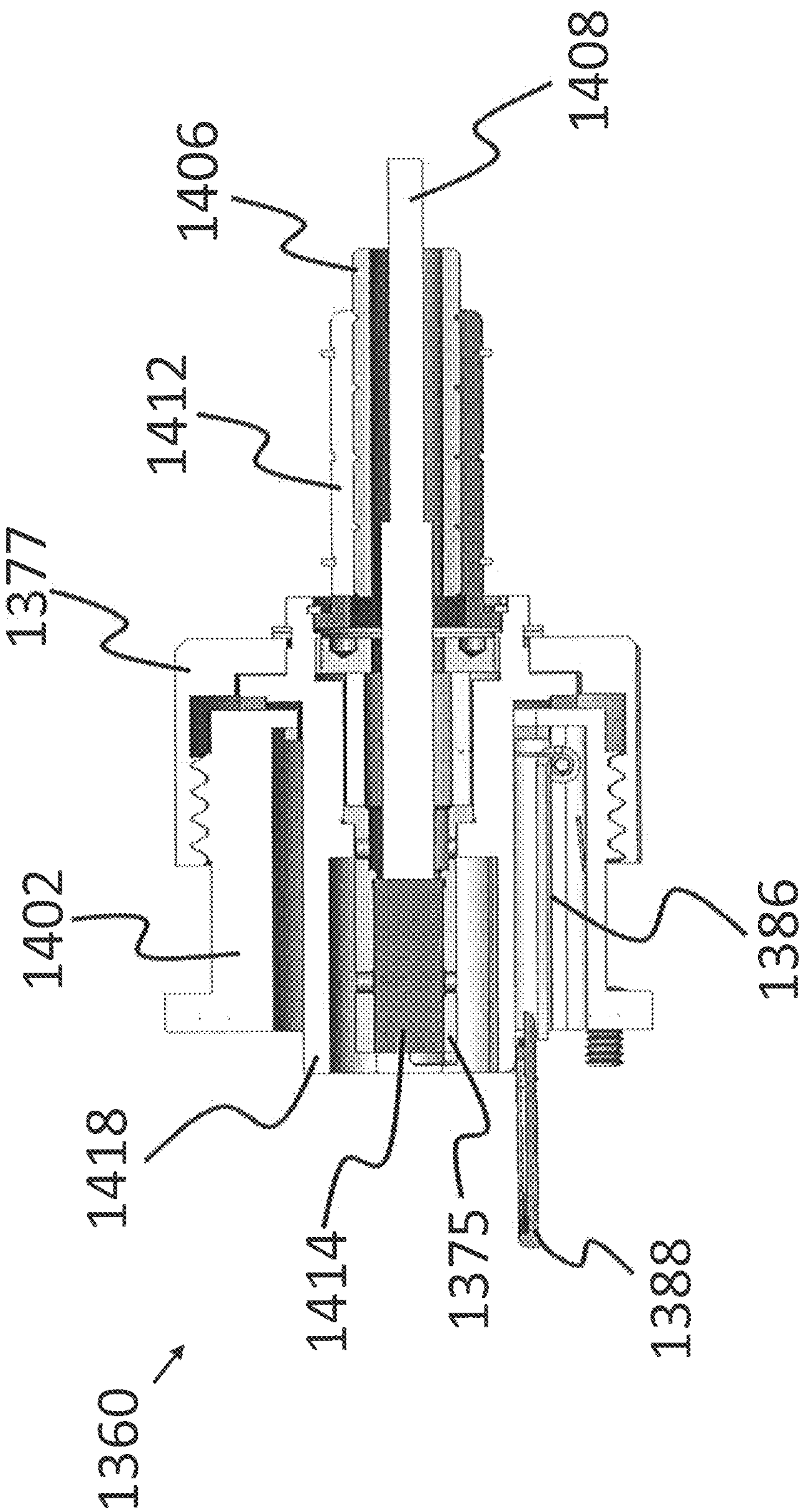
Figure 129:
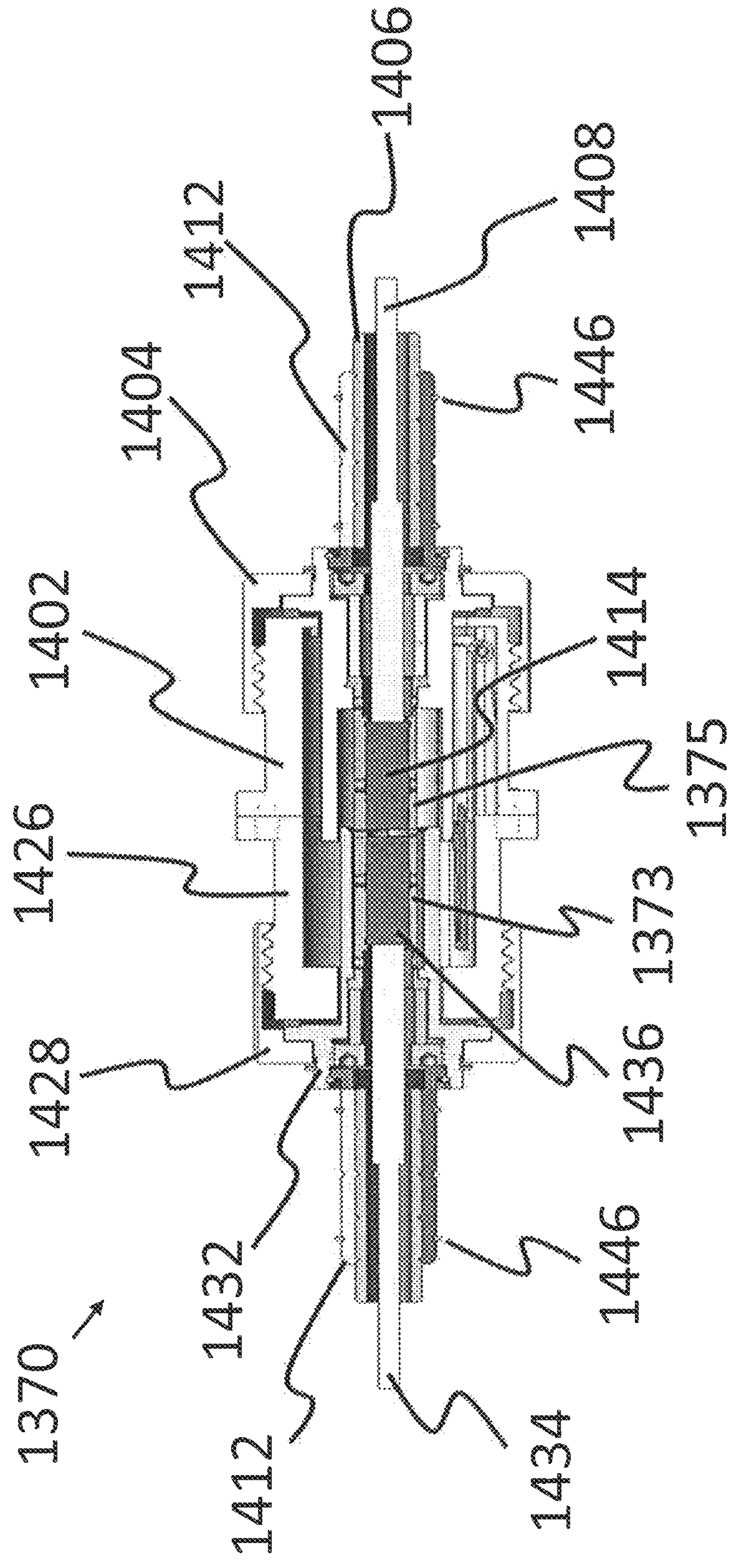
Figure 130:
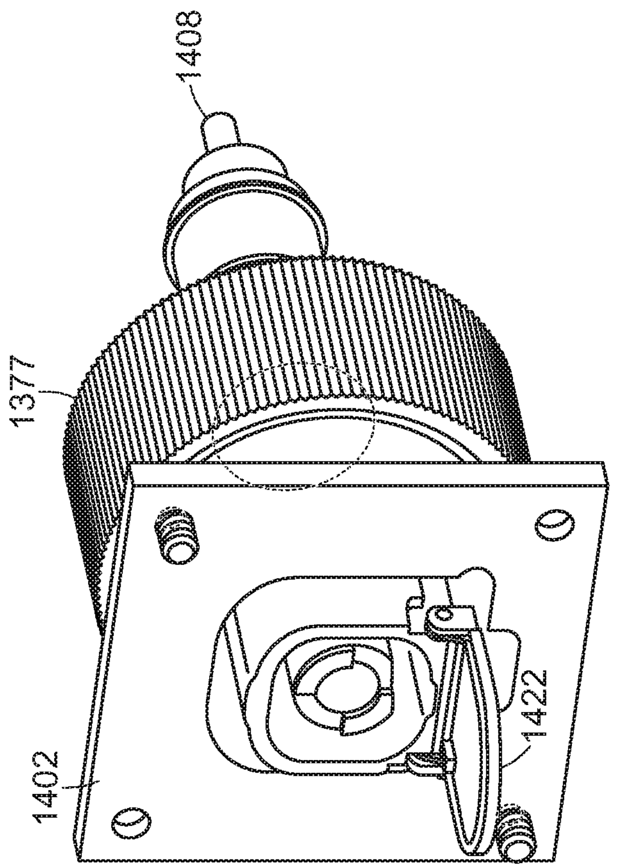
Figure 131:
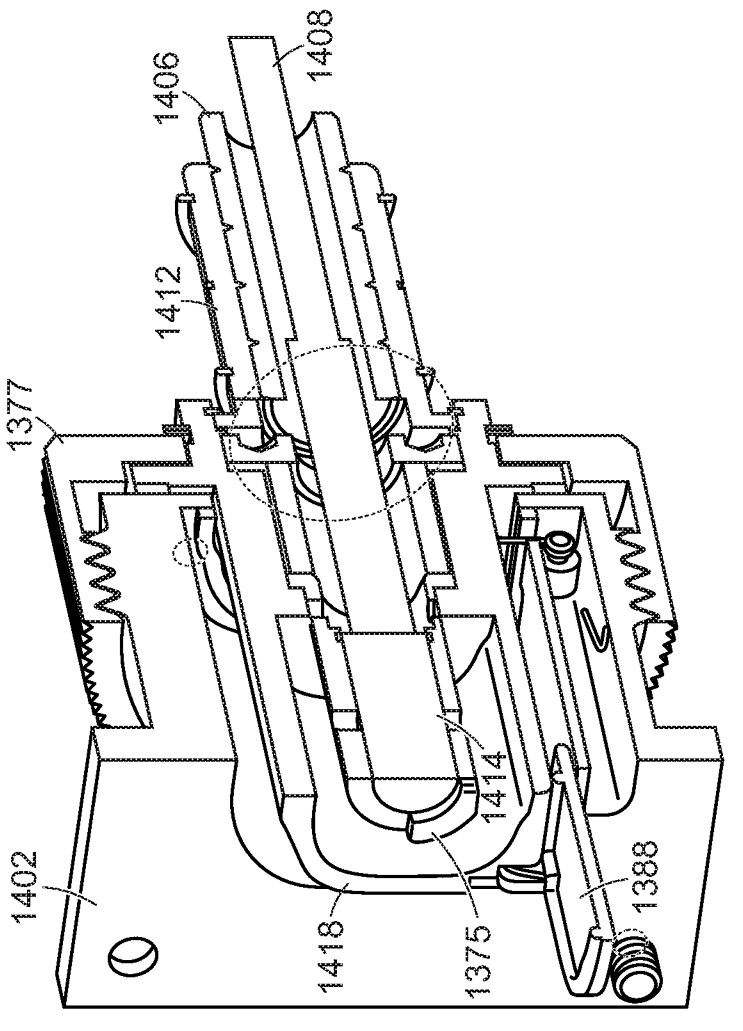
Figure 132:
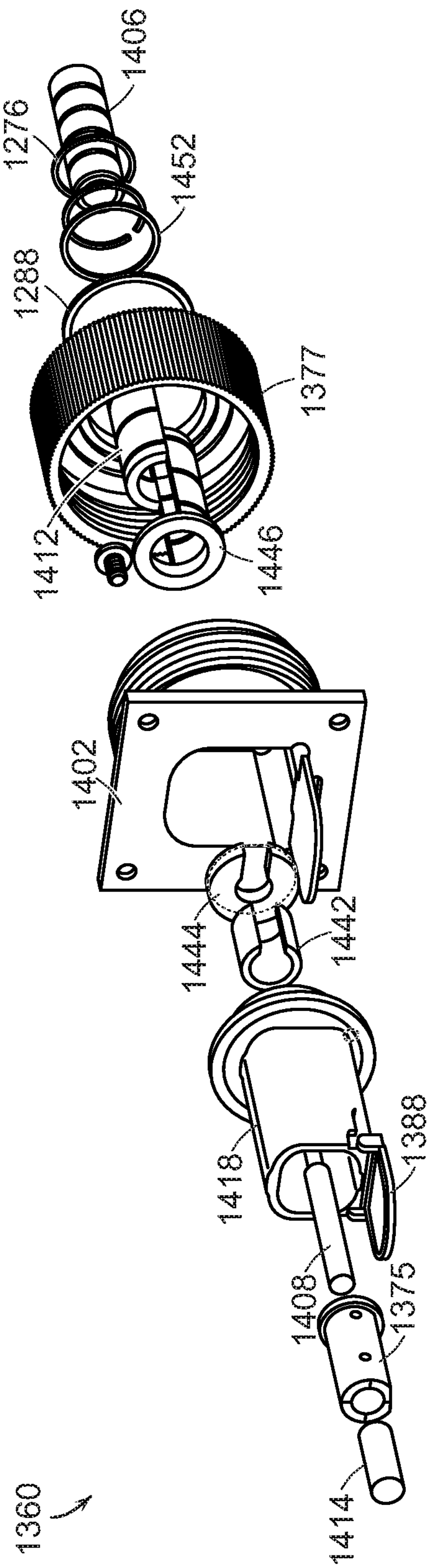

A cross section of a similar embodiment 1360 is shown in FIG. 128, followed by the complete connector 1370 cross-section in FIG. 129. Note that the external connector door 1388 actuates the opening of, and is in turn actuated by, the bulkhead housing door 1386 instead of features on the housings. The two halves 1426 and 1402 of the bulkhead connector housing 1376 provide attachment for the internal connector at its 38999-style collar 1428 and the external connector at its 38999-style collar 1377. The two imagers 1436 and 1414 are aligned by the alignment housings 1373 and 1375. Protective housings 1418 and 1432 contain the alignment housings 1373 and 1375 and allow attachment of the sheathing clamshells 1412 and 1446 and the sheathing 1406 to protect the two fiber bundles 1408 and 1434. Isometric views (both complete and cross-section) of the outside connector 1360 are shown in FIG. 130 and FIG. 131, respectively. An exploded isometric view of the outside connector is shown in FIG. 132. The bushing 1442 and spacer 1444 are to hold the alignment housing 1375 in position.

Gradient index (GRIN) rods are well known in the art, and are often used as optical collimators to collimate light from a source, in part because they provide object and pupil locations that are both external to the collimator. Unfortunately, the image quality that results from the use of these GRIN rods is commonly limited by spherical aberration and Petzval curvature, which increase the spot size and reduce the total throughput of systems that utilize these devices to couple light from one device to another. These aberrations can be reduced by replacing these GRIN rods with optical systems such as those described herein, which are specifically designed to provide the same external object and pupil locations, but with improved image quality.

Figure 133:
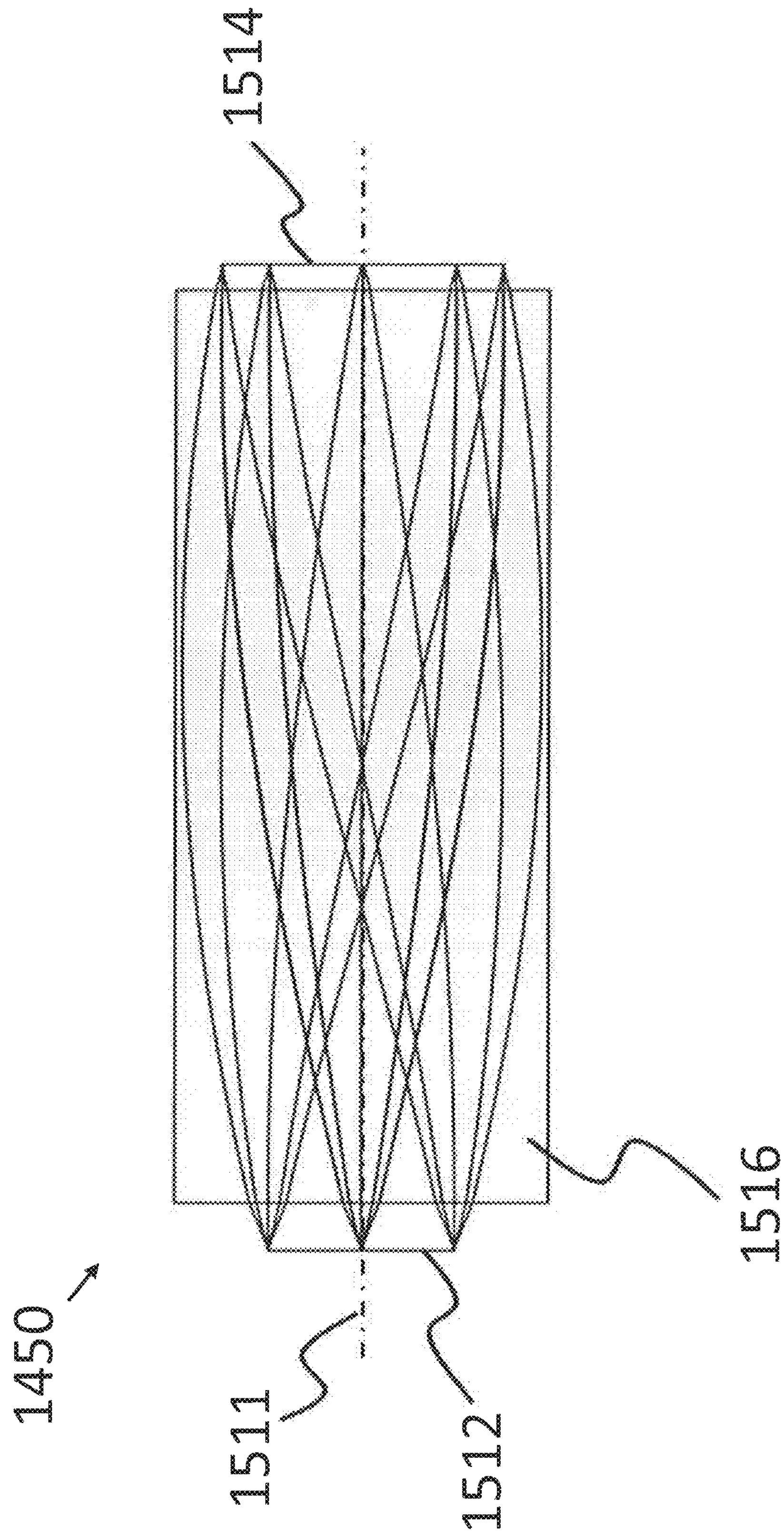

Reference is made to FIG. 133, which is a GRIN rod collimator 1450, taken along its optical axis 1511, the principles of which are well known in the art. Electromagnetic radiation, typically in the ultraviolet, visible, and/or infrared bands, hereinafter referred to generally as light, emitted or reflected by a given object, either real or virtual, hereinafter referred to generally as the source, located at the object plane 1512, is incident on a GRIN rod 1516, which is optically disposed between the object plane 1512 and an exit pupil 1514, and is capable of substantially receiving a portion of the light emanating from the object plane 1512 and substantially collimating the light at the exit pupil 1514.

Figure 134:
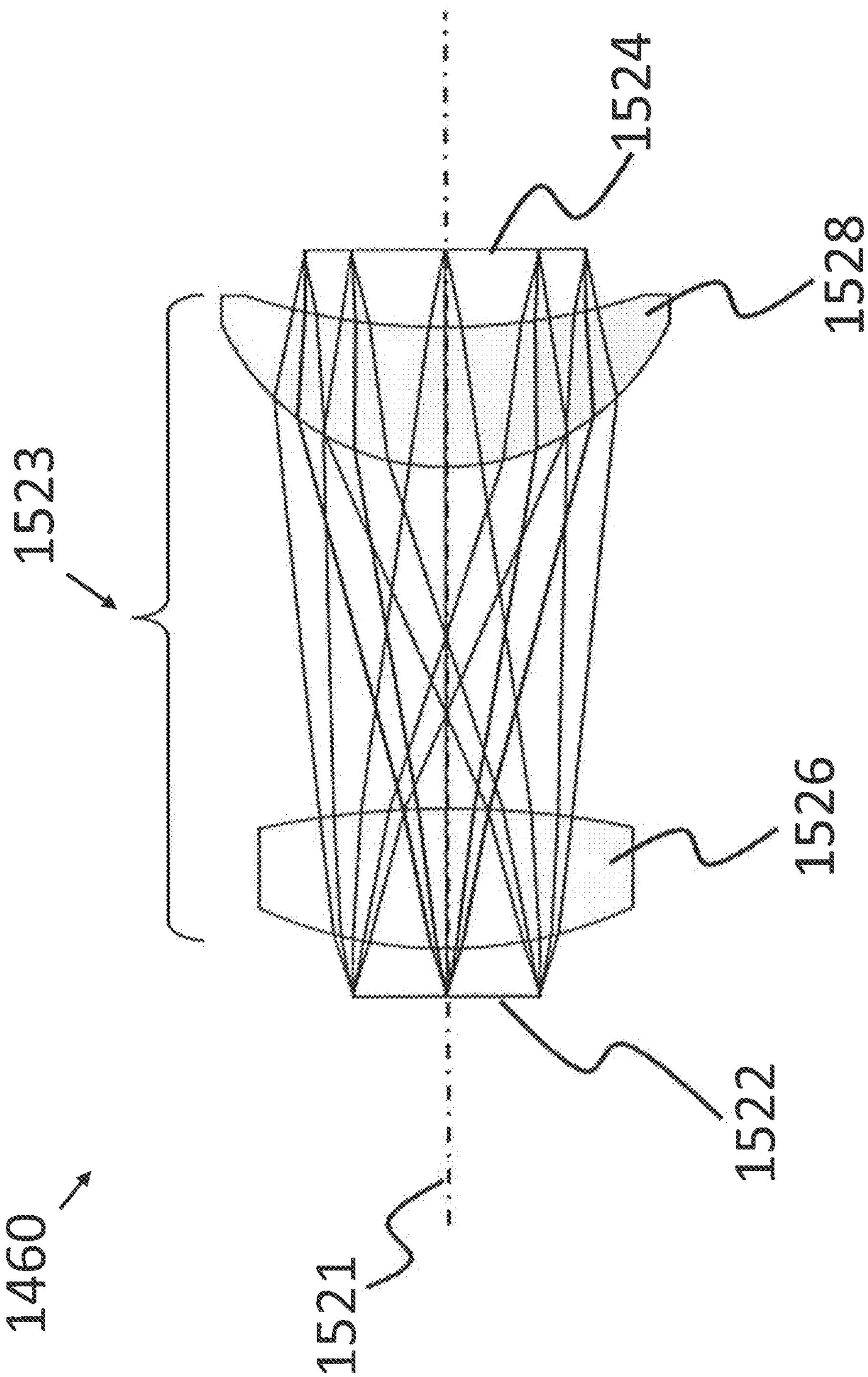

Reference is made to FIG. 134, which is an embodiment of an optical collimator 1460, taken along its optical axis 1521. Light emitted or reflected by a source located at an object plane 1522 is incident on an optical system 1523, in this embodiment made up of but not limited to refractive elements 1526 and 1528, which is optically disposed between the object plane 1522 and an exit pupil 1524, and is capable of substantially receiving a portion of the light emanating from the object plane 1522 and capable of substantially collimating the light at the exit pupil 1524, which is optically disposed such that the exit pupil 1524 is imaged substantially to infinity by the optical system 1523, making the imaging optical system substantially telecentric at the object plane 1522.

It is sometimes desirable to reduce the size of these collimators by folding them about certain locations within the optical system. This can be accomplished by inserting a light bending element into the optical system, either as a single element, a combination of elements, or as part of a combined optical element.

Figure 135:
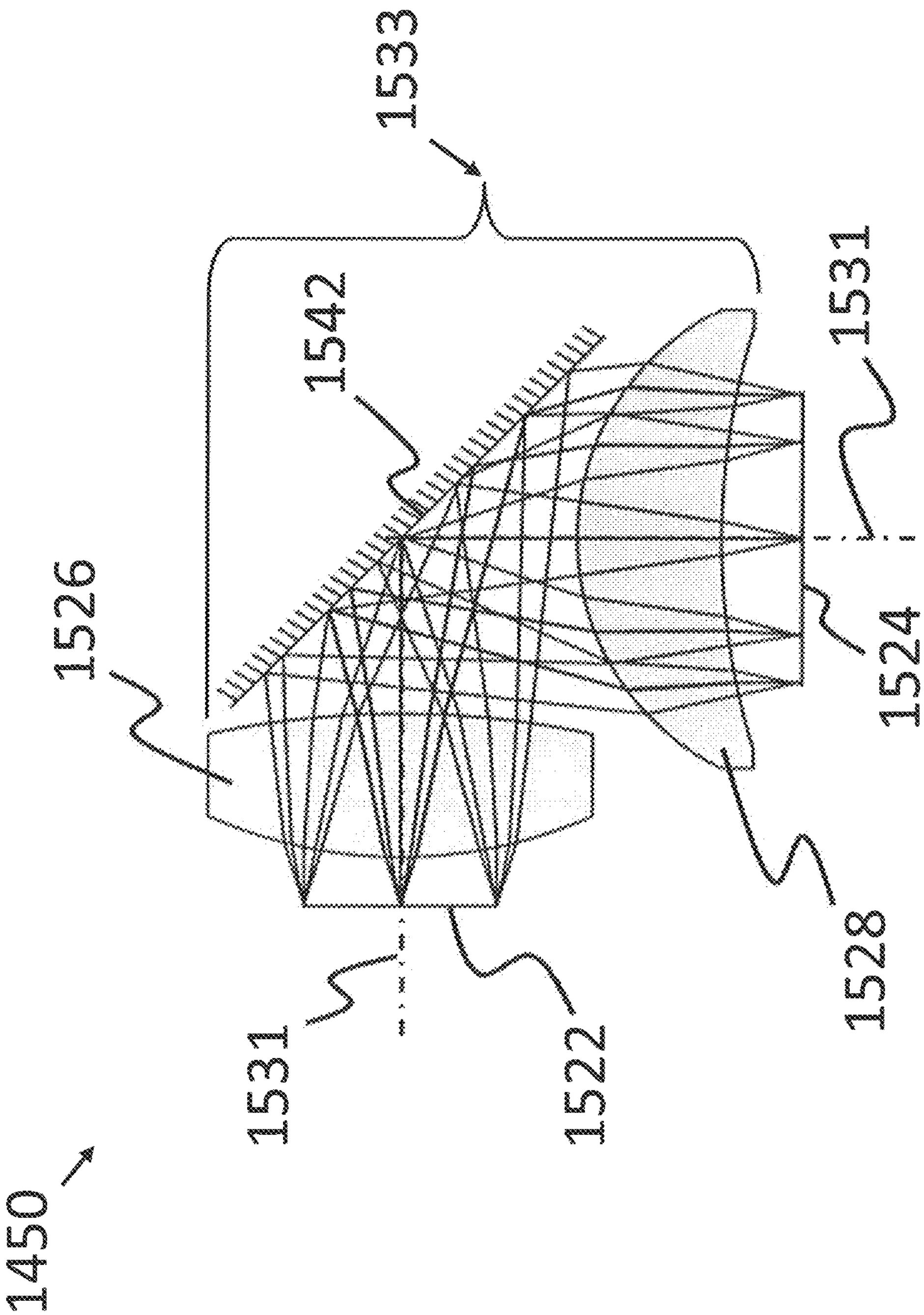

Reference is now made to FIG. 135, which is another embodiment of an optical collimator 1470, taken along its optical axis 1531, where a light bending element 1542 has been inserted into the optical system 1523 of the embodiment of the optical collimator 1460 illustrated in FIG. 134. Light emitted or reflected by a source located at an object plane 1522 is incident on an optical system 1533, in this embodiment made up of but not limited to refractive elements 1526 and 1528 and light bending element 1542, the preferred embodiment of which is a reflective optical element such as, but not limited to, a mirror, but in general is any method of bending light, hereinafter referred to generally as a light bending element. The optical system 1533 is optically disposed between the object plane 1522 and an exit pupil 1524, and is capable of substantially receiving a portion of the light emanating from the object plane 1522 and capable of substantially collimating the light at the exit pupil 1524, which is optically disposed such that the exit pupil 1524 is imaged substantially to infinity by the optical system 1533, making the imaging optical system substantially telecentric at the object plane 1522.

Figure 136:
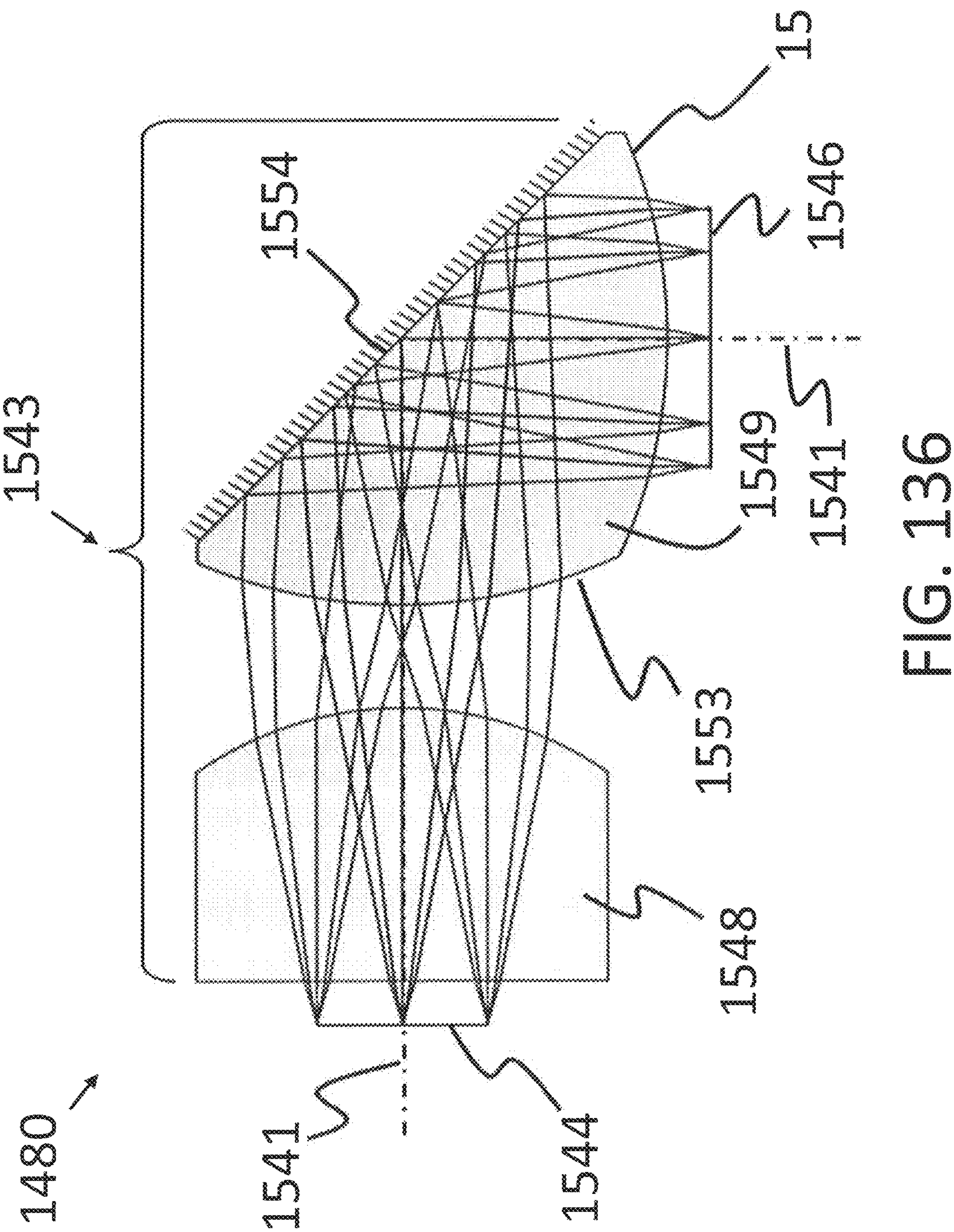

Reference is now made to FIG. 136, which is yet another embodiment of an optical collimator 1480, taken along its optical axis 1541. Light emitted or reflected by a source located at an object plane 1544 is incident on an optical system 1543, in this embodiment made up of but not limited to refractive element 1548 and catadioptric element 1549, the preferred embodiment of which is made up of, but not limited to, refractive surfaces 1552 and 1553 and reflective surface 1554. The optical system 1543 is optically disposed between the object plane 1544 and an exit pupil 1546, and is capable of substantially receiving a portion of the light emanating from the object plane 1544 and capable of substantially collimating the light at the exit pupil 1546, which is optically disposed such that the exit pupil 1546 is imaged substantially to infinity by the optical system 1543, making the imaging optical system substantially telecentric at the object plane 1544.

Figure 137:
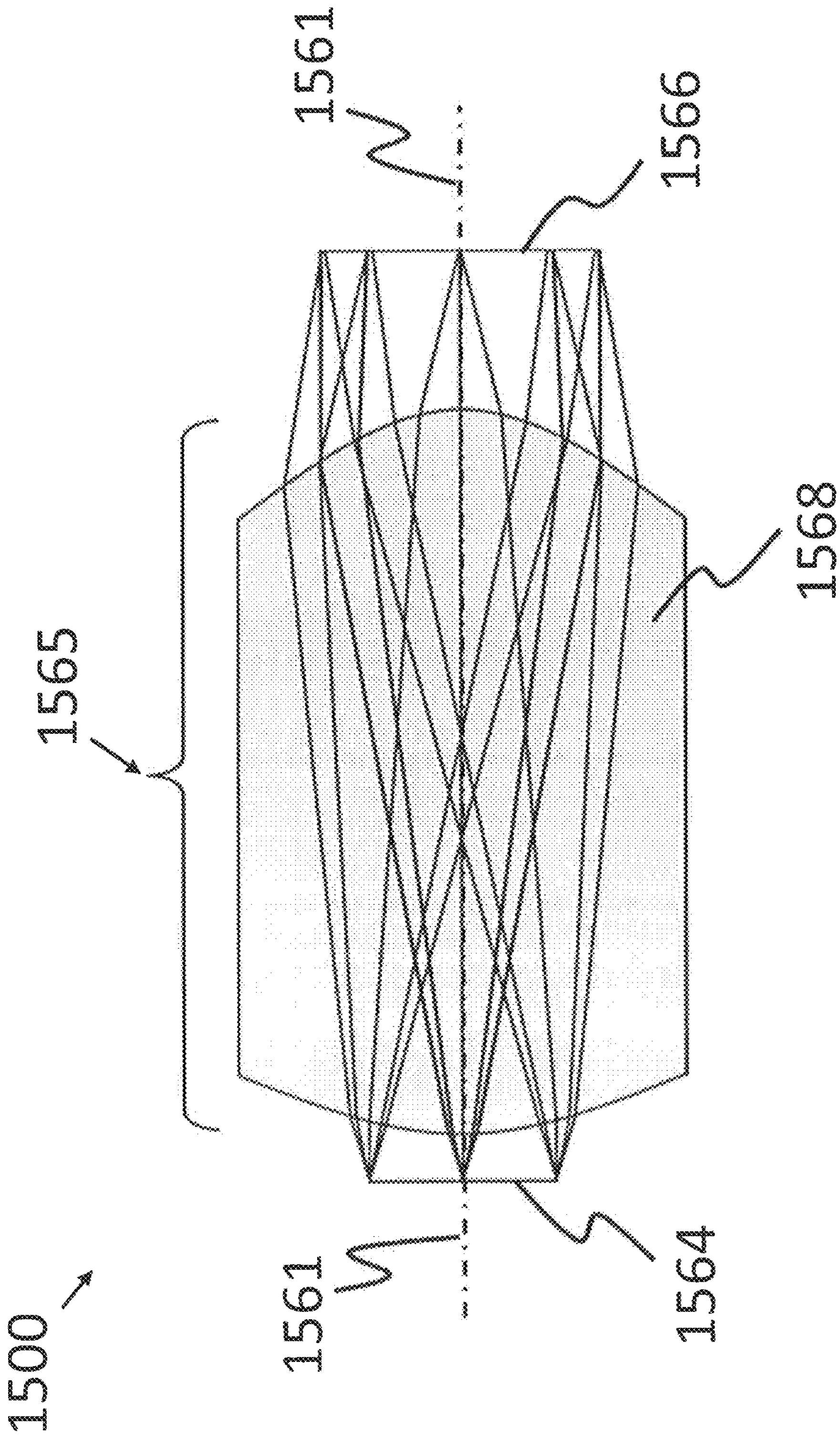

For purposes of simplicity of mounting, or reduced assembly tolerances, it is sometimes desirable to have the optical system be made up of only a single element. Since this reduces the number of variables that can be used to meet performance requirements, the design of such a system can be difficult. Reference is made to FIG. 137, which is an embodiment of an optical collimator 1500, taken along its optical axis 1561. Light emitted or reflected by a source located at an object plane 1564 is incident on an optical system 1565, in this embodiment made up of but not limited to aspheric refractive element 1568, which is optically disposed between the object plane 1564 and an exit pupil 1566, and is capable of substantially receiving a portion of the light emanating from the object plane 1564 and capable of substantially collimating the light at the exit pupil 1566, which is optically disposed such that the exit pupil 1566 is imaged substantially to infinity by the optical system 1565, making the imaging optical system substantially telecentric at the object plane 1564.

Figure 138:
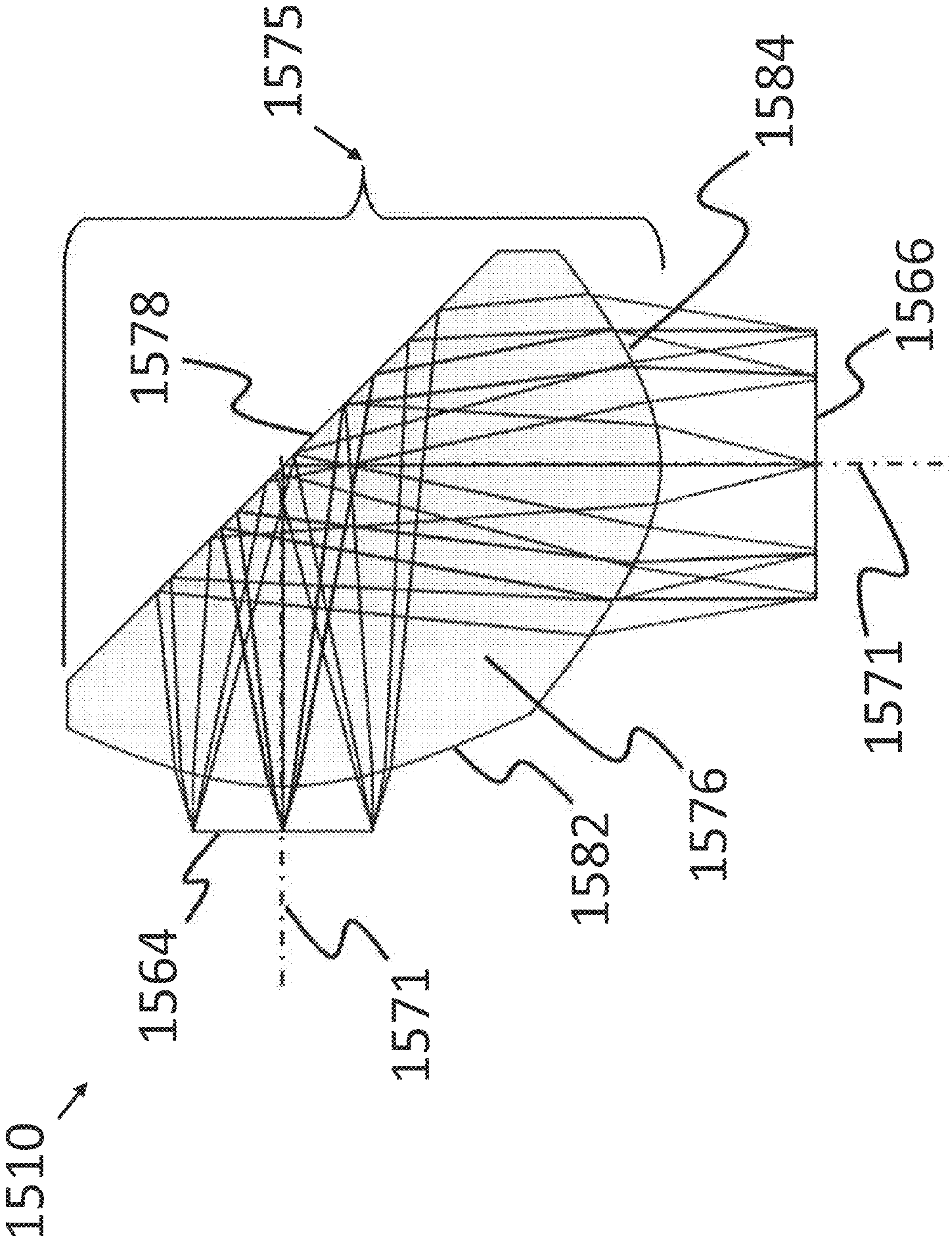

Reference is now made to FIG. 138, which is another embodiment of an optical collimator 1510, taken along its optical axis 1571, where a light bending element 1578 has been inserted into the optical system 1565 of the embodiment of the optical collimator 1500 illustrated in FIG. 137. Light emitted or reflected by a source located at an object plane 1564 is incident on an optical system 1575, in this embodiment made up of but not limited to catadioptric element 1576, the preferred embodiment of which is made up of, but not limited to, aspheric refractive surfaces 1582 and 1584 and reflective surface 1578. The optical system 1575 is optically disposed between the object plane 1564 and an exit pupil 1566, and is capable of substantially receiving a portion of the light emanating from the object plane 1564 and capable of substantially collimating the light at the exit pupil 1566, which is optically disposed such that the exit pupil 1566 is imaged substantially to infinity by the optical system 1575, making the imaging optical system substantially telecentric at the object plane 1564.

Figure 139:
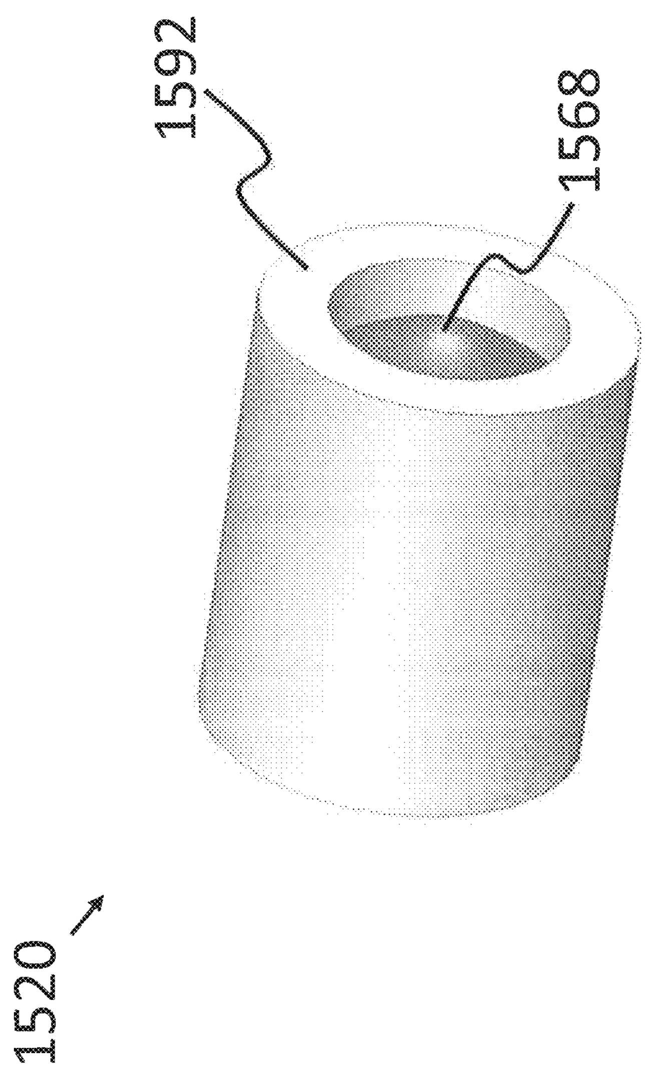
Figure 140:
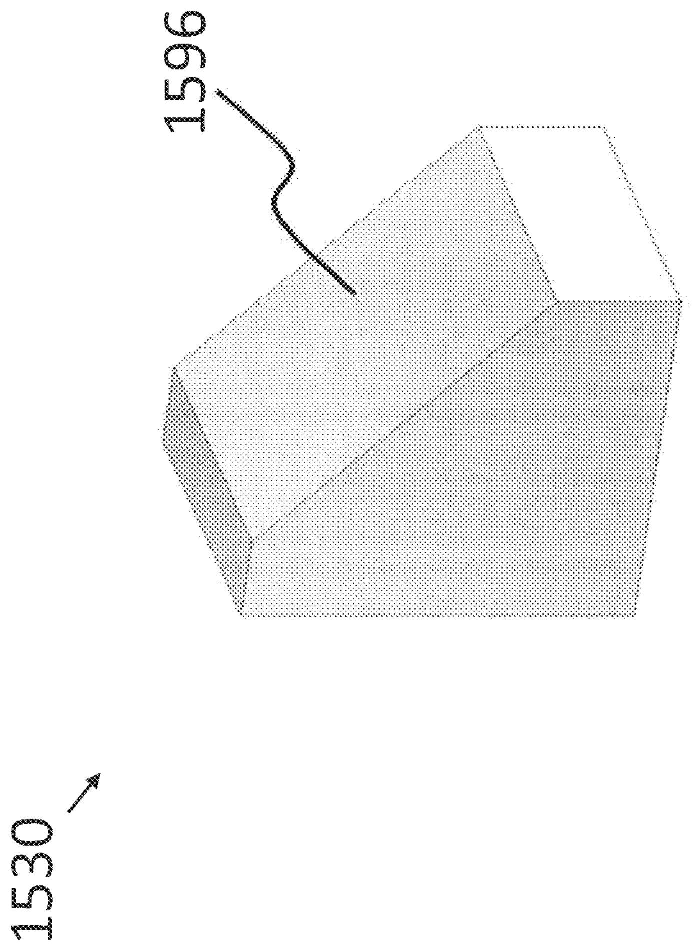

The simplicity in mounting of the single element embodiments of the optical collimators 1500 and 1510 are illustrated in FIG. 139 and FIG. 140 respectively. Reference is made to FIG. 139, which is an embodiment of an optical collimator 1520, where the aspheric refractive optical element 1568 is mounted within a mechanical housing 1592. Reference is now made to FIG. 140, which is another embodiment of an optical collimator 1530, where the aspheric catadioptric element 1576 is mounted within a mechanical housing 1596.

Figure 141:
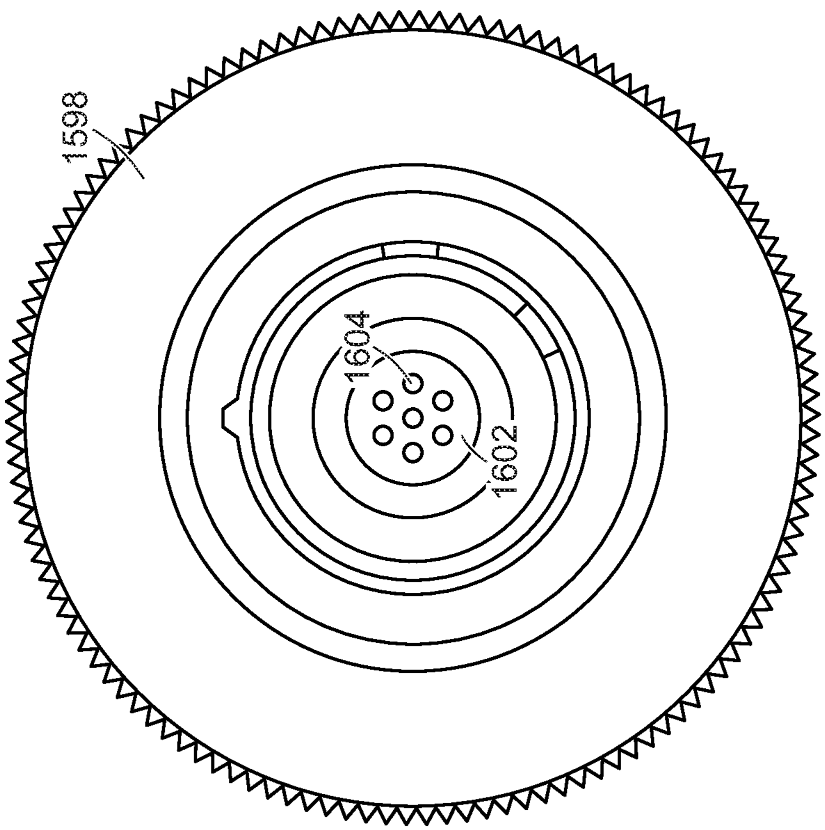
FIGS. 141-148 show embodiments of the optical collimators used in these teachings.

In many connector applications it is necessary to reduce or substantially prevent unwanted electromagnetic interference (EMI) in certain wavelengths that may be introduced to an electronics enclosure by the existence of a connection with the outside world. While the a connector such as the UDAT embodiments described will attenuate EMI in certain frequency regimes, some modification is needed if an improved cutoff frequency is desired. An EMI shield is a device or component that attenuates or substantially prevents undesired electromagnetic radiation from propagating through the connector and can achieve the desired added attenuation. One embodiment of an EMI shield is the EMI fiber shield, also herein described as the "EMI button", as shown in FIG. 141. FIG. 141 is a view looking toward a shielded connector from the shielded side. The large group of fibers encounters the shield and breaks into smaller groups of fibers sufficiently small enough to pass through one of an array of small holes 1604 in a metal disk 1602 which forms the EMI Fiber shield. When this EMI fiber shield is soldered or incorporated into the metallic housing 1598 of the connector or breakout, the only penetrations through metal are the small holes containing the fibers, which extend through the thickness of the EMI shield. The size of these holes is smaller than the desired minimum wavelength of attenuation, effectively making a waveguide beyond cutoff. The depth of the holes determines the amount of attenuation. This EMI button can be incorporated into many connector designs, including a generic self-sealing UDAT connector as shown in FIG. 129.

Figure 142:
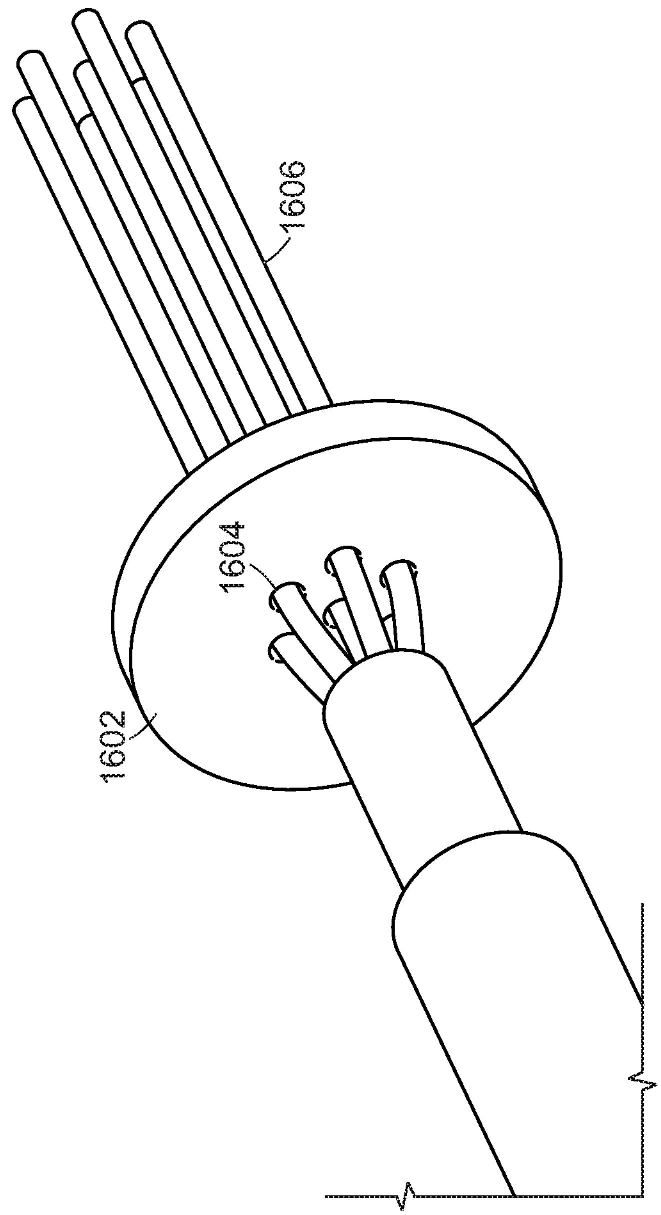

The embodiment of the EMI fiber shield 1602 shown in FIG. 142 has 7 holes, each 0.5 mm diameter, on a 2 mm hexagonal pitch. The front and rear hole surfaces are flared 1604 to reduce fiber wear. The holes can be lined with, for example, HDPE, or another wear resistant material, to further reduce possible wear on the fibers 1606 from sliding or vibration. The EMI shield thickness can be extended as required for the degree of EMI extinction (acting as a waveguide beyond cutoff).

Figure 143:
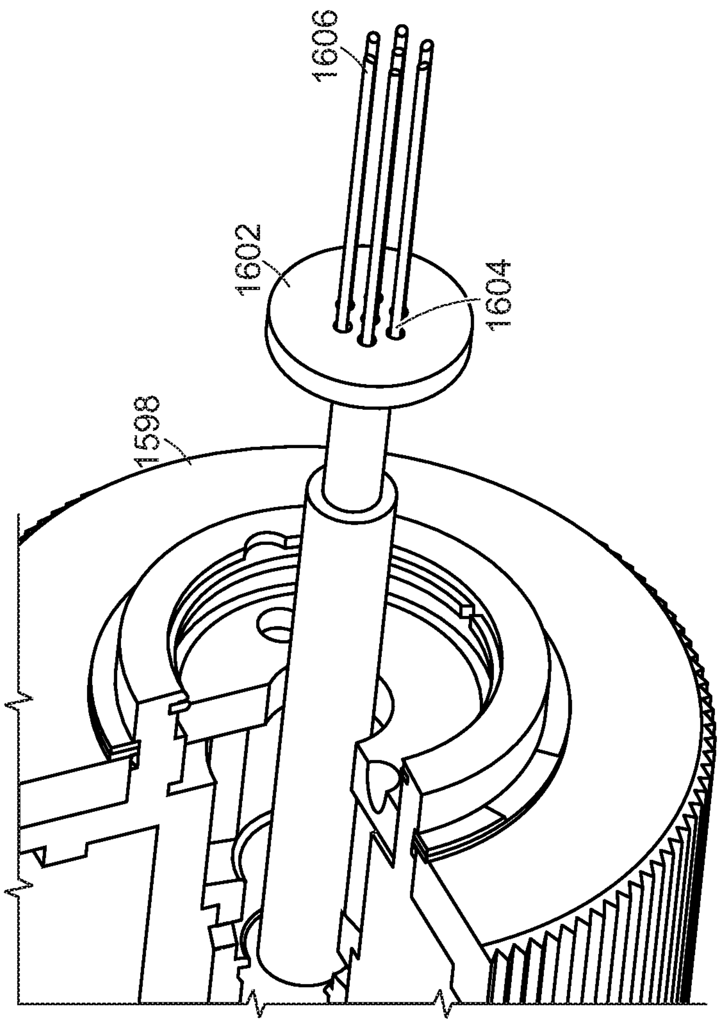
Figure 144:
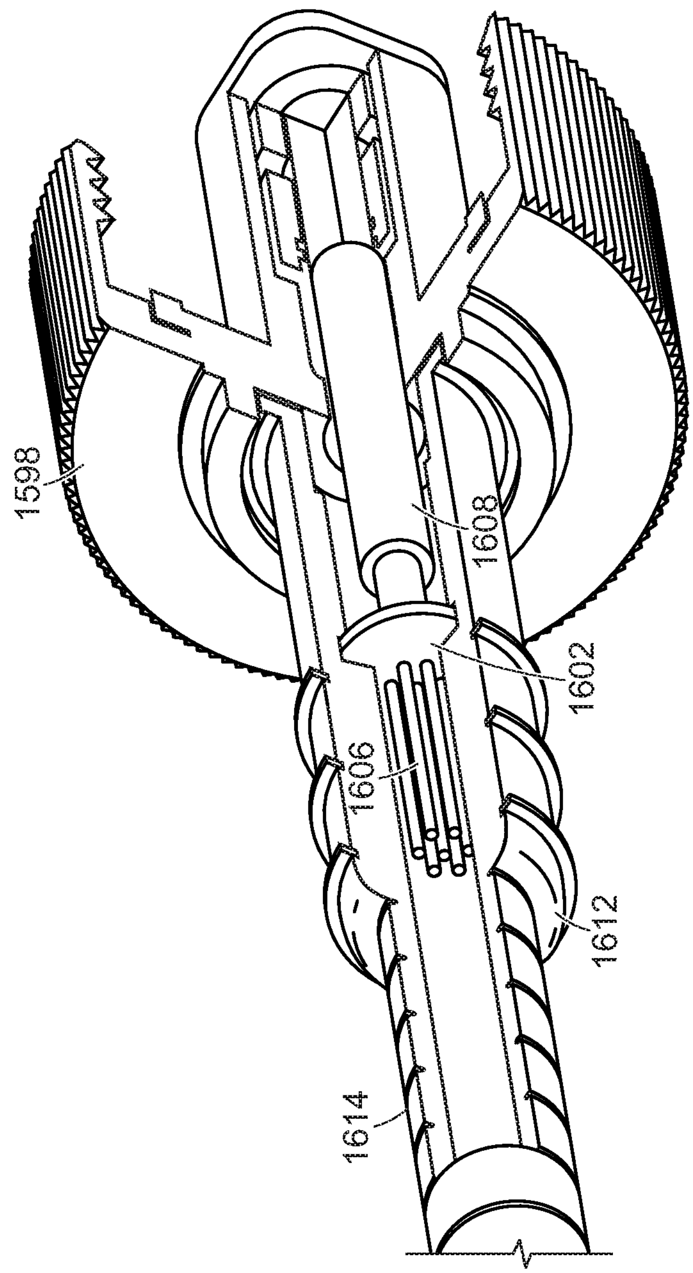

In FIG. 143, small groups of fibers 1606 pass through the 7 EMI fiber shield holes 1604. On this side of the shield the fibers may be loose, but are shown as cylinders here for simplicity. The generic 38999-style optical connector 1598 shown in FIG. 144 is used to illustrate the EMI fiber shield as shown in cutaway view. After passing through the EMI shield, the fibers 1606 enter the sheathing clamshell 1612 and the sheathing 1614 to be routed to their origin or destination. The EMI shield is scalable to other fiber counts, hole count/sizes, cutoff wavelengths, etc. The EMI fiber shield is conductively attached to the conductive enclosure by means of being conductively attached to the connector housing. Attachment in this embodiment is achieved by soldering, but in other embodiments could be achieved, for example, by welding, crush gasket, brazing, pressing, crimping, or tight contact and its thickness optimized for desired attenuation.

Figure 145:
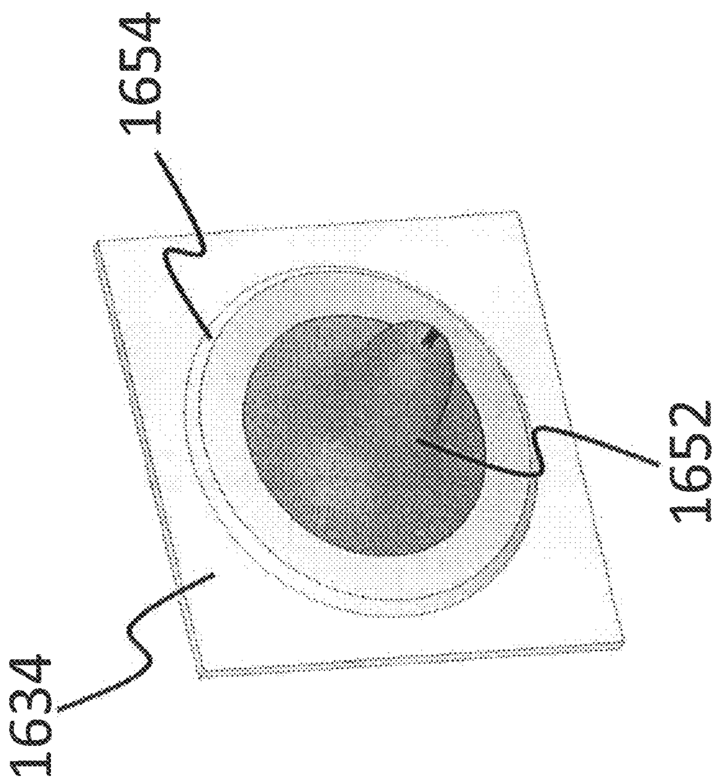
Figure 146:
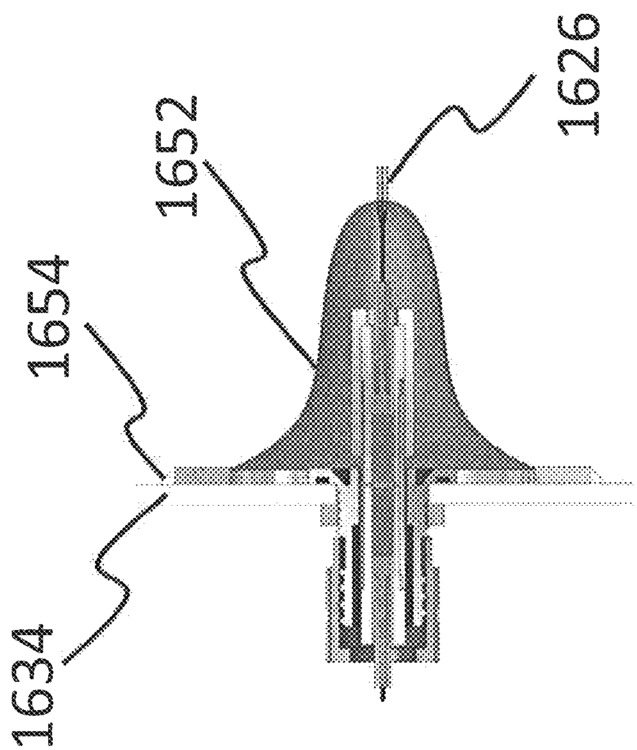

Another shielding device method is to pass the fibers 1626 through a metal mesh screen 1652, as in the embodiment in FIG. 145 and FIG. 146, thus limiting the pass-through size to the mesh openings. For example, Ø150 μm fibers would require approximately 200 μm openings in the mesh. The mesh 1652 is conductively attached to the enclosure 1634, or connector housing, using solder 1654 or by another means such as the examples mentioned for the EMI fiber shield 1602.

Figure 147:
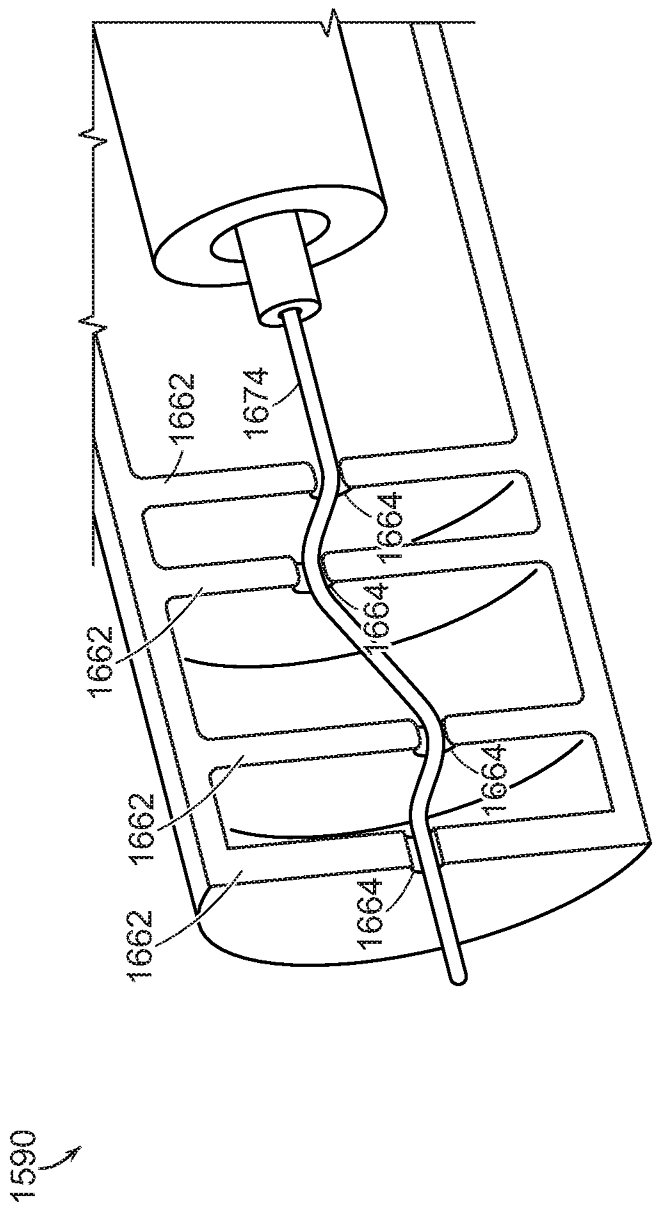
Figure 148:
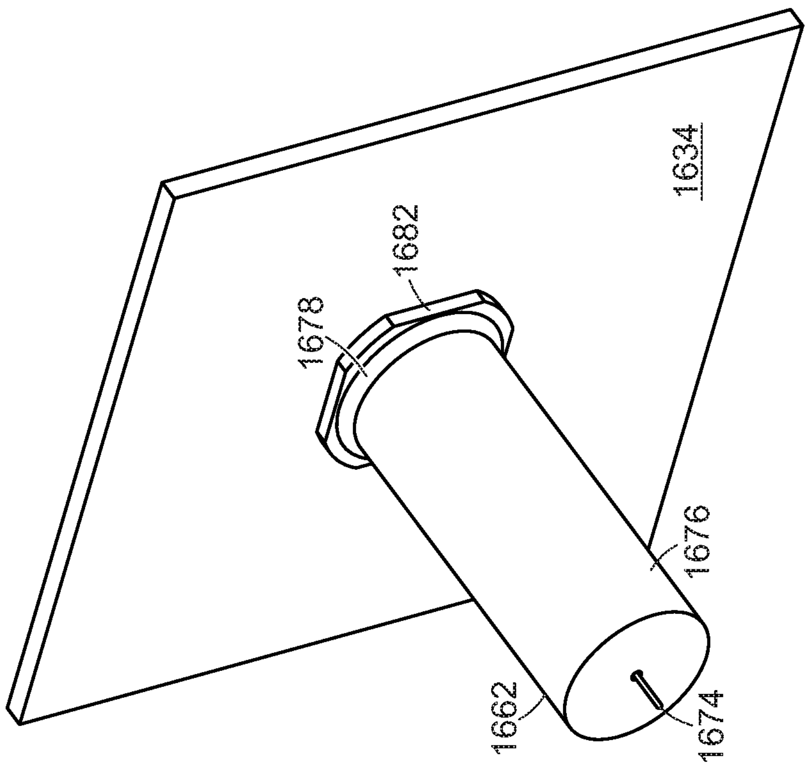
Figure 149:
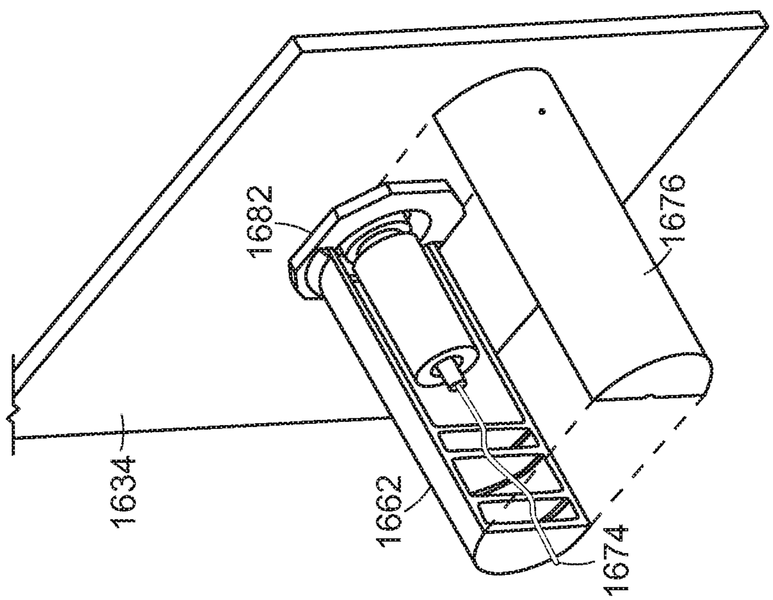
FIGS. 149-162 show embodiments of the electromagnetic interference (EMI) shields used in these teachings.
Figure 150:
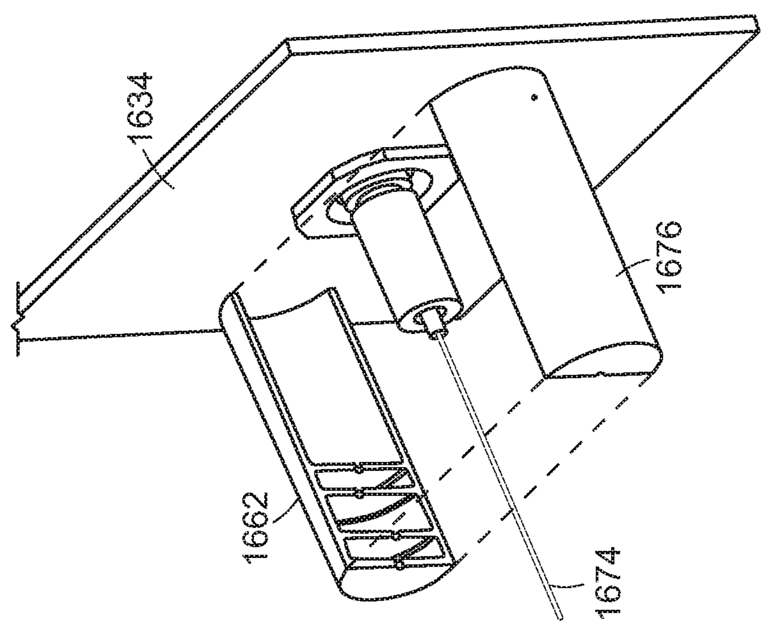
Figure 151:
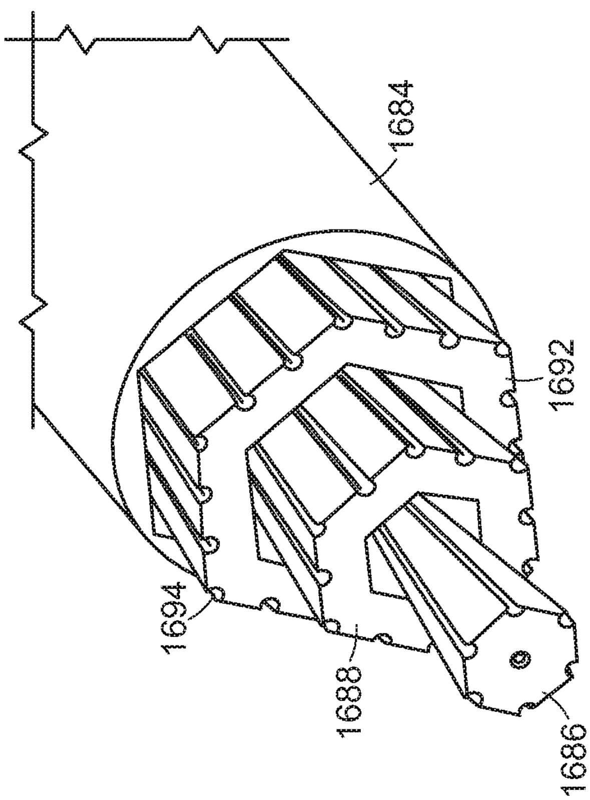
Figure 152:
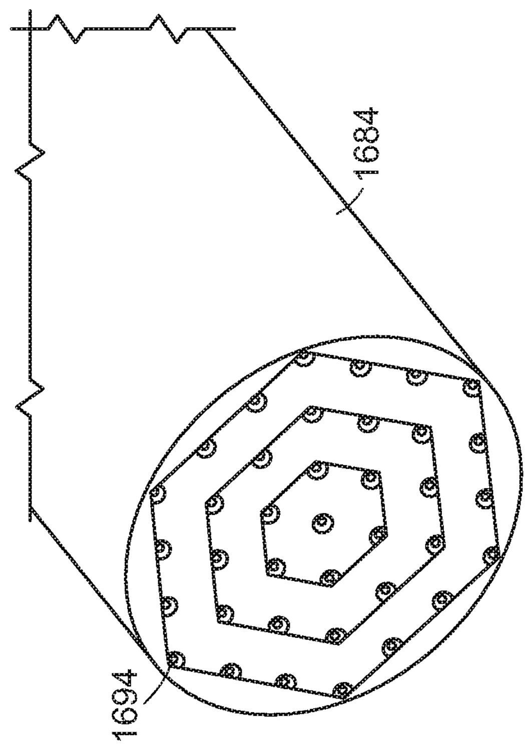
Figure 153:
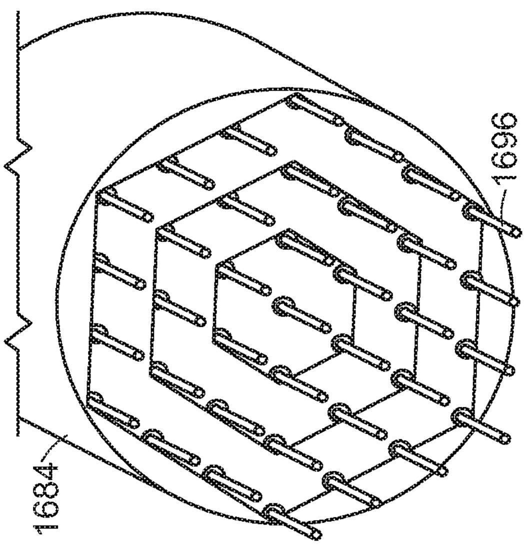
Figure 154:
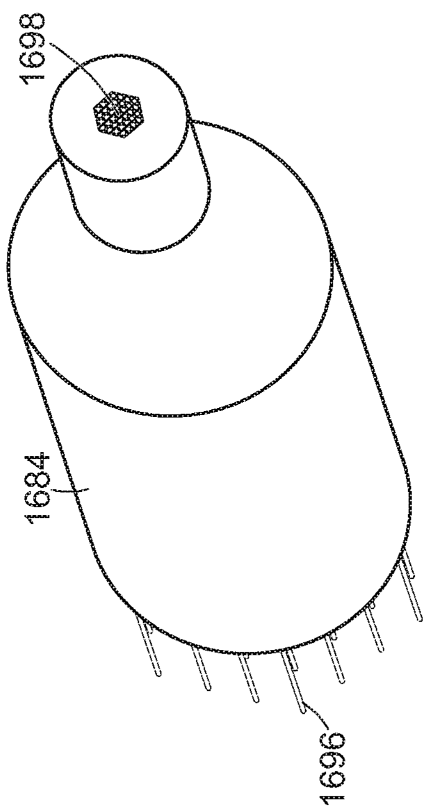

Another EMI shield device approach is to bend the fiber bundle in such a way as to prevent a line-of-sight path through the shield. In labyrinthine-path embodiment 1590, the fiber bundle 1674 is passed through a clamshell of baffles 1663 with holes 1664 that are not coaxial, as shown in FIG. 147. This embodiment attenuates the EMI sequentially through multiple baffles 1663. This embodiment is simple to integrate into a connector system, as assembly only requires feeding the fiber bundle through the serpentine path and connecting the two shield halves 1662 and 1676, then conductively attaching by means of, for example, soldering 1678, to provide a solid ground to the enclosure 1634. In this case, the ground to the enclosure is achieved through the connector housing 1682. This system can be retrofit onto existing assembled fiber bundles. Again, as with the EMI button design, removal of the clamshells 1662 and 1676 merely requires removal of the solder fillet 1678 or other conductive fixture. The use of RF EMI absorbing media or coatings in the chambers or on the chamber walls is also helpful. FIG. 148 shows a fully assembled EMI clamshell over the connector, FIG. 149 show one shell 1676 removed, and FIG. 150 shows both shells removed and desoldered.

The stacked EMI shield/fiber funnel is yet another embodiment of an EMI shield, due to its small holes and long path lengths. The fiber funnel EMI shield is shown in FIG. 151 through FIG. 154. The fiber funnel is also herein referred to as a stacked shield, since the metal components fit together as a set of stacked hexagonal cones 1686, 1688, 1692, and 1684. While it may be difficult to machine clearance holes for individual fibers, it is simple enough to machine small grooves 1694 on the outside of the parts. As is evident in FIG. 151 and FIG. 153, the fully assembled components provides an excellent EMI shield, with openings only approximately Ø200 μm. For extreme EMI applications, the individual components of the stacked shield can be coated with tin prior to assembly and then heated to solder the components together, ensuring solid grounding between all parts. The completed fiber funnel assembly 1610 can be soldered, welded, brazed, conductively epoxied, or otherwise conductively affixed to the connector housing or enclosure to complete the EMI shielding of the connector. Fibers 1696 in the fiber funnel assembly 1610 (shown in FIG. 151-FIG. 154) are routed through the funnel and out of the opening 1698 to form an array for the connector, while providing improved EMI attenuation.

Figure 155:
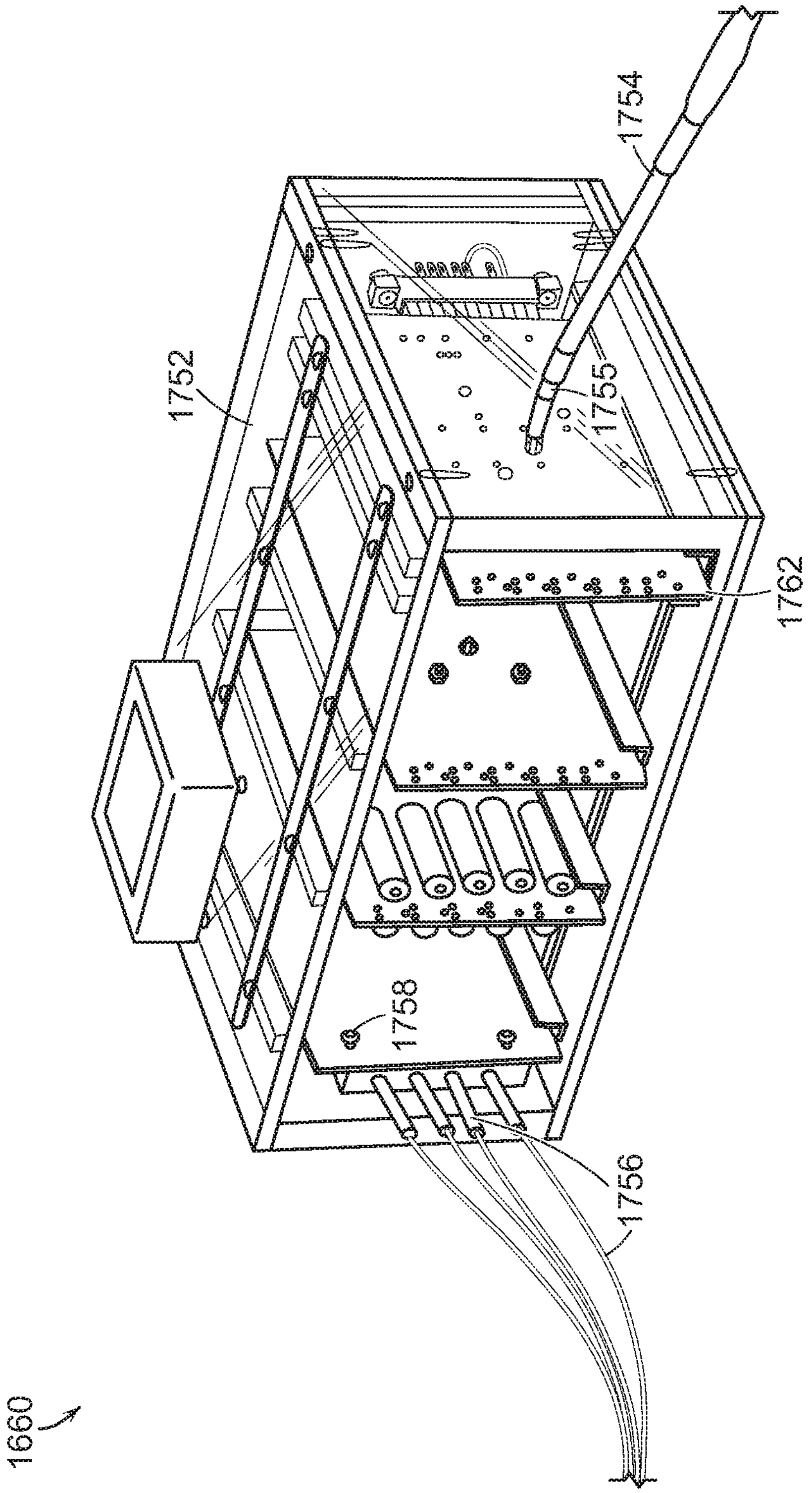

A reduction-to-practice of these teachings is the Fiber Array Board Interface (FABI) Demonstrator 1660, described herein, which consists of a card cage chassis that imitates an aerospace vehicle management system computer box, as shown in FIG. 155. This custom FABI demonstrator card cage includes interchangeable aluminum walls and transparent Plexiglas walls, which enable observation of the FABI operation. The card slots in the FABI demonstrator are intentionally designed with loose slots and alignment "slop" in order to demonstrate the large degree of alignment tolerance afforded in the FABI technology.

The emitter circuit board 1758 in the FABI demonstrator 1660 includes four colored emitters, each with a UDAT connector. A UDAT cable plant 1754 was fabricated with four broken-out UDAT connectors 1756 on one end and a single large fiber-count UDAT connector 1755 on the other end. Each of the four UDAT connectors 1756 in the breakout end of the UDAT cable plant 1754 will be inserted in the UDAT connector of a corresponding colored emitter on the emitter circuit board 1758. The FABI functionality will then be demonstrated by coupling these many fiber-optic channels directly onto a detector circuit board 1762 using the large-fiber count UDAT connector 1755. The complete feasibility of this FABI technology will be demonstrated by coupling the many fiber-optic channels onto a single CCD array on a receiving circuit board. Both the circuit boards and the UDAT connectors will be designed with loose tolerances so that the wide alignment tolerance inherent in the UDAT and FABI technologies will be clear.

Figure 156:
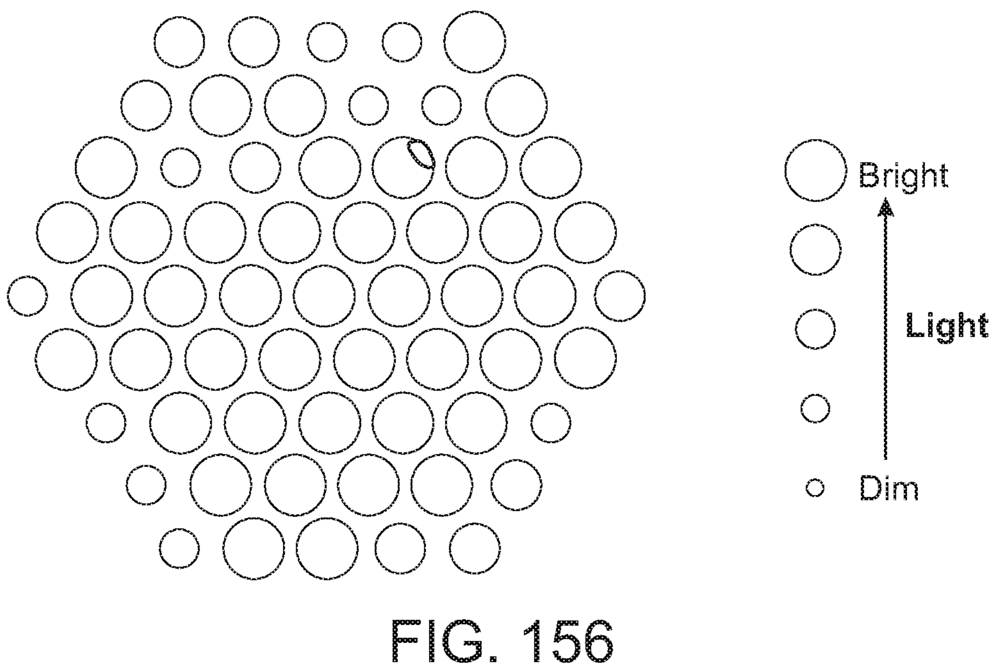
Figure 157:
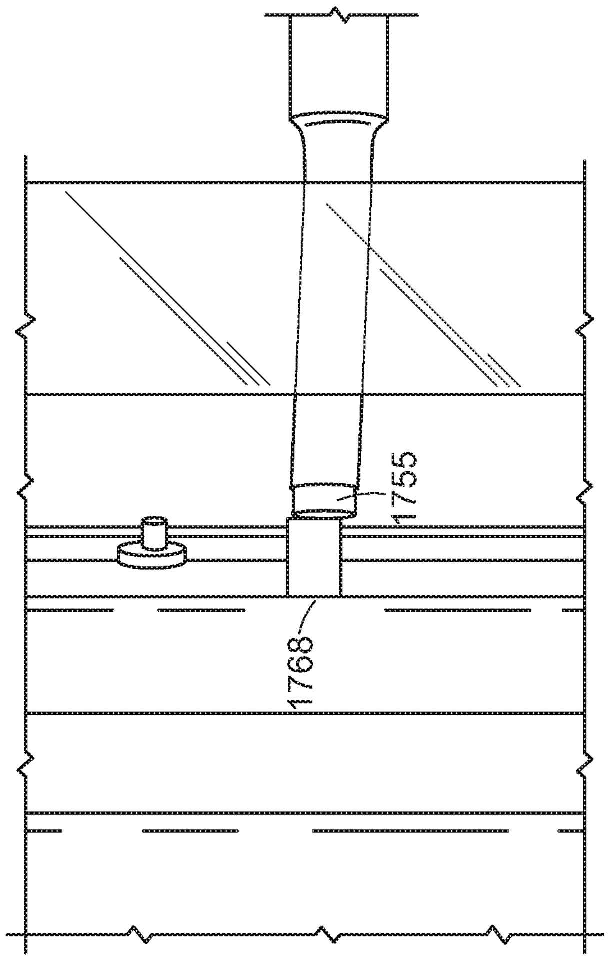
Figure 158:
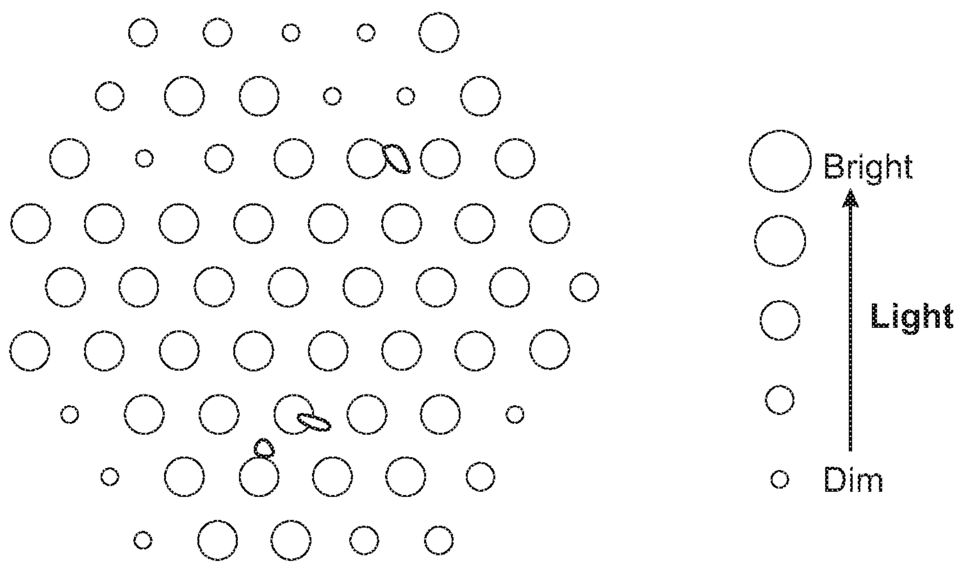
Figure 159:
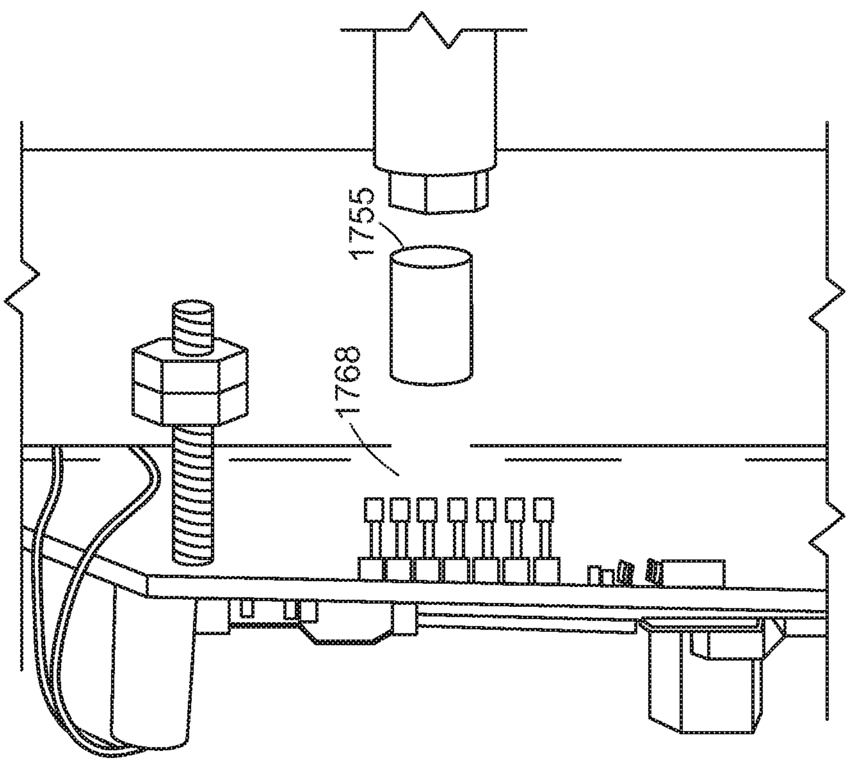
Figure 160:
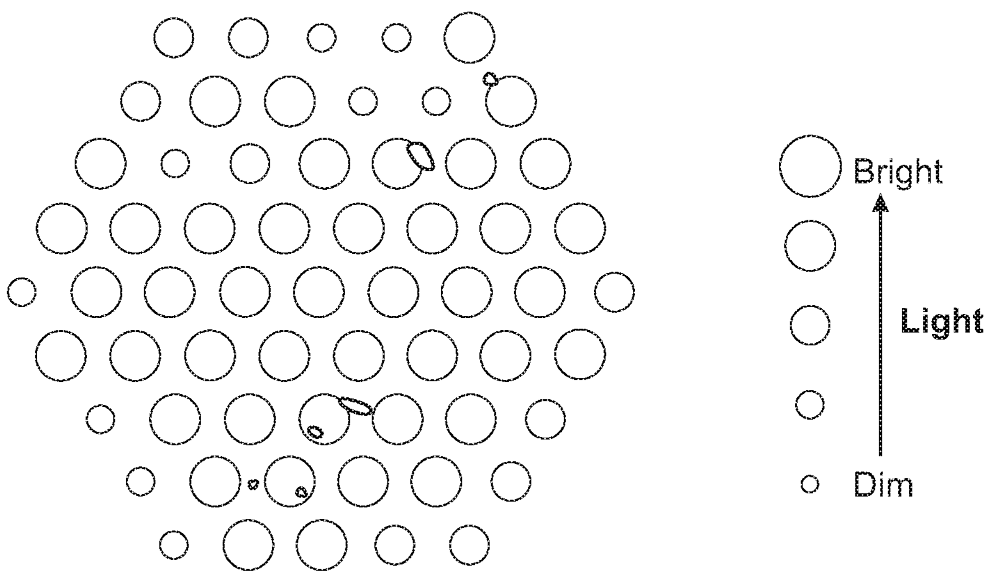

Operation of the FABI demonstrator 1660 is illustrated in FIG. 156 through FIG. 160. FIG. 156 shows the output of all 61 optical channels with minimal lateral and longitudinal UDAT connector misalignment. Each of the fibers is on an approximate 250 μm pitch. The sizes of the output spots are somewhat blurred due to the intensity of light in each of the fiber channels. FIG. 157 illustrates a lateral misalignment of approximately 1 mm between the UDAT connector 1755 and the FABI module 1768. FIG. 158 illustrates the output from the demonstrator with this lateral misalignment. It is seen in FIG. 158 that this lateral misalignment produces only negligible effect and each of the 61 optical channels still resides in his targeted position. In an operational FABI, the CCD array would be replaced by 61 element monolithic detector array. Similarly the longitudinal misalignment tolerance is demonstrated in FIG. 159 and FIG. 160. FIG. 159 illustrates a gap between the UDAT connector 1755 and the FABI module 1768 of approximately 2 mm. FIG. 160 illustrates the negligible effect of misalignment on the output.

Figure 161:
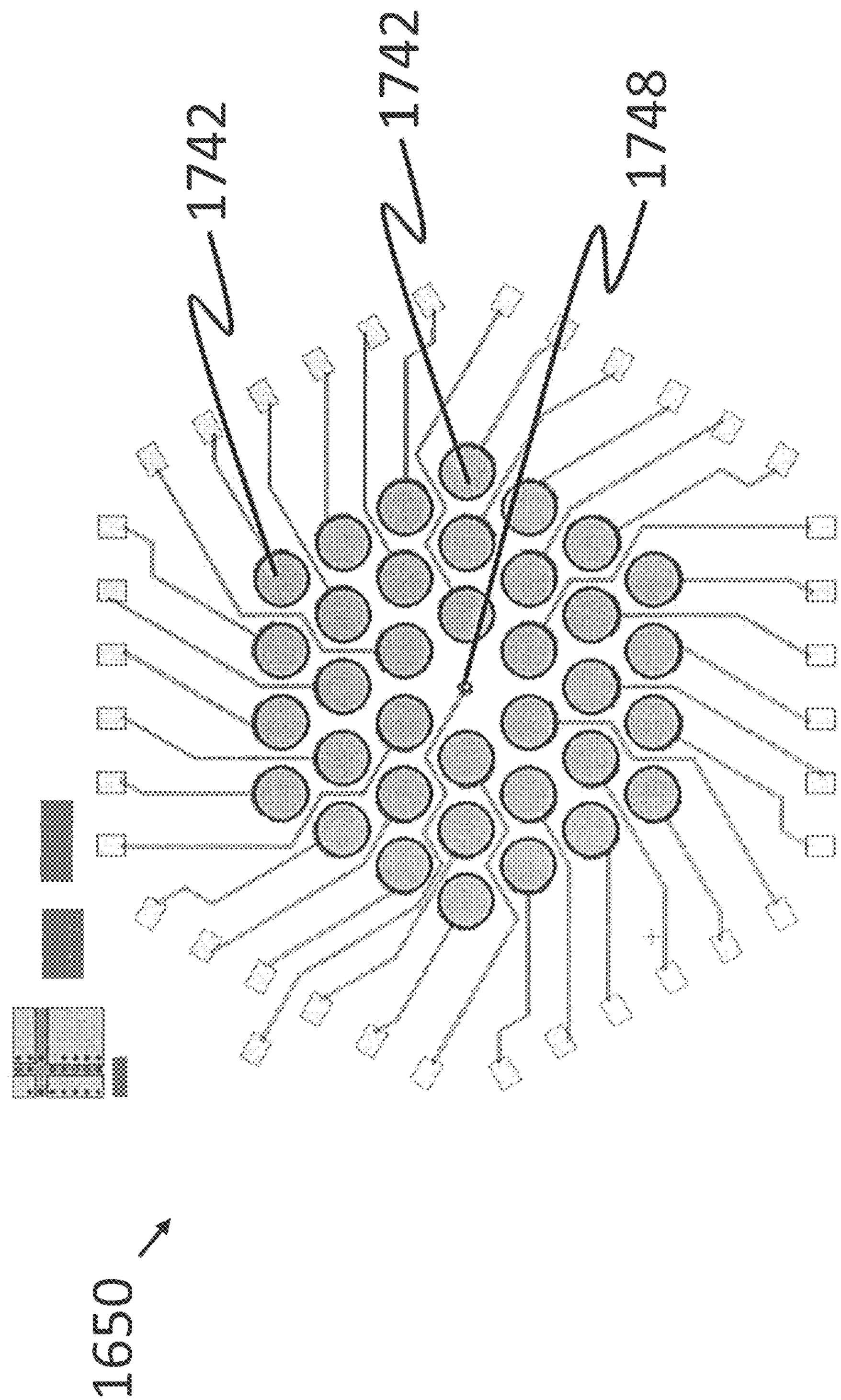

Another embodiment of a FABI demonstrator was built that utilized the detector array, shown in FIG. 161, will further demonstrating the FABI technology with independent electrical channels in place of the visual CCD array demonstration. This specialized detector array 1650 includes a 36 channel hexagonally packed array of detectors 1742 with a single small emitter 1748 located in the array center. In operation, each channel from a UDAT connector is coupled to one of these detecting elements using a module. The center emitter is used to demonstrate automatable alignment.

Figure 162:
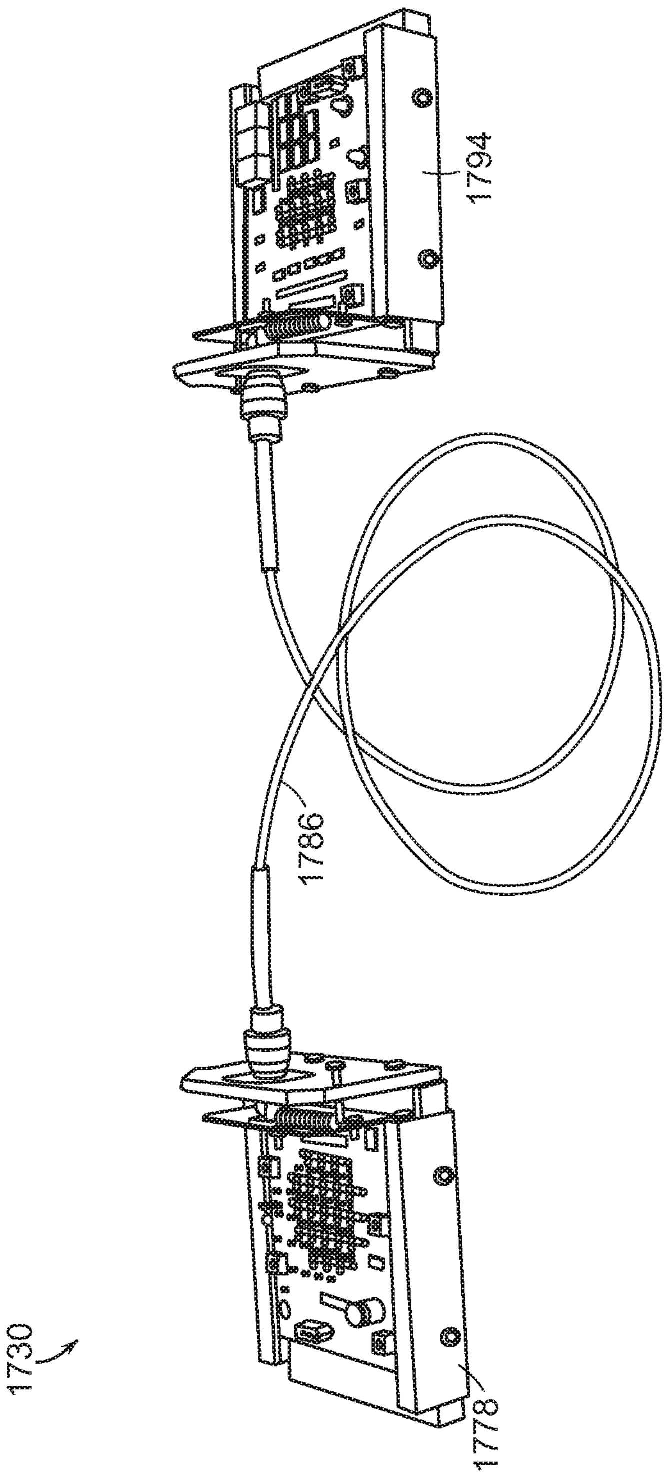

The FABI demonstrator is illustrated in FIG. 162. The double ended FABI demonstrator system 1730 consists of three elements: a receive module 1794 with an integral FABI, a transmit module 1778 with an integral FABI and a connectorized fiber optic cable plant 1786.

The demonstrator system 1730 in FIG. 162 transmits multiple signals through a multiple of separate fiber channels in the cable plant with the appropriate individual channels being detected and displayed at the receiver end. System modules were designed with high capacity, rechargeable battery systems for extended demonstration times. The demonstrators were also designed in an open frame format to enable observation of the FABI and optical cable interface.

Figure 163:
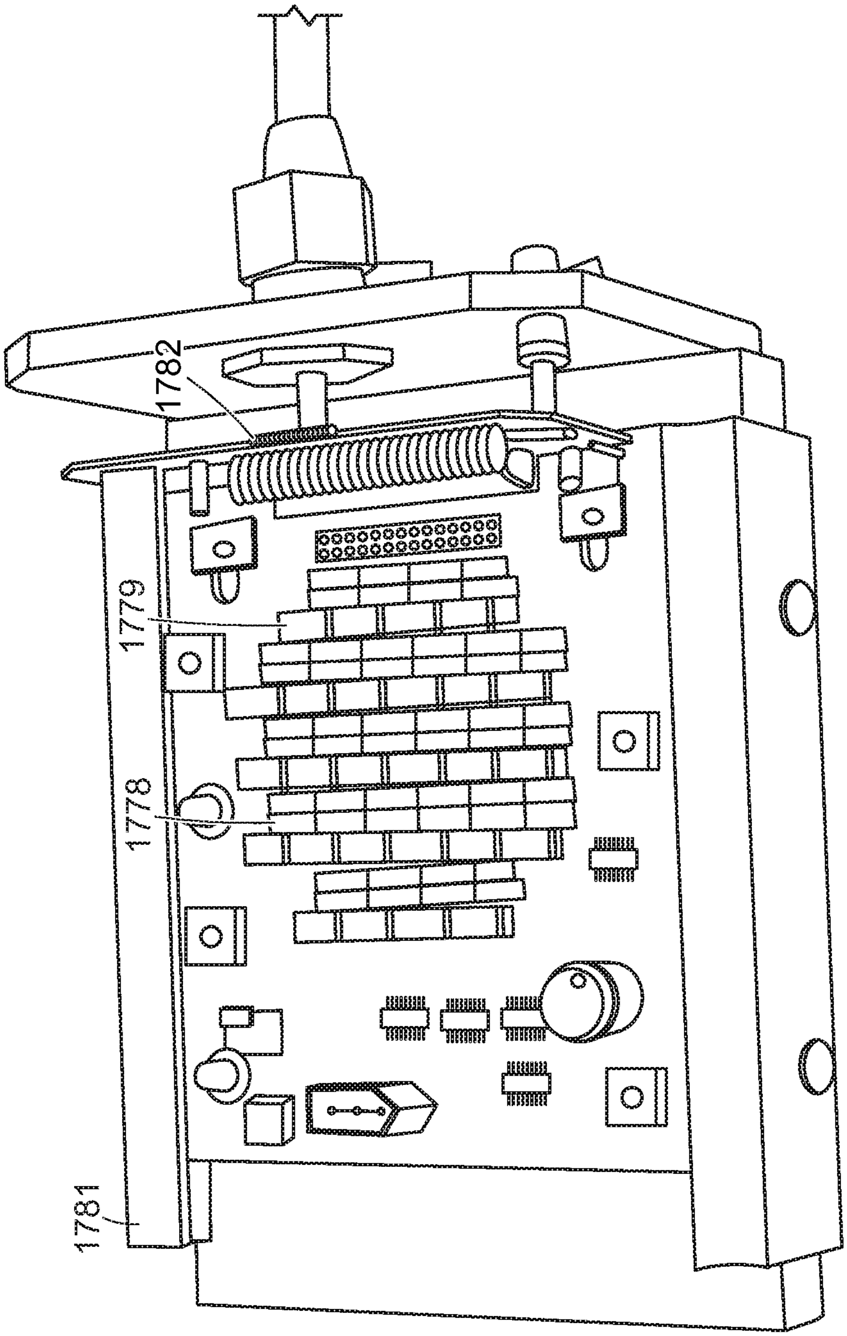
FIGS. 163-176 show the FABI reduction to practice demonstrators.
Figure 164:
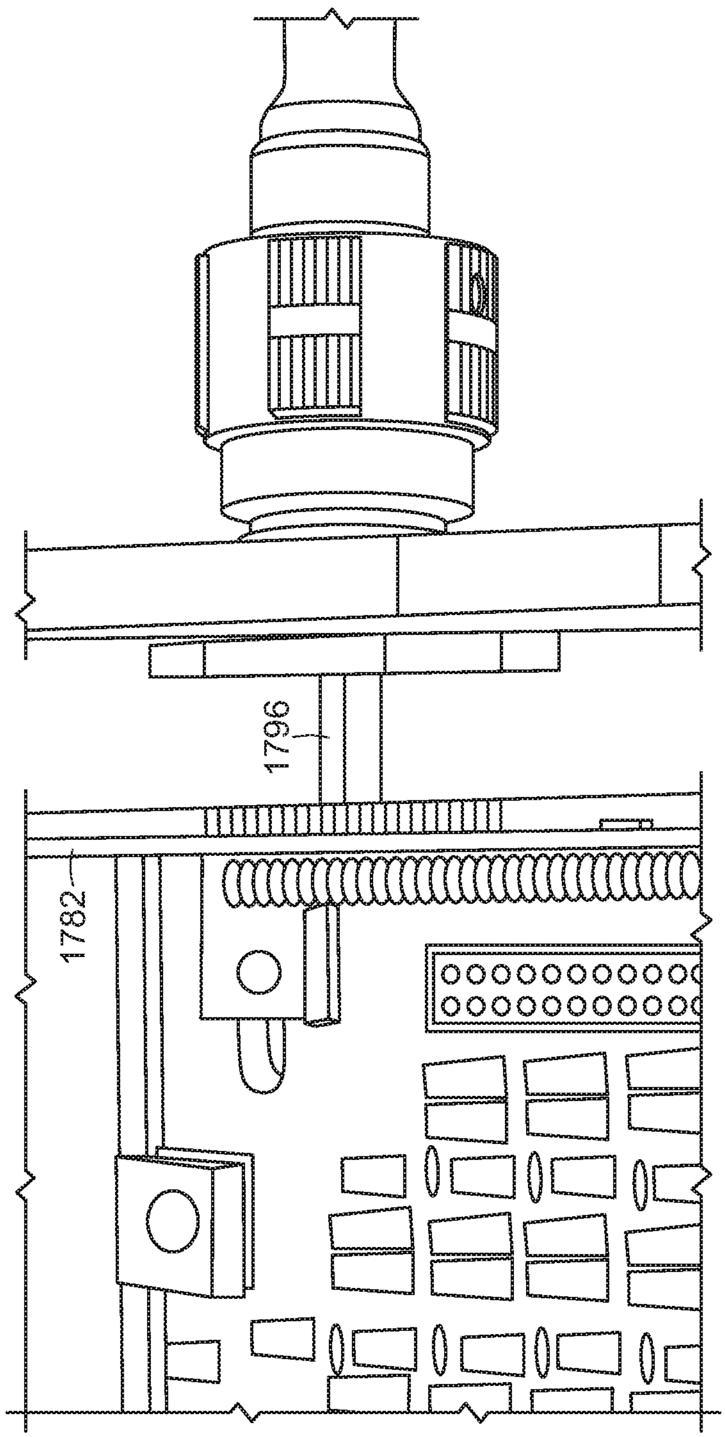
Figure 165:
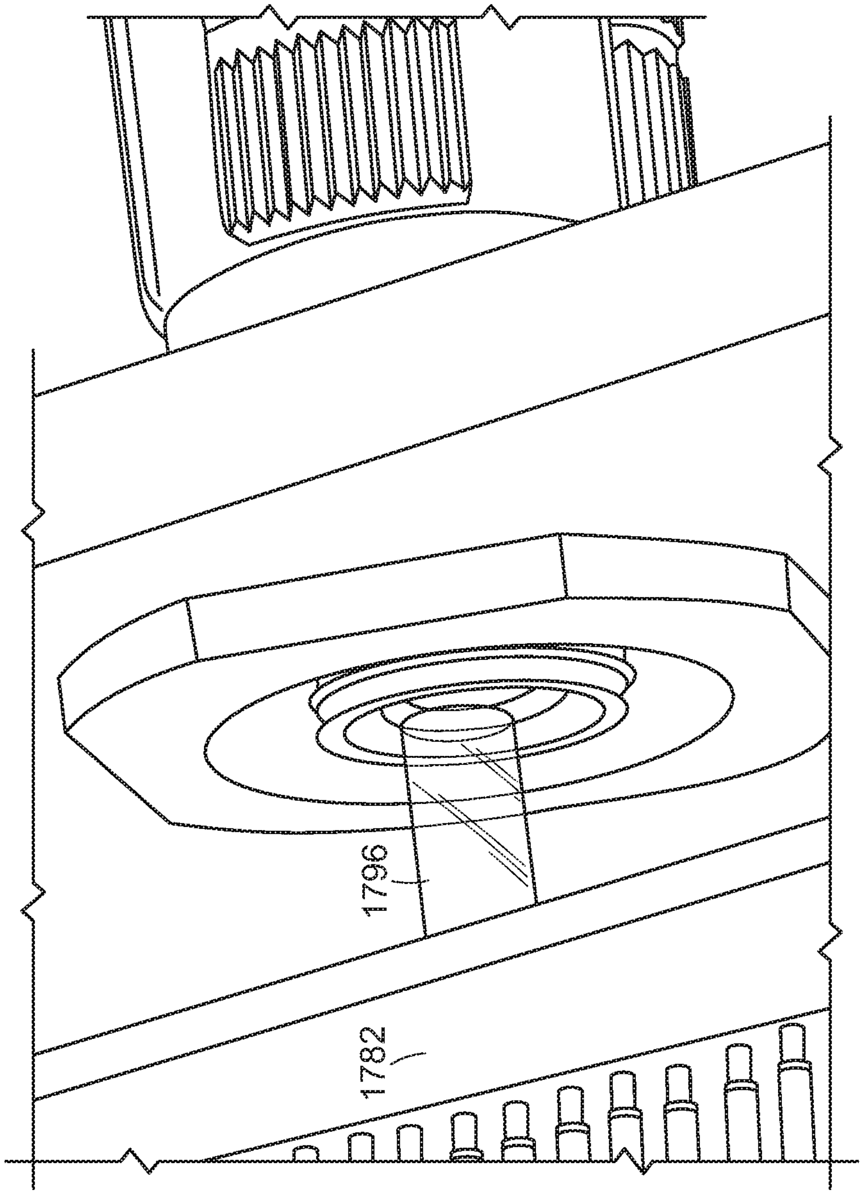

The transmit module 1778 in FIG. 163 consists of a number of switchable channels offering an ON or OFF signal condition via manual switches 1779 for each mounted on a circuit board 1781. There are 4 channels which cycle ON/OFF sequentially. These help demonstrate constant activity on these channels. Finally, there is one channel that transmits high frequency pulses with a variable clocking rate. Close up photographs of the transmit module 1778 are shown in FIG. 163 through FIG. 165. The transmit module 1778 consists of the circuit board 1781, the FABI mount board 1782, and UDAT connector 1796. An oblique close-up of the plane-wave spectrum gap region is illustrated in FIG. 165.

Figure 166:
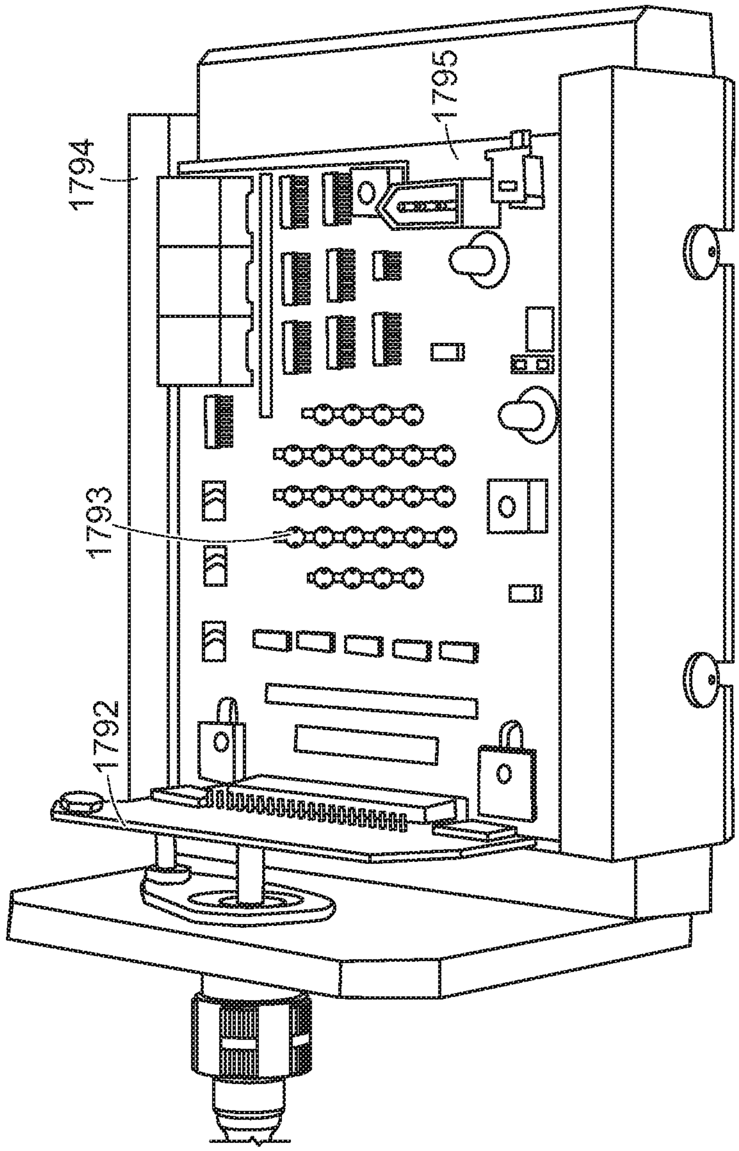
Figure 167:
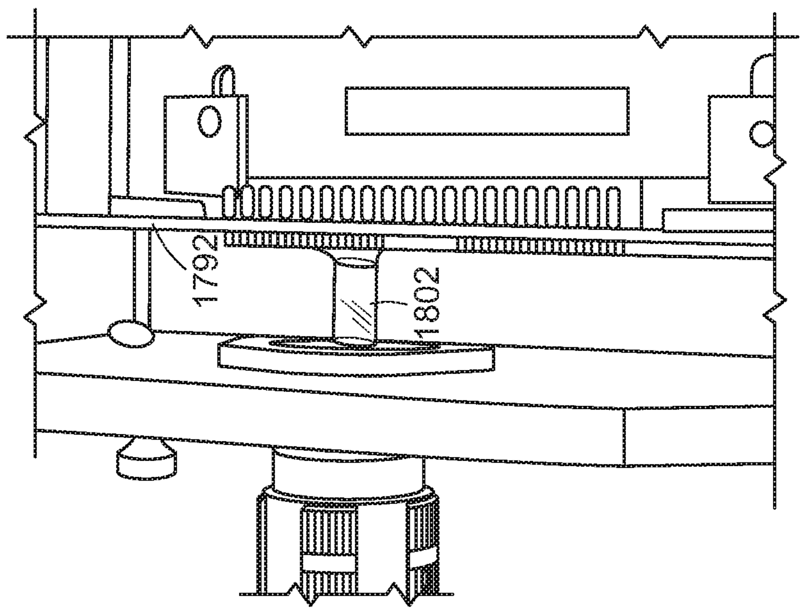
Figure 168:
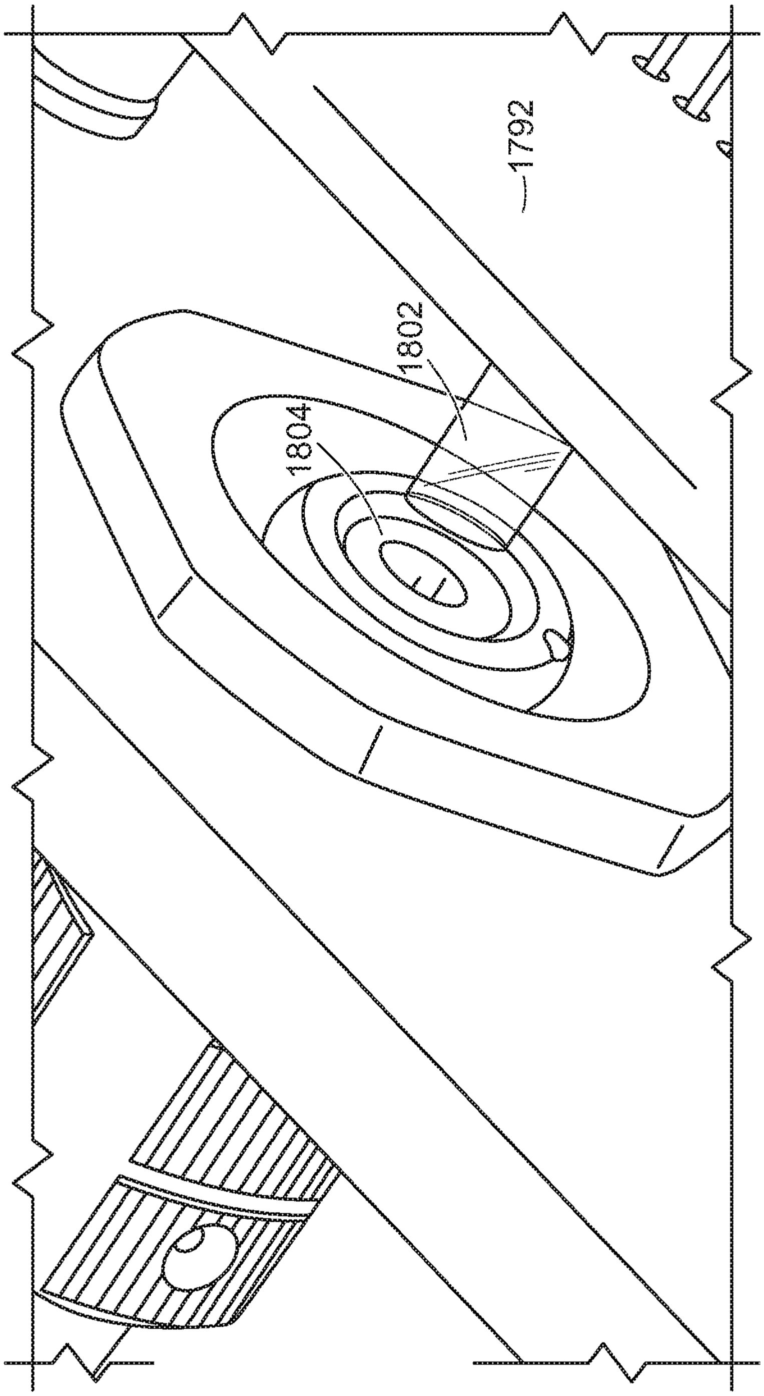

The receiver module 1794 consists of a multiple of separate channels with ON/OFF indicator lights 1793 for the respective channels to be interpreted. These lights are mounted on a circuit board 1795. There is also one channel input that is detected and fed into a frequency counter. Additionally, a FABI mount board 1792 supports the UDAT connector 1802. To demonstrate the double ended FABI system a specific channel or group of channels can be switched on and a corresponding channel indicator will light up at the receive module end. Further, the as the clock frequency is varied, the frequency counter will update and display the appropriate pulse rate frequency. The receive module 1794 is illustrated in FIG. 166. FIG. 167 and FIG. 168 illustrate the side view and oblique close-ups of the receive module.

Figure 169:
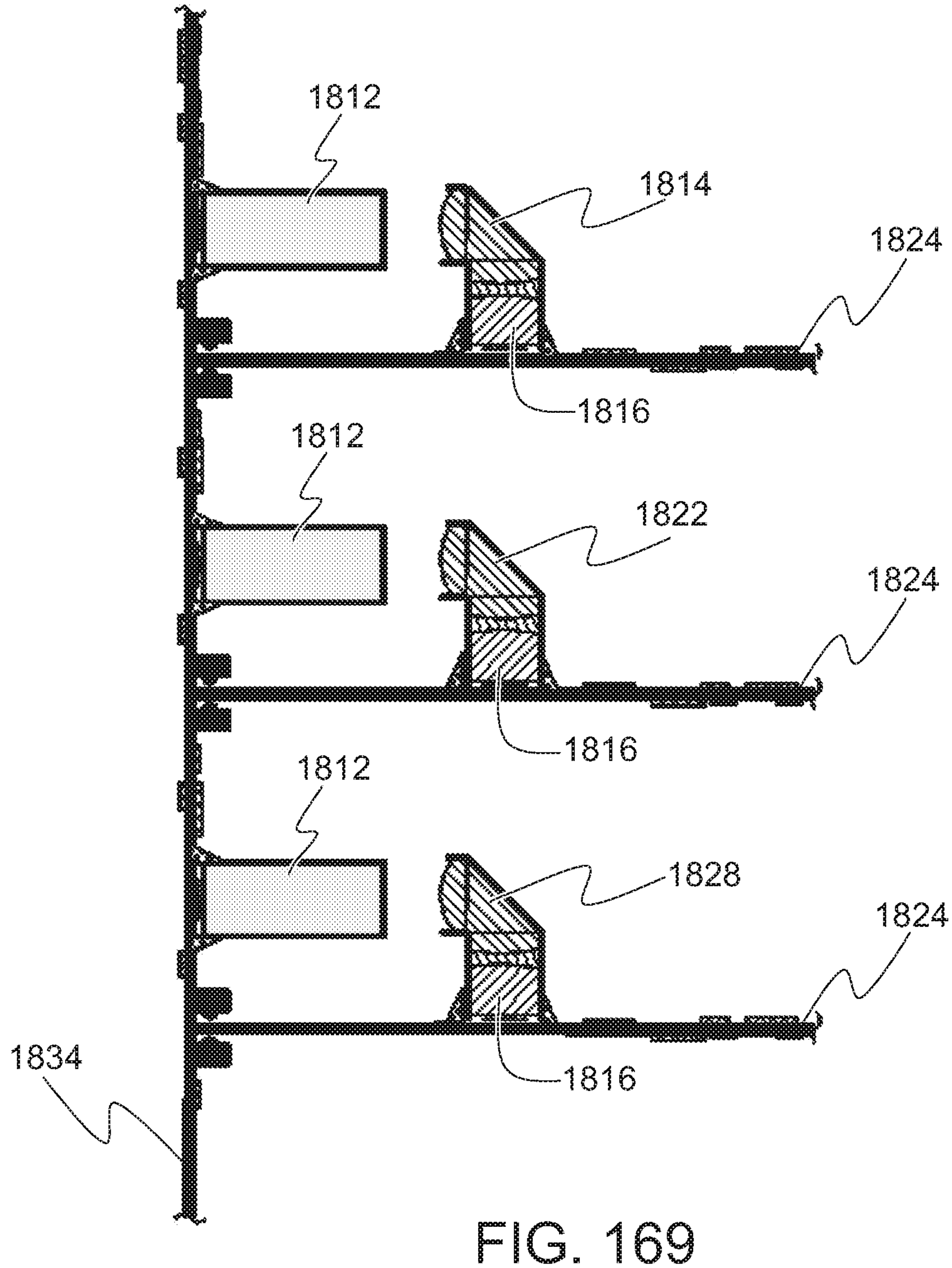

An array of FABIs 1816 utilizing right angle ODP modules 1814 mating to UDAT connectors 1812 is shown in FIG. 169. The FABIs 1816 are mounted on circuit boards 1824 and can be used to interface to an Optical or Electrical Backplane 1834, or to bundles of fibers on chassis UDAT connectors.

Figure 170:
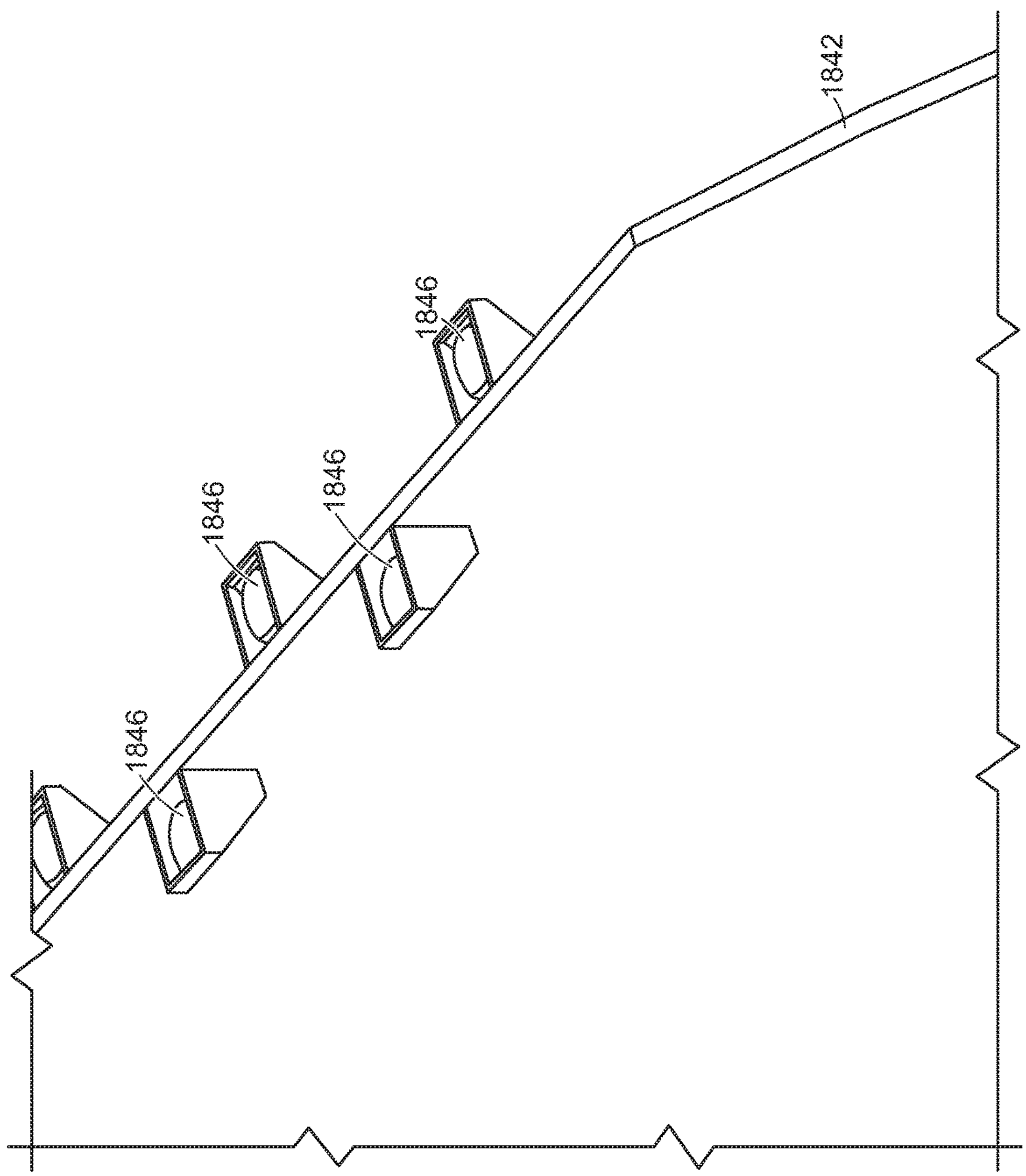

Some of the many system advantages of the right angle imagers include compact right angle chassis connectors, and compact board-to board, board-to-backplane, and FABI imagers. One embodiment is illustrated in FIG. 170, with the right angle imagers 1846 mounted on a circuit board 1842 edge that can connect to UDAT connectors, FABI interfaces, or related technologies.

Figure 171:
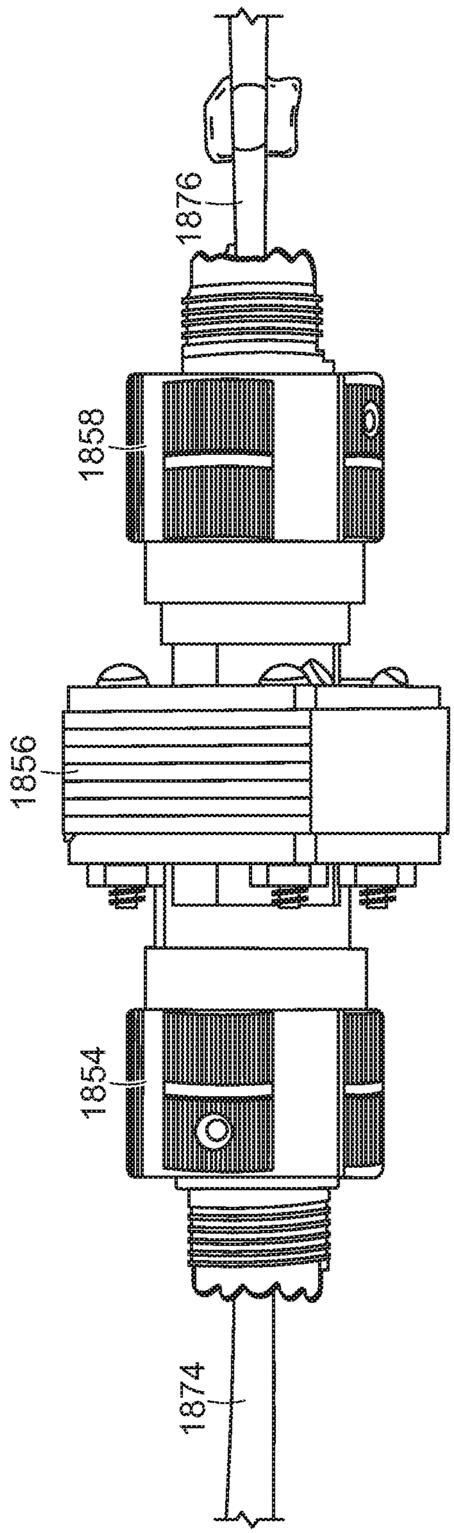

A fully functional UDAT connector was fabricated and is shown in FIG. 171. The UDAT connector consisted of two 37 count, 200 ? m diameter core fiber arrays with GRIN lenses attached using UV curable epoxy. FIG. 171 shows a photograph of the UDAT connector that was fabricated using a 38999 Amphenol connector. One side connector 1854 with fiber array 1874 is threaded into the bulkhead 1856. Similarly, the other side connector 1858 with fiber array 1876 is threaded into the bulkhead 1856.

Figure 172:
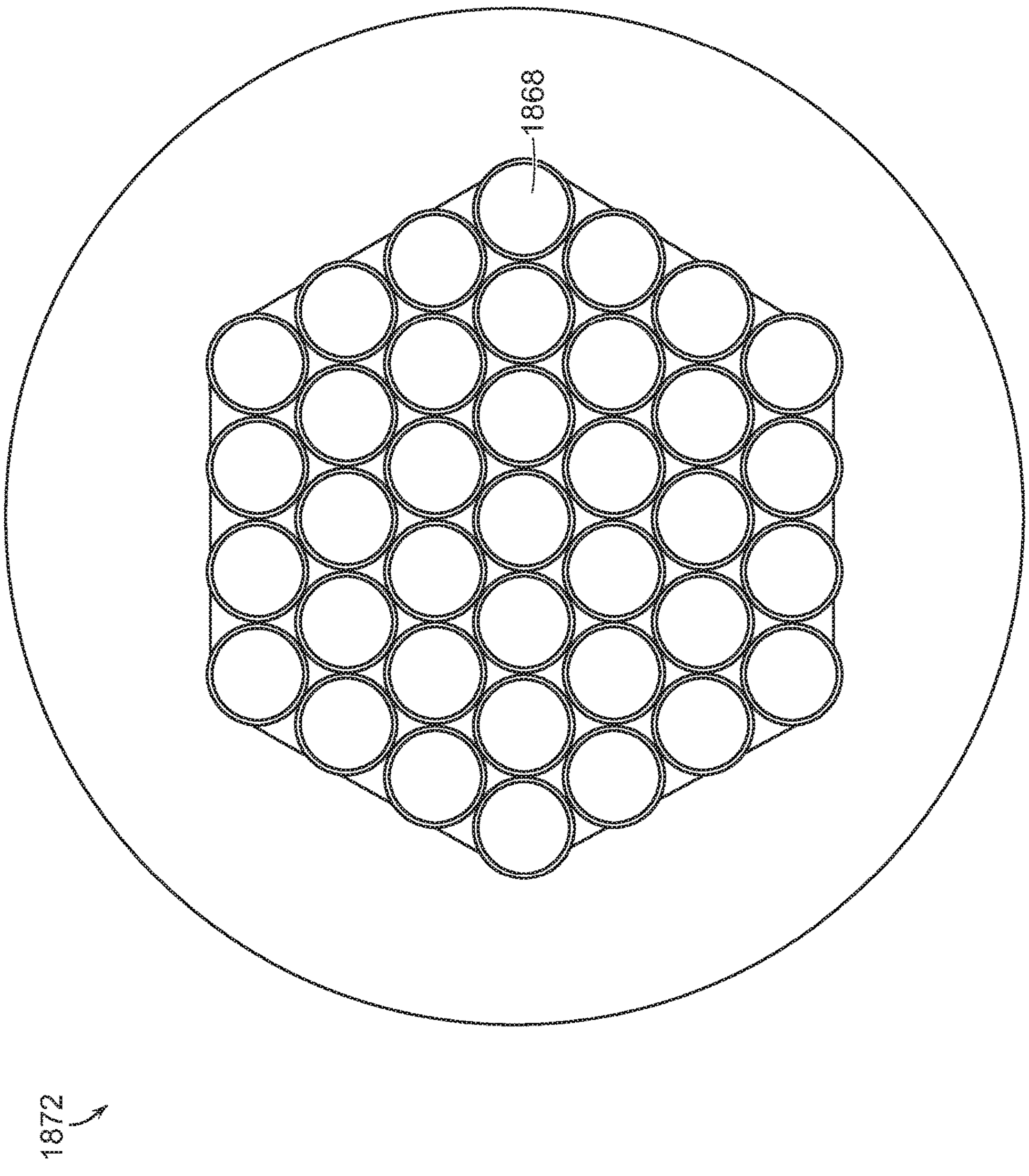
Figure 173:
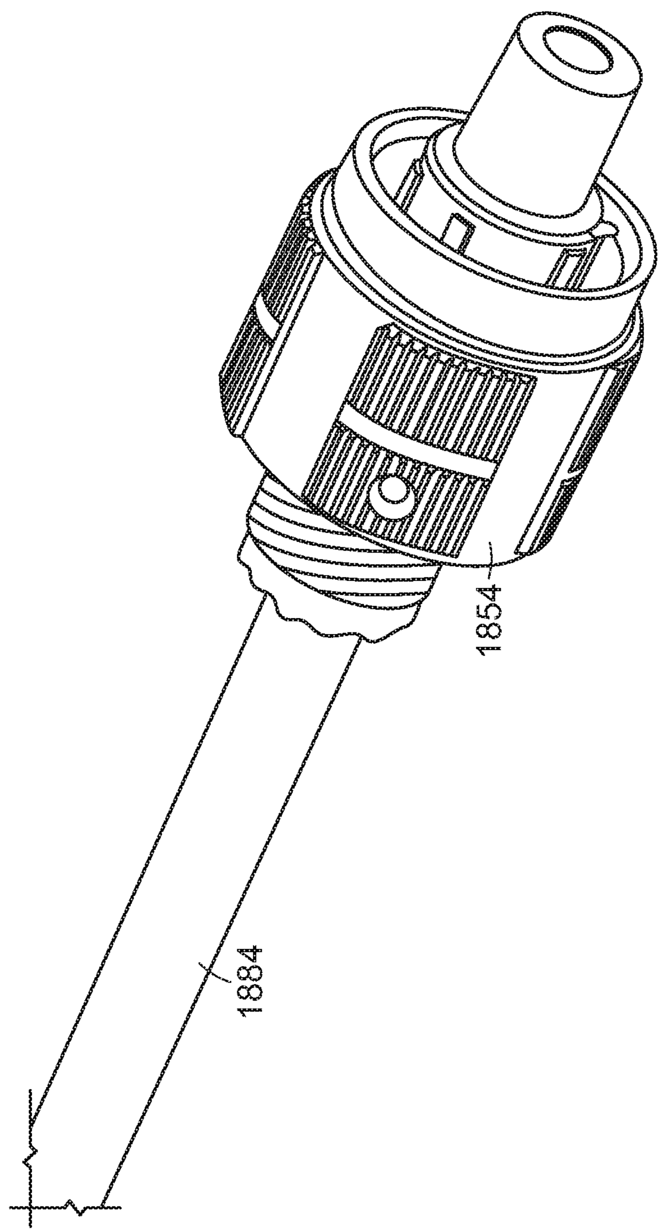
Figure 174:
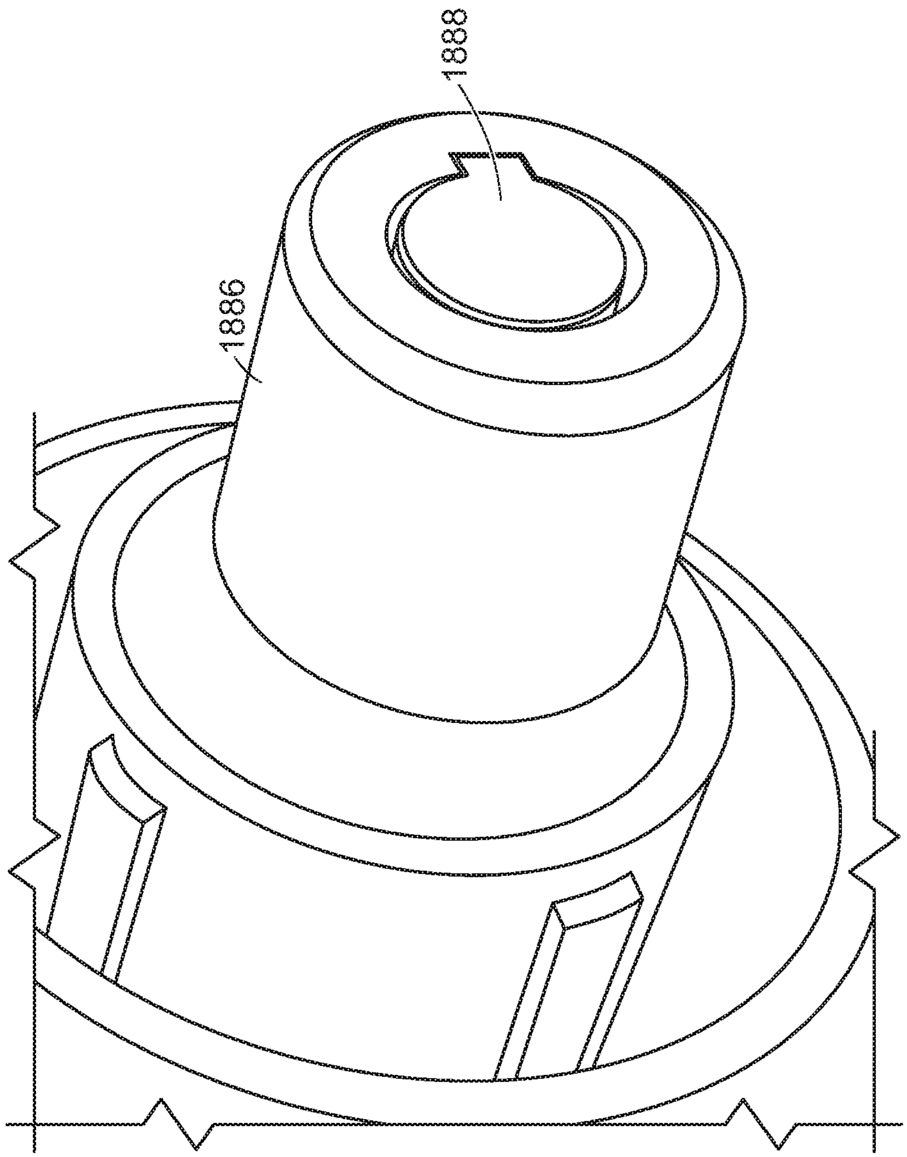
Figure 175:
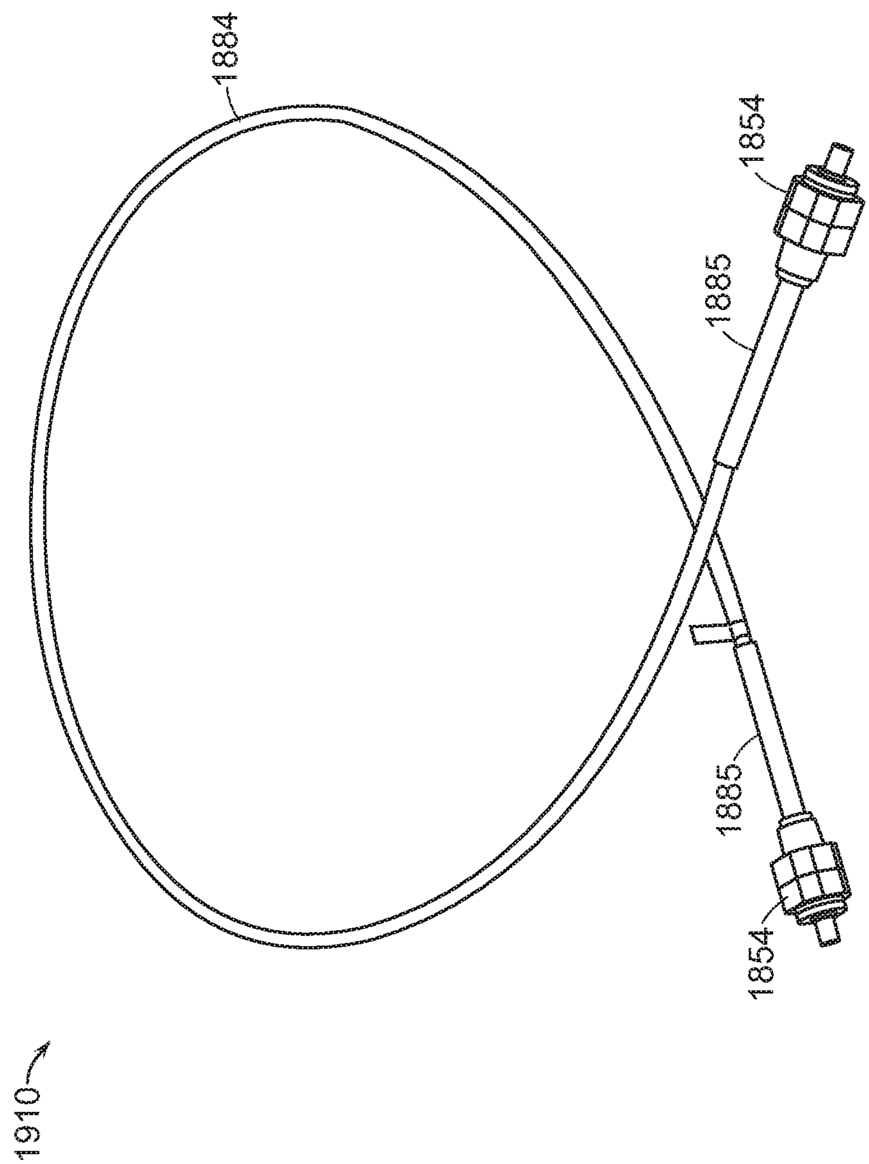

FIG. 172 shows a photomicrograph of one of the 37 count arrays fabricated with 200 ? m core fiber 1868 in a hexagonal array 1872. FIG. 173 illustrates the cable end connector 1854 during construction after the flexible tubing 1884 is applied but before the strain relief sheathing is applied. FIG. 174 provides a close view of the optical head region of the connector 1854, with the anti-reflection coating on the GRIN lens 1888 particularly visible in the center of the ferrule 1886. A photograph of the entire cable assembly is shown in FIG. 175, illustrating the strain relief 1885 added to the assembly.

Figure 176:
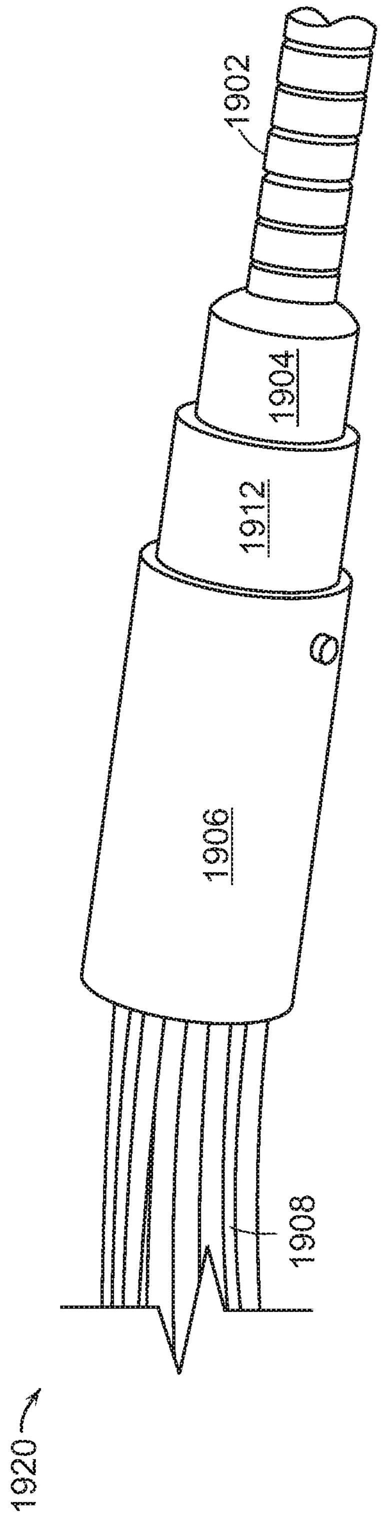
Figure 177:
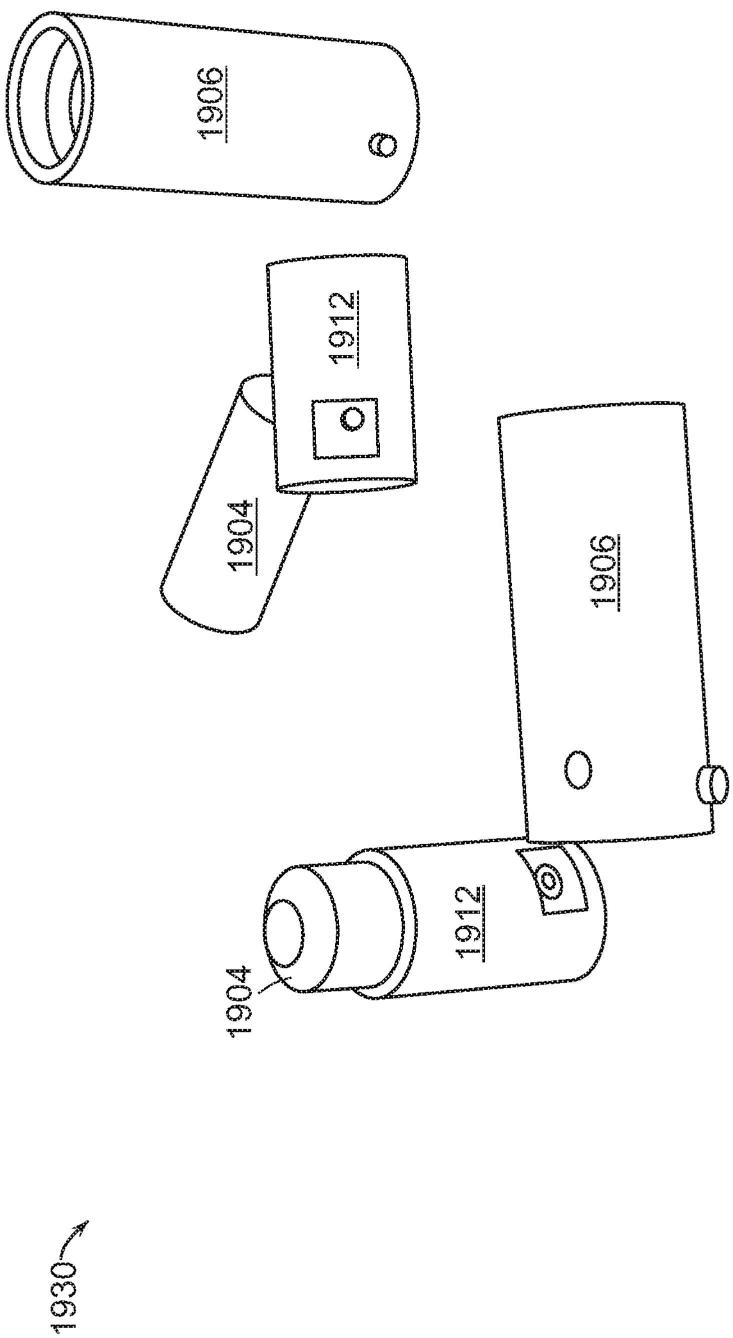
FIGS. 177-178 show embodiments of right angle imagers used in these teachings.

A reduced size embodiment 1920 of the breakout manifold is illustrated in FIG. 176. The components 1930 of the breakout manifold are shown in FIG. 177. This embodiment consists of the furcation tube sleeve 1906, the adapter 1912, and the optical fiber protection tube sleeve 1904 that clamps the sheathing 1902. Different embodiments may consist of more or less components but would provide a means to separate the multiple fibers coming from the connector into separate protective tubes 1908.

Figure 178:
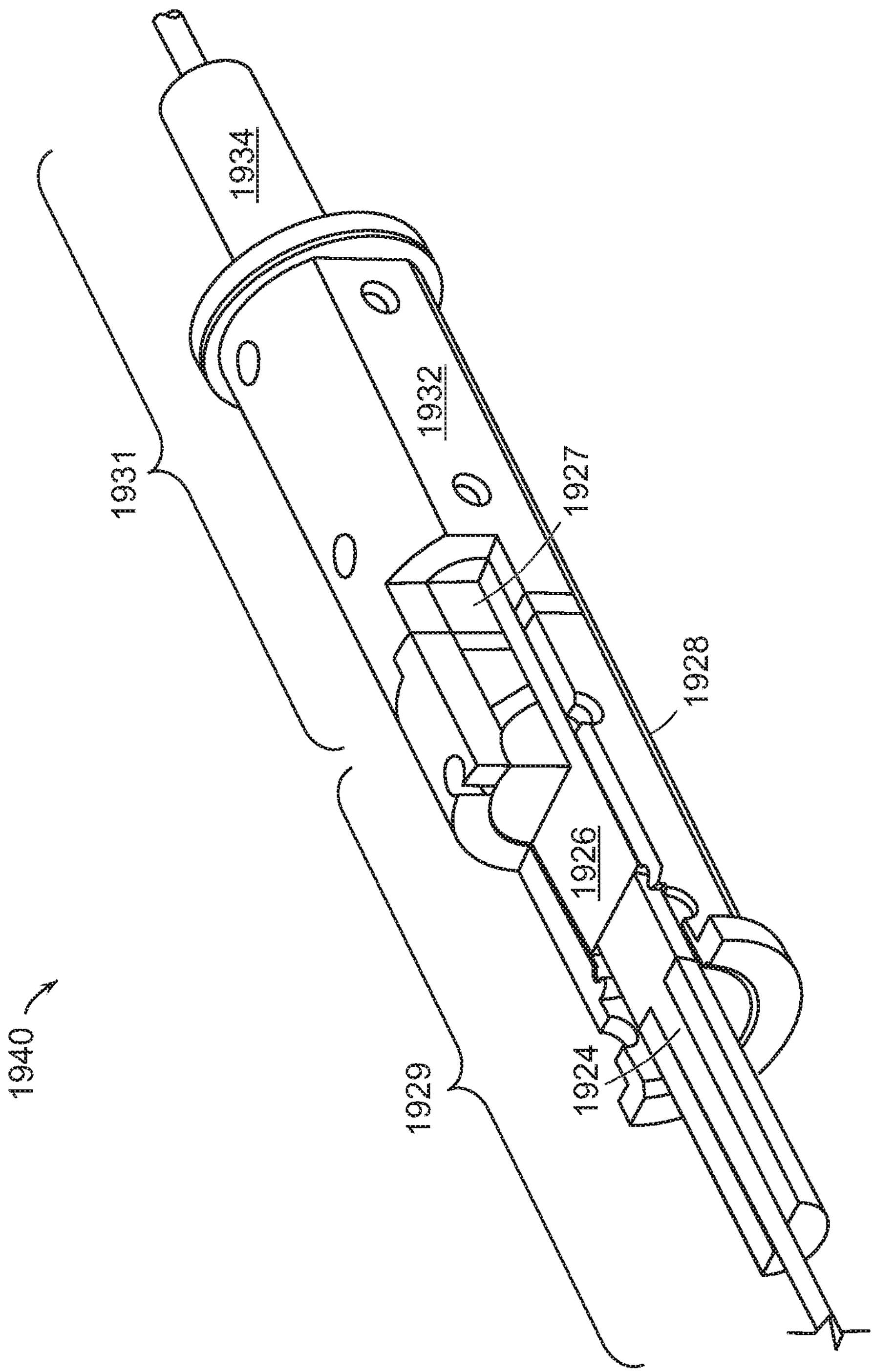
Figure 180:
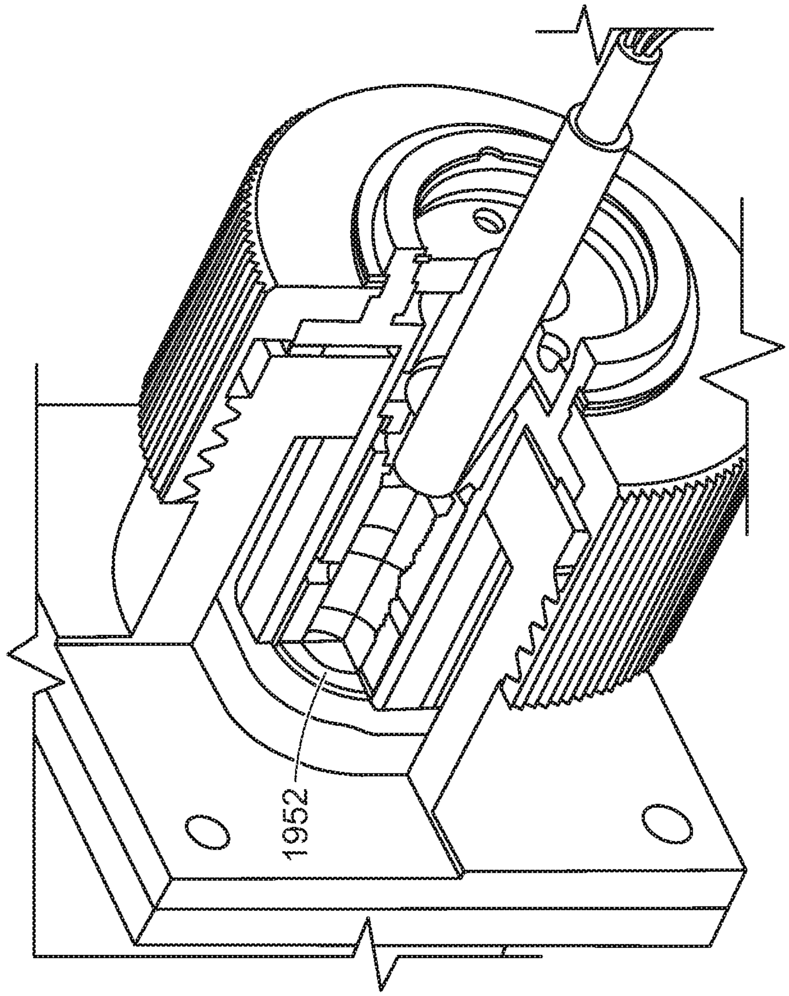

One embodiment 1940 of the core of the UDAT utilizes tightly toleranced crenellated imager housings as the mating interface between the infinite conjugate lenses. In this embodiment, shown in FIG. 178, the infinite conjugate lens 1926 is mounted into the imager housing 1928, and aligned to the fiber array 1924, creating the imager housing assembly 1929. Similarly, the mating infinite conjugate lens 1927 is mounted into the mating imager housing 1932 and aligned to the fiber array 1934, creating the imager housing assembly 1931. As shown in FIG. 180, the imager housing assembly 1929 is mounted into a connector housing 1952 such as but not limited to a 38999 style connector, which, when fully assembled 1960 causes it to interface with the imager housing assembly 1931 with two diametrically opposed raised quarter-circumference sections described in FIG. 6 and FIG. 7 earlier in this patent. The raised section surfaces and dimensions are tightly toleranced as they dictate the final lens-to-lens alignment. The inter-lens distance is controlled by the recession of the lens within the imager housing, the rotation is controlled by the crenellated structure, and the tip-tilt is controlled by the perpendicularity of the reference imager housing faces to the aligned axis.

Figure 179:
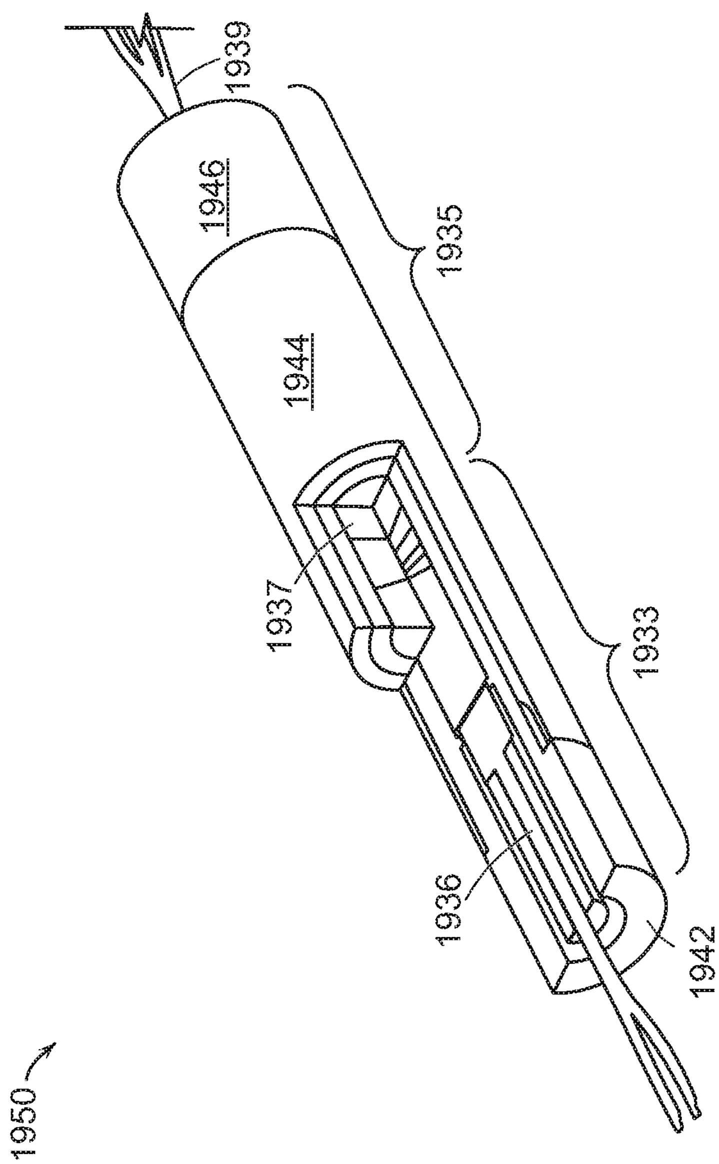
FIGS. 179-183 show the UDAT reduction to practice demonstrator.
Figure 181:
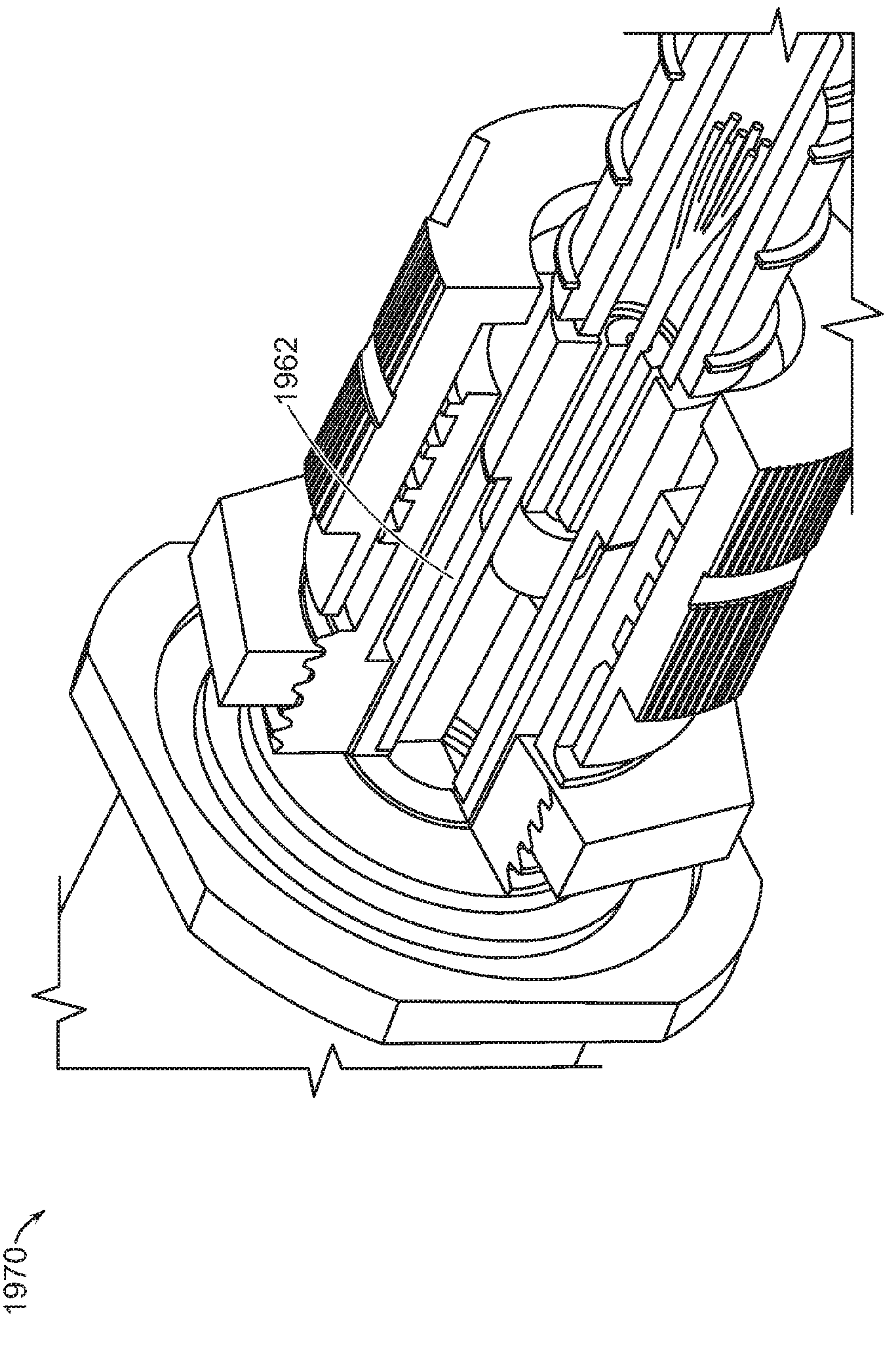

Another embodiment 1950 shown in FIG. 179 of the core of the UDAT connector utilizes the keyed imager housings 1942 and 1946 fitting within an aligning sleeve 1944 as the mating interface between the infinite conjugate lenses. In this embodiment, the infinite conjugate lens 1938 is mounted into the keyed imager housing 1942 and aligned to the fiber array 1936, creating the keyed imager housing assembly 1933. The mating infinite conjugate lens 1937 is mounted into the mating keyed imager housing 1946 and aligned to the mating fiber array 1939, creating the mating keyed imager housing assembly 1935. As shown in FIG. 181, the keyed imager housing assembly 1933 is mounted into a connector housing 1962, such as but not limited to a 38999 style connector, which, when fully assembled 1970 causes it to interface with the aligning sleeve 1944 and keyed imager housing assembly 1935. In this embodiment, the alignment is dictated by the tightly toleranced sleeve. The inter-lens distance is controlled by the recession of the lens within the imager housing and the gap in the imager housings, the rotation of the lenses is controlled by the key interface between the imager housings and the sleeve, and the tip-tilt alignment is controlled by the co-linearity of the reference sleeve to the aligned axis.

As the tip/tilt of the imager housings is especially important in the embodiments of the connectors described herein, a method with which to control the tip/tilt of the imager housings with respect to each other is the outer circumference of the imager housings, which provides a significant mechanical advantage. One embodiment 1980 (FIG. 182) of a means to align the outer circumference of the imager housings is the solid sleeve 1974, which is effectively a tube into which the imager housings are inserted with a predetermined slip fit tolerance. This solid sleeve design is highly resistant to tip/tilt beyond the clearance allowed for the ferrules 1976 and 1978 to fit within the sleeve 1974. Another embodiment described earlier in FIG. 12 and FIG. 13 is a split sleeve, which is a sleeve that is split down the length and toleranced to be an interference fit with the ferrules. The split sleeve acts as a spring that actively compresses the ferrule.

Another degree of freedom that is important to constrain in the embodiments of the connectors described herein is the rotation of the imagers about their axis. A number of embodiments include but are not limited to external keys and internal keys. External keys are those that are anywhere outside of the sleeve and interface with the housings, while internal keys are within the sleeve and interface ferrule-to-ferrule. The primary external keys include but are not limited to a single key-in-slot, a wedged key, and external "wedgellations". The primary internal keys considered include but are not limited to cup-cones, crenellations, and internal "wedgellations".

Figure 182:
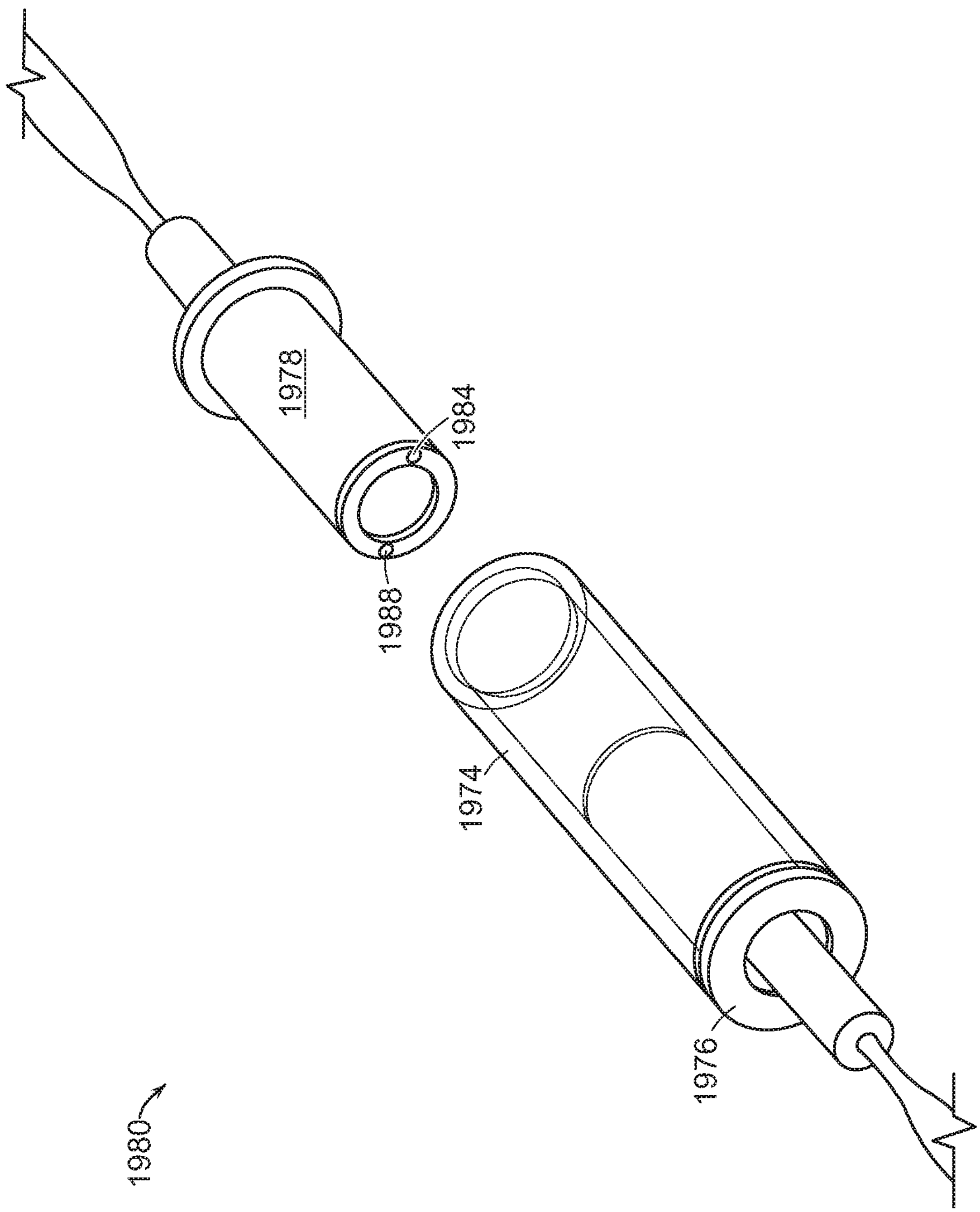

The internal key system places the main rotation fixing datums on the front face of the ferrule, thereby removing the intermediate component and reducing the tolerance stack-up. The cup-cone embodiment 1980 is illustrated in FIG. 182, showing the recessed cup 1988 and extruding cone 1984 on the ferrule 1978 located at 180" from each other in this case. Other orientations or multiples of rotation features are possible. When mated with another ferrule 1976 with similar features, the cone seats into the cup, providing rotational fixity. The combination of the cup/cone interface and the sleeve 1974 provide constraints in all six degrees of freedom when the connector is fully mated.

Figure 183:
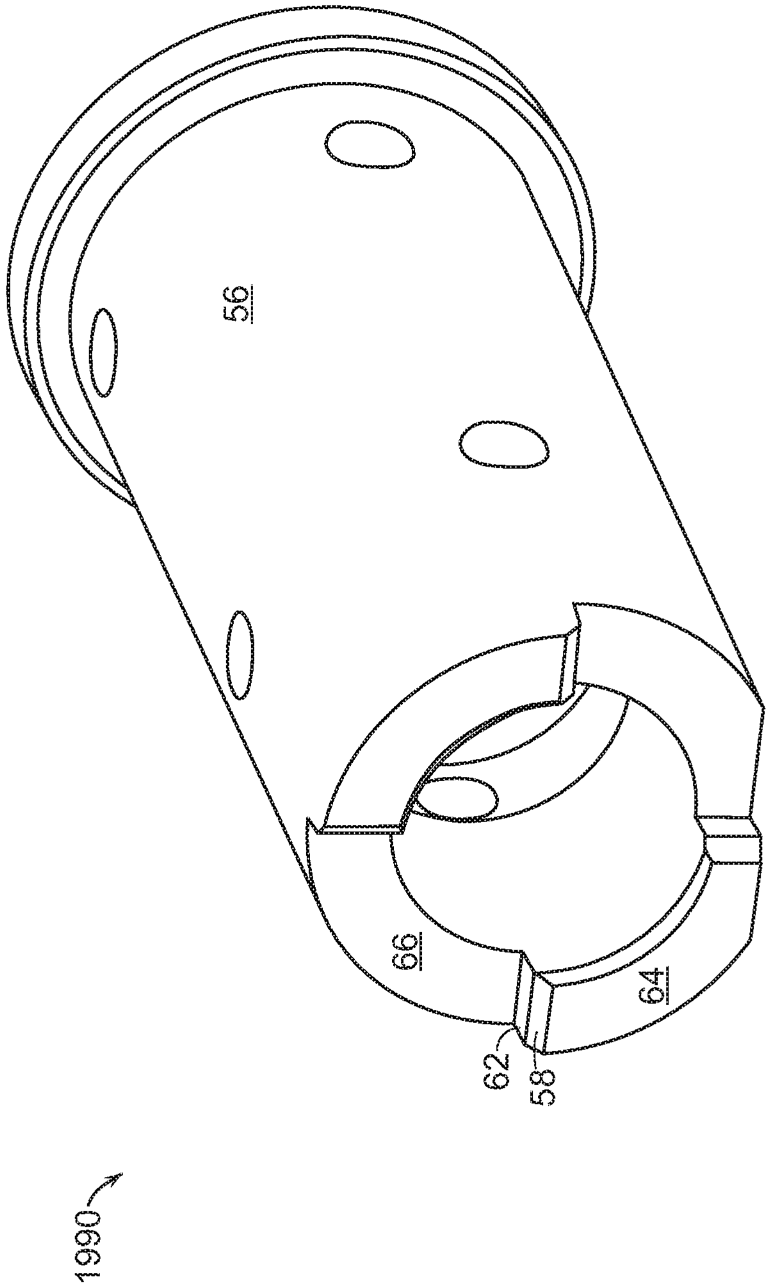

Another embodiment 1990 includes crenellations on the front faces of the mating ferrules which provide for rotational alignment. An example of the crenellated design is shown in FIG. 183. As described earlier in FIG. 7, the recessed face 66, vertical face 62, chamfer 58 and protruded face 64 are repeated around the circumference of the housing 56, in this case but not limited to 2 times. The interface of the vertical faces 62 between mating housings provides the rotational fixity.

Figure 184:
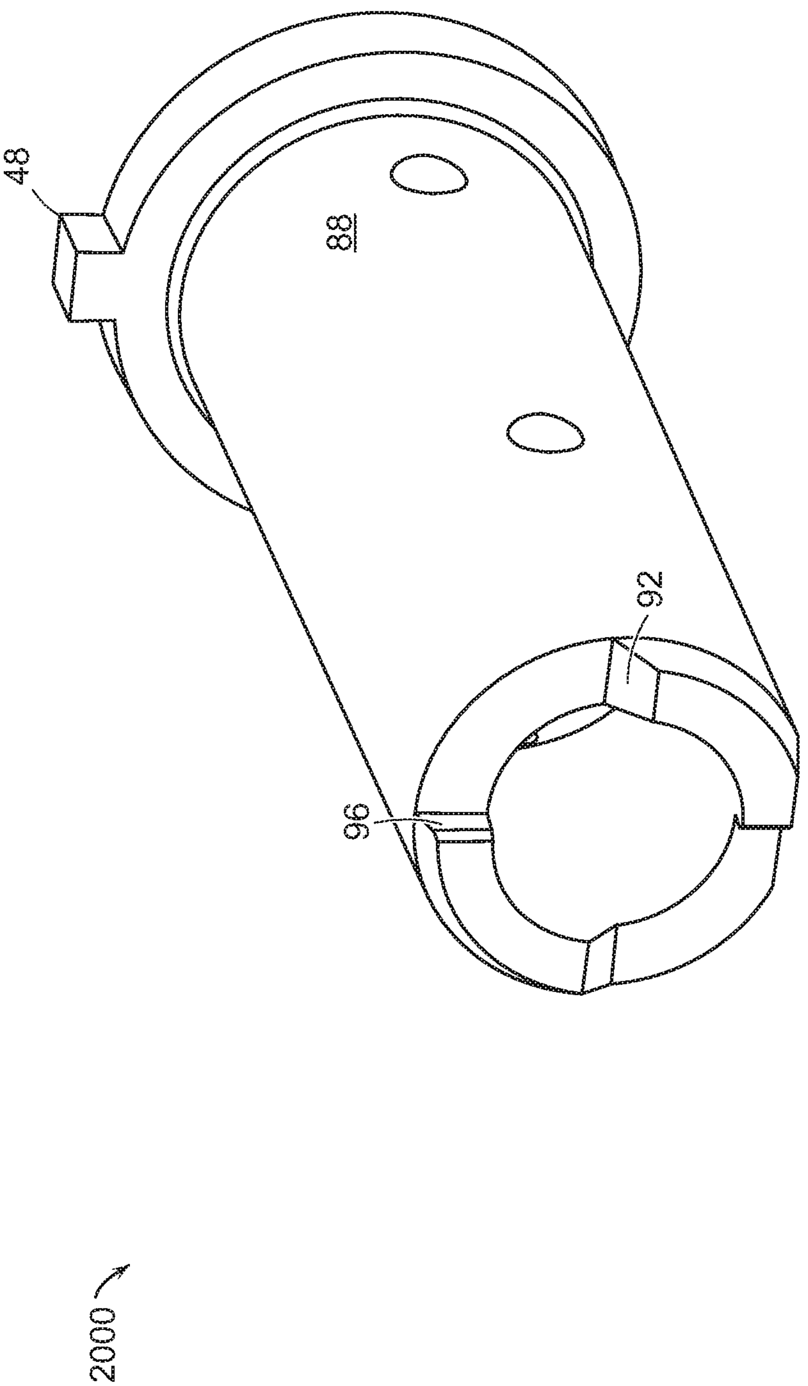
FIGS. 184-185 show the UDAT breakout manifold reduction to practice demonstrator.

Another embodiment 2000 is the "wedgellation" design, as shown in FIG. 184. As stated previously, two of the vertical faces 62 of the housing 88 are tilted to an angle, in this case but not limited to 45°, which cause the ferrules to rotate until the vertical faces 62 contact when the ferrules are pushed together. In this case, an external key 48 is used to provide initial rotational alignment, however, multiple alternate means are described herein.

Figure 185:
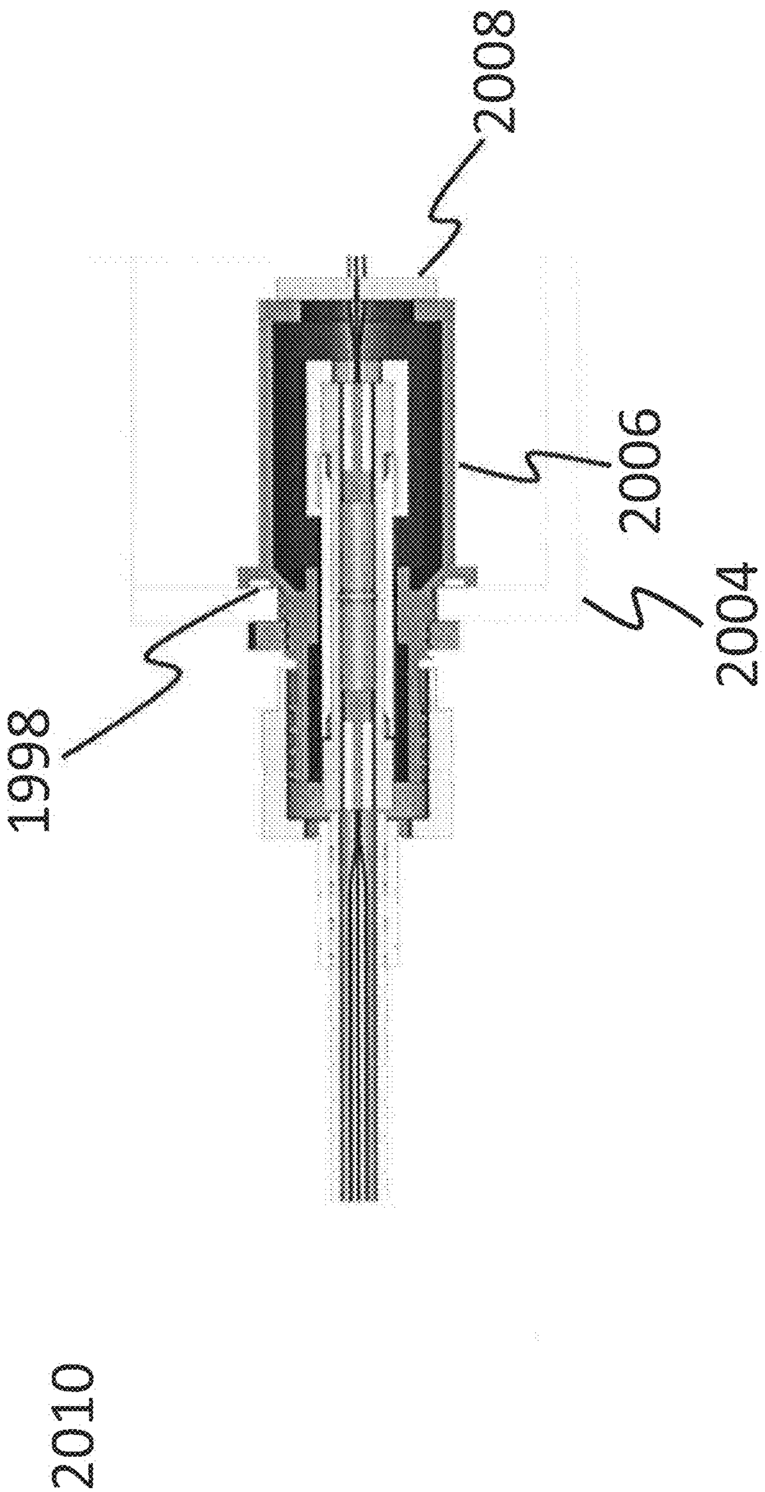

One embodiment incorporates shielding to attenuate electromagnetic interference (EMI). This embodiment includes a multiple penetration shield 2008 that is affixed to the connector 2006 and a compressible gasket 1998 between the connector housing 2006 and the enclosure 2004 as shown in FIG. 185. Another embodiment incorporates a shield with a single hole of sufficient diameter to allow the full number of optical fibers through it while remaining sufficiently thick to provide attenuation of the EMI radiation. Another embodiment 2020 shown in FIG. 186 includes an array 2024 of smaller holes that allow subgroups of the fibers to pass through multiple holes.

Figure 186:
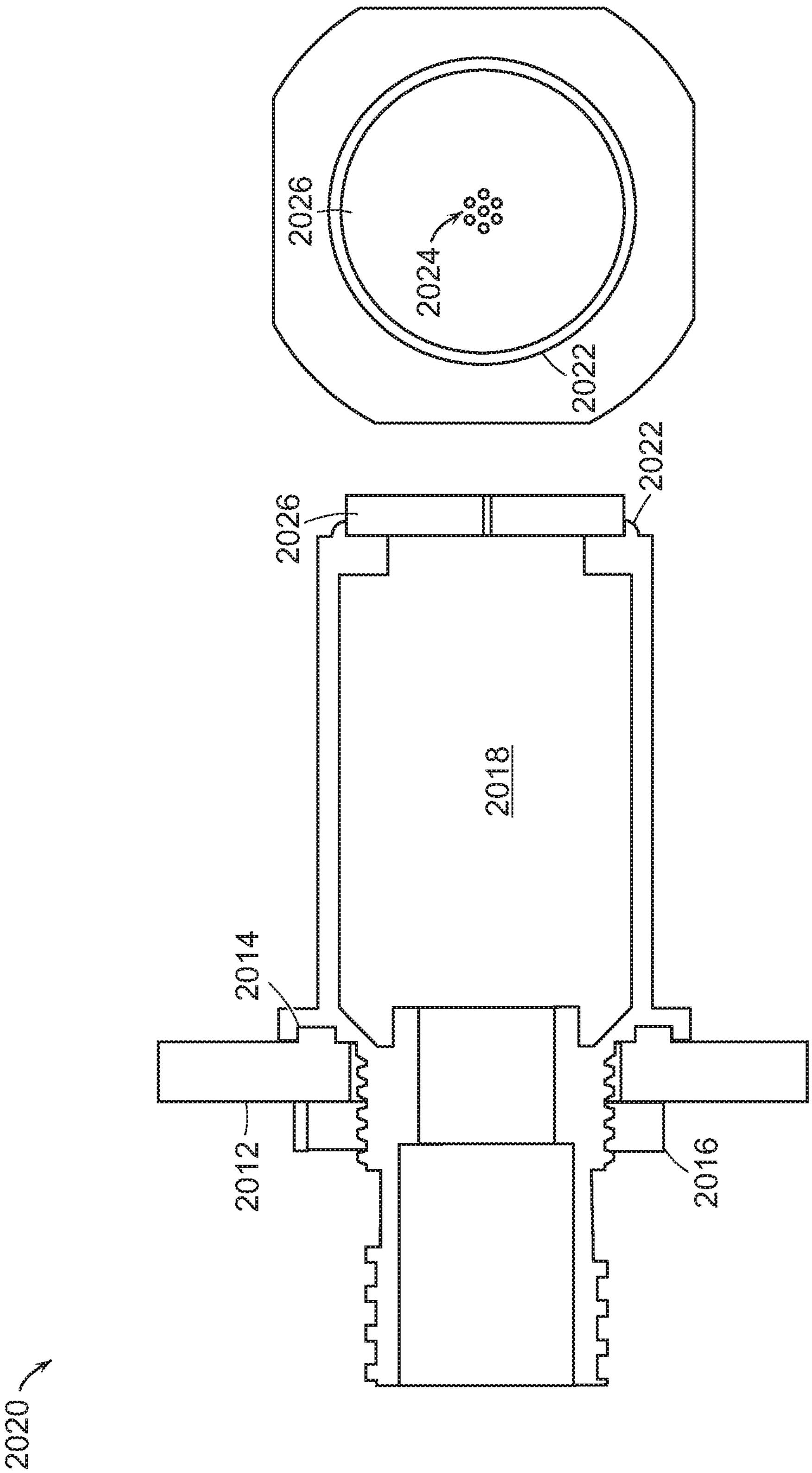
FIG. 186-192 show directly coupled and indirectly coupled embodiments of the alignment maintaining system of these teachings.

These subgroups can contain any smaller number of fibers. In this embodiment, a much smaller penetration aperture (less than 0.5 mm) is obtained for a 37 fiber UDAT array by dividing the fibers into seven subgroups and corresponding holes, organized in a hexagonal pattern for example, with up to seven fibers passing through any of the holes. This results in a maximal penetration diameter of 480 microns. The thickness of the shield plate 2026 can be varied based on the required system attenuation. Damage to the fibers due to vibrational contact with the shield plate 2026 can be prevented using a number of techniques—for example but not limited to potting the fibers in place using an RTV-like or other vibration absorbent material. The shield plate 2026 will be soldered 2022 or otherwise affixed to the connector housing 2018 ensuring high frequency electrical conductivity around the entire circumference for best EMI shielding performance. To prevent EMI leakage at the interface between the connector housing 2018 and the enclosure 2012, an electrically conductive compressible gasket 2014 can be used. In this embodiment, the gasket 2014 is compressed with a compression nut 2016 on the outside of the enclosure 2012 as shown in FIG. 186, however, other means of mounting the connector housing 2018 to the enclosure 2012 are possible.

Additional embodiments include the EMI shield/connector housings imbedded in the EMI-shielded composite chassis during chassis fabrication. Accordingly the UDAT connector can be installed and shield plate 2026 soldered onto the imbedded connector housing 2018 during the latter manufacturing steps. This embodiment removes the possibility of EMI leakage through the gaskets 2014 if the connector housing 2018 were to become loose. Another embodiment would utilize multiple threaded fasteners to compress the gasket 2014.

Figure 187:
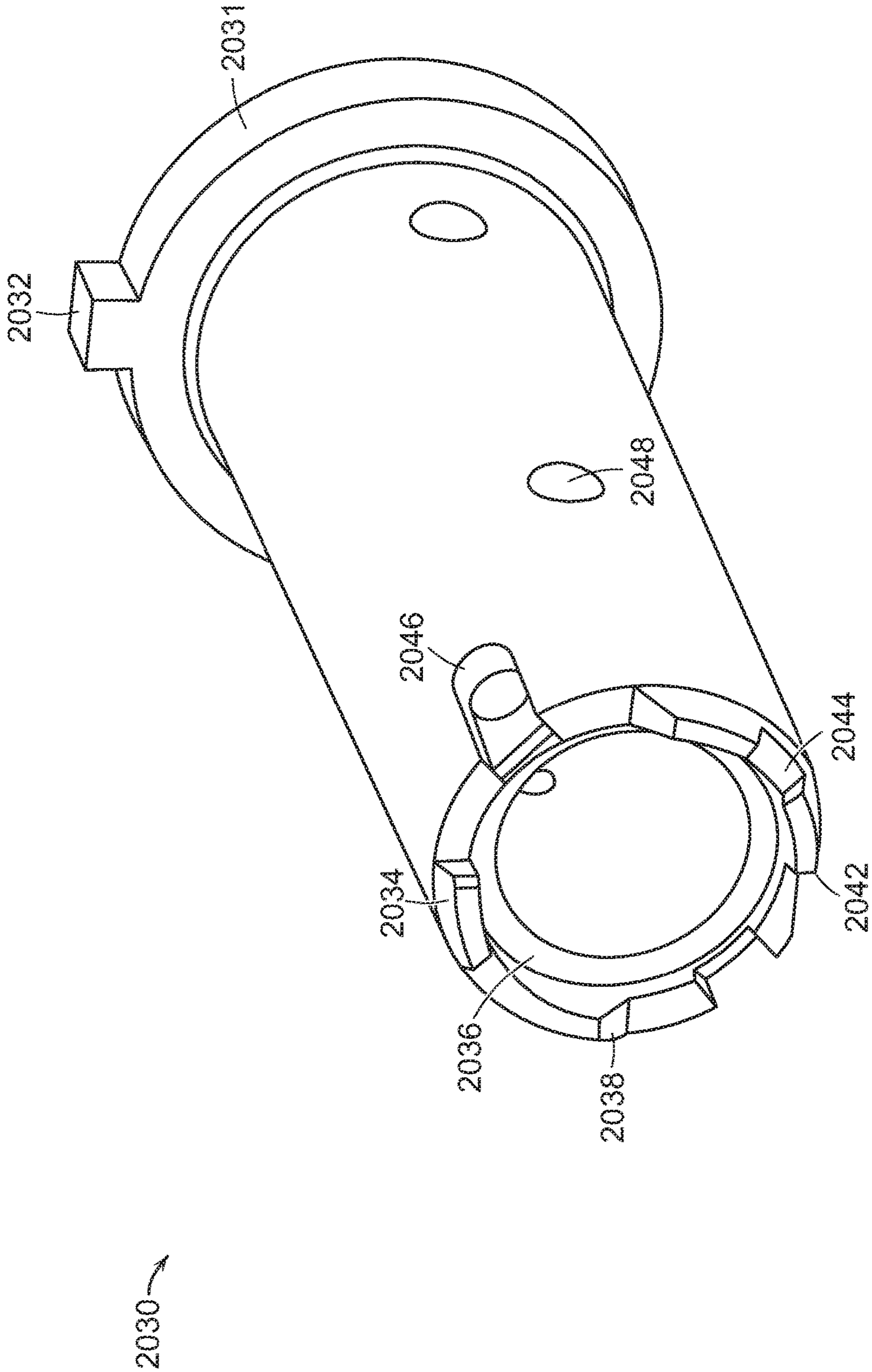

One embodiment 2030 of the imager housing 2031, as illustrated in FIG. 187, includes the following: an external key 2032 that provides initial rotational orientation with the connector housings, epoxy injection ports 2048 for the lens and fiber bundle, window latch recesses 2046 and arm clearances 2044, alignment flats 2042, and a recessed window mount face 2036. As described earlier, the "wedgellation" including the wedge faces 2038 and vertical datums 2034 provide rotational alignment when mated with another imager housing.

Figure 188:
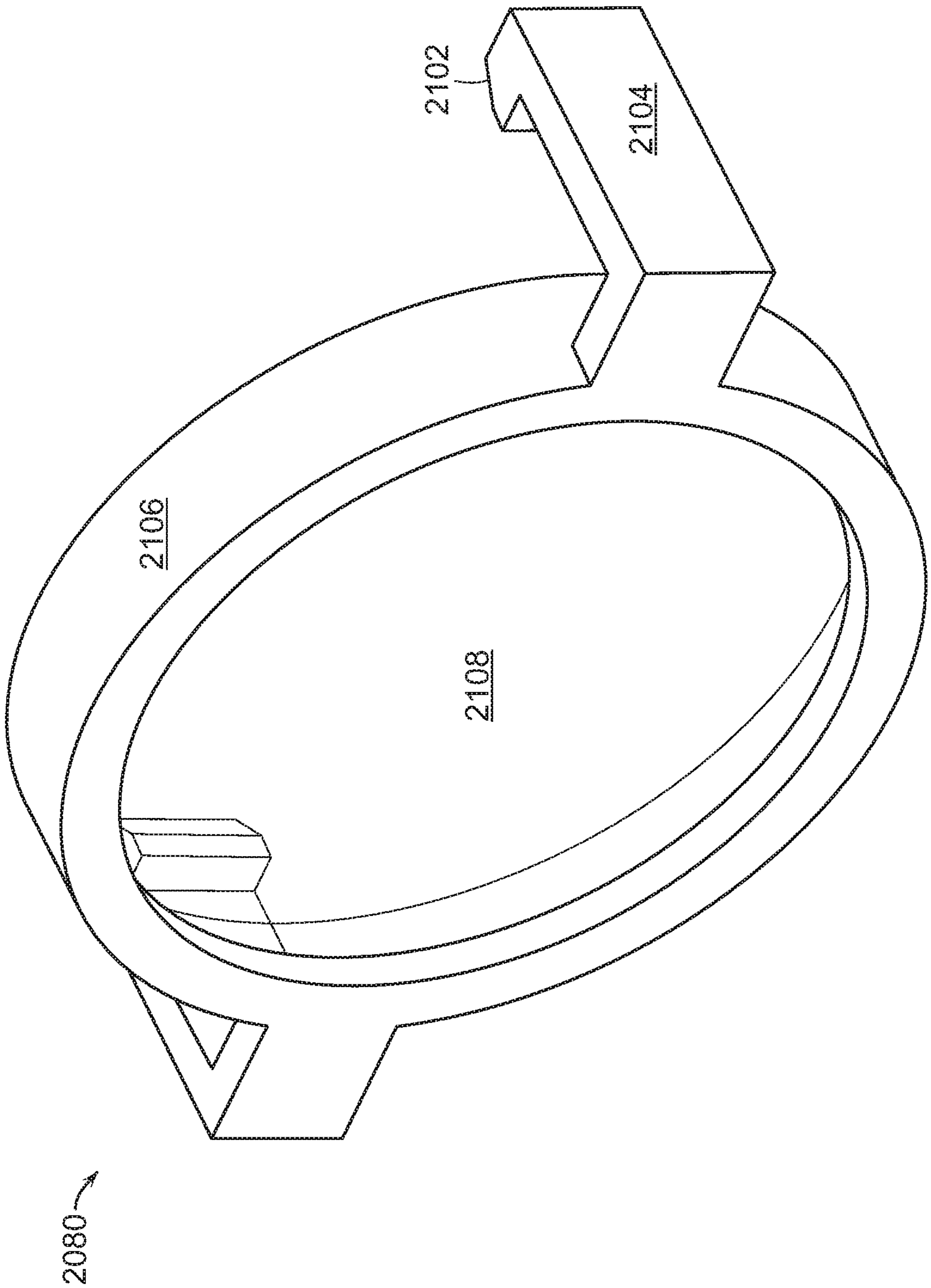
Figure 189A:
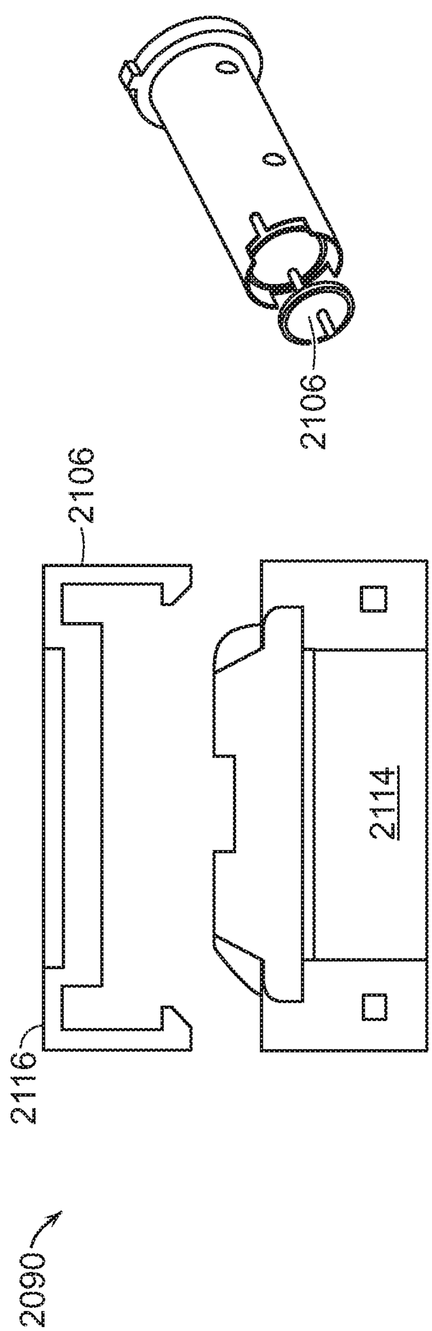
Figure 189B:
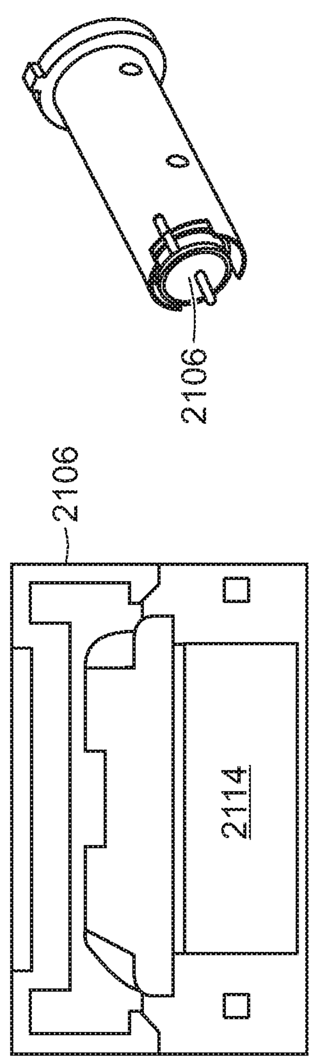
Figure 189C:
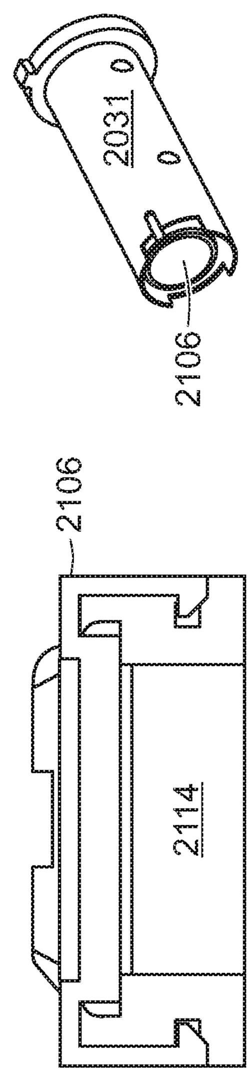

The window 2080 described above must be field-replaceable, meaning that technicians can easily remove and replace the windows without the need for a cleanroom lab environment. The embodiment 2080 shown in FIG. 188 allows for simple removal and replacement of windows in the field. It includes the window 2108, in this case but not limited to being recessed from the front surface of the window frame 2106, latch arms 2104 which have some means of positive window retention when the connector is fully assembled and connected such as but not limited to a catch 2102. The simple installation 2090 of the window 2080 is shown in FIG. 189 sequentially from top to bottom starting with the initial orientation where the latch arms 2104 are aligned with the latch recesses 2046 of the imager housing 2031 (FIG. 189*a*), followed by wedging the latch arms 2104 outward by applying force 2116 (FIG. 189*b*), and finally the latching of the window as the latch arms 2104 spring inward and the catch 2102 interfaces with the latch recesses 2046 (FIG. 189*c*). Isometric views are shown to the right of each cross section for clarification. One embodiment involves molded polymer materials, while other embodiments include a metal or plastic frame with glass or other window material.

Figure 190:
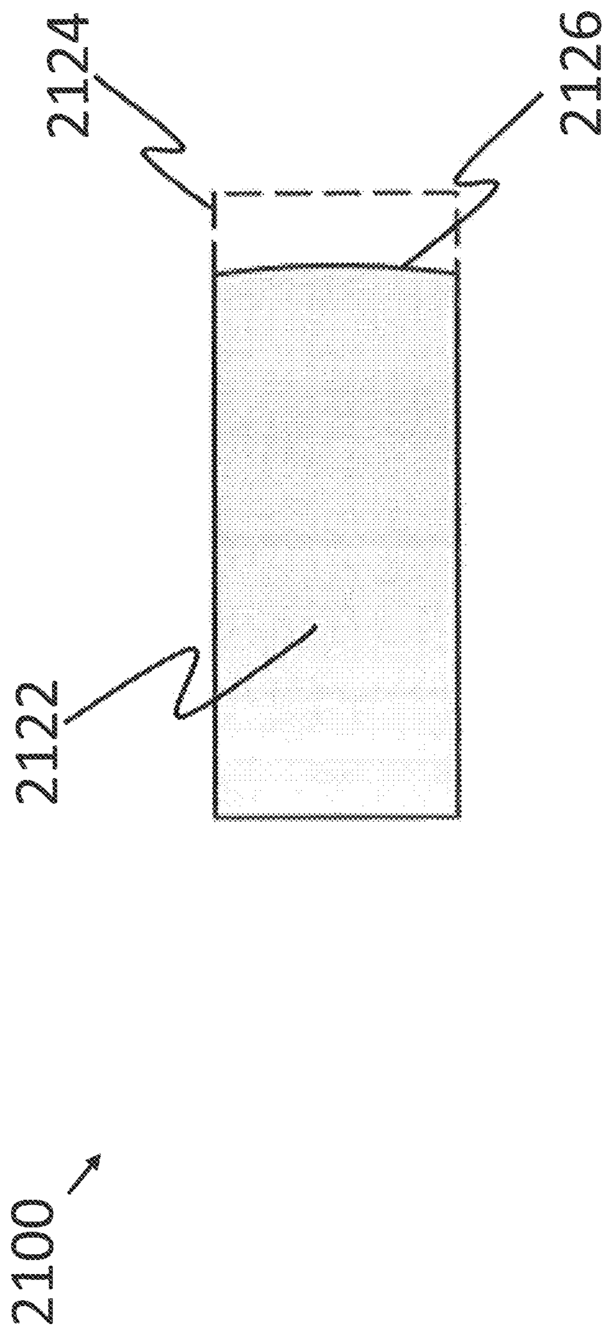

The GRIN rod collimator 1450 illustrated in FIG. 133 is often used in pairs to reimage light from a source to a detector or other receiving system. Unfortunately, the image quality that results from the use of these GRIN rods is commonly limited by spherical aberration and Petzval curvature, which increase the spot size and reduce the total throughput of systems that utilize these devices to couple light from one device to another. These aberrations can be reduced by modifying one or more of the refractive surfaces of these GRIN rods to improve their image quality. Reference is made to FIG. 190, which is an embodiment of an optical collimator 2100, where one of the refractive surfaces 2124 of the GRIN rod element 1516 in the GRIN rod collimator 1450 illustrated in FIG. 133 has been replaced with a spherical refractive surface 2126 to make the hybrid refractive GRIN rod element 2122.

Figure 191:
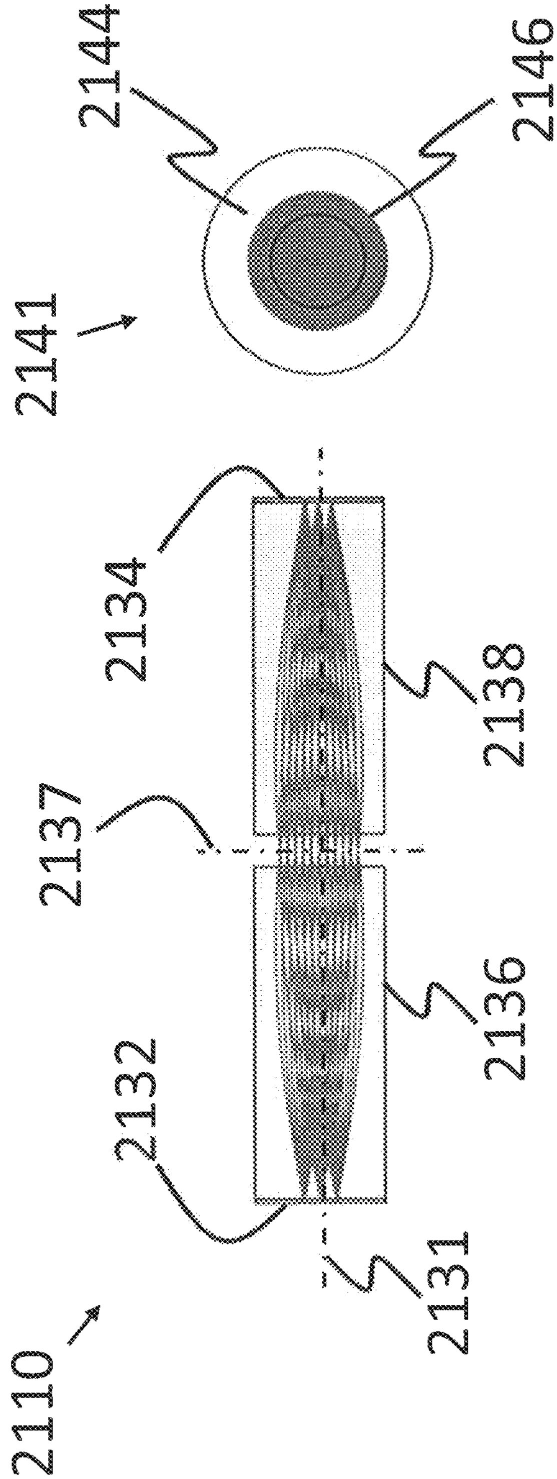

Reference is made to FIG. 191, which shows a GRIN rod optical relay system 2110, taken along its optical axis 2131. Light emitted or reflected by a source, the preferred embodiment of which is made up of, but not limited to, an array of optical fibers, located at the object plane 2132, is incident on a first GRIN rod 2136, which is optically disposed between the object plane 2132 and a pupil 2137, and is capable of substantially receiving a portion of the light emanating from the object plane 2132 and substantially collimating the light at the pupil 2137. Light is then incident on a second GRIN rod 2138, which is optically disposed between the pupil 2137 and a focus position (hereinafter also referred to as an image plane) of a CCD array, phosphorescent screen, photographic film, microbolometer array, or other means of detecting light energy, hereinafter referred to generally as a detecting element 2134, and is capable of substantially receiving a portion of the light emanating from the pupil 2137 and substantially focusing the light at the detecting element 2134, the preferred embodiment of which is made up of, but not limited to, an array of optical fibers. A view of an image 2144 of a single optical fiber core in the object plane 2132, taken at the detecting element 2137 along a plane perpendicular to the optical axis 2131, is shown superimposed on a corresponding single optical fiber at the detecting element 2137 in FIG. 191, where the image 2144 of the fiber core at the detecting element 2137 is substantially larger in size than the fiber core 2146 of the corresponding single optical fiber at the detecting element 2137.

Figure 192:
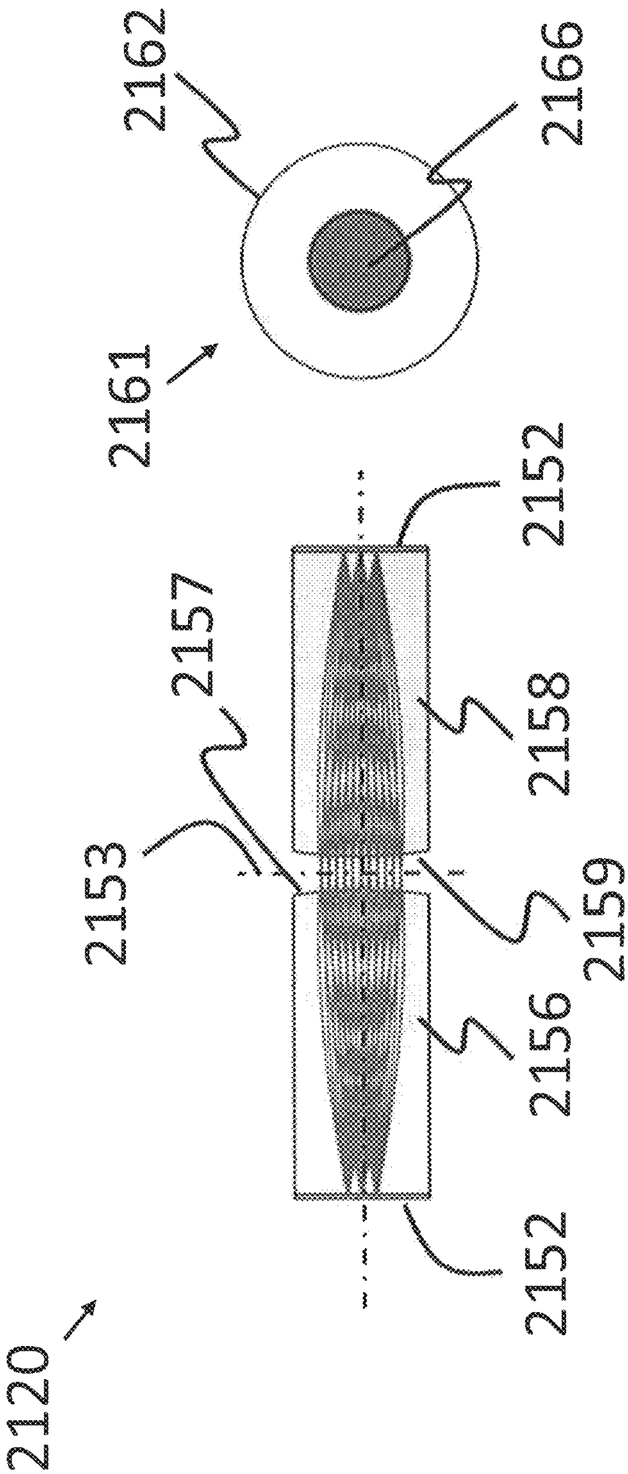

Reference is now made to FIG. 192, which is an embodiment of an optical relay system 2120, taken along its optical axis 2151. Light emitted or reflected by a source located at the object plane 2152, is incident on a first optical element 2156, in this embodiment made up of but not limited to a GRIN rod with a spherical refractive surface 2157, which is optically disposed between the object plane 2152 and a pupil 2153, and is capable of substantially receiving a portion of the light emanating from the object plane 2152 and substantially collimating the light at the pupil 2153. Light is then incident on a second optical element 2158, in this embodiment made up of but not limited to a GRIN rod with a spherical refractive surface 2159, which is optically disposed between the pupil 2153 and a detecting element 2154, and is capable of substantially receiving a portion of the light emanating from the pupil 2153 and substantially focusing the light at the detector 2154. A view of an image 2164 of a single optical fiber core 2166 in the object plane 2152, taken at the detecting element 2154 along a plane perpendicular to the optical axis 2151, is shown superimposed on a corresponding single optical fiber at the detecting element 2154 in FIG. 192, where the image 2164 of the fiber core at the detecting element 2154 is comparable in size than the fiber core 2166 of the corresponding single optical fiber at the detecting element 2154.

Figure 193:
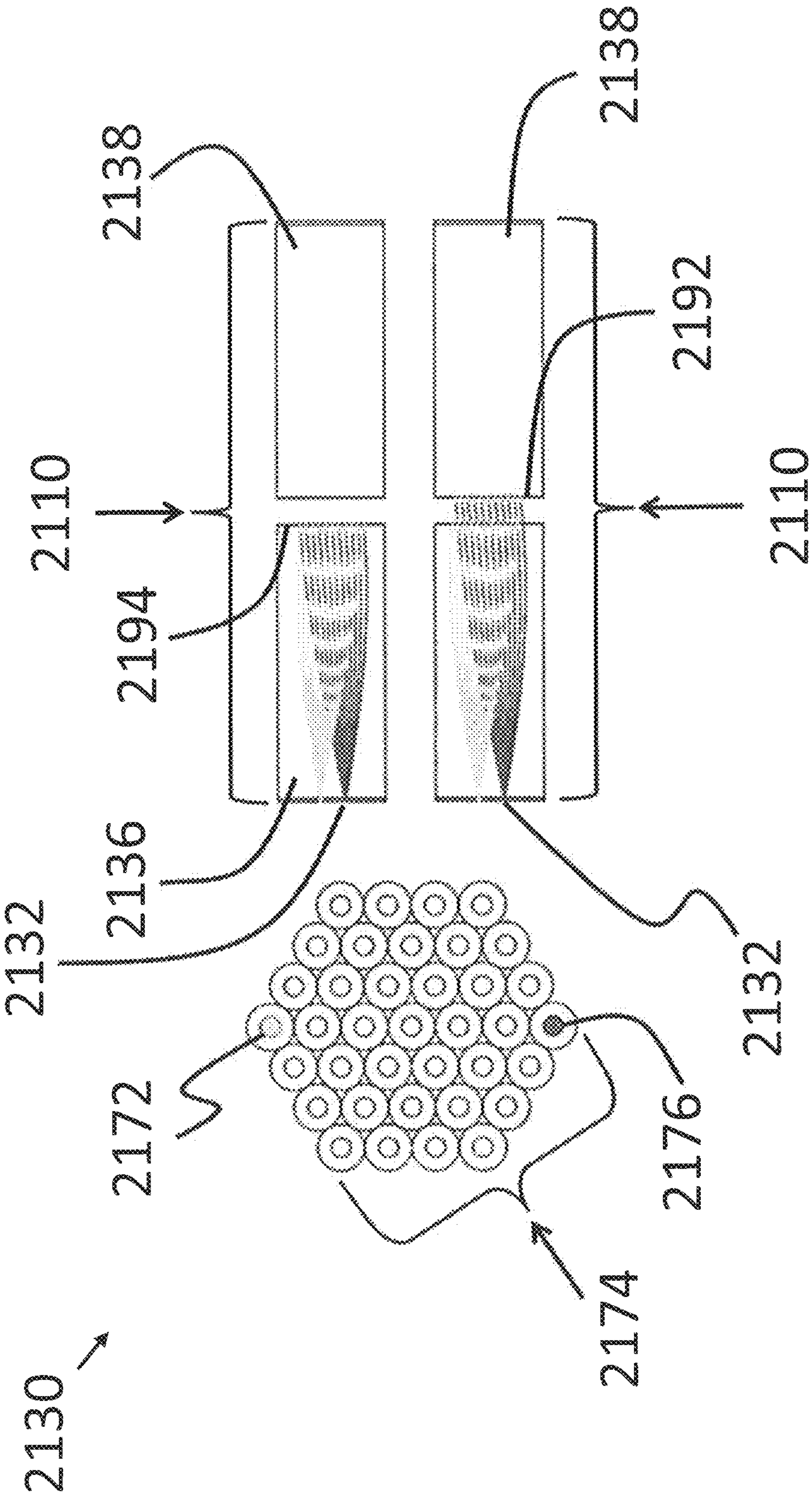
FIGS. 193-194 show embodiments of the electromagnetic interference (EMI) shields used in these teachings.

The use of GRIN rods in optical relay imagers can often result in unwanted ghost images reflecting back onto the source, which in some cases, such as but not limited to laser diodes or VCSELs, can result in instabilities in the output of these sources. Reference is made to FIG. 193, which contains multiple views of the GRIN rod optical relay system 2110 illustrated in FIG. 191. Light emitted or reflected by the source, the preferred embodiment of which is made up of, but not limited to, an array of optical fibers 2174, located at the object plane 2132, is incident on the first GRIN rod 2136, which is capable of substantially receiving a portion of the light emanating from the object plane 2132. Any portion of the light that is reflected by the refractive surface 2194 of the first GRIN rod 2136 is redirected back and substantially imaged by the first GRIN rod 2136 onto the object plane 2132. If the array of optical fibers 2174 and the first GRIN rod 2136 are both located along the optical axis 2131, then the portion of the light from a first optical fiber core 2176 that is reflected from the refractive surface 2194 of the first GRIN rod 2136 will be substantially reimaged to the core of a second optical fiber core 2172 located at a substantially symmetric location in the array of optical fibers 2174 about the optical axis 2131. Similarly, any portion of the light that is reflected by the refractive surface 2192 of the second GRIN rod 2138 is redirected back and substantially imaged by the first GRIN rod 2136 onto the object plane 2132 and substantially reimaged to the second optical fiber core 2172. A view of the array of optical fibers 2174, taken at the object plane 2132 along a plane perpendicular to the optical axis 2131, is also shown in FIG. 193, where the image of the portion of the light from a first optical fiber core 2176 that is reflected from either the refractive surface 2194 of the first GRIN rod 2136 or reflected from the refractive surface 2192 of the second GRIN rod 2138 is comparable in size to the second optical fiber core 2172.

Figure 194:
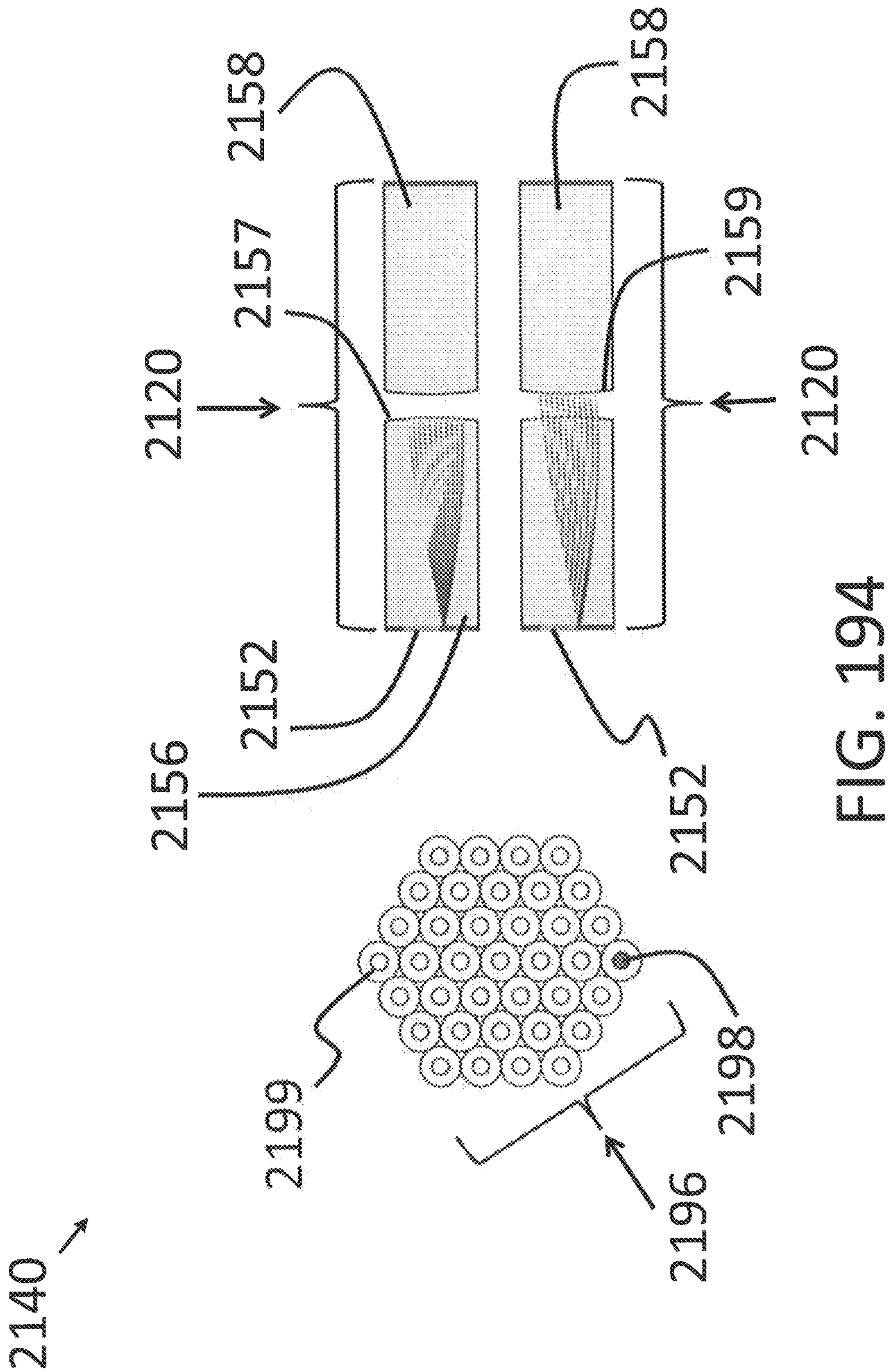

Reference is made to FIG. 194, which contains multiple views of the embodiment of the optical imaging system 2120 illustrated in FIG. 192. Light emitted or reflected by the source, the preferred embodiment of which is made up of, but not limited to, an array of optical fibers 2196, located at the object plane 2152, is incident on the first optical element 2156, which is capable of substantially receiving a portion of the light emanating from the object plane 2152. Any portion of the light that is reflected by the spherical refractive surface 2157 of the first optical element 2156 is redirected back and substantially imaged by the first optical element 2156 onto the object plane 2152. If the array of optical fibers 2196 and the first optical element 2156 are both located along the optical axis 2151, then the portion of the light from a first optical fiber core 2198 that is reflected from the spherical refractive surface 2157 of the first optical element 2156 will be substantially reimaged to a second optical fiber core 2199 located at a substantially symmetric location in the array of optical fibers 2196 about the optical axis 2151. Similarly, any portion of the light that is reflected by the spherical refractive surface 2157 of the second optical element 2158 is redirected back and substantially imaged by the first optical element 2156 onto the object plane 2152 and substantially reimaged to the core of the second optical fiber 2199. A view of the array of optical fibers 2196, taken at the object plane 2152 along a plane perpendicular to the optical axis 2151, is also shown in FIG. 194, where the image of the portion of the light from a first optical fiber core 2198 that is reflected from either the spherical refractive surface 2157 of the first optical element 2156 or reflected from the spherical refractive surface 2159 of the second optical element 2158 is substantially larger in size than the second optical fiber core 2198.

While the addition of a spherical curvature to the front surface of the GRIN rod imagers can reduce the crosstalk in the system, it does so by spreading the ghost energy out over many channels, as illustrated in FIG. 194. A greater reduction in crosstalk can be achieved if the ghost imagery could be kept focused, as in the case of the GRIN rod optical relay system 2110 illustrated in FIG. 191 and FIG. 193, but directed to a location that would not interfere with other fibers in the array. In order to accomplish this, the line of symmetry in the array of optical fibers 2174 at the object plane 2132 can be offset from the optical axis 2131 without interrupting the imaging characteristics of the system, as illustrated in the isometric transparent view of FIG. 195.

Figure 195:
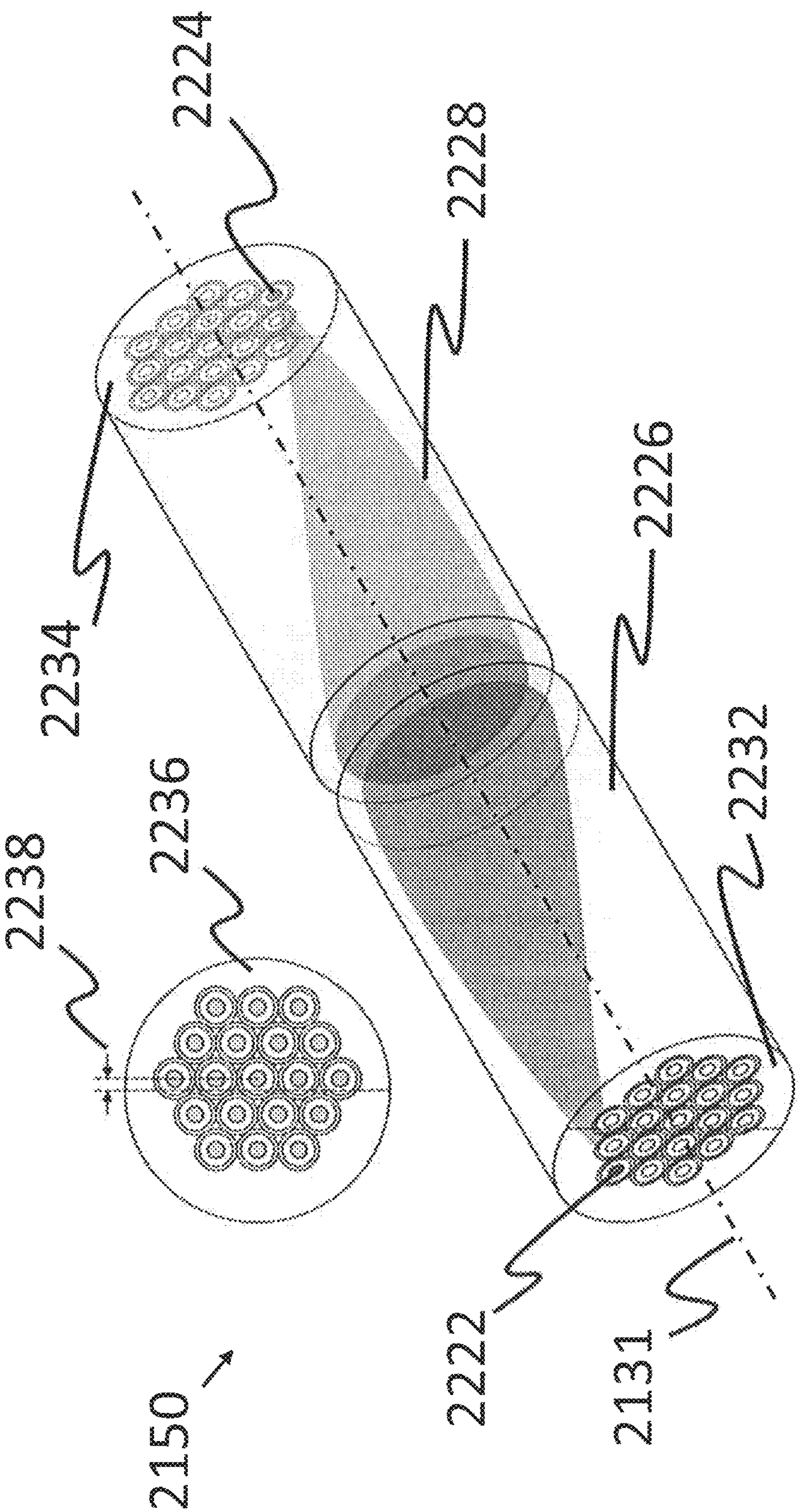
FIG. 195 shows an embodiment of the imager housing of these teachings.

Reference is made to FIG. 195, which is an embodiment of an optical imaging system 2150, taken from a transparent isometric view, where the array of optical fibers 2174 at the object plane 2132 of the GRIN rod optical relay system 2110 illustrated in FIG. 191 and FIG. 193 is displaced from the optical axis and the plane of symmetry by some offset 2238. Light emitted or reflected by the source, the preferred embodiment of which is made up of, but not limited to, an array of optical fibers 2174 located at the object plane 2132, is incident on a first GRIN rod 2136, which is capable of substantially receiving a portion of the light emanating from the object plane 2132. Light is then incident on a second GRIN rod 2138, which is optically disposed between the first GRIN rod 2136 and a detecting element 2134, and is capable of substantially receiving a portion of the light emanating from the first GRIN rod 2136 and substantially focusing the light at the detecting element 2134, the preferred embodiment of which is made up of, but not limited to, and array of optical fibers. In this manner, light from a first optical fiber 2222 in the array of optical fibers 2174 at the object plane 2132 is substantially reimaged to a corresponding first optical fiber 2224 at the detecting element 2134.

Figure 196:
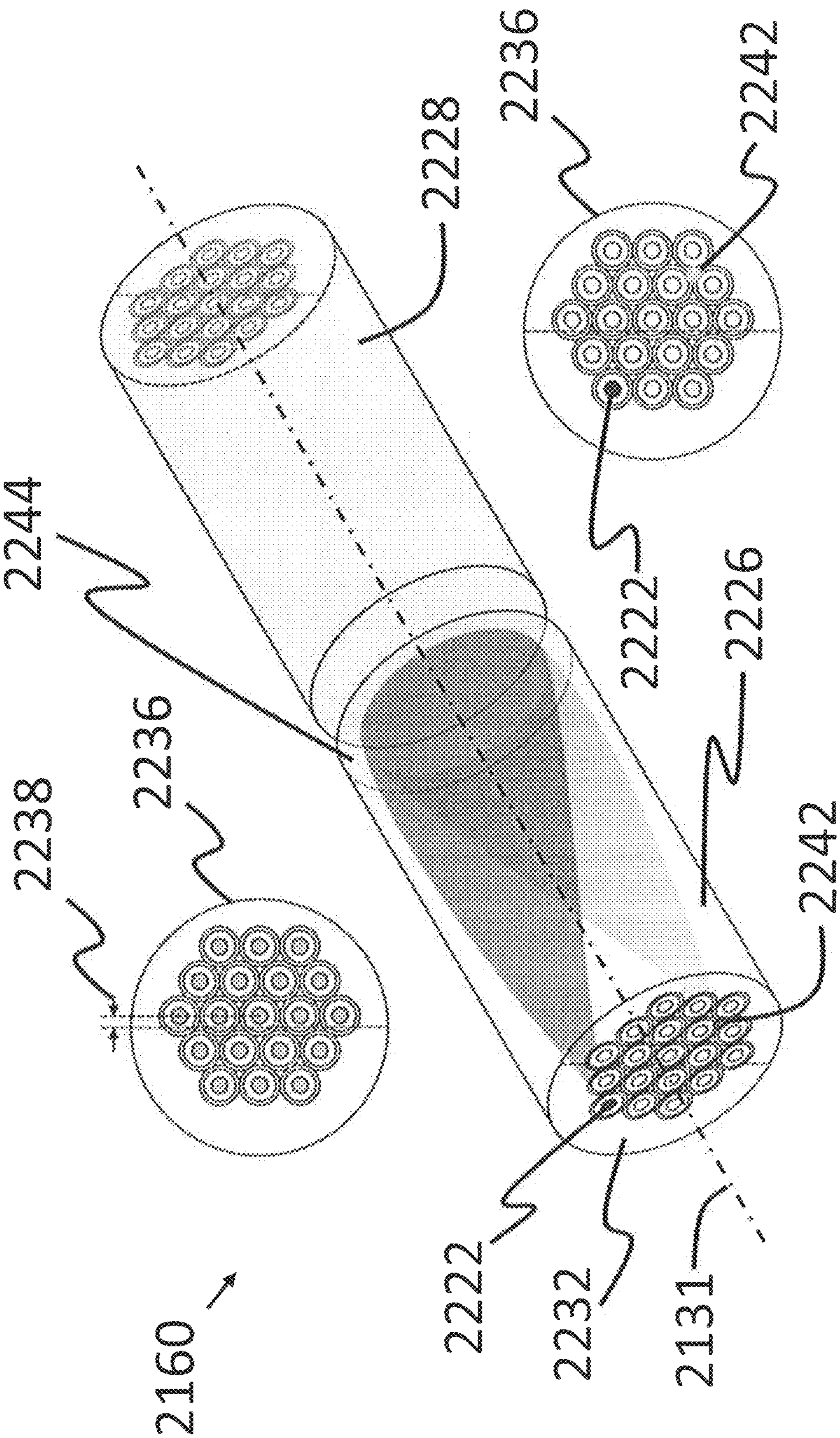
FIGS. 196-197 show an embodiment of a imager protective window.

Reference is now made to FIG. 196, which is another transparent isometric view of the same embodiment of an optical imaging system 2150 illustrated in FIG. 195. Light emitted or reflected by the first optical fiber 2222 in the array of optical fibers 2174 at the object plane 2132 is incident on the first GRIN rod 2136, which is capable of substantially receiving a portion of the light emanating from the first optical fiber 2222. Any portion of the light that is reflected by the refractive surface 2194 of the first GRIN rod 2136 is redirected back and substantially imaged by the first GRIN rod 2136 onto the object plane 2132. If the array of optical fibers 2174 and the first GRIN rod 2136 are both located along the optical axis 2131, then the portion of the light from the first optical fiber core 2222 that is reflected from the refractive surface 2194 of the first GRIN rod 2136 will be substantially reimaged to the core of a second optical fiber 2172 located at a substantially symmetric location in the array of optical fibers 2174 about the optical axis 2131. A view of the array of optical fibers 2174, taken at the object plane 2132 along a plane perpendicular to the optical axis 2131, is also shown in FIG. 193, where the image of the portion of the light from a first optical fiber core 2222 that is reflected from the refractive surface 2194 of the first GRIN rod 2136 is substantially located in between optical fibers at the detecting element 2134.

By introducing an offset 2238 between the line of symmetry 2236 in the array of optical fibers 2174 at the object plane 2132 and the optical axis 2131, the reflected energy from the first refractive surface 2194 of the first GRIN rod 2136 is re-imaged back to the array of optical fibers 2174 to a location 2242 between optical fibers. If the first refractive surface is substantially planar and optically disposed substantially near the collimated space or pupil of the optical relay, the ghosts reflected back to the object plane 2132 are substantially imaged to the object plane 2132 and do not substantially overlap with any of the other optical fibers in the array of optical fibers 2174. As a result, this ghost energy is substantially lost in the spaces between the optical fibers, which substantially reduces the amount of crosstalk between channels. In some embodiments, an opaque epoxy can be used to absorb this reflected light.

Figure 197:
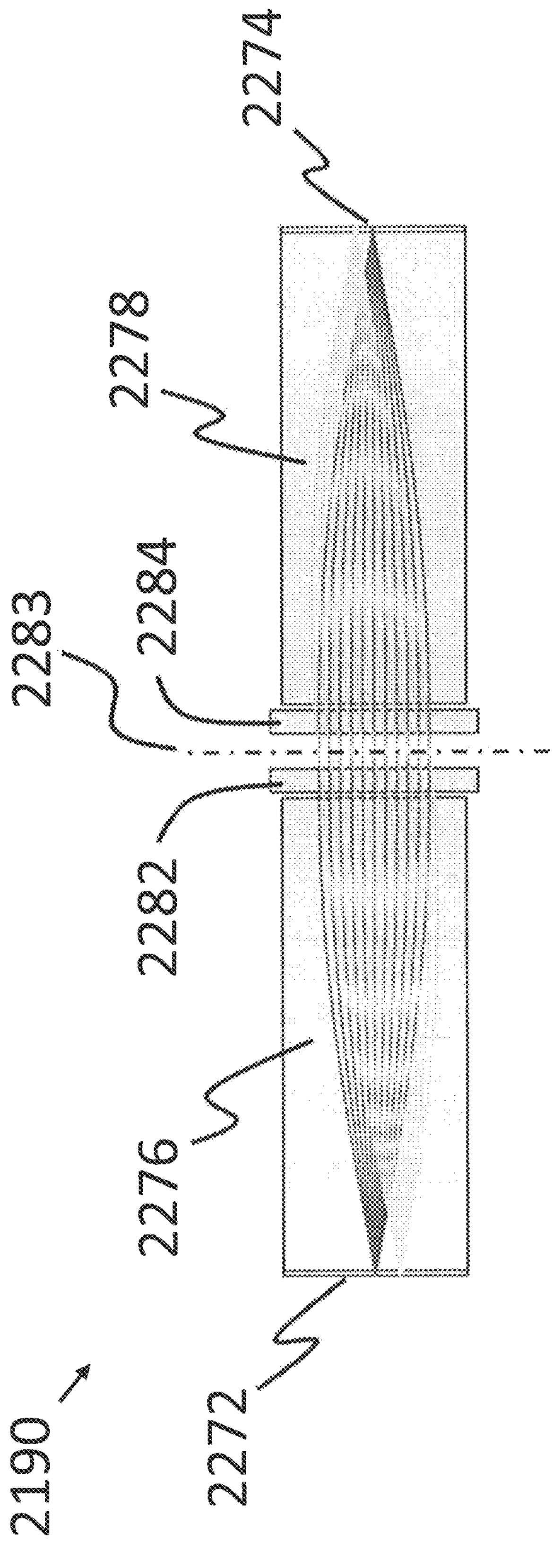

In some applications it is desirable to improve the image quality of a relay optical system while simultaneously protecting the exposed surfaces of the more expensive or more difficult to replace optical components in the system. This can be accomplished by introducing aspheric protective windows that not only protect one or more optical elements but also provide aberration correction to improve image quality. Reference is made to FIG. 197, which is an embodiment of an optical relay system 2190, where aspheric windows 2282 and 2284 are optically disposed between the first and second GRIN rods 2136 and 2138 respectively and the pupil 2137 in the GRIN rod optical relay system 2110 illustrated in FIG. 191. Light emitted or reflected by a source located at the object plane 2132, is incident on a first GRIN rod 2136, which is optically disposed between the object plane 2132 and an aspheric window 2282, and is capable of substantially receiving a portion of the light emanating from the object plane 2132 and substantially collimating the light at the pupil 2137. Light is then incident on a first aspheric window optically disposed between the first GRIN rod 2136 and the pupil 2137, which is capable of substantially receiving a portion of the light emanating from first GRIN rod 2136 and substantially correcting spherical aberration in the collimated light introduced by the first GRIN rod 2136. Light is then incident on a second aspheric window 2284 optically disposed between the pupil 2137 and a second GRIN rod 2138, which is capable of substantially receiving a portion of the light emanating from the pupil 2137 and substantially correcting spherical aberration in the collimated light introduced by the second GRIN rod 2138. Light is then incident on a second GRIN rod 2138, which is optically disposed between the second aspheric window 2284 and a detecting element 2134, and is capable of substantially receiving a portion of the light emanating from the second aspheric window 2284 and substantially focusing the light at the detecting element 2134.

Figure 198:
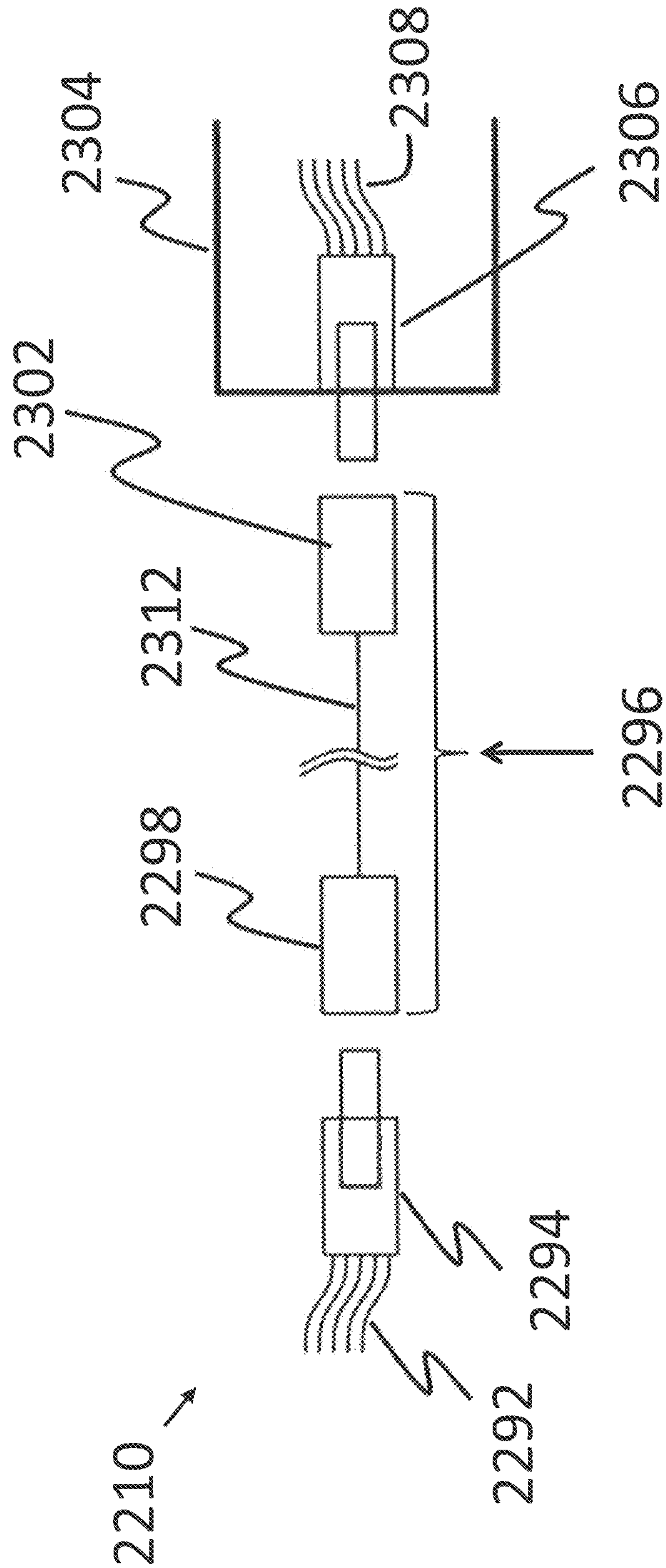
FIGS. 198-205 show embodiments of the optical relay system of these teachings.

A preferred embodiment of the UDAT cable plant 2210 is illustrated in FIG. 198. In this design scenario, the cable plant 2210 will consist of two breakouts 2294 and 2306 interconnected with an intermediate UDAT cable 2296. One breakout 2306 will interface with the EMI shield box 2304 to maintain the EMI shield boundary and provide a breakout for individual fiber connections 2308, while the other breakout 2294 will simply act as a breakout for individual fiber connections 2292. The UDAT cable 2296 consists of a connector 2298, connecting tubing 2312, and connector 2302 which allows for simple reversal, i.e. the two breakouts 2294 and 2306 and/or the connectors 2298 and 2302 positions can be switched.

Figure 199:
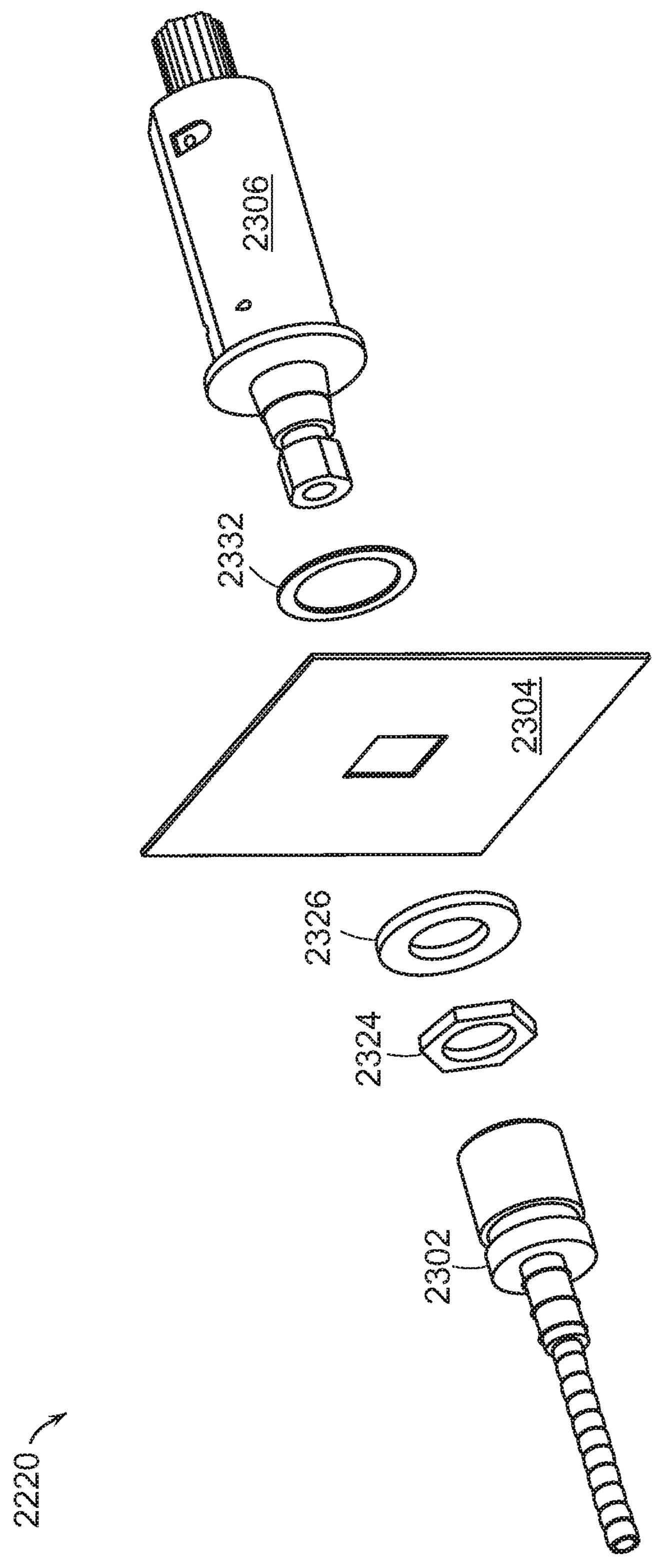
Figure 200A:
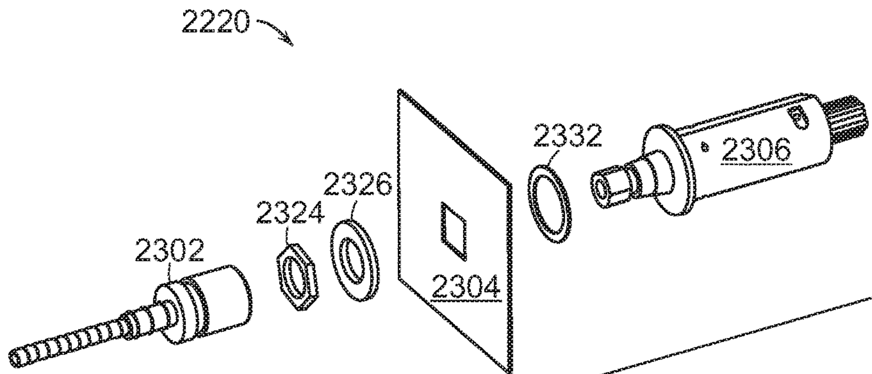
Figure 200B:
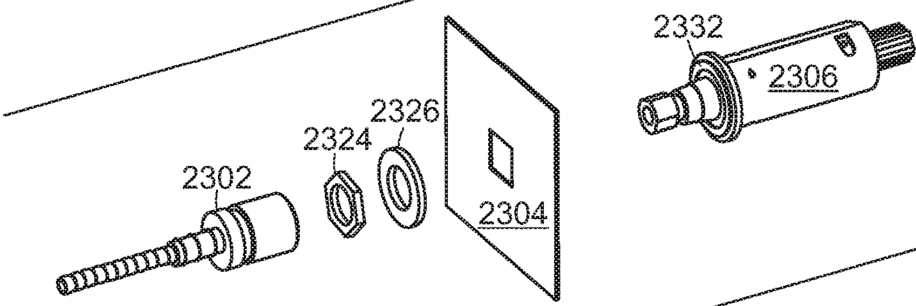
Figure 200C:
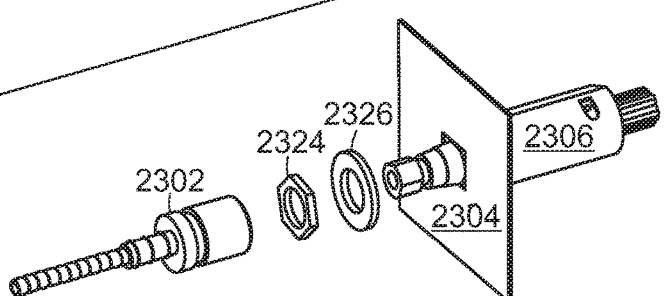
Figure 200D:
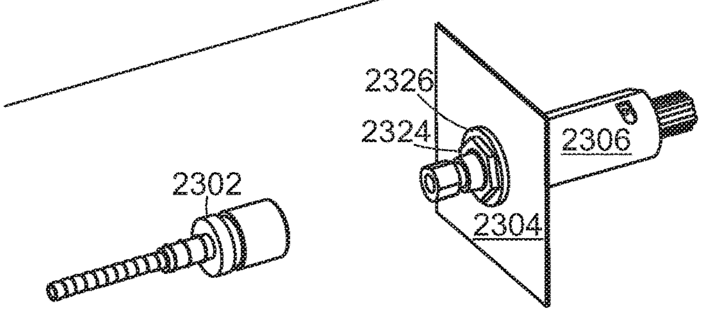
Figure 201A:
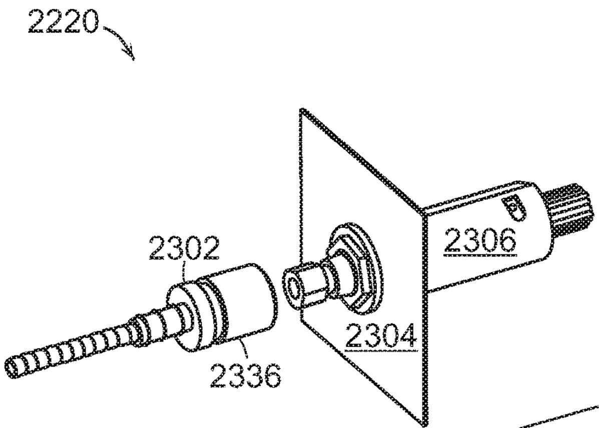
Figure 201B:
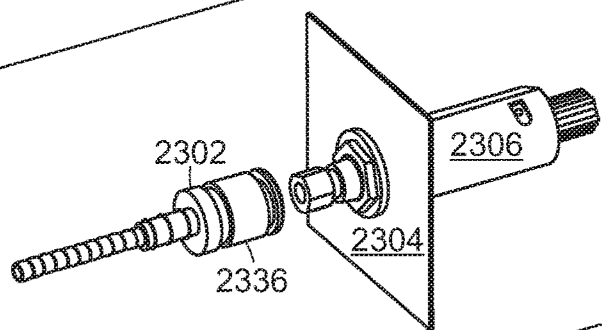
Figure 201C:
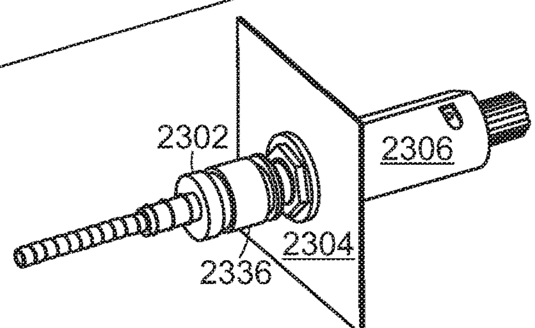
Figure 201D:
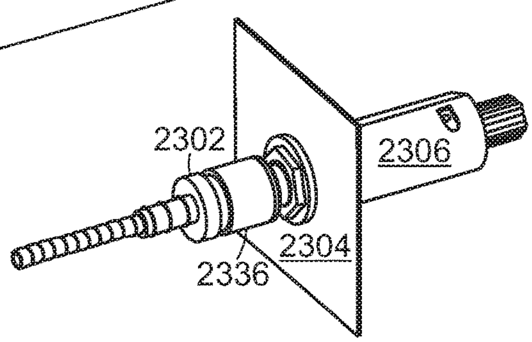

The system design allows for simple installation into an EMI shielded box. The connector is illustrated in further detail as an exploded view in FIG. 199. The connector 2220 consists of the breakout 2306, crush gasket 2332, EMI shield box 2304, nut 2324, washer 2326, and UDAT connector 2302. The installation of the UDAT breakout 2306 into the shield wall 2304 is shown in sequential order in FIG. 200. The components are initially shown in FIG. 200A. The crush gasket 2332 is mounted to the UDAT breakout 2306 flange (FIG. 200B) and compressed against the EMI shield wall 2304 (FIG. 200C) and then the nut 2324 and washer 2326 are tightened (FIG. 200D). Similarly, the sequence of steps required to mate the UDAT connector 2302 with the UDAT breakout 2306 is shown in FIG. 201. The components are shown lined up in FIG. 201A. The UDAT connector 2302 spring-loaded retainer 2336 is pulled back (FIG. 201B), then the connector 2302 is inserted onto the protruding section of the breakout 2306 (FIG. 201C). The external keys on the breakout 2306 interface with the internal key slots in the UDAT connector 2302 to provide initial rotational alignment. The connector 2302 is pushed onto the breakout 2306 until the released spring-loaded retainer 2336 clicks into place (FIG. 201D), which locks the connector 2302 into place on the breakout 2306.

Figure 202:
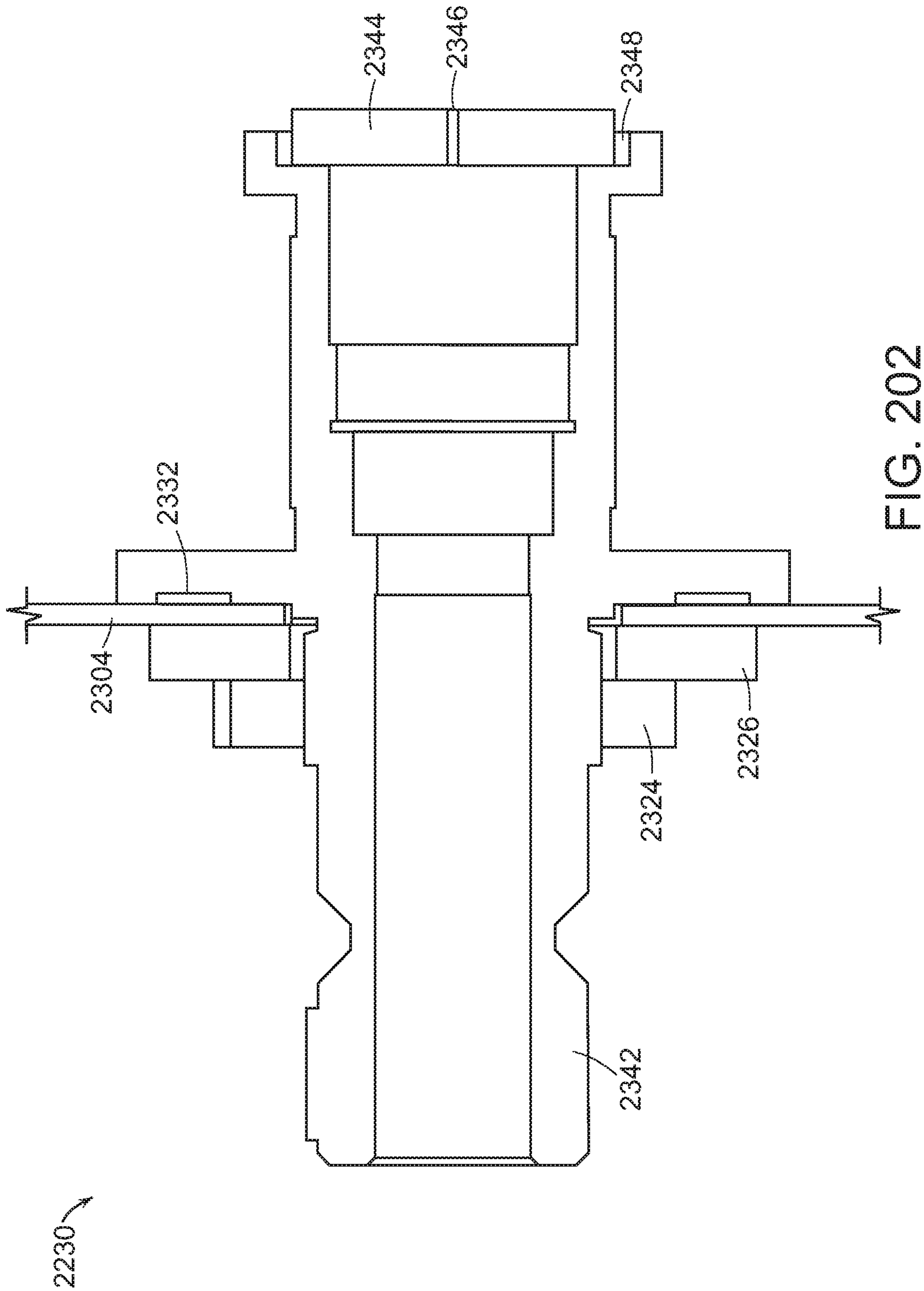
Figure 203:
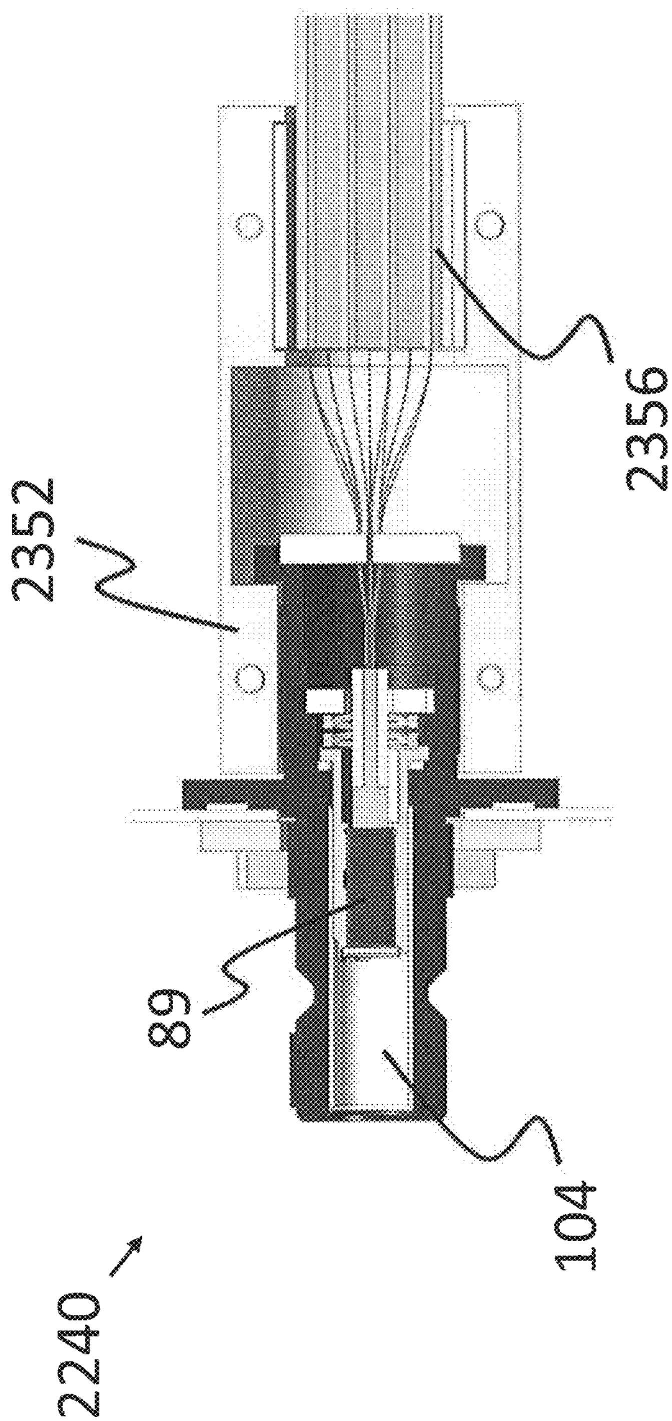

A detailed cross-sectional view 2230 of the EMI boundary is shown in FIG. 202. During assembly of the UDAT breakout, the EMI shield button 2344 is soldered 2348 around its outer circumference to the sleeve housing 2342, providing a 360° ground path. As previously discussed, the sleeve housing flange 2342, in conjunction with the compression nut 2324 and washer 2326, compress the crush gasket 2332 to the EMI shield wall 2304, completing the boundary. In this embodiment, 37 fibers are connected and are passed through the shield button 2344 individually or in groups (e.g. 6 to 7 fibers per group), each group passing through a small hole 2345 (e.g. 0.3-0.6 mm hole) in an array of holes 2346 in the EMI shield button 2344 that can be, but is not limited to, from 3 mm to 15 mm long, to produce the required level of suppression at the highest target EMI frequency (waveguide beyond cutoff). A similar view of the UDAT breakout 2240 as shown in system 2230 but including the split sleeve 104, imager housing assembly 89, furcation tube clamp 2352, and furcation tube array 2356, is shown in FIG. 203.

Figure 204:
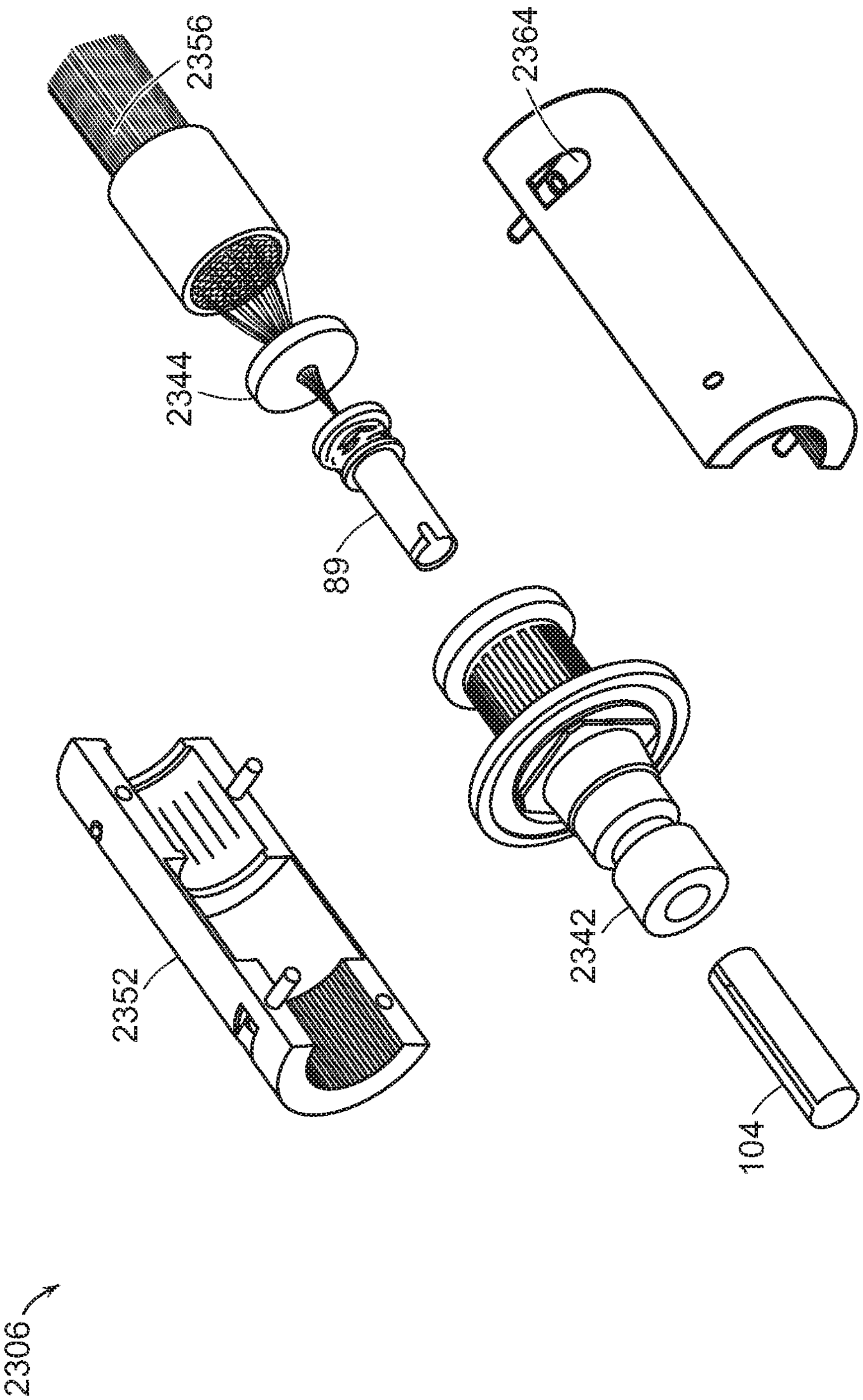

The construction of the UDAT breakout 2306 involves assembly of the components illustrated in FIG. 204. The sleeve 104 is inserted into the sleeve housing 2342, followed by insertion of the imager housing assembly 89 into the sleeve housing 2342. The EMI shield button 2344 is then soldered onto the recess in the sleeve housing 2342. The furcation tube clamps 2352 and 2364 are then mounted onto the sleeve housing 2342 clamping the furcation tube array 2356, completing the assembly of the UDAT breakout.

Figure 205:
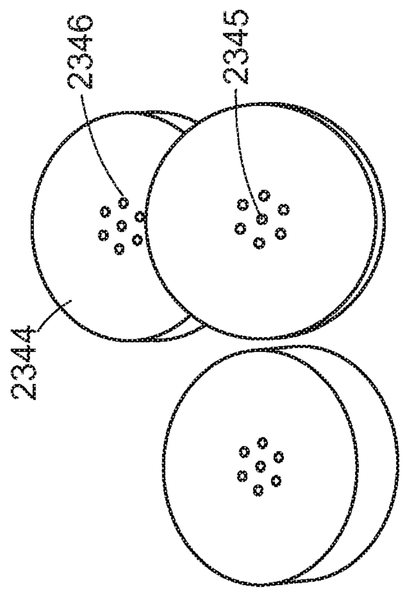

The EMI shield buttons 2344 shown in FIG. 205 pass fibers in subgroups of roughly 6 fibers through an array of holes 2346. The holes 2345 can be, for example, 0.5 mm diameter and 10 mm long, or roughly quarter wave diameter at >200 GHz and many wavelengths long providing excellent EMI suppression. The holes 2345 that the fibers pass through can be made nearly as small as a single fiber, and in that case each fiber has an individual hole. Each hole acts as a waveguide beyond cutoff, and the EMI field exponentially decays with distance through the hole. The smaller the holes and/or the thicker the EMI shield button, the greater the attenuation on the incoming field. In this manner the shield can be designed to provide nearly any desired attenuation level for a given attacking EMI frequency or spectrum.

Figure 206:
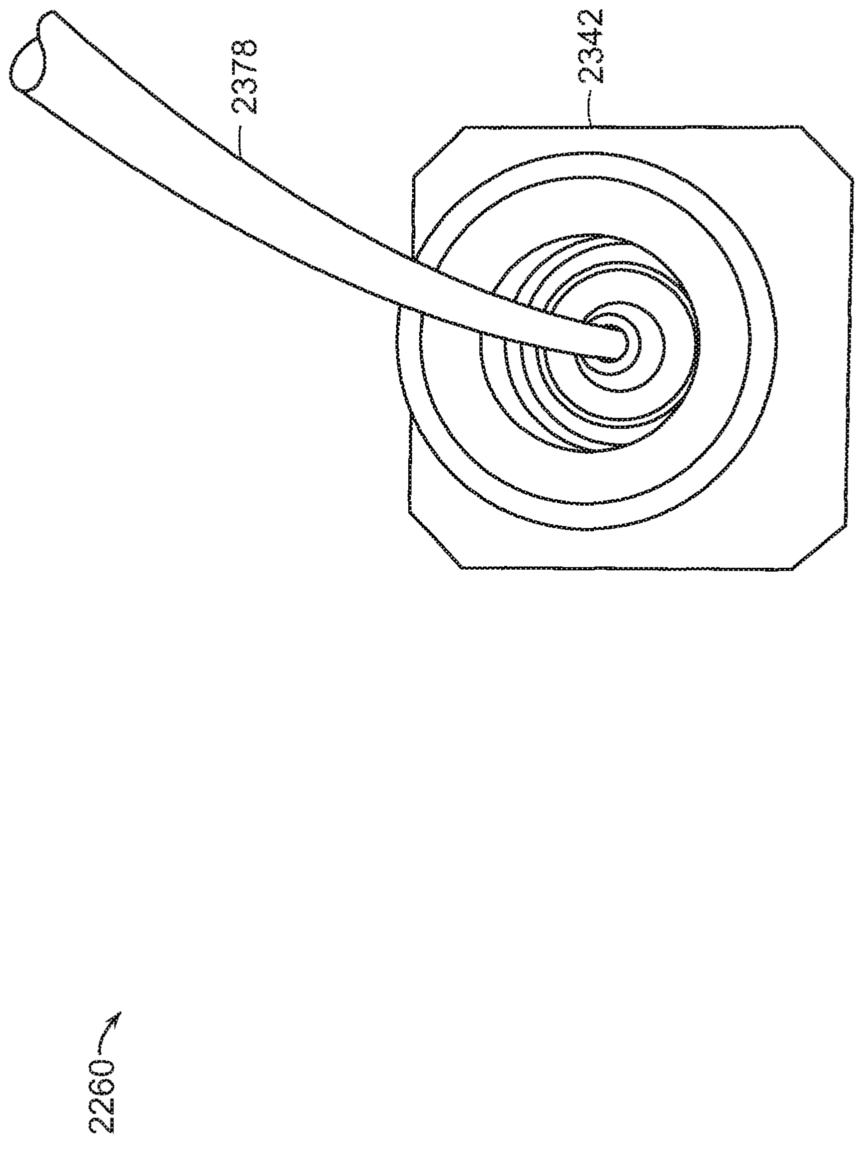
FIGS. 206-225 show an embodiment of a bulkhead-mounted UDAT connector of these teachings.
Figure 207:
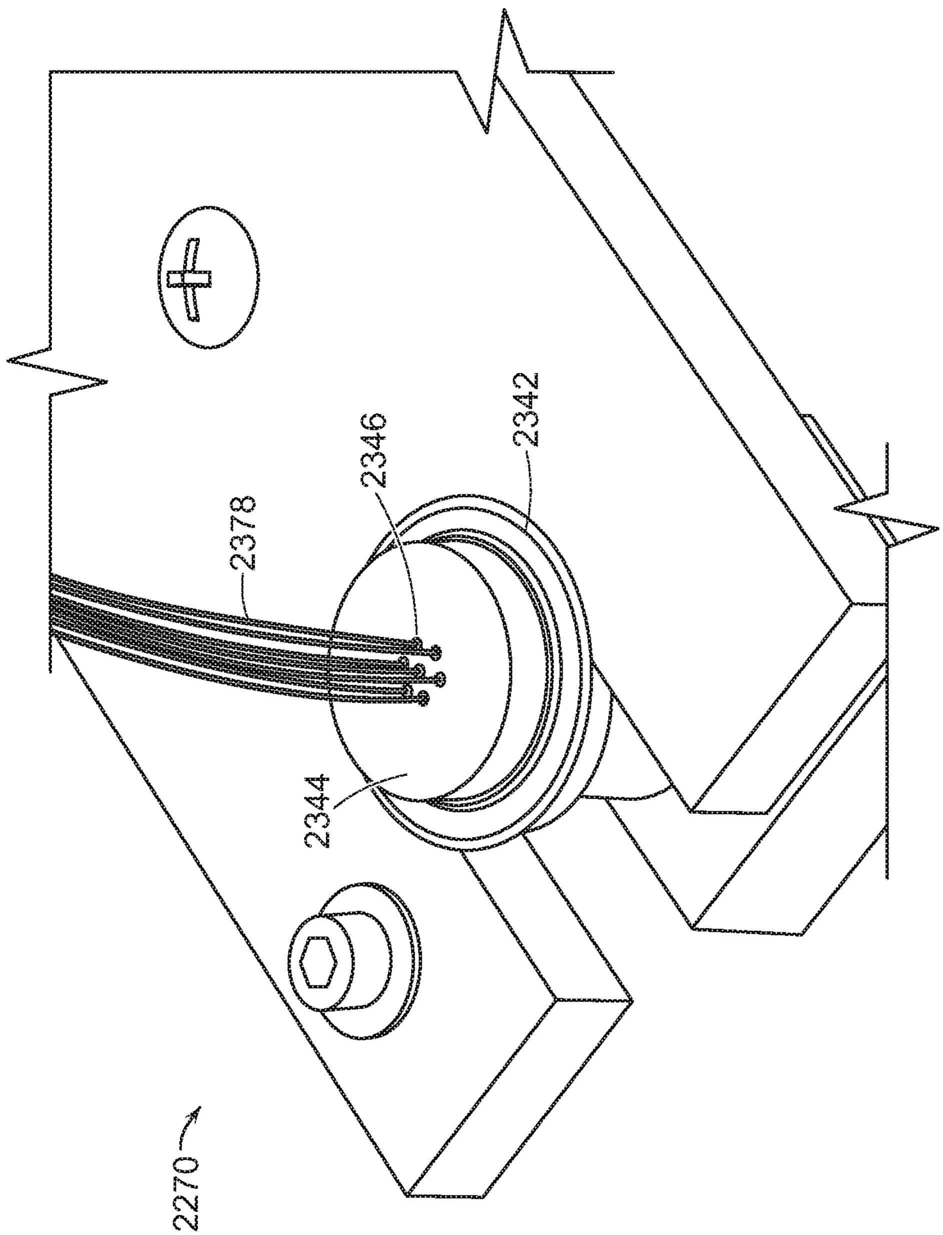
Figure 208:
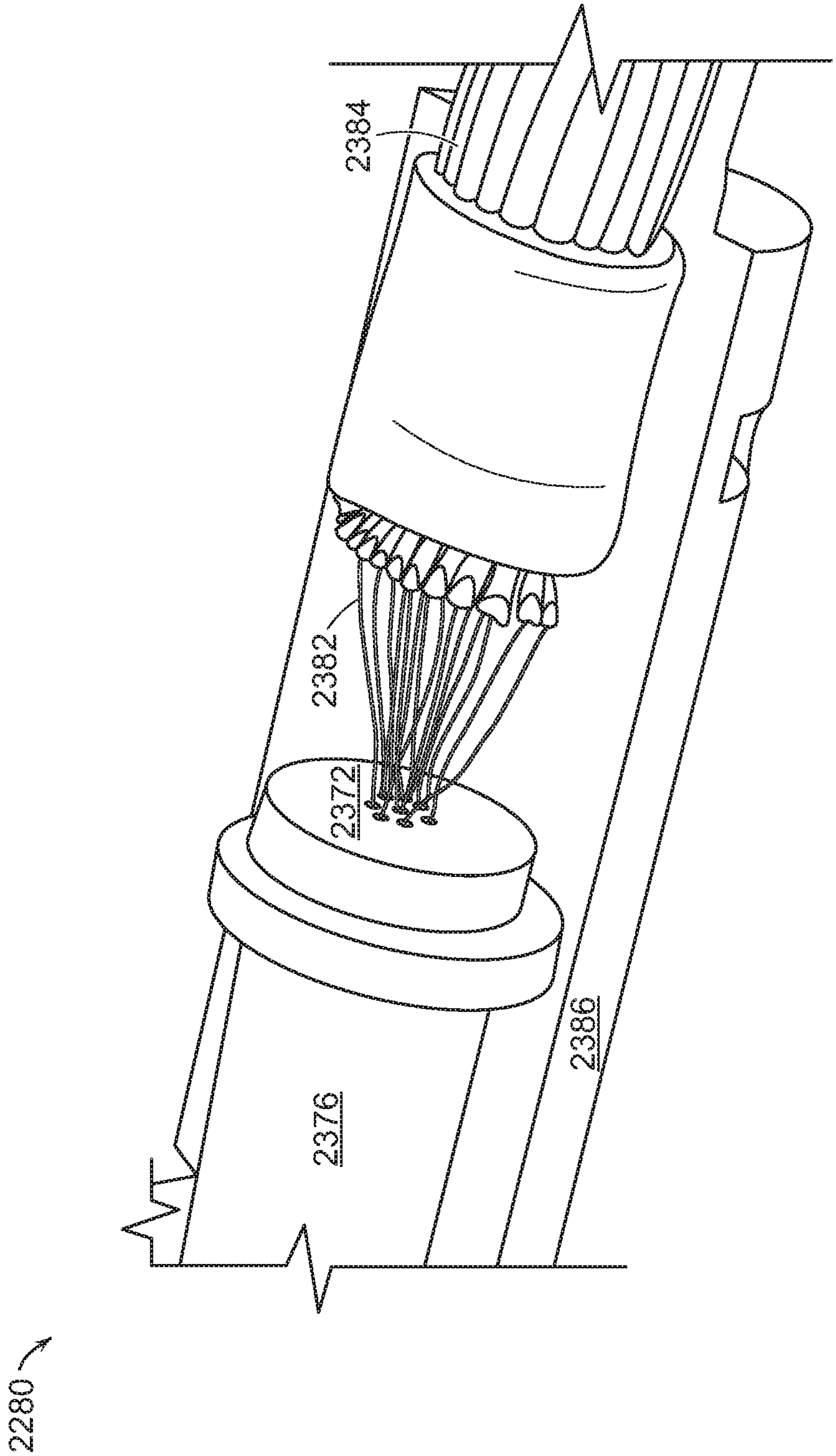

The assembly of the EMI shield is shown in FIG. 206, FIG. 207, and FIG. 208 as a prototype. FIG. 206 shows the back of the sleeve housing 2342 with a fiber array 2378 mounted in the connector.

FIG. 207 shows the EMI shield button 2344 after it has been soldered 2348 into the back of the sleeve housing 2342. It illustrates the fiber array 2378 being split into smaller multiples to pass through the hole array 2346 of the EMI shield button 2344.

FIG. 208 shows the fiber array 2378 as they exit the EMI shield button 2344. The fiber array 2378 is individually broken out to the furcation tube array 2356 in this embodiment. In other UDAT styles, the fibers continue on without furcation in an armored flexible tube. It should be noted in FIG. 208 that even without the EMI shield button, the only EMI path through the connector is the relatively small inner diameter of the sleeve housing 2342—which also has a long length. For common EMI spectra having wavelengths much large than a few millimeters, for example in a UAS, this connector structure itself provides a very large degree of EMI attenuation even without the EMI shield button 2344.

Figure 209:
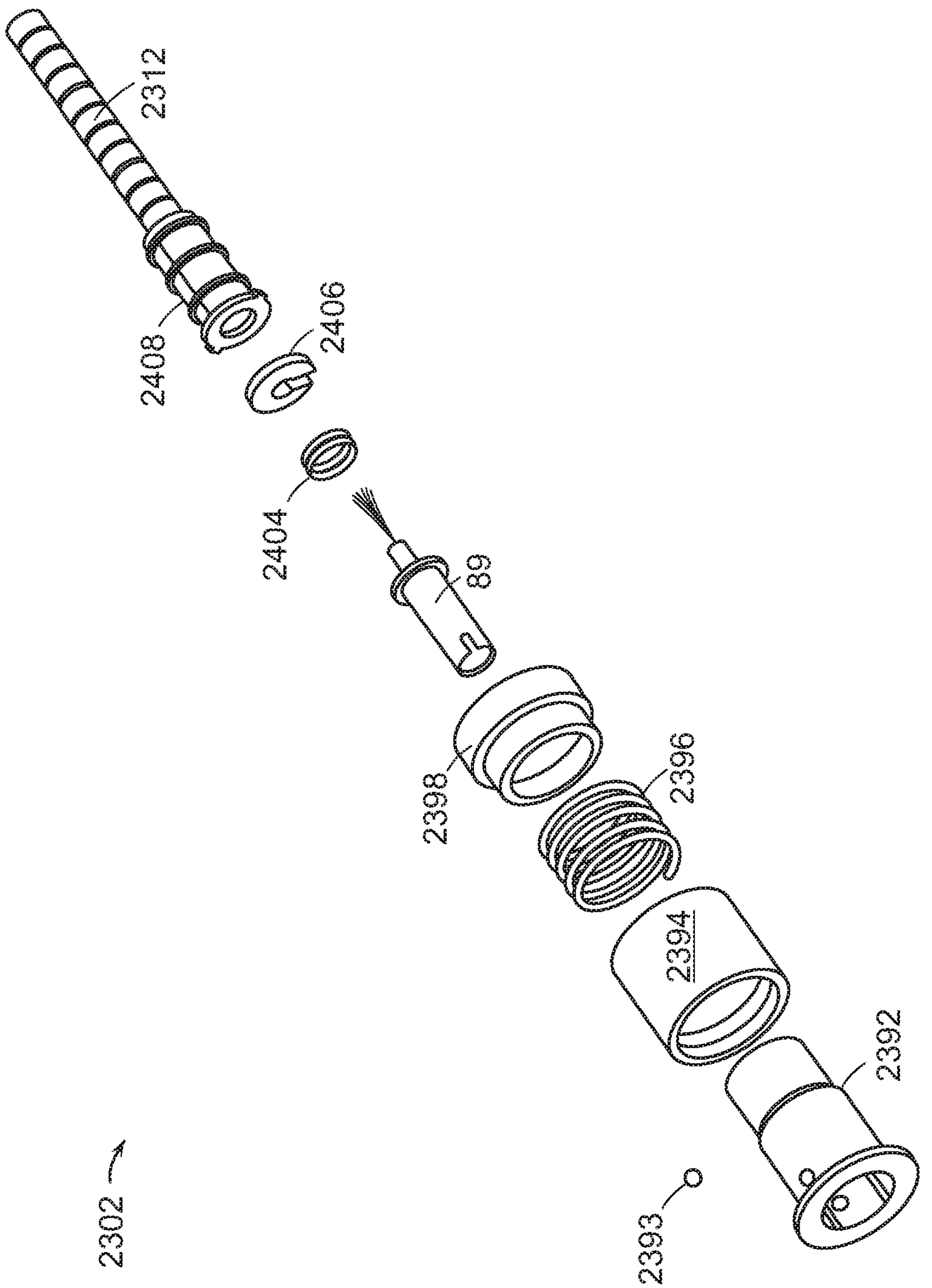
Figure 210:
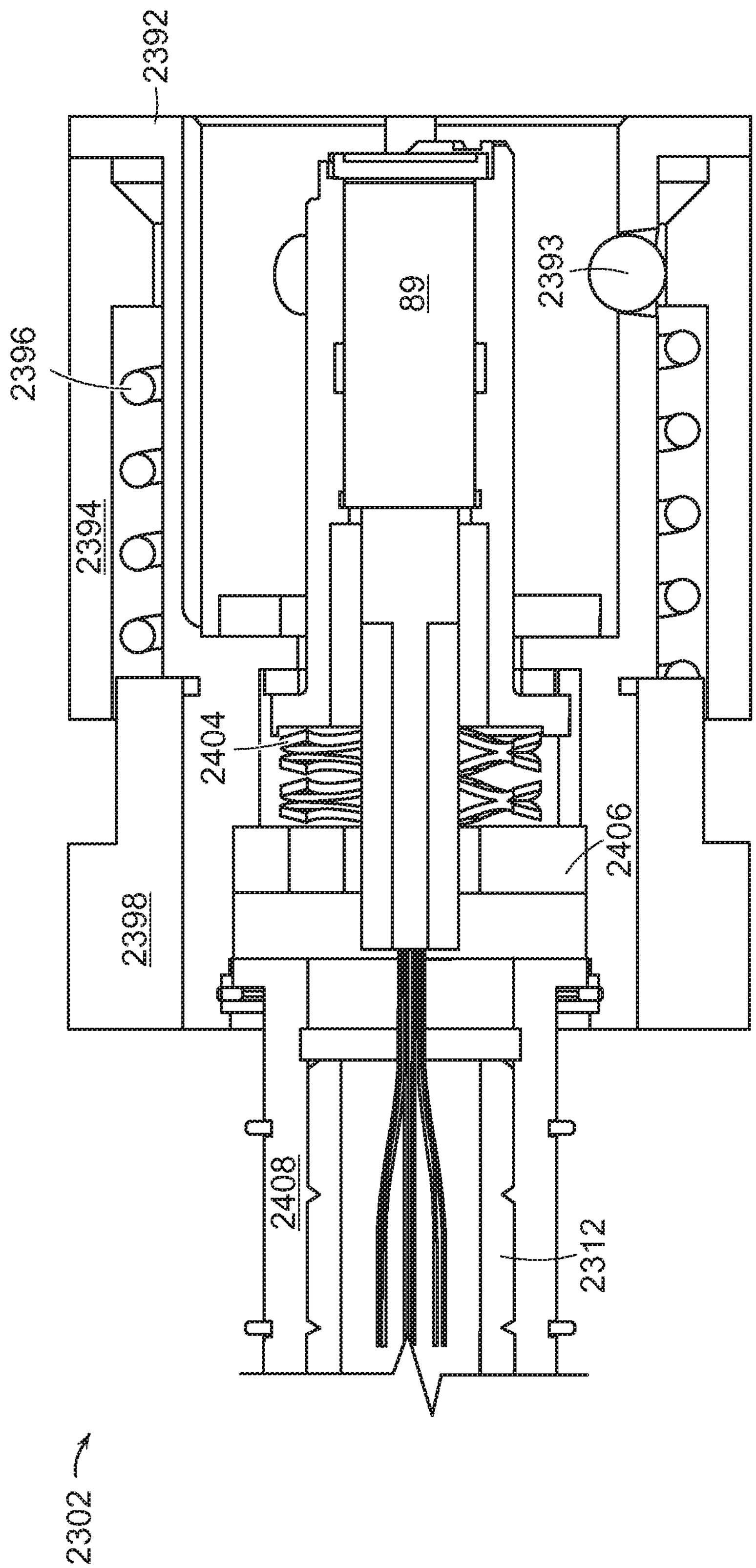

The individual components of the UDAT connector 2302 are shown in an exploded view in FIG. 209. The lock balls 2393 are installed into the main housing 2392 and held in place by the lock slide 2394. The lock spring 2396 is installed between the main housing 2392 and lock slide 2394, and preloaded with the lock spring nut 2398. The imager housing assembly 89 is then inserted into the main housing 2392 and preloaded with the preload spring 2404 and preload nut 2406. Finally, the tubing 2312 and clamp 2408 are installed. The complete assembly is shown in cross-section in FIG. 210.

Figure 211:
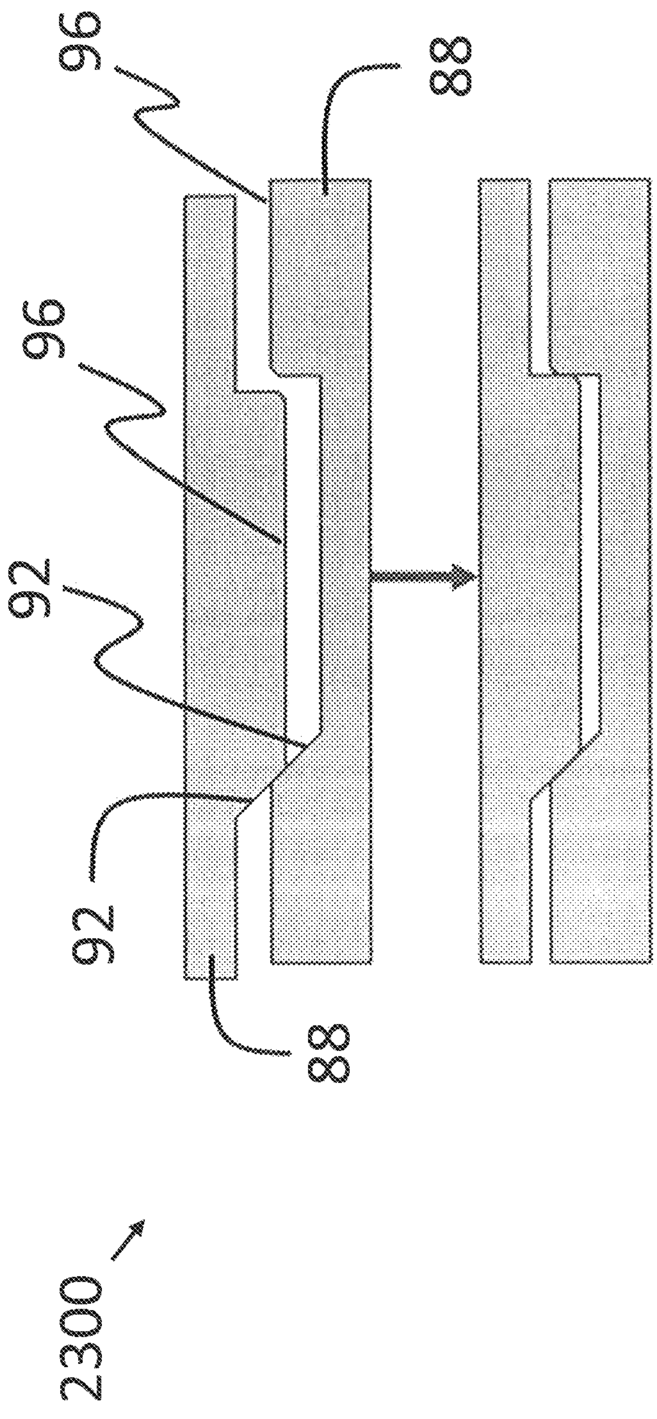
Figure 212:
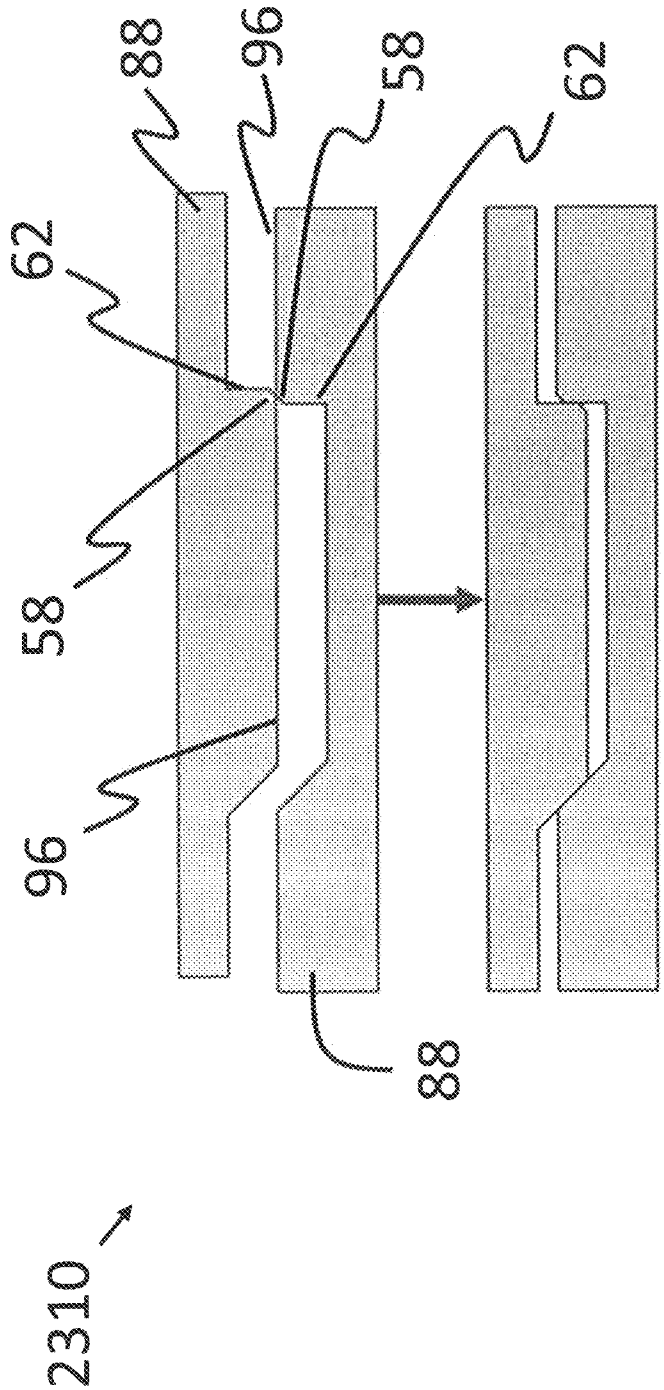
Figure 213:
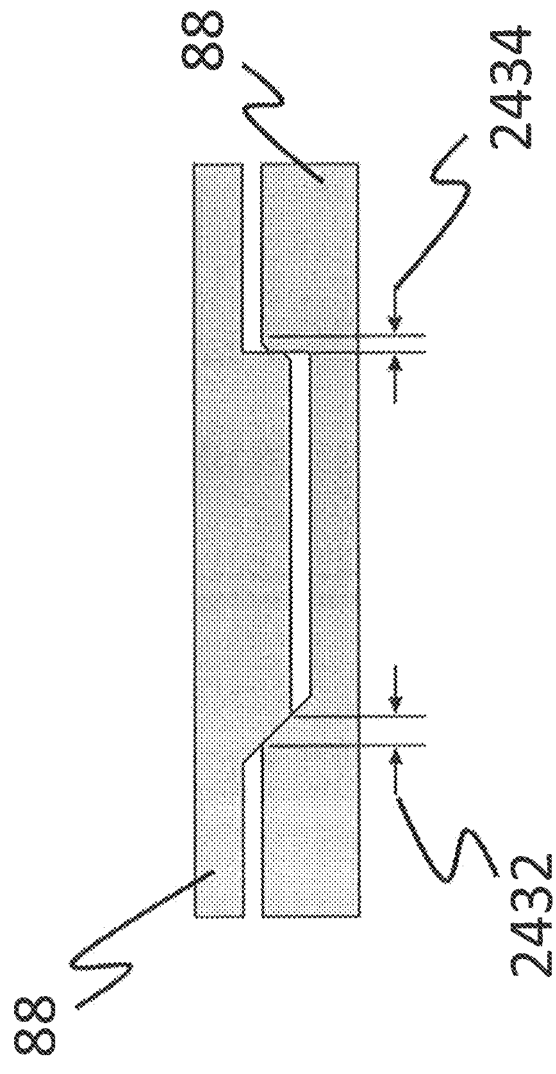
Figure 214:
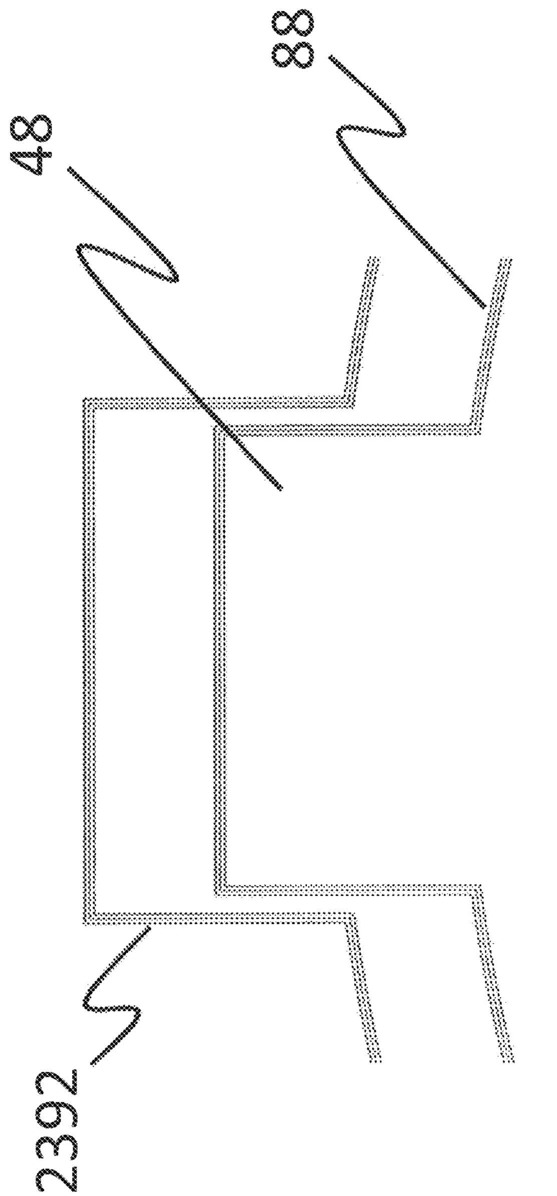
Figure 215:
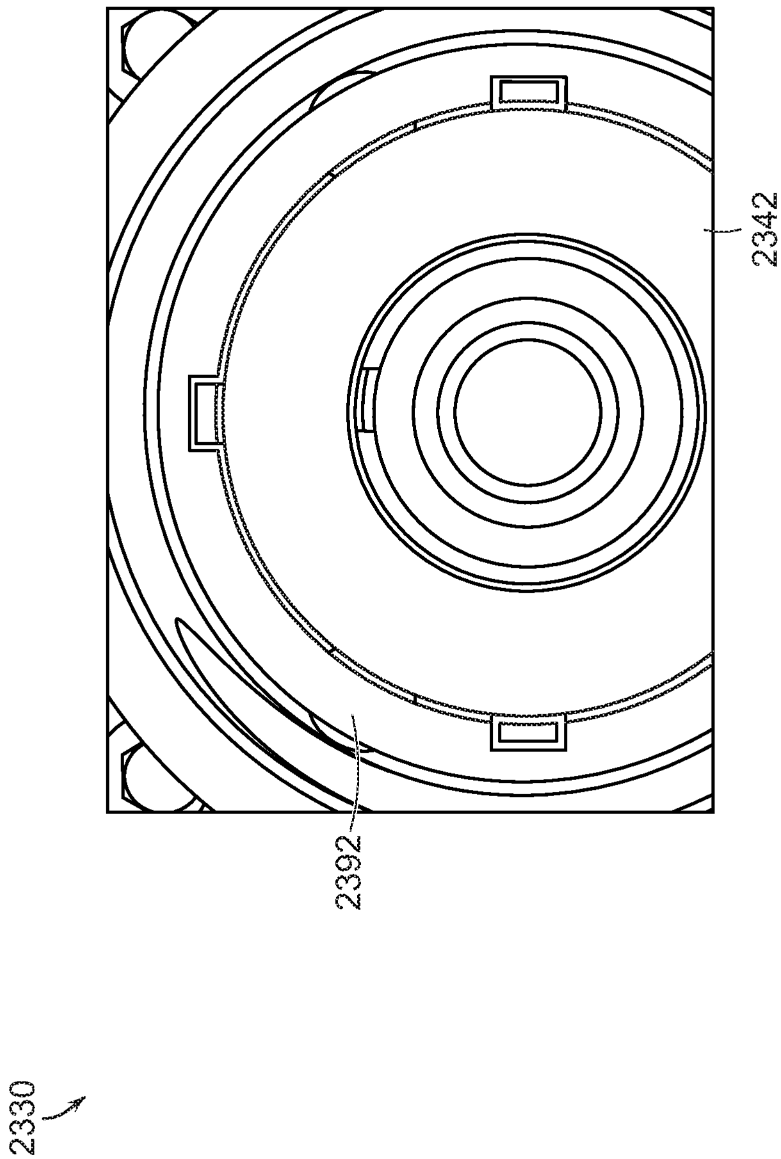

In this embodiment of the UDAT connector 2220 the imager housings 88 are of the same design and have hermaphrotic alignment features, in order to ensure that the imager housing 88 interfaces with the mating imager housing 88 when the UDAT connector 2302 interfaces the breakout 2306 on wedge faces 92 and not flat 96 to flat 96 (ref. FIG. 11), which would prohibit full interaction of the wedge features and result in connection failure, the "rough" keys 48 on the imager housings interface with features on the main housing 2392 and sleeve housing 2342 in order to provide an initial rotational alignment. The two possible initial rotational alignments are shown in FIG. 211, case 2300 where the rotation of the imager housings 88 are induced by the wedge faces 92, and in FIG. 212 case 2310 where the rotation of the imager housings 88 are induced by the chamfers 58 of the corner between the vertical face 62 and the protruding face 96. The magnitude of this initial alignment is dictated by the geometry of the front faces of the imager housing 88, as shown in FIG. 213, which shows the imager housings 88 fully mated, and the rotational misalignments allowed as 2432 and 2434 respectively. This alignment tolerance must be summarily met at each component interface, including machining tolerances for each component. FIG. 214, is a representation of the key 48 of the imager housing 88 interfacing with the keyway feature of the connector housing 2392 (or sleeve housing 2342). As shown in FIG. 215, the interface between the sleeve housing 2342 and connector housing 2392 occurs having, for example but not limited to, 3 key features.

Figure 216:
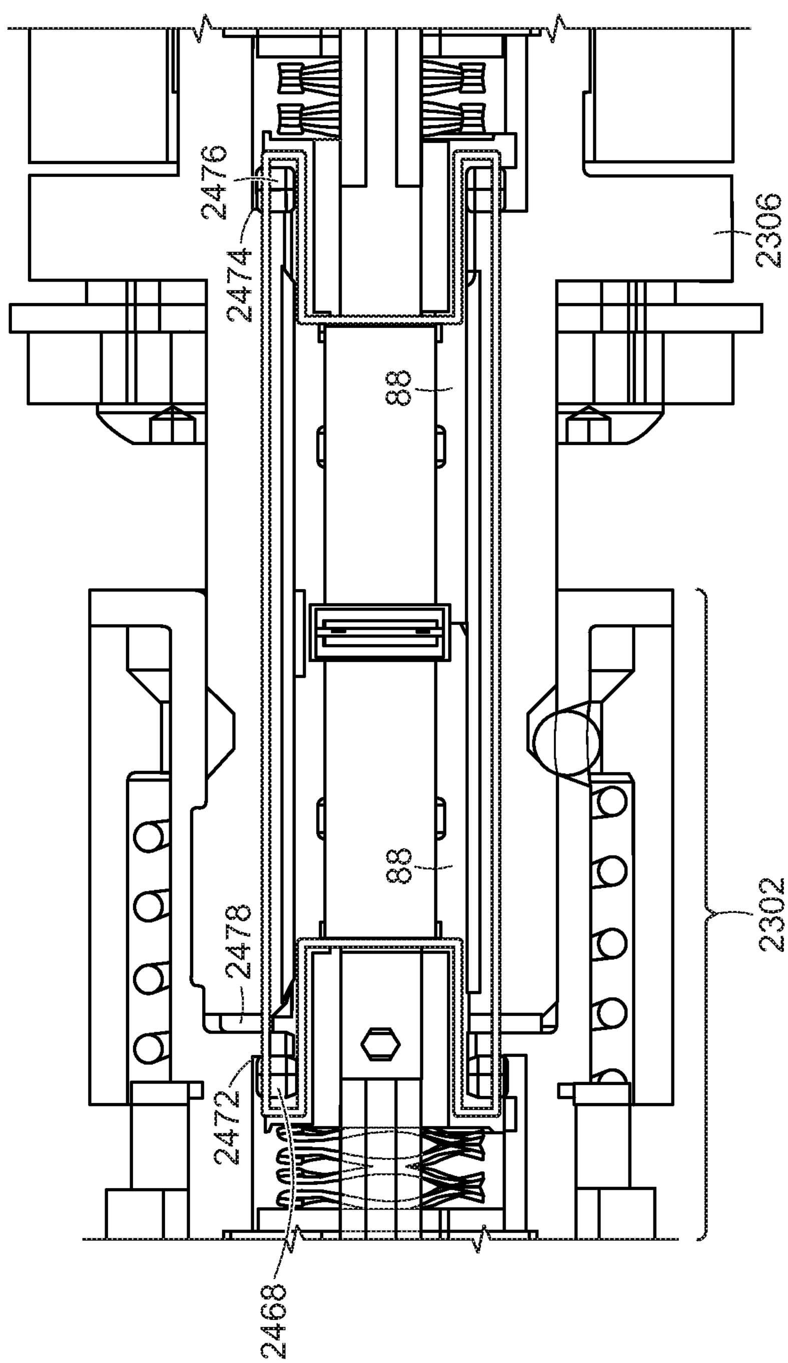

In order to prevent the accumulation of significant condensation on the Infinite Conjugate Imager (ICI) faces during temperature and pressure transitions, the air volume and therefore the total mass of water vapor are limited by sealing the cavity. To accomplish this, the embodiment incorporates rubber gaskets. Other materials are possible for use as a sealing medium. As shown in FIG. 216, gasket 2472 and low-friction washer 2468 are within the connector 2302, while gasket 2474 and low-friction washer 2476 are within the breakout 2306, and finally gasket 2478 seals between the connector 2302 and breakout 2306. This is illustrating the tiny volume of air that is trapped within the housings after connection. The addition of low-friction washers 2468 and 2476 reduces the coefficient of friction, allowing the imager housings 88 to rotate as necessary for alignment.

Figure 217:
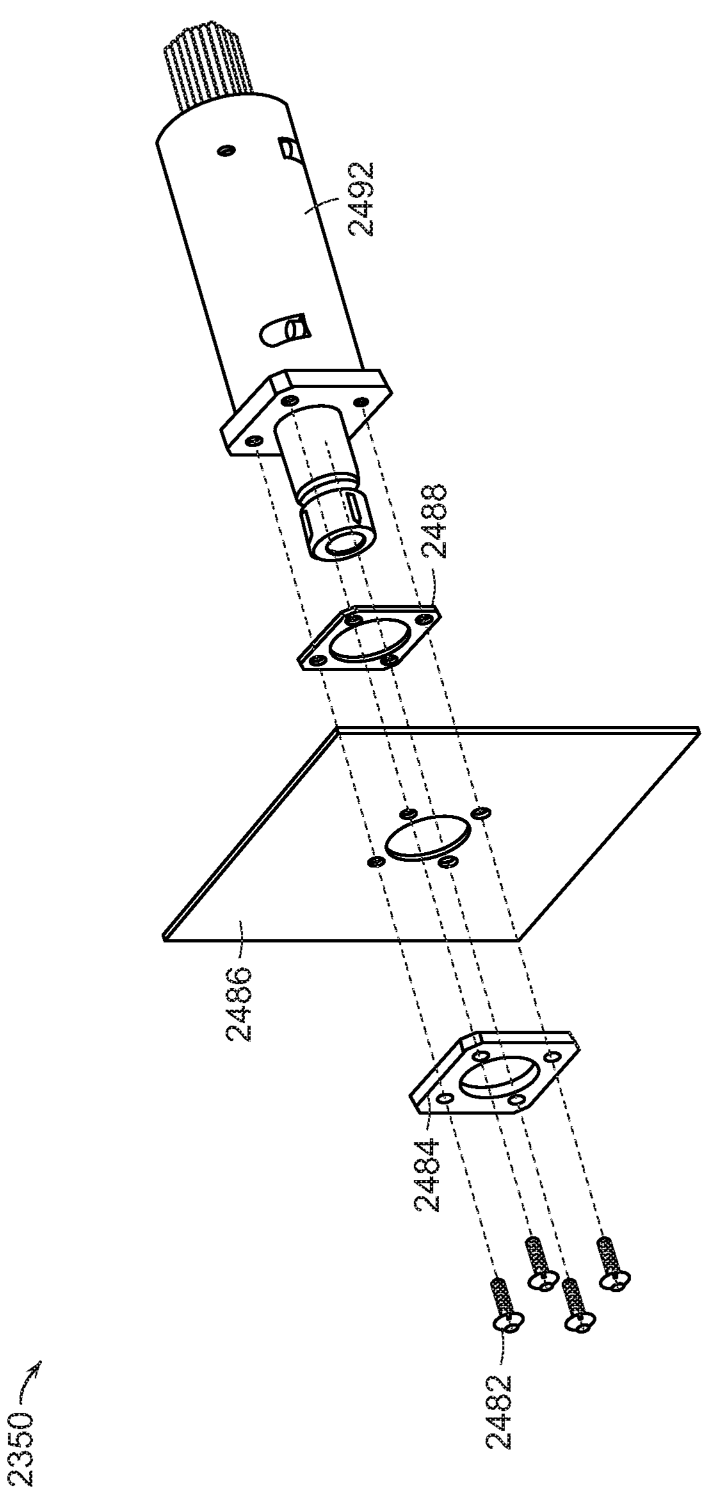

Another embodiment of the interface between the UDAT breakout 2492 and the EMI shield box wall 2486, shown in FIG. 217, utilizes a number of, for example but not limited to four screws 2482 with the washer 2484 to provide the compression on the crush gasket 2488. The design inherently prevents rotation of the UDAT breakout 2492 based on the position of the mounting bolts. This embodiment will be referred to as the UDAT connector system 2350 herein.

Figure 218:
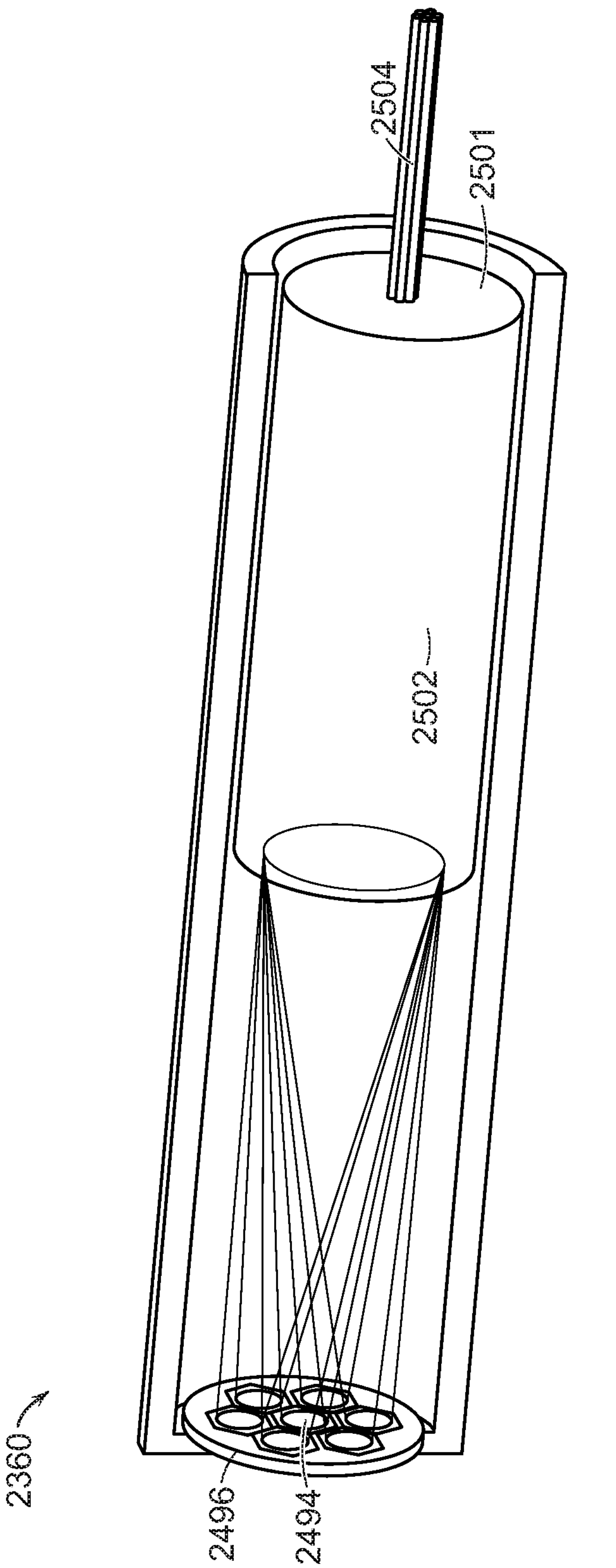

In some applications it is desirable to detect light emanating from a source, such as but not limited to an array of optical fibers, where the detecting elements can significantly larger than the individual components in the source, resulting in relaxed tolerances on the alignment of the detector relative to the GRIN rod or the source, or for decreased power densities on the detector elements for high power systems. Reference is made to FIG. 218, which is an isometric partial cutaway view of an embodiment of an optical imaging system 2360. Light emitted or reflected by a source, the preferred embodiment of which is made up of but not limited to an array of optical fibers 2504 located at the object plane 2501, is incident on an imaging element 2502, the preferred embodiment of which is a GRIN rod, which is capable of substantially receiving a portion of the light emanating from the object plane 2501, and capable of substantially focusing the light onto a detecting element 2496, which is located substantially away from the GRIN rod 2502 such that the magnification of the embodiment of the optical imaging system 2360 is substantially greater than unity.

Figure 219:
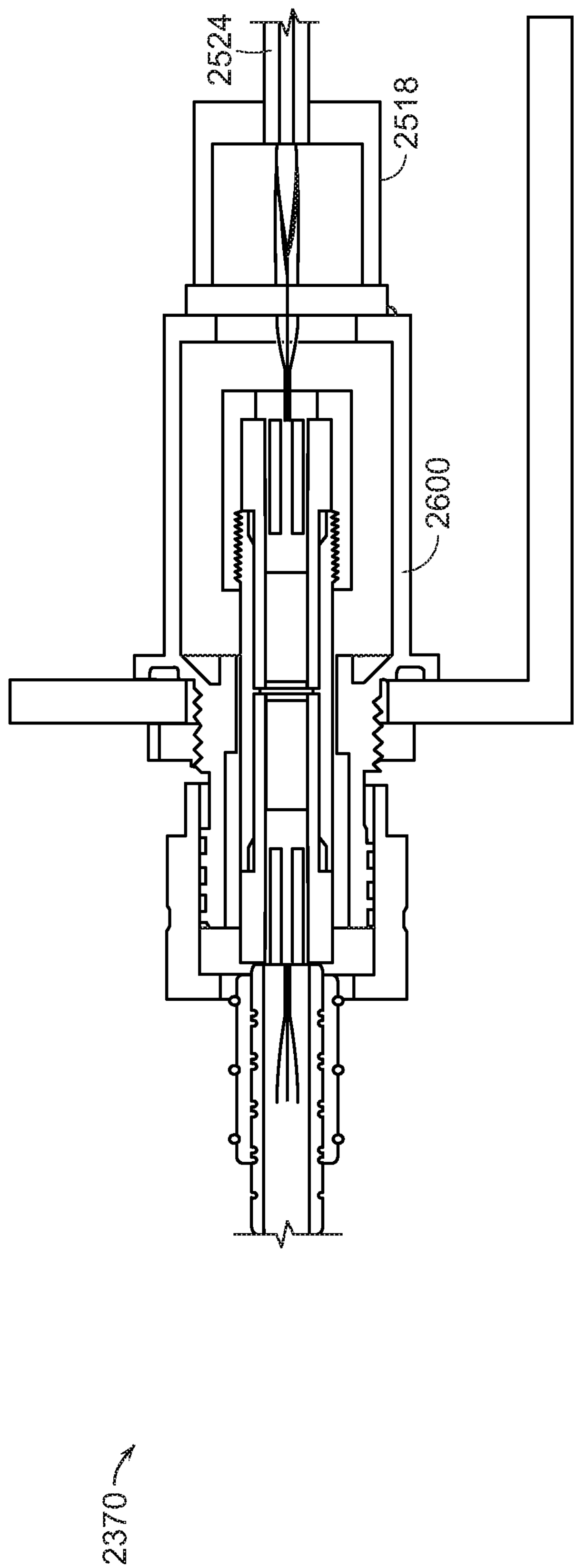
Figure 220:
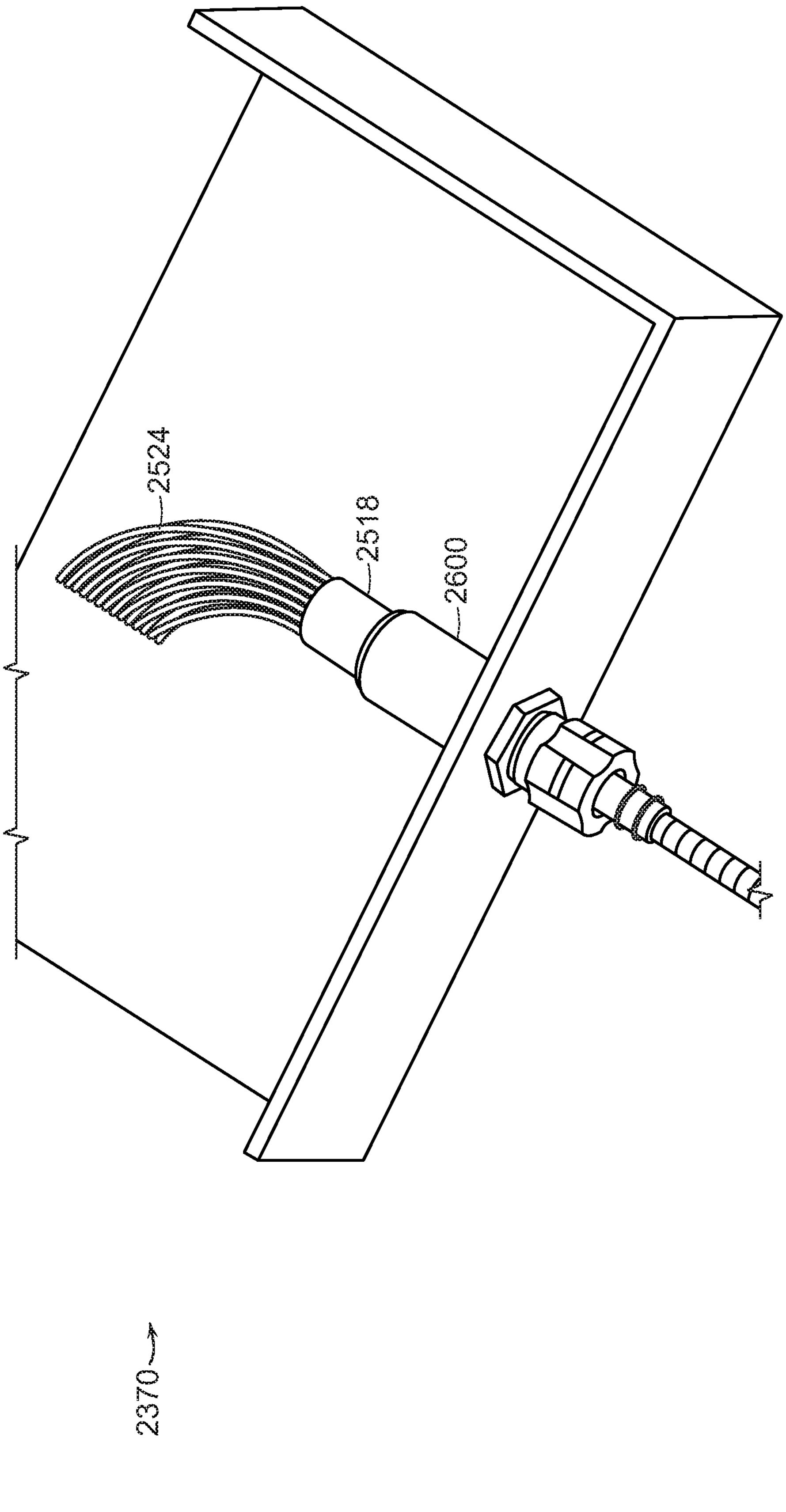

FIG. 219 and FIG. 220 show in general how the EMI shielded UDAT connector system 2010 discussed earlier in FIG. 185 can be adapted to another embodiment of the EMI shielded UDAT connector system 2370. In this embodiment, the system provides a distribution to an array of individually sheathed optical fibers 2524 in a compact breakout 2518 that is integral with the UDAT connector 2600.

Figure 221:
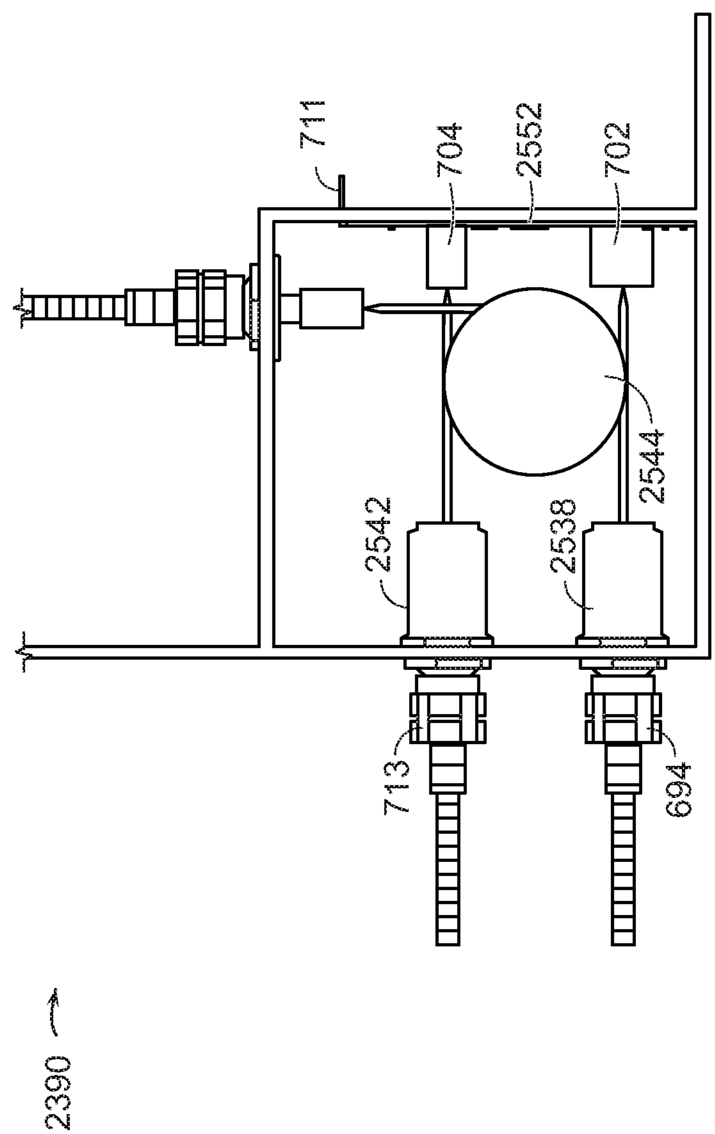

Another embodiment including the EMI shielded UDAT connectors, is shown in FIG. 221. The cable 713 feeds the EMI shielded UDAT connector 2542, and the cable 694 feeds the EMI shielded UDAT connector 2538. This embodiment also includes a vibration tolerant spool 2544 for routing of fibers within the actuator interface box 684.

Figure 222:
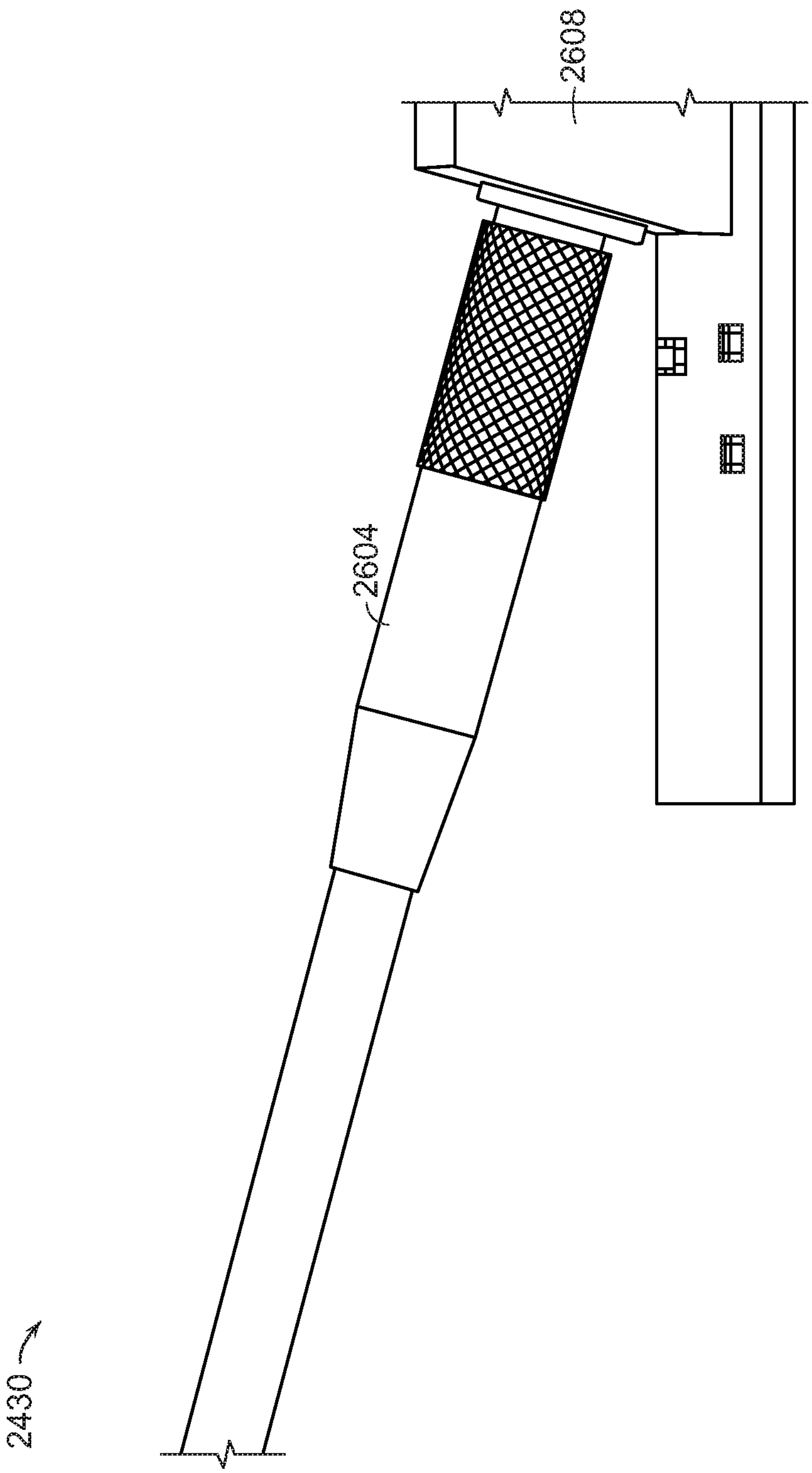

Another embodiment is the mini-UDAT connector system 2430—i.e., a UDAT connector that is only, for example but not limited to, 6 mm in diameter. This same mini-UDAT connector concept, shown in FIG. 222, can be a useful component for intra-box fiber management providing ruggedness, reliability, and large improvements in size, weight, and configurational flexibility. The Mini-UDAT connector 2604 can interface fibers to detectors or emitters (as a FABI) or to waveguides on or in the boards or directly to pigtailed fiber devices. A general conceptual component 2608 containing optoelectronic die, waveguides, fibers, a FABI interface, etc. is shown in blue in FIG. 222.

Figure 223:
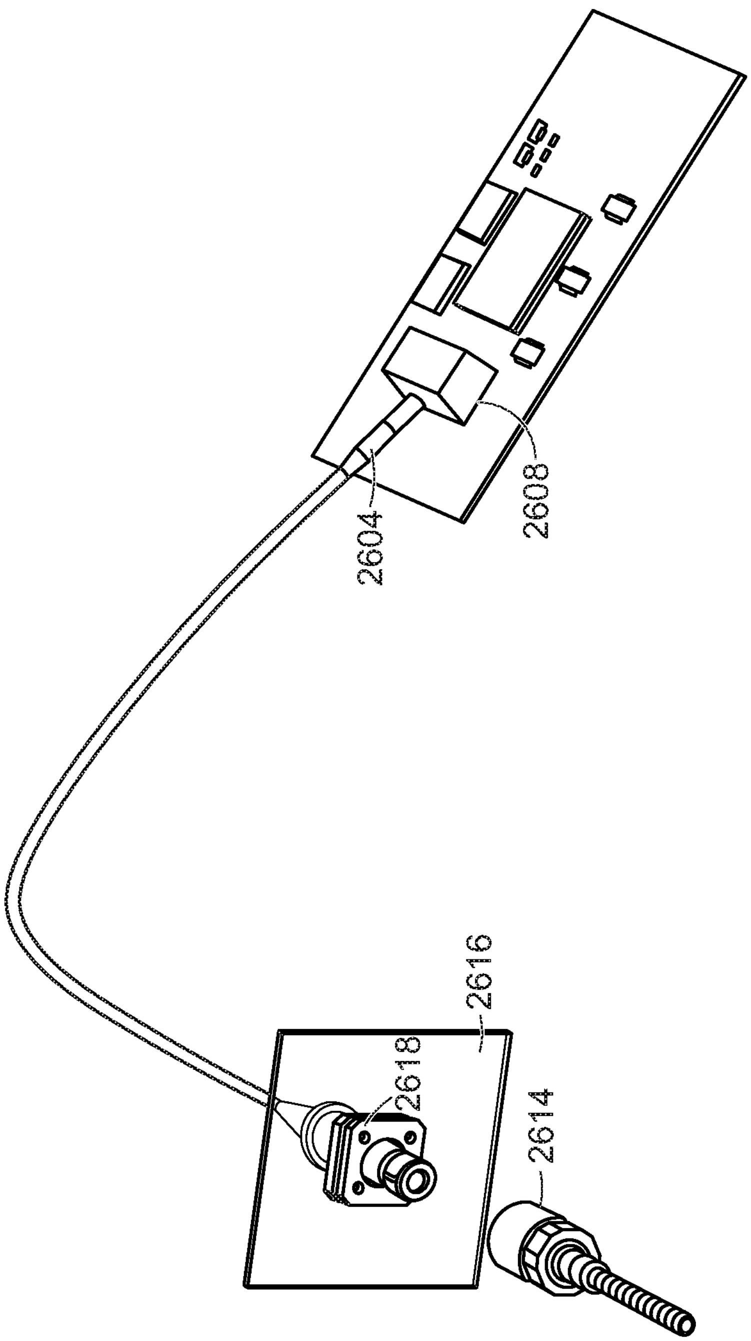

The embodiment shown in FIG. 223 illustrates an external UDAT connector 2614 coupling to an internal flexible conduit UDAT connector 2616 through a box wall 2618 with a mini-UDAT connector 2604 connecting into the general conceptual component 2608.

Figure 224:
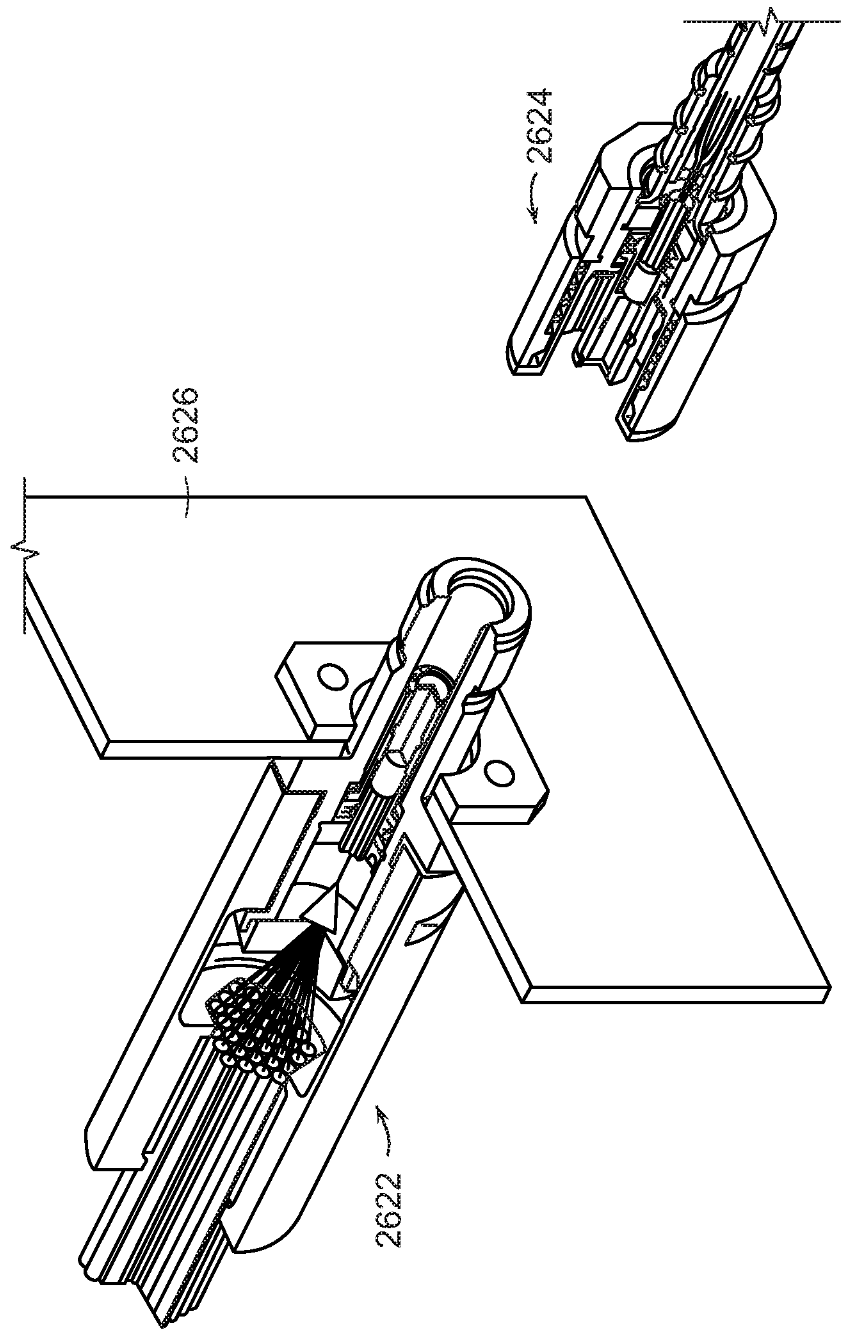
Figure 225:
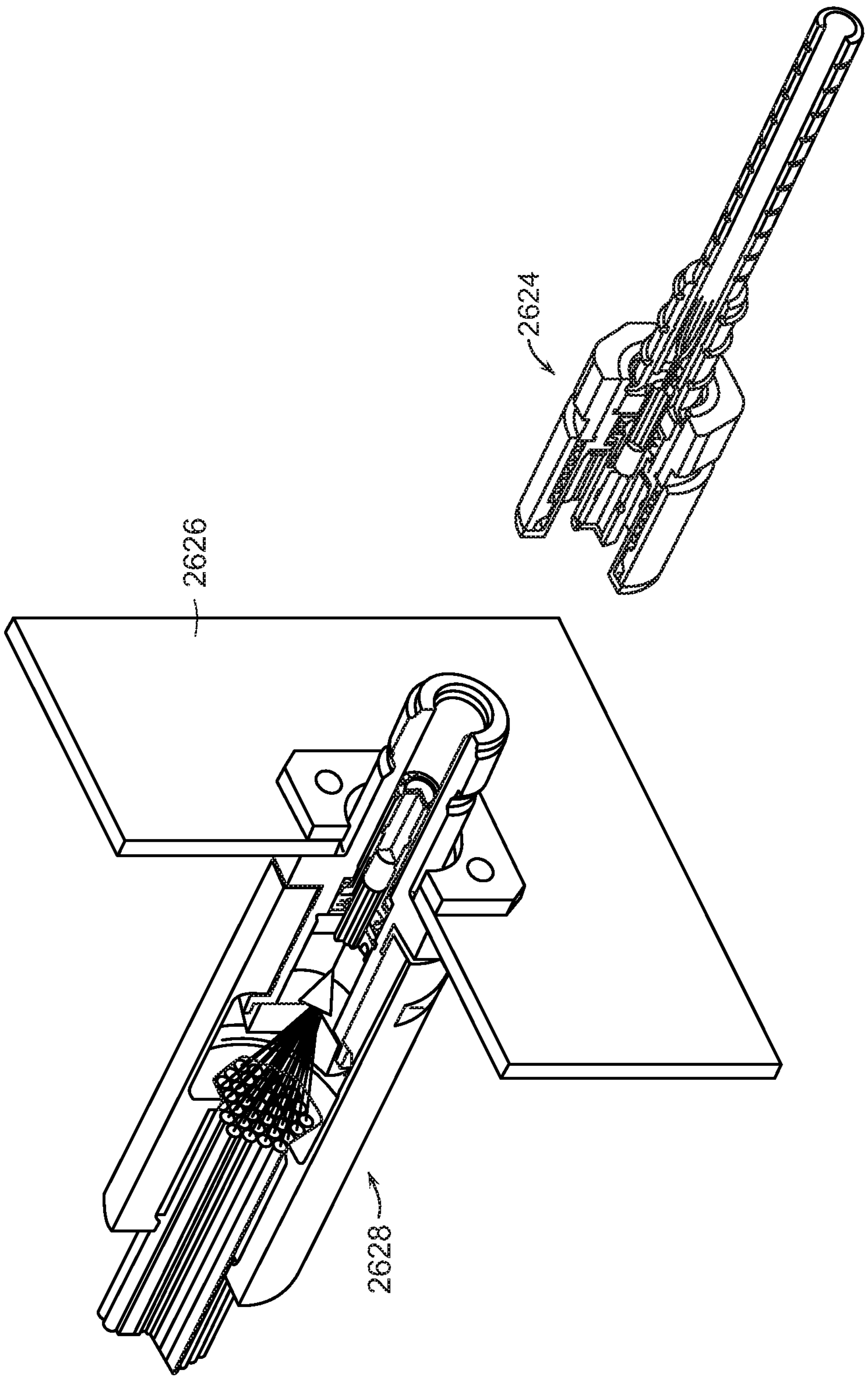

One embodiment illustrated in FIG. 224, involves removing all metallic components from the external connector 2624 in order to remove metallic components that may radiate RF. In this embodiment, there are no changes to the UDAT breakout 2622. The connector components would be constructed of, for example but not limited to, polymer or ceramic in place of steel or aluminum. The second embodiment, illustrated in FIG. 225, also removes all metallic components from the external connector 2624, but additionally replaces all components of the UDAT breakout 2628 that are external to the EMI shield wall 2626 with non-metallic components.

Figure 226:
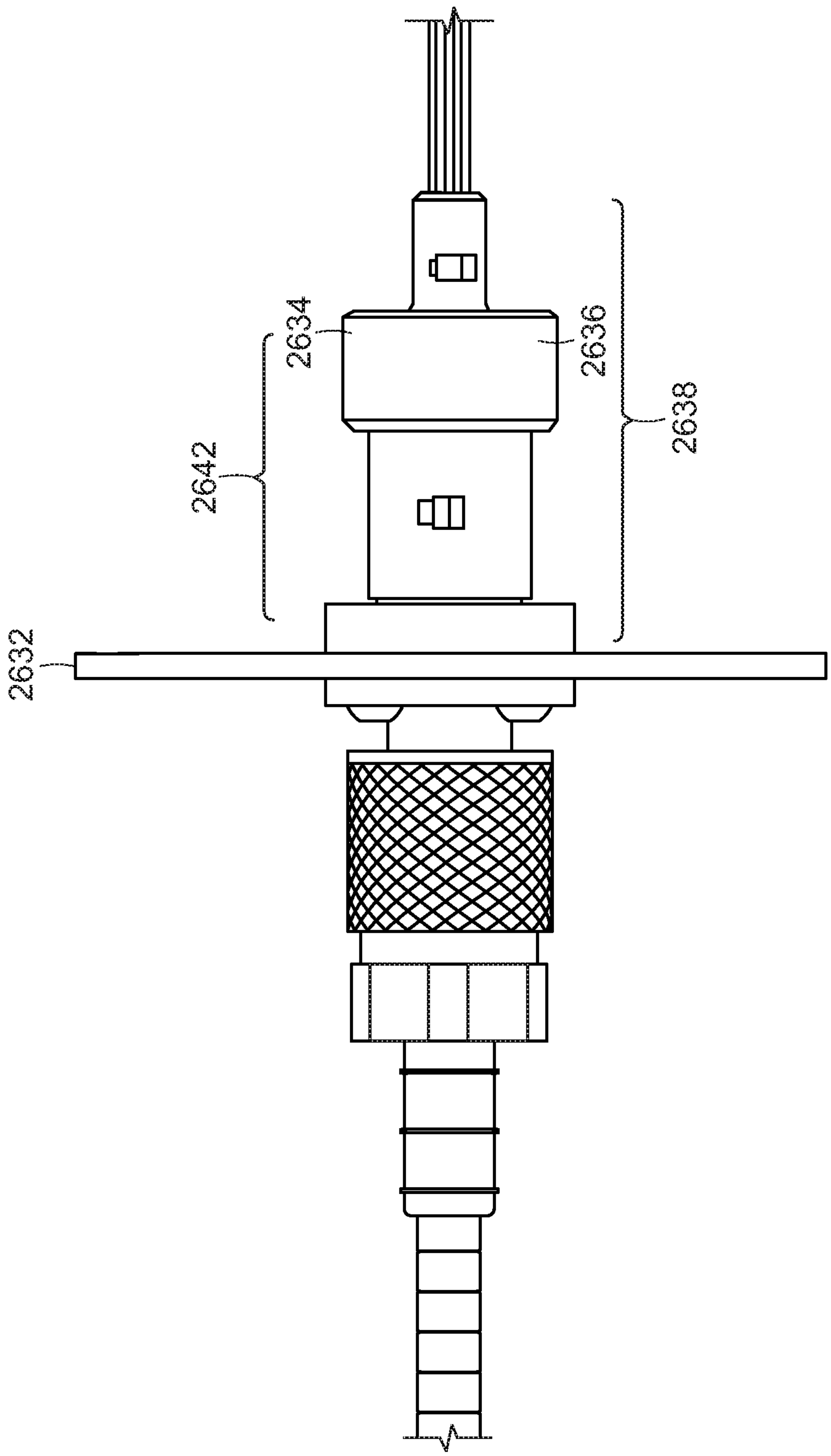
FIG. 226 shows an embodiment of an optical imaging system of these teachings.

The UDAT connector shown in FIG. 226 is an embodiment of the UDAT connector system 2350 described earlier, but the mass and volume are reduced within the enclosure represented by box wall 2632 by replacing the furcation tube clamps 2352 and 2364 with reduced size clamps 2634 and 2636. Expected improvements in the internal component sizes are expected to produce the further decrease in internal UDAT connector size shown in FIG. 227.

Figure 227:
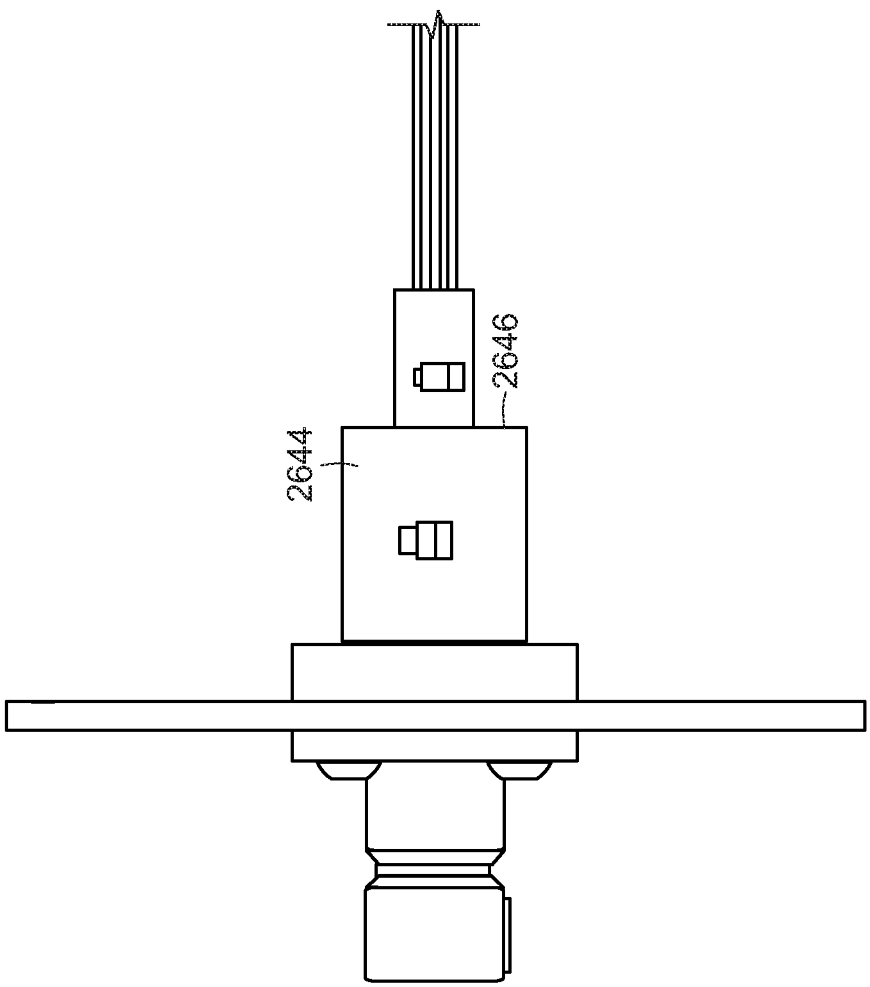
FIGS. 227-229 show an embodiment of an EMI shielded UDAT connector of these teachings.

Another embodiment further shortens the internal UDAT connector by replacing the furcation tube clamps 2352 and 2364 with reduced size clamps 2644 and 2646. This shorter UDAT connector configuration is illustrated in FIG. 227.

Other embodiments of the UDAT connector include using UDAT cables inside the box, complemented with mini UDAT and specialized connectors, rather than individually furcated and connectorized fibers. These approaches are summarized herein.

Figure 228:
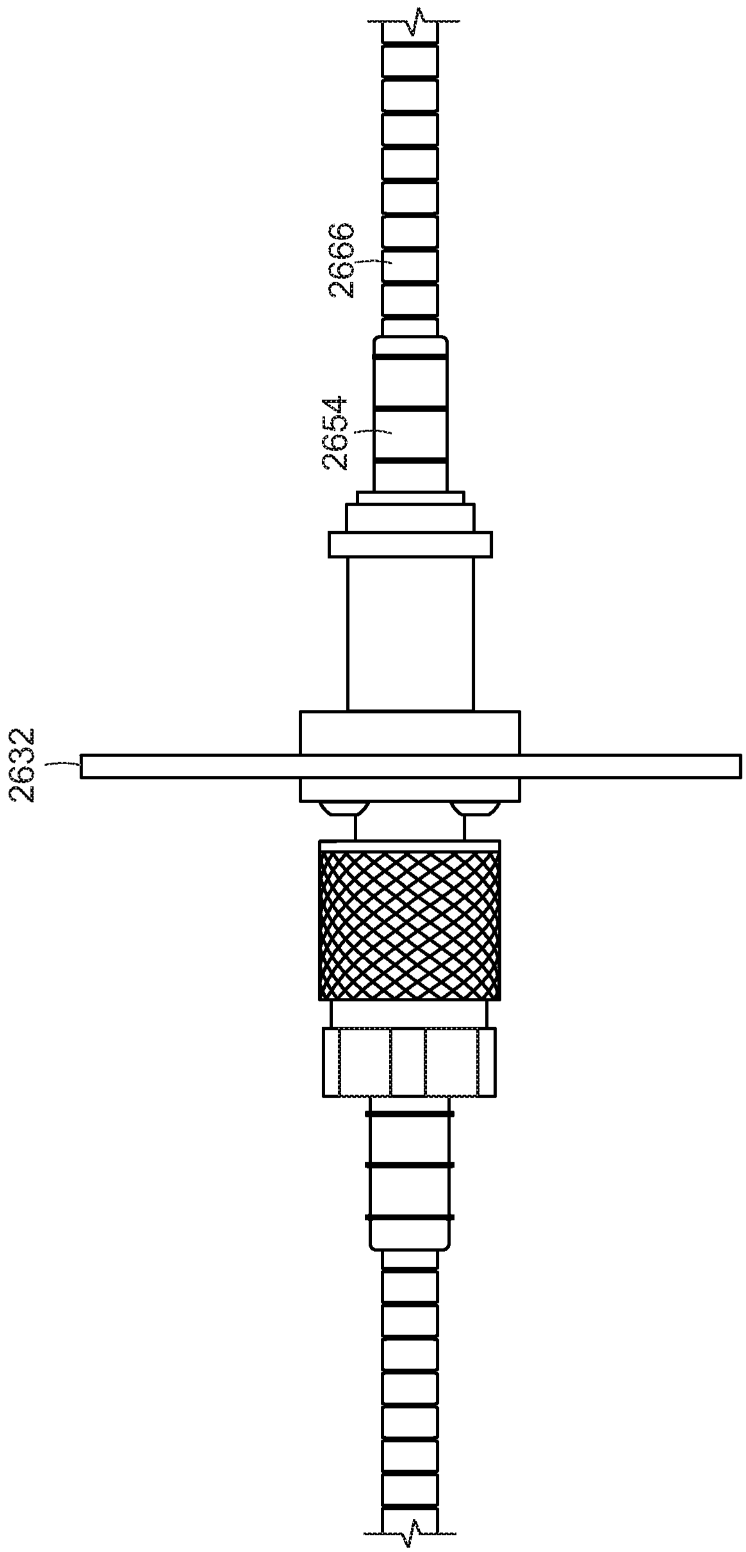
Figure 229:
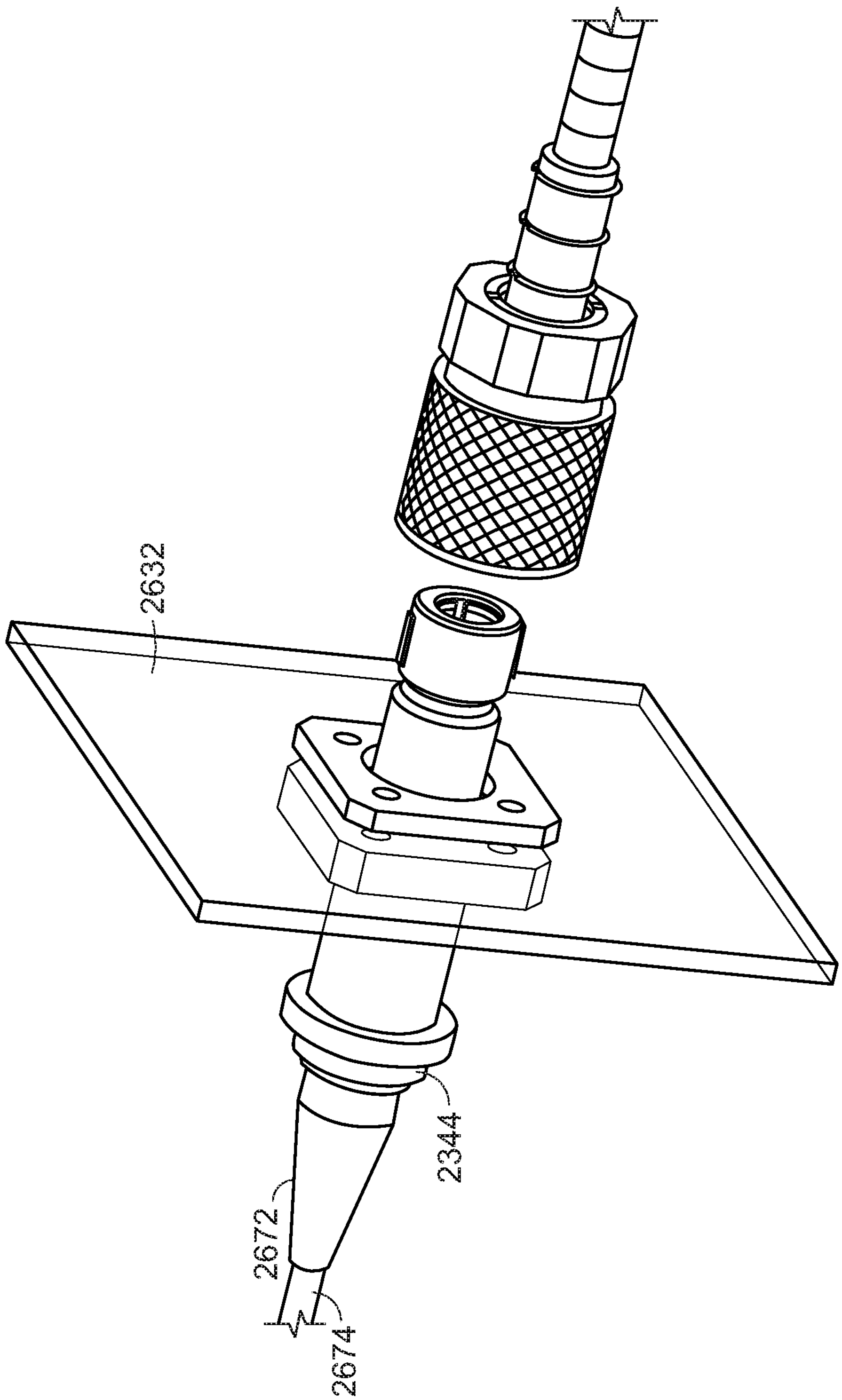

For size, weight, and reliability purposes it is advantageous in some applications to interface directly to a flexible tube or large furcation tube that can be used to route the fibers inside the box. As illustrated in FIG. 228, the components to the right of the box wall 2632 are within the enclosure. After the fibers pass through the EMI shield button 2344, they enter the flexible tube 2666 which is retained by the damp 2654. Alternatively, as shown in FIG. 229, the components to the left of the box wall 2632 are within the enclosure. After the fibers pass through the EMI shield button 2344, they enter the large furcation tube 2674 which is retained by the strain relief 2672. The flexible conduit shown can be, for example but is not limited to, comprising a flexible polymer coated tube.

Figure 230:
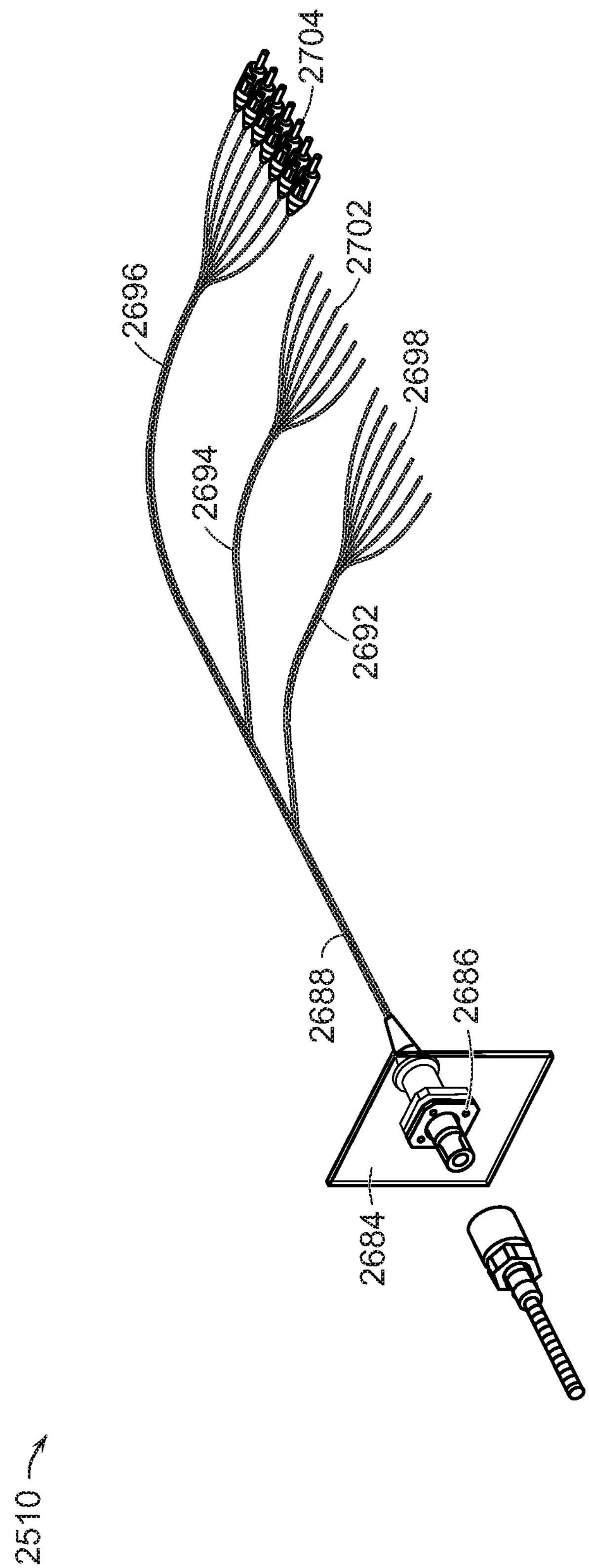
FIGS. 230-231 show embodiments of the mini-UDAT connector of these teachings.

In another embodiment shown in FIG. 230, the UDAT connector 2686 branches directly into a set of tubes 2688, 2692, 2694 and 2696 that route fibers directly to individual boards or locations throughout the electronics box (represented by the box wall 2684). The large numbers of individual fibers from the UDAT connector 2686 are branched out 2698 and 2702 to various connection types such as but not limited to FABI, High Power FABI, mini-UDAT connectors, etc. and/or are individually connectorized 2704.

Figure 231:
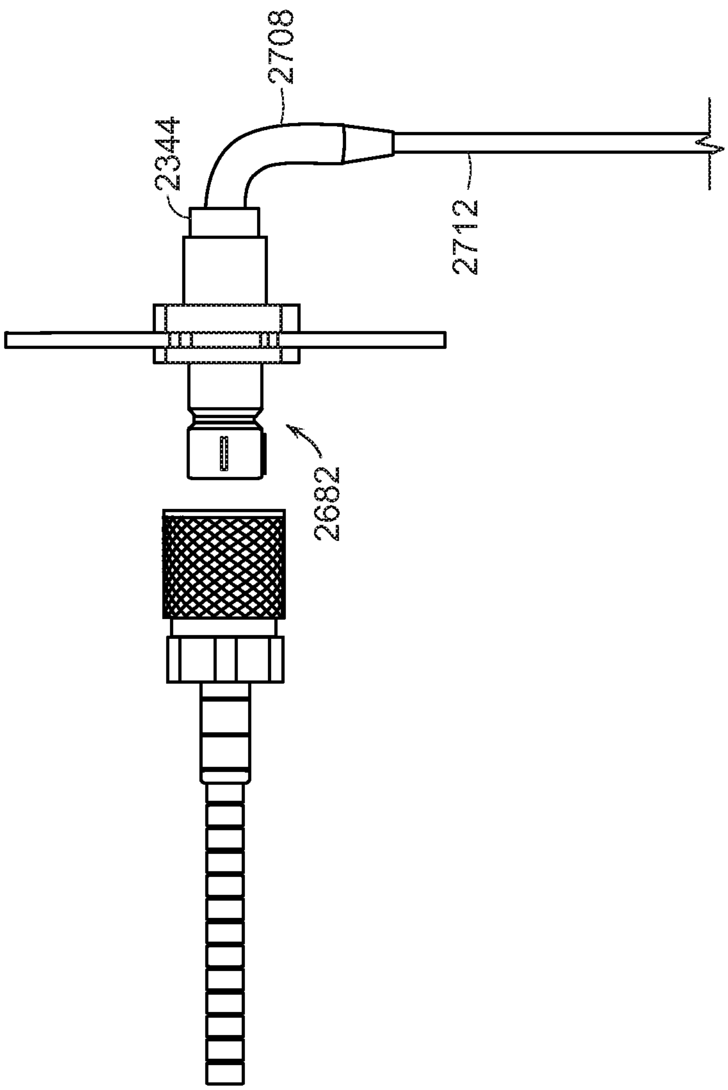

Aircraft Boxes tend to be cramped, and depending on the box configuration, board orientation, etc., it may be useful to use a right-angle UDAT connector 2682 to flexible conduit 2712 with strain relief 2708 as illustrated in FIG. 231. This embodiment includes an EMI shield button 2344 which can be left out if EMI shielding is not required.

Figure 232:
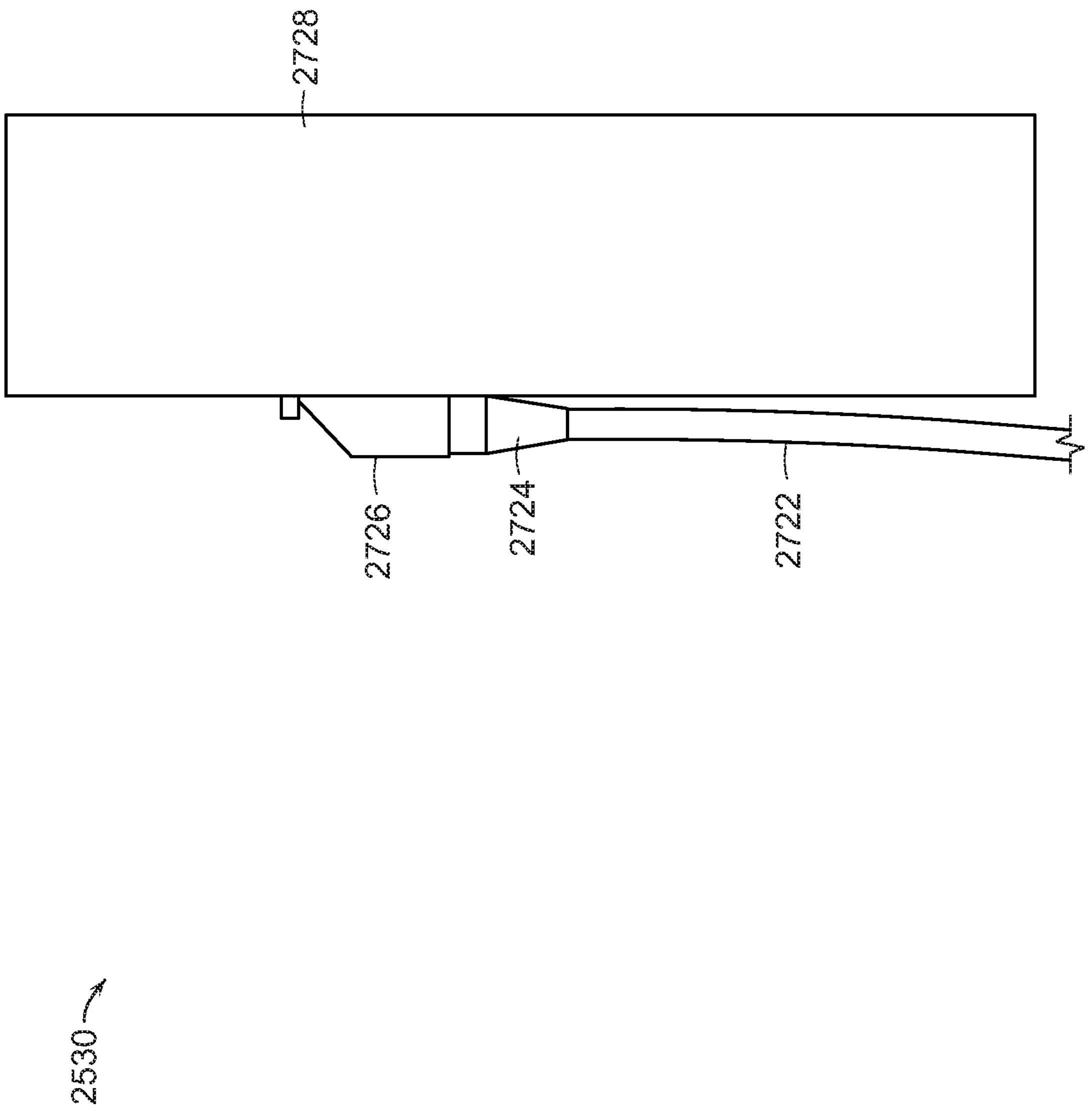
FIGS. 232-233 show embodiments of non-metallic UDAT connectors of these teachings.

The low profile right angle UDAT connector system 2530 shown in FIG. 232 illustrates a UDAT connector 2726 with strain relief 2724 and flexible tubing 2722 that is connected to a chassis 2728. This right angle low profile connector avoids the need to bend the fibers in a small radius.

Figure 233:
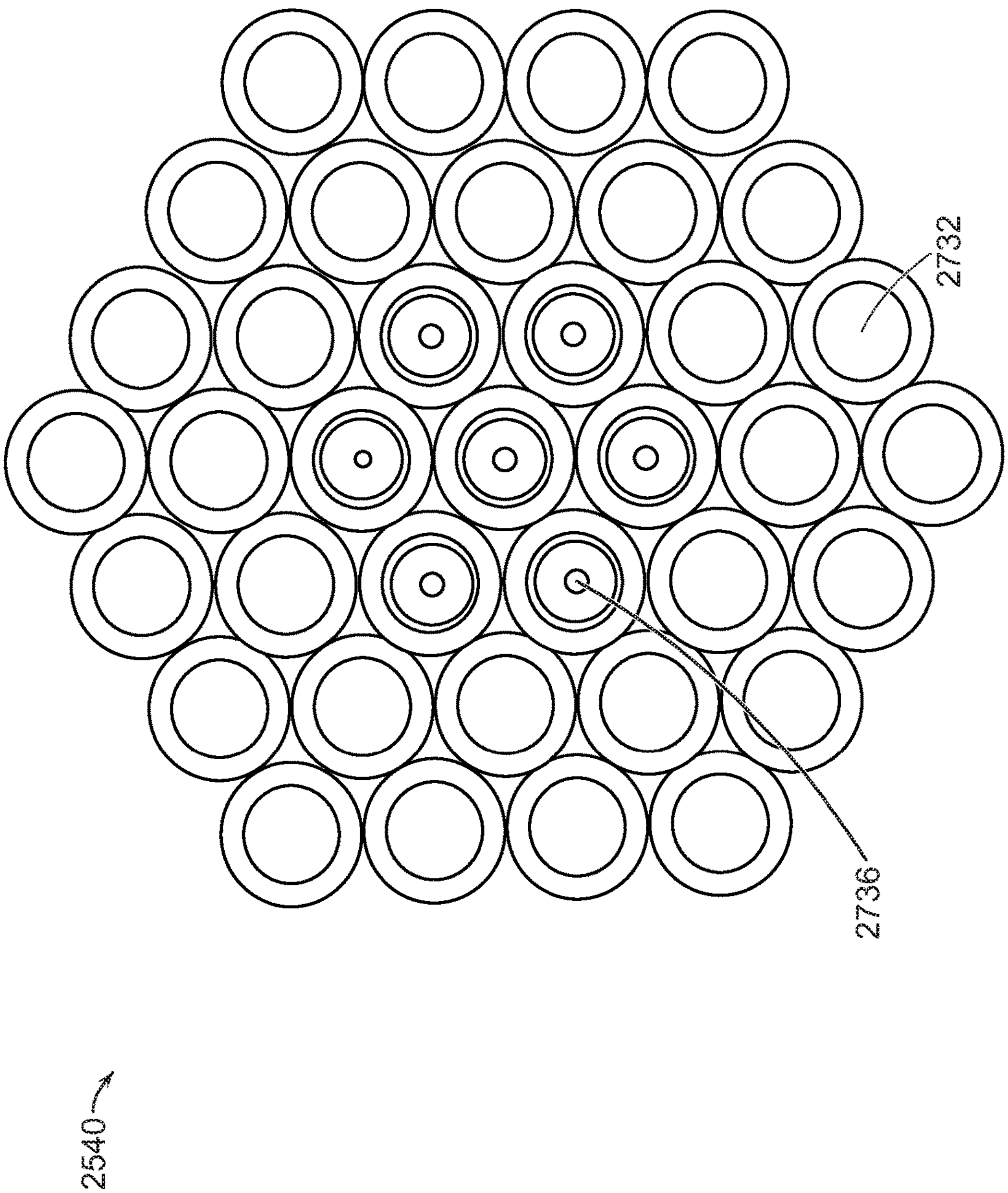

It is sometimes useful to provide both single mode and multimode fibers for various applications. In order to extend the array of intra-box UDAT, FABI, and ODP devices to support both single and multimode fibers, the hybrid UDAT Array 2540 with single mode fibers 2736 in the center surrounded by multimode fibers 2732 in the periphery as shown in FIG. 233 can be used. While the 7 central fibers in FIG. 233 are single mode fibers, and the surrounding 30 fibers are multimode, other arrangements are possible.

Figure 234:
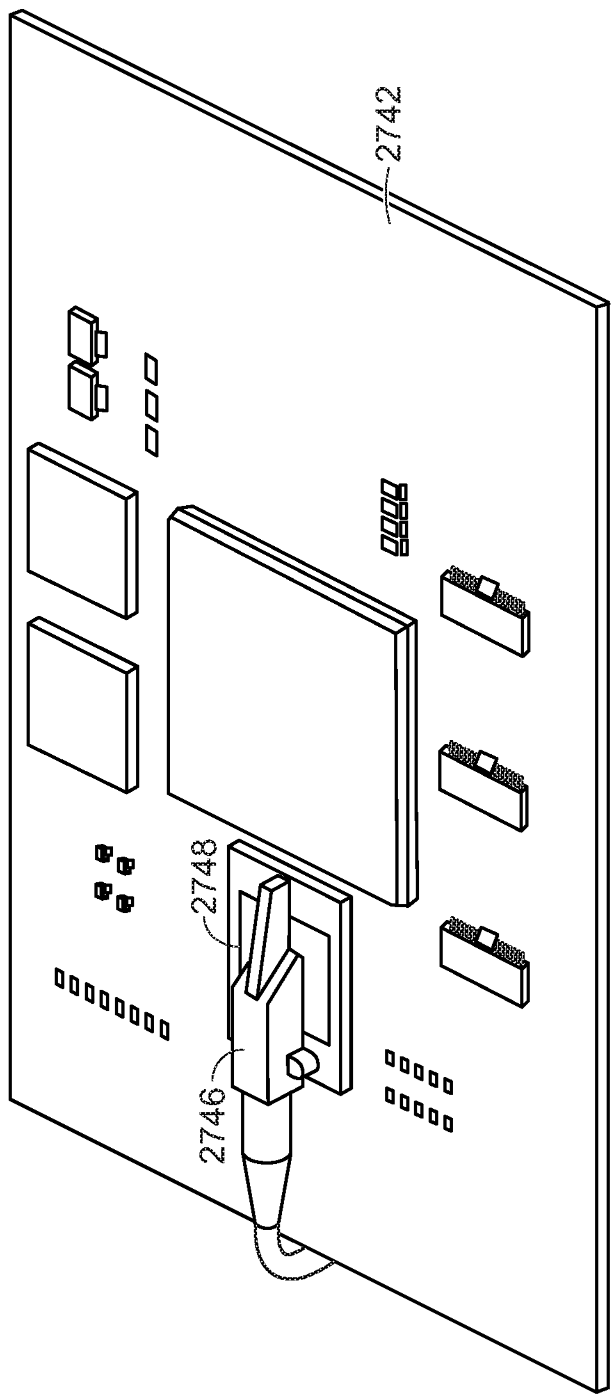
FIGS. 234-235 show embodiments of the UDAT breakouts of these teachings.
Figure 235:
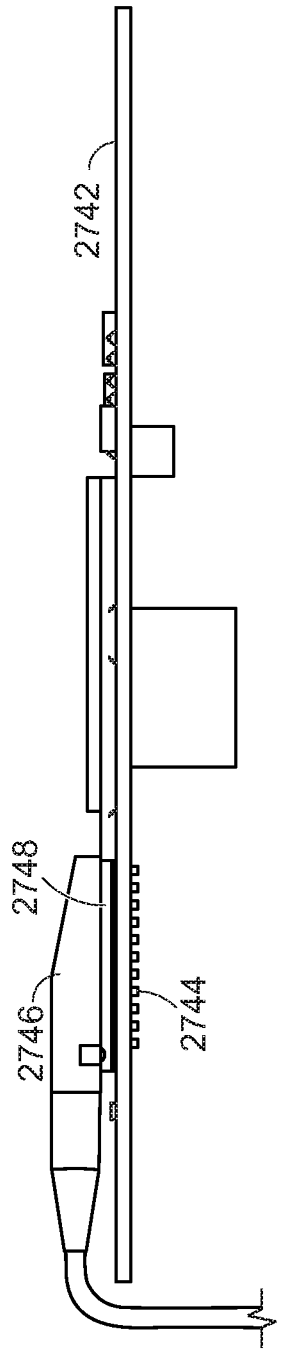
Figure 236:
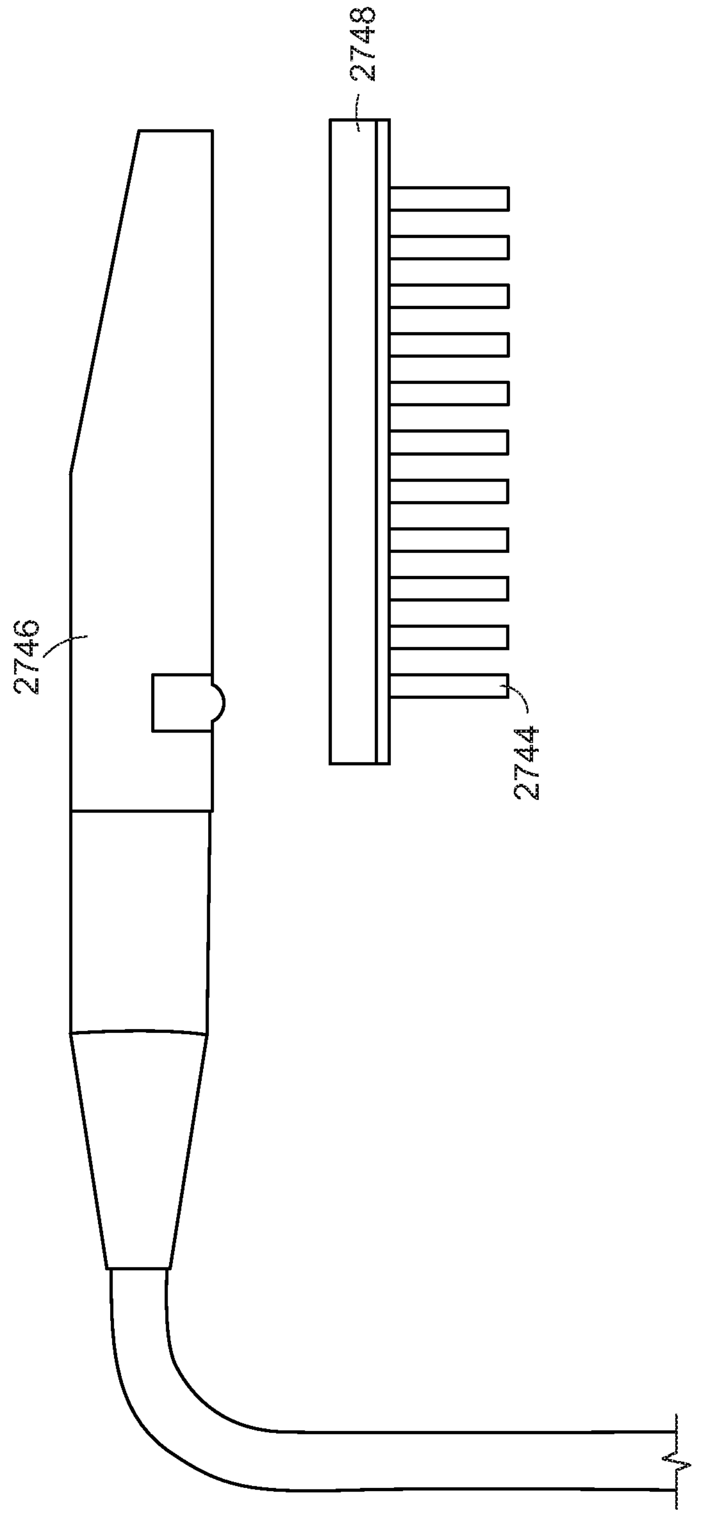
FIGS. 236-239 show embodiments of the UDAT flexible conduit of these teachings.
Figure 237:
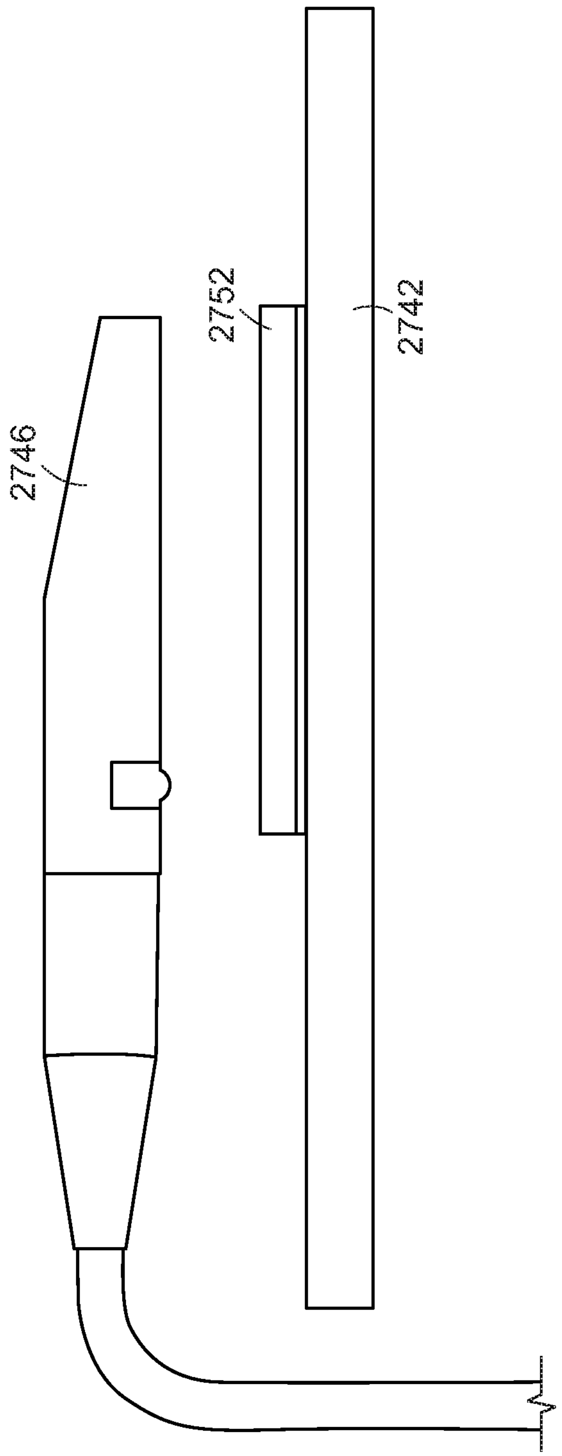

An embodiment of a High Power FABI connector is presented in FIG. 234 through FIG. 237 which supports a variety of system requirements. FIG. 234 shows an oblique view of a board-mountable High Power FABI connector. The High Power FABI connector 2746 can be mounted on a separate hermetic module 2748, for example, with a pin grid array 2744 or similar means to electronically connect the hermetic module 2748 to the circuit card 2742 as shown in FIG. 235 through FIG. 236. This approach is useful since the optoelectronic die can be protected in the hermetic module, and the hermetic module can be soldered to the board with minimal alignment. Once soldered to the board, the top High Power FABI connector 2746 is connected to the hermetic module 2748 using alignment datums on the hermetic module surface. Alternatively, the optoelectronic die 2752 can be mounted directly to the circuit board 2742, and the High Power FABI connector 2746 connects and aligns via a frame fixed to the circuit board 2742. This is illustrated in FIG. 237.

Figure 238:
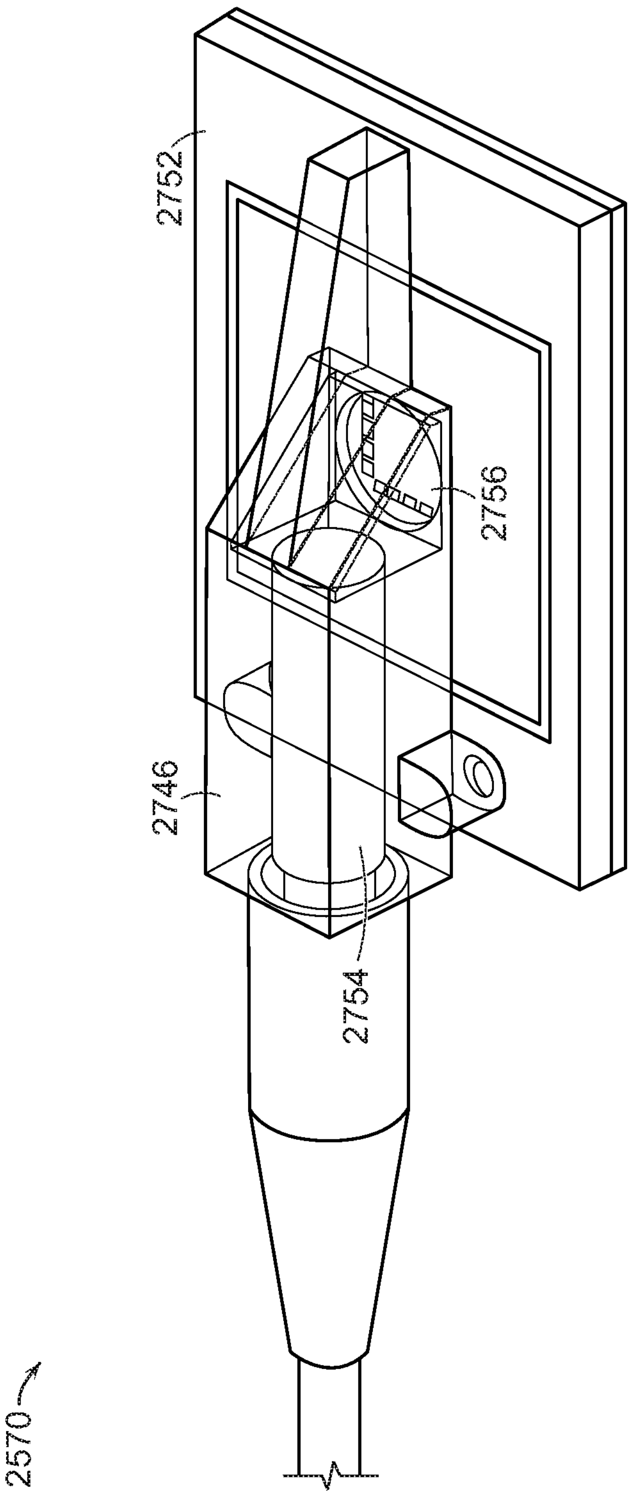

A detailed view inside an embodiment 2570 of the high power FABI connector 2746 is given in FIG. 238. Signals from a fiber array pass through an optical element 2754 and are reflected onto the detector and/or emitter array 2756 mounted on the optoelectronic die 2752.

Figure 239:
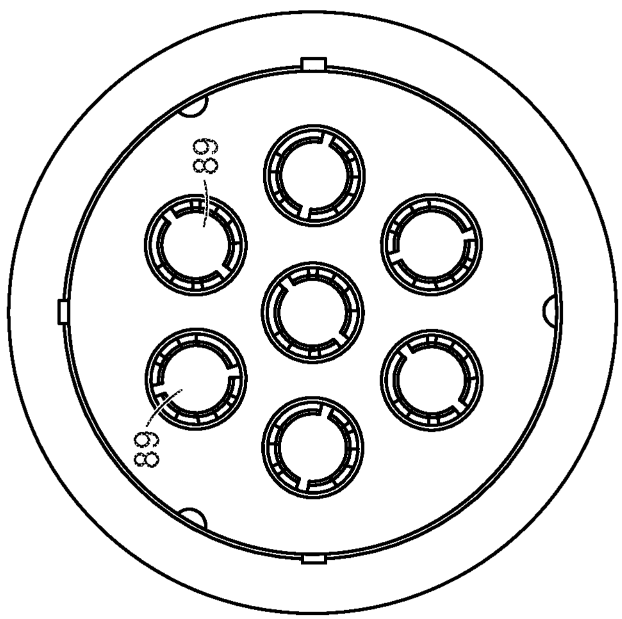
Figure 240:
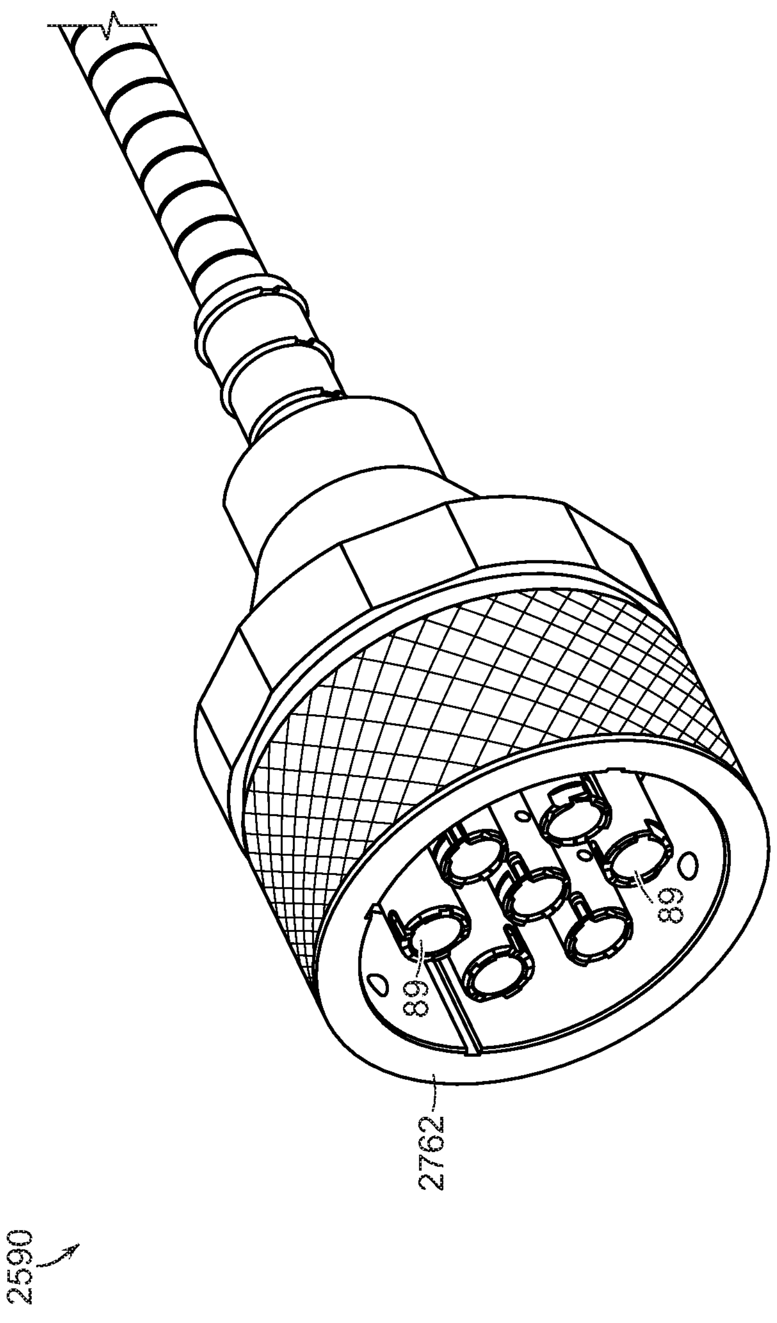
FIG. 240 shows an embodiment of a right-angle UDAT connector of these teachings.
Figure 241:
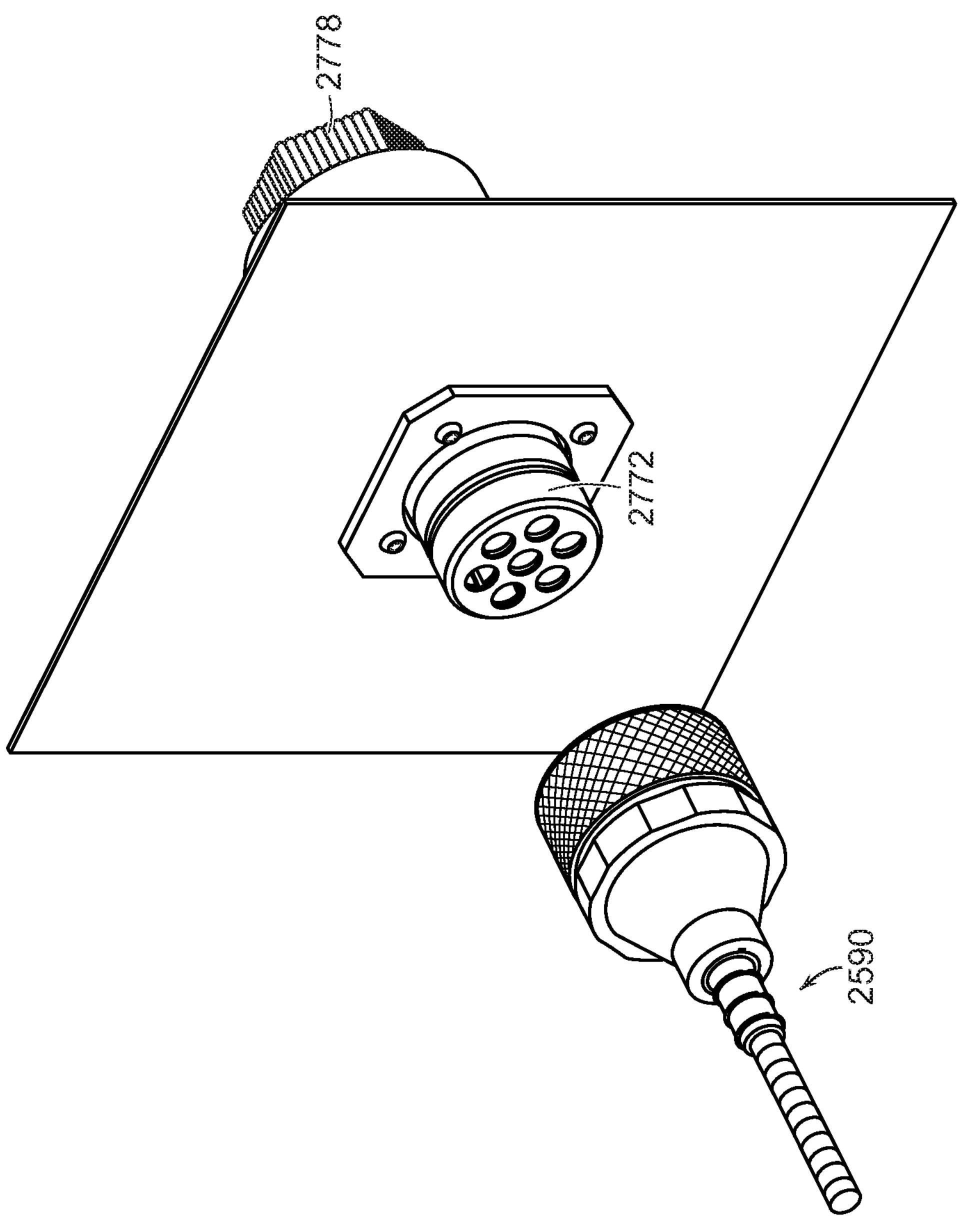
FIG. 241 shows an embodiment of a mufti-type array of fibers of these teachings.
Figure 242:
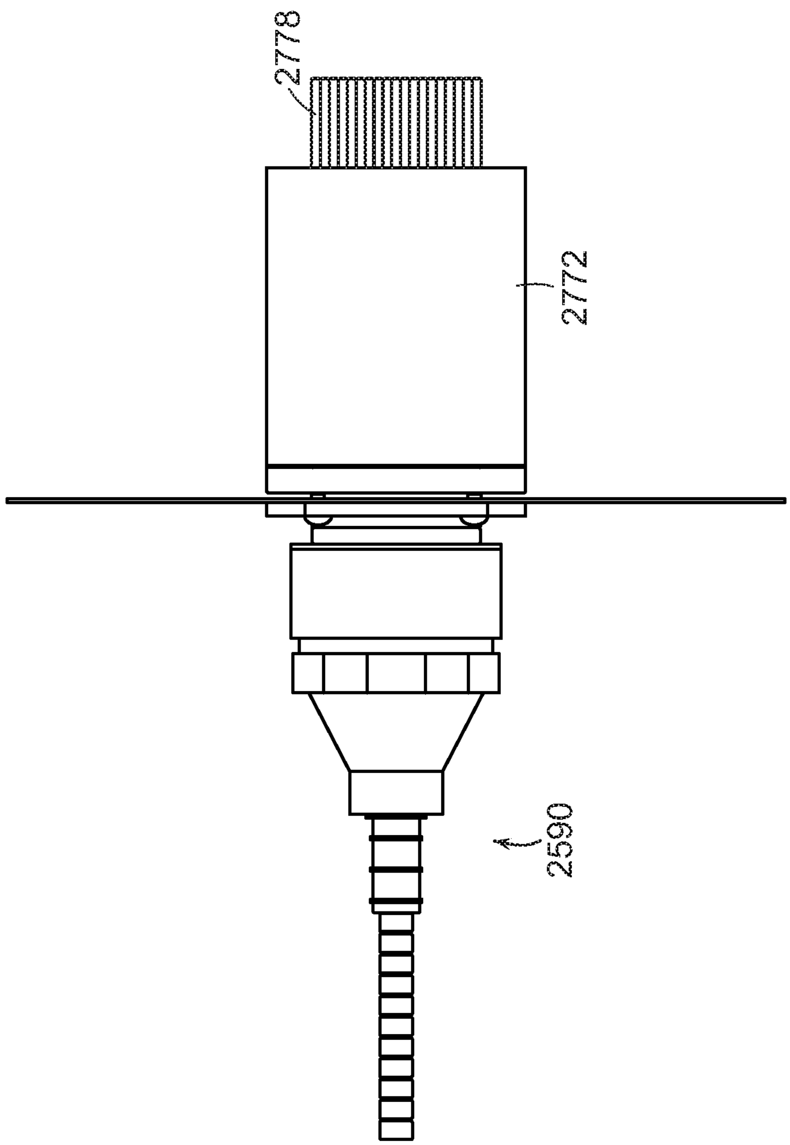
FIGS. 242-246 show embodiments of high power FABI connectors of these teachings.
Figure 243:
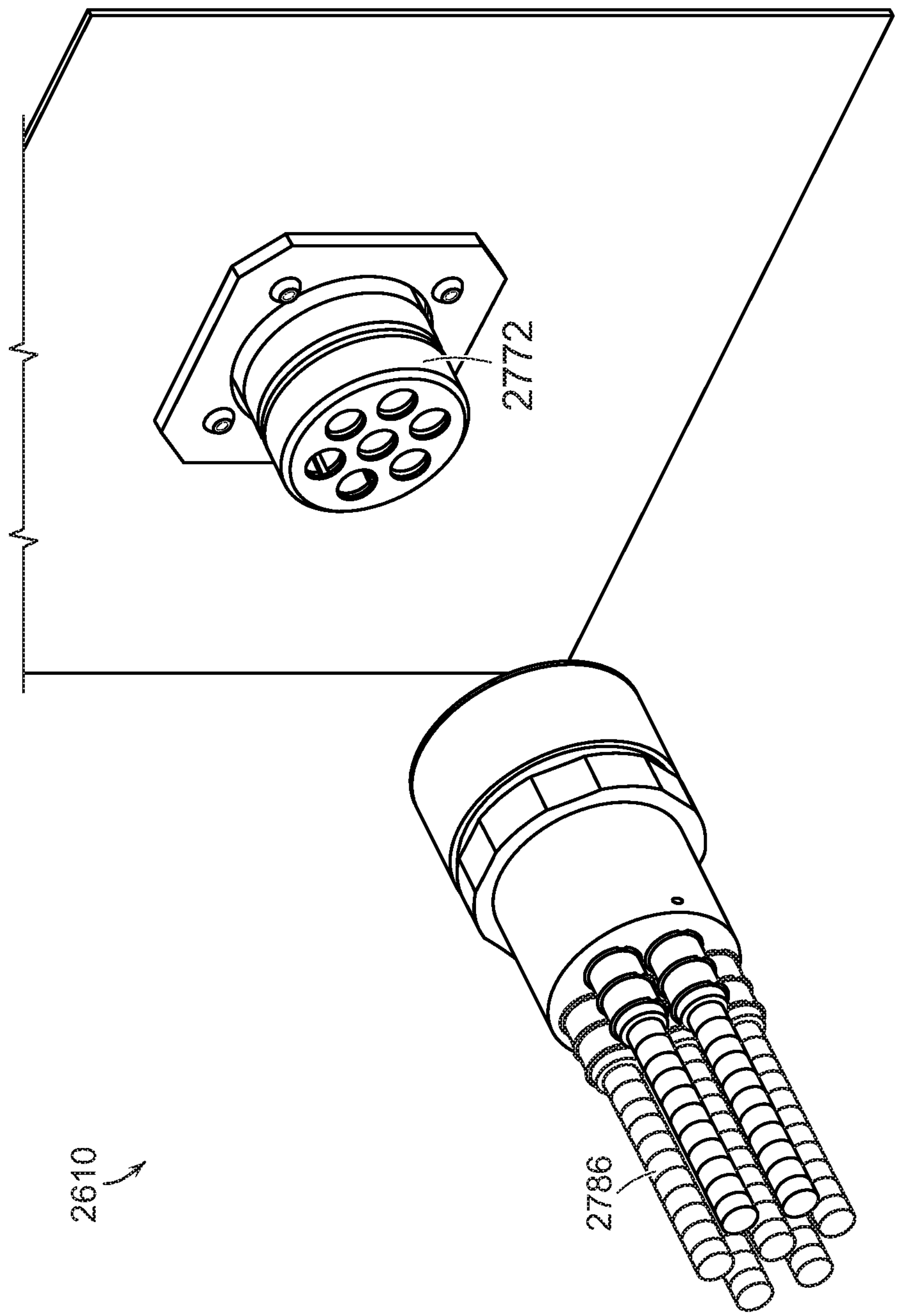

Yet another embodiment comprises multiple imager housing assemblies 89 arranged in a single UDAT connector 2762. This UDAT connector has many distinct advantages, for example, in the Multiple Head UDAT (MH-UDAT) connector system 2590 shown in FIG. 239 and FIG. 240 there are 7 imager housing assemblies 89 built into the single UDAT connector 2762. Each of the imager housing assemblies 89 couples a UDAT fiber array that can contain, for example but not limited to, 37 or 100 fibers. For 37 fibers per imager housing assembly 89, the MH-UDAT connector system 2590 couples 259 fibers in seven groups. Each of the 7 groups may be independently replaced offering increased flexibility and serviceability in applications. The individual imager housing assemblies 89 are shown in FIG. 240. Each cluster of optical fibers in a given imager housing assembly 89 can be dedicated to special signals such a high power, low power, digital, or analog signals; or for signals that are carried on optical carriers with unique or widely differing optical wavelengths. Or they may be dedicated to specific routing patterns in an airframe or other application. Similarly they may contain subsets of identical fibers and signals that are routed in redundant paths on an airframe or other application. Other UDAT features such as EMI shielding can still be accommodated in these designs. FIG. 241 thru FIG. 242 illustrate the MH-UDAT connector system 2590 connecting to the MH-UDAT breakout 2772 to many individually furcated fibers 2778 as another option, and show greater detail in oblique and side views. The MH-UDAT connector system 2590 shown in FIG. 239 and FIG. 240 includes a single flexible tube containing the many optical fibers. FIG. 243 illustrates a multi-head UDAT (MH-UDAT) connector system 2610 where each of the imager housing assemblies is independently replaceable and wherein each of the heads interconnect fibers that are in independently routable flexible tubes 2786.

Figure 244:
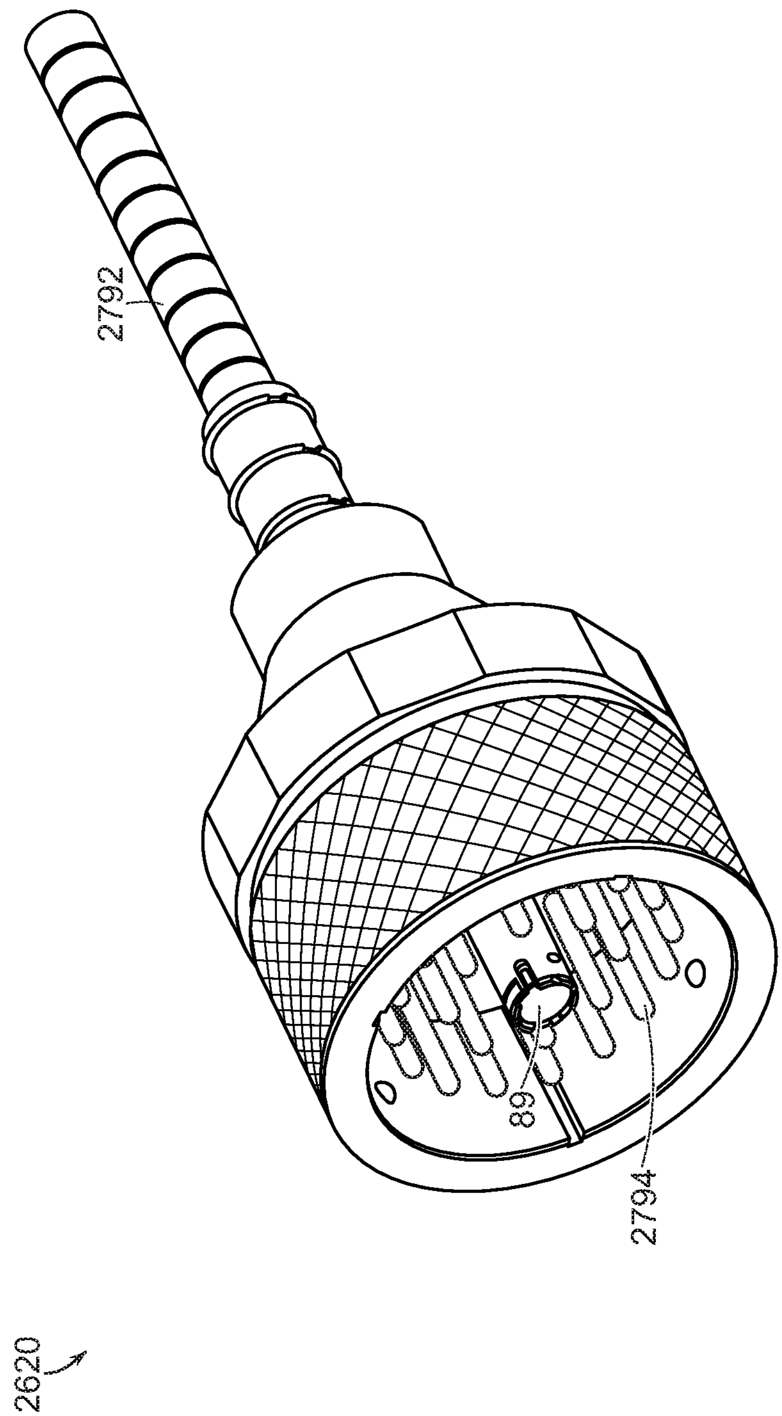

Another embodiment, labeled the H-UDAT (Hybrid UDAT) connector system 2620, is shown in FIG. 244. The H-UDAT connector system 2620 consists of the central imager housing assembly 89 that is capable of interconnecting multiple optical fibers in a reliable non-contact technology with the addition of many standard electrical connections 2794. Twenty-four are shown but any number can be used, being only limited by the available space. The proposed H-UDAT connector system 2620 shown here combines the benefits of the proven UDAT optical fiber connector and a variety of proven pin connector styles. The flexible tube 2792 exiting the connector contains the optical fibers and can also contain the electrical wires. Alternatively the electrical wires can be incorporated in a twin tube or integrated in the walls of the tube shown. Shielding is readily incorporated in the tube as required. A further feature of this cable plant technology is that the cable can be laid, strung, or fished with a greatly reduced head size (much smaller that the size of the final connector). A Quick-Disconnect version is shown, but another embodiment can be a classic screw-on mechanism like the 38999 standard or other housing.

Figure 245:
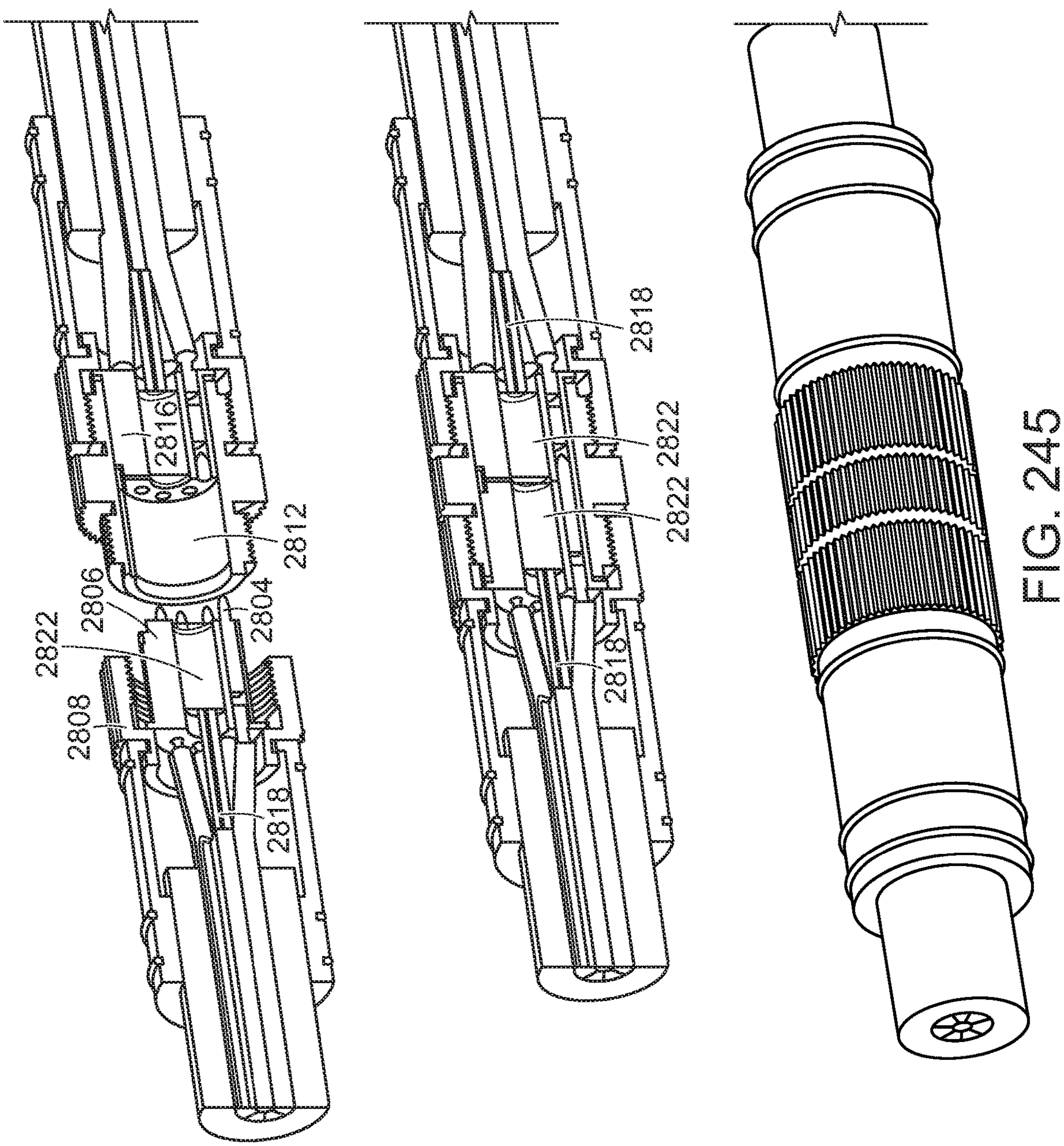
Figure 246:
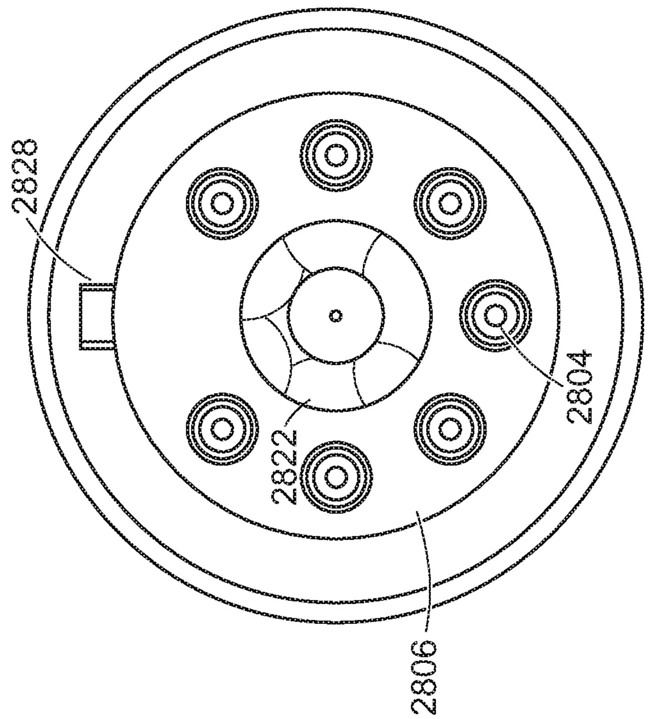

Yet another embodiment is to combine a high performance large aperture non-contact expanded beam optical fiber connector in a compact connector shown in FIG. 245 capable of seven or more high reliability electrical connections. The connector will have a small outer diameter and a short overall length. An example of the orientation of the electrical connections 2804 about the optical fiber connection 2822 is shown in FIG. 246, but the number of electrical connections and their orientation about the centerline is not limited to this example.

This embodiment includes a fiber optic 2818 that is affixed to the back of the lens 2822 during the system alignment. The lens 2822 itself is affixed into a male housing 2806 which also contains the wire connection pins 2804. During connection, the male housing 2806 is fitted into the alignment sleeve 2812, oriented rotationally about the central axis with the alignment key 2828. Rotation of the housing nut 2808 drives the front face of the male housing 2806 towards the center of the alignment sleeve 2812, where it mates with the female housing 2816. The required gap between the optical lenses is maintained by the recessed distance between the front face of the male housing 2806 and female housing 2816 and the front face of the lens.

Figure 247:
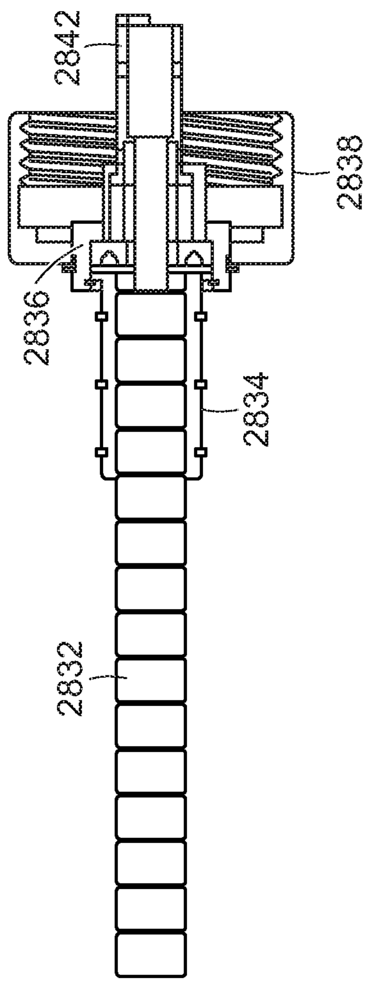
FIGS. 247-259 show embodiments of the UDAT connectors of these teachings.

Another unique capability afforded by the UDAT cables is a removable-housing UDAT embodiment in which the connector can be disassembled during cable plant installation to allow the cable plant to be installed through small holes in bulkheads or crevices in fuselages for example. FIG. 247 illustrates one such removable housing UDAT connector with the housing attached. This is illustrated for the 38999 style housing for the UDAT connector but other styles including the quick disconnect style can also be used. This embodiment includes a flexible tube 2832, tubing clamp 2834, snap-in housing 2836, imager housing 2842 and threaded housing nut 2838.

Figure 248:
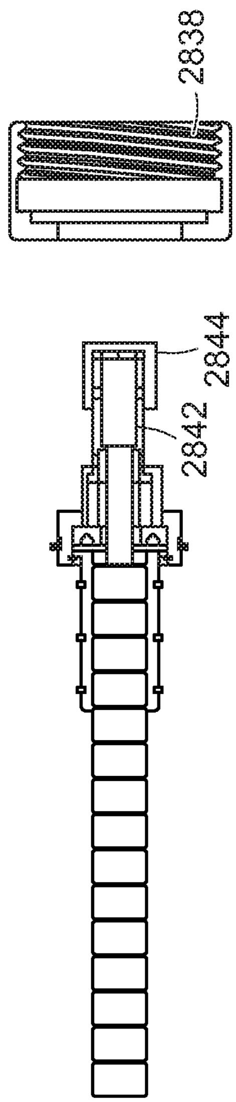

The previous embodiment is shown in FIG. 248 with the threaded housing nut 2838 detached. A protective cap 2844 is shown inserted over the imager housing 2842 to protect the optical surface during operations such as cable plant installation. This illustrates the greatly reduced outer diameter of the connector, facilitating installation of the cable plant in challenging irregular and cramped environments.

Figure 249:
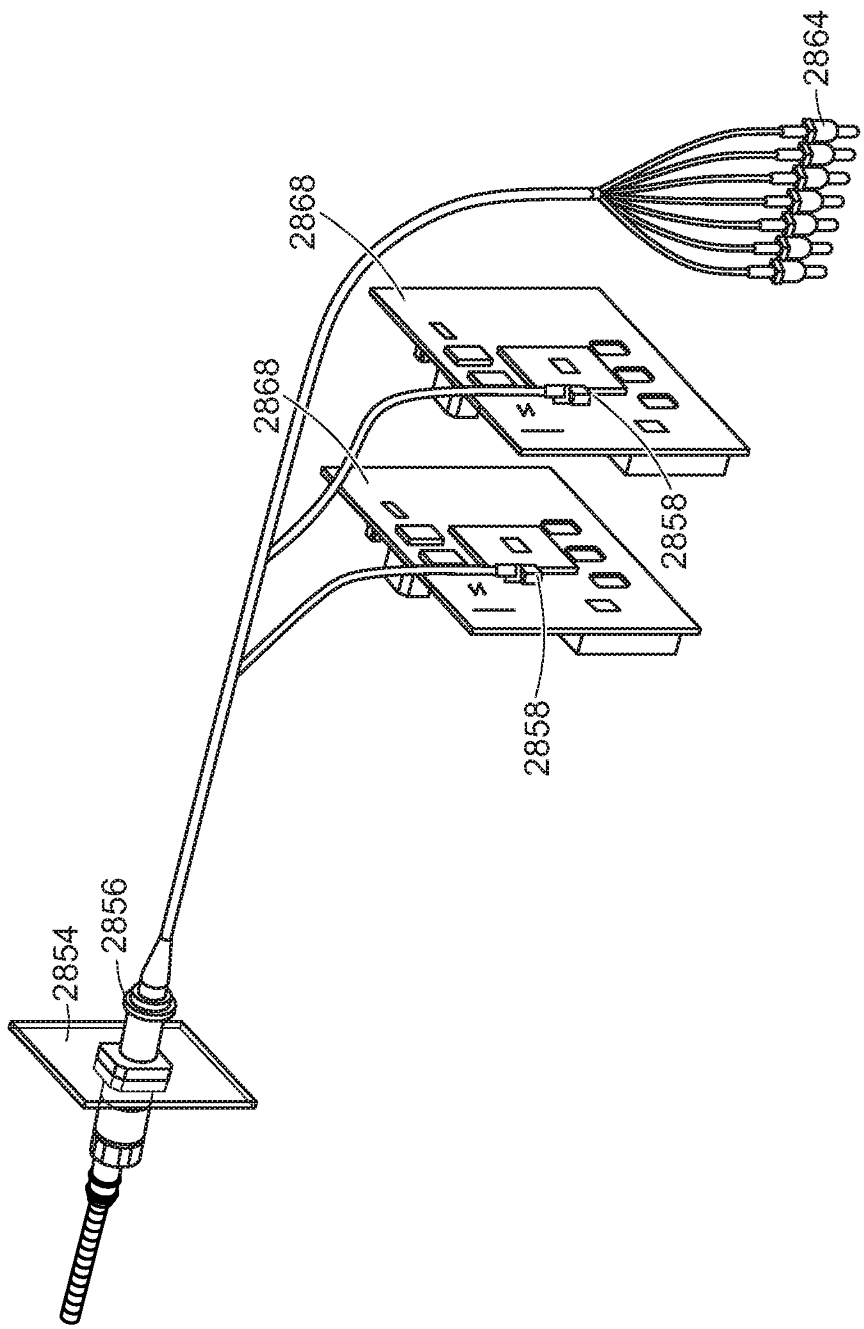
Figure 250:
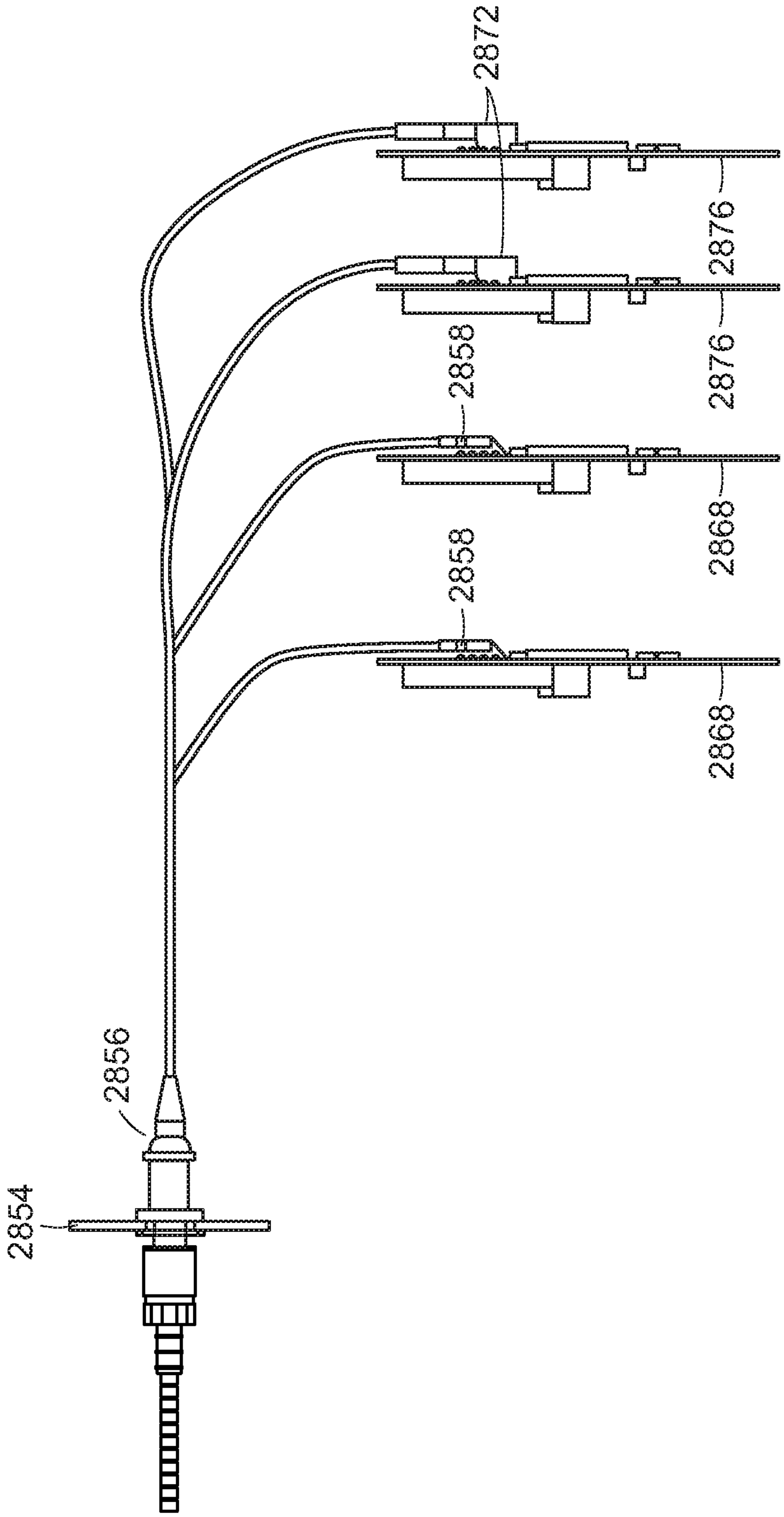
Figure 251:
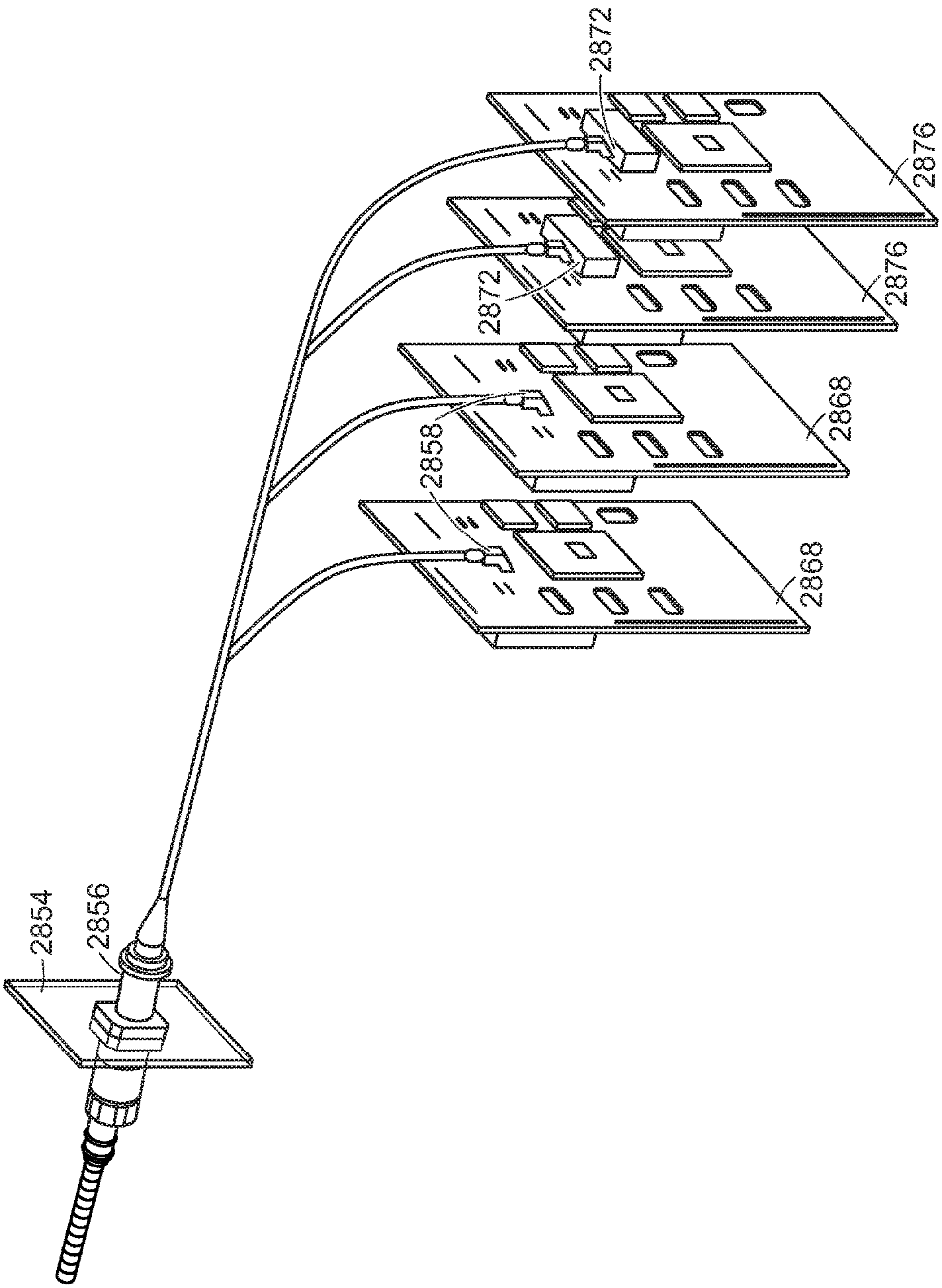

Embodiments of high power FABI connectors, FABI connectors, and Mini UDAT connectors can provide an attractive set of components for increasing reliability, adding (dis-) connectability, and decreasing size and weight over conventional individual fiber breakout approaches. This is illustrated in FIG. 249-FIG. 251. In these figures, a multiple of fibers are interfaced through the box wall 2854 using the UDAT connector 2856. In the embodiment shown in FIG. 249, inside the box, the many fibers are brought to three groups of fibers, two groups powering high power FABI connectors 2858 on two circuit cards 2868, and the third group simply broken out as individually furcated fibers with (for example) ST connectors 2864. The three groups of fibers are arranged in the three tube branches.

The High Power FABI connectors 2858 couple many (e.g., 37 or 100) fibers to high current detectors. The ST connectors 2864 can be replaced by a much smaller number of mini-UDAT connectors 2872 on circuit cards 2876 as shown in FIG. 250 or FIG. 251. The Mini-UDAT connectors 2872 couple fibers to other bare or furcated fibers, or to detectors and lasers, or to waveguides on board, or to other devices.

The tubes are shown "spaciously" connecting to the boards for clarity. In practice a much tighter packing configuration can be attained.

Figure 252:
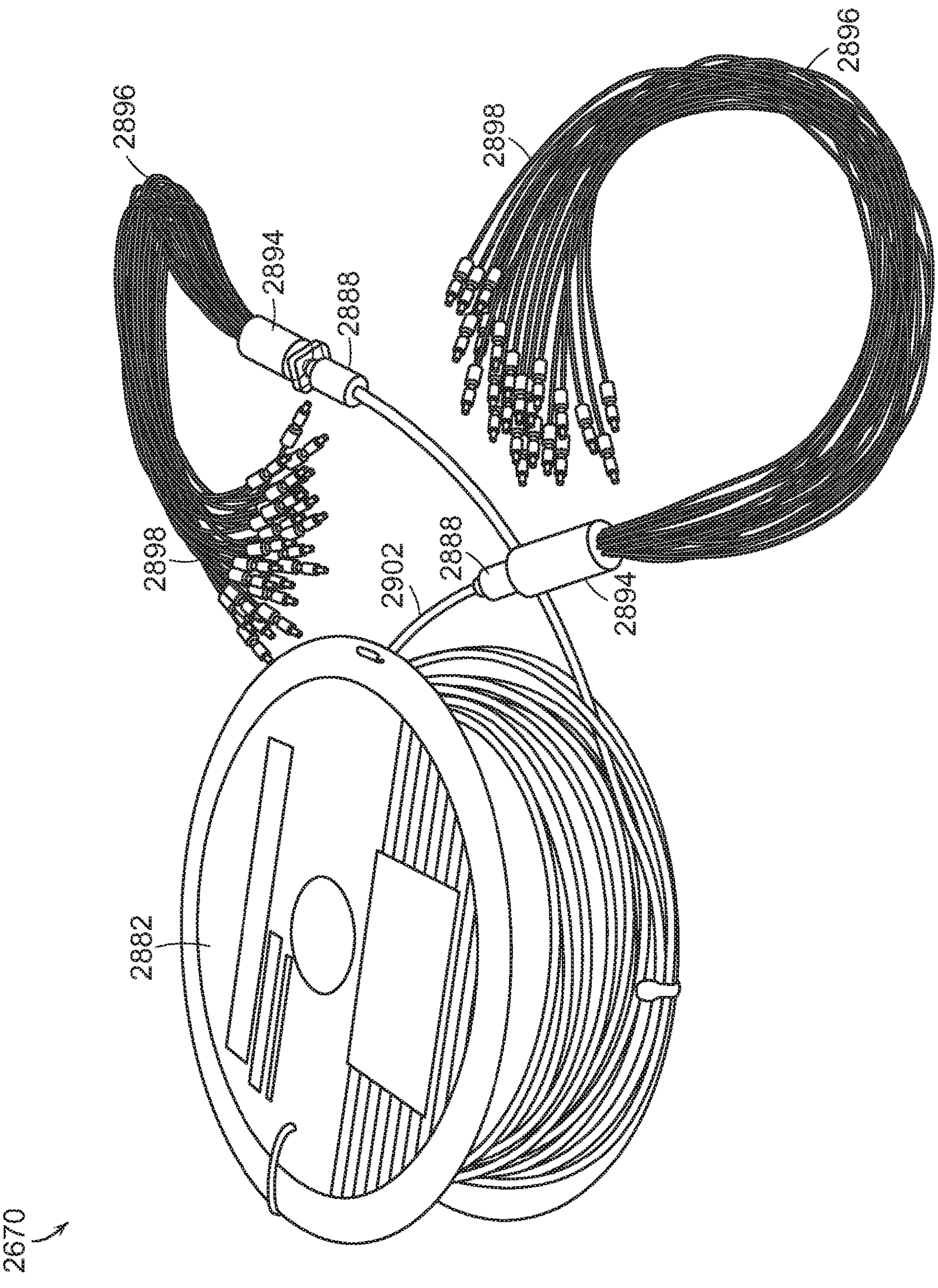
Figure 253:
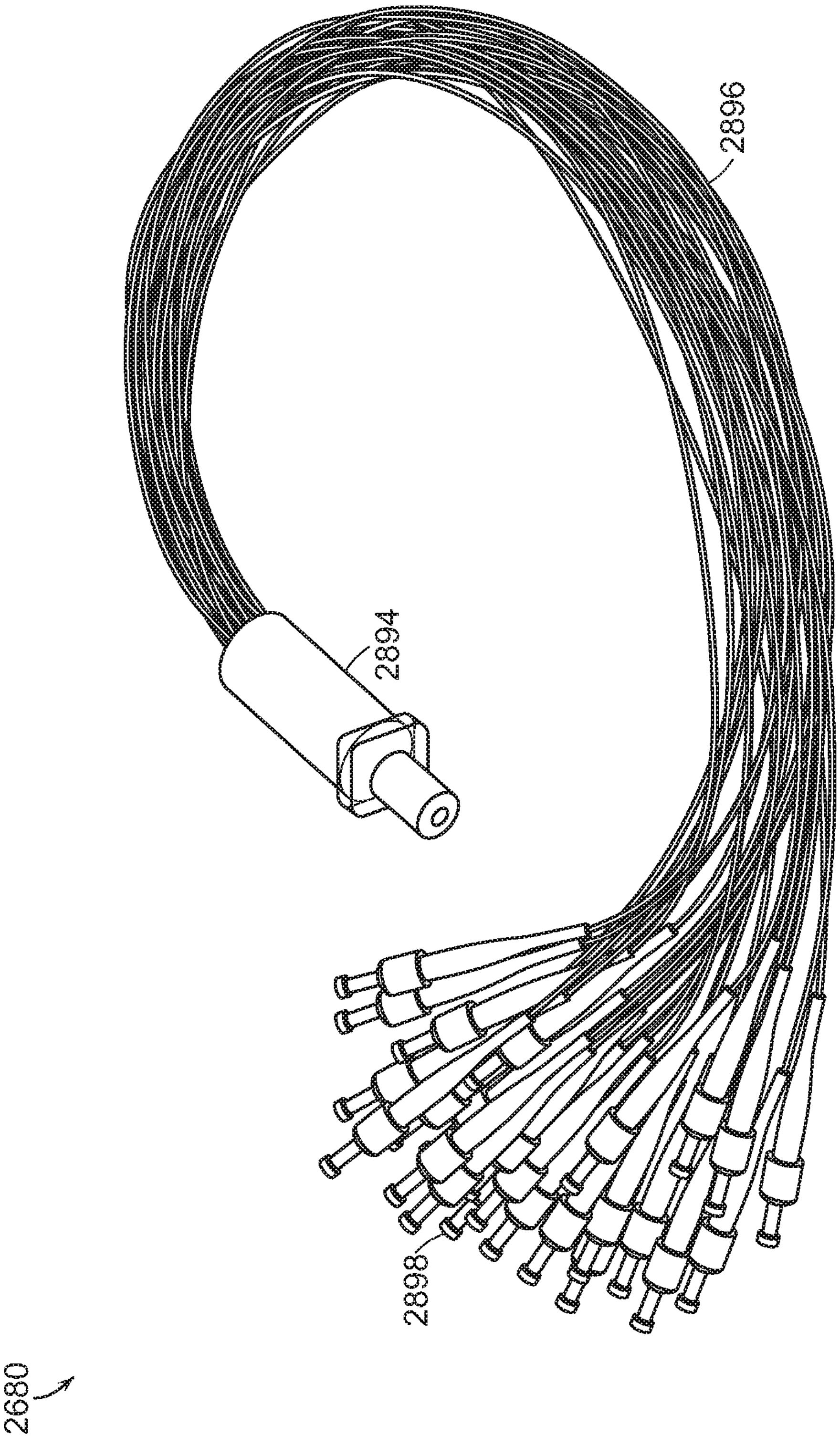

The GEN-III UDAT cable plant 2670 is shown in FIG. 252. It consists of a 37-fiber cable 2902 (shown on the spool 2882) terminated with UDAT connectors 2888. Each UDAT connector 2888 is connected to a UDAT breakout 2894, which separates the fibers into individual furcation tubes 2896, which are then terminated with ST connectors 2898.

Figure 254:
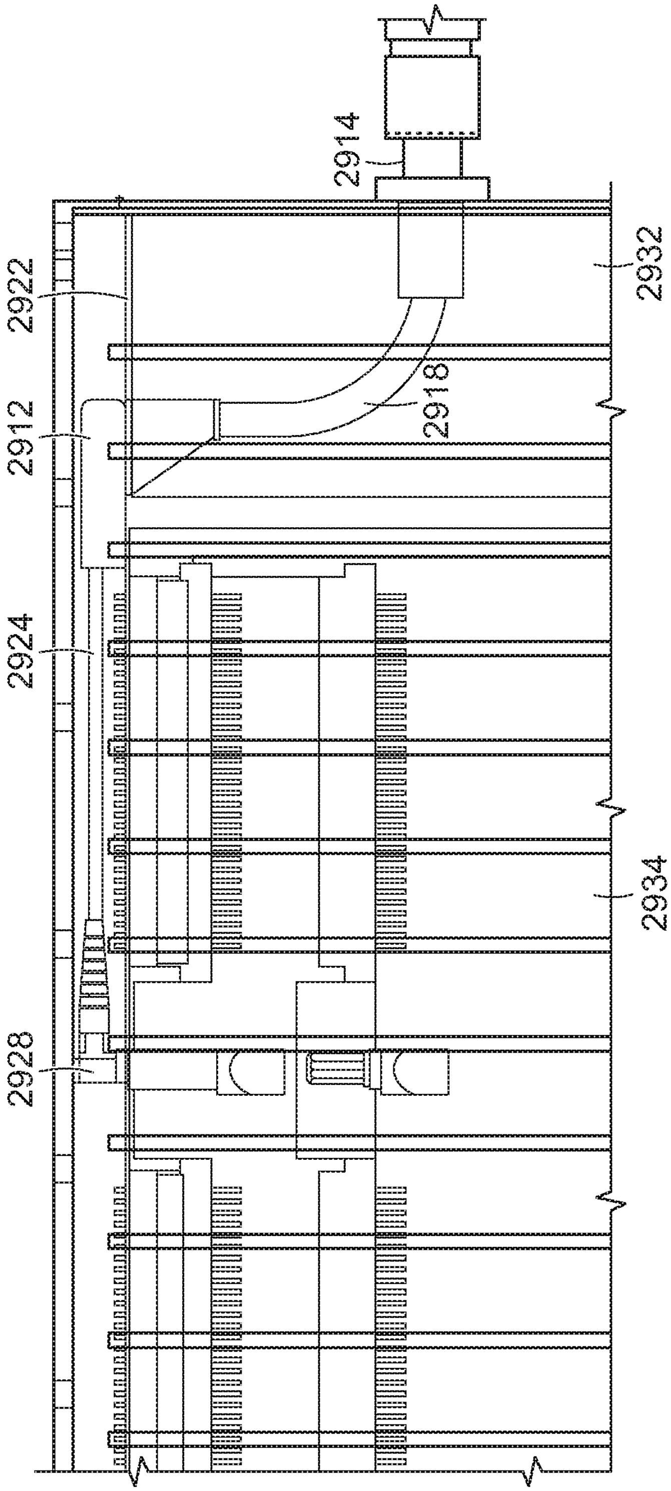
Figure 255:
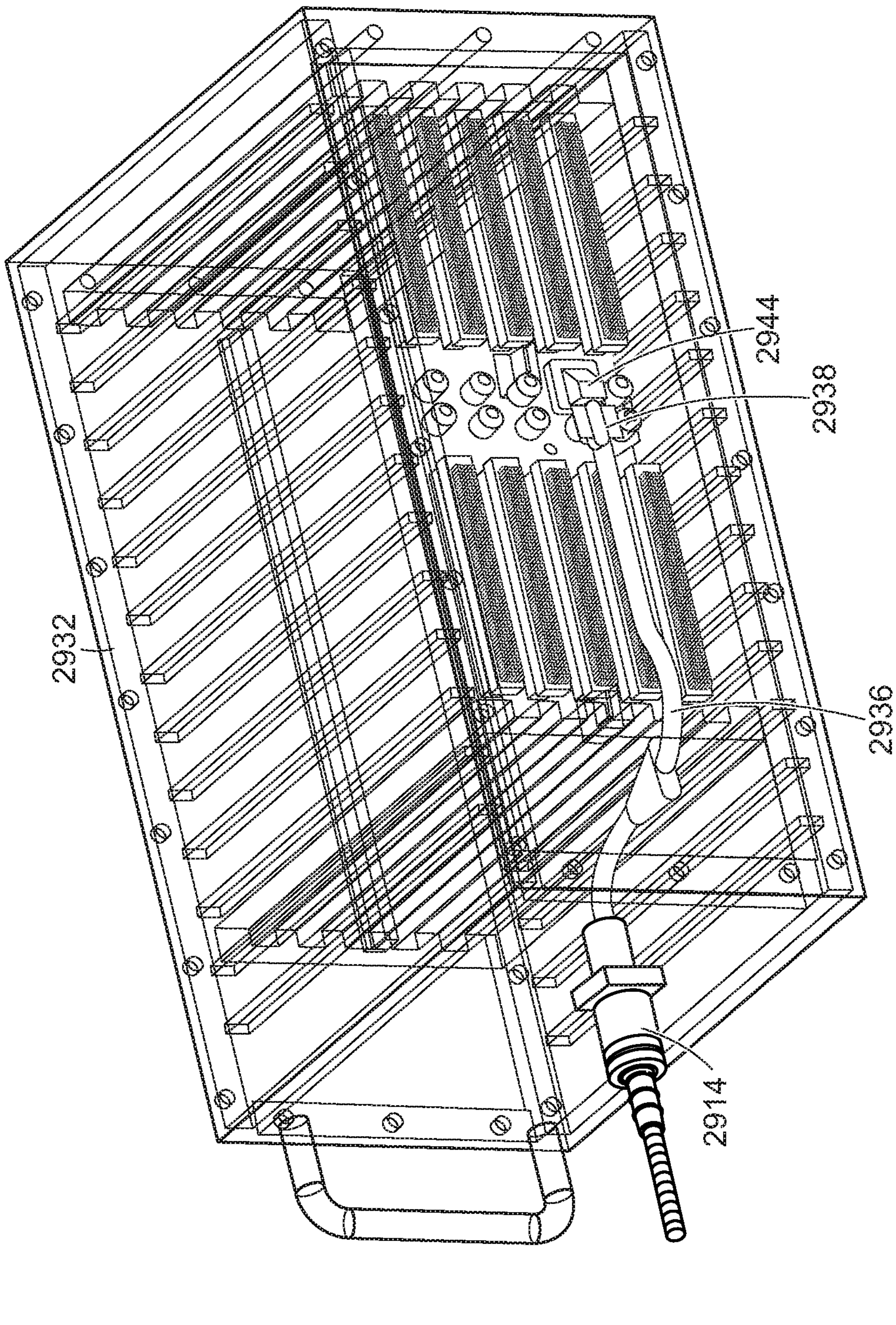
Figure 256:
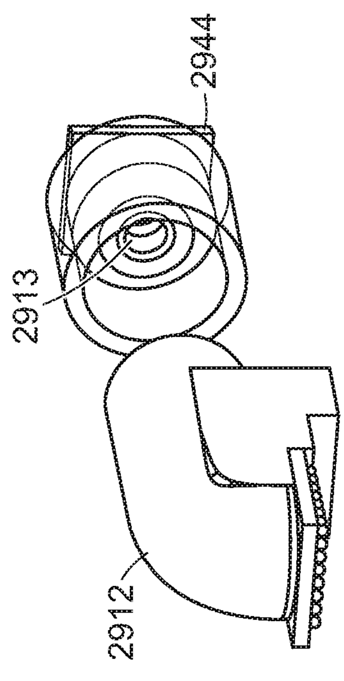
Figure 257:
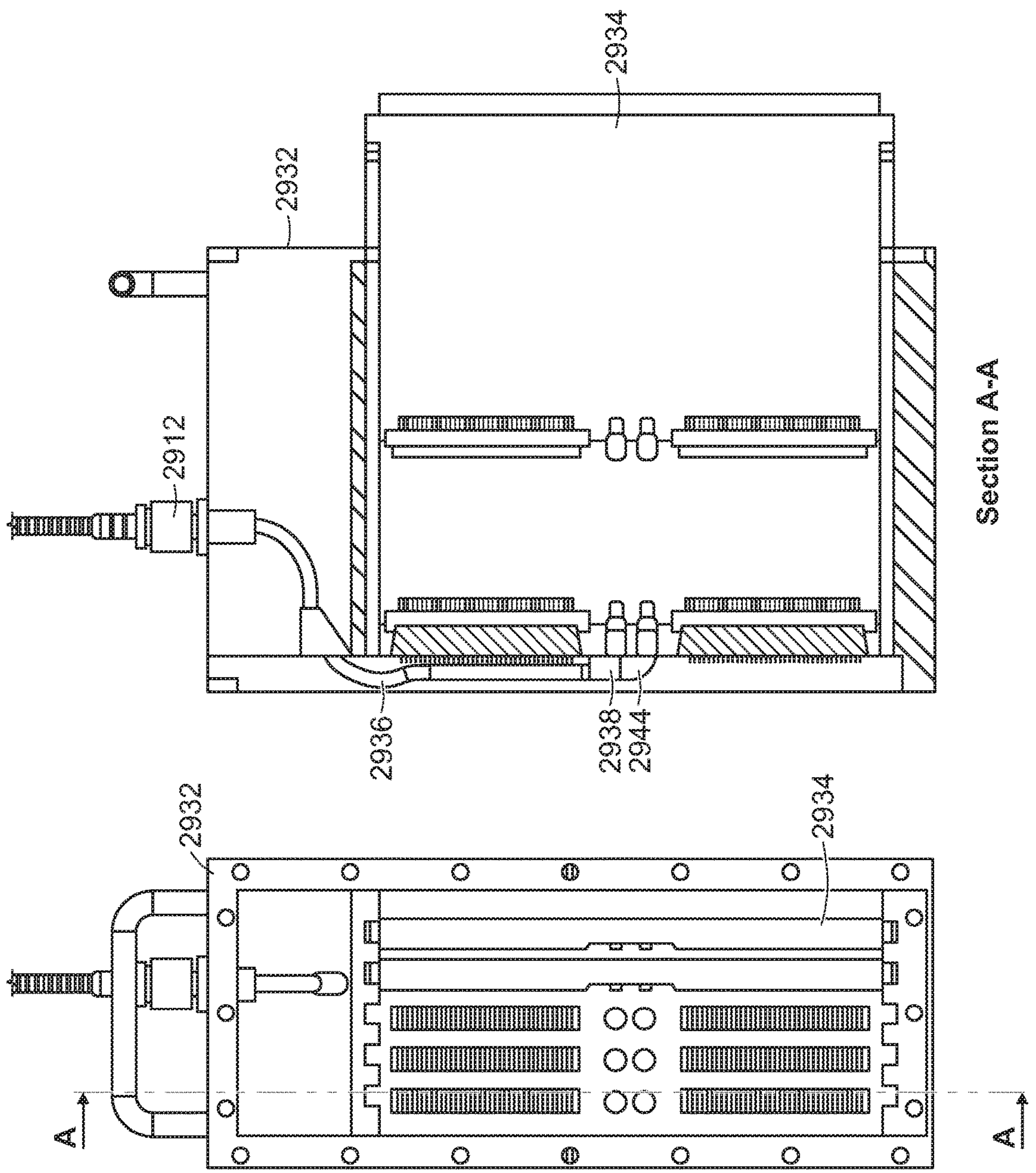
Figure 258:
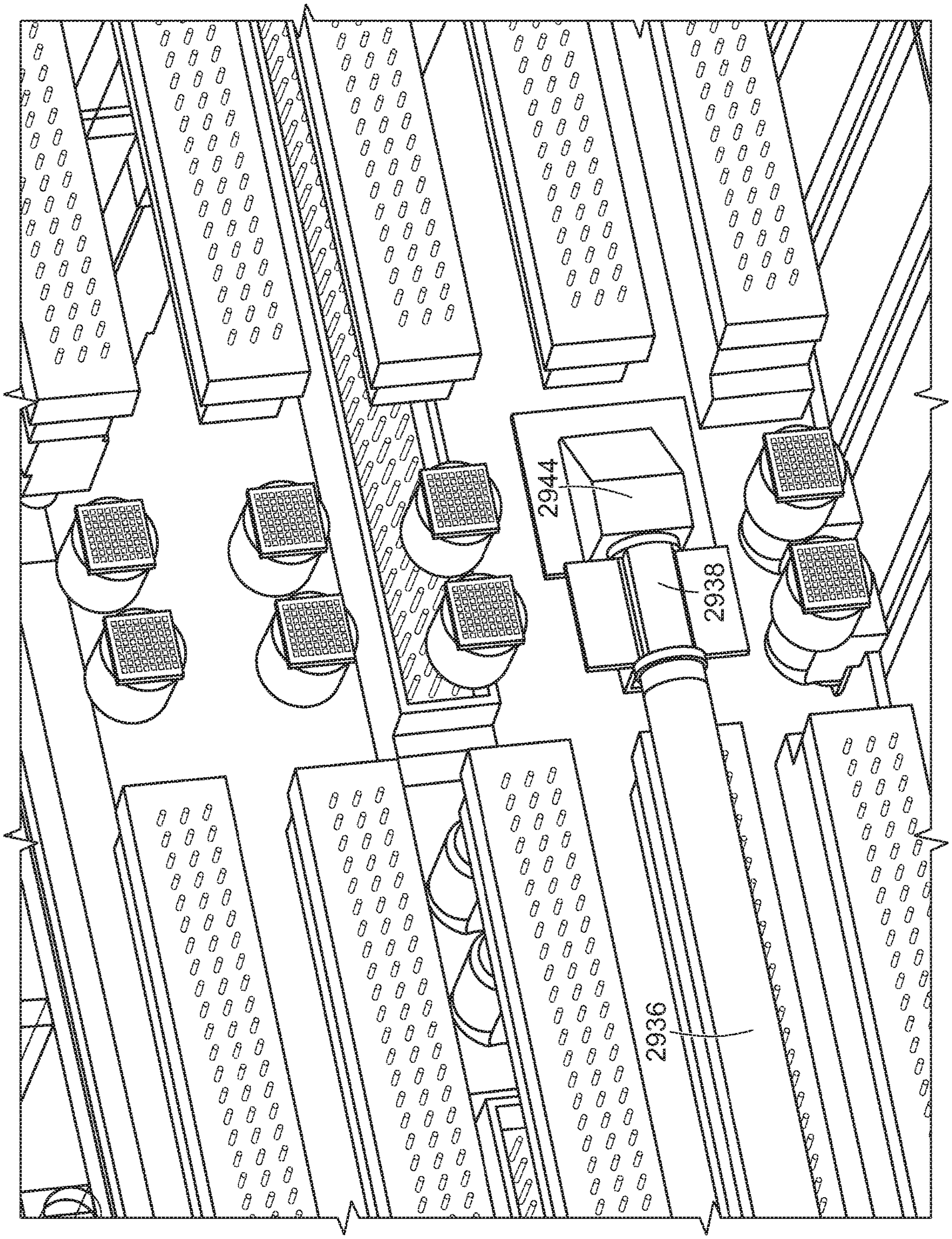

FIG. 254 shows one embodiment for bringing fibers into an electronics box or circuit card rack. Herein the electronics box/circuit card rack can be referred to simply as a box 2932. Multiple embodiments provide for the routing of fibers from the UDAT connector 2914, shown at right, to the backplane 2922 for efficient board connection.

A box 2932 layout contains two chambers—the “noisy” chamber where the connectors enter the box and also where the power supply is mounted, and the “quiet” chamber where the boards are stacked. Keeping in mind that the connector chamber can contain higher levels of EMI, the fibers are brought through the backplane using techniques such as but not limited to a shielding boot 2912 so that EMI energy does not penetrate to the quiet board side.

One embodiment, as shown in FIG. 254, routes optical fibers to the backplane 2922 from the UDAT connector 2914 through a tube 2918 to the shielding boot 2912 and a protective sleeve 2924 where they are interfaced through a backplane connector 2929 to a FABI interface 2928 on the circuit boards 2934.

The “Backplane FABI” embodiment, as shown in FIG. 255 through FIG. 258, comprises the fibers passing from the UDAT connector 2914 through a flexible tube 2936 directly to a S-UDAT connector 2938 to a backplane FABI 2944 which transmits via, for example but not limited to, a right-angle optical data pipe pair 2913 to a circuit board 2934.

Figure 259:
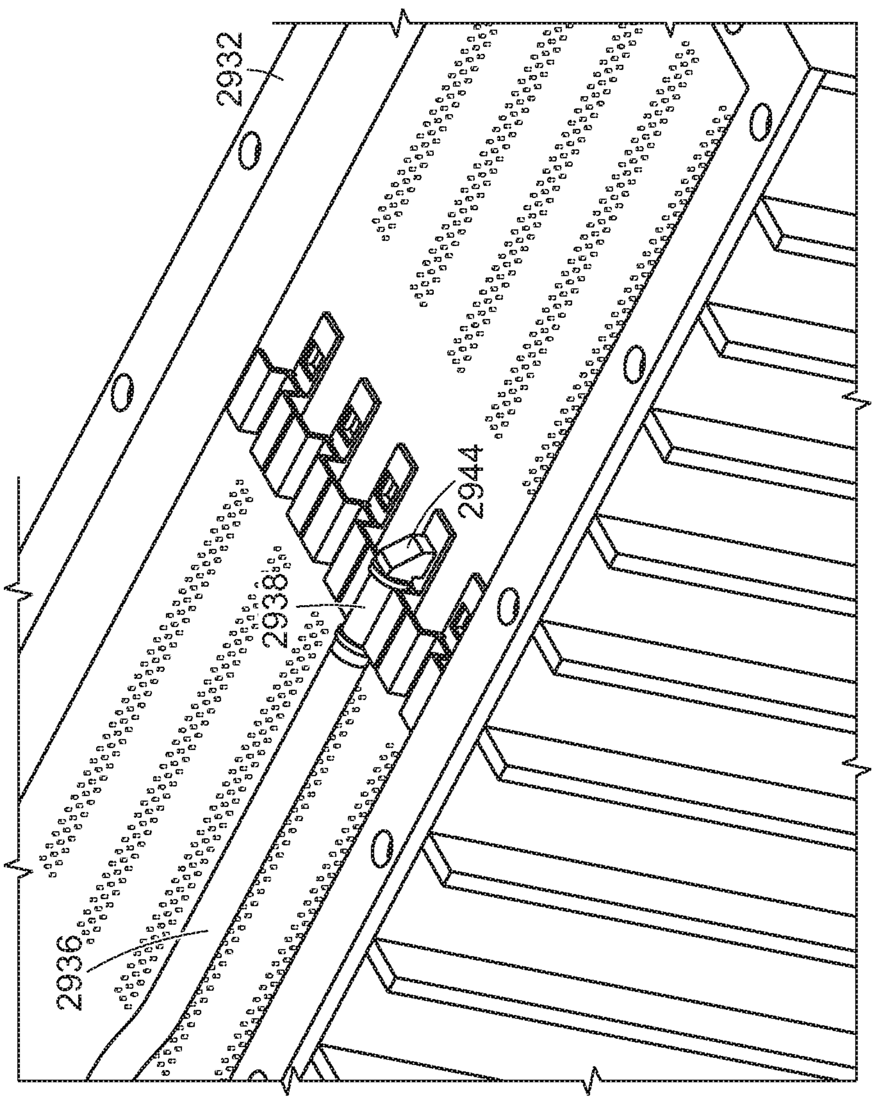
Figure 260:
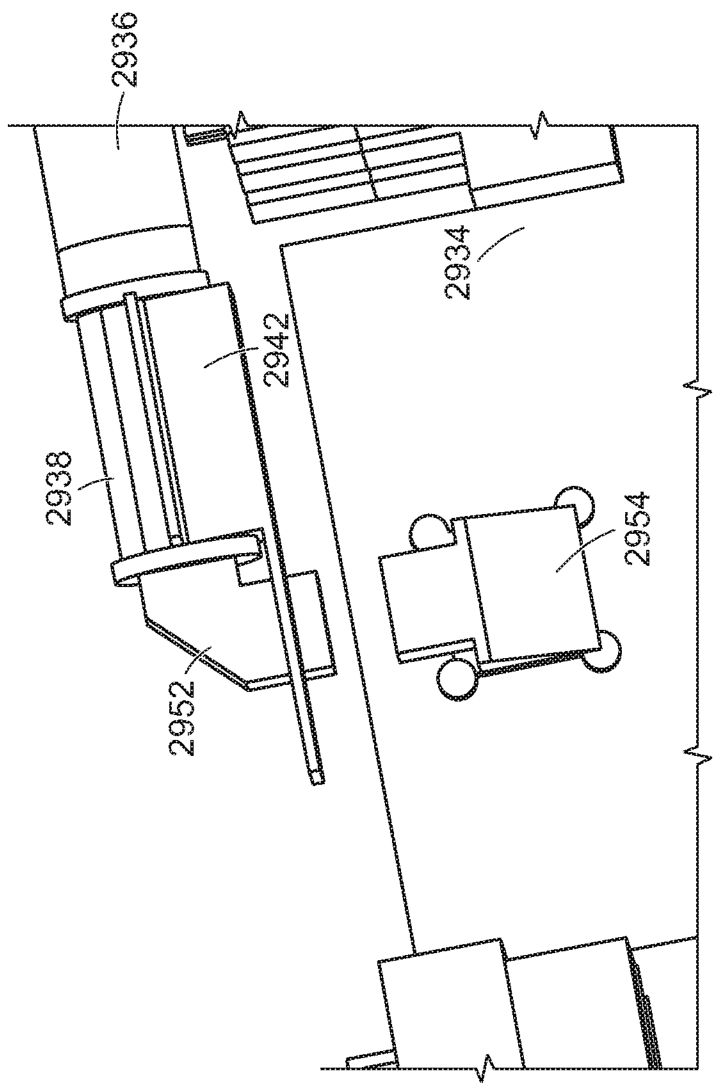
FIGS. 260-261 show the UDAT cable plant of these teachings as manufactured.
Figure 261:
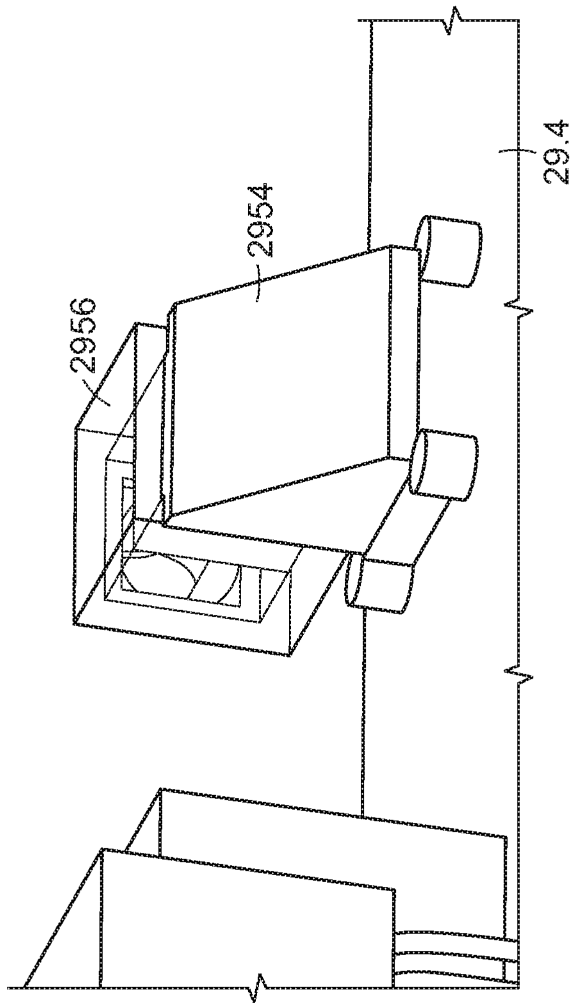
Figure 262:
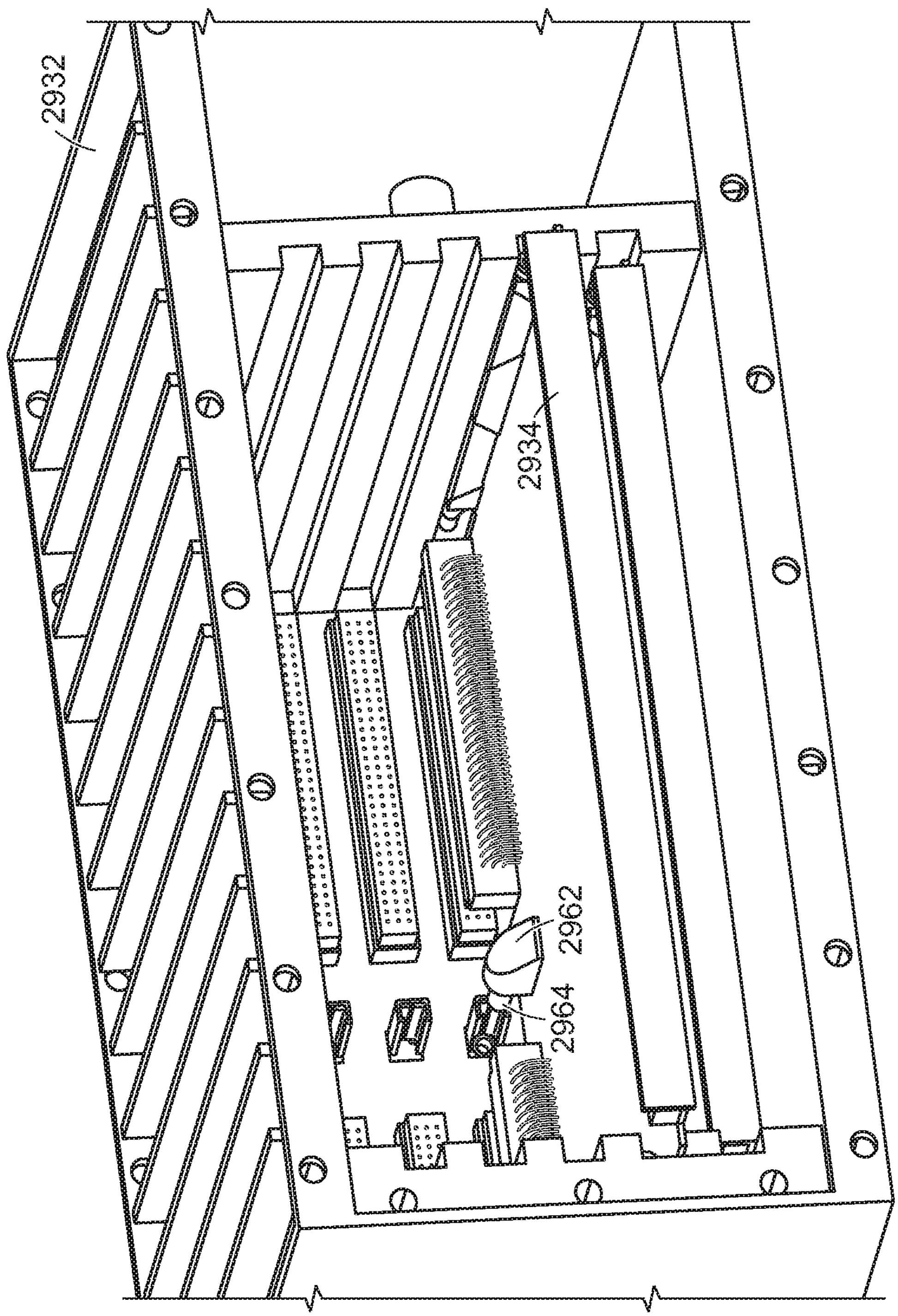
FIGS. 262-286 show embodiments of the UDAT and FABI technology of these teachings within circuit card racks.
Figure 263:
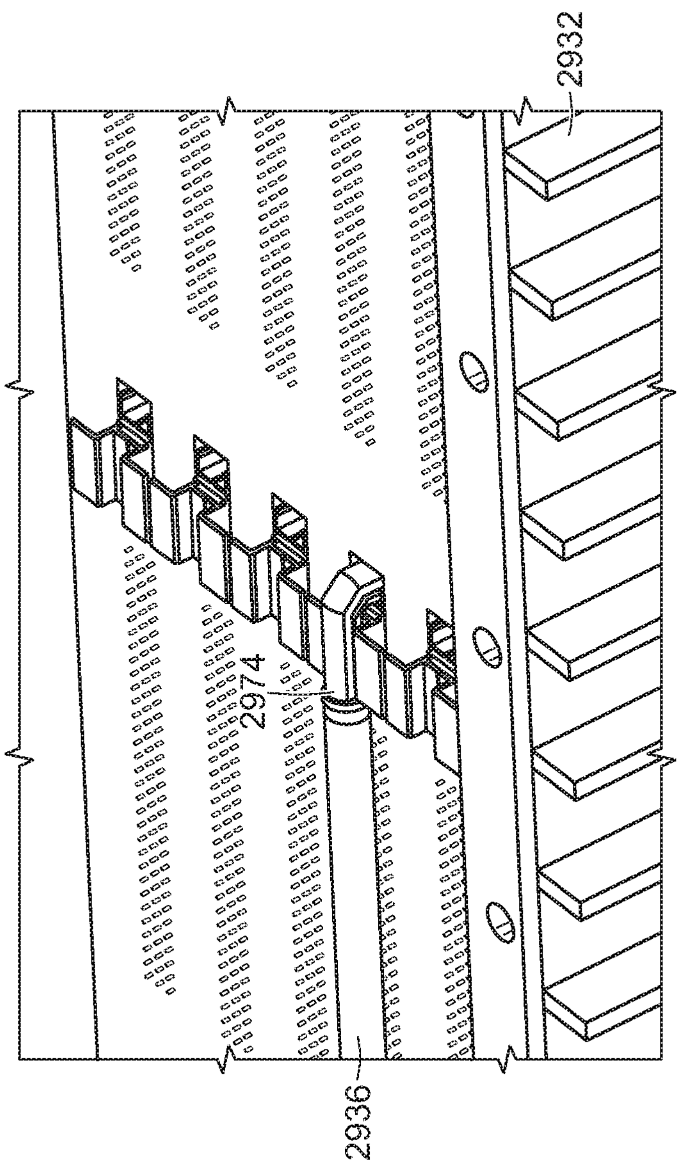
Figure 264:
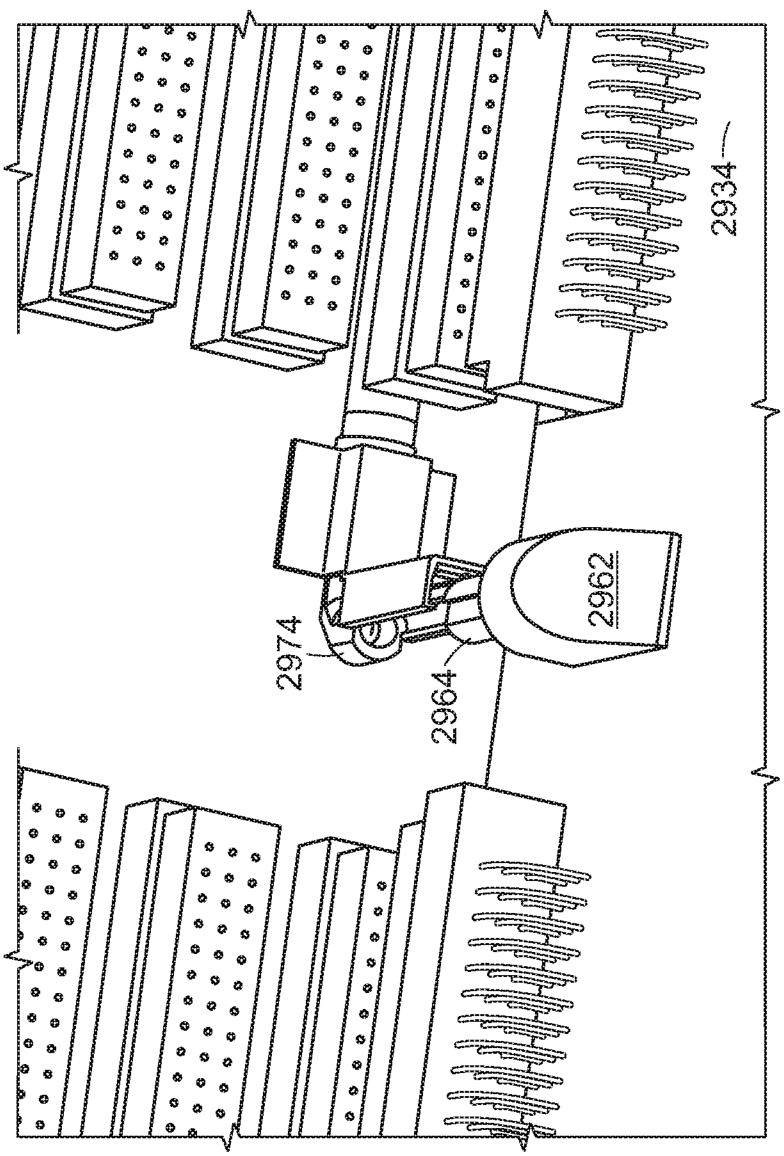
Figure 265:
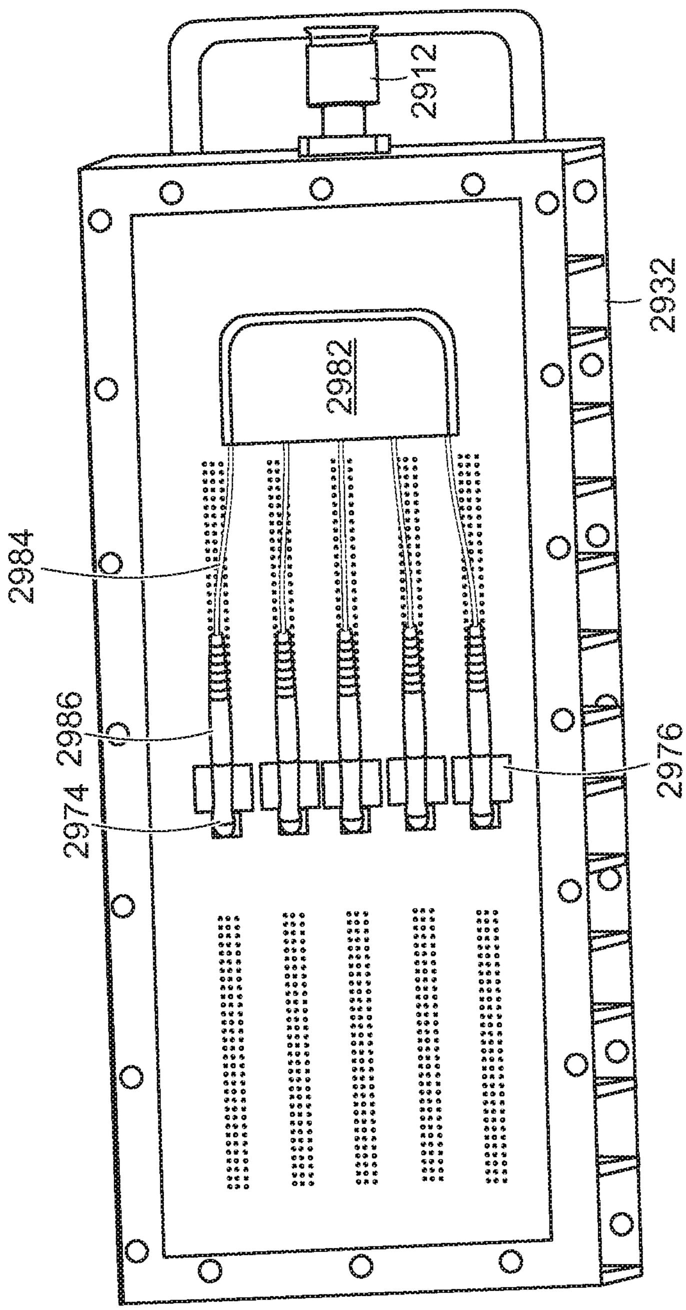

Another embodiment is shown in FIG. 259 through FIG. 261 includes the fibers passing through the flexible tube 2936 to an S-UDAT connector 2938 which mates to an in-line or right-angle infinite conjugate imagers 2952 passing to circuit board mounted FABI 2954, Often these connectors can be most compact using right angle versions of the typical infinite conjugate imagers. A dust boot 2956 can be placed over the optical junction.

Another embodiment is shown in FIG. 262 through FIG. 265, in which the fibers pass through a flexible tube 2936 to a backplane S-UDAT 2974 which interfaces with a mating connector 2964 to a circuit board 2934 mounted FABI 2962. These embodiments can be directed to multiple circuit boards 2934 in the same box 2932 as needed. Within the box 2932, the fiber cable can be broken out in a manifold 2982 to individual flexible cables 2984 with strain relief 2986.

Figure 266:
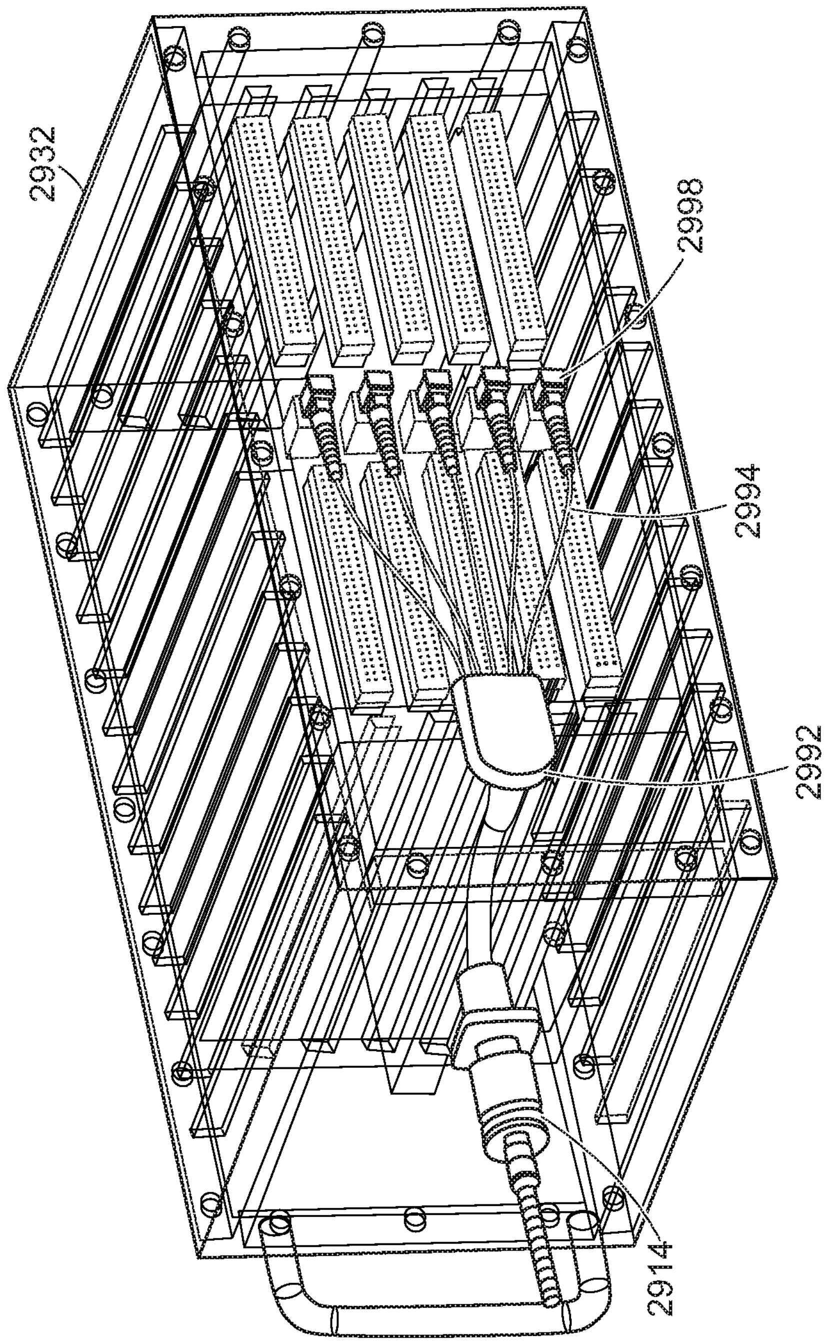
Figure 267:
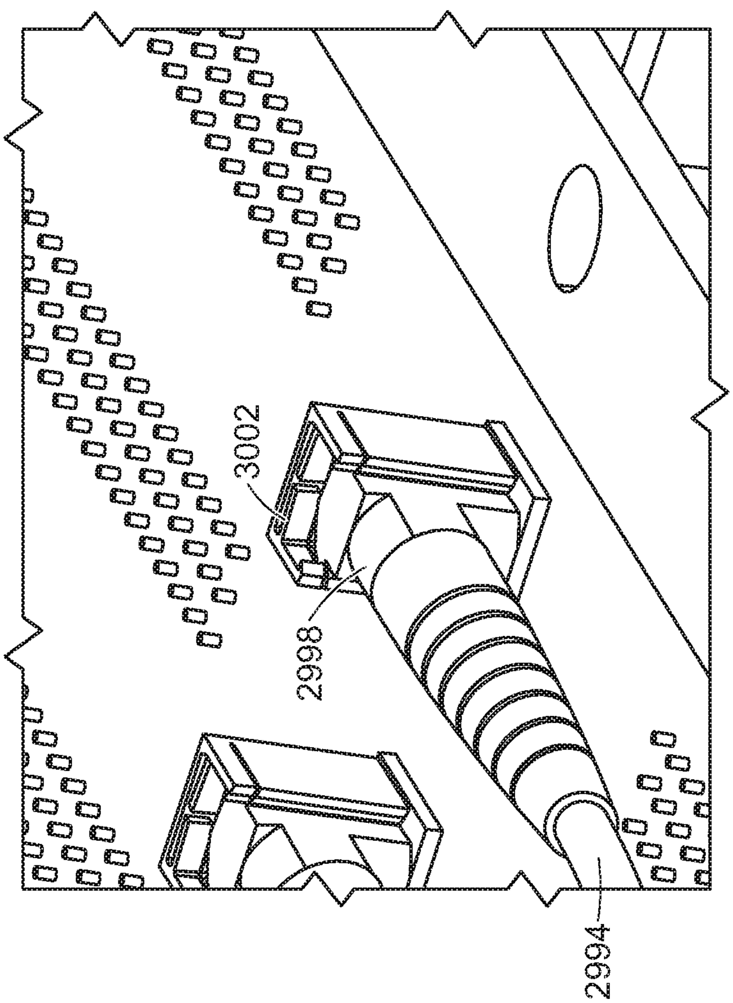
Figure 268:
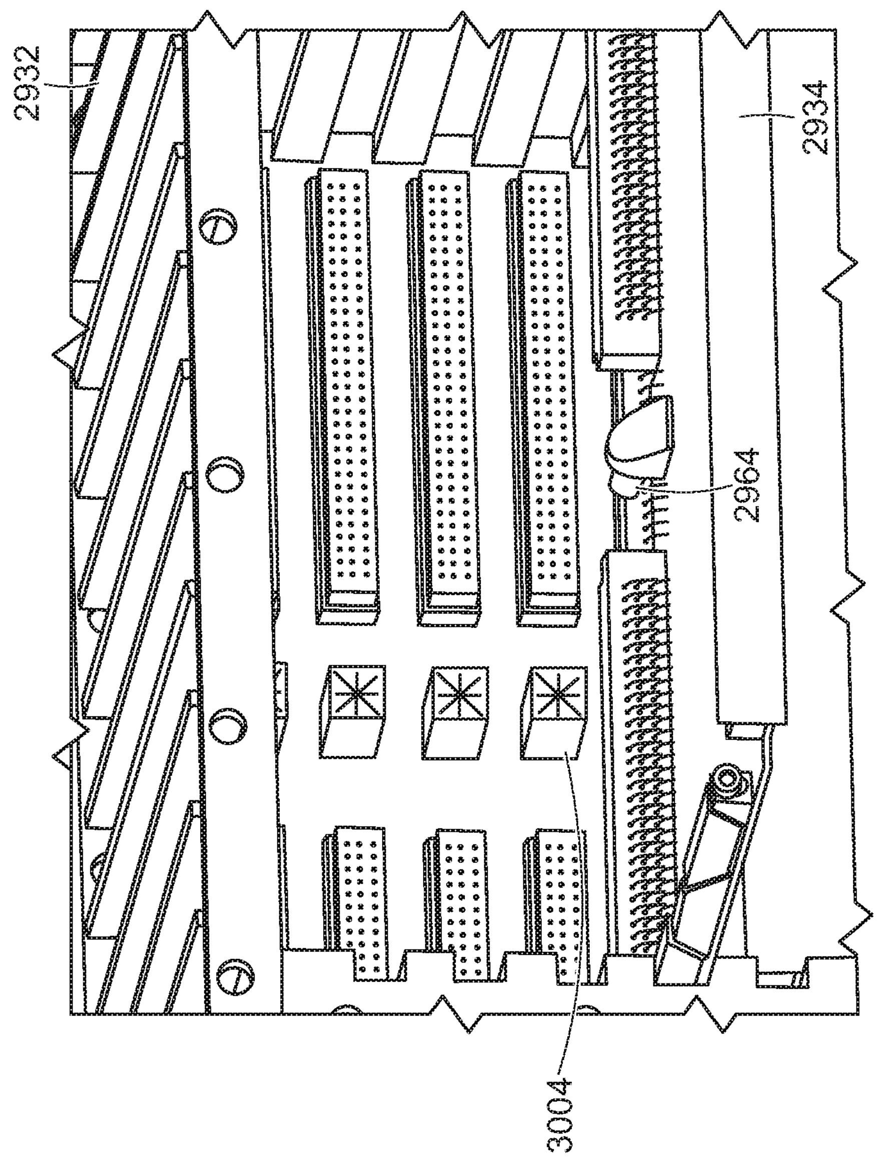

Another embodiment, shown in FIG. 266 through FIG. 268, includes fibers coming from the UDAT connector 2914 through a boot breakout 2992 through flexible tubes 2994 to backplane connectors 2998 which interface to circuit board 2934 mounted connectors 2964. A protective boot self-closing 3004 could be added for protection of optical elements.

Figure 269:
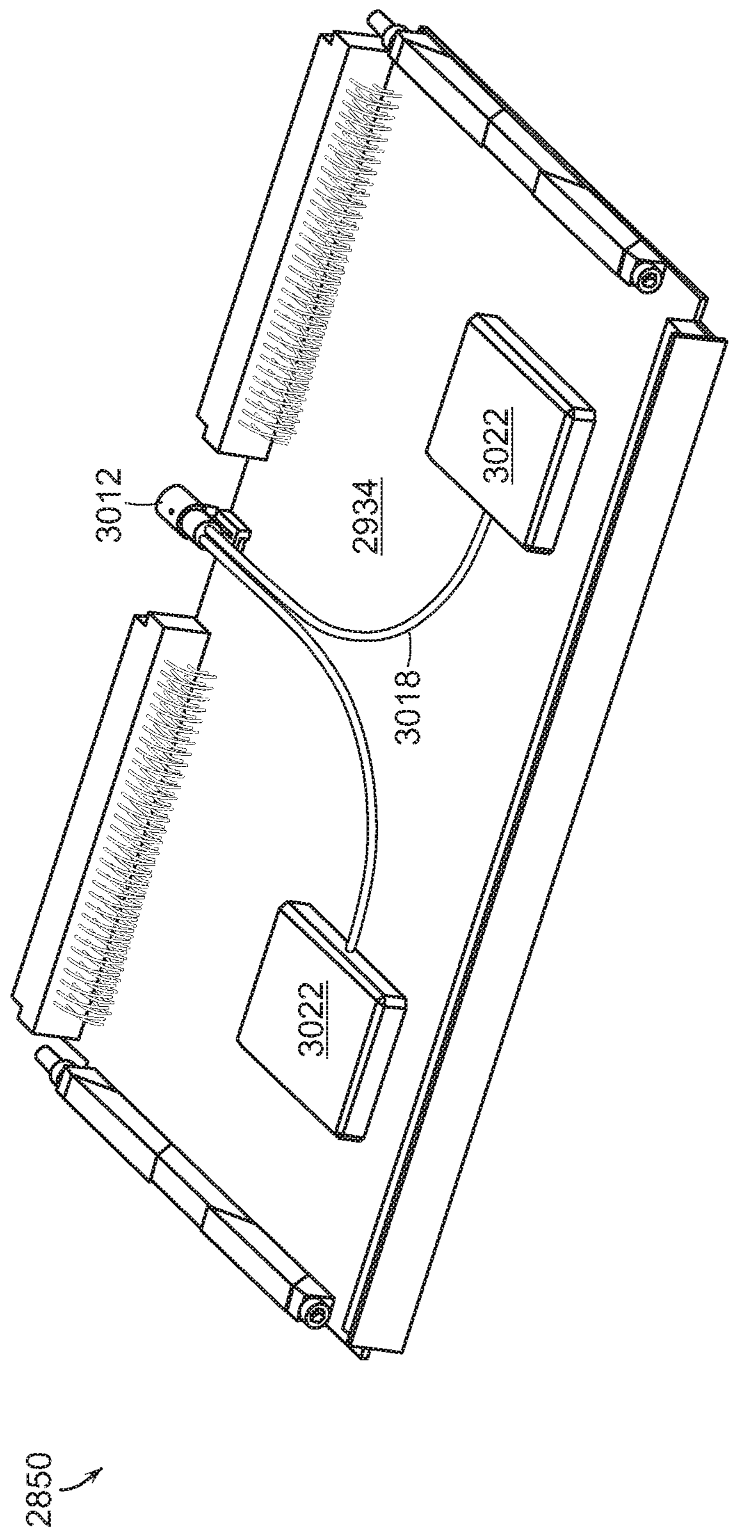

In other embodiments the optical fibers are first connected to the backplane as above, and then are optically interfaced to optical fibers or waveguides located on the circuit boards 2934. Once on optical signals are on the boards 2934, the fibers or waveguides can be used in any way to route them, including being pigtailed to devices or interfaced on the board using FABIs, etc, FIG. 269 shows one of many ways the fibers on the backplane can be coupled to the modules 3022 on the circuit boards 2934. This embodiment uses tubes 3018 to carry multiples of fibers each. The tubes 3018 carry the fibers that exit from the B-UDAT 3012, and these fibers can be arranged in a single or in multiple tubes. The tubes 3018 shown in FIG. 269 are built in to the board modules, but may be connectorized in other embodiments as shown below. These tubes 3018 can be clamped down the board 2934 if required. Some tube versions are non-metallic and others are flexible (for example but not limited to spiral) metal, often over coated with a rubberized or other polymer coating.

Figure 270:
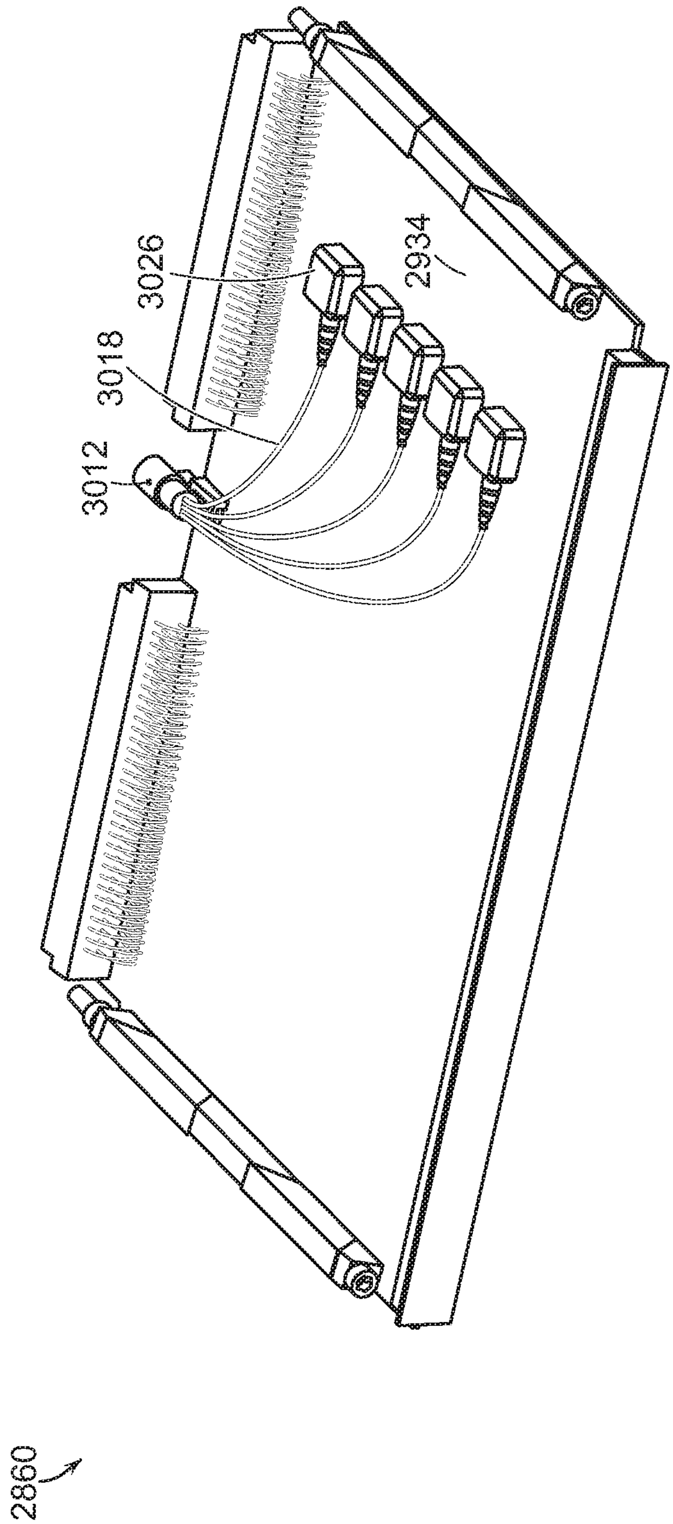

FIG. 270 shows another embodiment similar to that of FIG. 269, with more, smaller devices 3026. The tubes 3018 can be hard-wired to devices 3026 as shown previously or connectorized as shown.

Figure 271:
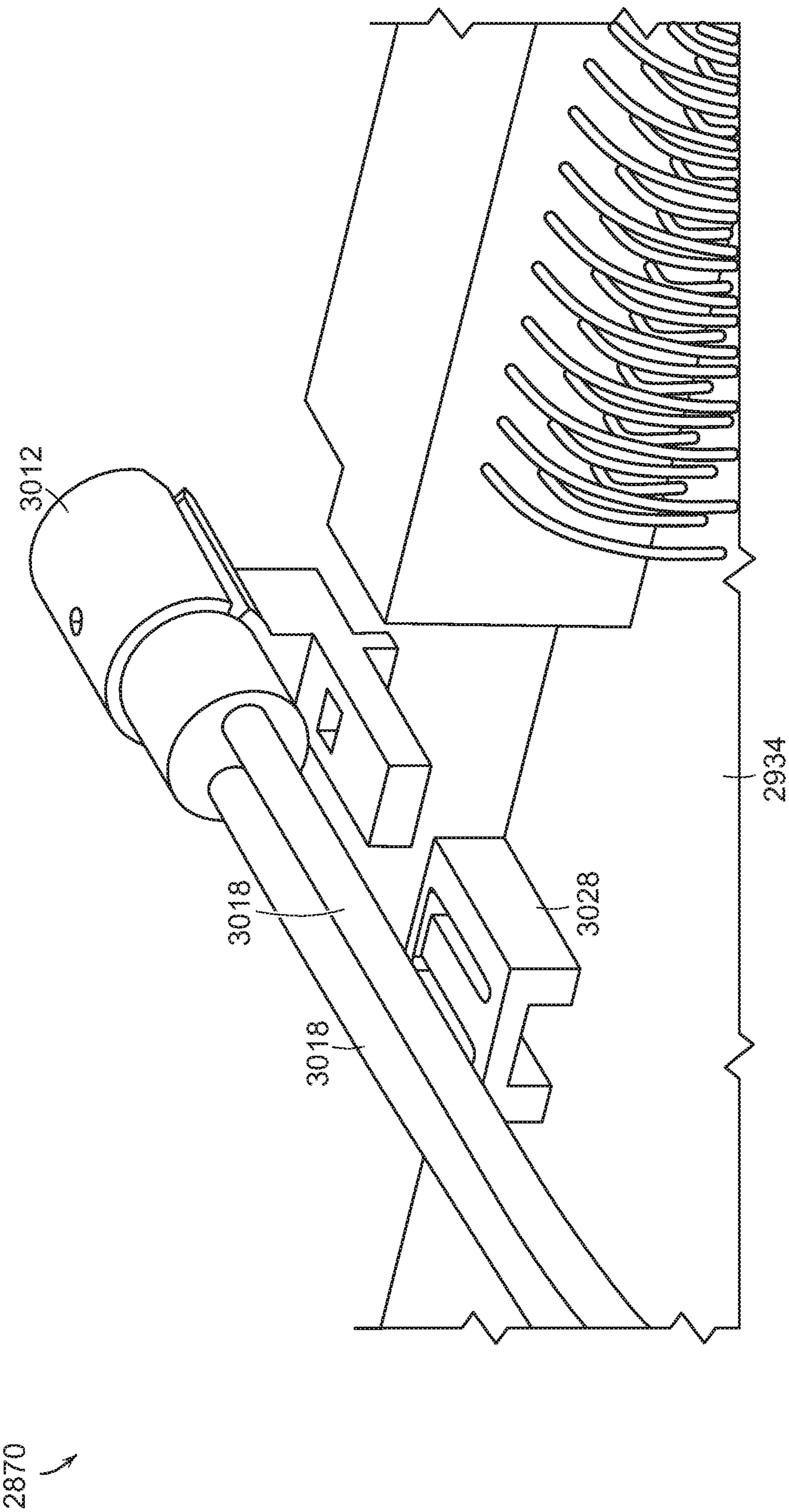

FIG. 271 shows a close-up view of the removable B-UDAT connector system 2870. This embodiment includes the connector 3012, removeable board mount 3028 mounted to the circuit board 2934, and the tubes 3018. This feature facilitates board population and repairs. This removable feature can be accomplished both with end-on insertion as shown in FIG. 271 or with a vertical snap-on format.

Figure 272:
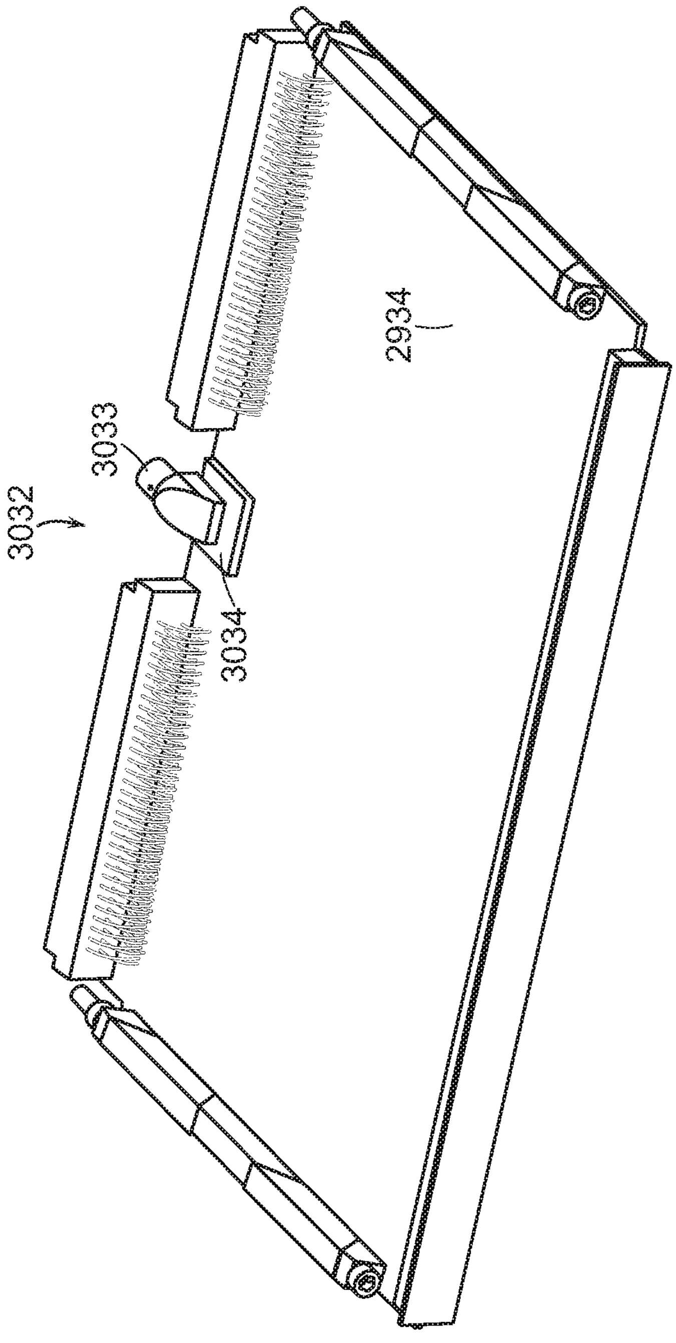

In many applications it is important to couple the fiber input and output all the way to optoelectronic die on circuit boards 2934 in the box 2932, but the optoelectronic die can be located near the edge of the circuit board 2934. For this case, the B-UDAT FABI Interface 3032 can be used, as illustrated in FIG. 272. In this embodiment, the B-UDAT connector includes a right angle infinite conjugate imager 3033 (or in-line infinite conjugate imager with a mirror) and couples the light from the fibers connected to the backplane to the optoelectronic die 3034 located in the base of the B-UDAT FABI interface 3032. In this case no on-board fiber management is required, and electrical signals are brought to the optoelectronic die 3034, for example, through board traces. In other embodiments, fibers and/or waveguides embedded in the boards are used to distribute signals to and/or from the B-UDAT FABI module.

Figure 273:
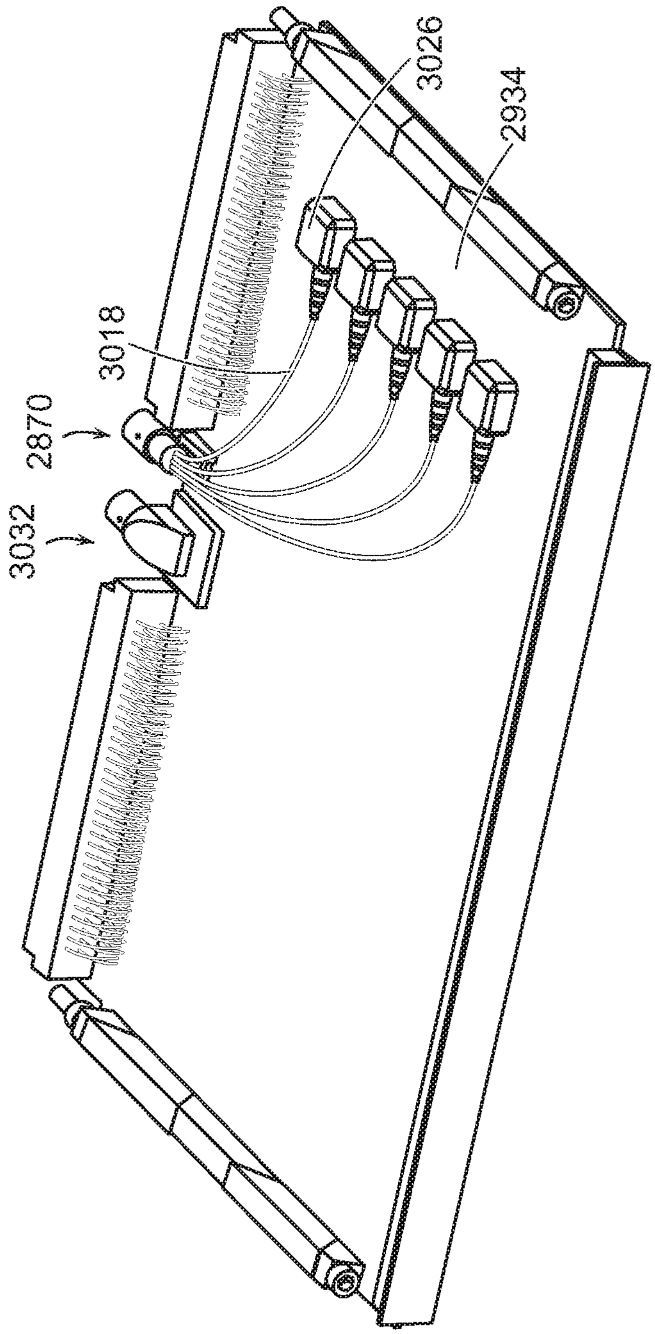

Another feature of these technologies is shown in FIG. 273, where multiple B-UDAT connectors of different types can be used together. FIG. 273 shows two universal B-UDAT connectors that are used simultaneously for different applications. The connector on the left is a B-UDAT FABI interface 3032, where the optical fibers input on the backplane are coupled to optoelectronic die on the removable circuit board. Thus, VCSELs and detectors can be on-board and directly couple to fibers that exit the box. The neighboring connector is a removeable B-UDAT connector system 2870 which connects to fibers in tubes 3018 to other devices or modules 3026 on the circuit board 2934, as shown earlier.

Figure 274:
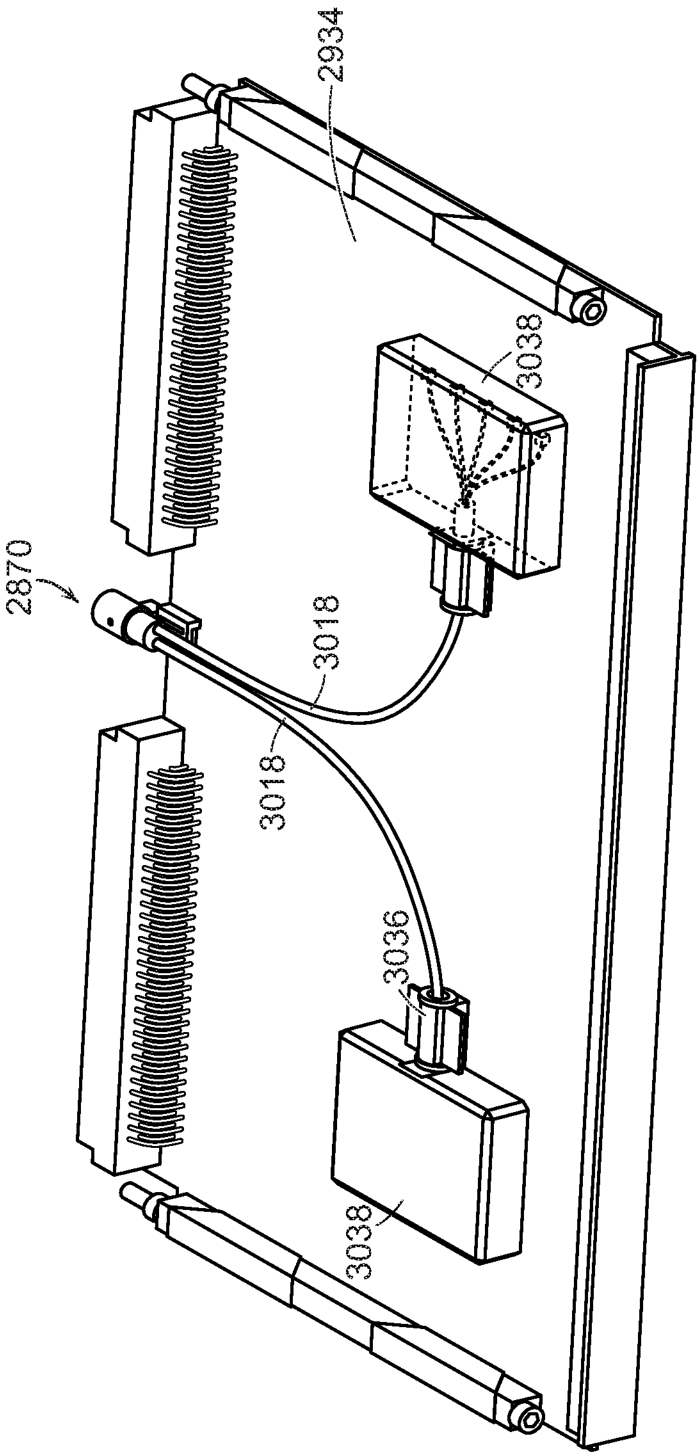

The embodiment in FIG. 274 includes a removeable B-UDAT connector system 2870 coupled to a snap-on S-UDAT connector 3036 to connect the fibers to the modules 3038 on the circuit board 2934. This is particularly valuable for complex internally fiber-pigtailed modules as shown. A hermetic module is shown figuratively at right on the board, with a transparent housing for clarity.

Figure 275:
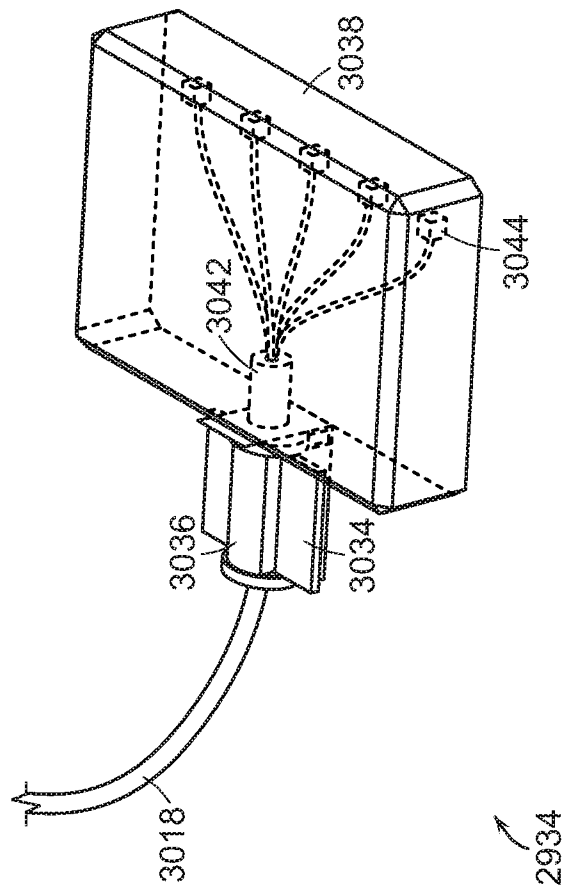

A close-up of this hermetic module 3038 is shown in FIG. 275. The S-UDAT connector 3036 is inserted vertically against the (transparent) hermetic module wall. There are infinite conjugate imagers both in the S-UDAT 3036 and the module 3038 with the ODP imaging system described earlier. This allows the S-UDAT 3036 to connect to the hermetic package through a sealed sapphire window, for example. Within the modules, the fibers can be branched out to individual components 3044, for example.

Figure 276:
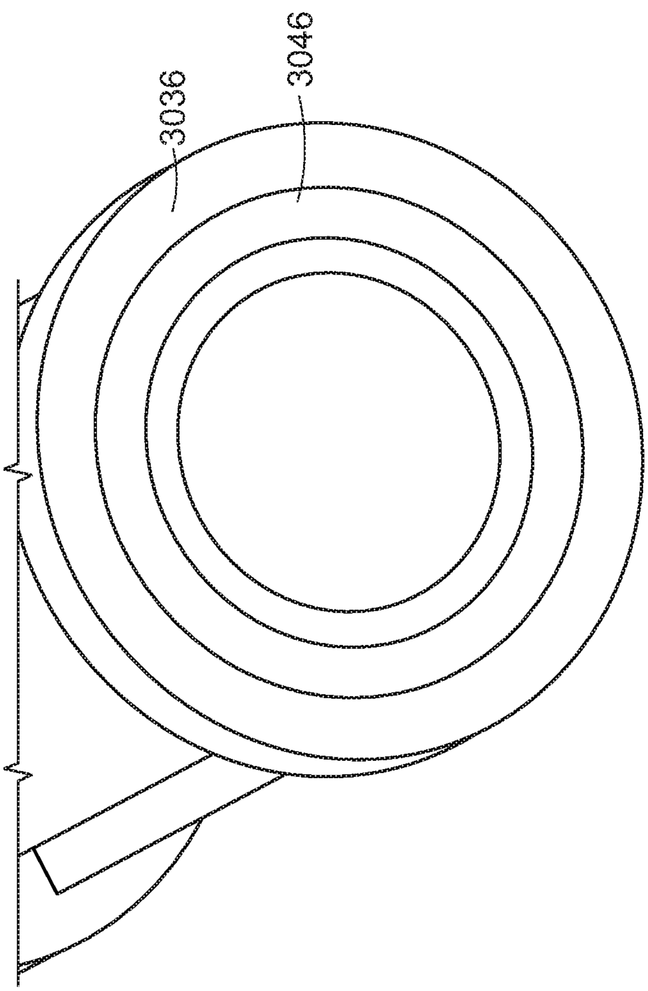
Figure 277:
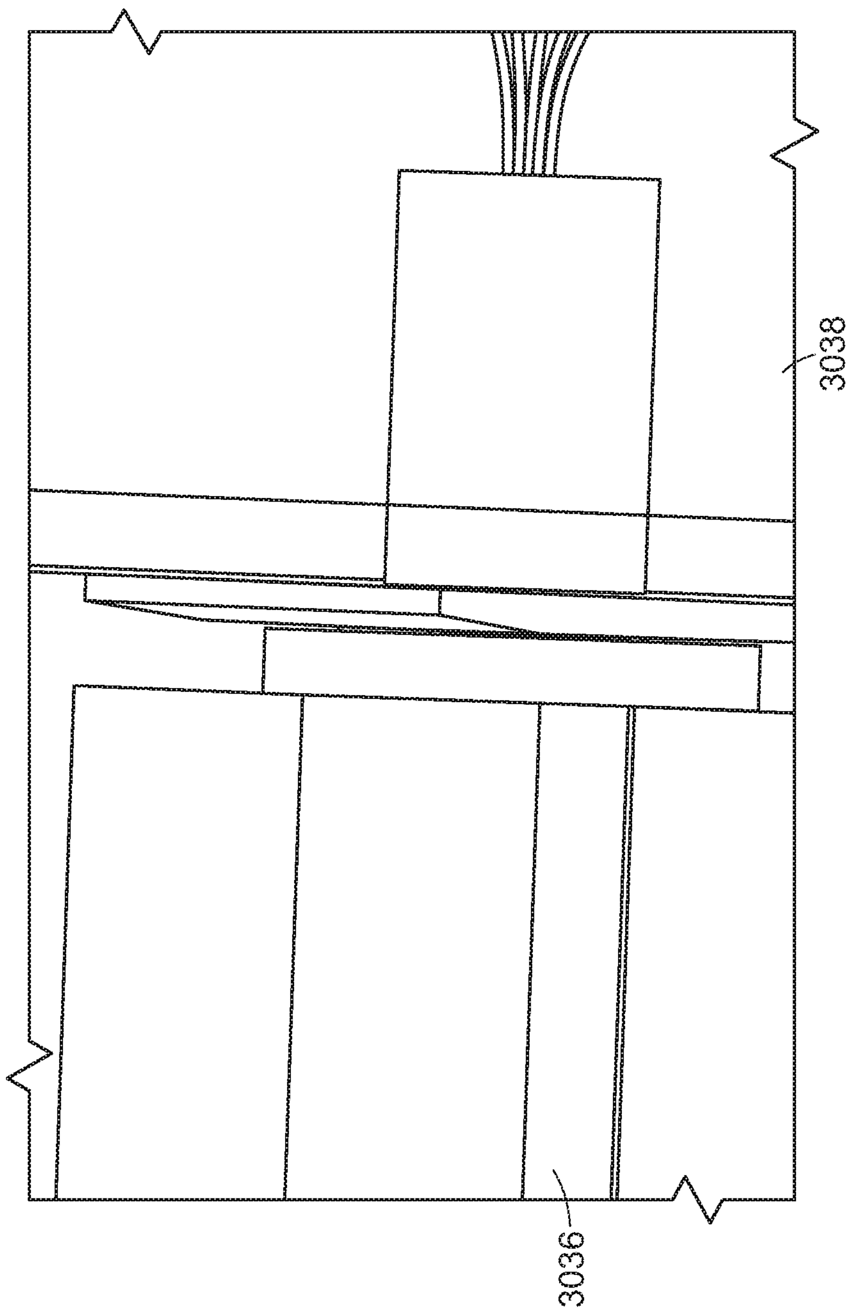

The S-UDAT connector 3036 can include a gasket 3046 such as, but not limited to, an o-ring on the end face to further environmentally seal the connection. One such type of gasket configuration is shown in FIG. 276. A close-up view of the gasketed interface between the S-UDAT connector 3036 and the hermetic module 3038 is shown in FIG. 277.

Figure 278:
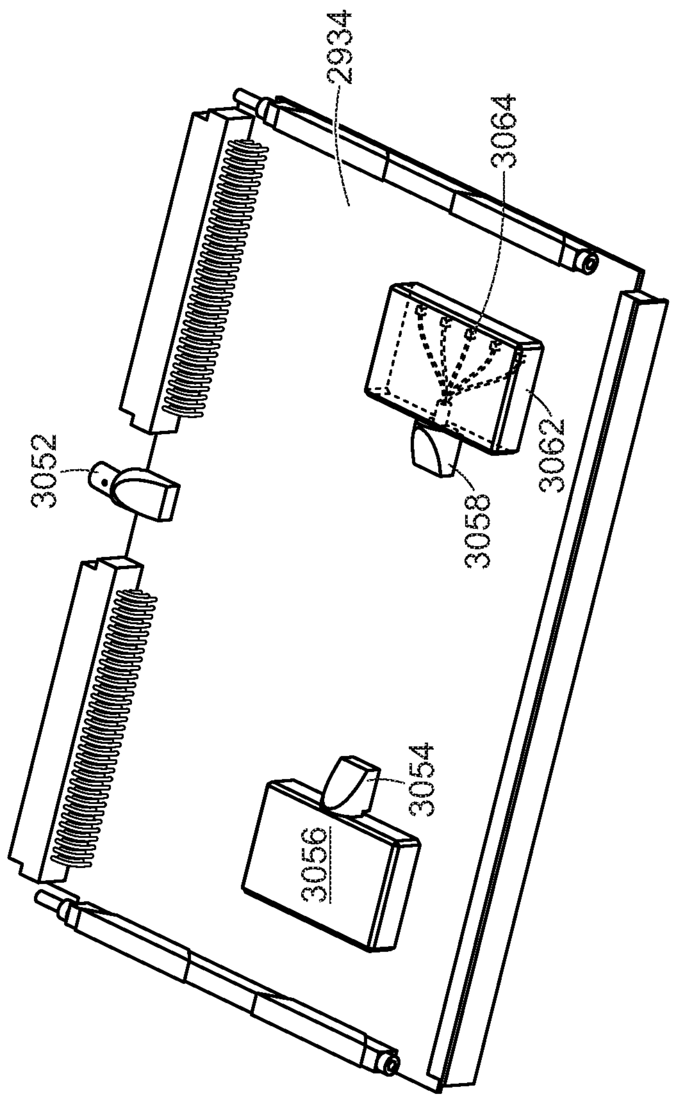

Another embodiment for circuit board 2934-level fiber management is the B-UDAT to embedded waveguide (or optical fiber) interface shown in FIG. 278. Here the B-UDAT connector 3052 couples the light between the fibers connected to the backplane and fibers or waveguides (e.g., planar waveguides) that are on or embedded in the circuit board 2934 This optical coupling can be accomplished with in-line infinite conjugate imager typical configurations or perhaps more compactly using typical right angle infinite conjugate imagers 3054, (or in-line infinite conjugate imager with a mirror) to couple into coupled fibers or waveguides. These embedded waveguides can interface to the other modules 3056 using pigtailing, conventional technologies, or can make use of compatible FABI connectors or interfaces.

Figure 279:
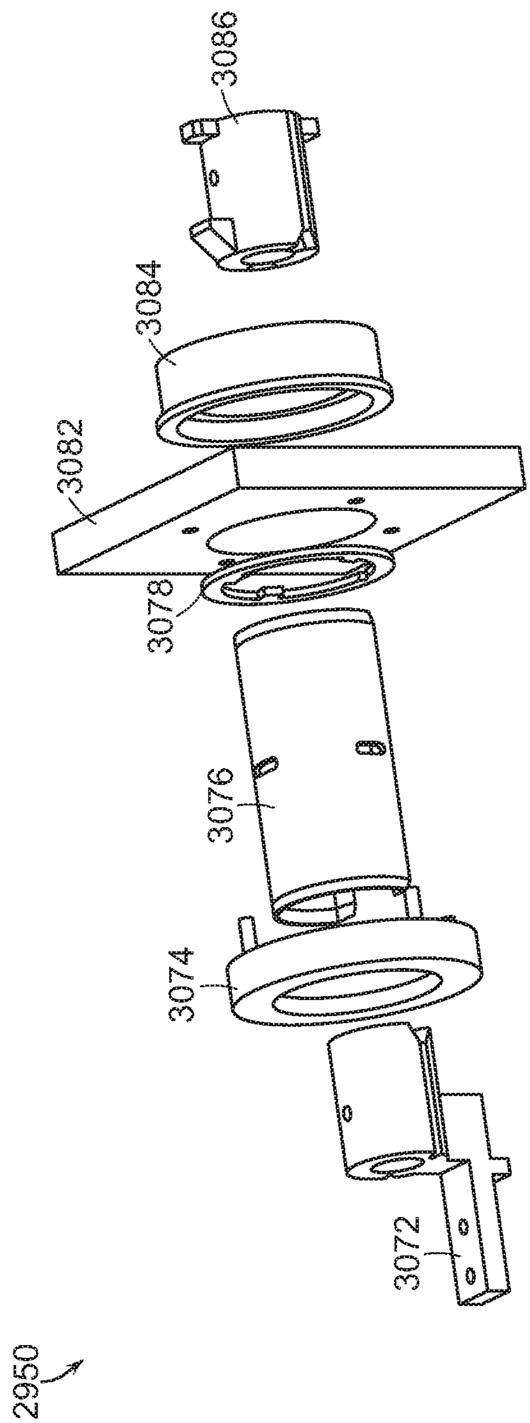

One embodiment of a means to connect optical fibers from the backplane to optical fibers or other devices on the removable circuit boards 2934 in the box 2932 is illustrated in FIG. 279. The system includes a circuit board mount housing 3072, captive housing 3074, connector rail 3076, clip 3078, flexible boot 3084 and backplane housing 3086. The backplane 3082 is a small representation of a section of a real backplane.

The universal B-UDAT connector system 2950 is shown in FIG. 279. The connector rail aligns the two housings in axial rotation, tip, and tilt while also providing the clamping force and stiffness required to resist relative movement of the ferrules due to vibrations. The connectors 3072 and 3086 are shown at far right and left in FIG. 279. Each of these components contains a typical infinite conjugate imager as described earlier. The backplane housing 3086 couples light to and from the fibers on the rear of the backplane, and the circuit board mount housing 3072 couples the light to and from devices on the board. The connector rail 3076 is mounted on the backplane 3082 using the clip 3078 that snaps into the holes shown in the center of the connector rail 3076. This is compliantly fixed to the backplane 3082 using the flexible boot 3084 and captive housing 3074 at left of the connector rail 3076. The circuit board housing 3072 and backplane housing 3086 are accepted into the connector rail 3076 by means of bevels on the alignment grooves at the ends of the housings and by bevels on the connector rail alignment lips. Upon contact of a housing with the rail, the flexible boot 3084 stretches to allow the clip 3078 to hit the backstop or the backplane 3082 and thus provide a rigid stop. The connector rail 3076 then expands to accept, align, and clamp the said housing.

Figure 280:
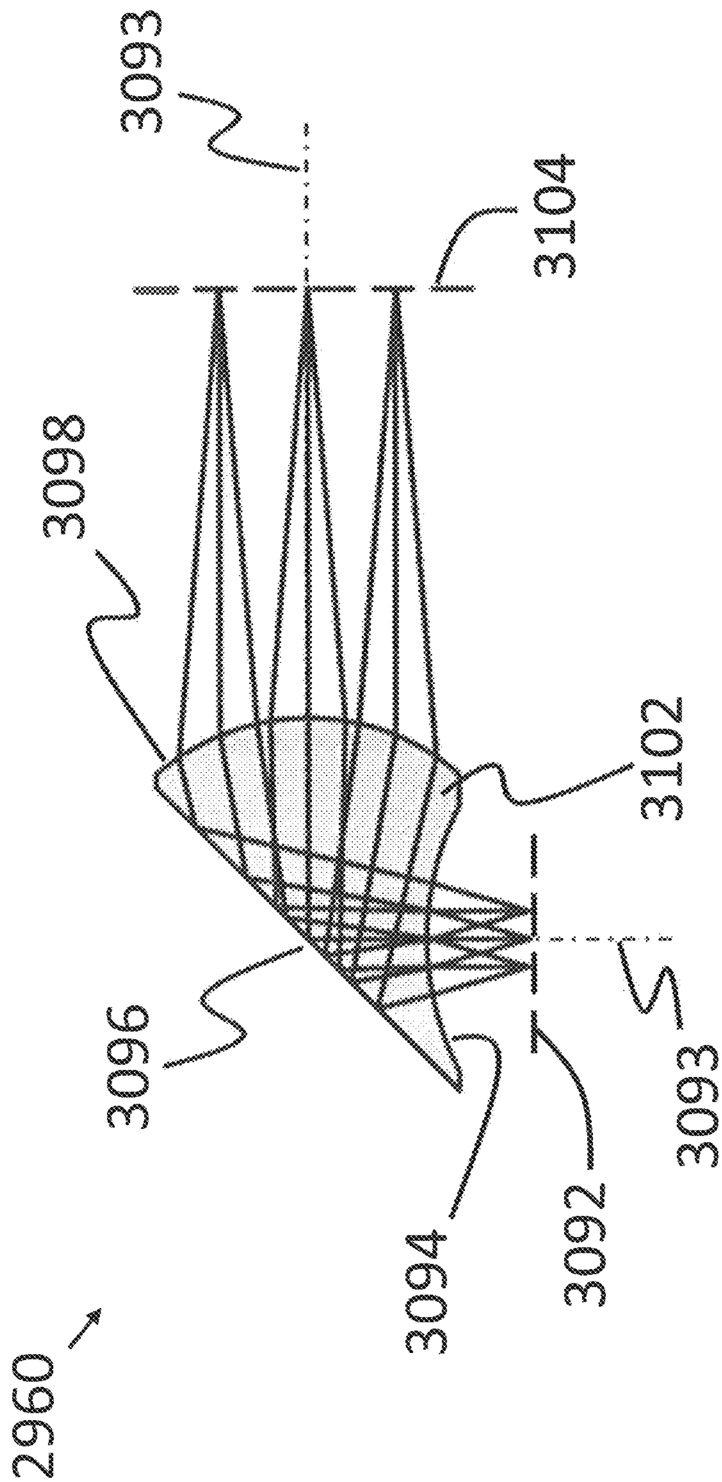

In some applications, it is advantageous to have a right angle optical collimator due to, for example, the tight confines in the backplane region of avionic electronic boxes. Further, an optical collimator with a substantially long distance between the image plane and the pupil is useful for practical board-to-backplane distances as well as to keep connector components from riding too close to the board edges in such systems. Reference is made to FIG. 280, which is an embodiment of an optical collimator 2960, taken along its optical axis 3093. Light emitted or reflected by a source located at an object plane 3092 is incident on an optical element 3102, in this embodiment made up of but not limited to, refractive surfaces 3094 and 3098 and reflective surface 3096, which is optically disposed between the object plane 3092 and an exit pupil 3104, and is capable of substantially receiving a portion of the light emanating from the object plane 3092 and capable of substantially collimating the light at the exit pupil 3104. Light is incident on the refractive surface 3094, which is capable of substantially receiving a portion of the light emanating from the object plane 3092. The light is then reflected by the reflective surface 3096 and re-directed substantially towards the refractive surface 3098, where it is refracted and propagated to the exit pupil 3104, which is optically disposed a substantial distance from the optical element 3102 such that the exit pupil 3104 is imaged substantially to infinity by the optical element 3102, making the imaging optical system substantially telecentric at the object plane 3092.

Figure 281:
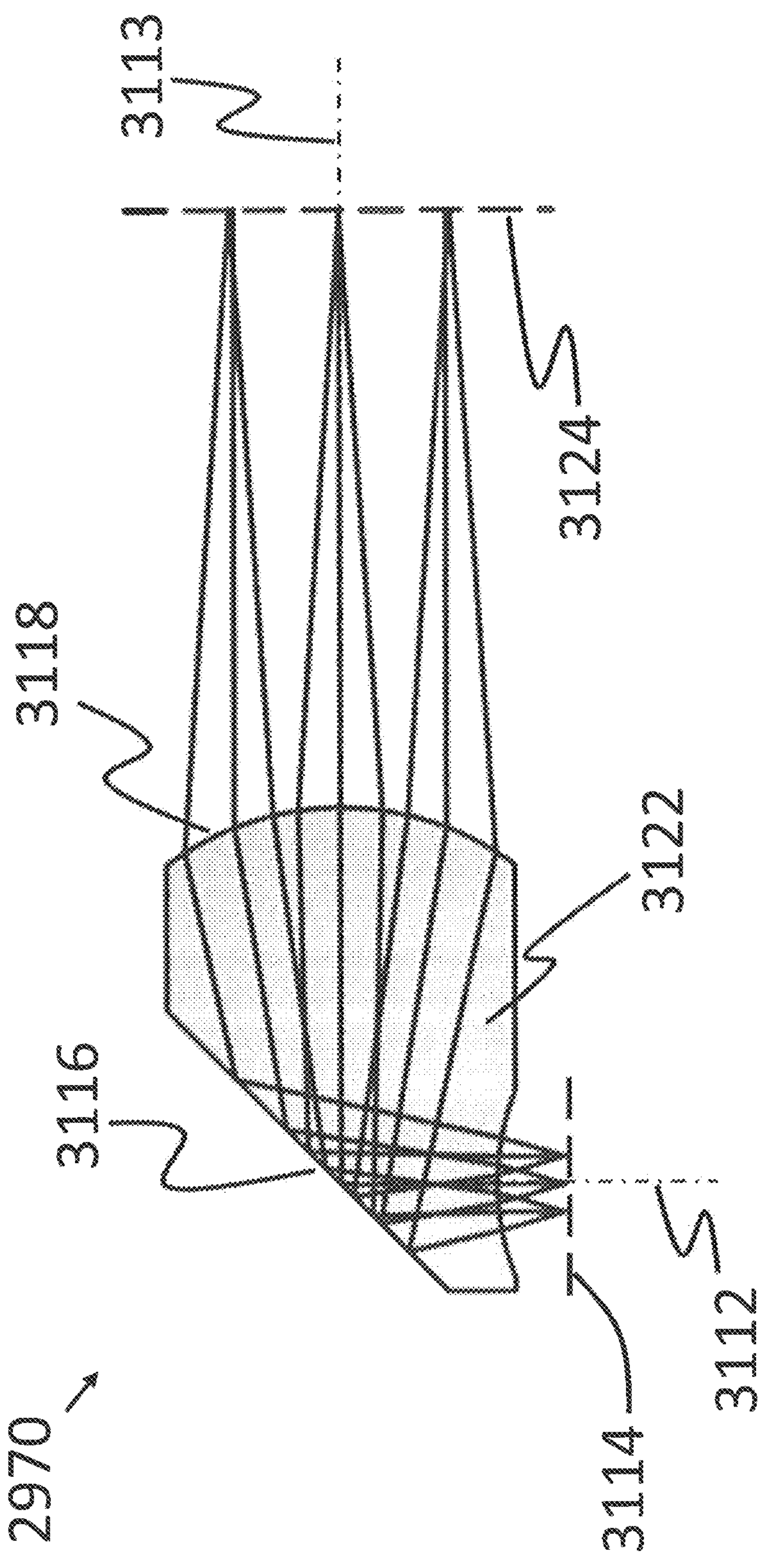

Reference is made to FIG. 281, which is another embodiment of an optical collimator 2970, taken along its optical axis 3113. Light emitted or reflected by a source located at an object plane 3112 is incident on an optical element 3122, in this embodiment made up of but not limited to, refractive surfaces 3114 and 3118 and reflective surface 3116, which is optically disposed between the object plane 3112 and an exit pupil 3124, and is capable of substantially receiving a portion of the light emanating from the object plane 3112 and capable of substantially collimating the light at the exit pupil 3124. Light is incident on the refractive surface 3114, which is capable of substantially receiving a portion of the light emanating from the object plane 3112. The light is then reflected by the reflective surface 3116 and re-directed substantially towards the refractive surface 3118, where it is refracted and propagated to the exit pupil 3124, which is optically disposed a substantial distance from the optical element 3122 such that the exit pupil 3124 is imaged substantially to infinity by the optical element 3122, making the imaging optical system substantially telecentric at the object plane 3112.

The embodiments of the optical collimators 2960 and 2970 illustrated in FIG. 280 and FIG. 281 respectively are both single elements that lend themselves readily to moldable optics and have large pupil distances to facilitate a long separation distance and are telecentric in image space to provide good fiber coupling efficiency. These imagers have excellent performance, superior to that of the GRIN rod lens.

Figure 282:
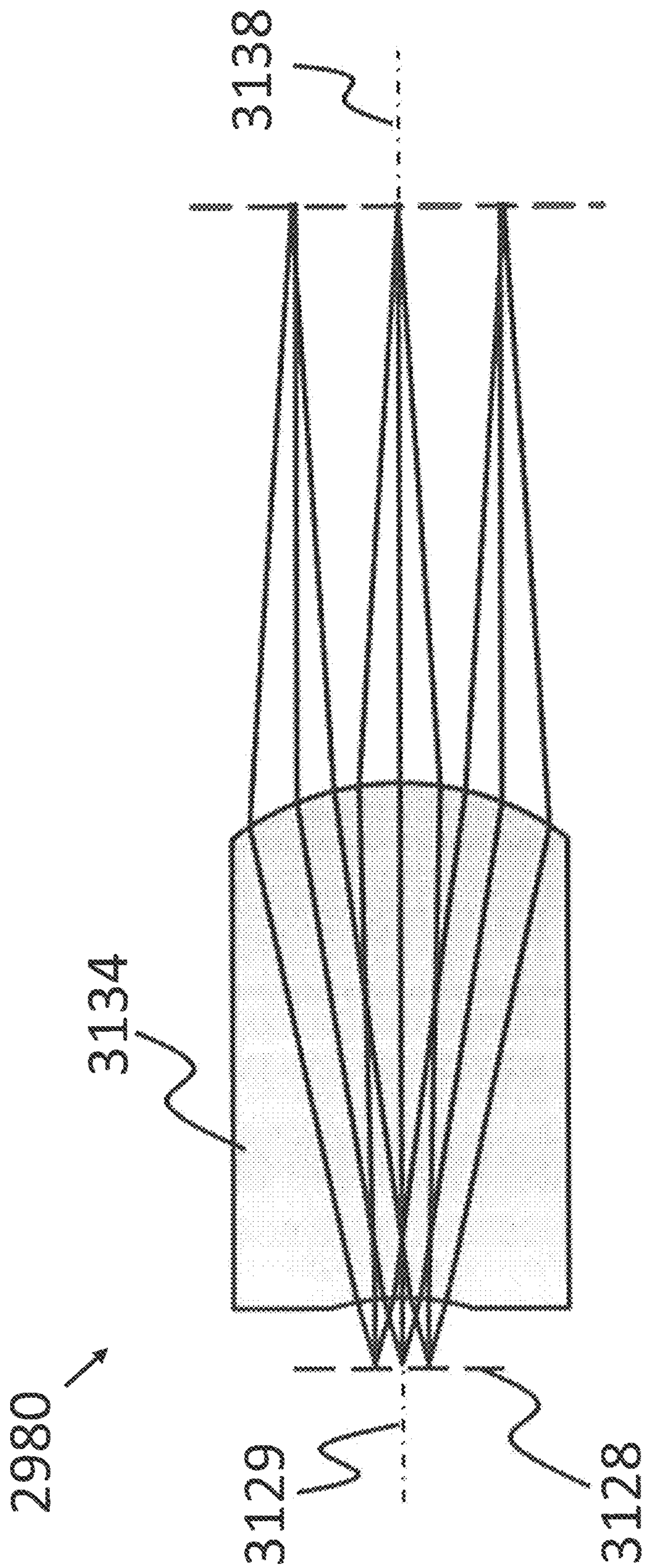

Reference is made to FIG. 282, which is yet another embodiment of an optical collimator 2980, taken along its optical axis 3129. Light emitted or reflected by a source located at an object plane 3128 is incident on a refractive optical element 3134, which is optically disposed between the object plane 3128 and an exit pupil 3138, and is capable of substantially receiving a portion of the light emanating from the object plane 3128 and capable of substantially collimating the light at the exit pupil 3138, which is optically disposed a substantial distance from the optical element 3134 such that the exit pupil 3138 is imaged substantially to infinity by the optical element 3134, making the imaging optical system substantially telecentric at the object plane 3128.

Figure 283:
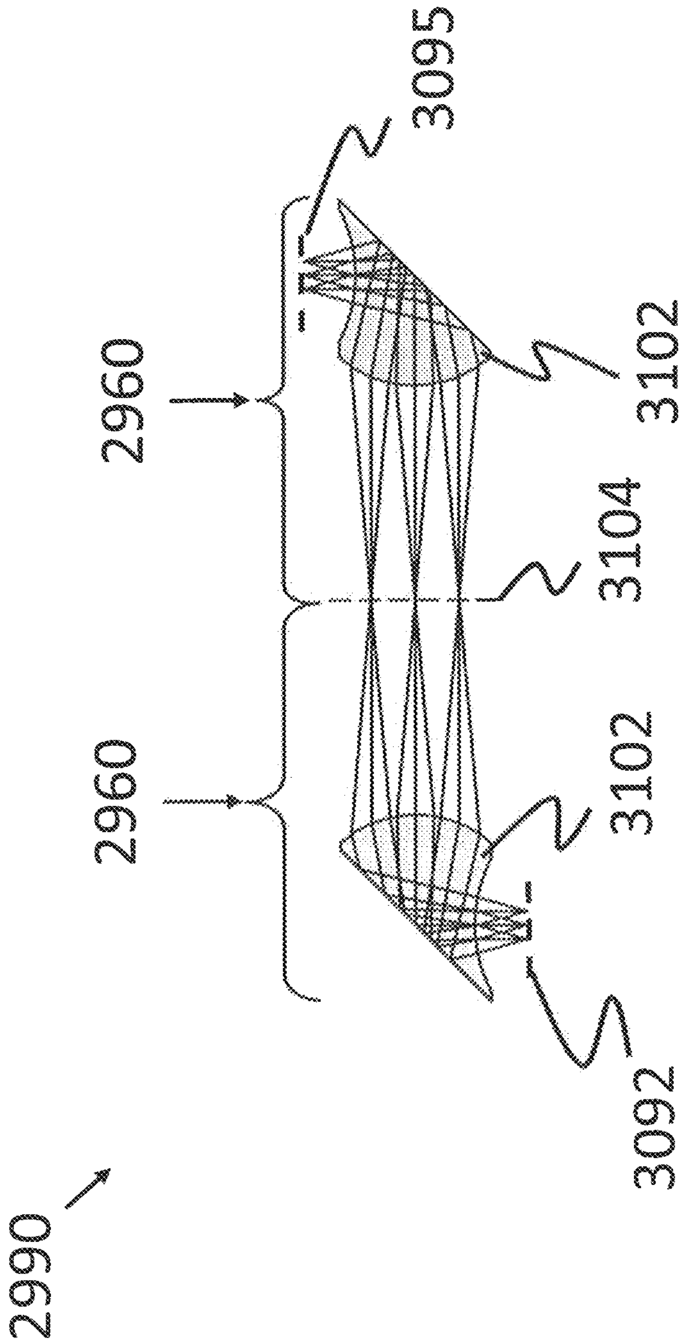

The embodiments of the optical collimators 2960, 2970, and 2980 illustrated in FIG. 280, FIG. 281, and FIG. 282 respectively can be combined in any number of configurations to create further embodiments of optical imaging systems that are capable of substantially reimaging light emanating from an object array to a detecting element. Reference is made to FIG. 283, which is an embodiment of an optical relay system 2990, where two of the embodiments of the optical collimator 2960 illustrated in FIG. 280 are optically disposed relative to each other such that their pupils 3104 are substantially collocated with each other. Light emitted or reflected by a source located at the object plane 3092, is incident on a first optical element 3102, which is optically disposed between the object plane 3092 and a pupil 3104, and is capable of substantially receiving a portion of the light emanating from the object plane 3092 and substantially collimating the light at the pupil 3104.

Light is then incident on a second optical element 3102, which is optically disposed between the pupil 3104 and a detecting element 3095, and is capable of substantially receiving a portion of the light emanating from the pupil 3104 and substantially focusing the light at the detector 3095.

Figure 284:
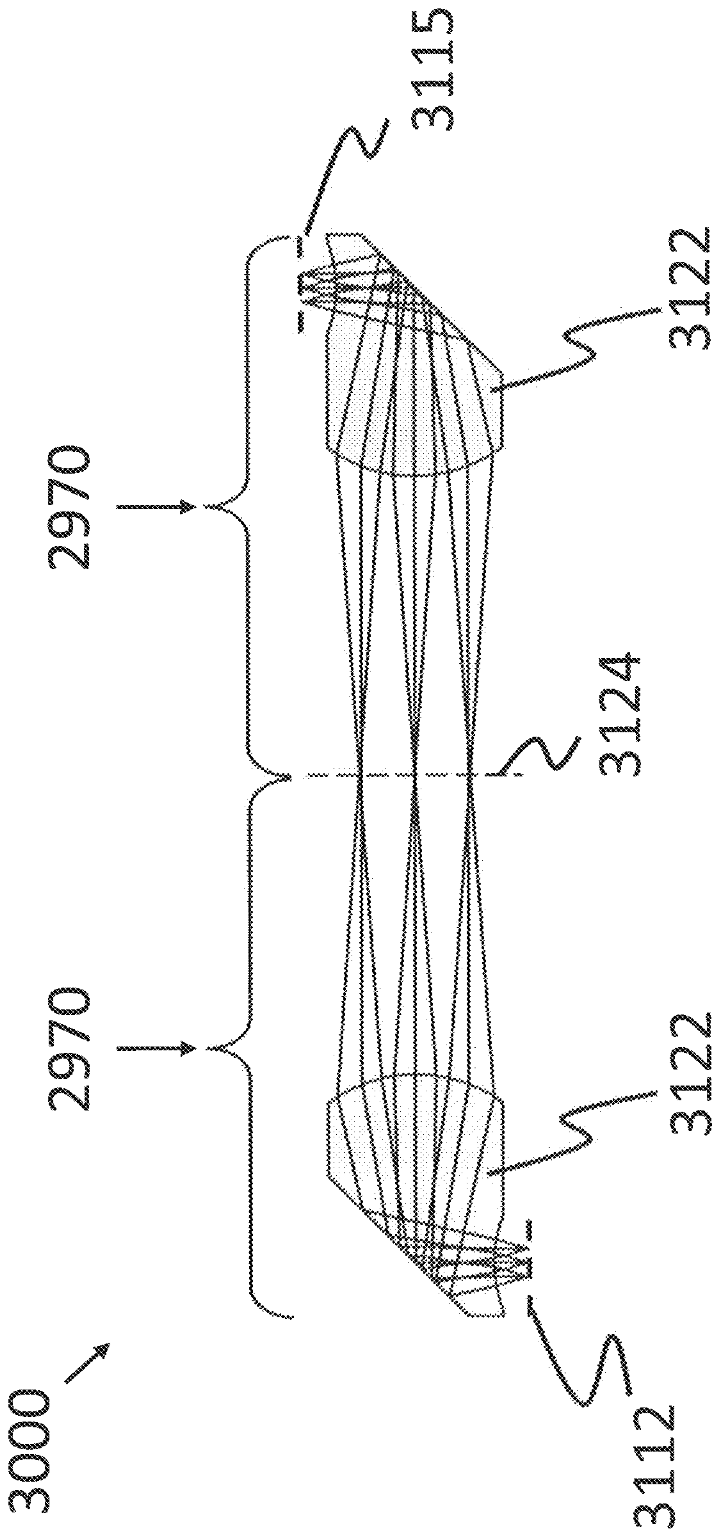

Reference is made to FIG. 284, which is an embodiment of an optical relay system 3000, where two of the embodiments of the optical collimator 2970 illustrated in FIG. 281 are optically disposed relative to each other such that their pupils 3124 are substantially collocated with each other. Light emitted or reflected by a source located at the object plane 3112, is incident on a first optical element 3122, which is optically disposed between the object plane 3112 and a pupil 3124, and is capable of substantially receiving a portion of the light emanating from the object plane 3112 and substantially collimating the light at the pupil 3124. Light is then incident on a second optical element 3122, which is optically disposed between the pupil 3124 and a detecting element 3115, and is capable of substantially receiving a portion of the light emanating from the pupil 3124 and substantially focusing the light at the detector 3115.

Figure 285:
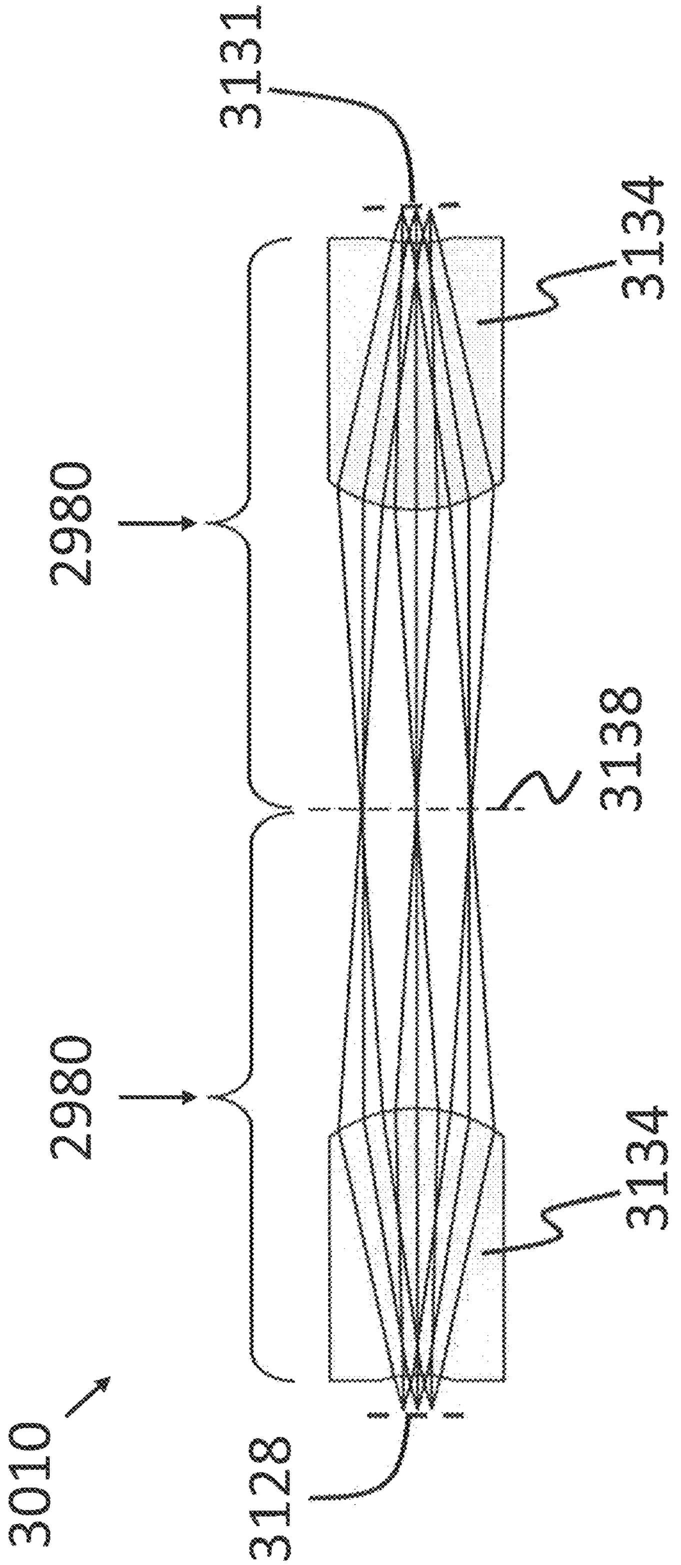

Reference is made to FIG. 285, which is an embodiment of an optical relay system 3010, where two of the embodiments of the optical collimator 2980 illustrated in FIG. 282 are optically disposed relative to each other such that their pupils 3138 are substantially collocated with each other. Light emitted or reflected by a source located at the object plane 3128, is incident on a first optical element 3134, which is optically disposed between the object plane 3128 and a pupil 3138, and is capable of substantially receiving a portion of the light emanating from the object plane 3128 and substantially collimating the light at the pupil 3138. Light is then incident on a second optical element 3134, which is optically disposed between the pupil 3138 and a detecting element 3131, and is capable of substantially receiving a portion of the light emanating from the pupil 3138 and substantially focusing the light at the detector 3131.

Figure 286:
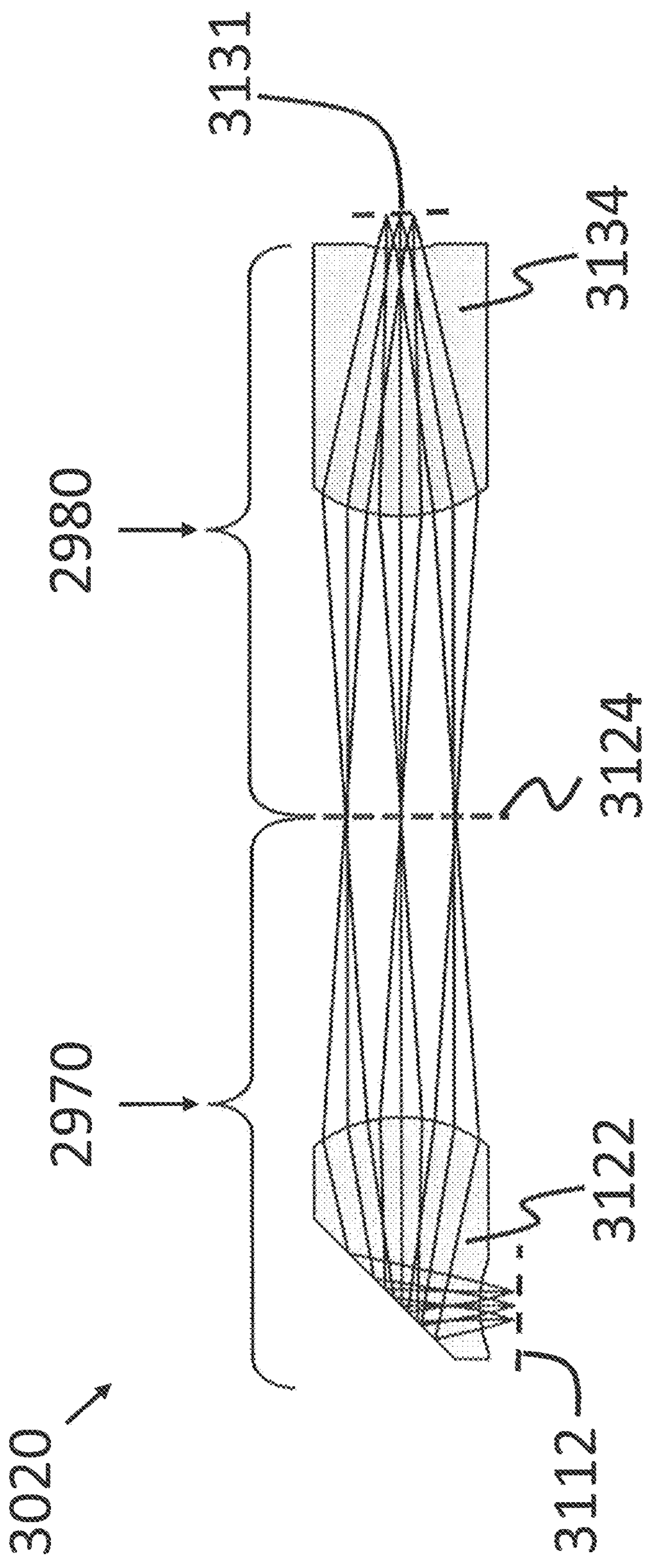

Reference is made to FIG. 286, which is an embodiment of an optical relay system 3020, where an embodiments of the optical collimator 2970 illustrated in FIG. 281 and an embodiment of the optical collimator 2980 illustrated in FIG. 282 are optically disposed relative to each other such that their pupils 3213 and 3138 respectively are substantially collocated with each other. Light emitted or reflected by a source located at the object plane 3112, is incident on a first optical element 3122, which is optically disposed between the object plane 3112 and a pupil 3124, and is capable of substantially receiving a portion of the light emanating from the object plane 3112 and substantially collimating the light at the pupil 3124. Light is then incident on a second optical element 3134, which is optically disposed between the pupil 3138 and a detecting element 3131, and is capable of substantially receiving a portion of the light emanating from the pupil 3138 and substantially focusing the light at the detector 3131.

Spring Alignment Clipspring Alignment Clip

Figure 287:
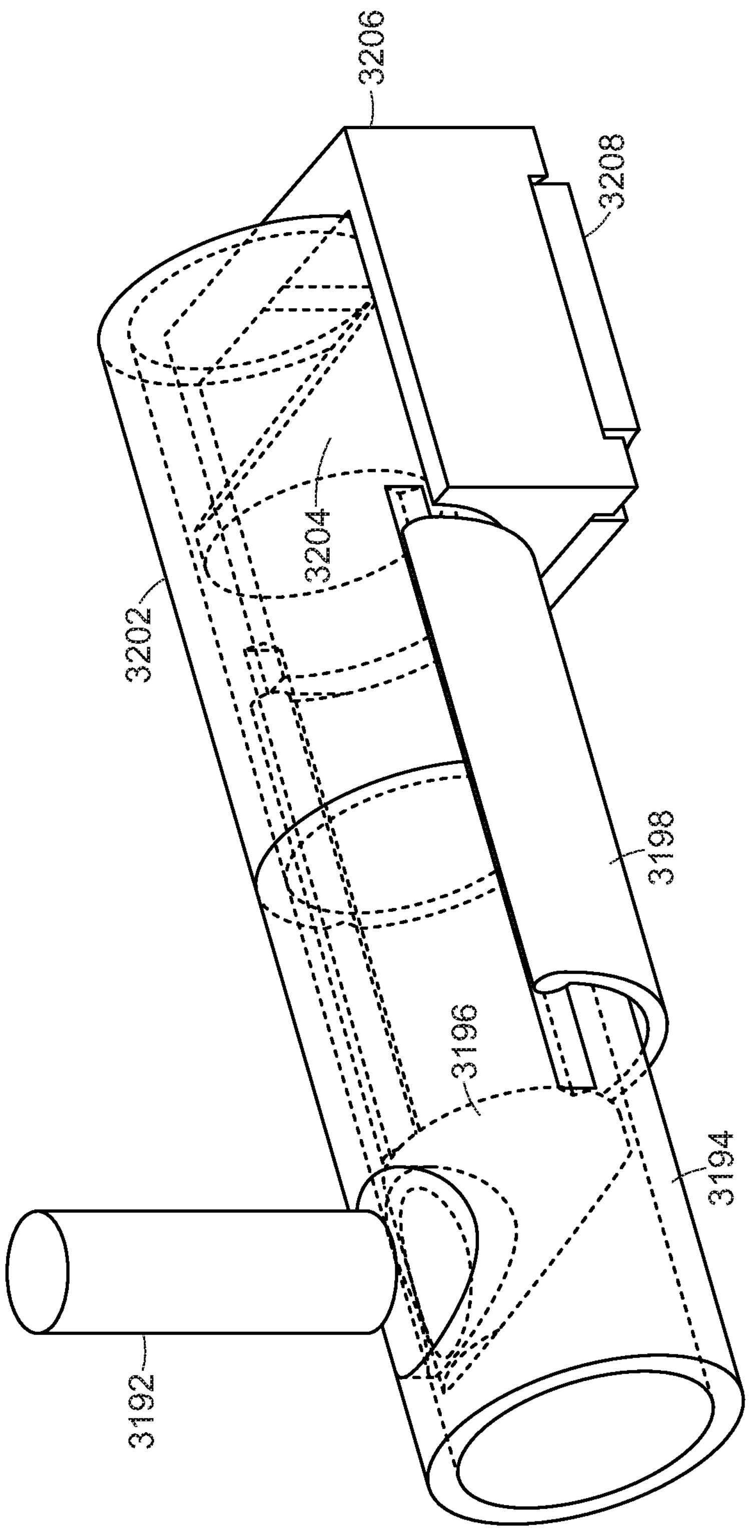
FIG. 287 shows an embodiment of the backplane UDAT connector system of these teachings.
Figure 288:
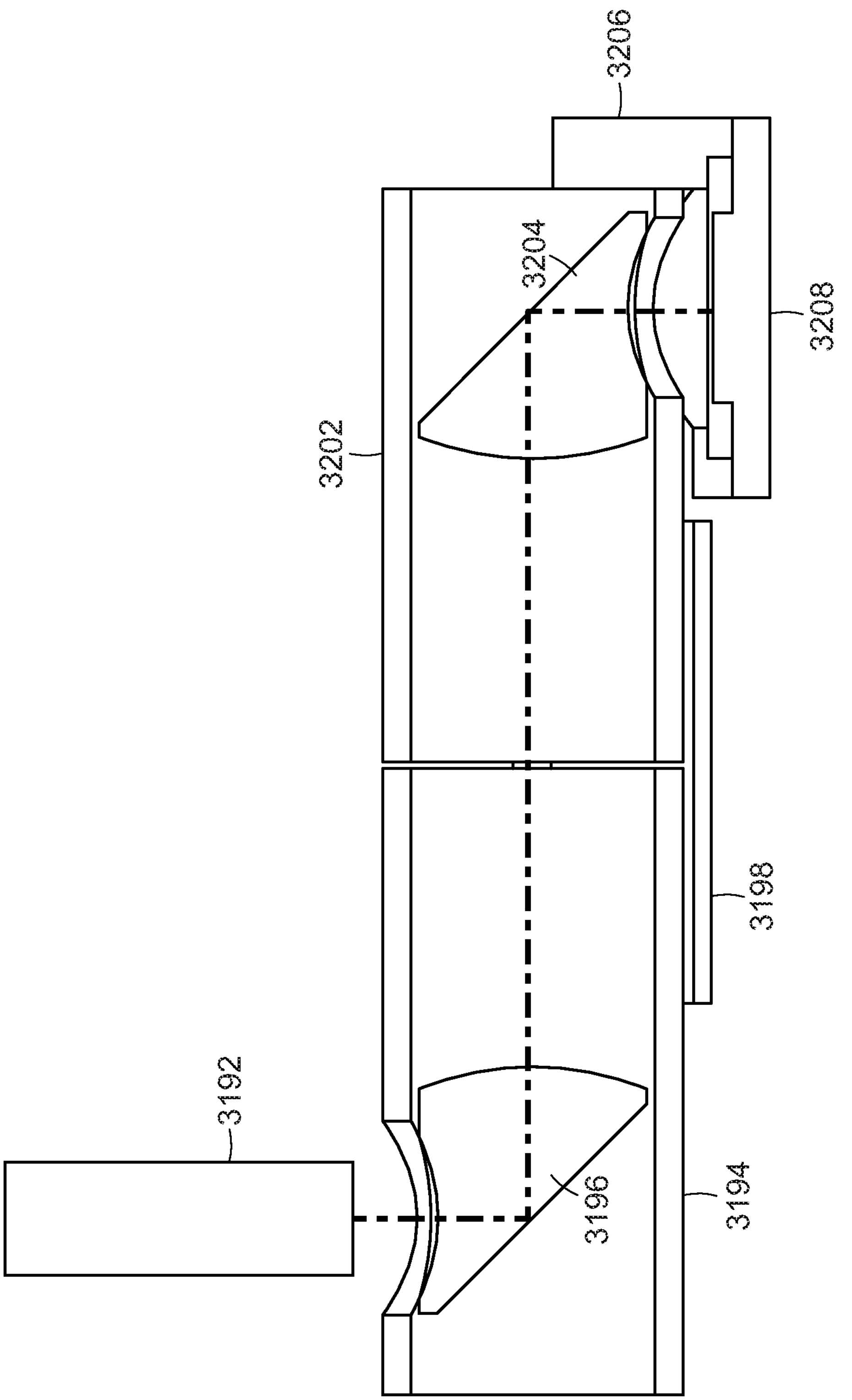
FIGS. 288-294 show embodiments of the optical collimators used in these teachings.

One embodiment of the right-angle B-UDAT connector that interconnects the backplane and the card-slot Circuit Card Assembly (CCA) uses a fiber-to-FABI overall concept. The fiber bundle 3192 is aligned to the right-angle imager 3196 in a backplane lens housing 3194 which is mounted on a compliant mount on the backplane. This backplane lens housing 3194 connects to a fixed housing 3202 which is rigidly mounted to the circuit card (not shown) using a spring alignment clip 3198. A second right-angle imager 3204 mates to a FABI 3208 in a FABI housing 3206. This design concept is illustrated in FIG. 287 and FIG. 288.

Figure 289:
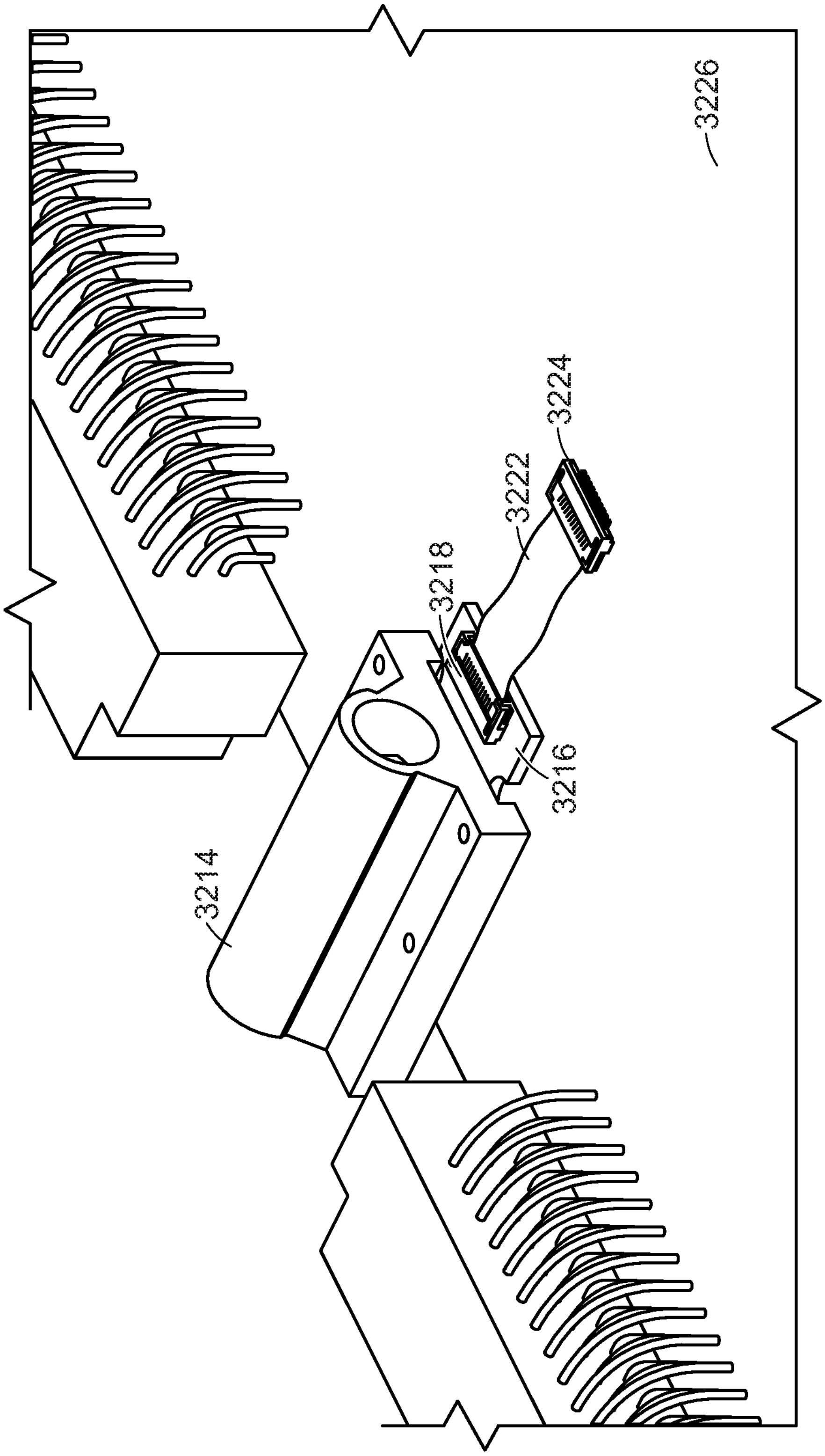

Another embodiment shown in FIG. 289 extends the interposer board 3216 on which the FABI 3208 is mounted beyond the fixed housing 3214 and has a Zero-Insertion-Force (ZIF) type Flexible Printed Cable (FPC) connector 3218 (or other similar connector). A similar connector 3224 would be mounted on the circuit card 3226. Electrical signals would be passed from the interposer board 3216 to the circuit card 3226 via a flexible printed cable 3222 or similar means.

Figure 290:
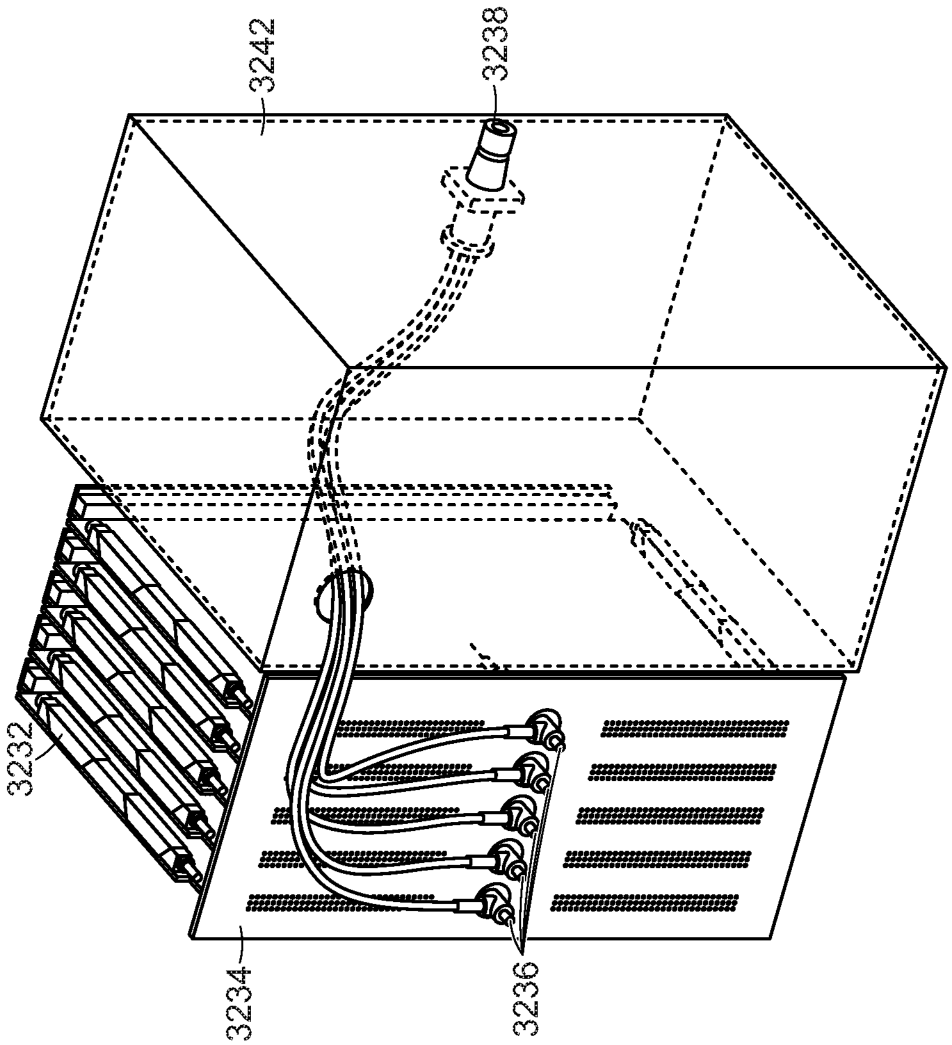
Figure 291:
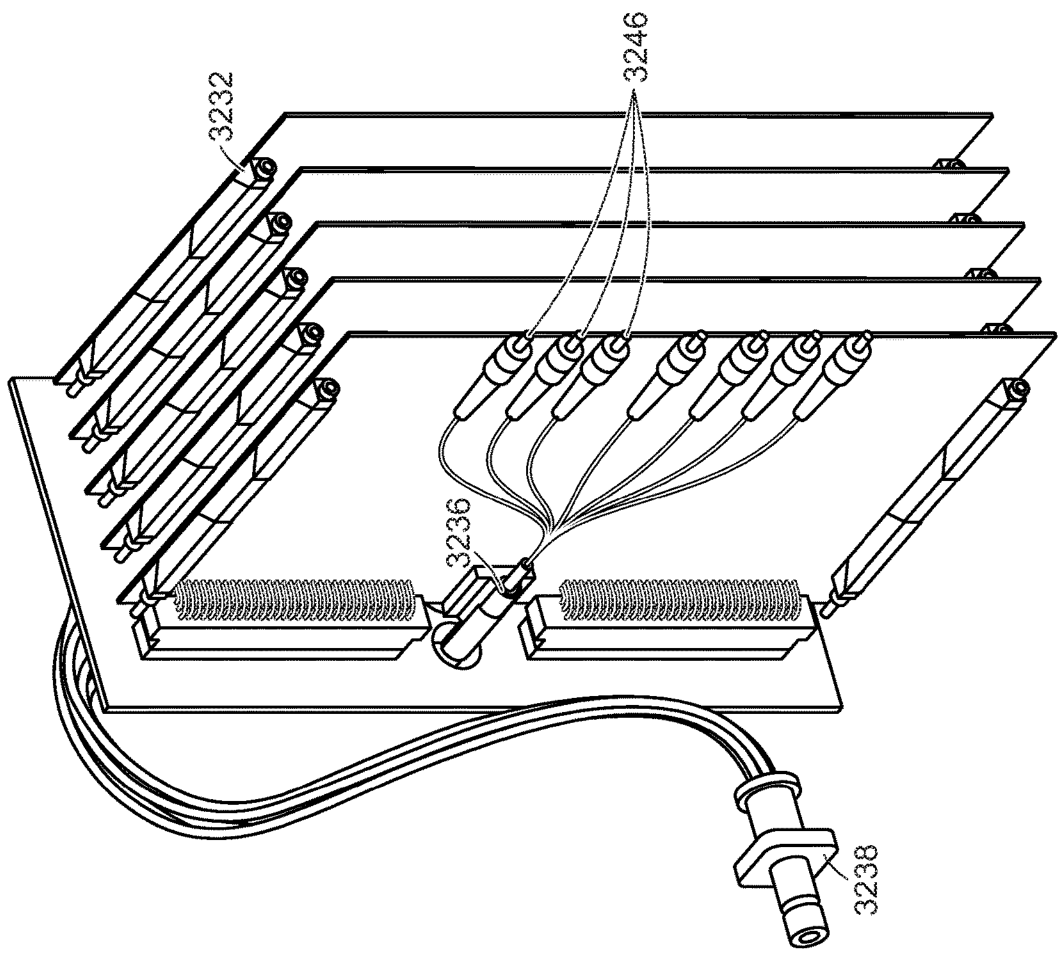

Another embodiment of the utilization of this technology is shown in FIGS. 290 and 291. The optical signals are brought into the power supply enclosure 3242 via a UDAT connector 3238, and then are broken out into several groups containing subsets of these fibers. These are in turn routed to the B-UDAT blind-mate connections 3236 on the backplane 3234. Consideration is given to maintaining the shield integrity of the power supply enclosure 3242, preventing EMI leakage to the backplane 3234 and circuit board 3232 stack. A conceptual representation of the routing from the UDAT to the, for example but not limited to, seven B-UDATs is shown in FIG. 290.

Once the fibers have been routed to the circuit boards 3232 as described above, they can be broken out to one or more of several options including individual connectors 3246 such as, but not limited to, ST-style fiber optic connectors and/or other miniature UDAT related connectors as described earlier. A representation of this is illustrated in FIG. 291.

Figure 292:
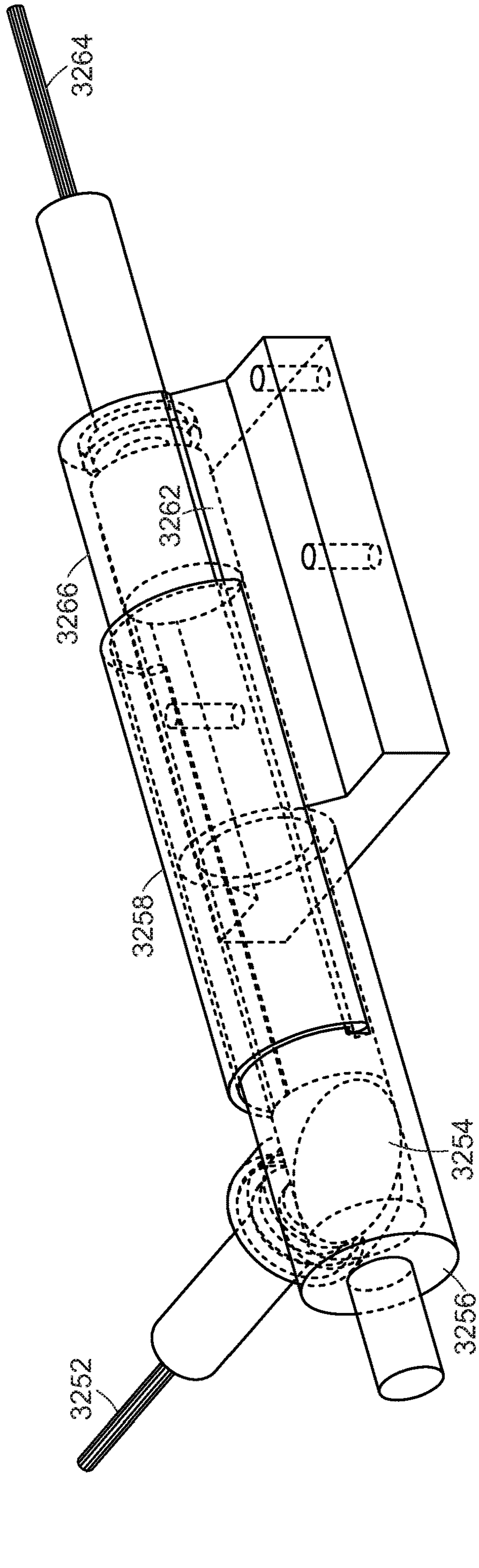
Figure 293:
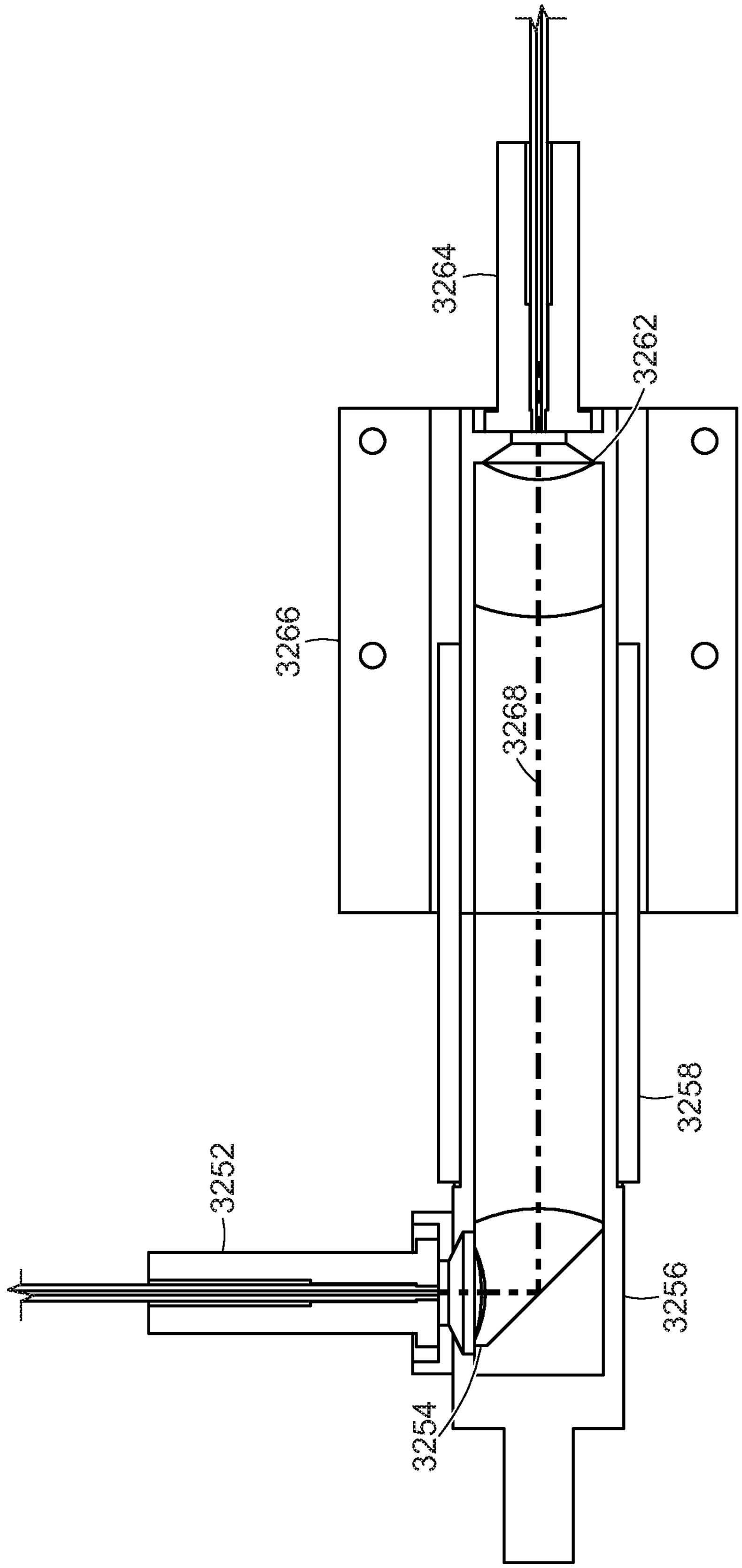

One embodiment of the right-angle B-UDAT connector that interconnects the backplane and the card-slot circuit board utilizes a fiber-to-fiber overall concept as described above. The fiber bundle 3252 from the bulkhead mount is aligned to the right-angle imager 3254 in the backplane housing 3256 which is mounted on a compliant mount on the backplane (not shown). The backplane housing 3256 connects via a spring alignment clipspring alignment clip 3258 to a fixed housing 3266 which is rigidly mounted to the circuit board (not shown). This houses the in-line imager 3262, which is aligned to the board fiber bundle 3264. This design concept is illustrated in FIG. 292 and FIG. 293.

Figure 294:
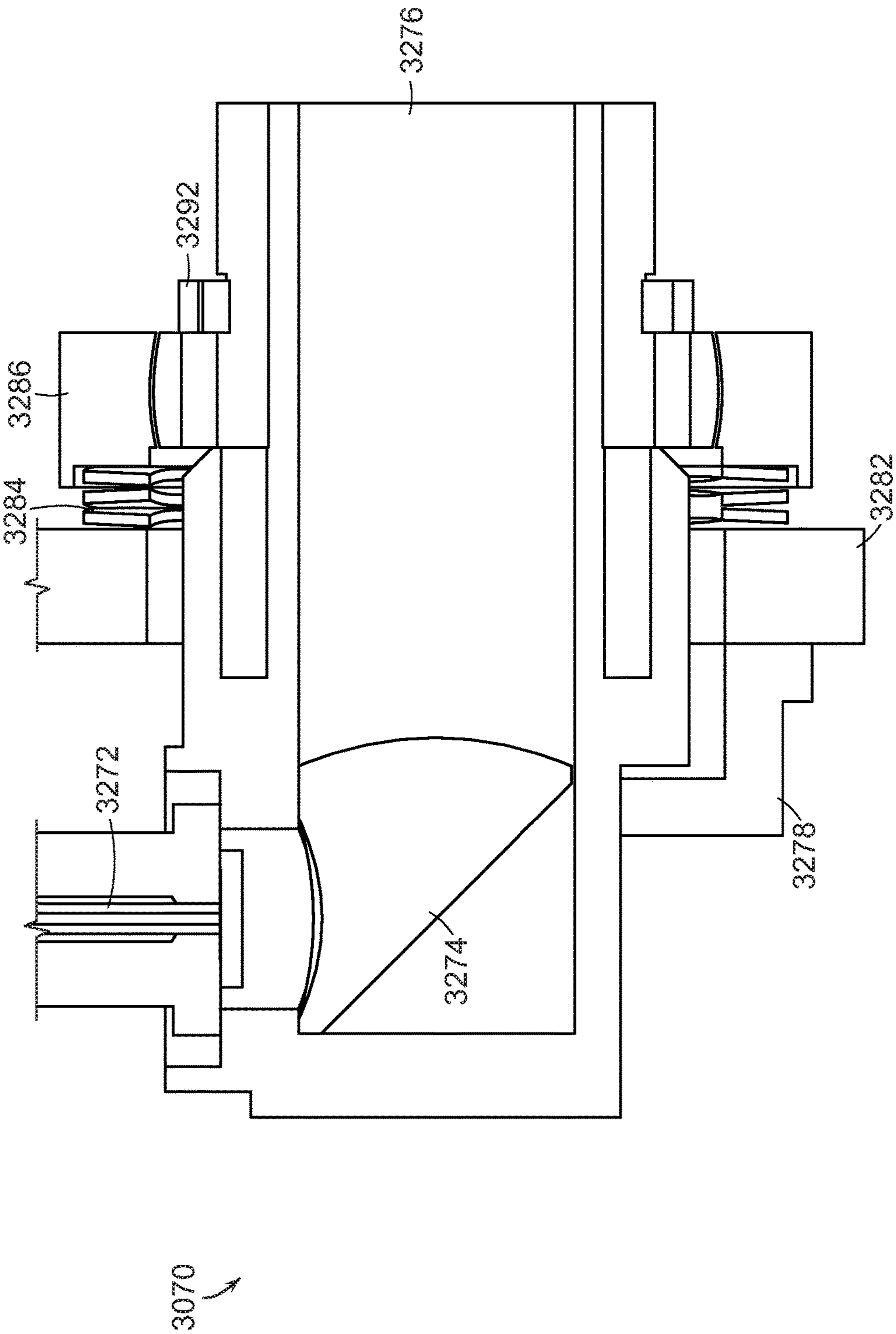

One embodiment of a compliance mechanism 3070 places a spherical bearing 3286 forward of the backplane 3282 which provides sufficient clearance behind the backplane 3282 to allow room for an elastomeric spring 3278. This provides self-centering capabilities to re-align the system following removal of a mating circuit card. The fiber bundle 3272 is aligned and firmly affixed to the right angle infinite conjugate imager 3274 via the backplane housing 3276. A cross-sectional view of the modified composite compliant mount is shown in FIG. 294. This view represents only the components that are mounted on the backplane 3282 and does not include the circuit board and mating connector half.

Figure 295:
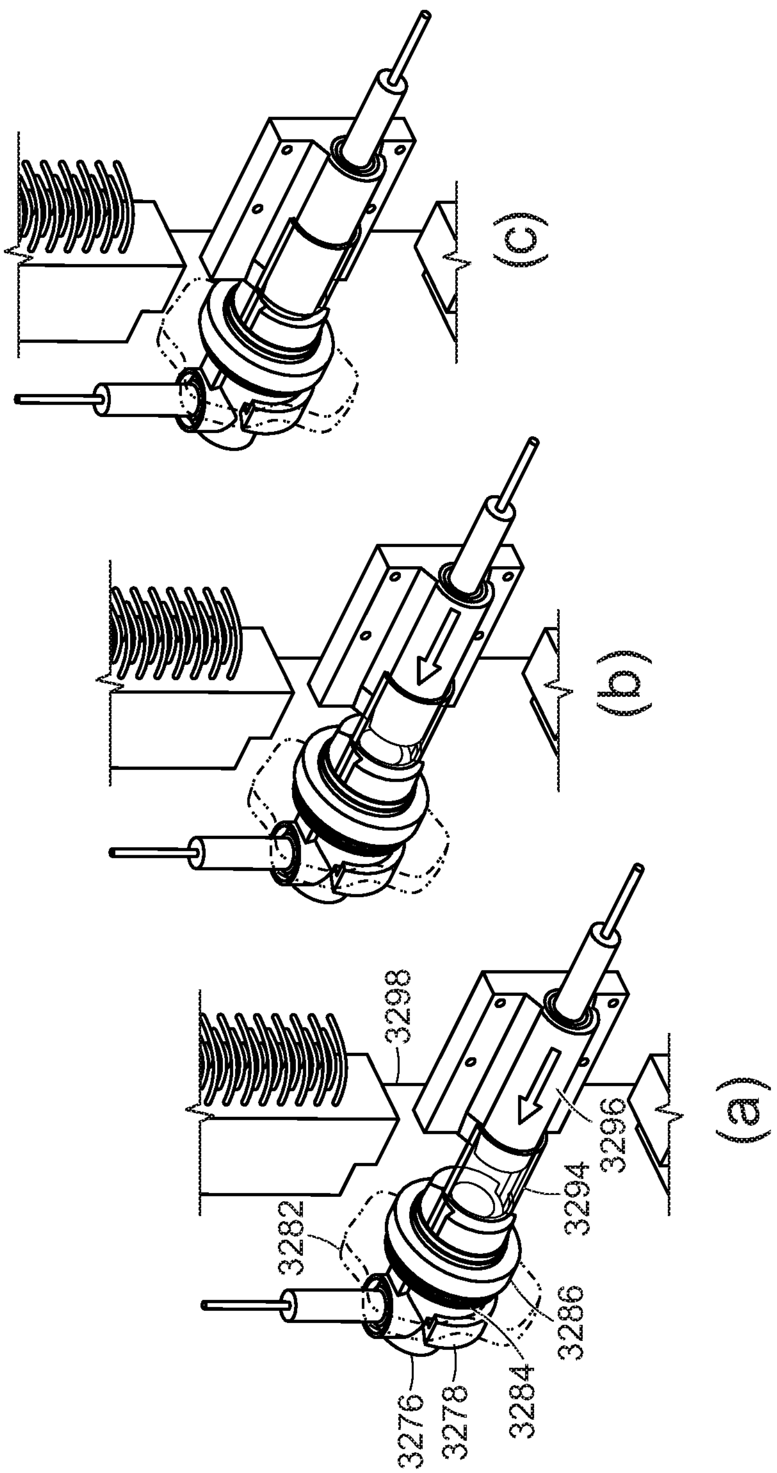
FIGS. 295-321 show embodiments of the backplane UDAT connector systems of these teachings.

During insertion of a circuit board 3298 into a card slot, a sequence of events occurs to ensure the proper mating of the connector, illustrated in FIG. 295. Initially, the spring alignment clip spring alignment clip 3294 will fit into the lead-in chamfer on the front of the straight lens housing 3296. This lead-in chamfer is designed so that the spring alignment clip 3294 will mate to the housing 3296 correctly regardless of the in-tolerance position of all of the components. In FIG. 295, the compression spring 3284 behind the spherical bearing 3286 is shown uncompressed at (a), partially compressed at (b), and nominally compressed at (c). The compressive force of the spring 3284 provides sufficient push force to overcome the friction associated with mating the housing 3296 to the spring alignment clip 3294. Following the initial lead-in chamfer, the spring alignment clip begins to mate with the v-grooves in the straight housing 3296, and the compliance mechanism allows for misalignments in 5 degrees of freedom (DOF), the sixth DOF is along the z-axis for insertion. Finally, the housings 3276 and 3296 will be fully aligned and mated.

Figure 296:
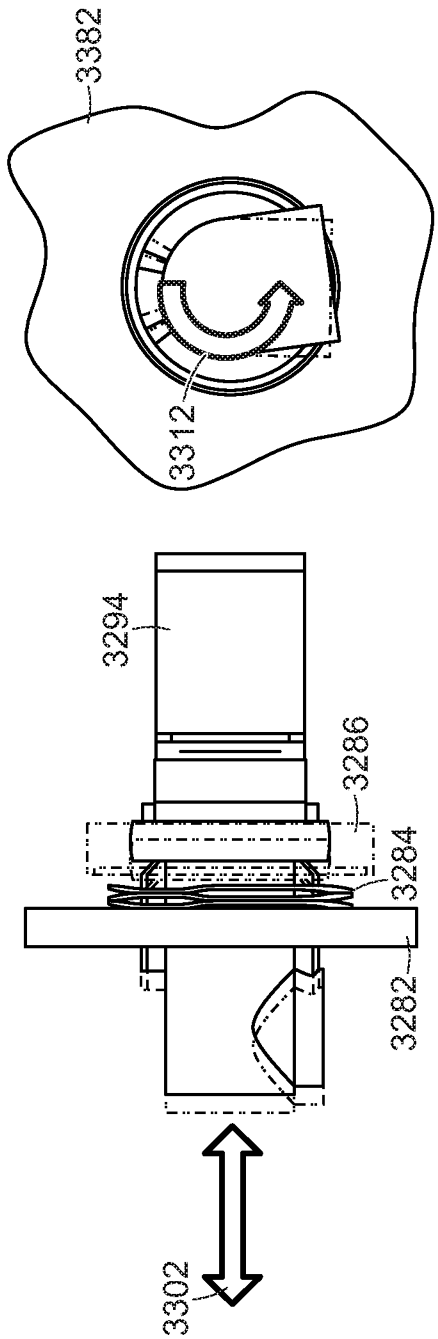

Compliance for translation along the z-axis 3302 is allowed by expansion and contraction of the compression spring 3284. An important element of the compliance mechanism 3070 is that the backplane housing 3276 never hits a hard stop, so it does not become over-constrained, and its alignment is fully defined by the spring alignment clip 3294 mating in the straight housing 3296. Rotation about the z-axis 3312 is allowed by sliding rotation of the spherical bearing 3286 with the compression spring 3284, or by the two races of the spherical bearing 3286 rotating with respect to one another. These two degrees of freedom are shown in FIG. 296.

Figure 297:
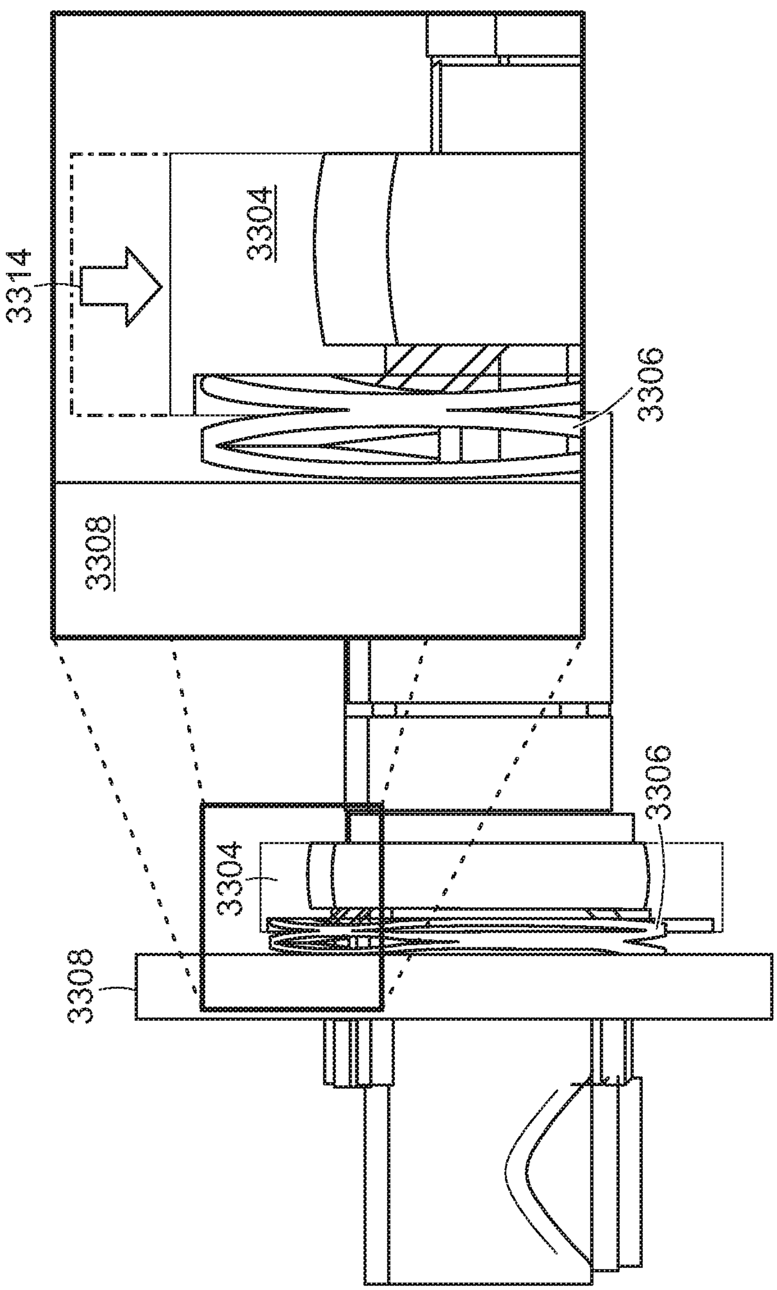
Figure 298:
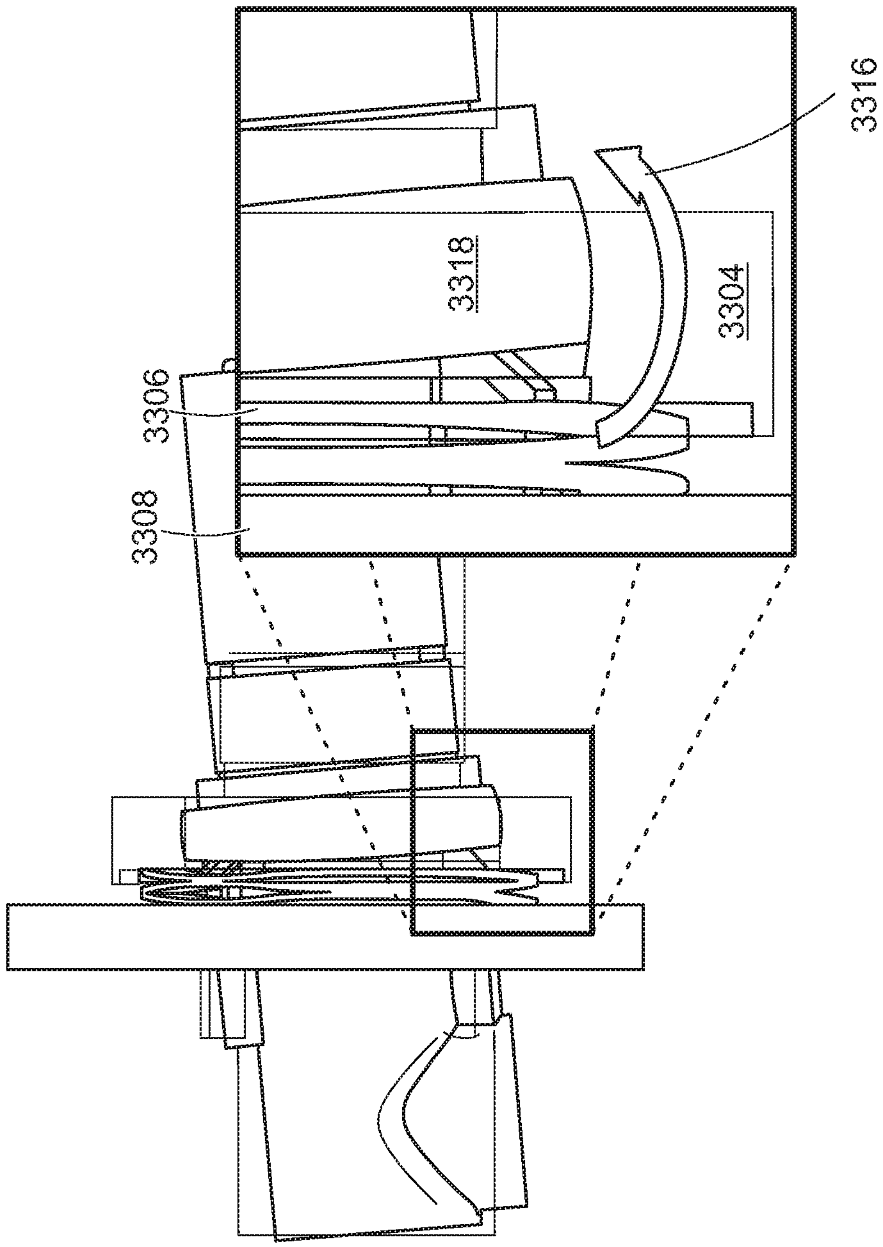

Lateral translations 3314 along the x- and y-axes occur when the spherical bearing 3286 slides across the compression spring 3284, as shown in FIG. 297. As a sliding interface, careful consideration is taken on the material or coating selection to improve performance. Rotational compliance 3316 about the x- and y-axes occurs when the inner race of the spherical bearing 3286 pivots within the outer race as shown in FIG. 298.

Figure 299:
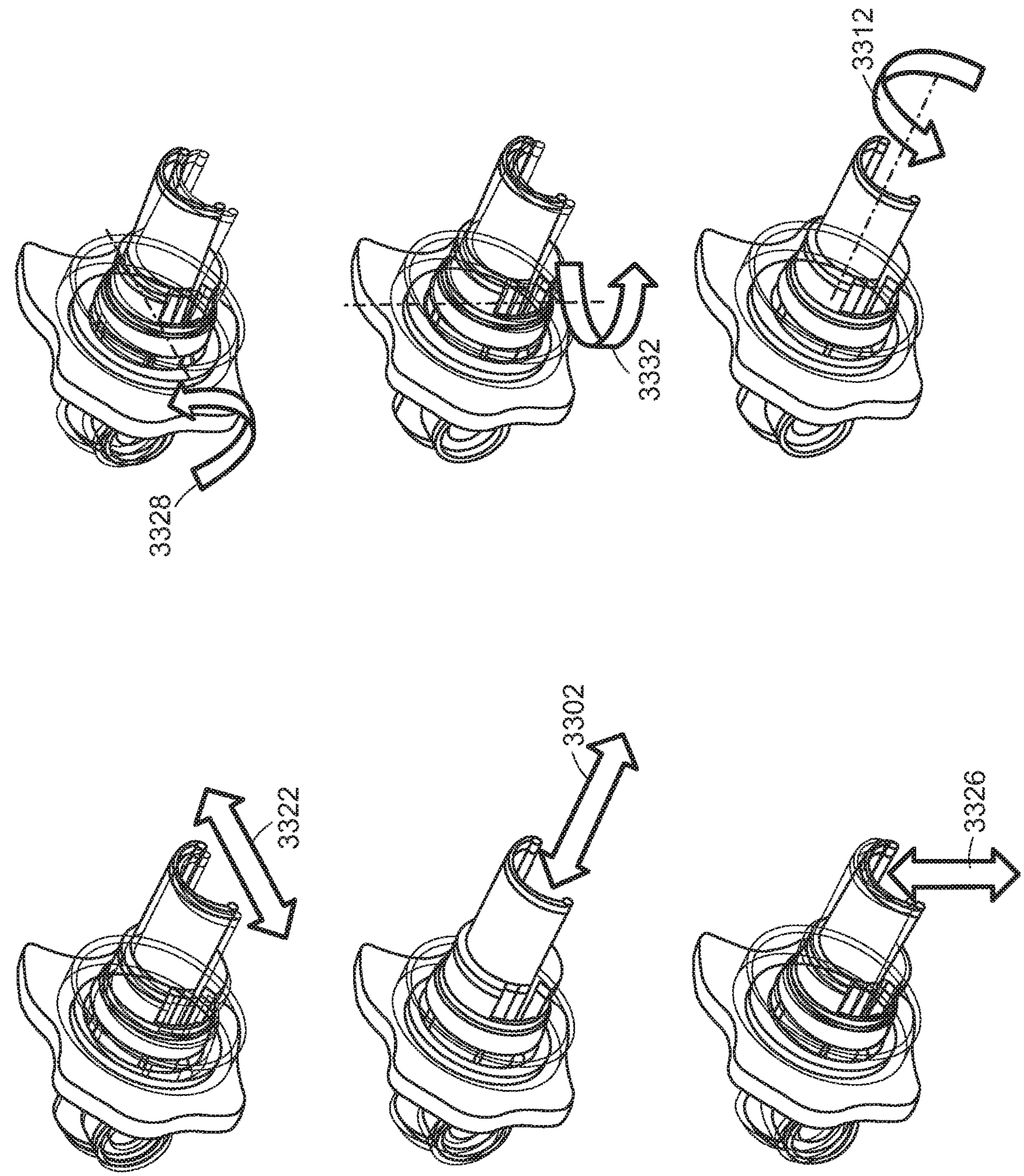

A summary of the six degrees of compliance freedom is given in FIG. 299. Translations are represented by the x-axis 3322, z-axis 3302 and y-axis 3326, and rotations are represented about the x-axis 3328, y-axis 3332 and z-axis 3312.

Figure 300:
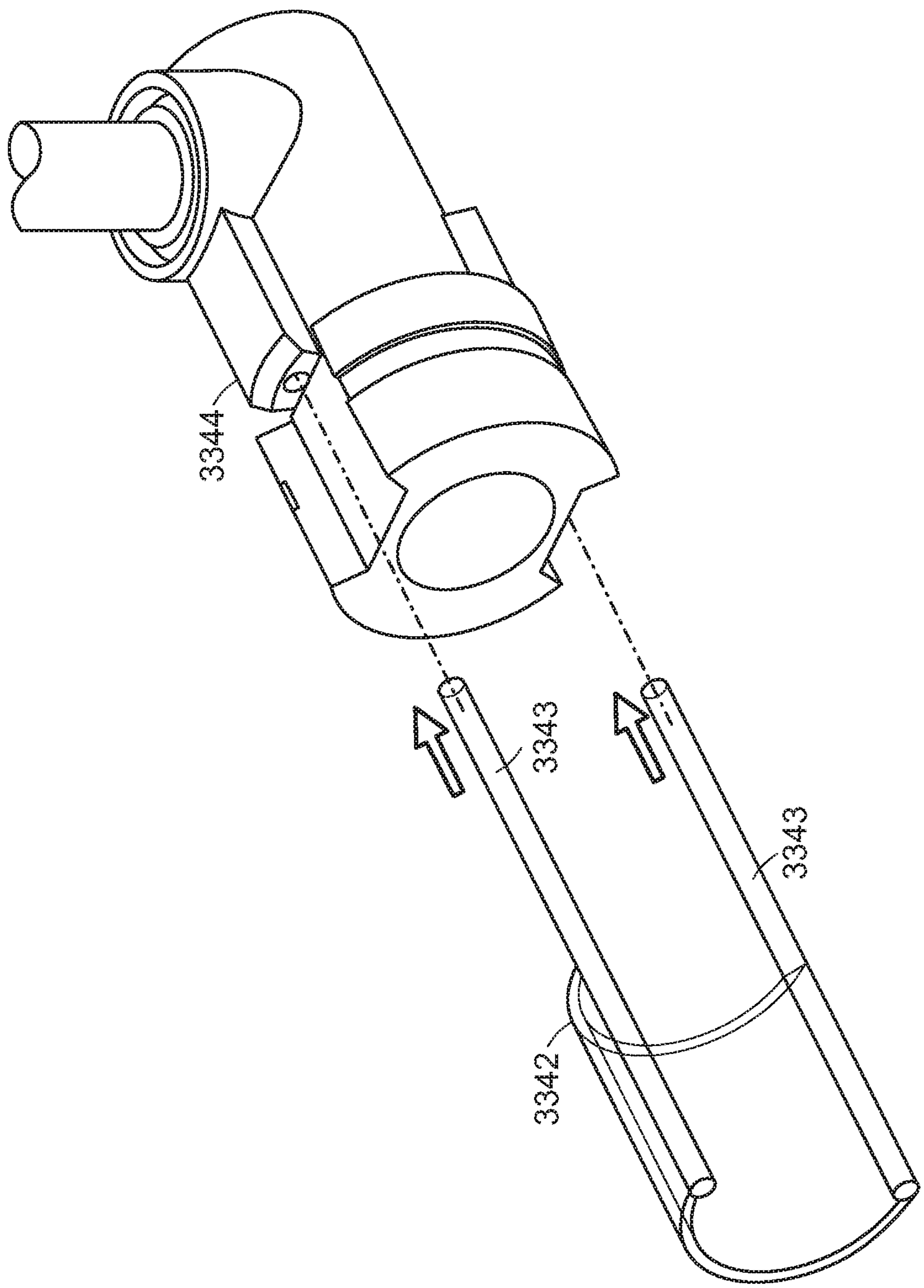

In another embodiment of the spring alignment dip, the rods 3343 of the spring alignment clip 3342 are press-fit into the housing 3344 as shown in FIG. 300. In this way the outside diameter of the housing 3344 can be split to provide clearance for the rods, while still providing a seat for the spherical bearing.

Figure 301:
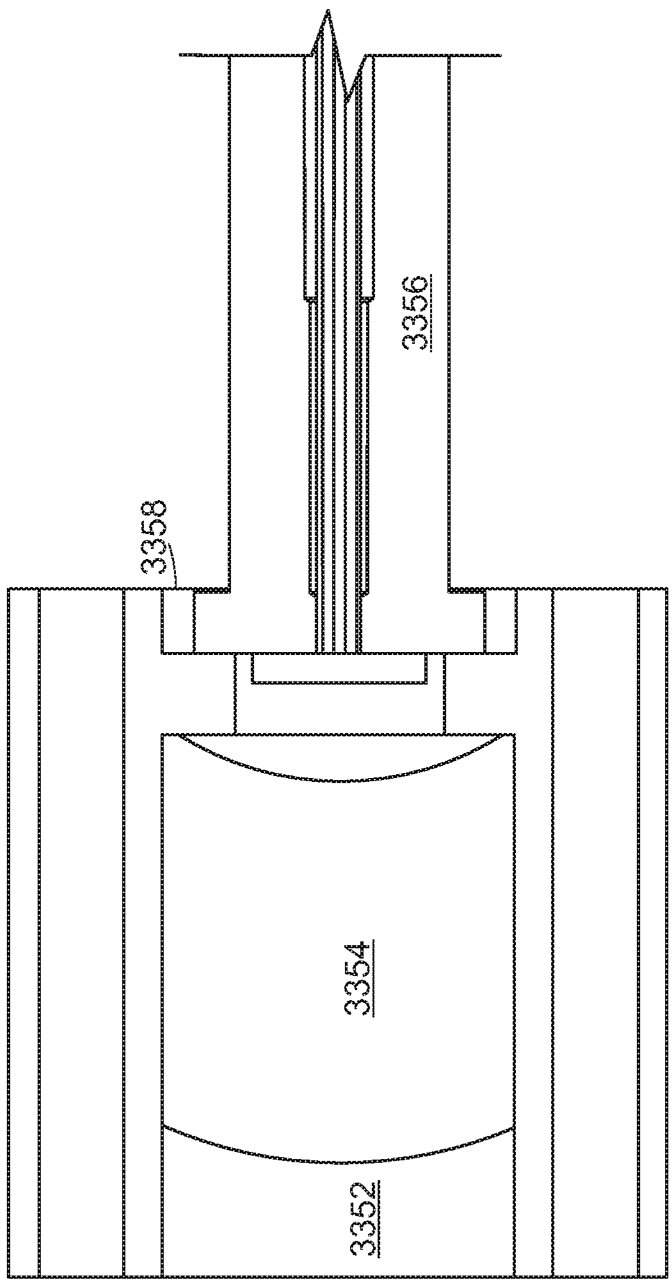

The fiber bundle 3356 will be aligned to the infinite conjugate imager 3354 and affixed in place. In one embodiment, the lens housings 3352 will have a recessed cavity that can be backfilled with a fillet of epoxy 3358 or eventually may be soldered or welded or affixed by other means to provide structural rigidity to the fiber bundle 3356. This concept is illustrated in FIG. 301.

Figure 302:
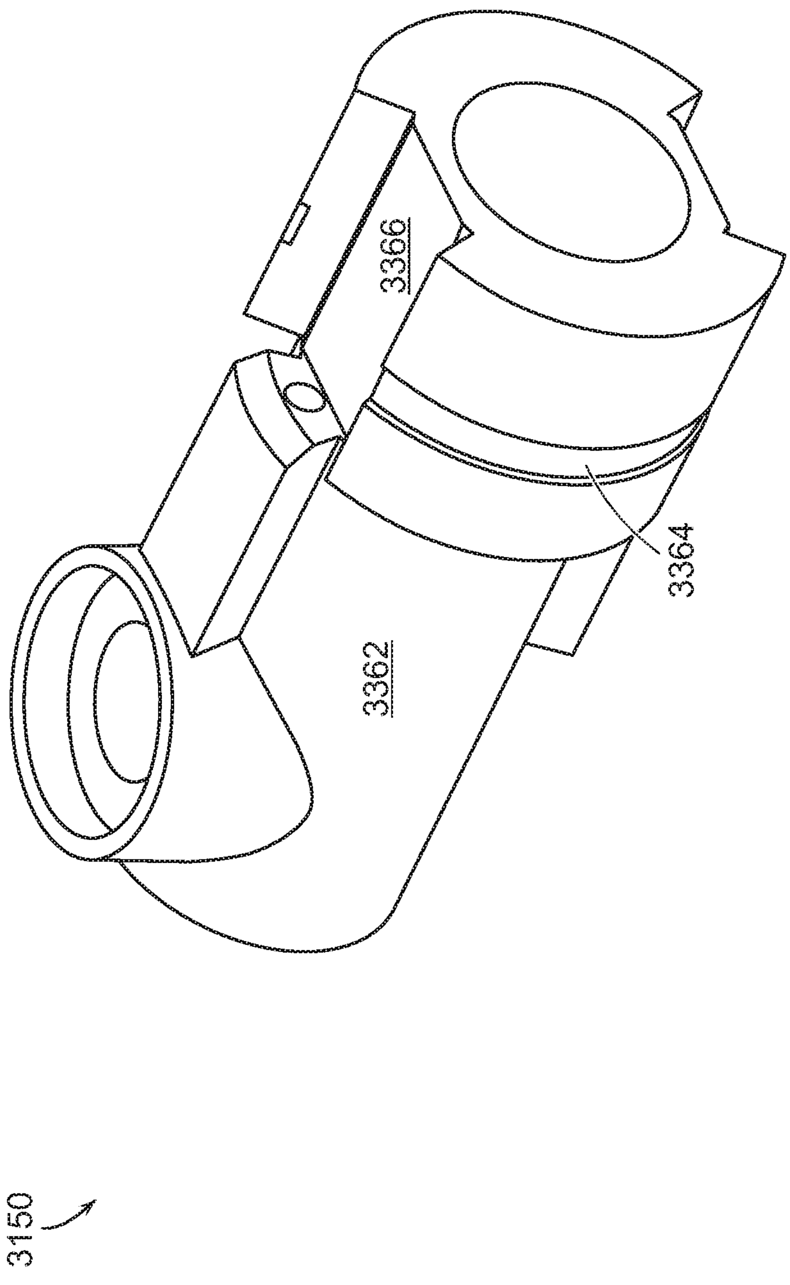
Figure 303:
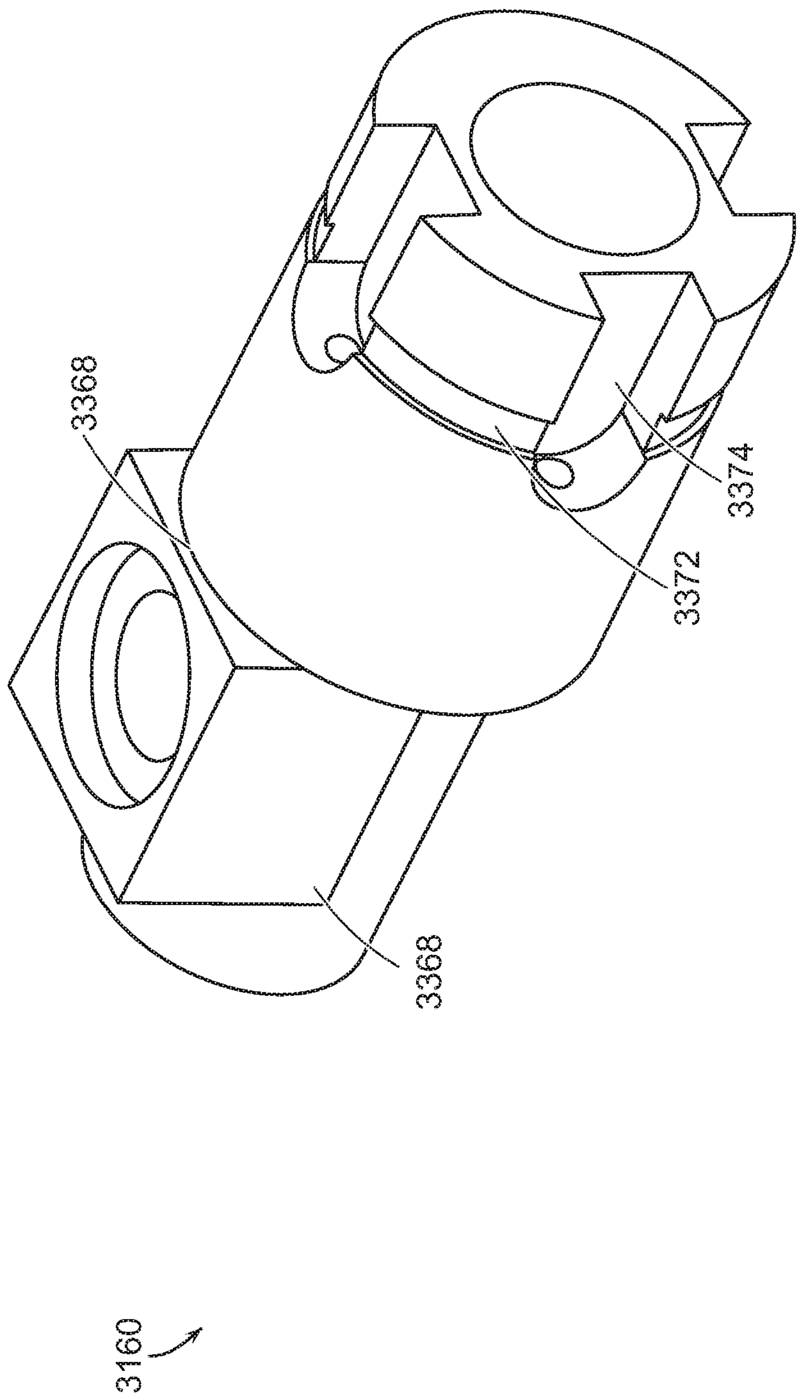

As illustrated in FIG. 302, one embodiment of the backplane housing 3150 includes moldable features such as the spherical bearing retaining ring slot 3364 and spring alignment clip clearance cavity 3366 with a lower-mass region 3362. Another embodiment of the backplane housing 3160 shown in FIG. 303 includes machinable features such as milled slots 3374 for the spring alignment clip, a turned spherical bearing retaining ring slot 3372, and machinable transitions 3368.

Figure 304B:
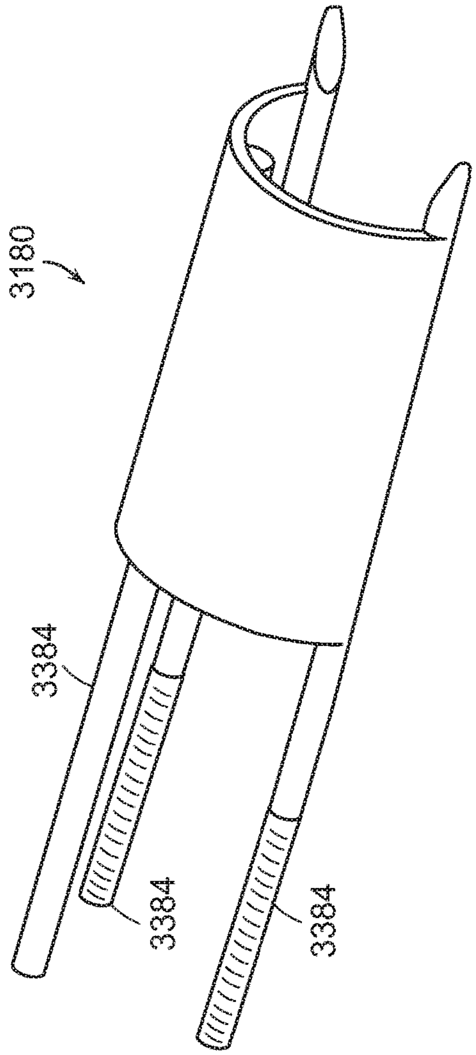
Figure 304A:
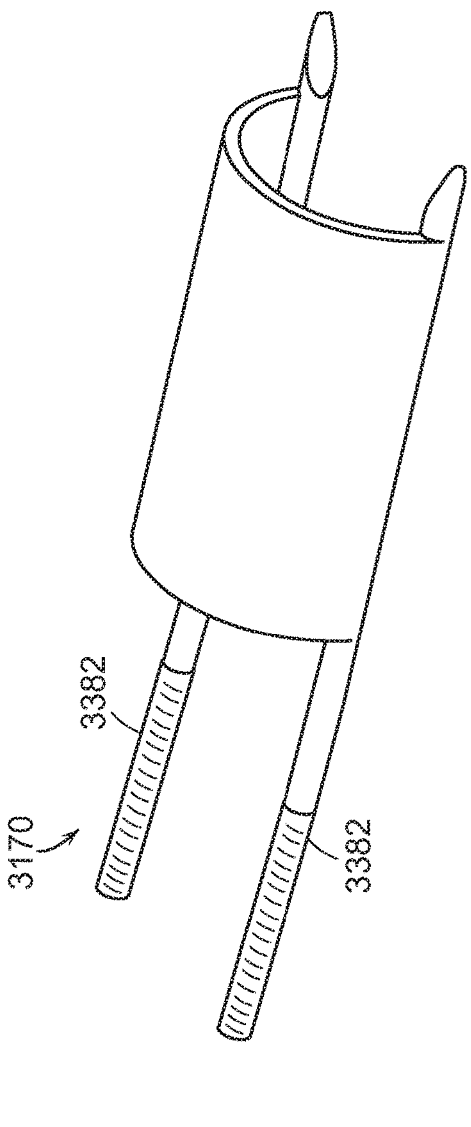

One embodiment of the spring alignment clip 3170 uses two parallel rails 3382, while another embodiment 3180 uses three parallel rails 3384. Finite element analysis (FEA) of both embodiments is shown in FIG. 304 (*a*), with the final distorted shape shown in solid and the original shape shown partially transparent.

Figure 305:
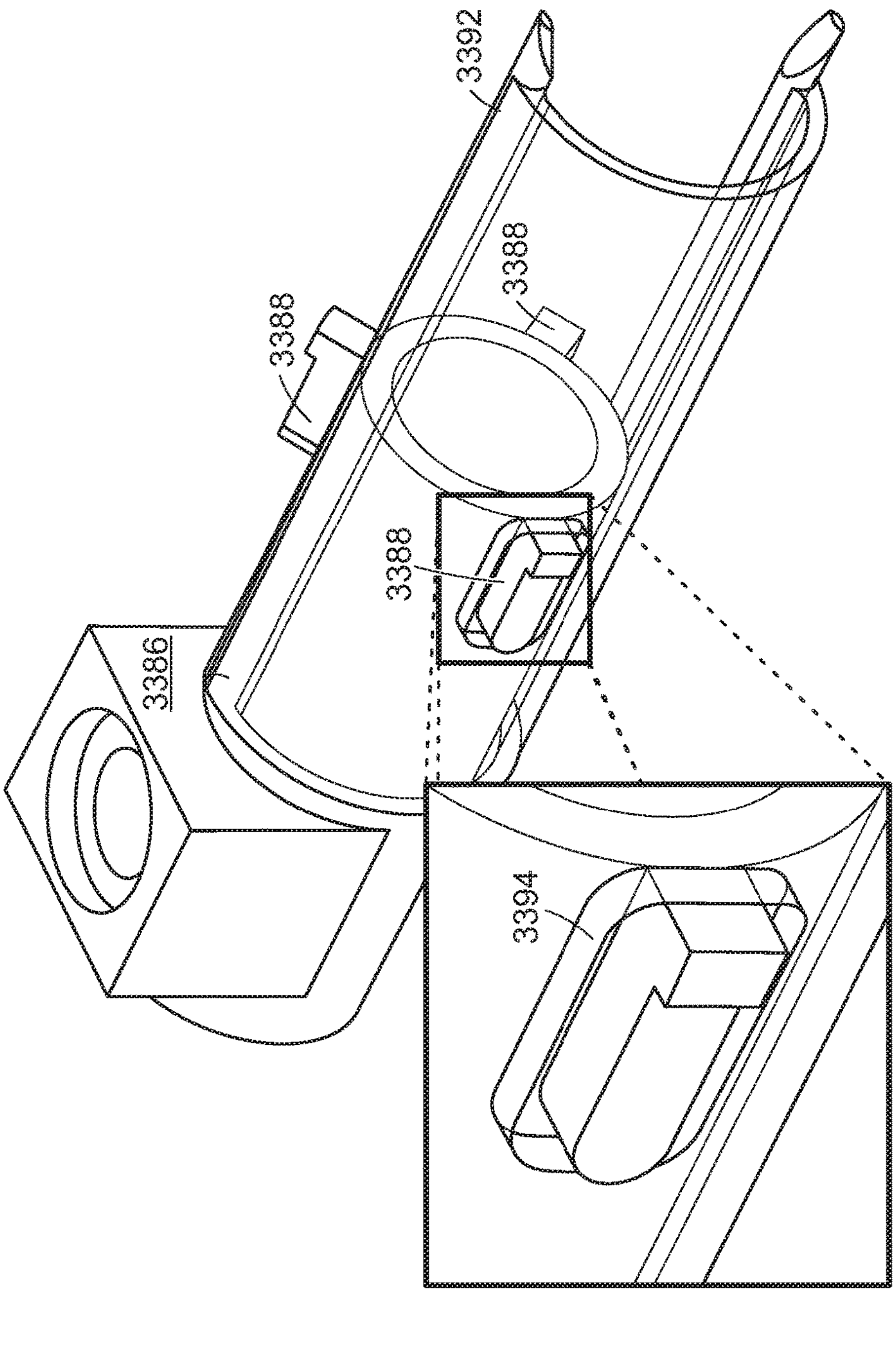

As shown in FIG. 305, another embodiment of the spring alignment clip 3392 has a rectangular cutout 3394 located on the sleeve between the rods. The backplane housing 3386 incorporates three, for example but not limited to, 120 degree opposed boss features 3388 that support the spherical bearing. One boss aligns with the cutout in the spring alignment clip 3392 and provides an axial retainer for the spring alignment clip 3392. During assembly of the backplane lens housing, the spring alignment clip can be snapped into place radially.

Figure 306:
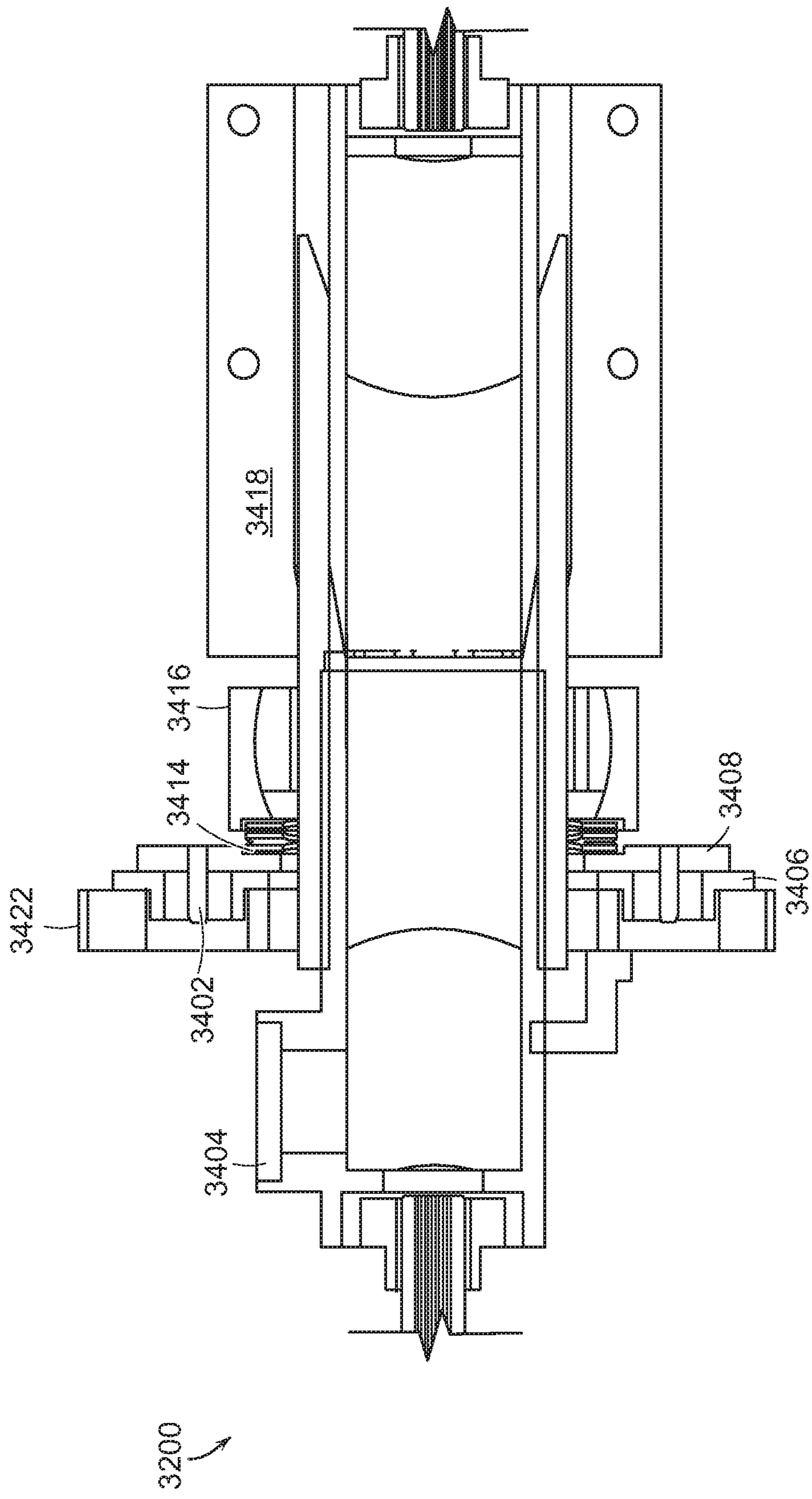
Figure 307:
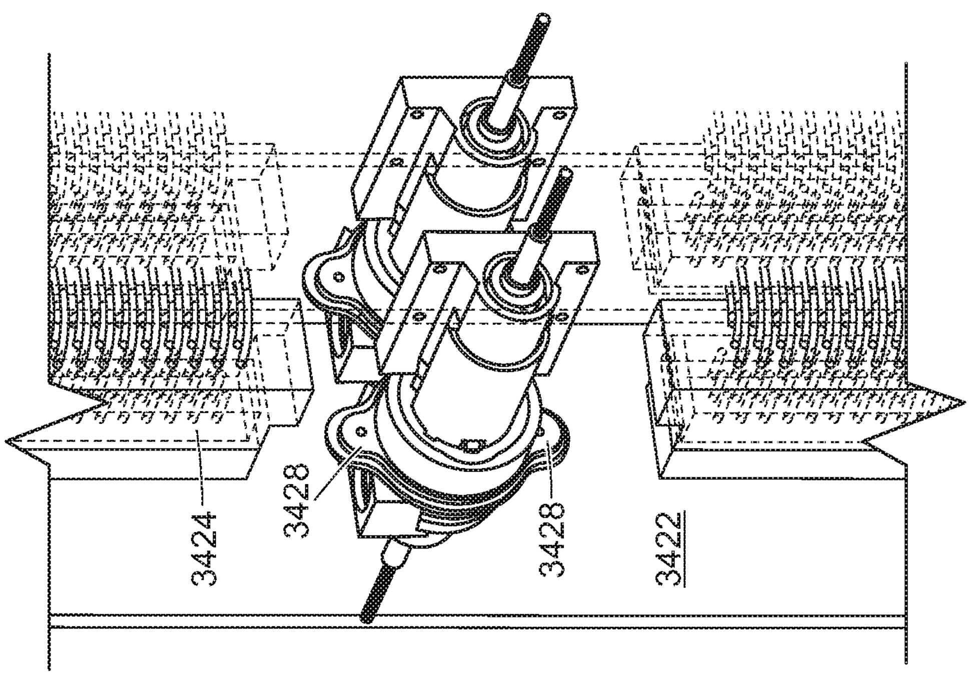

As illustrated in FIG. 306, another embodiment of a compliance mechanism 3200 uses plates 3408 and 3406 with controlled material selection or lubricious coatings to maintain a low coefficient of friction for sliding compliance in the x- and y-axis directions. Additionally, the low-friction plate 3406 directly in contact with the backplane 3422 has holes that, when interfaced with pins 3402 in the spring plate 3408, limit the total x- and y-axis linear travel. The backplane housing 3404 interfaces with the spherical bearing 3416. The mating straight housing 3418 is shown. These features can bebut are not limited to being, oriented on the backplane 3422 parallel to the mating circuit card 3424 face so as to not limit the card-to-card spacing, as shown in FIG. 307. The mating circuit cards 3424 are shown partially transparent for clarity.

Figure 308:
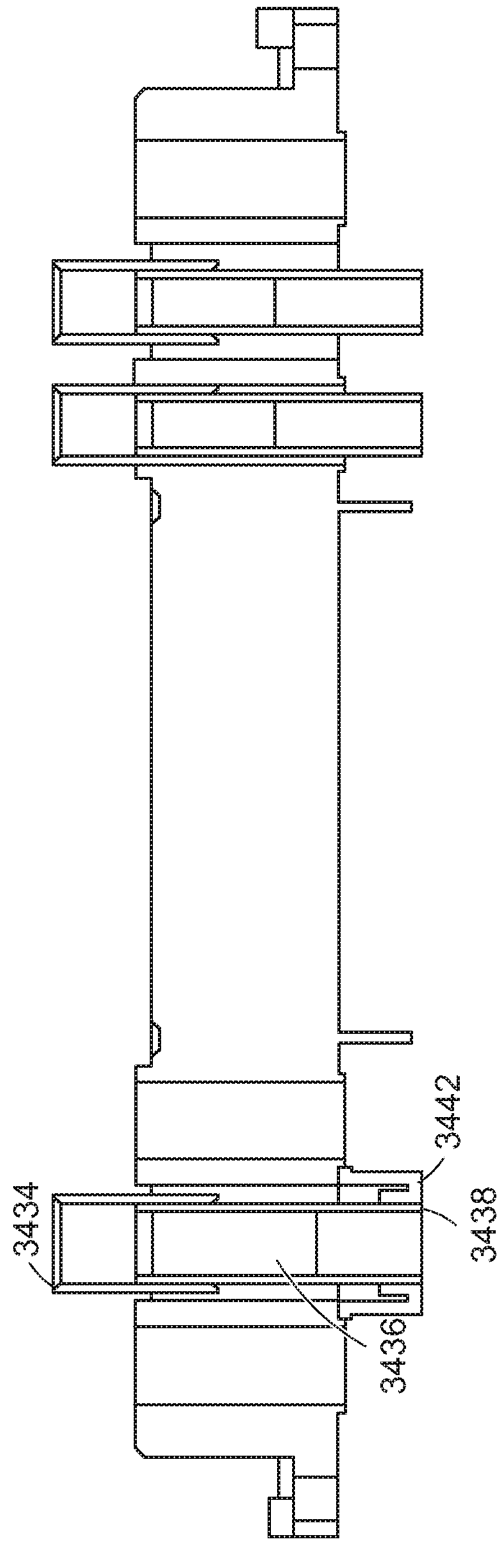

An embodiment of a B-UDAT connector would fit within a large electrical backplane connector with large RF insert or pin holes, for example. While some changes would inevitably need to be made to any existing electrical connector, a useful embodiment would be a B-UDAT connector that snaps into another off-the-shelf electrical backplane connector 3446. FIG. 308 shows one embodiment where an imager 3436 within a housing 3438 is affixed to a compliance mechanism 3442 which is in turn affixed to the backplane connector 3446. A split sleeve 3434 or other similar alignment device would mate to another housing on a mating circuit card electrical connector 3432. Multiple such connectors could be mounted in a single backplane connector 3446. In this embodiment, the optical connector must protrude from the electrical connector (as seen in FIG. 308) and engage first because of the required pupil relief distance of the imagers. Unless this embodiment has as much compliance as a stand-alone circuit card assembly (CCA) to backplane optical connector, some alternate means of prealignment such as long alignment pins should be used.

Figure 309:
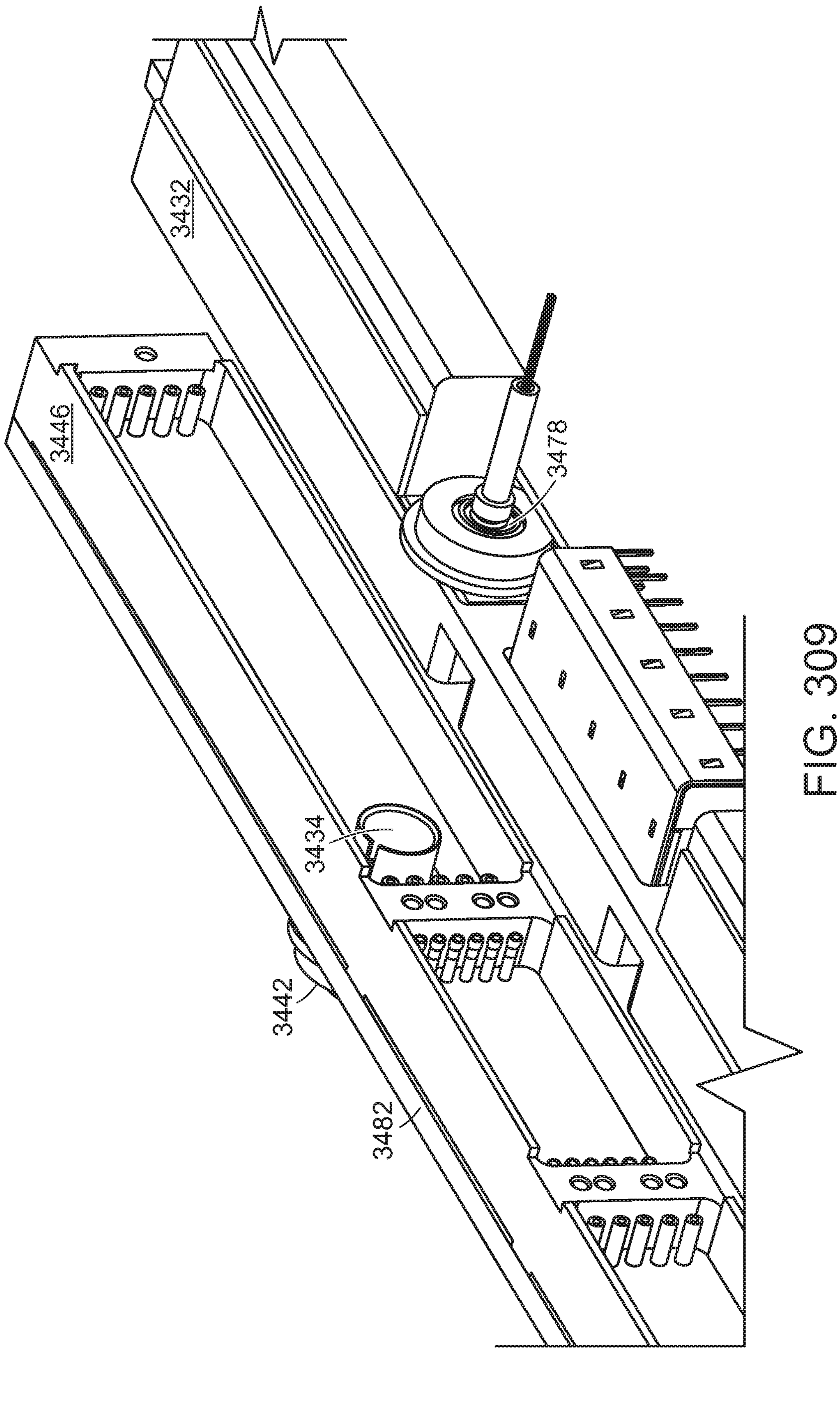
Figure 310:
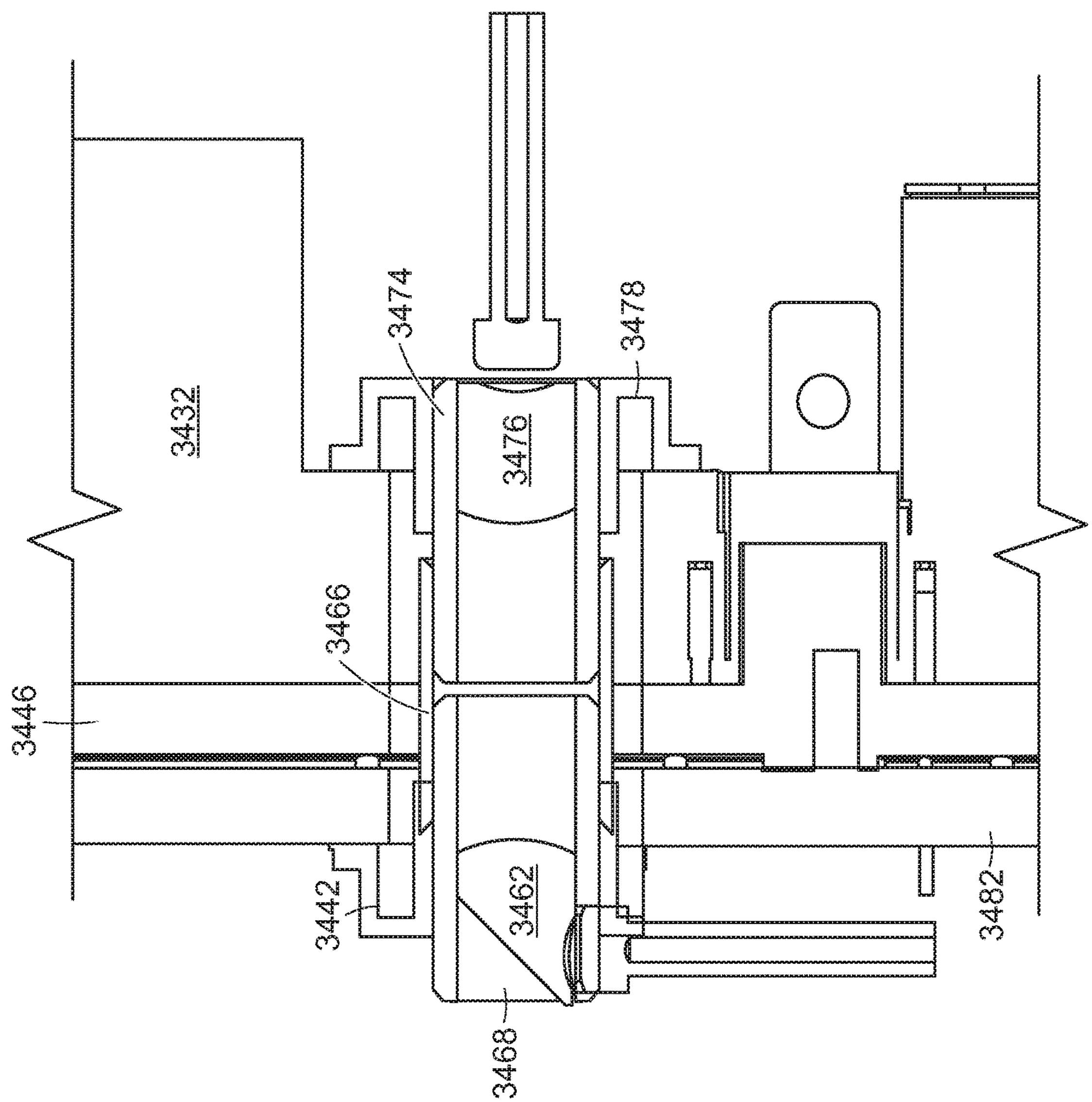

In the embodiment shown in FIG. 309 and FIG. 310, the right angle imager 3462 is mounted within a backplane housing 3468 which is affixed to a compliant mechanism 3442 which is in turn affixed to the backplane 3482. The alignment mechanism 3466, in this case but not limited to a split sleeve, mates the backplane housing 3468 to the circuit card housing 3474, which contains a straight imager 3476 and is affixed to the compliant mechanism 3478 which is in turn affixed to the circuit card electrical connector 3432. Compliance is split between the CCA and backplane to provide twice the compliance of one side alone, though it is not determined if this will be necessary.

Figure 311:
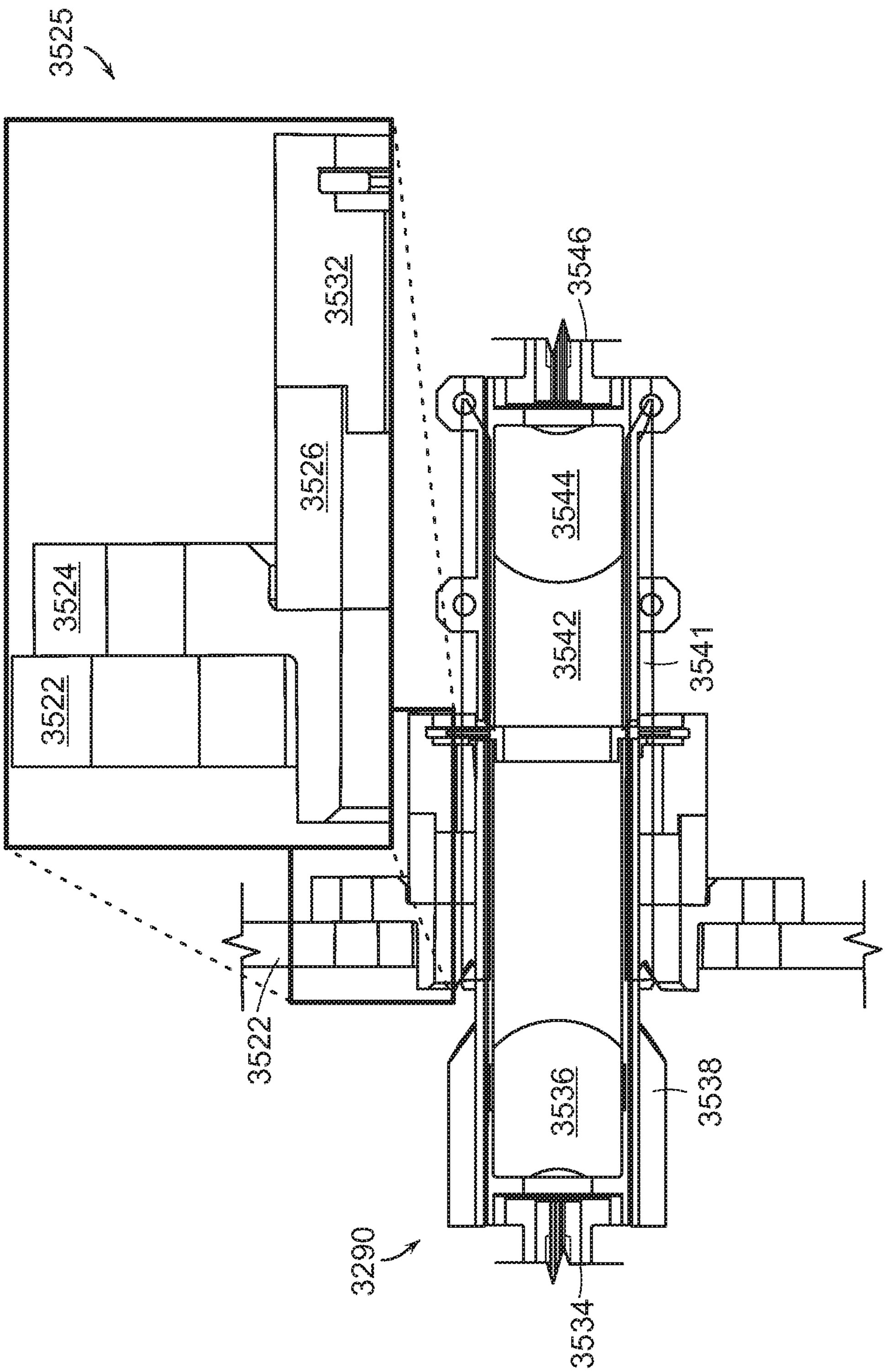

One embodiment of the B-UDAT connector system 3290 shown in cross-section in the fully mated position in FIG. 311 In this embodiment, the backplane fiber bundle 3534 is aligned to the backplane imager 3536 and affixed to the backplane housing 3538. The backplane housing mates to the compliance mechanism 3525, which is made up of the housing mount 3532, compliance spring 3526, and backplane spring mount 3524, which is affixed to the backplane 3522. All degrees of freedom of motion for compliance are provided by the compliance spring 3526 which is sized so that the spring is retained in place in the un-mated condition with a small amount of preload. The additional advantage to this design is that the forward stop that sets the spring preload also centers the backplane housing 3538 while un-mated to the circuit card housing 3542. This is accomplished, for example but not limited to, with the use of chamfered fins 3537 on the backplane housing 3538 and mating compound angle notches in the backplane spring mount 3524. Separately, the circuit card fiber array 3546 is aligned to the circuit card imager 3544 and affixed to the circuit card housing 3542. When the B-UDAT connector system 3290 is fully mated, the backplane housing 3538 is forced into alignment (by the spring alignment clip 3541) to the circuit card housing 3542 via the degrees of freedom afforded by the compliance mechanism 3525. The interface between the spring alignment clip 3541 and the housings 3538 and 3542 is described earlier in FIG. 16.

The sequence of events during the mating of the circuit card housing 3542 and the backplane housing 3538 can be described by four discrete positions. The first two positions shown in FIGS. 312A and 312B include the movement of the circuit card housing 3542 only, the compliance mechanism 3525 and backplane housing 3538 remain in an initial pre-loaded standby state. In this condition, the backplane housing 3538 and spring alignment clip 3541 are centered in the x- and y-axes and in all rotations by the mating of the housing fins 3537 and the notches 3572 in the backplane spring mount 3524. The backplane housing is pre-positioned towards the incoming circuit card housing 3542, with the compliance spring 3526 in a partially compressed position.

Figure 312A:
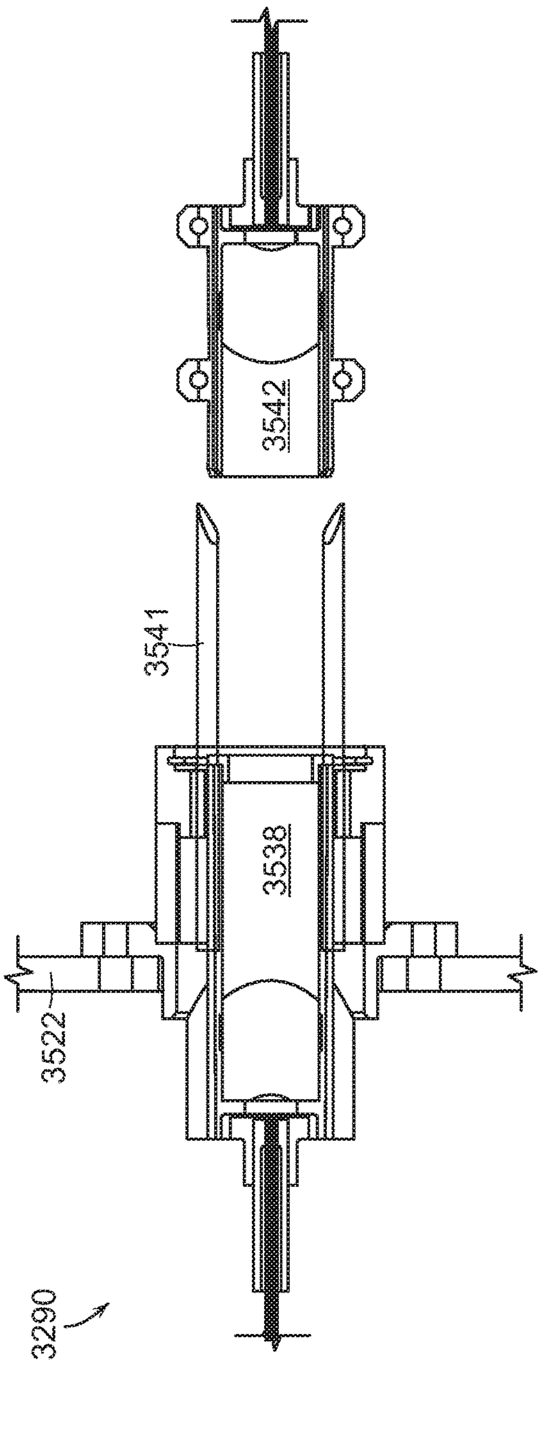
Figure 312B:
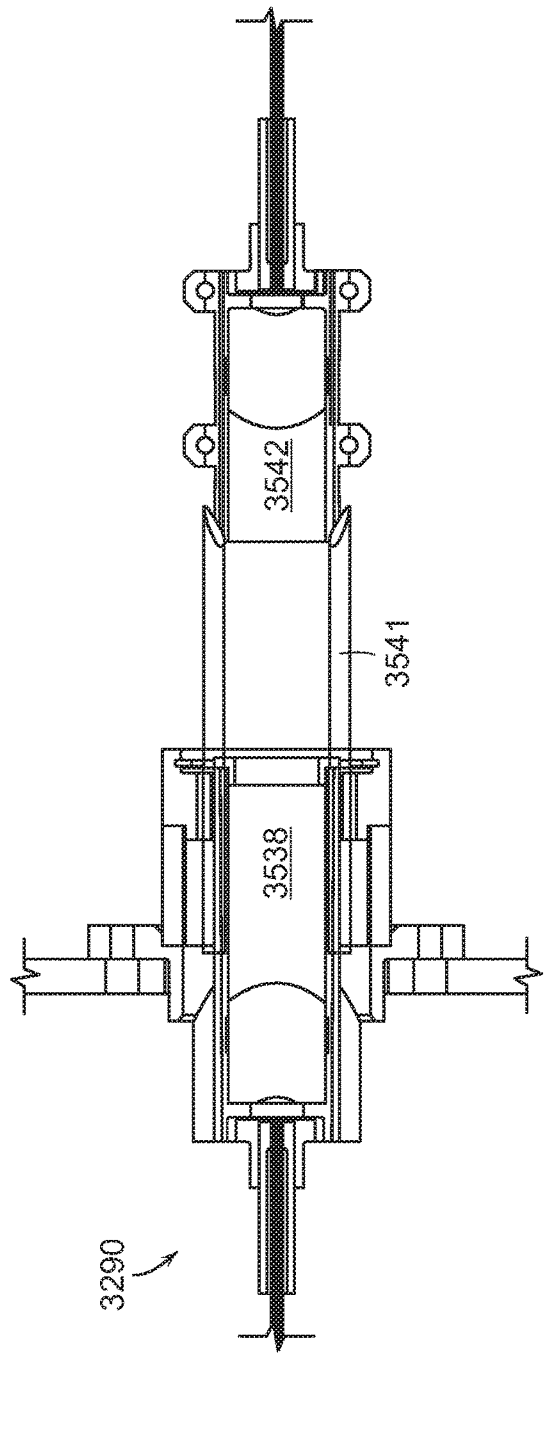

The pre-mating position of FIG. 312A assumes that the circuit card housing 3542 is mounted on a circuit card that is being inserted into a card slot, and that the components have not yet made contact. The initial engagement position of FIG. 312B involves the interaction of the lead-in chamfers on the circuit card housing 3542 leading edge and on the end of the spring alignment clip 3541, causing the backplane components to shift, if necessary, to allow for any initial alignment offset.

Figure 313A:
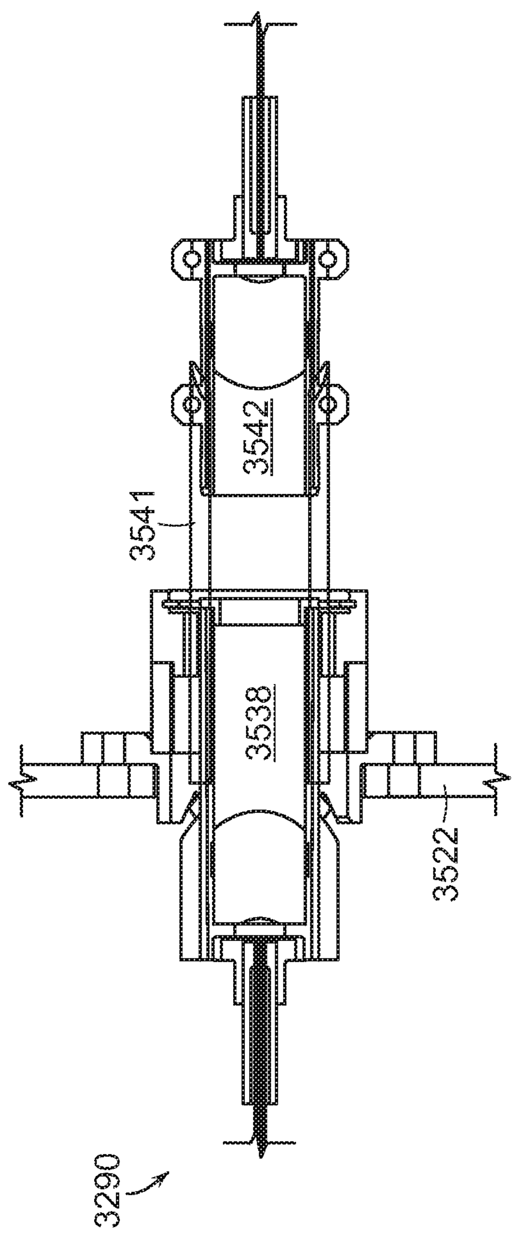
Figure 313B:
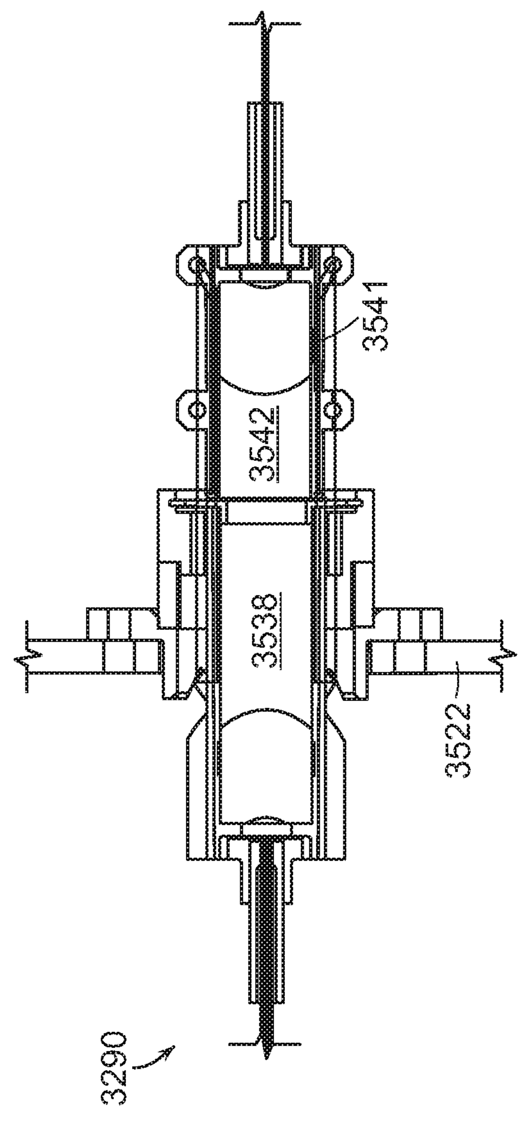

As the circuit card is pushed farther into the card slot, the circuit card housing 3542 pushes on the ends of the spring alignment clip 3541. The pre-loaded compliance spring 3526 axial force is insufficient to overcome the wedging forces (needed to widen the spring alignment clip rods sufficiently to mate with the v-notches in the side of the housing) of the circuit card housing 3542 and the spring alignment clip 3541; therefore, the compliance spring 3526 will compress and the backplane housing fins 3537 will disengage with the notches 3572 in the backplane spring mount 3524. Once the compliance spring 3526 compresses enough to increase the axial force enough to overcome the spring alignment clip 3541 wedging forces, the spring alignment clip 3541 will engage with the v-notches on the side of the circuit card housing 3542. In this intermediate engagement position shown in FIG. 313A, the compliance spring 3526 axial force will balance with the friction force of the mating spring alignment clip 3541 and circuit card housing 3542. For the remainder of the insertion of the circuit card into the card slot, the alignment between the circuit card housing 3542 and backplane housing 3538 is completely defined by the spring alignment clip 3541.

Figure 314A:
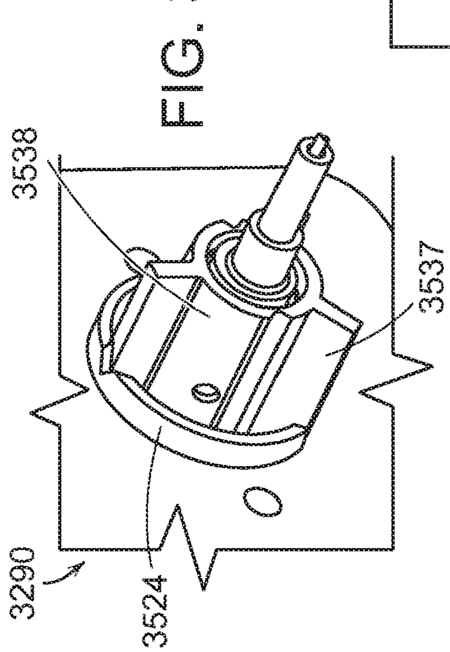
Figure 314B:
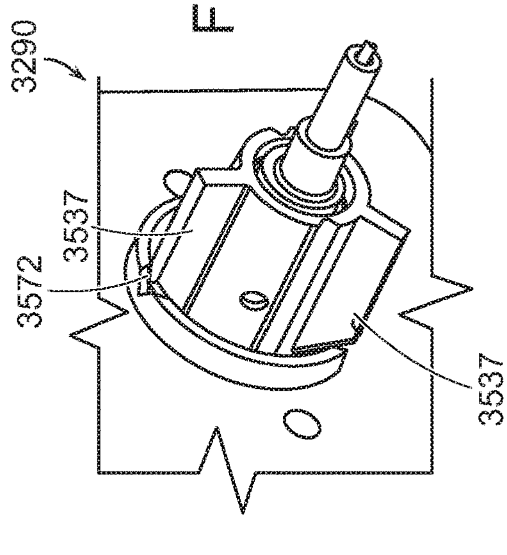
Figure 314C:
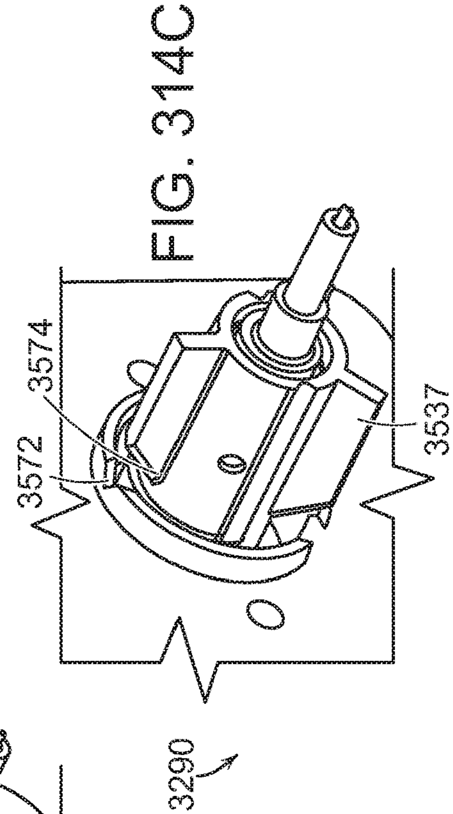

The image sequence shown in FIG. 314 illustrates the same sequence of events (the first pre-mating position is not shown) as seen from the backside of the backplane 3522. The position shown in FIG. 3128 is also shown in FIG. 314A, that of FIG. 312C is also in FIG. 3148, and finally that of FIG. 312D is in FIG. 314C. The notches 3572 in the backplane spring mount 3524 and the chamfers on the leading edge of the fins 3537 on the backplane housing 3538 are illustrated to show the mating surfaces that center the backplane assembly when the B-UDAT connector system 3290 is un-mated. The sequence of events that would occur during removal of the circuit card would simply be the reverse.

Figure 315:
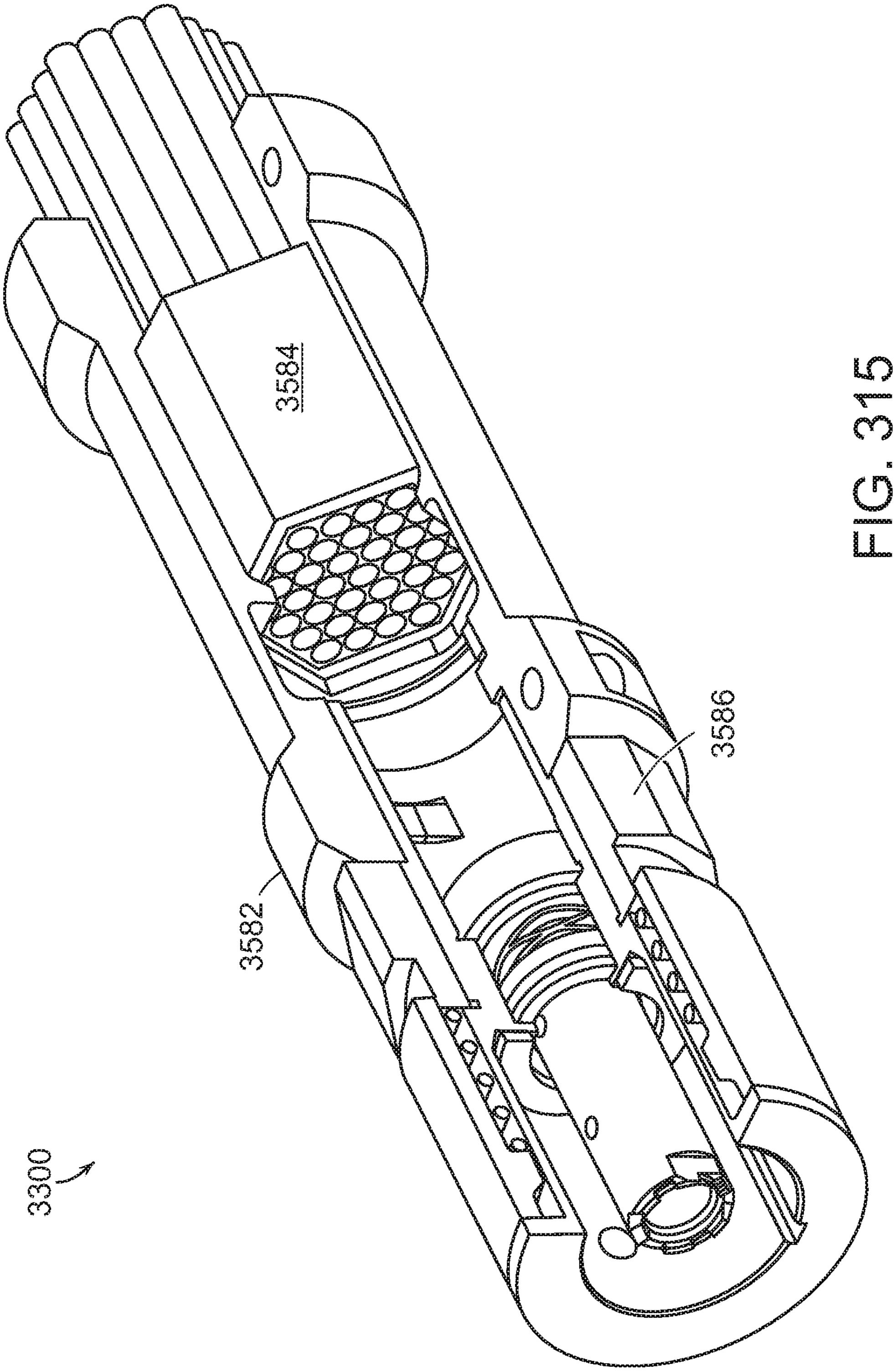

Another embodiment of the UDAT connector 2302 shown in FIG. 209 is the UDAT connector 3300 as shown in FIG. 315. This embodiment replaces the flexible tubing 2312 and flexible tubing damp 2408 with a furcation tube damp 3582 that supports and damps an array of furcation tubes 3584 which breakout the fibers to individual furcation tubes. The connector housing 3586 provides a rotation-locking attachment point for the furcation tube clamps 3582, locking the epoxied array of furcation tubes 3584 in place.

Figure 316:
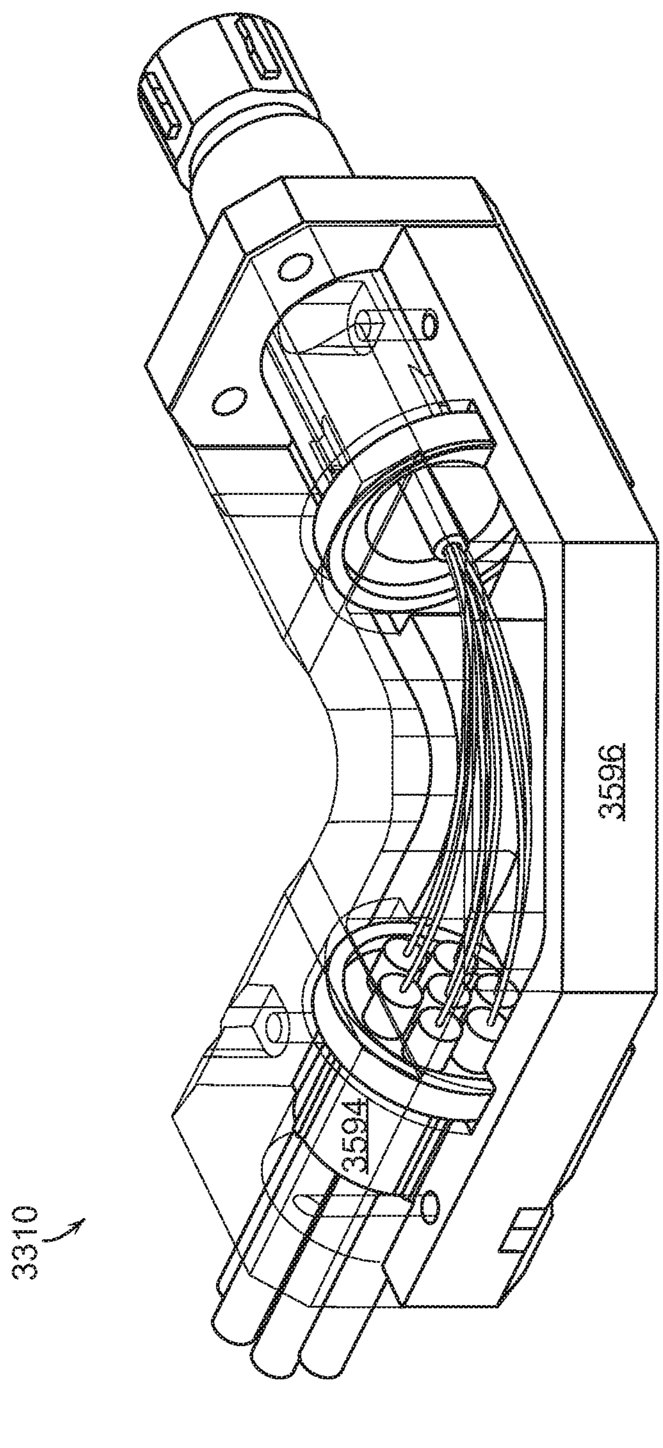

Another embodiment of the UDAT breakout 2306 shown in FIG. 204 is the UDAT breakout 3310 shown in FIG. 316 which introduces a right-angle bend to minimize the space required inside the demonstration box which can be useful for avoiding the need to sharply bend fibers to fit within cramped spaces. The embodiment includes the right-angle furcation tube clamp 3596 which supports and clamps an array of furcation tubes 3594.

Figure 317:
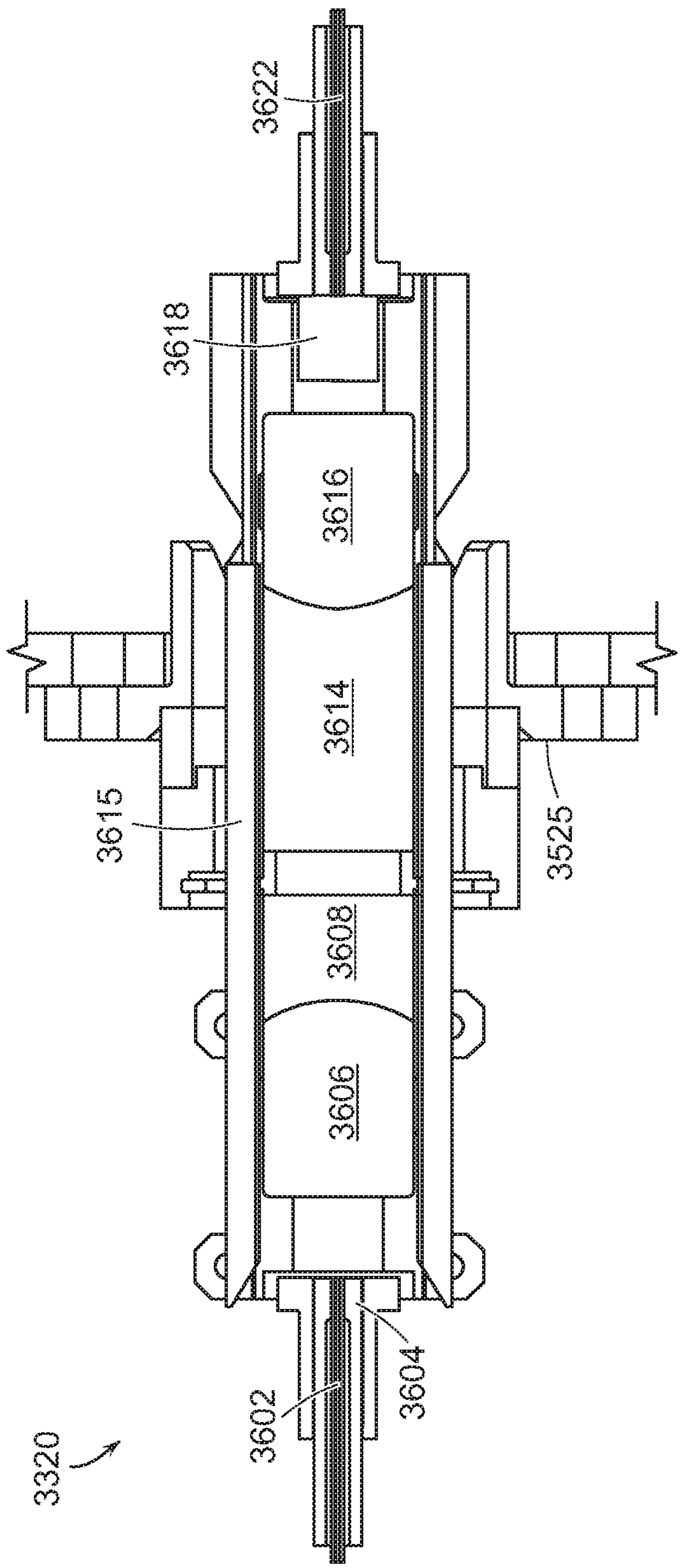
Figure 318:
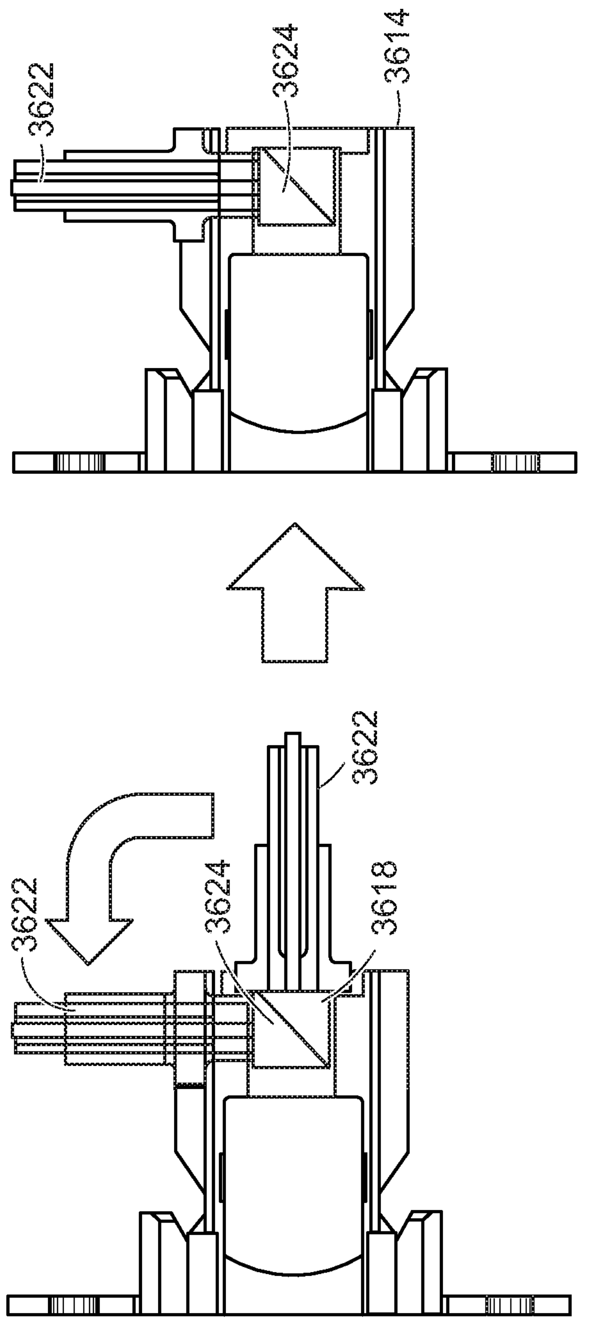

One embodiment of the 8-UDAT connector system 3320 shown in FIG. 317 is the same as the B-UDAT connector system 3290 with the exception of incorporating the backplane mounted prism rod 3618 between the backplane imager 3616 and backplane fiber array 3622 and the circuit card fiber window 3604 between the circuit card imager 3606 and the circuit card fiber array 3602. This embodiment allows the replacement of the backplane mounted prism rod 3618 with the right angle prism 3624 in order to convert the connector system from a straight-through orientation to a right-angle orientation. As illustrated in FIG. 318A, the backplane mounted prism rod 3618 is overlaid on the right angle prism 3624. The backplane fiber array 3622 is shown in both the straight-through orientation and the right-angle orientation. As illustrated in FIG. 318B, the right angle orientation is shown only with the right angle prism 3624 and the backplane fiber array 3622.

Figure 319:
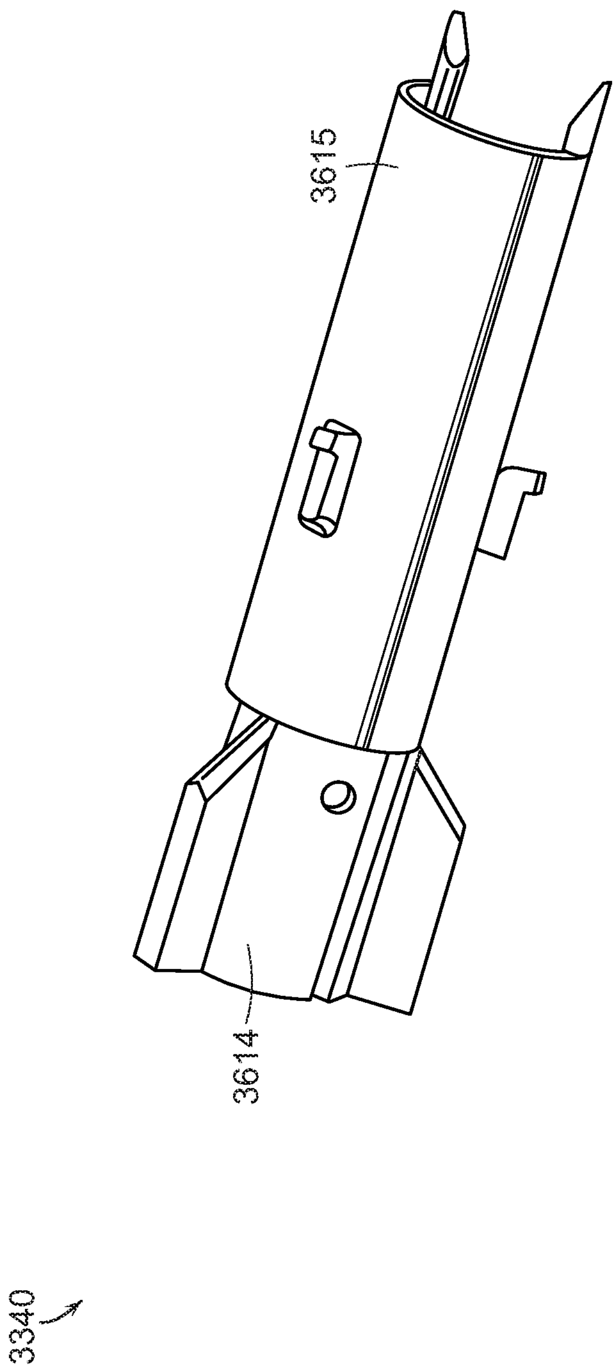

As illustrated in FIG. 319, the fabricated spring alignment clip 3615 is mounted on the fabricated backplane housing 3614.

Figure 320:
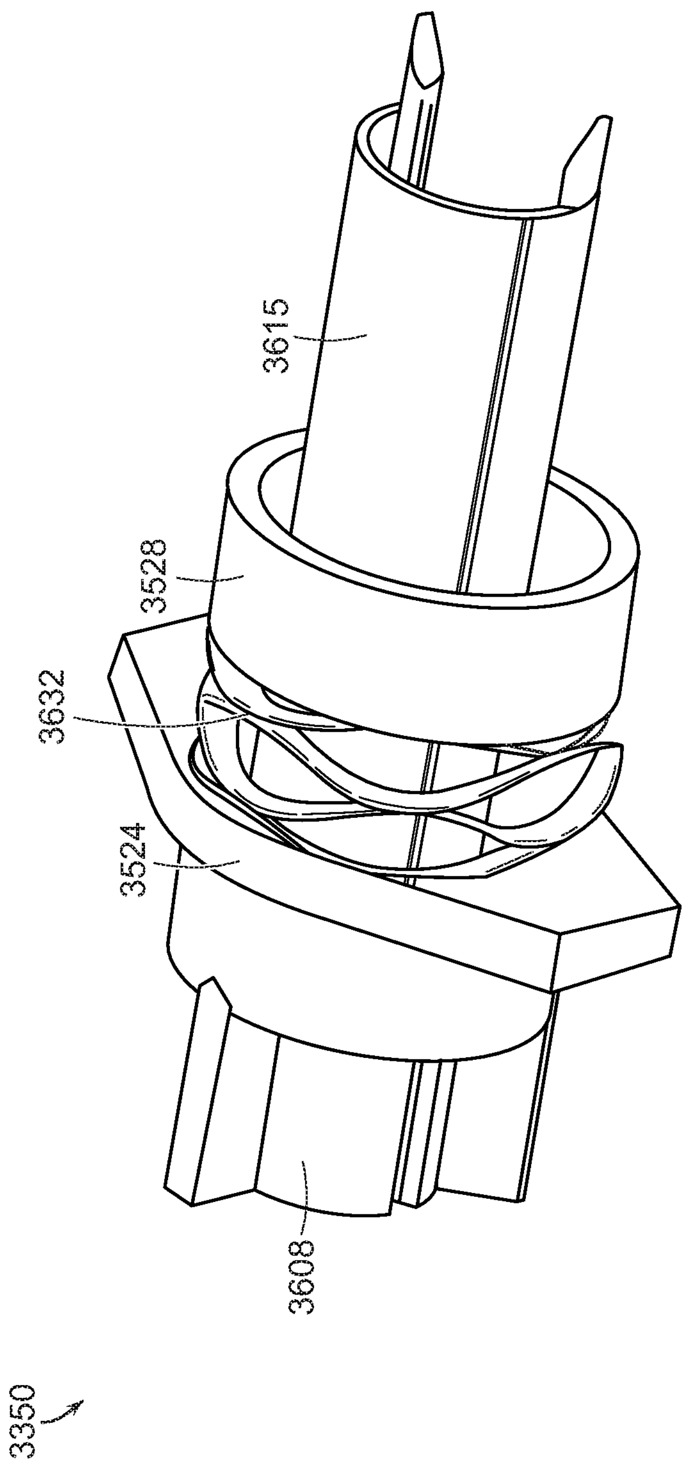

As shown in FIG. 320, the components shown in FIG. 319 are mounted within the fabricated backplane mounted compliance mechanism 3525.

Figure 321:
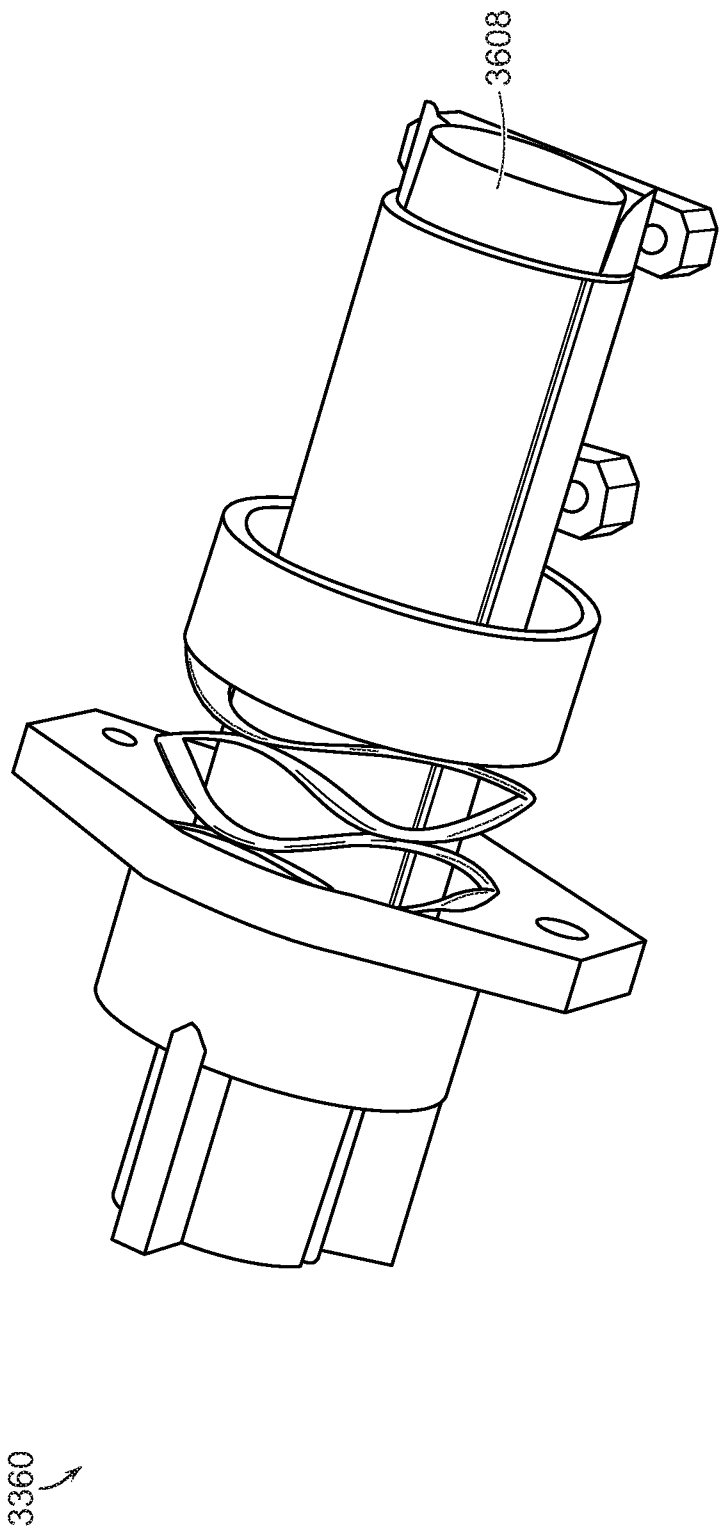

Finally, as shown in FIG. 321, the circuit card housing 3608 is mated with the spring alignment dip 3615, as would happen during insertion of a circuit card into the box. This completes the full B-UDAT assembly.

As used herein, the singular forms "a," "an," and "the" include the plural reference unless the context clearly dictates otherwise. Except where otherwise indicated, all numbers expressing quantities of ingredients, reaction conditions, and so forth used in the specification and claims are to be understood as being modified in all instances by the term "about."

For the purpose of better describing and defining the present invention, it is noted that terms of degree (e.g., "substantially," "about," and the like) may be used in the specification and/or in the claims. Such terms of degree are utilized herein to represent the inherent degree of uncertainty that may be attributed to any quantitative comparison, value, measurement, and/or other representation. The terms of degree may also be utilized herein to represent the degree by which a quantitative representation may vary (e.g., ±10%) from a stated reference without resulting in a change in the basic function of the subject matter at issue.

Although embodiments of the present teachings have been described in detail, it is to be understood that such embodiments are described for exemplary and illustrative purposes only. Various changes and/or modifications may be made by those skilled in the relevant art without departing from the spirit and scope of the present disclosure as defined in the appended claims.

What is claimed is:

1. An alignment system comprising:

a first housing comprising:

an inner surface defining an interior volume;

an outer surface;

a first end face; and a second end face;

said first housing configured to mount at least one first optical component;

a second housing comprising:

an inner surface defining an interior volume;

an outer surface;

a first end face; and a second end face;

said second housing configured to mount at least one second optical component; and an alignment component comprising a first fixed alignment feature on said second end face of said first housing; and a second fixed alignment feature on said second end face of said second housing; said first fixed alignment feature and said second fixed alignment feature configured to operate together to rotationally align said first housing and said second housing.

2. The alignment system of claim 1 wherein the first fixed alignment feature comprises at least one indentation on the second end face of the first housing; and wherein the second alignment feature comprises at least one protrusion on the second face end of the second housing; wherein said at least one indentation is configured to engage with said at least one protrusion.

3. The alignment system of claim 1 wherein the first alignment feature further comprises an alignment guide component at the second end face of the first housing; and wherein the second alignment feature further comprises an alignment guide component at the second end face of the second housing.

4. The alignment system of claim 1 wherein the first fixed alignment feature comprises at least one indentation on the second end face of the first housing; and wherein the second fixed alignment feature comprises at least one protrusion on the second end face of the second housing; said at least one indentation comprising a substantially flat portion of an area of the second end face of the first housing; said at least one protrusion comprising another substantially flat portion of an area of the second end face of the second housing; wherein said at least one indentation is configured to engage with said at least one protrusion.

5. An optical interconnect system comprising:

a first housing comprising:

an inner surface defining an interior volume;

an outer surface;

a first end face; and a second end face;

at least one first optical component mounted inside said first housing;

a second housing comprising:

an inner surface defining an interior volume;

an outer surface;

a first end face; and a second end face;

at least one second optical component mounted inside the second housing; and means for rotationally aligning said first housing and said second housing.

6. The housing of claim 1 wherein the at least one of said first and second fixed alignment features comprises at least one of hemisphere extrusion and conic cut, pin and slot, ridge and groove, ball and groove, ball and cone, and crenellations.

7. The alignment system of claim 1 wherein said first fixed alignment feature and said second fixed alignment feature are configured to align said at least one first optical component to at least one second optical component by means of direct connection of said first housing to said second housing.

8. An optical connector housing comprising:

an inner surface defining an interior volume;

an outer surface;

a first end face; and a second end face;

said housing being configured to mount at least one optical component;

at least one fixed alignment feature built into said second end face of the optical connector housing; all alignment features being fixed; said at least one fixed alignment feature configured to tip and tilt align said housing to another housing.

9. The optical connector housing of claim 8 wherein said at least one fixed alignment feature is configured to rotationally align said housing.

10. The alignment system of claim 1 wherein a first array of optical fibers is aligned to said first fixed alignment feature and a second array of optical fibers is aligned to said second alignment feature; wherein said first alignment feature engages said second alignment feature to rotationally align said first array of optical fibers to said second array of optical fibers.

* * * * *